US012535875B2

(12) United States Patent
Dascola et al.

(10) Patent No.: US 12,535,875 B2
(45) Date of Patent: Jan. 27, 2026

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Jonathan R. Dascola, San Francisco, CA (US); Stephen O. Lemay, Palo Alto, CA (US); Israel Pastrana Vicente, Spring, TX (US); Peter D. Anton, Portola Valley, CA (US); Kristi E.S. Bauerly, Los Altos, CA (US); Alan C. Dye, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/444,386

(22) Filed: Feb. 16, 2024

(65) Prior Publication Data

US 2024/0192764 A1    Jun. 13, 2024

Related U.S. Application Data

(63) Continuation of application No. 17/563,864, filed on Dec. 28, 2021, now Pat. No. 11,954,242.
(Continued)

(51) Int. Cl.
*G06F 3/01* (2006.01)
*G06F 3/16* (2006.01)

(52) U.S. Cl.
CPC .............. *G06F 3/011* (2013.01); *G06F 3/167* (2013.01)

(58) Field of Classification Search
CPC .. G06F 3/011; G06F 3/167; G06F 2203/0381; G06F 3/012; G06F 3/013;
(Continued)

(56) References Cited

U.S. PATENT DOCUMENTS 8,847,988 B2    9/2014  Geisner et al.
10,481,755 B1  11/2019  Ngo et al.
(Continued)

FOREIGN PATENT DOCUMENTS

EP    3187976 A2    7/2017
EP    3361352 A1    8/2018
(Continued)

OTHER PUBLICATIONS

Ni, "A Survey of Large High-Resolution Display Technologies, Techniques, and Applications", Dept. of Computer Science, University of California, Jan. 4, 2006, 12 pages.
(Continued)

*Primary Examiner* — Andrey Belousov
(74) *Attorney, Agent, or Firm* — Morgan, Lewis & Bockius LLP

(57) ABSTRACT

A computer system displays a first view of a three-dimensional environment, including a first and second user interface objects at distinct first and second positions. While displaying the first view, the computer system detects a first gaze input directed to a first region in the three-dimensional environment corresponding to the first position. While detecting the first gaze input, the computer system detects first movement of a hand meeting first gesture criteria. In accordance with a determination that the first movement is detected after the first gaze input meets first gaze criteria requiring the gaze to be held at the first region for at least a first preset extended amount of time, the computer system selects the first user interface object; and in accordance with a determination that the first movement is detected before the gaze meeting the first gaze criteria, the computer system forgoes selecting the first user interface object.

27 Claims, 30 Drawing Sheets

Related U.S. Application Data

(60) Provisional application No. 63/133,742, filed on Jan. 4, 2021.

(58) Field of Classification Search
CPC .... G06F 3/017; G06F 3/04815; G06F 3/0482; G06F 3/04842; H04R 3/00; H04R 2430/01; H04S 2400/13; H04S 7/303
See application file for complete search history.

(56) References Cited

U.S. PATENT DOCUMENTS

| | | | |
|---|---|---|---|
| 11,096,006 B1 | 8/2021 | Robinson | |
| 2005/0243054 A1* | 11/2005 | Beymer | G06F 3/013 382/103 |
| 2008/0309632 A1* | 12/2008 | Westerman | G06F 3/0485 345/173 |
| 2012/0139935 A1 | 6/2012 | Miyasaka et al. | |
| 2012/0194554 A1 | 8/2012 | Kaino et al. | |
| 2012/0229392 A1* | 9/2012 | Morita | G06F 3/04883 345/173 |
| 2012/0257035 A1 | 10/2012 | Larsen | |
| 2013/0147687 A1* | 6/2013 | Small | G06F 3/015 345/8 |
| 2014/0282105 A1 | 9/2014 | Nordstrom | |
| 2014/0282196 A1* | 9/2014 | Zhao | G06F 3/04815 715/771 |
| 2014/0292665 A1 | 10/2014 | Lathrop et al. | |
| 2014/0313119 A1 | 10/2014 | Cho et al. | |
| 2017/0109936 A1 | 4/2017 | Powderly et al. | |
| 2017/0324841 A1 | 11/2017 | Clement et al. | |
| 2017/0329404 A1 | 11/2017 | Keskin et al. | |
| 2017/0357398 A1 | 12/2017 | Alonso-Ruiz | |
| 2018/0066956 A1 | 3/2018 | Kim et al. | |
| 2018/0286070 A1 | 10/2018 | Benedetto | |
| 2018/0292906 A1 | 10/2018 | Kato et al. | |
| 2019/0065027 A1 | 2/2019 | Hauenstein et al. | |
| 2019/0182355 A1 | 6/2019 | Clement et al. | |
| 2020/0004321 A1 | 1/2020 | Kawano | |
| 2020/0051335 A1 | 2/2020 | Antypov | |
| 2020/0111260 A1 | 4/2020 | Osborn et al. | |
| 2020/0125165 A1 | 4/2020 | Pace et al. | |
| 2020/0142475 A1 | 5/2020 | Paez et al. | |
| 2020/0233485 A1 | 7/2020 | Chan et al. | |
| 2020/0387228 A1 | 12/2020 | Ravasz et al. | |
| 2021/0158715 A1 | 5/2021 | Kim | |
| 2022/0091722 A1 | 3/2022 | Faulkner et al. | |
| 2022/0101593 A1 | 3/2022 | Rockel et al. | |
| 2022/0135050 A1* | 5/2022 | Egashira | A61B 5/6893 701/1 |
| 2022/0214743 A1 | 7/2022 | Dascola et al. | |
| 2023/0143827 A1 | 5/2023 | Rockel et al. | |
| 2023/0147148 A1 | 5/2023 | Rockel et al. | |
| 2023/0389822 A1 | 12/2023 | Palamadai et al. | |
| 2024/0177403 A1 | 5/2024 | Rockel et al. | |
| 2024/0257441 A1 | 8/2024 | Sorrentino, III et al. | |
| 2024/0319841 A1 | 9/2024 | Faulkner et al. | |
| 2025/0139871 A1 | 5/2025 | Ive et al. | |

FOREIGN PATENT DOCUMENTS

| | | |
|---|---|---|
| JP | 2002073246 A | 3/2002 |
| JP | 2011-170682 A | 9/2011 |
| JP | 2013025369 A | 2/2013 |
| JP | 2015-118332 A | 6/2015 |
| JP | 2016-033800 A | 3/2016 |
| JP | 2018-524712 A | 8/2018 |
| KR | 20190027354 A | 3/2019 |
| KR | 20190087907 A | 7/2019 |
| KR | 20190092141 A | 8/2019 |
| WO | WO 2014/073345 A | 9/2016 |
| WO | WO 2019/067470 A1 | 4/2019 |
| WO | WO 2018/225149 A | 5/2020 |
| WO | WO 2020/247550 A1 | 12/2020 |

OTHER PUBLICATIONS

Pfeuffer et al., "Gaze + Pinch Interaction in Virtual Reality", Proceedings of the 5th Symposium on Spatial User Interaction, SUI '17, Oct. 16, 2017, 11 pages.
Office Action, dated May 28, 2024, received in European Patent Application No. 21795103.7, which corresponds with U.S. Appl. No. 17/483,730, 13 pages.
Office Action, dated Jun. 17, 2024, received in European Patent Application No. 21854915.2, which corresponds with U.S. Appl. No. 18/444,386, 12 pages.
Notice of Allowance, dated Sep. 3, 2024, received in U.S. Appl. No. 18/433,309, 9 pages.
Notice of Allowance, dated Sep. 3, 2024, received in U.S. Appl. No. 18/433,326, 10 pages.
Notice of Allowance, dated Mar. 13, 2024, received in U.S. Appl. No. 17/481,187, 8 pages.
Office Action, dated Feb. 28, 2024, received in Japanese Patent Application No. 2023-515647, which corresponds with U.S. Appl. No. 17/483,730, 8 pages.
Ballendat et al., "Proxemic Interaction: Designing for a Proximity and Orientation-Aware Environment", Dept. of Computer Science, University of Calgary, 2500 University Drive NW, Calgary, AB, T2N, IN4, Canada, Nov. 7, 2010, 10 pages.
Office Action, dated Jul. 21, 2022, received in U.S. Appl. No. 17/481,187, 22 pages.
Final Office Action, dated Apr. 11, 2023, received in U.S. Appl. No. 17/481,187, 22 pages.
Office Action, dated Sep. 14, 2023, received in U.S. Appl. No. 17/481,187, 22 pages.
Notice of Allowance, dated Sep. 8, 2022, received in U.S. Appl. No. 17/483,730, 10 pages.
Office Action, dated Aug. 3, 2023, received in U.S. Appl. No. 17/563,864, 16 pages.
Notice of Allowance, dated Nov. 22, 2023, received in U.S. Appl. No. 17/563,864, 9 pages.
Office Action, dated Jun. 23, 2023, received in U.S. Appl. No. 18/091,119, 8 pages.
Notice of Allowance, dated Oct. 2, 2023, received in U.S. Appl. No. 18/091,119, 9 pages.
Notice of Allowance, dated Jun. 28, 2023, received in U.S. Appl. No. 18/091,154, 10 pages.
Invitation to Pay Additional Fees, dated Jan. 10, 2022, received in International Patent Application No. PCT/US2021/051498 (7698WO), which is in correspondence with U.S. Appl. No. 17/481,187, 12 pages.
International Search Report and Written Opinion, dated Mar. 3, 2022, received in International Patent Application No. PCT/US2021/051498, which is in correspondence with U.S. Appl. No. 17/481,187, 42 pages.
Invitation to Pay Additional Fees, dated Jan. 27, 2022, received in International Patent Application No. PCT/US2021/052027, which corresponds with U.S. Appl. No. 17/483,730, 14 pages.
International Search Report and Written Opinion, dated Mar. 22, 2022, received in International Patent Application No. PCT/US2021/052027, which corresponds with U.S. Appl. No. 17/483,730, 38 pages.
International Search Report and Written Opinion, dated Apr. 26, 2022, received in International Patent Application No. PCT/US2021/065537, which corresponds with U.S. Appl. No. 17/563,864, 19 pages.
Office Action, dated Feb. 21, 2023, received in European Patent Application No. 21791188.2, which corresponds with U.S. Appl. No. 17/481,187, 14 pages.
Office Action, dated Sep. 1, 2025, received in Japanese Patent Application No. 2024-131169, which corresponds with U.S. Appl. No. 18/433,309, 4 pages.
Notice of Allowance, dated Sep. 3, 2025, received in U.S. Appl. No. 19/003,947, 9 pages.
Intent to Grant, dated Nov. 14, 2025, received in European Patent Application No. 21795103.7, which corresponds with U.S. Appl. No. 17/483,730, 8 pages.

(56) References Cited

OTHER PUBLICATIONS

Office Action, dated Dec. 28, 2024, received in Korean Patent Application No. 2023-7008484, which corresponds with U.S. Appl. No. 17/483,730, 7 pages.
Notice of Allowance, dated Sep. 23, 2025, received in Korean Patent Application No. 2023-7008484, which corresponds with U.S. Appl. No. 17/483,730, 7 pages.
Notice of Allowance, dated Sep. 26, 2025, received in Japanese Patent Application No. 2024-131169, which corresponds with U.S. Appl. No. 18/433,309, 5 pages.
Patent, dated Oct. 23, 2025, received in Japanese Patent Application No. 2024-131169, which corresponds with U.S. Appl. No. 18/433,309, 4 pages.

* cited by examiner

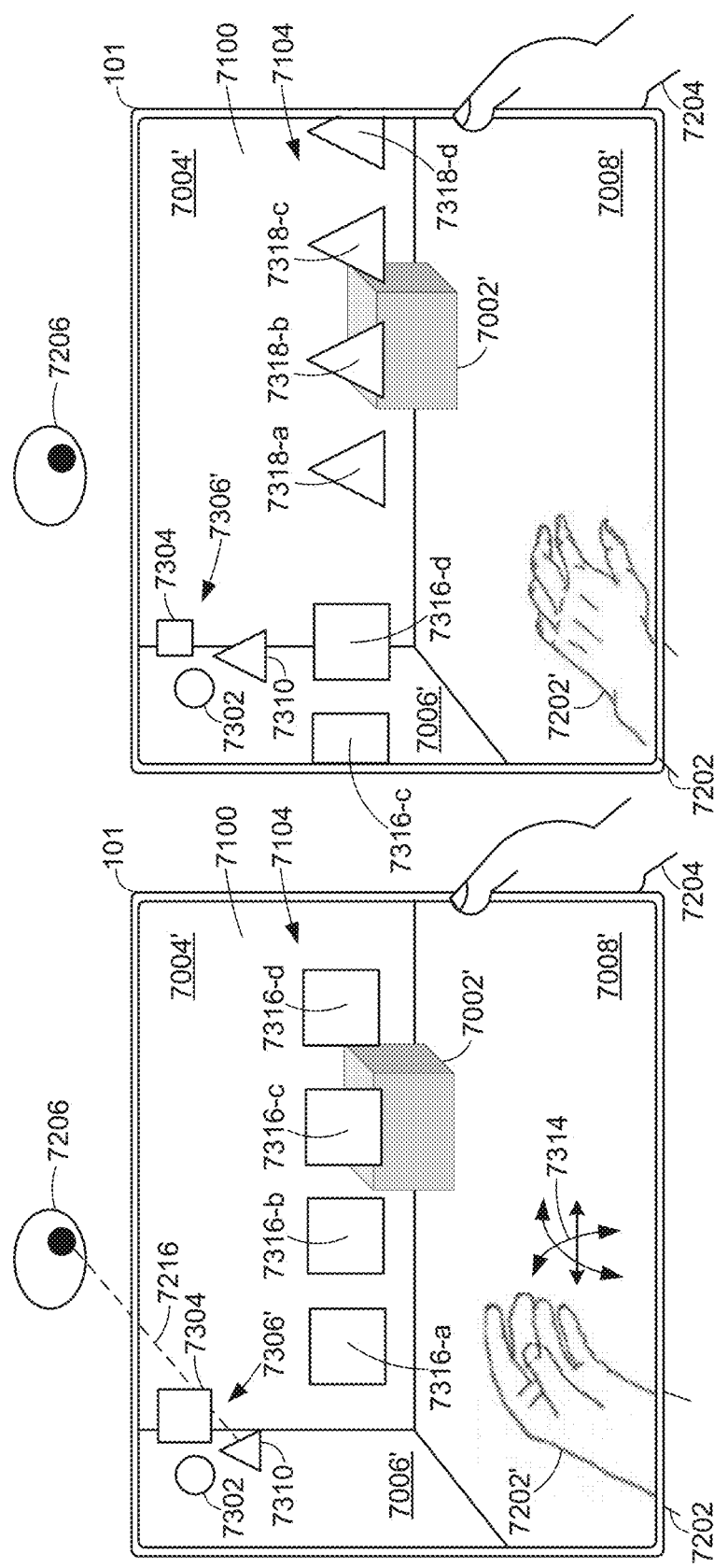
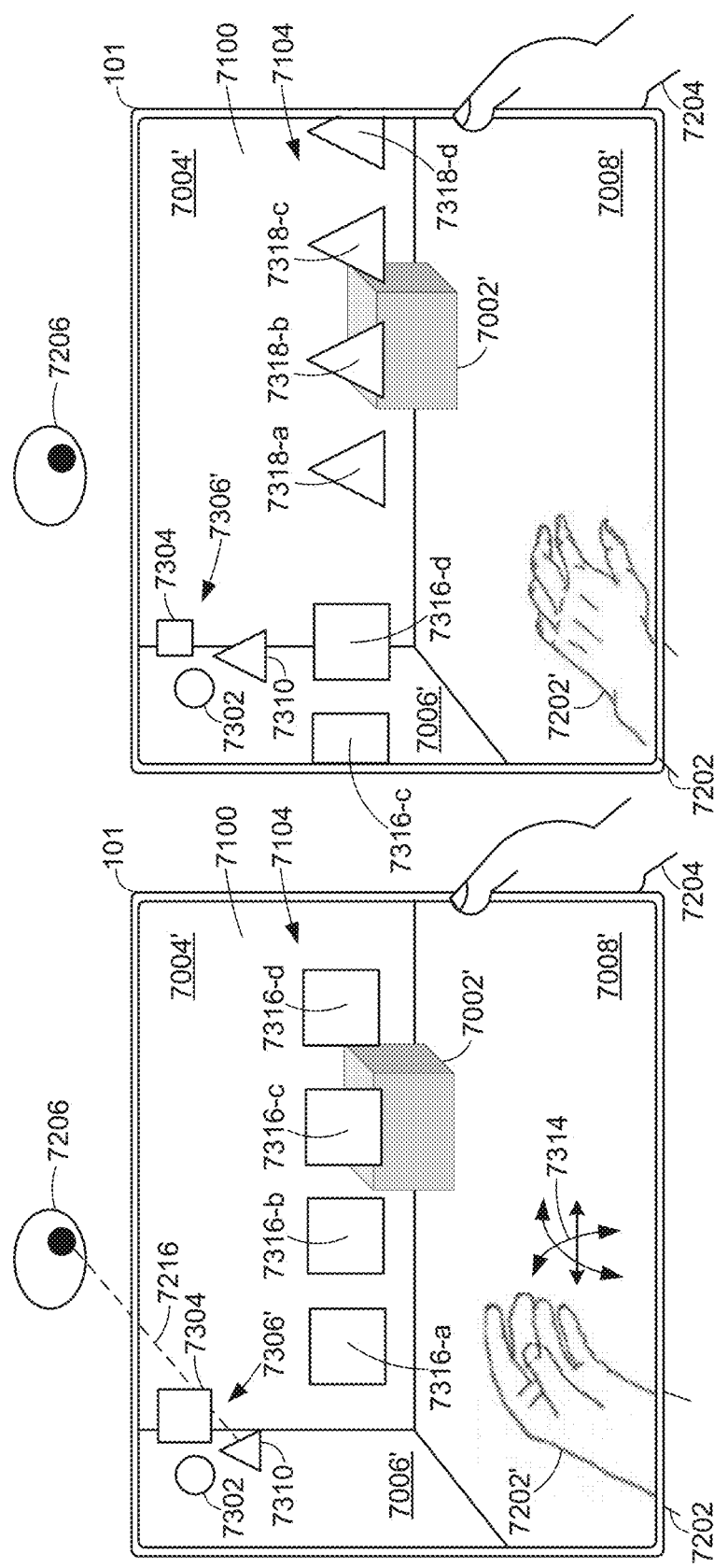
Figure 7K
Figure 7L

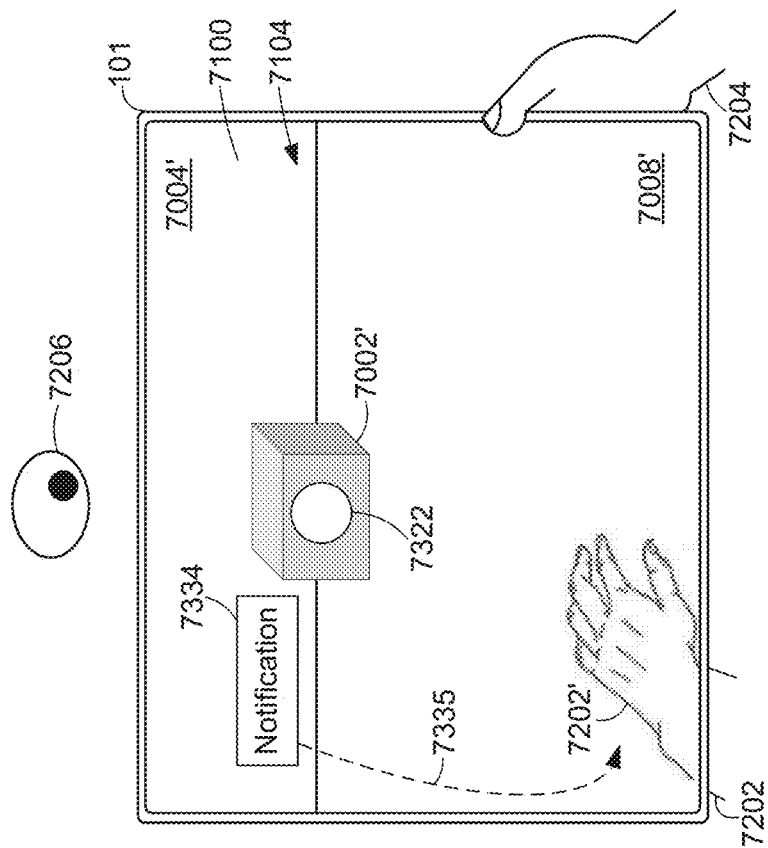
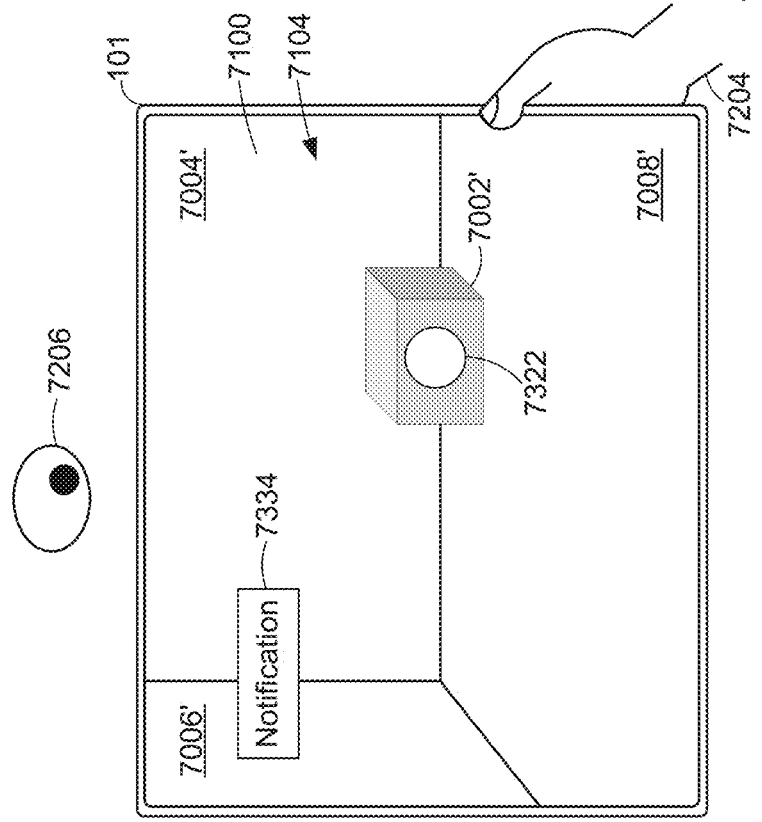

DEVICES, METHODS, AND GRAPHICAL USER INTERFACES FOR INTERACTING WITH THREE-DIMENSIONAL ENVIRONMENTS

PRIORITY CLAIM AND RELATED APPLICATION

This application is a continuation of U.S. application Ser. No. 17/563,864, filed Dec. 29, 2021, which claims priority to U.S. Provisional Application Ser. No. 63/133,742, filed Jan. 4, 2021, all of which are incorporated by reference in their entireties.

TECHNICAL FIELD

This disclosure relates generally to computer systems that provide computer-generated experiences, including but not limited to electronic devices that provide virtual reality and mixed reality experiences via a display generation component.

BACKGROUND

The development of computer systems for virtual reality, augmented reality, and extended reality has increased significantly in recent years. Example augmented reality and extended reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented/extended reality environments. Example virtual elements include virtual objects include digital images, video, text, icons, and control elements such as buttons and other graphics.

SUMMARY

But methods and interfaces for interacting with environments that include at least some virtual elements (e.g., applications, augmented reality environments, mixed reality environments, virtual reality environments, and extended reality environments, etc.) are cumbersome, inefficient, and limited. For example, systems that provide insufficient feedback for performing actions associated with virtual objects, systems that require a series of inputs to achieve a desired outcome in a virtual/augmented/extended reality environment, and systems in which manipulation of virtual objects are complex, tedious and error-prone, create a significant cognitive burden on a user, and detract from the experience with the virtual/augmented/extended reality environment. In addition, these methods take longer than necessary, thereby wasting energy. This latter consideration is particularly important in battery-operated devices.

Accordingly, there is a need for computer systems with improved methods and interfaces for providing computer generated experiences to users that make interaction with the computer systems more efficient and intuitive for a user. The above deficiencies and other problems associated with user interfaces for computer systems with a display generation component and one or more input devices are reduced or eliminated by the disclosed systems, methods, and user interfaces. Such systems, methods and interfaces optionally complement or replace conventional systems, methods, and user interfaces for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

In accordance with some embodiments, a method is performed at a computer system that is in communication with a first display generation component and one or more input devices. The method includes displaying, via the first display generation component, a first view of a three-dimensional environment. The method further includes, while displaying the first view of the three-dimensional environment, detecting a gaze input directed to a respective first position in the three-dimensional environment that corresponds to a location of a user's hand in a physical environment. The method further includes, while displaying the first view of the three-dimensional environment, detecting movement of the user's hand in the physical environment, including detecting at least an initial portion of the movement of the user's hand while detecting the gaze input at the respective first position in the three-dimensional environment that corresponds to the location of the user's hand. The method further includes, in response to detecting the movement of the user's hand in the physical environment: in accordance with a determination that the movement of the user's hand in the physical environment meets first criteria, wherein the first criteria are met when the movement of the user's hand corresponds to a first hand gesture, displaying a plurality of user interface objects at respective second positions in the three-dimensional environment that are away from the respective first position in the three-dimensional environment that corresponds to the location of the user's hand in the physical environment, wherein a respective user interface object of the plurality of user interface objects, when activated, initiates a process for causing display of a corresponding computer-generated experience in the three-dimensional environment.

In some embodiments, a method is performed at a computer system that is in communication with a first display generation component and one or more input devices. The method includes displaying, via the first display generation component, a first view of a three-dimensional environment, including displaying at least a first user interface object at a first position in the three-dimensional environment and a second user interface object at a second position different from the first position in the three-dimensional environment. The method further includes, while displaying the first view of the three-dimensional environment via the first display generation component, detecting a first gaze input directed to a first region in the three-dimensional environment that corresponds to the first position in the three-dimensional environment. The method further includes, while detecting the first gaze input directed to the first region in the three-dimensional environment, detecting a first movement of a hand that meets first gesture criteria. The method further includes, in response to detecting the first movement of the hand that meets the first gesture criteria while detecting the first gaze input directed to the first region in the three-dimensional environment: in accordance with a determination that the first movement of the hand that meets the first gesture criteria is detected after first gaze criteria have been met, wherein first gaze criteria require that the first gaze input is held at the first region for at least a first preset amount of time in order for the first gaze criteria to be met, selecting the first user interface object between the first user interface object and the second user interface object; and in accordance with a determination that the first movement of the hand that meets the first gesture criteria is detected before the first gaze criteria have been met, forgoing selection of the first user interface object.

In some embodiments, a method is performed at a computer system that is in communication with a first display generation component and one or more input devices. The method includes displaying, via the first display generation component, a first view of a three-dimensional environment, including displaying, at a first position in the three-dimensional environment, a first group of selectable user interface objects from multiple different groups of selectable user interface objects. The method further includes, while displaying the first group of selectable user interface objects at the first position in the three-dimensional environment, detecting a user input that corresponds to a request to display a second group of selectable user interface objects from the multiple different groups of selectable user interface objects at the first position in the three-dimensional environment, the second group of selectable user interface objects being different from the first group of selectable user interface objects. The method further includes, in response to detecting the user input that corresponds to a request to display the second group of selectable user interface objects at the first position in the three-dimensional environment: moving the first group of selectable user interface objects in the three-dimensional environment away from the first position in the three-dimensional environment and reducing visual prominence of the first group of selectable user interface objects in the three-dimensional environment as the first group of selectable user interface objects are moved away from the first position in the three-dimensional environment; and moving the second group of selectable user interface objects in the three-dimensional environment toward the first position in the three-dimensional environment and increasing visual prominence of the second group of selectable user interface objects as the second group of selectable user interface object are moved to the first position in the three-dimensional environment.

In some embodiments, a method is performed at a computer system that is in communication with a first display generation component and one or more input devices. The method includes displaying, via the first display generation component, a first view of a three-dimensional environment, including concurrently displaying, at a first position in the three-dimensional environment, a plurality of user interface objects corresponding to different operations, and at a second position in the three-dimensional environment, background content, wherein the plurality of user interface object includes a first user interface object and a second user interface object, and wherein the background content has a first value for a respective visual property relative to corresponding values for the respective visual property of the plurality of user interface objects in the first view of the three-dimensional environment. The method further includes, while concurrently displaying the plurality of user interface objects with the background content that has the first value for the respective visual property relative to corresponding values for the respective visual property of the plurality of user interface objects in the first view of the three-dimensional environment, detecting a user input that activates the first user interface object in accordance with first activation criteria. The method further includes, in response to detecting the user input that activates the first user interface object in accordance with the first activation criteria, initiating a communication session with a first user corresponding to the first user interface object, and adjusting the value of the respective visual property of at least a first portion of the background content from the first value to a second value that is different from the first value.

In some embodiments, a method is performed at a computer system that is in communication with a first display generation component and one or more input devices. The method includes displaying, via the first display generation component, a first view of a three-dimensional environment. The method further includes, while displaying the first view of the three-dimensional environment, detecting a first event that corresponds to receipt of a first notification. The method further includes, in response to detecting the first event, displaying a first representation of the first notification in the three-dimensional environment at a position that is selected based on a position of a first portion of a first user in the physical environment. The method further includes, after displaying the first representation of the first notification at the position in the three-dimensional environment that is selected based on a position of the first portion of the first user in the physical environment, displaying a second representation of the first notification at a second position in the three-dimensional environment that is selected based on a position of a second portion of the first user in the physical environment, wherein the second portion of the first user is different from the first portion of the first user and can be moved relative to the first portion of the first user. The method further includes, while displaying the second representation of the first notification at the position in the three-dimensional environment that is selected based on the position of the second portion of the first user in the physical environment, detecting movement of the second portion of the first user in the physical environment relative to the first portion of the first user. The method further includes, in response to detecting movement of the second portion of the first user in the physical environment relative to the first portion of the first user, moving the second representation of the first notification in the three-dimensional environment based on the movement of the second portion of the first user in the physical environment.

In some embodiments, a method is performed at a computer system that is in communication with a first display generation component and one or more input devices. The method includes displaying, via the first display generation component, a first view of a three-dimensional environment. The method further includes, while displaying the first view of the three-dimensional environment, detecting a first event that corresponds to an incoming request for establishing a communication session between a first user corresponding to the computer system and a second user different from the first user. The method further includes, in response to detecting the first event, displaying a first notification at a first position in the three-dimensional environment, wherein the first position is selected based on a respective position in the three-dimensional environment that corresponds to a location of at least a first portion of the first user in the physical environment. The method further includes, while displaying the first notification at the first position in the three-dimensional environment that is selected based on the respective position in the three-dimensional environment that corresponds to the location of at least the first portion of the first user in the physical environment, detecting a sequence of one or more user inputs that correspond to acceptance of the incoming request for establishing the communication session. The method further includes, in response to detecting the sequence of one or more user inputs that correspond to the acceptance of the incoming request for establishing the communication session, displaying a plurality of user interface objects associated with the communication session at respective second positions in the three-dimensional environment that are at least a threshold distance away from a characteristic position of the first user in the three-dimensional environment.

In some embodiments, a method is performed at a first computer system that is in communication with a first display generation component and one or more first input devices. The method includes displaying, via the first display generation component, a first user interface of a first communication session between a first user corresponding to the first computer system and a second user corresponding to a second computer system different from the first computer system, wherein the second user is participating in the first communication session within a first three-dimensional environment, and wherein displaying the first user interface of the first communication session includes displaying a respective representation of the second user that indicates a spatial positioning of the second user relative to a respective representation of at least one other user in the first communication session in the first three-dimensional environment. The method further includes, while displaying the first user interface of the first communication session including the respective representation of the second user that indicates the spatial positioning of the second user relative to the respective representation of the at least one other user in the first communication session in the first three-dimensional environment, detecting a first user input that corresponds to a request to display the respective representation of the second user without indicating the spatial positioning of the second user relative to the respective representation of the at least one other user in the first communication session in the first three-dimensional environment. The method further includes, in response to detecting the first user input, displaying the respective representation of the second user without indicating the spatial positioning of the second user relative to the respective representation of the at least one other user in the first communication session in the first three-dimensional environment.

In some embodiments, a method is performed at a first computer system that is in communication with a first display generation component and one or more first input devices. The method includes displaying, via the first display generation component, a first user interface of a first communication session between a first user and a second user, wherein the first user interface includes a representation of the second user. The method further includes, while displaying the first user interface of the first communication session between the first user and the second user, detecting a first movement of the first display generation component in a first physical environment. The method further includes, in response to detecting the first movement of the first display generation component in the first physical environment: in accordance with a determination that the first display generation component is in a first orientation during the first movement of the first display generation component, updating an appearance of the representation of the second user based on the first movement of the first display generation component in the first physical environment and a simulated viewpoint of the first user into a respective three dimensional environment in which the representation of the second user is displayed; and in accordance with a determination that the first display generation component is in a second orientation, different from the first orientation, during the first movement of the first display generation component, maintaining display of the representation of the second user at a respective location in the first user interface of the communication session as the first display generation component moves in the first physical environment.

In some embodiments, a method is performed at a first computer system that is in communication with a first display generation component, a first audio output component, and one or more input devices. The method includes presenting first computer-generated content; and while presenting the first computer-generated content, detecting first movement of a first user that is in a position to perceive the first computer-generated content, wherein the first movement of the first user is in a physical environment of the first user. The method further includes, in response to detecting the first movement of the first user in the physical environment of the first user: in accordance with a determination that the first movement of the first user in the physical environment of the first user changes a spatial relationship between the first user and a second user in the physical environment of the first user from a first spatial relationship to a second spatial relationship and a determination that the change in spatial relationship from the first spatial relationship to the second spatial relationship meets first criteria, changing one or more output properties of the first computer-generated content while presenting the first computer-generated content; and in accordance with the determination that the first movement of the first user in the physical environment of the first user changes the spatial relationship between the first user and the second user in the physical environment of the first user from the first spatial relationship to the second spatial relationship and a determination that the change in spatial relationship from the first spatial relationship to the second spatial relationship does not meet the first criteria, presenting the first computer-generated content without changing the one or more output properties of the first computer-generated content.

In accordance with some embodiments, a computer system includes or is in communication with a display generation component (e.g., a display, a projector, a head-mounted display, etc.), one or more input devices (e.g., one or more cameras, a touch-sensitive surface, optionally one or more sensors to detect intensities of contacts with the touch-sensitive surface), optionally one or more audio output components, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more audio output components, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators, includes means for performing or causing performance of the operations of any of the methods described herein.

Thus, computer systems with display generation components are provided with improved methods and interfaces for interacting with a three-dimensional environment and facilitating the user's user of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's use of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7I-7M are block diagrams illustrating switching between different groups of selectable user interface objects in response to a user input, where visual prominence of a respective group is increased or decreased depending on whether it is moving toward or away from a first position in a three-dimensional environment, in accordance with some embodiments.

FIGS. 7P-7U are block diagrams that illustrate display of and interactions with notifications in a three-dimensional environment, in accordance with some embodiments. FIGS. 7P-7S illustrate display of a representation of a notification before detecting direct user interaction with the notification, in accordance with some embodiments. FIGS. 7P-7U are block diagrams illustrating interaction with a notification corresponding to an incoming communication request and displaying the communication session in the three-dimensional environment, in accordance with some embodiments.

DESCRIPTION OF EMBODIMENTS

Figure 1:
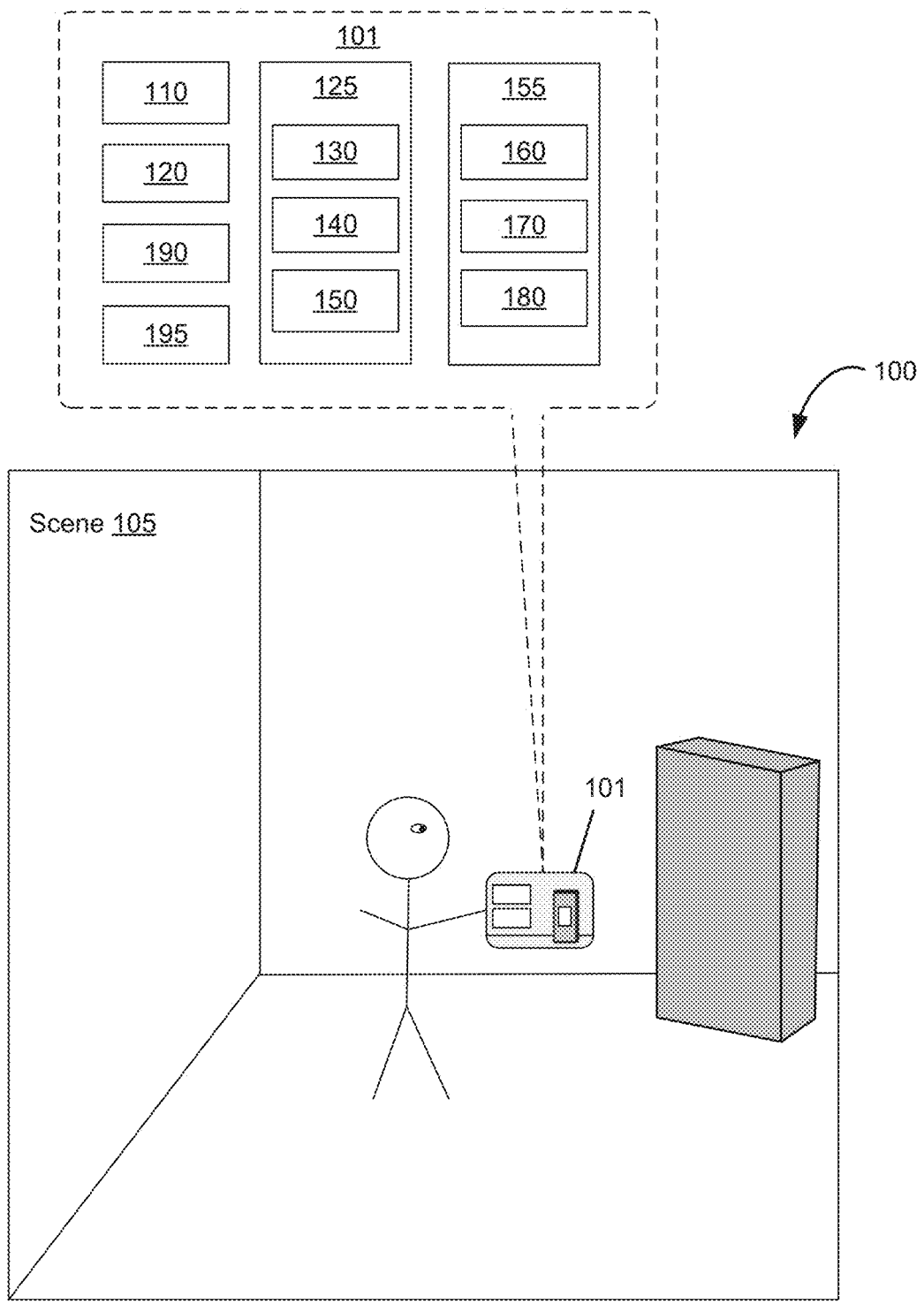
FIG. 1 is a block diagram illustrating an operating environment of a computer system for providing XR experiences in accordance with some embodiments.

The present disclosure relates to user interfaces for providing a computer generated extended reality (XR) experience to a user, in accordance with some embodiments.

The systems, methods, and GUIs described herein improve user interface interactions with virtual/augmented reality environments in multiple ways.

In some embodiments, a computer system, in response to detecting a gaze input directed to a region of a three-dimensional environment that corresponds to the location of a user's hand in conjunction with detecting a preset movement of the hand, displays user interface objects corresponding to various computer-generated experiences (e.g., applications, communication sessions, computer-generated extended reality experiences, etc.) at positions in the three-dimensional environment that are away from the region that corresponds to the location of the user's hand, in accordance with some embodiments. In some embodiments, the preset hand gesture in conjunction with the gaze input directed to the representation of the hand in the three-dimensional environment cause the computer system to launch a home user interface that includes icons corresponding to different applications, different users, and/or different computer-generated experiences to respective positions that are anchored to the three-dimensional environment, away from the region in the three-dimensional environment that corresponds to (and moves in accordance with) the position of the user's hand in the physical environment. In some embodiments, the preset hand gesture includes a flick of the wrist of the hand that corresponds to a throw or toss gesture of the hand. In some embodiments, a home button, a cluster of group icons corresponding to different groups of user interface objects, etc. are, optionally, displayed at a position in the three-dimensional environment that corresponds to (and moves in accordance with) a location at or near the user's hand in the physical environment, e.g., before the preset hand gesture is detected. In some embodiments, the home button, the cluster of group icons corresponding to different groups of user interface objects, etc., optionally, remain displayed at a position in the three-dimensional environment that corresponds to (and moves in accordance with) a location at or near the user's hand in the physical environment while the user interface objects are displayed at the respective positions that are anchored to the three-dimensional environment, away from the region in the three-dimensional environment that corresponds to the position of the user's hand in the physical environment.

In some embodiments, a computer system requires detection of a preset hand gesture in conjunction with detection of a gaze input that is maintained on a respective user interface object for a preset extended amount of time (e.g., a preset dwell time) to trigger selection of the respective user interface object, in accordance with some embodiments. Absence of the preset hand gesture, or absence of a gaze input that is maintained for less than the preset extended amount of time in a region of the respective user interface object does not cause selection of the respective user interface object. Mere detection of the gaze input at the respective user interface object in conjunction with the preset hand gesture is not sufficient to cause the computer system to select the respective user interface object. In some embodiments, the preset hand gesture is a pinch gesture that includes movement of two or more fingers of a hand to make contact with one another, or to break contact from each other. In some embodiments, the preset hand gesture in conjunction with the gaze followed by dwell of the gaze on a respective user interface object can be used to activate the respective user interface object to start an application, initiate a communication session, or launch a computer-generated experience, etc. corresponding to the respective user interface object.

In some embodiments, a computer system, in response to a user input that corresponds to a request to switch from displaying a first group of selectable user interface objects at a first position in a three-dimensional environment to displaying a second group of selectable user interface objects at the first position in the three-dimensional environment, moves the first group of selectable user interface objects away from the first position while reducing visual prominence of the first group of selectable user interface objects, and moves the second group of selectable user interface objects toward the first position while increasing visual prominence of the second group of selectable user interface objects. In some embodiments, the first group of selectable user interface objects and the second group of selectable user interface objects are concurrently visible in the currently displayed view of the three-dimensional environment during the movement of the two groups of selectable user interface objects in the three-dimensional environment. In some embodiments, the different groups of selectable user interface objects include different categories of icons respectively correspond to applications, users, and computer-generated experiences. In some embodiments, the different groups of selectable user interface objects are part of a home user interface, and the computer system switches between displaying different groups of selectable user interface objects in response to selection of their respective group icons displayed in a position in the three-dimensional environment away from the position corresponding to the location of the user's hand, or in response to selection of their respective group icons displayed at a position in the three-dimensional environment that corresponds to the location of the user's hand.

In some embodiments, a computer system changing display properties of background regions in a three-dimensional environment in conjunction with initiating a communication session, in accordance with some embodiments. In some embodiments, before detecting a sequence of one or more user inputs that initiates the communication session, a user interface object corresponding to the communication session (e.g., a representation of a communication contact of the user, a button for accepting a communication request, a button for sending a communication request, etc.) is displayed with the background regions having first values for the display properties; and after the communication session is initiated in response to the sequence of one or more user inputs, a user interface of the communication session (e.g., a user interface displayed before a communication request is answered, or a user interface displayed after the communication request is answered and the communication session is established, etc.) is displayed with the background regions having second values for the display properties. In some embodiments, the second values of the display properties correspond to a lower level of visual prominence of the background regions relative to the user interface of the communication session than the level of visual prominence the background regions had relative to the user interface object corresponding to the communication session. For example, the background regions have a normal, unadjusted level of visibility (e.g., having a first brightness level, a first color saturation level, a first level of opacity, a first level of clarity, a first blur radius, etc.) relative to the user interface objects corresponding to the communication session before the communication session is initiated; and the background regions have reduced level of visibility relative to the user interface of the communication session (e.g., having a second brightness level that is lower than the first brightness level, having a second color saturation level that is lower than the first color saturation level, having a second level of opacity that is higher than the first level of opacity, having a second level of clarity that is lower than the first level of clarity, having a second blur radius that is greater than the first blur radius, etc.) once the communication session is initiated. In some embodiments, the background regions include a pass-through view of a physical environment surrounding physical environment (e.g., in a camera view of the physical environment, or through a transparent region of the display generation component, etc.), and reducing the visual prominence of the background region includes making the pass-through view of the physical environment less visible, less bright, and/or less clear (e.g., by applying one or more filters (e.g., a blur filter, a color saturation filter, a brightness filter, etc.) on the camera view of the physical environment, or by adjusting the pass-through properties of the transparent portion of the display generation component (e.g., by making the transparent portion more opaque, making the transparent portion darker and reduce transmissivity of the transparent portion, etc.). In some embodiments, reducing the visual prominence of the background regions when initiating the communication session helps to provide visual feedback to the user regarding the transition into a new experience and a co-presence environment of the communication session. In some embodiments, the background regions also include virtual objects, virtual surfaces, and virtual content, the computer system optionally reduces the visual prominence of at least some of these virtual objects, virtual surfaces, and virtual content in the background regions as well, when initiating the communication session in response to the user's input. In some embodiments, the reduction of visual prominence applied to the background regions of the three-dimensional environment does not occur when a user interface objects corresponding to an operation other than starting a communication session is activated (e.g., when an application icon is activated to start a corresponding application, or when an icon of an experience is activated to start a corresponding experience, etc.), even though the operation also includes displaying a new user interface or new user interface objects in the three-dimensional environment.

In some embodiments, a computer system initially displays a first representation of a notification at a first position in a three-dimensional environment that corresponds to (and moves in accordance with) a position of a first portion of a user (e.g., the user's face, head, torso, eyes, etc.) in the physical environment, and then displays a second representation of the notification at a second position in the three-dimensional environment that corresponds to (and moves in accordance with) a position of a second portion of the user (e.g., the user's hand, wrist, etc.) in the physical environment before detecting direct user interaction with the notification that disposes of the notification, in accordance with some embodiments. In some embodiments, the first representation of the notification includes notification content, and the second representation of the notification does not include notification content or includes less notification content than the first representation of the notification. In some embodiments, the first representation of the notification is displayed in a peripheral portion of the field of view provided by the display generation component. In some embodiments, the computer system displays a third representation of the notification (e.g., a full version of the notification with notification content and optionally user interface objects) at a third position in the three-dimensional environment that corresponds to the location of the user's hand (e.g., back of hand, palm, etc.) in response to a first hand gesture (e.g., turning the hand or raising the hand toward the user's face while a gaze input is directed to the representation of the user's hand). In some embodiments, the computer system dismisses the notification in response to a second hand gesture (e.g., opening the hand to shown the third representation of the notification and closing the hand again). In some embodiments, the computer system displays a user interface corresponding to the notification or a fourth representation of the notification (e.g., an extended version of the notification, with input regions and/or extended notification content, etc.) at a fourth position in the three-dimensional environment that is away from the location of the user and that is anchored to the three-dimensional environment. In some embodiments, the computer system uses spatial audio alert that appears to originate from the position at or near which a respective representation of the notification will be displayed to guide the user to look at that first position in the three-dimensional environment to see the representation of the notification at or near that position. As used herein, the term "spatial audio" is used to describe audio output that appears to originate from a virtual source that is attached to a point or object in space (e.g., physical space, augmented reality environment, virtual reality environment, etc.) so that as the user's position relative to the point or object changes, the audio changes to reflect the change in the user's position relative to the point or object.

In some embodiments, a computer system, in response to detecting user input directed to a representation of an incoming communication request (e.g., a notification, an alert, etc.) that is displayed at a position in the three-dimensional environment that corresponds to (and moves in accordance with) a first portion of a user (e.g., head, face, torso, hand, wrist, etc.), displays a user interface of the communication session at a position in the three-dimensional environment that is anchored to the three-dimensional environment and that is away from the virtual position of the user, in accordance with some embodiments. For example, in some embodiments, an alert of an incoming communication request is displayed near the user (e.g., anchored to a position corresponding to a preset portion of the user), and in response to user interaction with the alert to accept the incoming communication request, a user interface of the communication session is moved into the three-dimensional environment and anchored to a position in the three-dimensional environment (e.g., a position that is away from to the preset portion of the user, and that does not move with the preset portion of the user).

In some embodiments, a first computer system that is used by a first user to participate in a communication session with a second user provides two display modes (e.g., a spatial mode and a non-spatial mode) of a user interface of the communication session via a first display generation component, when the first user participates in the communication session in a non-immersive mode and the second user participates in the communication session in an immersive mode in a first three-dimensional environment. The first computer system used by the first user, when displaying the spatial mode of the communication user interface, shows a representation of the second user with an indication of a spatial relationship between the representation of the second user and at least one other participant of the communication session (e.g., the first user, or a third user, etc.) in the first three-dimensional environment. As the first user, the second user, and/or another participant of the communication session move in their respective physical environments, the representations of the first user, the second user, and/or the other participant move in the first three-dimensional environment which causes the first computer system to update the user interface displayed in the spatial mode to reflect the changed spatial relationship between the representation of the second user and at least one other participant of the communication session in the first three-dimensional environment. The first computer system used by the first user, when displaying the non-spatial mode of the communication user interface, shows a representation of the second user without an indication of a spatial relationship between the representation of the second user and at least one other participant of the communication session (e.g., the first user, or a third user, etc.) in the first three-dimensional environment. As the first user, the second user, and/or another participant of the communication session move in their respective physical environments, the representations of the first user, the second user, and/or the other participant move in the first three-dimensional environment, but the first computer system does not update the user interface displayed in the non-spatial mode to reflect the changed spatial relationship between the representation of the second user and at least one other participant of the communication session in the first three-dimensional environment. In some embodiments, when the first computer system displays the communication user interface in the spatial mode, the first computer system displays a representation of the physical environment surrounding the first user in a view of the first three-dimensional environment; and the first computer system, in response to inputs received from the first user (e.g., input that moves the first display generation component relative to the physical environment, and/or input on a touch-screen of the first display generation component, etc.), moves the representation of the second user (and optionally, a representation of a third user who is also participating in the communication session in an immersive mode) relative to the representation of the physical environment in the view of the first three-dimensional environment. In some embodiments, when the first computer system displays the communication user interface in the non-spatial mode, the first computer system displays a virtual environment; and the first computer system, displays the representation of the second user and representations of other participants of the communication session in accordance with a preset layout, and does not change the positions of the representations of the second user and other participants in response to changes in the spatial relationships between the participants in the first three-dimensional environment, or inputs received from the first user (e.g., input that moves the first display generation component relative to the physical environment, and/or input on a touch-screen of the first display generation component, etc.).

In some embodiments, a first computer system that is used by a first user to participate in a communication session with a second user provides two display modes (e.g., a spatial mode and a non-spatial mode) of a user interface of the communication session via a first display generation component, when the first user participates in the communication session in a non-immersive mode and the second user participates in the communication session in an immersive mode in a first three-dimensional environment. The first computer system, when displaying the spatial mode of the communication user interface, updates the representation of the second user (and, optionally, updates the representation of a third user who also participates in the communication session in the immersive mode) based on a movement of the first display generation component in a first physical environment and a simulated viewpoint of the first user into a respective three dimensional environment in which the representation of the second user is displayed. In some embodiments, the first computer system displays the user interface of the communication session in the spatial mode in accordance with a determination that the first display generation component has a first preset orientation relative to the physical environment or the face of the first user. The first computer system, when displaying the non-spatial mode of the communication user interface, maintains the position and appearance of the representation of the second user (and, optionally, does not update the representation of a second user and the representation of the third user who also participates in the communication session in the immersive mode) in the user interface of the communication session, irrespective of movement of the first display generation component in the first physical environment. In some embodiments, the first computer system displays the user interface of the communication session in the non-spatial mode in accordance with a determination that the first display generation component has a second preset orientation relative to the physical environment or the face of the first user. In some embodiments, the first computer system switches between displaying the user interface of the communication session in the spatial mode and the non-spatial mode in response to movement of the first display generation component that causes the first display generation component to transition between the first preset orientation and the second preset orientation. In some embodiments, the user interface of the communication session provides user interface control(s) for switching between the spatial mode and the non-spatial mode of the user interface. In some embodiments, when the first computer system displays the spatial mode of the communication user interface, the second computer system used by the second user displays a representation of the first user at a first position in a currently displayed view of the first three-dimensional environment shown by a second display generation component, and the first position is controlled by the first user (e.g., through movement of the first display generation component, or through user inputs that changes the viewpoint of the currently displayed view of the first three-dimensional environment shown in the spatial mode by the first display generation component) and not by the second user. In some embodiments, when the first computer system displays the non-spatial mode of the communication user interface, the second computer system used by the second user displays a representation of the first user at a second position in a currently displayed view of the first three-dimensional environment shown by the second display generation component, and the second position is controlled by the second user (e.g., through user inputs that drags the representation of the first user in the currently displayed view of the first three-dimensional environment shown by the second display generation component) and not controlled by the first user.

In some embodiments, a computer system changes output properties (e.g., audio output properties, visual output properties, etc.) of computer-generated content in response to detecting a first user's movement in a physical environment (e.g., leaning, turning, etc.) that indicates first user's shifting attention toward a second user (e.g., in the same physical environment, in a shared virtual environment, etc.), in accordance with some embodiments. In some embodiments, changing the output properties of the computer-generated content while continuing to present the computer-generated content includes reducing the visual prominence of the computer-generated visual content, or reducing the audio prominence of the computer-generated audio content, to allow the second user to be seen more clearly by the first user, or to allow the second user to be heard more clearly by the first user. In some embodiments, the computer system enhances pass-through of the view and/or sound of the physical environment in response to detecting a first user's movement in the physical environment (e.g., leaning, turning, etc.) that indicates first user's shifting attention toward the second user (e.g., in the same physical environment, in a shared virtual environment, etc.). In some embodiments, computer-generated content corresponds to a co-presence experience in a communication session with one or more third users different from the first user and the second user.

FIGS. 1-6 provide a description of example computer systems for providing XR experiences to users. The user interfaces in FIGS. 7A-7X are used to illustrate the processes in FIGS. 8-16, respectively.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended-reality: In contrast, an extended-reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves, to maintain a fixed spatial relationship between the virtual object and the portion of the environment.

In some embodiments a virtual object that is environment-locked or viewpoint-locked exhibits a lazy follow behavior which reduces or delays motion of the environment-locked or viewpoint-locked virtual object relative to movement of a point of reference which the virtual object is following. In some embodiments, when exhibiting the lazy follow behavior, the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits the lazy follow behavior, the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
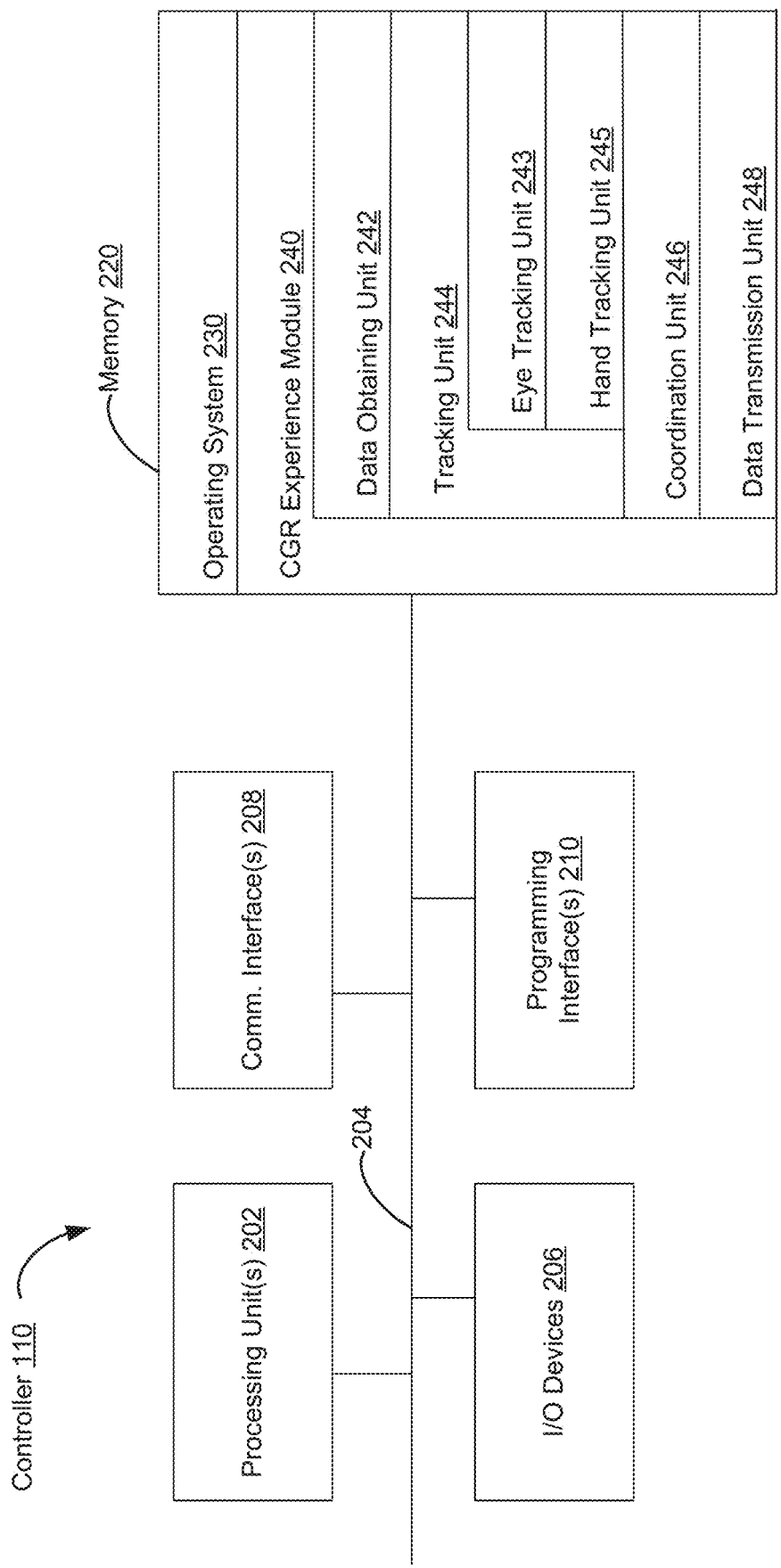
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
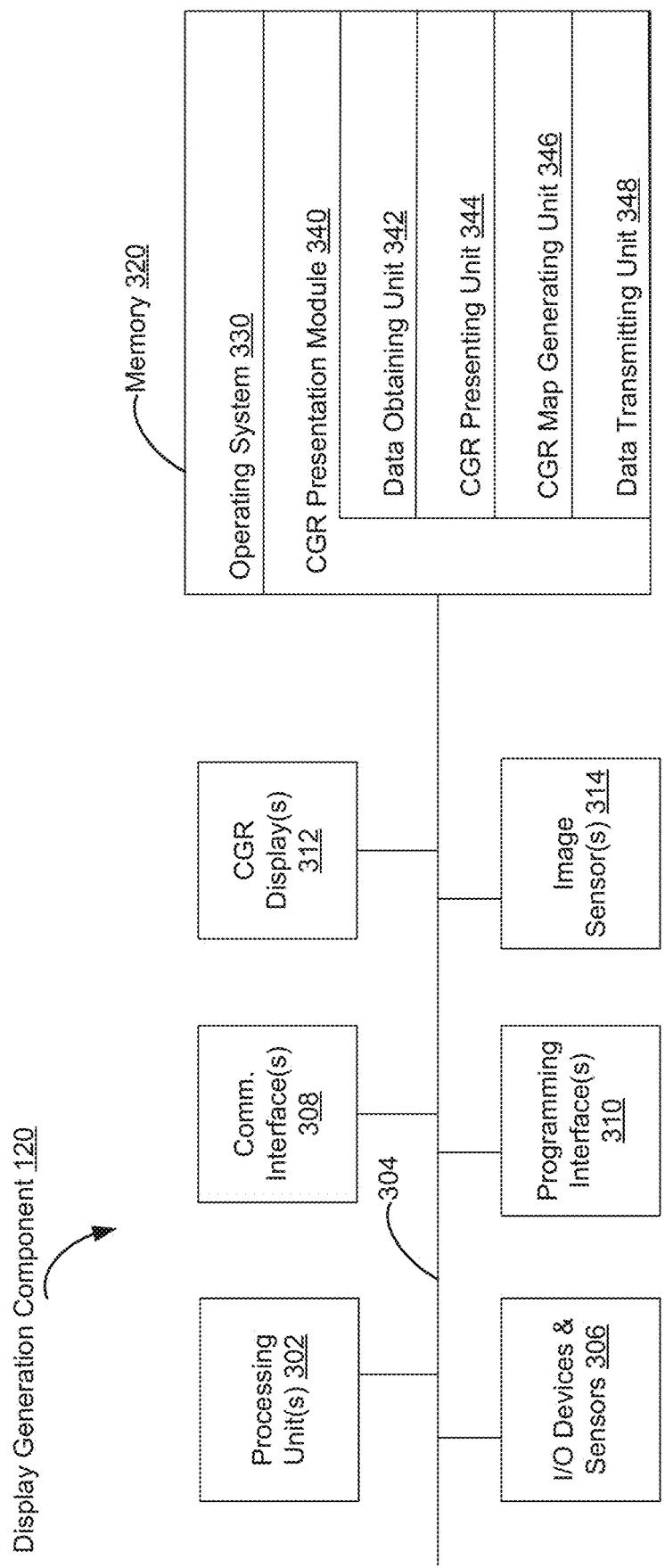
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the HMD 120 includes a single XR display. In another example, the HMD 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
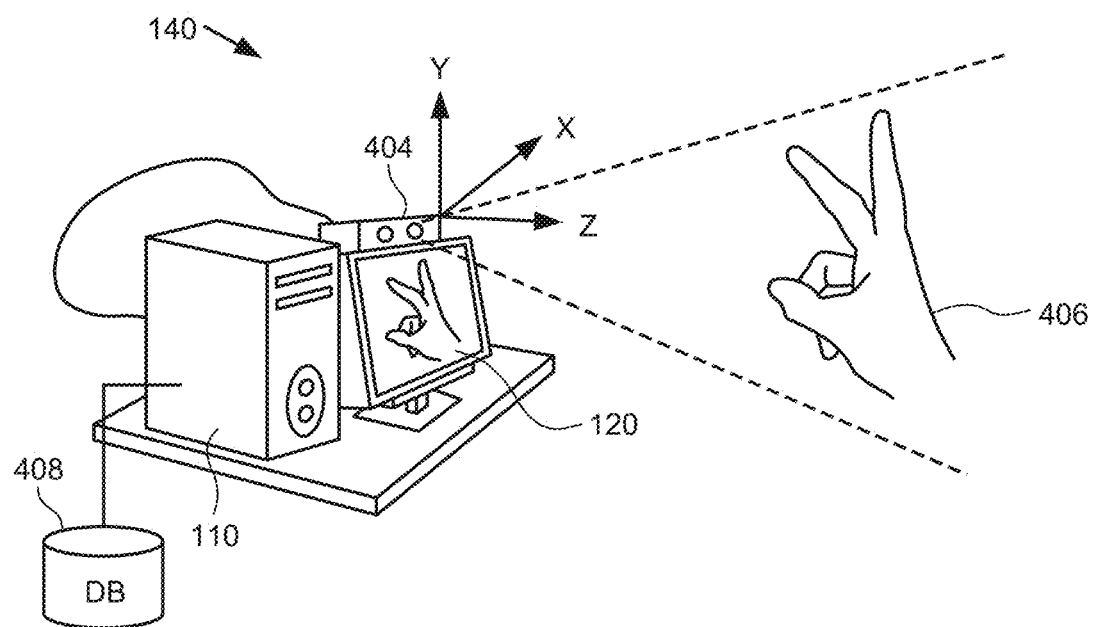
FIG. 4 is a block diagram illustrating a hand tracking unit of a computer system that is configured to capture gesture inputs of the user in accordance with some embodiments.
Figure 4:
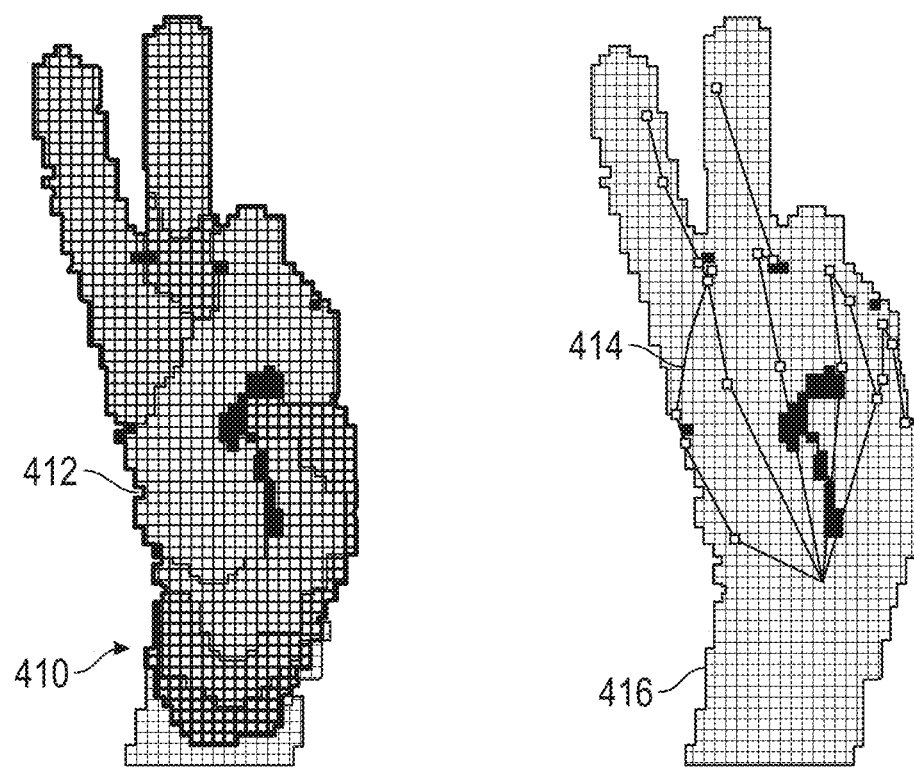

FIG. 4 is a schematic, pictorial illustration of an example embodiment of the hand tracking device 140. In some embodiments, hand tracking device 140 (FIG. 1) is controlled by hand tracking unit 245 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 140 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed and/or amount of rotation of a portion of the user's body, etc.).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in embodiments involving air gestures, the input gesture is, for example, detected attention (e.g., gaze) toward the user interface element in combination (e.g., concurrent with, within a threshold time window of, etc.) movement of a user's finger(s) and/or hands to perform a pinch and/or tap input, as described in more detail below.

In some embodiments, input gestures that are directed to a user interface object are performed directly or indirectly with reference to the user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the user interface object, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by, preceding, or within a time window of, etc.) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface object) performed as an air gesture includes movement of a user's finger(s) toward the user interface object, movement of the user's hand toward the user interface object optionally with the user's finger(s) extended toward the user interface object, a downward motion of a user's finger (e.g., mimicking a mouse click motion or a tap on a touchscreen), or other predefined movement of the user's hand. In some embodiments, a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments, the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or another air gesture described herein, etc.). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the hand tracking device 140 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
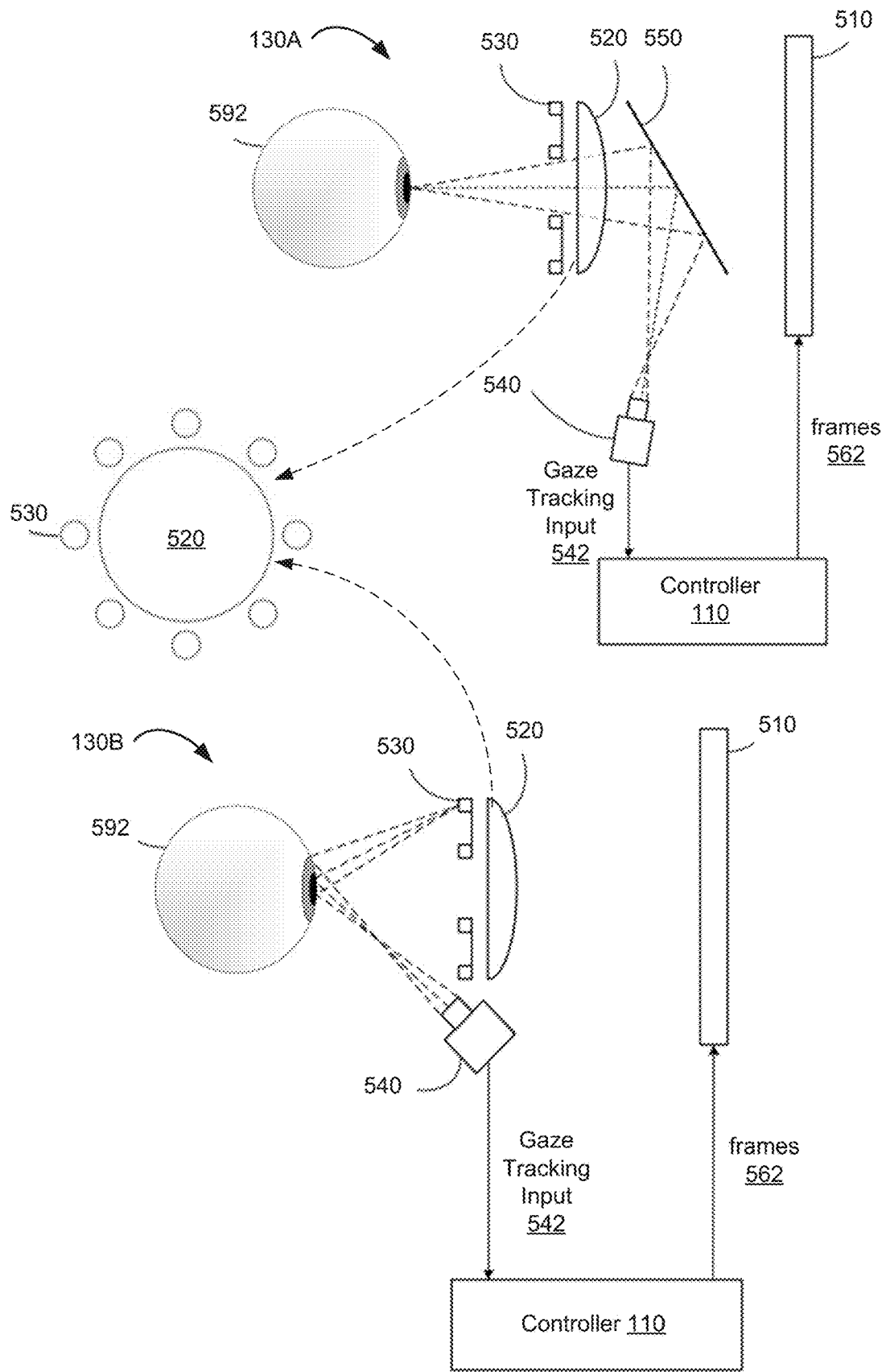
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a eye tracking device (or alternatively, a gaze tracking device) 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lense(s) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in extended-reality (e.g., including virtual reality, and/or mixed reality) applications to provide extended-reality (e.g., including virtual reality, augmented reality, and/or augmented virtuality) experiences to the user.

Figure 6:
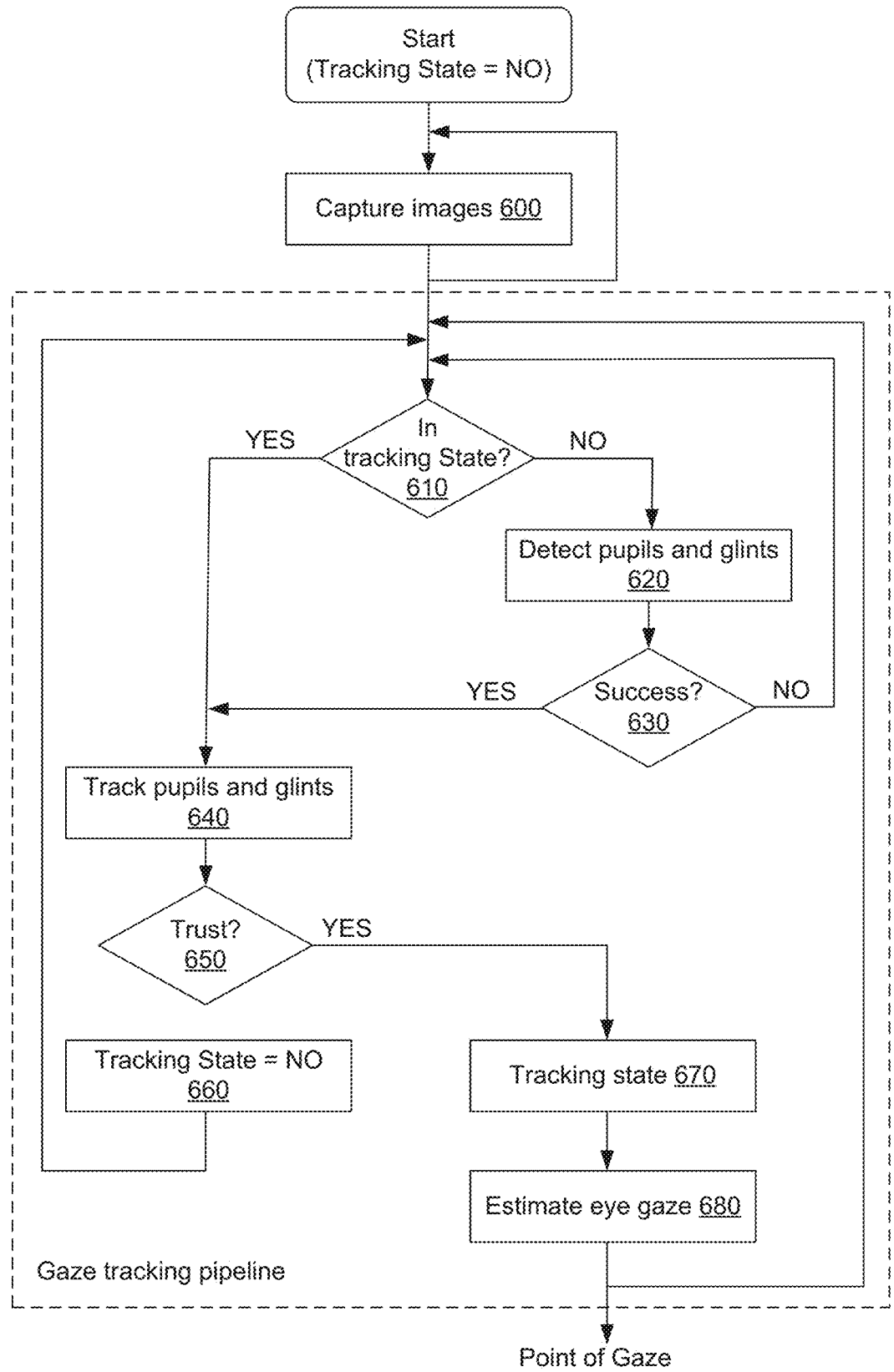
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

Figure 7B:
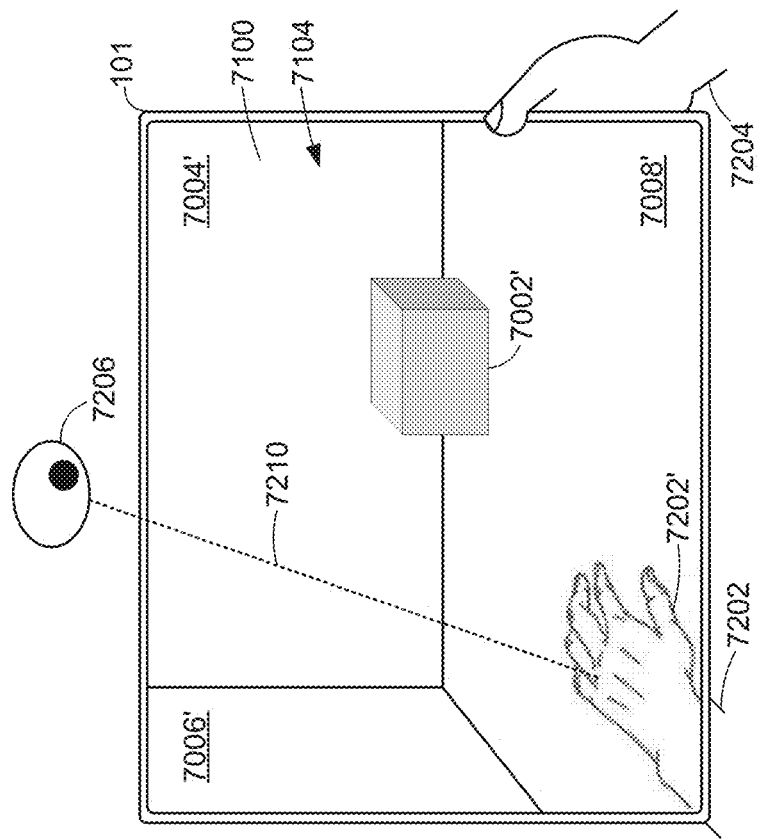
FIGS. 7A-7D are block diagrams that illustrate using detection of a gaze input directed to a hand in conjunction with a preset movement of the hand to cause display of user interface objects corresponding to various computer-generated experiences at positions in a three-dimensional environment that are away from the virtual position of the user's hand in the three-dimensional environment, in accordance with some embodiments.
Figure 7A:
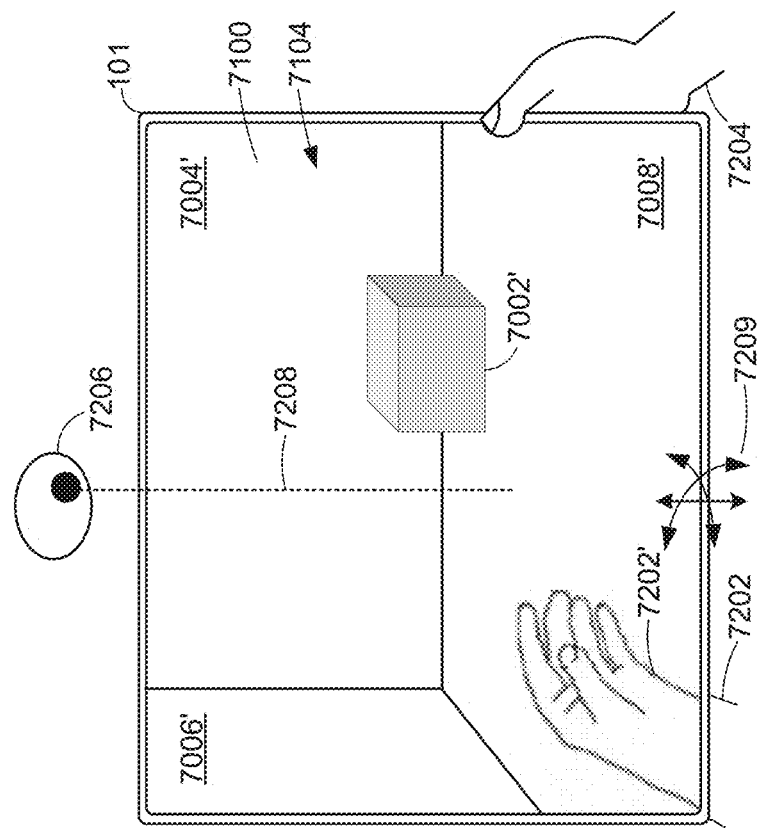
Figure 7D:
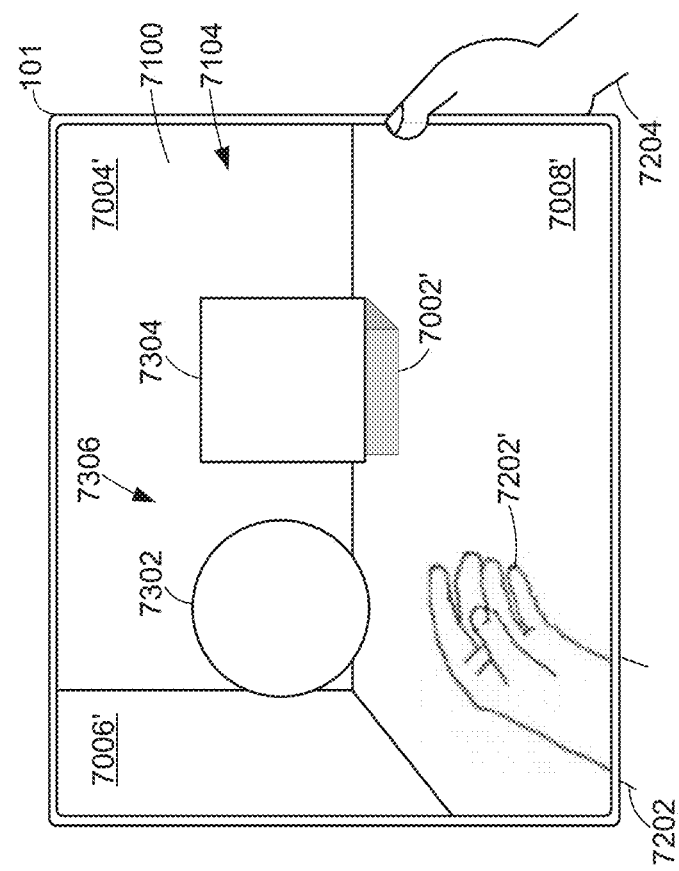
Figure 7C:
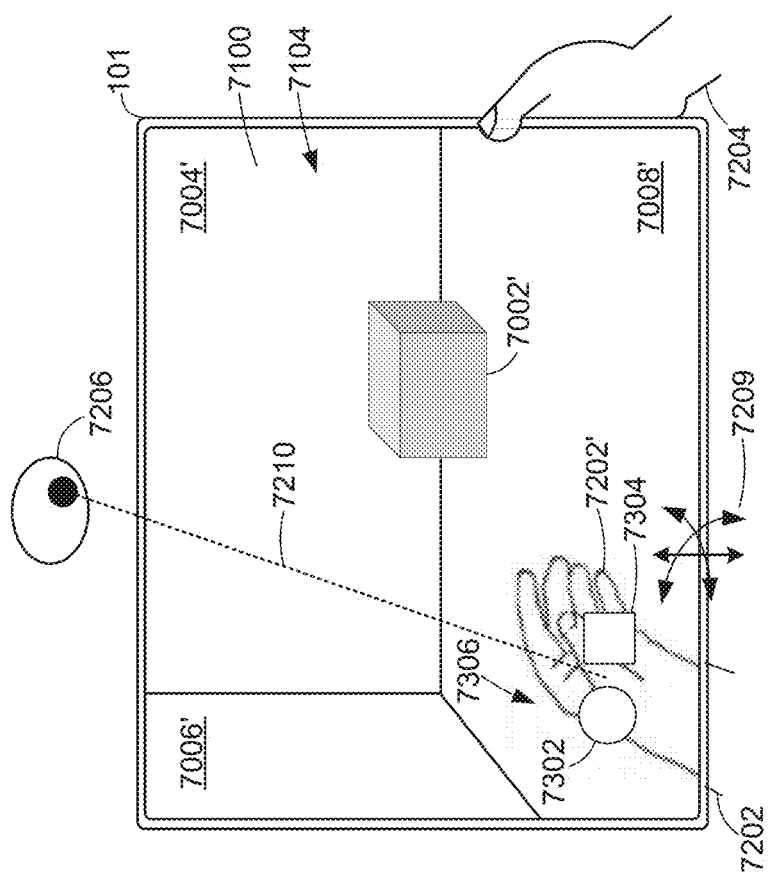
Figure 7F:
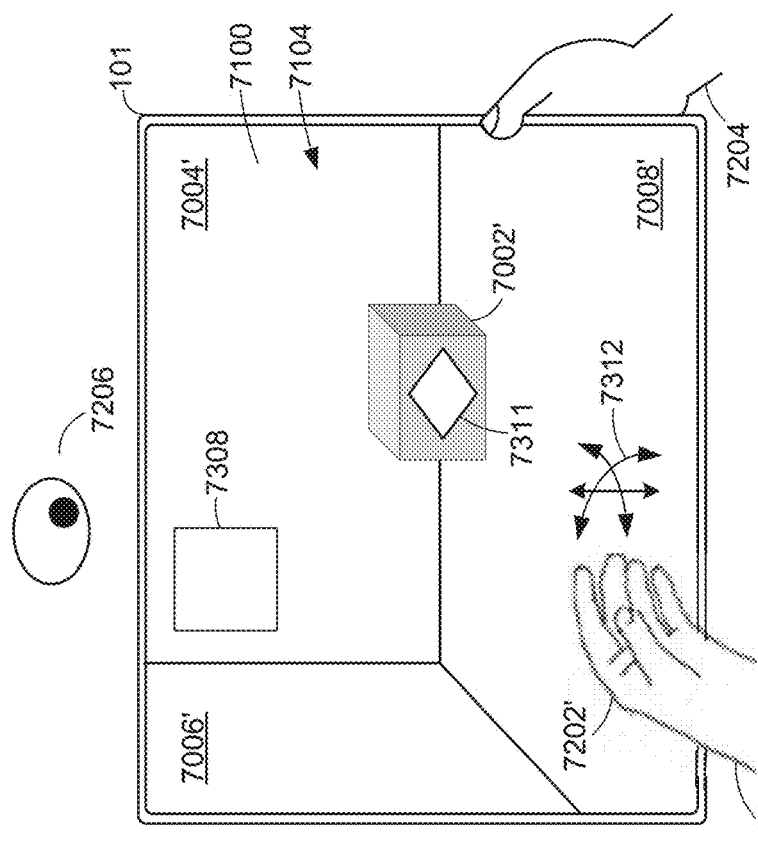
FIGS. 7E-7H are block diagrams that illustrating using detection of a preset hand gesture in conjunction with detection of a gaze input that is maintained on a respective user interface object for a preset extended amount of time (e.g., a preset dwell time) to cause selection of the respective user interface object, in accordance with some embodiments.
Figure 7E:
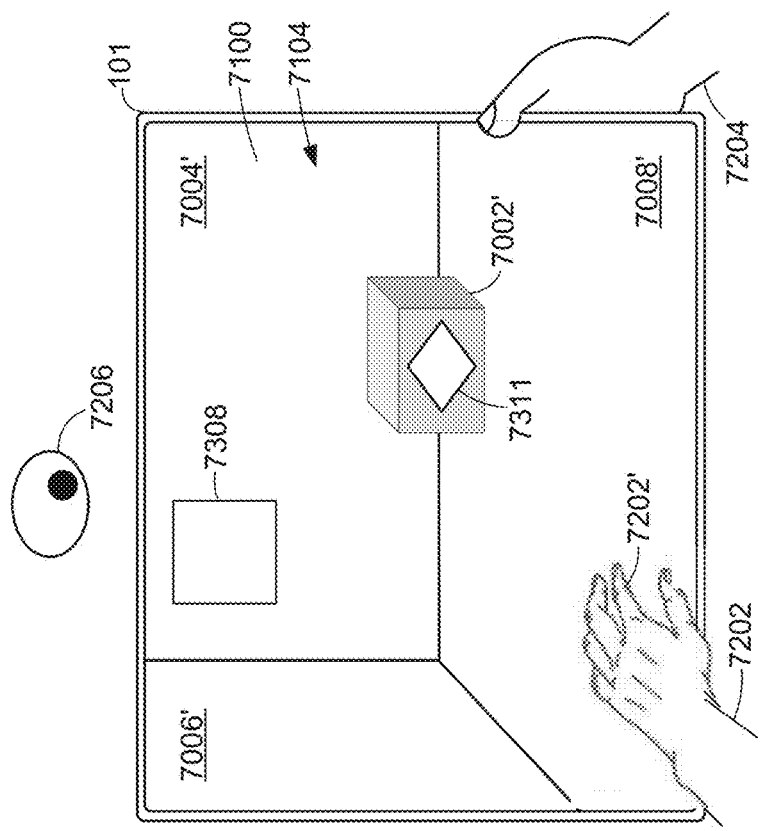
Figure 7G:
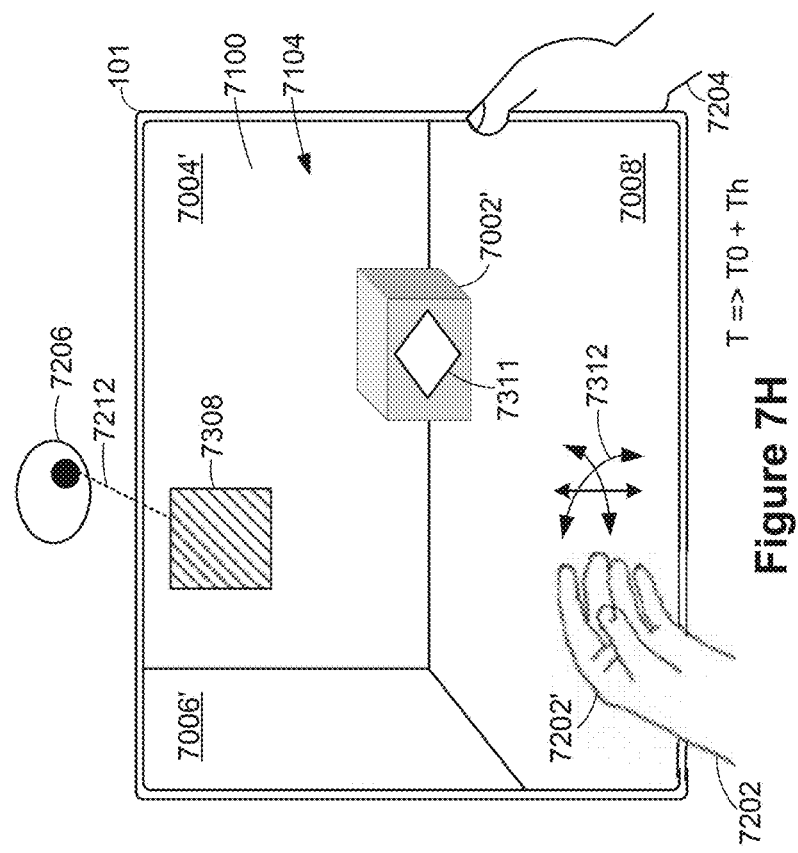
Figure 7H:
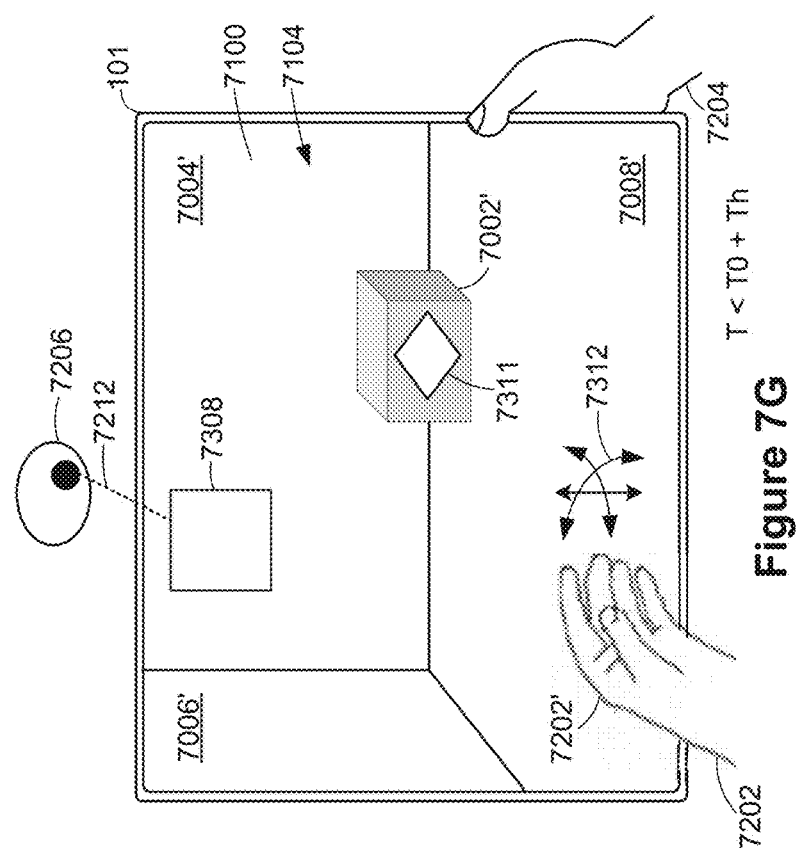
Figure 7J:
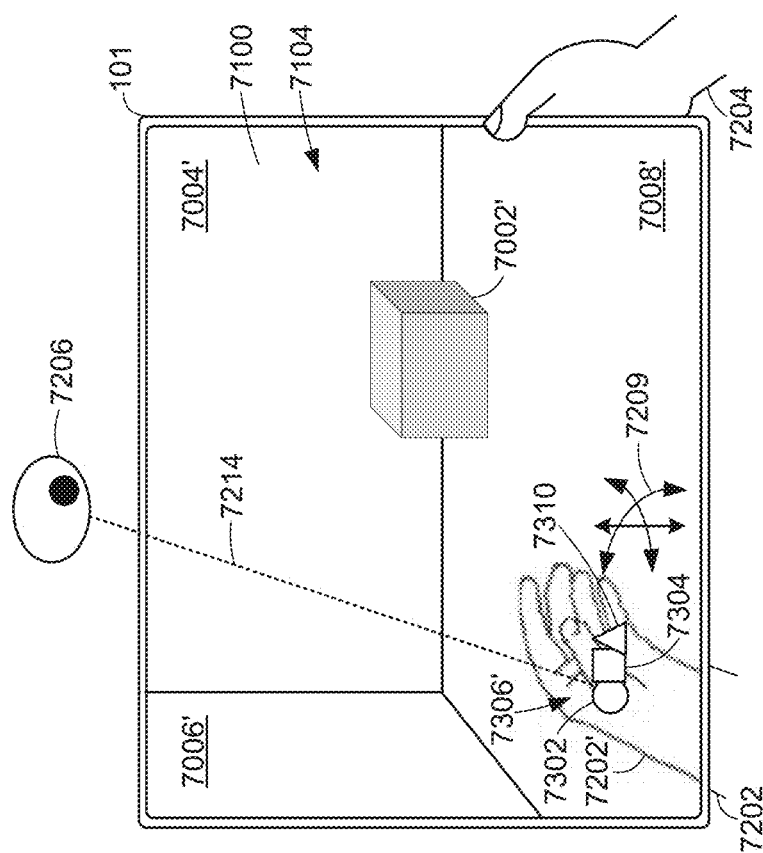
Figure 7I:
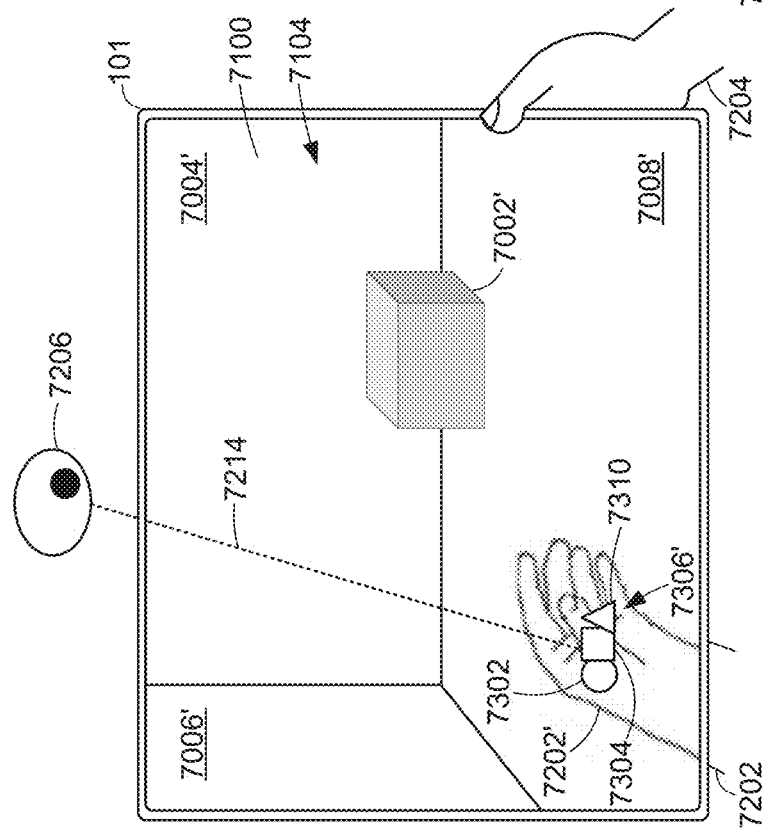
Figure 7M:
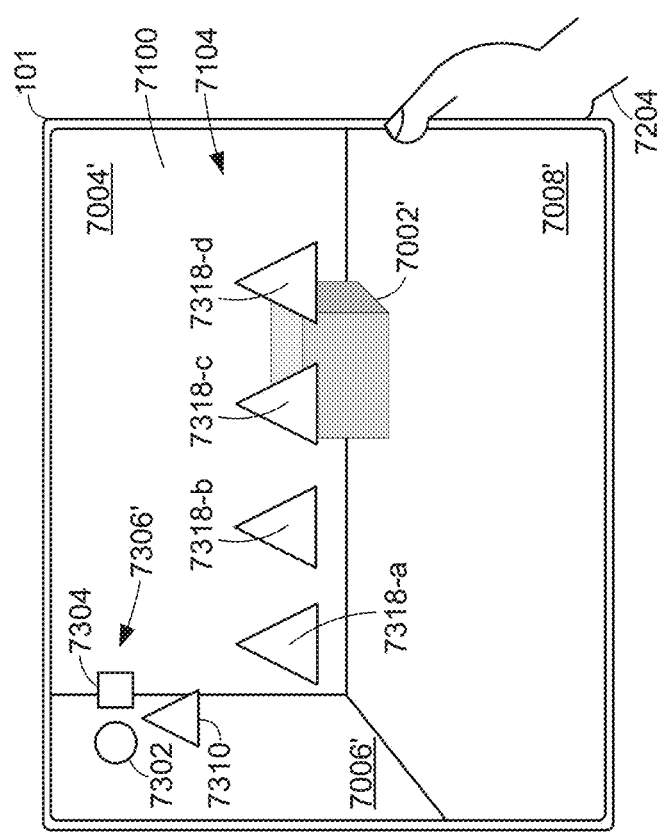
Figure 7O:
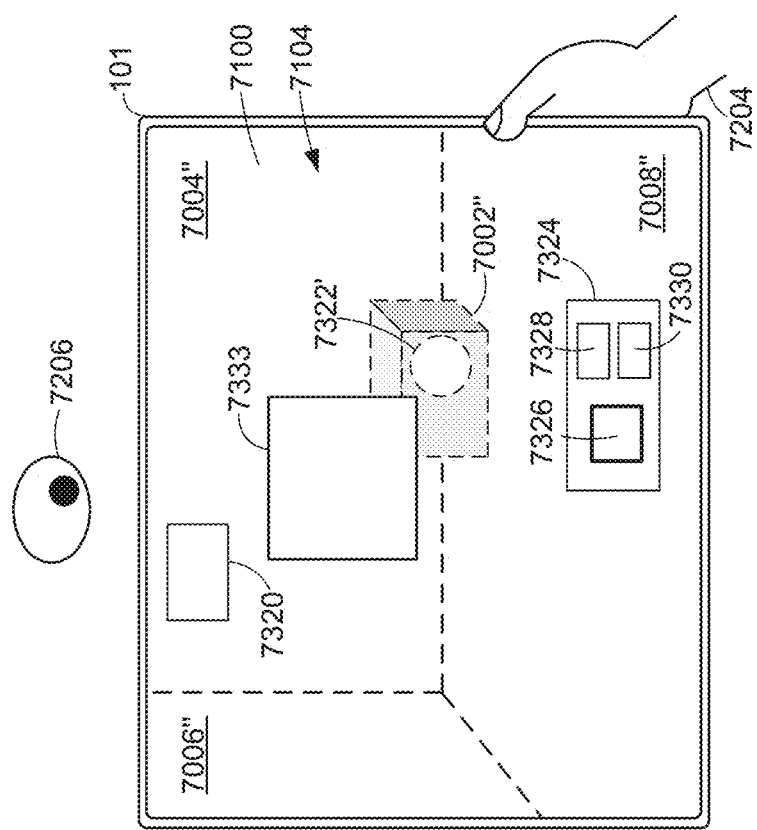
FIGS. 7N-7O are block diagrams illustrating changing display properties of background regions in a three-dimensional environment in conjunction with initiating a communication session, in accordance with some embodiments.
Figure 7N:
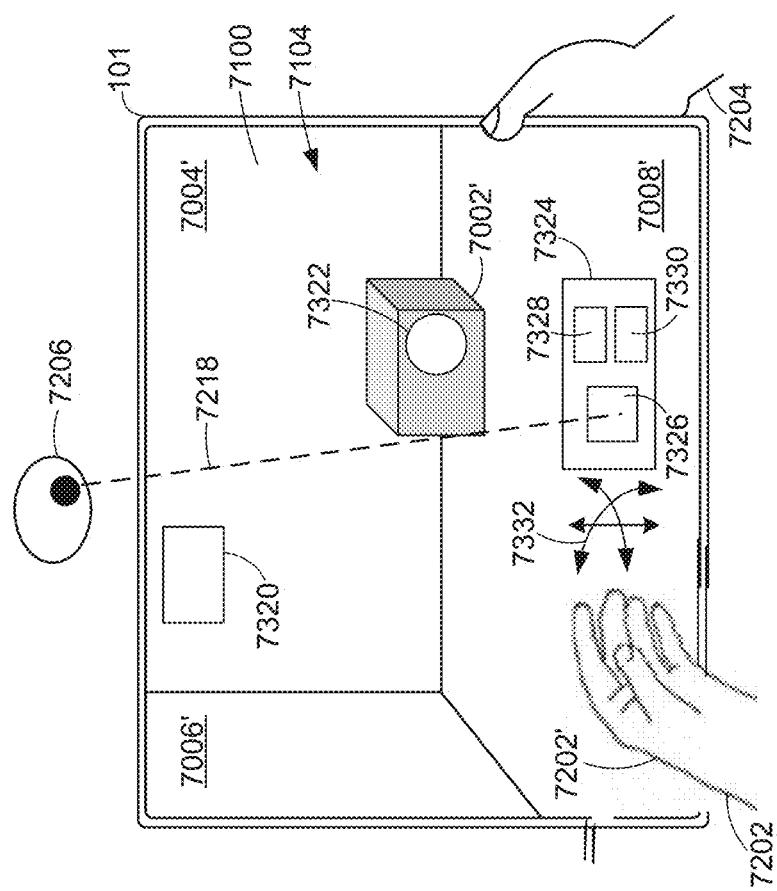
Figure 7S:
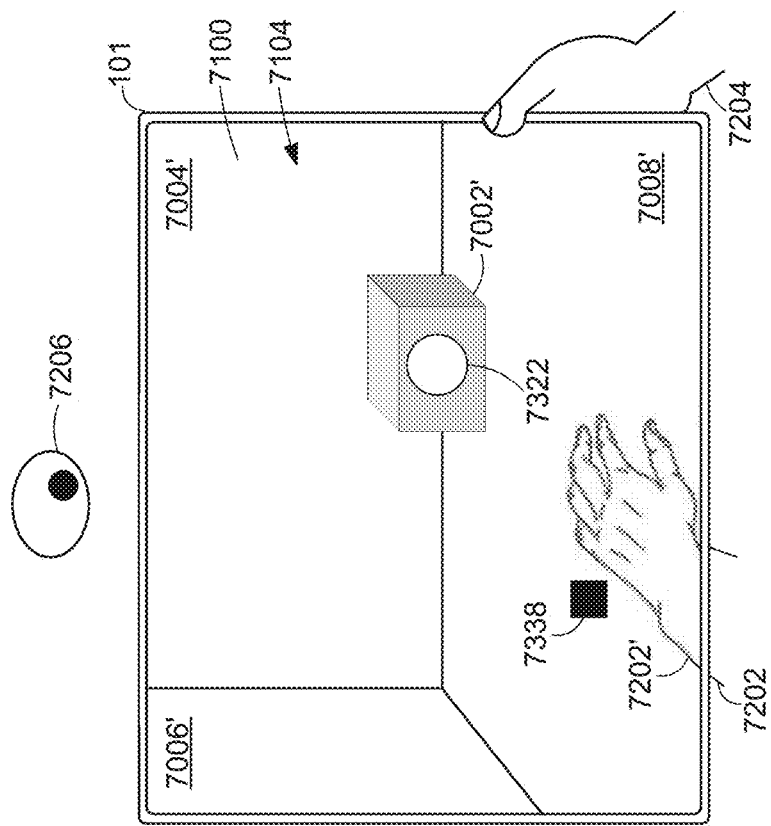
Figure 7R:
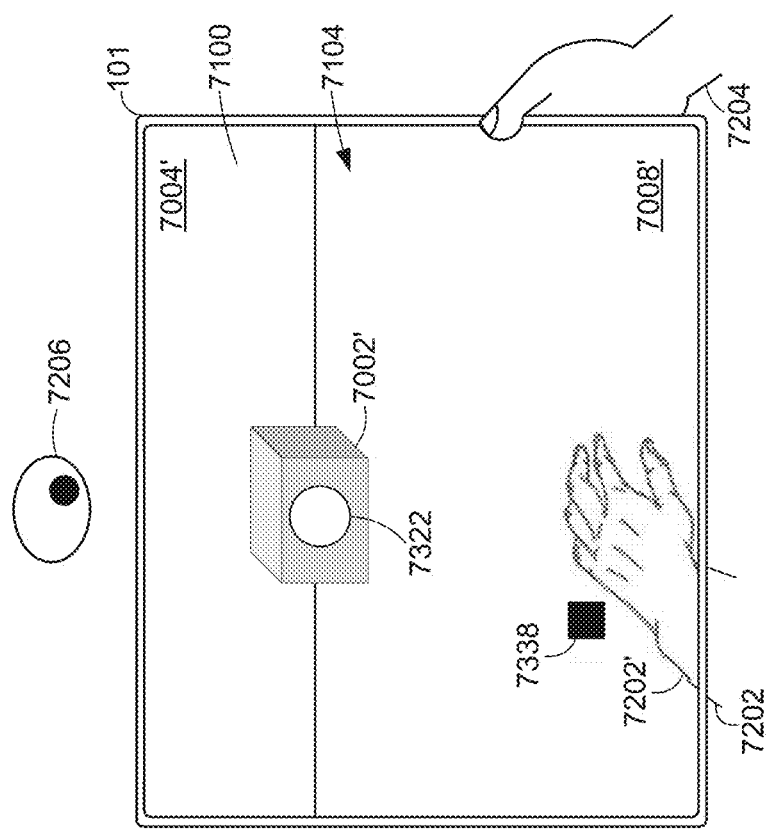
Figure 7U:
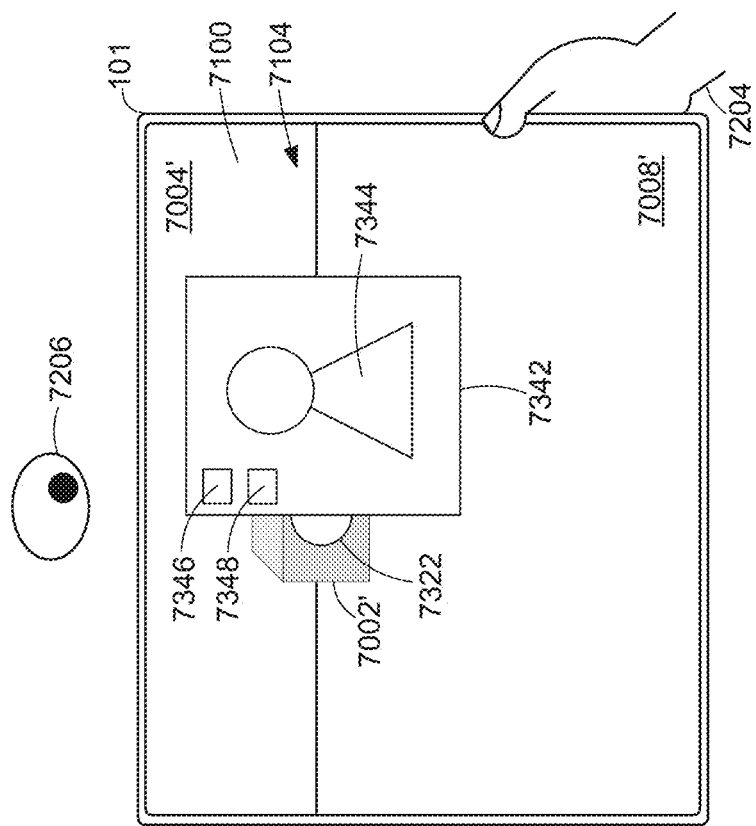
Figure 7T:
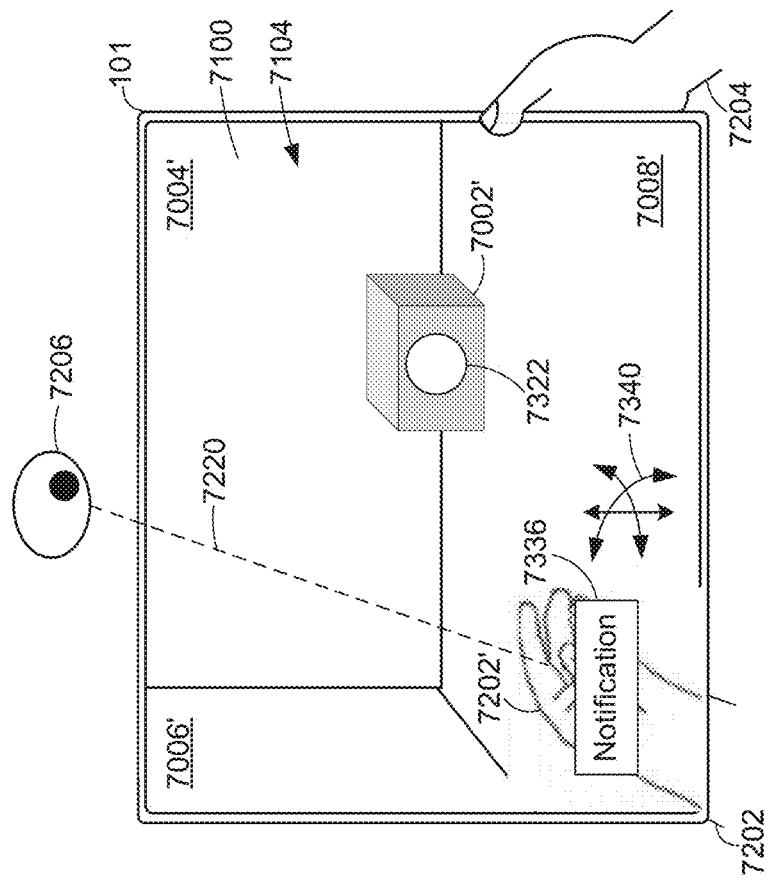
Figure 7V:
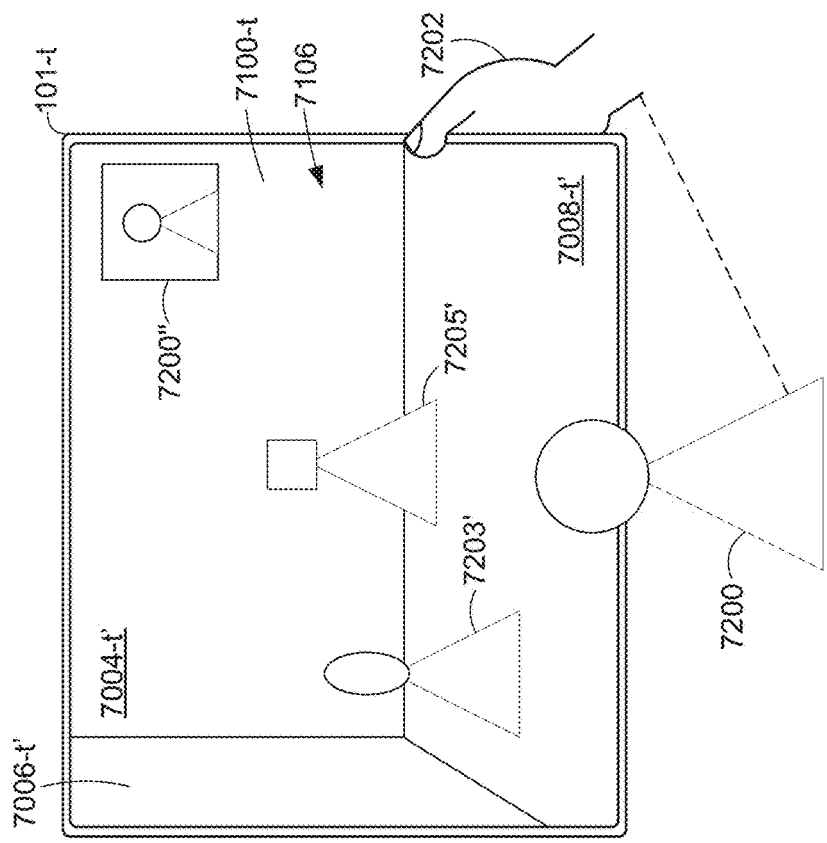
FIGS. 7V-7X are block diagrams illustrating two display modes (e.g., a spatial mode and a non-spatial mode) of a user interface of a communication session between a first user and a second user, where the second user participates in the communication session in a three-dimensional environment, in accordance with some embodiments.
Figure 7V:
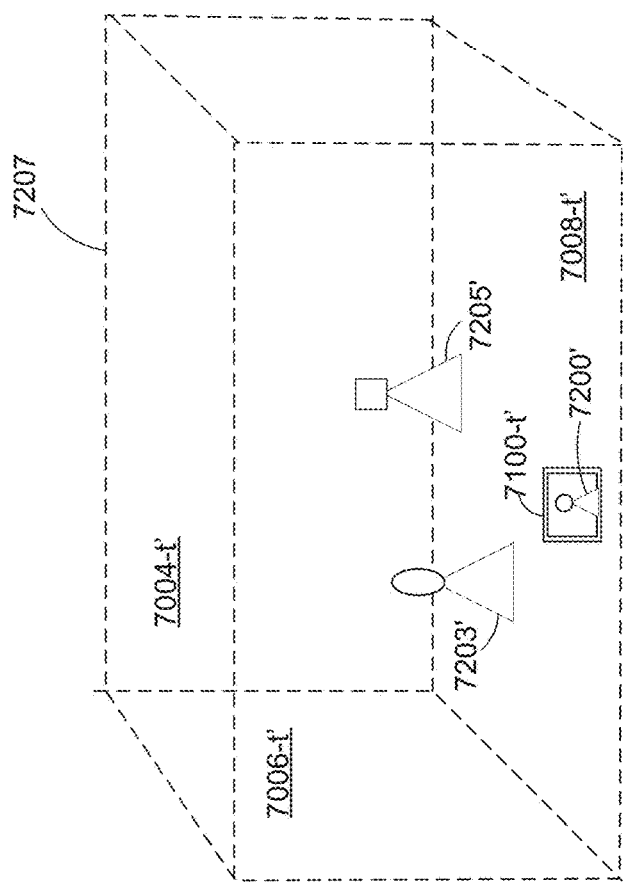
Figure 7V:
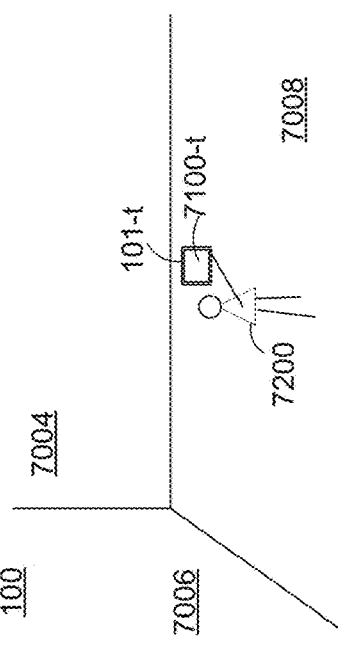
Figure 7W:
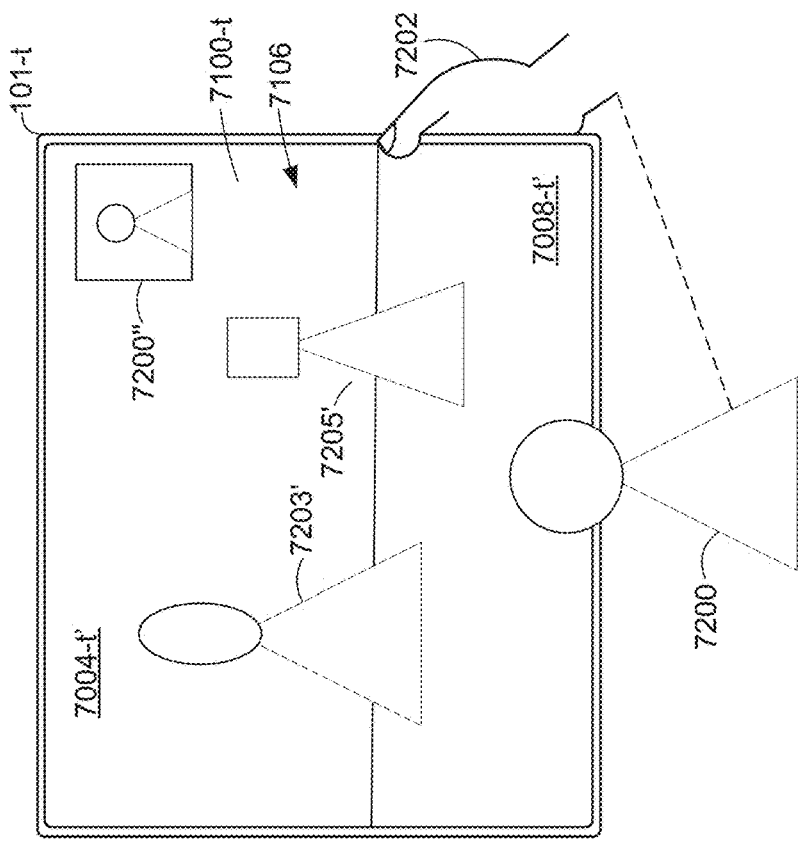
Figure 7W:
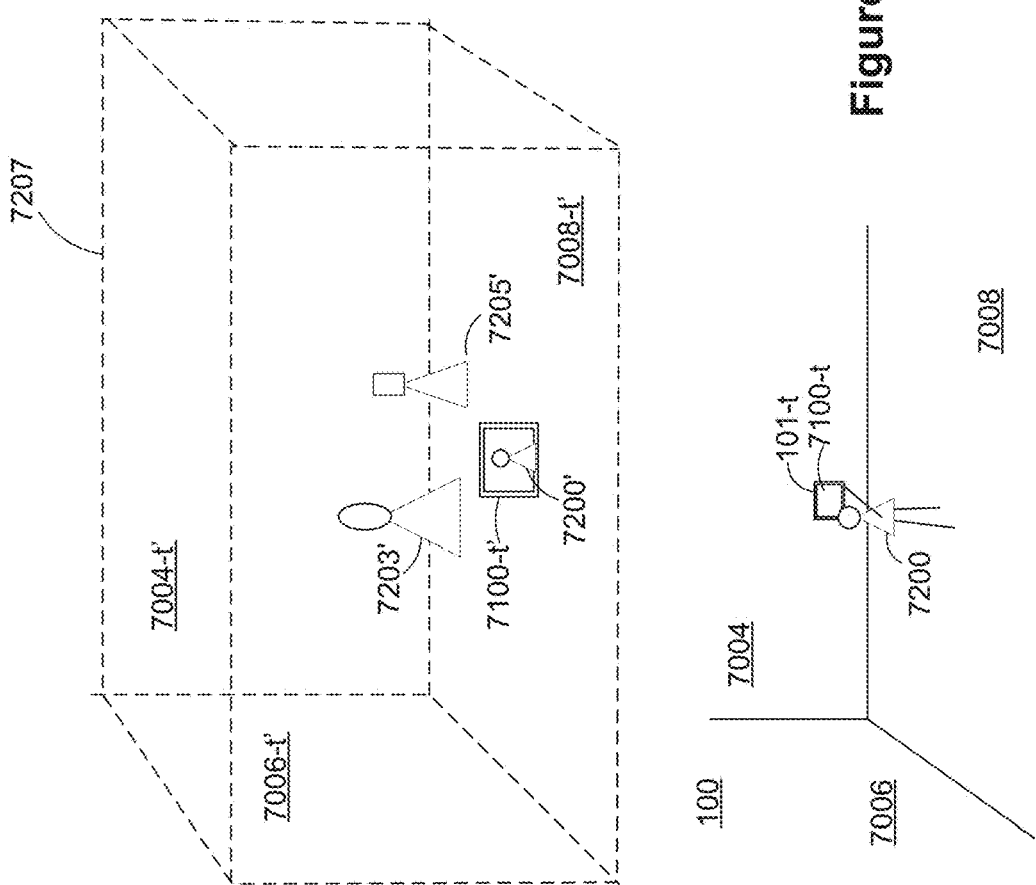
Figure 7X:
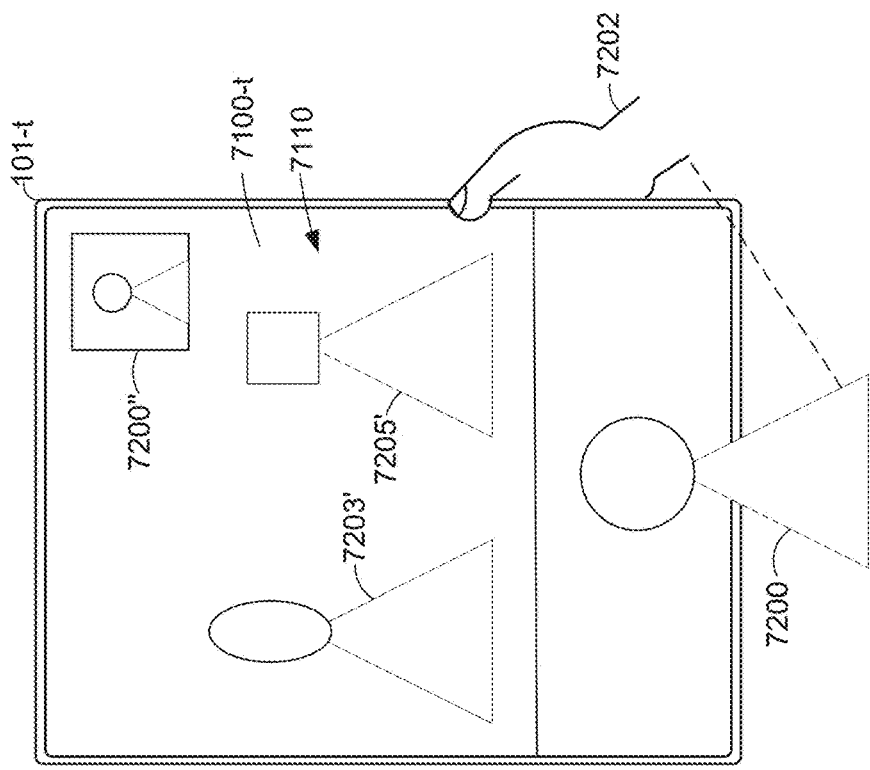
Figure 7X:
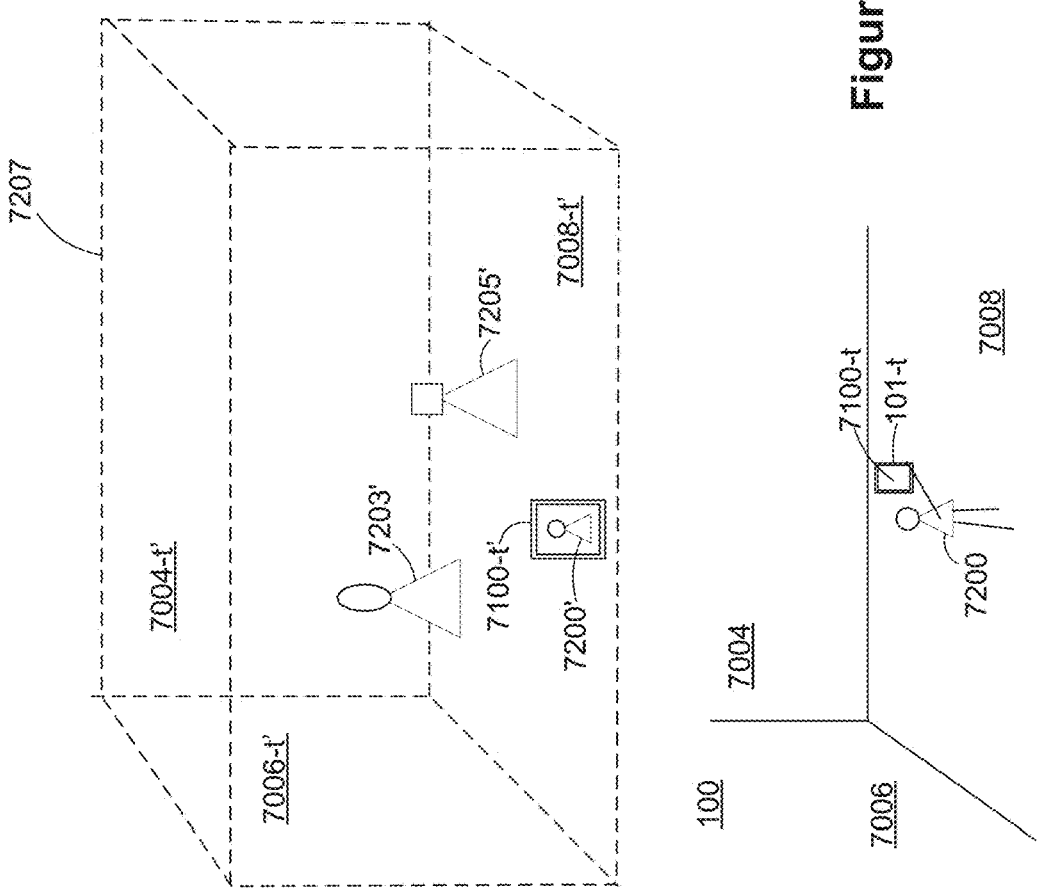
Figure 7Z:
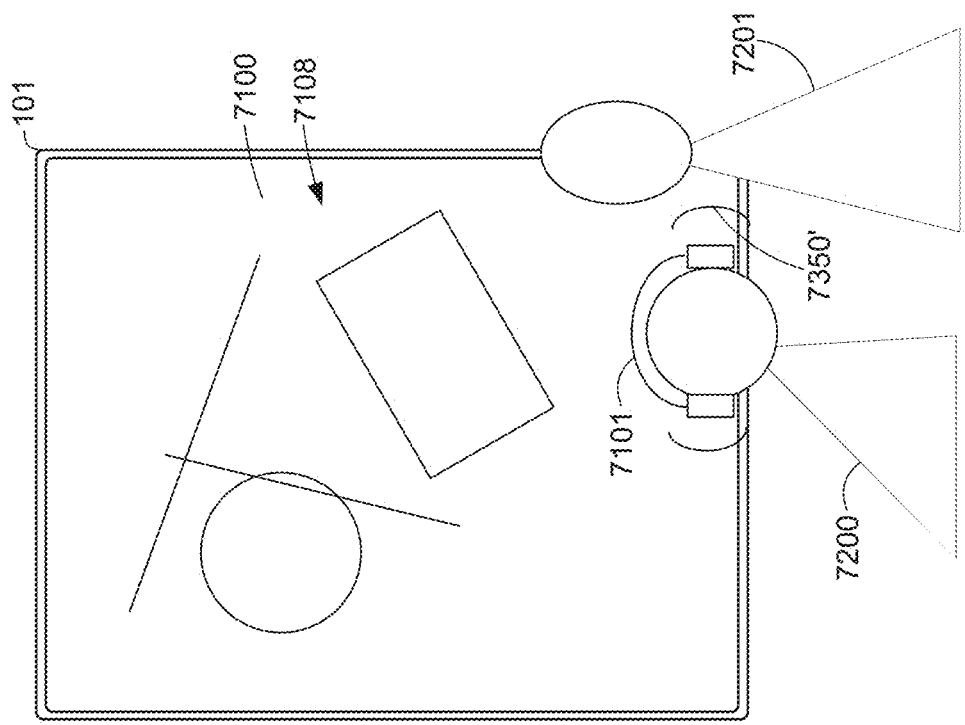
FIGS. 7Y-7Z are block diagrams illustrating changing output properties (e.g., audio output properties, visual output properties, etc.) of computer-generated content in response to detecting a first user's movement in a physical environment (e.g., leaning, turning, etc.) that indicates first user's shifting attention toward a second user (e.g., in the same physical environment, in a shared virtual environment, etc.), in accordance with some embodiments.

FIGS. 7A-7Z illustrate three-dimensional environments displayed via a display generation component (e.g., a display generation component 7100, display generation component 7100-*t*, a display generation component 120, etc.) and interactions that occur in the three-dimensional environments caused by user inputs directed to the three-dimensional environments and/or inputs received from other computer systems and/or sensors. In some embodiments, an input is directed to a virtual object within a three-dimensional environment by a user's gaze detected in the region occupied by the virtual object, by a hand gesture performed at a location in the physical environment that corresponds to the region of the virtual object. In some embodiments, an input is directed to a virtual object within a three-dimensional environment by a hand gesture that is performed (e.g., optionally, at a location in the physical environment that is independent of the region of the virtual object in the three-dimensional environment) while the virtual object has input focus (e.g., while the virtual object has been selected by a concurrently and/or previously detected gaze input, selected by a concurrently or previously detected pointer input, selected by a concurrently and/or previously detected gesture input, etc.). In some embodiments, an input is directed to a virtual object within a three-dimensional environment by an input device that has positioned a focus selector object (e.g., a pointer object, selector object, etc.) at the position of the virtual object. In some embodiments, an input is directed to a virtual object within a three-dimensional environment via other means (e.g., voice, control button, etc.). In some embodiments, an input is directed to a representation of a physical object or a virtual object that corresponds to a physical object by the user's hand movement (e.g., whole hand movement, whole hand movement in a respective posture, movement of one portion of hand relative to another portion of the hand, relative movement between two hands, etc.) and/or manipulation with respect to the physical object (e.g., touching, swiping, tapping, opening, moving toward, moving relative to, etc.). In some embodiments, the computer system displays some changes in the three-dimensional environment (e.g., displaying additional virtual content, ceasing to display existing virtual content, transitioning between different levels of immersion with which visual content is being displayed, etc.) in accordance with inputs from sensors (e.g., image sensors, temperature sensors, biometric sensors, motion sensors, proximity sensors, etc.) and contextual conditions (e.g., location, time, presence of others in the environment, etc.). In some embodiments, the computer system displays some changes in the three-dimensional environment (e.g., displaying additional virtual content, ceasing to display existing virtual content, transitioning between different levels of immersion with which visual content is being displayed, etc.) in accordance with inputs from other computers used by other users that are sharing the computer-generated environment with the user of the computer system (e.g., in a shared computer-generated experience, in a shared virtual environment, in a shared virtual or augmented reality environment of a communication session, etc.). In some embodiments, the computer system displays some changes in the three-dimensional environment (e.g., displaying movement, deformation, changes in visual characteristics, etc. of a user interface, a virtual surface, a user interface object, virtual scenery, etc.) in accordance with inputs from sensors that detects movement of other persons and objects and movement of the user that may not quality as a recognized gesture input for triggering an associated operation of the computer system.

In some embodiments, a three-dimensional environment that is displayed via a display generation component described herein is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, spatial relationships between physical objects, etc.). In some embodiments, the three-dimensional environment is an augmented reality environment that includes a representation of the physical environment. In some embodiments, the representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. In some embodiments, when virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environment (e.g., transitions between presenting a computer-generated environment or experience with different levels of immersion, adjusting the relative prominence of audio/visual sensory inputs from the virtual content and from the representation of the physical environment, etc.) based on user inputs and/or contextual conditions.

In some embodiments, the display generation component includes a pass-through portion in which the representation of the physical environment is displayed. In some embodiments, the pass-through portion of the display generation component is a transparent or semi-transparent (e.g., see-through) portion of the display generation component revealing at least a portion of physical environment surrounding and within the field of view of user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side or behind the user).

In some embodiments, when displaying virtual objects at positions that correspond to locations of one or more physical objects in the physical environment (e.g., at positions in a virtual reality environment, a mixed reality environment, an augmented reality environment, etc.), at least some of the virtual objects are displayed in placed of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component, etc.). In some embodiments, at least some of the virtual objects and virtual content are displayed to overlay a portion of the display and blocks the view of at least a portion of the physical environment visible through the transparent or semi-transparent portion of the display generation component.

In some embodiments, the display generation component displays different views of the three-dimensional environment in accordance with user inputs or movements that change the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, gestures performed by movement of one portion of the hand relative to another portion of the hand, etc.) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD, etc.), etc., relative to the physical environment cause corresponding movement of the viewpoint (e.g., with corresponding movement direction, movement distance, movement speed, and/or change in orientation, etc.) relative to the three-dimensional environment, resulting in corresponding change in the currently displayed view of the three-dimensional environment. In some embodiments, when a virtual object has a preset spatial relationship relative to the viewpoint (e.g., is anchored or fixed to the viewpoint), movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement alone (e.g., the display generation component and/or other location sensing component of the computer system rotating around a fixed location of the user in the physical environment). In some embodiments, a virtual object is, optionally, locked to another portion of the user, such as a user's hand or a user's wrist, and moves in the three-dimensional environment in accordance with movement of the portion of the user in the physical environment, to maintain a preset spatial relationship between the position of the virtual object and the virtual position of the portion of the user in the three-dimensional environment. In some embodiments, a virtual object is locked to a preset portion of a field of view provided by the display generation component, and moves in the three-dimensional environment in accordance with the movement of the field of view, irrespective of movement of the user that does not cause a change of the field of view.

In some embodiments, as shown in FIGS. 7A-7Z, the views of a three-dimensional environments sometimes do not include representation(s) of a user's hand(s), arm(s), and/or wrist(s). In some embodiments, the representation(s) of a user's hand(s), arm(s), and/or wrist(s) are included in the views of a three-dimensional environments. In some embodiments, the representation(s) of a user's hand(s), arm(s), and/or wrist(s) are included in the views of a three-dimensional environment as part of the representation of the physical environment provided via the display generation component. In some embodiments, the representations are not part of the representation of the physical environment and are separately captured (e.g., by one or more camera's pointing toward the user's hand(s), arm(s), and wrist(s)) and displayed in the three-dimensional environment independent of the currently displayed view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view and no transparent pass-through portion), real-time visual representations (e.g., stylize representations or segmented camera images) of one or both arms, wrists, and/or hands of the user are, optionally, still displayed in the virtual environment. In some embodiments, if a representation of the user's hand is not provided in the view of the three-dimensional environment, the position that corresponds to the user's hand is optionally indicated in the three-dimensional environment, e.g., by the changing appearance of the virtual content (e.g., through a change in translucency, simulated reflective index, etc.) at positions in the three-dimensional environment that correspond to the location of the user's hand in the physical environment. In some embodiments, the representation of the user's hand or wrist is outside of the currently displayed view of the three-dimensional environment because the virtual position in the three-dimensional environment that corresponds to the location of the user's hand or wrist is outside of the current field of view provided via the display generation component; and the representation of the user's hand or wrist will be visible in the view of the three-dimensional environment when the virtual position that corresponds to the location of the user's hand or wrist is moved within the current field of view due to movement of the display generation component, the user's hand or wrist, the user's head, and/or the user as a whole, etc.

FIGS. 7A-7M are block diagrams illustrating user interactions with user interface objects displayed in a three-dimensional environment, in accordance with some embodiments. In some embodiments, the user interface objects are provided as part of a home user interface or home experience in the three-dimensional environment. The user interface objects are optionally icons of items that are typically included in a home user interface or launch pad for the computer system, such as icons for launching applications, icons for starting communication sessions, icons for starting computer-generated experiences, group icons for different categories of user interface objects, container objects such as folders or groups, a home button, a dock, a root menu, etc. in the three-dimensional environment. Behaviors described in FIGS. 7A-7M (and FIGS. 8-10) with respect to user interface objects in some examples are applicable to user interface objects in other examples, in accordance with various embodiments, unless stated otherwise in the descriptions.

FIGS. 7A-7D are block diagrams that illustrate using detection of a gaze input directed to a first position in a three-dimensional environment that corresponds to a location at or near a user's hand (e.g. hand 7202, or another hand, etc.) in a physical environment in conjunction with a movement of the hand that meets preset criteria (e.g., forming a toss gesture, or a flick gesture, etc.) to cause display of a plurality of user interface objects corresponding to various computer-generated experiences (e.g., user interface objects 7306, 7302, 7304, etc.) at positions in the three-dimensional environment that are away from the position that corresponds to the location at or near the user's hand, in accordance with some embodiments.

For example, as illustrated in FIGS. 7A-7D, a first gaze input (e.g., a gaze input 7210 in FIG. 7C, or another gaze input, etc.) is directed to a first position in a three-dimensional environment (e.g., environment 7104 in FIGS. 7A-7D, or another AR, VR, or XR environment, etc.) that corresponds to a location at or near a user's hand (e.g., hand 7202, or another hand, etc.) in a physical environment is detected in conjunction with a first movement of the hand that meets preset criteria (e.g., movement 7209 in FIGS. 7A and 7C, or other kinds of movement that meet the preset criteria, etc.). In response to detecting the first gaze input in conjunction with the first movement (as shown in FIG. 7C), the computer system displays of a plurality of user interface objects (e.g., user interface objects 7306, 7302 and 7304 in FIG. 7D, other user interface objects, etc.) corresponding to various computer-generated experiences (e.g., VR experiences, AR experiences, XR experiences, applications, communication sessions, etc.) at positions in the three-dimensional environment 7104 that are away from the position that corresponds to the location at or near the user's hand (e.g., as shown in FIG. 7D), in accordance with some embodiments. The positions at which the user interface objects are displayed, as shown in FIG. 7D, are anchored to the three-dimensional environment 7104, and not anchored to a portion of the user's body (e.g., head, eyes, face, torso, hand, wrist, etc.).

As described herein, in some embodiments, absent of either component of the user input, e.g., the movement of the user's hand that meets the preset criteria (e.g., no movement, or movement that does not meet the preset criteria is detected, as illustrated in the scenario in FIG. 7B), or the gaze input directed to the position corresponding to the location at or near the user's hand, the computer system (e.g., no gaze input, or gaze input 7208 is not detected at the position that corresponds to the location at or near the user's hand, as shown in the scenario in FIG. 7A), the computer system does not (e.g., in contrast to the scenario shown in FIGS. 7C-7D) display the plurality of user interface objects (e.g., the user interface objects 7306, 7302 and 7304, or other user interface objects) at positions in the three-dimensional environment 7104 that are away from the position that corresponds to the location at or near the user's hand (e.g., as shown in FIGS. 7A and 7B, respectively).

FIGS. 7A-7D shows an exemplary computer system (e.g., device 101, or another computer system, etc.) that is in communication with a first display generation component (e.g., display generation component 7100, or another display generation component, etc.). In some embodiments, the first display generation component is a heads-up display. In some embodiments, the first display generation component is a head-mounted display (HMD). In some embodiments, the first display generation component is a standalone display, a touchscreen, a projector, or another type of display. In some embodiments, the computer system is in communication with one or more input devices, including cameras or other sensors and input devices that detect movement of the user's hand(s), movement of the user's body as whole, and/or movement of the user's head in the physical environment. In some embodiments, the one or more input devices detect the movement and the current postures, orientations, and positions of the user's hand(s), face, and body as a whole, etc. of the user. In some embodiments, the one or more input devices include an eye tracking component that detects location and movement of the user's gaze. In some embodiments, the first display generation component, and optionally, the one or more input devices and the computer system, are parts of a head-mounted device (e.g., an HMD, a pair of goggles, etc.) that moves and rotates with the user's head in the physical environment, and changes the viewpoint of the user into the three-dimensional environment provided via the first display generation component. In some embodiments, the first display generation component is a heads-up display that does not move or rotate with the user's head or the user's body as a whole, but, optionally, changes the viewpoint of the user into the three-dimensional environment in accordance with the movement of the user's head or body relative to the first display generation component. In some embodiments, the first display generation component is optionally moved and rotated by the user's hand relative to the physical environment or relative to the user's head, and changes the viewpoint of the user into the three-dimensional environment in accordance with the movement of the first display generation component relative to the user's head or face or relative to the physical environment.

As shown in FIGS. 7A-7D, the computer system displays a view of a three-dimensional environment (e.g., environment 7104, a virtual three-dimensional environment, an augmented reality environment, a pass-through view of a physical environment, a camera view of a physical environment, etc.). In some embodiments, the three-dimensional environment is a virtual three-dimensional environment without a representation of a physical environment. In some embodiments, the three-dimensional environment is a mixed reality environment that is a virtual environment that is augmented by sensor data corresponding to the physical environment. In some embodiments, the three-dimensional environment is an augmented reality environment that includes one or more virtual objects and a representation of at least a portion of a physical environment (e.g., representations 7004', 7006' of walls, representation 7008' of a floor, representation 7002' of a physical object, etc.) surrounding the first display generation component 7100. In some embodiments, the representation of the physical environment includes a camera view of the physical environment. In some embodiments, the representation of the physical environment includes a view of the physical environment through a transparent or semitransparent portion of the first display generation component.

In FIG. 7A, a gaze input 7208 from the eyes (e.g., eyes 7206) of the user is detected by the computer system, and the gaze input 7208 is directed to a position in the three-dimensional environment that does not correspond to the location of the user's hand 7202 in the physical environment. For example, the gaze 7208 is directed to a position that correspond to a location on the floor (e.g., directed to a region on the representation 7008' of the floor), or a position on the representation 7002' of a physical object, etc. in the three-dimensional environment. In some embodiments, the gaze input 7208 does not have a stable position in the three-dimensional environment 7104 and wanders around in the three-dimensional environment from position to position without remaining in a respective region that is at or near the representation 7202' of the hand 7202. In some embodiments, the representation 7202' of the hand 7202 is optionally outside of the currently displayed field of view provided by the first display generation component 7100, and is not visible to the user through the first display generation component 7100.

In FIG. 7A, the computer system detects that the hand of the user (e.g., hand 7202, or another hand, etc.) makes the first movement 7209 that meets the preset criteria (e.g., criteria for detecting a flick gesture, a toss gesture, a push gesture, etc.) while the gaze input 7208 is not directed to the region in the three-dimensional environment 7104 that corresponds to the location at or near the hand 7202 of the user (e.g., the region of the representation 7202' of the hand 7202 in FIG. 7A). In response to detecting the first movement 7209 of the hand 7202, in accordance with a determination that the gaze input 7208 is not detected in the region in the three-dimensional environment that corresponds to the location of the user's hand in conjunction with (e.g., while, within a time window before, during, or after, etc.) the detection of at least a portion of the first movement 7209, the computer system does not display the plurality of user interface objects at positions away from the virtual position that corresponds to the user in the three-dimensional environment 7104. In some embodiments, a home user interface object (e.g., a cluster of miniature representations of the plurality of user interface objects, a cluster of category icons for different categories of the plurality of user interface objects, a home button, etc.) is displayed at the position that corresponds to the location of the user's hand (e.g., overlaying, blocking, replacing display of, etc. at least a portion of the representation 7202' of the user's hand, palm, back of hand, wrist, etc., or a region near the representation 7202', etc.). In some embodiments, display of the home user interface object is in response to the movement of the user's hand that turns a preset side of the hand toward the user's face, or movement toward the user's face, etc. In some embodiments, display of the home user interface object is in response to the movement of the user's hand that turns a preset side of the hand toward the user's face, or movement toward the user's face, etc., while the gaze input is directed to the representation of the user's hand (e.g., as shown in FIG. 7C). In some embodiments, display of the home user interface object is in response to detecting the gaze input being directed to the representation of the user's hand.

In FIG. 7B, in contrast to the scenarios shown in FIG. 7A and FIGS. 7C-7D, the computer system detects the gaze input at the position that corresponds to the location of the user's hand (e.g., the gaze input 7210 is directed to the region of the representation 7202' of the user's hand 7202 in FIG. 7B) in conjunction with second movement or no movement of the user's hand 7202 in the physical environment. In accordance with a determination that the gaze input directed to the region that corresponds to the location of the user's hand is detected in conjunction with second movement of the user's hand that does not meet the preset criteria (or that the gaze input is detected when the user's hand is stationary or out of view), the computer system does not display the plurality of user interface objects (e.g., user interface objects 7306, 7302, and 7304, etc.) at positions away from the virtual position that corresponds to the user. In some embodiments, the home user interface object (e.g., a cluster of miniature representations of the plurality of user interface objects, a cluster of category icons for different categories of the plurality of user interface objects, a home button, etc.) is displayed at the position that corresponds to the location of the user's hand (e.g., overlaying, blocking, replacing display of, etc. at least a portion of the representation 7202' of the user's hand, palm, back of hand, wrist, etc., or a region near the representation 7202', etc.) even though the hand is not moving or is not making the movement that meets the preset criteria. In some embodiments, display of the home user interface object is in response to the movement of the user's hand that turns a preset side of the hand toward the user's face, or movement toward the user's face, etc. In some embodiments, display of the home user interface object is in response to the movement of the user's hand that turns a preset side of the hand toward the user's face, or movement toward the user's face, etc., while the gaze input is directed to the representation of the user's hand.

In FIG. 7C, the computer system detects the first movement 7209 of the user's hand 7202 in the physical environment that meets the preset criteria and the gaze input 7210 that is directed to the region of the three-dimensional environment 7104 that corresponds to the location at or near the user's hand 7202 in the physical environment (e.g., the gaze input is directed to the representation 7202' of the user's hand 7202, optionally, while a preset side of the hand is facing toward the user). In accordance with a determination that the first movement 7209 of the user's hand in the physical environment meets the preset criteria (e.g., the movement of the hand corresponds to a flick gesture, a toss gesture, a push gesture, etc.) and that the first movement meets the preset criteria in conjunction with detection of the gaze input 7210 at the region corresponding to the location at or near the hand 7202 of the user, the computer system displays the plurality of user interface objects (e.g., user interface objects 7306, 7302 and 7304, other user interface objects, category icons of the user interface objects, etc.) at respective positions in the three-dimensional environment 7104 that are away from the position that corresponds to the location of the user's hand in the physical environment, as shown in FIG. 7D. In some embodiments, the computer system, optionally, does not display a reduced version of the user interface object 7306 at the position that corresponds to the location of the user's hand in FIG. 7C, when the gaze input is detected at the region that corresponds to the location of the user's hand and a preset side of the hand faces toward the user. In some embodiments, the computer system, optionally, displays a reduced version of the user interface object 7306 at the position that corresponds to the location of the user's hand in FIG. 7D, while the user interface object 7306 is displayed away from the position that corresponds to the location of the user's hand (e.g., the user can interact with either the version displayed near the user's hand, or the version displayed away from the user's hand). In some embodiments, the version of the user interface object 7306 displayed at the position that corresponds to the location of the user's hand (e.g., in FIG. 7C) includes a reduced sized cluster of category icons for different groups of selectable user interface objects, and the version of user interface object 7306 displayed at the position that are away from the virtual position of the user (e.g., in FIG. 7D) includes an enlarged cluster of category icons for the different groups of selectable user interface objects. In some embodiments, the version of the user interface object 7306 displayed at the position that corresponds to the location of the user's hand (e.g., in FIG. 7C) includes a single home button, and the version of user interface object 7306 displayed at the position that are away from the virtual position of the user (e.g., in FIG. 7D) includes a cluster of category icons for the different groups of selectable user interface objects.

As shown in FIG. 7C, in some embodiments, the home user interface object (e.g., user interface object 7306, a cluster of miniature version of the plurality of user interface objects that correspond to computer-generated experiences, a cluster of category icons that correspond to different categories of computer-generated experiences, a home button, etc.) is displayed at the position that corresponds to the location at or near the user's hand 7202 in response to the computer system detecting the gaze input 7210 in the region that corresponds to the location of the user's hand 7202. In some embodiments, the home user interface object is displayed in accordance with a determination that the gaze input 7210 is directed to the region that corresponds to the location of the user's hand 7202 while the hand is in a preset posture (e.g., with the back of hand facing the user's face, with the palm side facing the user's face, etc.), or while the hand made a preset movement (e.g., turned a preset side of the hand toward the user's face, raised the hand toward the user's face, etc.), etc. In some embodiments, the home user interface object is anchored to and moves with the representation 7202' of the user's hand when displayed at the position in the three-dimensional environment that corresponds to the location of the user's hand in the physical environment. In some embodiments, at least an initial portion of the first movement 7209 that meets the preset criteria is detected during the display of the home user interface object at the position that corresponds to the location at or near the user's hand 7202. In some embodiments, the first movement 7209 of the user's hand 7202 that meets the preset criteria includes a flick of the wrist that is connected to the hand 7202, and that causes the hand 7202 to move from a position that is close to the user to a position that is farther away from the user, while the wrist is stationary or moving away from the user's face.

In some embodiments, the user interface objects that are displayed at positions that are away from the first position that corresponds to the user's hand 7202 are objects that are associated with a home environment or launch pad for experiences, including application icons for launching applications, avatars of users for initiating communication sessions with the users, icons for launching computer-generated AR, VR, or XR experiences in the three-dimensional environment, or category icons corresponding to different categories of the above, etc. In some embodiments, selection of a respective category icon (e.g., represented by object 7302 in FIG. 7C, or 7D) causes display of a set of user interface objects from a corresponding category (e.g., application icons, avatars of users, icons for experiences, icons of other categories, icons from sub-categories of the above categories, etc.). In some embodiments, the computer system displays an animated transition that shows the plurality of user interface objects moving from the position that corresponds to the location at or near the user's hand (e.g., from the positions of the user interface objects 7306, 7302, and 7304, etc. in FIG. 7C) to the positions away from the position corresponds to the location at or near the user's hand 7202 (e.g., to the positions of the user interface objects 7306, 7302, and 7304, etc. in FIG. 7D). In some embodiments, the animated transition shows a home button or a cluster of category icons displayed at the position that corresponds to the location of the user's hand flying out of the representation of the user's hand away from the viewpoint of the currently displayed view of the three-dimensional environment and settling into their final positions in the three-dimensional environment away from the representation of the user's hand and away from the virtual position of the user. In some embodiments, the home button stays with the representation 7202' of the hand, and the cluster of category icons (e.g., represented by objects 7306, 7302, and 7304 in FIG. 7D) are shown to fly out of the representation of the user's hand and settle into their final positions in the three-dimensional environment. In some embodiments, the plurality of category icons settle in a corner or edge region of the field of view (e.g., as shown in FIGS. 7K-7M) and moves with the viewpoint in the three-dimensional environment 7104. In some embodiments, the plurality of category icons settle in a portion of the three-dimensional environment that is currently in a corner or edge region of the field of view (e.g., as shown in FIGS. 7K-7M) and do not move with the viewpoint in the three-dimensional environment 7104.

In some embodiments, the positions that are away from the first position that corresponds to the location at or near the user's hand (e.g., the first position is dynamically updated in accordance with movement of the user's hand as a whole in the physical environment) are positions in the three-dimensional environment that are at least a first threshold distance (e.g., an arm's length away, a preset viewing distance selected by or for the user, etc.) away from a position that corresponds to the location of the user's face or the user as a whole. In some embodiments, the positions that are away from the first position that corresponds to the location at or near the hand of the user are positions that are anchored to the three-dimensional environment 7104 (e.g., to positions in the three-dimensional environment that correspond to the wall, a preset region in the physical environment, a desk, etc.) and the positions anchored to the three-dimensional environment do not change with the movement of the user as a whole or with the movement of a respective portion of the user (e.g., the user's hand, the user's head, etc.) in the physical environment. In some embodiments, the positions that are away from the first position that corresponds to the location at or near the hand of the user are positions that are anchored to the position of the user's viewpoint into the three-dimensional environment 7104 and the positions that are anchored to the position of the user's viewpoint changes in accordance with the movement of the user's viewpoint in the three-dimensional environment (e.g., the viewpoint moves with the movement of the user as a whole or with the movement of the user's head in the physical environment).

In some embodiments, the computer system generates an audio output that is output in conjunction with the movement and display of the plurality of user interface objects (e.g., objects 7306, 7302, and 7304, etc.) at the positions that are away from the first position that corresponds to the location of the user's hand 7202. In some embodiments, the audio output is a spatial audio output that appears to originate from a moving sound source that is attached to the plurality of user interface objects. In some embodiments, the audio output provides an indication of the direction of movement and final landing of the plurality of user interface objects at their settlement positions in the three-dimensional environment (e.g., settlement positions shown in FIG. 7D). In some embodiments, the plurality of user interface objects are settled at positions that are within a threshold distance (e.g., within one to five feet, within a comfortable viewing distance selected for the user, etc.) away from the virtual position of the user or the position of the viewpoint of the currently displayed view of the three-dimensional environment. In some embodiments, the threshold distance is selected based on the total number and/or size of the plurality of user interface objects that are to be displayed at the positions away from the first position that corresponds to the location of the hand of the user (e.g., at positions that do not move with the movement of the hand of the user). In some embodiments, the plurality of user interface objects displayed at the positions that are away from the first position that corresponds to the location of the user's hand (e.g., object 7306, 7302, 7304, etc. in FIG. 7D) are larger than their counterparts displayed at the first position that corresponds to the location of the user's hand (e.g., object 7306, 7302, 7304, etc. in FIG. 7C). In some embodiments, the computer system displays an animated transition that shows the expansion of the respective sizes of the plurality of user interface objects as the plurality of user interface objects move from the first position in the three-dimensional environment that corresponds to the location of the hand in the physical environment to their settlement positions away from the first position that corresponds to the location of the hand.

In some embodiments, while the plurality of user interface objects are displayed at the positions that are away from the first position that corresponds to the location of the user's hand (e.g., while the plurality of user interface objects are anchored to the environment, or the viewpoint, etc., and no longer anchored to the user's hand), the computer system detects movement of the hand that meets a different set of preset criteria (e.g., criteria for detecting a hand wave gesture, criteria for detecting a swipe gesture, etc.), and in response, the computer system moves the plurality of user interface objects from the positions that are away from the first position corresponding to the location of the user's hand, back to the first position that corresponds to the location of the user's hand. For example, in some embodiments, the computer system detects that the user's hand moving toward the user's face with the palm side is turned toward the user's face, the computer system redisplays the home user interface object at the first position that corresponds to the location at or near the user's hand, and ceases to display the plurality of user interface objects at the positions away from the first position that corresponds to the location of the user's hand.

In some embodiments, the home user interface object (e.g., user interface object 7306 in FIG. 7C) that is displayed at the first position in the three-dimensional environment that corresponds to the location at or near the user's hand (e.g., as shown in FIG. 7C) and the home user interface object (e.g., user interface object 7306 in FIG. 7D) that is displayed at a position in the three-dimensional environment that is away from the first position that corresponds to the location at or near the user's hand (e.g., as shown in FIG. 7D) are, optionally, displayed concurrently in the same view of the three-dimensional environment 7104 provided via the first display generation component. In some embodiments, the home user interface object displayed at the first position that corresponds to the location of the user's hand moves in the three-dimensional environment in accordance with the movement of the user's hand in the physical environment (e.g., independent of the movement of the user's head, person, or the movement of the first display generation component, etc. that does not cause movement of the hand); and while the home user interface object displayed at the position that is away from the first position that corresponds to the location of the user's hand moves in the three-dimensional environment in accordance with the movement of the user's head (e.g., translation, rotation, etc.) or the movement of the first display generation component (e.g., translation, rotation, etc.) in the physical environment (e.g., independent of the movement of the user's hand that does not cause movement of the first display generation component).

In some embodiments, when the home user interface object (e.g., object 7306) is displayed at the first position that corresponds to the location at or near the user's hand 7202 (e.g., as shown in FIG. 7C), a tap input that is directed to the hand 7202 can activate the home user interface object or a user interface object (e.g., object 7302, or 7304, etc.) within the home user interface object, and cause performance of a corresponding function in the three-dimensional environment. For example, in some embodiments, in accordance with a determination that the location of the tap input on the hand 7202 corresponds to the position of the home user interface object as a whole, the computer system displays the cluster of category icons at positions away from the first position that corresponds to the location of the user's hand. In some embodiments, in accordance with a determination that the location of the tap input on the hand corresponds to the position of a respective category icon (e.g., represented by object 7304 in FIG. 7C) within the home user interface object, the computer system displays a set of icons corresponding the respective category icon at positions away from the first position that corresponds to the location of the user's hand (e.g., in the manner analogous to the objects 7316 shown in FIG. 7K). In some embodiments, in accordance with a determination that the location of the tap input on the hand corresponds to the position of a respective icon for a respective computer-generated experience within the home user interface object, the computer system initiates the process for displaying the respective computer-generated experience in the three-dimensional environment. In some embodiments, home user interface object displayed at the first position that corresponds to the location of the user's hand can be activated by a user input directed to the user's hand 7202, without requiring corresponding user interface objects to be displayed at positions away from the first position that corresponds to the location of the user's hand.

In some embodiments, the plurality of user interface objects displayed at the positions away from the first position that correspond to the location of the user's hand cease to be displayed at those positions when the user moves by more than a threshold amount from the current location. For example, if the viewpoint of the currently displayed view of the three-dimensional environment has moved by an amount that causes the plurality of user interface objects to completely exit the current field of view provided by the first display generation component, the plurality of user interface objects ceases to be displayed at their respective positions even if those positions subsequently reenter the field of view provided by the first display generation component.

In some embodiments, the computer system displays a home user interface object (e.g., represented by user interface object 7306 in FIG. 7C) at a first position that corresponds to a location at or near the user's hand. In some embodiments, the home user interface object appears to float above the user's hand and does not obscure the representation 7202' of the user's hand 7202. In some embodiments, the home user interface object does not move or change orientation when the user's hand 7202 merely changes posture, without changing its overall location in the physical environment and without meeting the preset criteria (e.g., the criteria for detecting the flick gesture or toss gesture, etc.).

In some embodiments, when the plurality of user interface objects are displayed at the positions that are away from the first position that corresponds to the location of the user's hand, the computer system detects a user input (e.g., a tap input, a swipe input, a gaze input detected in conjunction with a tap or swipe input, etc.) that corresponds to a request to select a respective user interface object (e.g., a first application icon for launching a first application, a second application icon for launching a second application, a first avatar for a first user, a second avatar for a second user, a first icon for a first experience, a second icon for a second experience, etc.) of the plurality of user interface objects. In response to detecting the user input that corresponds to the request to select the respective user interface object, the computer changes a size (e.g., enlarging, shrinking, etc.) of the respective user interface object relative to one or more user interface objects of the plurality of user interface objects (e.g., other user interface objects that are not selected by the user input, other user interface objects that are in the same category as the respective user interface objects, etc.).

In some embodiments, the home user interface object displayed at the first position that corresponds to the location of the user's hand is dynamically resized in accordance with a change in hand posture of the user's hand 7202 that corresponds to a transition between an open posture and a closed posture of the user's hand 7202 (e.g., opening the hand to show the full palm or back of hand, closing the hand to form a fist or semi-fist, etc.). For example, the home user interface object (e.g., represented by object 7306 in FIG. 7C) and optionally its constituent objects (e.g., represented by objects 7302 and 7304 in FIG. 7C) expand in size in accordance with the opening movement of the user's hand 7202, and shrink in size in accordance with the closing movement of the user's hand 7202, in accordance with some embodiments.

FIGS. 7E-7H are block diagrams that illustrating using detection of a movement of a user's hand that meets first gesture criteria in conjunction with detection of a gaze input that is directed to a region of a three-dimensional environment that corresponds to a first user interface object (e.g., user interface object 7308 in FIGS. 7E-7H, or another user interface object, such as one of the user interface objects 7306, 7302, 7304 in FIGS. 7A-7D, and user interface objects 7306' 7302, 7304, 7310, 7316-*a* through 7316-*d*, 7318-*a* through 7318-*d* in FIGS. 7I-7M, etc.) for more than a first threshold amount of time $T_h$ (e.g., an amount of time that is greater than that required for merely detecting a gaze input directed to the region) to cause selection of the first user interface object, in accordance with some embodiments.

As shown in FIGS. 7E-7H, a three-dimensional environment (e.g., environment 7104, an environment as described with respect to FIGS. 7A-7D, another VR, AR, or XR environment, etc.) is displayed via a first display generation component (e.g., display generation component 7100, the first display generation component described with respect to FIGS. 7A-7D, other display generation components, etc.) in communication with a computer system (e.g., the computer system 101, the computer system described with respect to FIGS. 7A-7D, etc.). As shown in FIGS. 7E-7H, the currently displayed view of the three-dimensional environment 7104 includes one or more user interface objects (e.g., user interface object 7311, user interface object 7308, other user interface objects or virtual objects, etc.) displayed at various positions in the three-dimensional environment (e.g., positions that correspond to respective locations of physical objects or surfaces, positions that do not correspond to locations of physical objects and surfaces, etc.). In some embodiments, the user interface object 7308 shown in FIGS. 7E-7H is an object analogous to the home user interface object (e.g., user interface object 7306 in FIGS. 7A-7D, the user interface object 7306' in FIGS. 7I-7M, etc.) or a respective user interface object (e.g., user interface object 7302, user interface object 7304, one of the user interface objects 7316, one of the user interface objects 7318, etc. in FIGS. 7I-7M) of the plurality of user interface objects displayed at positions that are away from the first position that corresponds to the location of the user's hand, and have similar behaviors as those described with respect to FIGS. 7A-7D and FIGS. 7I-7M. In some embodiments, the behaviors of the user interface (e.g., the three-dimensional environment 7104 and the first user interface object, etc.) described with respect to FIGS. 7E-7H are also applicable to the user interface (e.g., the home user interface object and the plurality of user interface objects displayed at positions that are away from the first position that corresponds to the location of the user's hand, etc.), as described in FIGS. 7A-7D and 7I-7M. In some embodiments, the user interface object 7308 in FIGS. 7E-7H is different from the user interface object 7306, 7302, or 7304 in FIGS. 7A-7D, and/or the user interface objects 7306', 7302, 7304, 7310, 7316, 7318, etc. in FIGS. 7I-7M, and do not have all of the features of those objects. In some embodiments, the user interface object 7308 is displayed at a position that is away from the first position that corresponds to the location of the user's hand, and is optionally anchored to a portion of the physical environment, or fixed relative to the field of view provided by the first display generation component.

FIGS. 7E-7H, respectively, illustrate four different scenarios, where different outcomes result depending on which combination of conditions regarding the gaze input and the movement of the user's hand is met, in accordance with some embodiments. For example, in FIG. 7E, the movement of the user's hand 7202 does not meet the first gesture criteria (e.g., no movement, or not the movement that is required) and no gaze input is detected in the region corresponding to the first user interface object 7308; and as a result, the computer system does not select the first user interface object 7308. In FIG. 7F, the movement 7312 of the user's hand 7202 meets the first gesture criteria, but no gaze input is detected in the region corresponding to the first user interface object 7308; and as a result, the computer system does not select the first user interface object 7308. In FIG. 7G, the movement 7312 of the user's hand 7202 meets the first gesture criteria and the gaze input 7212 is detected in the region corresponding to the first user interface object 7308 (e.g., gaze is held in the region for at least the gaze detection threshold $T_0$), however, the gaze input 7212 has not been detected in the region for at least the first threshold amount of time $T_h$ (e.g., dwell time threshold) after the gaze is initially detected in the region; and as a result, the computer system does not select the first user interface object 7308. In FIG. 7H, the movement 7312 of the user's hand 7202 meets the first gesture criteria and the gaze input 7212 is detected in the region corresponding to the first user interface object 7308, and the gaze input 7212 has been detected in the region for at least the first threshold amount of time $T_h$ after the gaze is initially detected in the region (e.g., total time T that the gaze is detected in the region is greater than or equal to $T_0+T_h$); and as a result, the computer system selects the first user interface object 7308 in the three-dimensional environment. In some embodiments, for scenarios where the first user interface object 7308 is not selected, the computer system optionally performs other operations in the three-dimensional environment that are different from selection of the first user interface object 7308, in response to the detected input (e.g., in response to a combination of a movement of the hand that does not meet the first gesture criteria but meets some other criteria and absence of the gaze input directed to the first user interface object, a combination of a movement of the hand that meets the first gesture criteria and absence of a gaze input that is directed to the first user interface object, a combination of a movement of the hand that meets the first gesture criteria and a gaze input that is directed to the first user interface object for less than the first threshold amount of time, a combination of a movement that does not meet the first gesture criteria but meets some other criteria and a gaze input that is directed to the first user interface object for less than the first threshold amount of time, a combination of a movement that does not meet the first gesture criteria but meets some other criteria in conjunction with the gaze input that is directed to the first user input for more than the first threshold duration, etc.).

FIGS. 7E-7H show a computer system (e.g., device 101, or another computer system, etc.) that is in communication with a first display generation component (e.g., display generation component 7100, or another display generation component, etc.). In some embodiments, the first display generation component is a heads-up display. In some embodiments, the first display generation component is a head-mounted display (HMD). In some embodiments, the first display generation component is a standalone display, a touchscreen, a projector, or another type of display. In some embodiments, the computer system is in communication with one or more input devices, including cameras or other input devices that detect movement of the user's hand(s), movement of the user's body as whole, and/or movement of the user's head in the physical environment. In some embodiments, the one or more input devices detect the movement and the current postures, orientations, and positions of the user's hand(s), face, and body as a whole, etc. of the user. In some embodiments, the one or more input devices include an eye tracking component that detects location and movement of the user's gaze. In some embodiments, the first display generation component, and optionally, the one or more input devices and the computer system, are parts of a head mounted device (e.g., an HMD, a pair of goggles, etc.) that moves and rotates with the user's head in the physical environment, and changes the viewpoint of the user into the three-dimensional environment provided via the first display generation component. In some embodiments, the first display generation component is a heads-up display that does not move or rotate with the user's head or the user's body as a whole, but, optionally, changes the viewpoint of the user into the three-dimensional environment provided via the first display generation component in accordance with the movement of the user's head or body relative to the first display generation component. In some embodiments, the first display generation component can be moved and rotated by the user's hand relative to the physical environment or the user's head, and thereby changing the viewpoint of the user into the three-dimensional environment provided via the first displayed generation component in accordance with the movement of the first display generation component relative to the user's head or face or relative to the physical environment.

As shown in FIGS. 7E-7H, the computer system displays a view of a three-dimensional environment (e.g., environment 7104, a virtual three-dimensional environment, an augmented reality environment, a pass-through view of a physical environment, a camera view of a physical environment, etc.). In some embodiments, the three-dimensional environment is a virtual three-dimensional environment without a representation of a physical environment. In some embodiments, the three-dimensional environment is a mixed reality environment that is a virtual environment augmented by sensor data corresponding to the physical environment. In some embodiments, the three-dimensional environment is an augmented reality environment that includes one or more virtual objects and a representation of at least a portion of a physical environment (e.g., representations 7004' and 7006' of walls, representation 7008' of a floor, representation 7002' of a physical object, etc.) surrounding the first display generation component. In some embodiments, the representation of the physical environment includes a camera view of the physical environment. In some embodiments, the representation of the physical environment includes a view of the physical environment through a transparent or semitransparent portion of the first display generation component. In FIGS. 7E-7H, two user interface objects 7311 and 7308 are displayed at positions that are away from the first position in the three-dimensional environment 7104 that corresponds to the location of the user's hand 7202 (e.g., at positions that are anchored to the three-dimensional environment or the viewpoint, and that do not move in accordance with the movement of the hand in the physical environment).

In FIG. 7E, the computer system does not detect any gaze input from eyes 7206 of the user at the region that corresponds to the first user interface object 7308, e.g., because the line of sight of the eyes 7206 of the user is moving around in the three-dimensional environment (e.g., with a position that changes by more than a threshold amount within a threshold amount of time (e.g., a gaze detection time threshold $T_0$)) or because a gaze input is directed to a region of the three-dimensional environment that is outside of the region corresponding to the first user interface object 7308 (e.g., the gaze input is directed to the second user interface object 7311, the line of sight has less than a threshold amount of movement within the gaze detection time threshold, or the line of sight is confined in the region corresponding to the second user interface object 7311 for at least the gaze detection time threshold, the gaze is directed to a position that correspond to a location on the floor (e.g., directed to a region on the representation 7008' of the floor), the gaze is directed to a position on the representation 7002' of a physical object, etc. in the three-dimensional environment, etc.).

As shown in FIG. 7E, in some embodiments, the view of the three-dimensional environment 7104 does not include a representation of the hand 7202, or the representation of the hand 7202 may be outside of the currently displayed field of view provided by the first display generation component. In FIG. 7E, the computer system does not detect movement of the hand 7202 in the physical environment, or the computer system detects a movement of the hand that does not meet the first gesture criteria for selecting the first user interface object 7308. In some embodiments, the first gesture criteria include criteria for detecting a pinch gesture (e.g., movement of at least two fingers away from each other after making contact with each other, and/or movement of at least two fingers toward each other and make contact with each other, etc.), an in-air tap gesture, a tap gesture of one portion of a the hand on another part of the same hand, a tap gesture of one hand on another hand or surface, or a pinch and drag gesture, etc. As shown in FIG. 7E, the computer system, in accordance with a determination that a movement of the user's hand 7202 does not meet the first gesture criteria and a determination that a gaze input has not been detected in the region of the first user interface object 7308 for more than the first threshold amount of time (e.g., Th+$T_0$) that is greater than the gaze detection time threshold (e.g., $T_0$), does not select the first user interface object 7308 (e.g., the first user interface object 7308 remains unselected in FIG. 7E after the user input). In some embodiments, the first user interface object 7308 is a user interface object that, when activated, initiates display of a home menu, a plurality of user interface objects corresponding to a category or group, a home user interface object (e.g., a cluster of miniature representations of the plurality of user interface objects, a cluster of category icons for different categories of the plurality of user interface objects, etc.), etc. In some embodiments, the first user interface object 7308 represents a category icon, an application icon, an avatar of a user, an icon for starting a computer-generated experience, etc. that is displayed among a plurality of other selectable user interface objects of the same type or of different types.

In FIG. 7F, the computer system still does not detect any gaze input from eyes 7206 of the user in the region that corresponds to the first user interface object 7308, e.g., because the line of sight of the eyes 7206 of the user is moving around in the three-dimensional environment 7104 or because a gaze input is directed to a region of the three-dimensional environment that is outside of the region corresponding to the first user interface object 7308. In FIG. 7F, the computer system detects movement 7312 of the hand 7202 in the physical environment that meets the first gesture criteria for selecting the first user interface object 7308. As shown in FIG. 7F, the computer system, in accordance with a determination that the movement 7312 of the user's hand 7202 meets the first gesture criteria and a determination that a gaze input has not been detected in the region of the first user interface object 7308 for more than the first threshold amount of time (e.g., $T_0$+$T_h$) that is greater than the gaze detection time threshold (e.g., To), still does not select the first user interface object 7308 (e.g., the first user interface object 7308 remains unselected in FIG. 7F after the user input).

In FIG. 7F, the computer system does not detect any gaze input from eyes 7206 of the user in the region that corresponds to the first user interface object 7308, e.g., because the line of sight of the eyes 7206 of the user is moving around in the three-dimensional environment (e.g., with a position that changes by more than a threshold amount within a threshold amount of time (e.g., a gaze detection time threshold)) or because a gaze input is directed to a region of the three-dimensional environment that is outside of the region corresponding to the first user interface object 7308 (e.g., the gaze input is directed to the second user interface object 7311, the line of sight has less than a threshold amount of movement within the gaze detection time threshold, the line of sight is confined in the region corresponding to the second user interface object 7311 for at least the gaze detection time threshold, the gaze is directed to a position that corresponds to a location on the floor (e.g., directed to a region on the representation 7008' of the floor), or the gaze is directed to a position on the representation 7002' of a physical object, etc. in the three-dimensional environment).

As shown in FIG. 7G, the computer system detects movement 7312 of the hand 7202 in the physical environment that meets the first gesture criteria for selecting the first user interface object 7308. As shown in FIG. 7G, the computer system detects that the gaze input 7212 of the eyes 7206 has moved to the region corresponding to the first user interface object 7308 (e.g., gaze is maintained in the region for at least the gaze detection time threshold $T_0$) at a time within a threshold window of at least a portion of the movement 7312. But the gaze input 7212 has not been detected at the region of the first user interface object 7308 for at least the first threshold amount of time yet (e.g., the movement 7312 is completed before the gaze has been held within the region of the first user interface object 7308 for at least the first threshold amount of time (e.g., $T_0$+$T_h$), or the gaze moved away from the region of the first user interface object 7308 before the gaze has been held within the region of the first user interface object 7308 for at least the first threshold amount of time, etc.). As shown in FIG. 7G, the computer system, in accordance with a determination that the movement 7312 of the user's hand 7202 meets the first gesture criteria and a determination that a gaze input 7212 has not been detected in the region of the first user interface object 7308 for more than the first threshold amount of time (e.g., $T_0$+$T_h$) that is greater than the gaze detection time threshold (e.g., $T_0$), does not select the first user interface object 7308 (e.g., the first user interface object 7308 remains unselected in FIG. 7G after the user input). In some embodiments, the computer system optionally provides some visual feedback to indicate the location of the gaze input 7212 when the gaze input is detected in the region of the first user interface object 7308, at a time before the gaze input has been held within the region for at least the first threshold amount of time but the first user interface object 7308 cannot yet be considered selected by the user's input. In some embodiments, the first user interface object 7308 is a user interface object that, when selected, initiates display of a home menu, a plurality of user interface objects within a category of icons, a cluster of category icons for different categories of the plurality of user interface objects, an application user interface, a communication session with a user, a computer-generated experience, etc.

As shown in FIG. 7H, the computer system detects movement 7312 of the hand 7202 in the physical environment that meets the first gesture criteria for selecting the first user interface object 7308. As shown in FIG. 7H, the computer system detects that the gaze input 7212 of the eyes 7206 has moved to the region corresponding to the first user interface object 7308 at a time within a threshold window of at least a portion of the movement 7312, and the gaze input 7212 has remained in the region of the first user interface object 7308 for at least the first threshold amount of time (e.g., the movement 7312 is completed after the gaze has been held within the region of the first user interface object 7308 for at least the first threshold amount of time, or the gaze remained in the region of the first user interface object 7308 for at least the first threshold amount of time and the movement 7312 has been started or completed by the time that the gaze has been held in the region of the first user interface object 7308 for at least the first threshold amount of time, etc.). As shown in FIG. 7H, the computer system, in accordance with a determination that the movement 7312 of the user's hand 7202 meets the first gesture criteria and a determination that the gaze input 7212 has been detected in the region of the first user interface object 7308 for more than the first threshold amount of time (e.g., $T_0+T_h$) that is greater than the gaze detection time threshold (e.g., $T_0$), selects the first user interface object 7308 (e.g., the first user interface object 7308 becomes selected in FIG. 7H after the user input). In some embodiments, the computer system optionally provides some visual feedback to indicate the selection of the first user interface object 7308 (e.g., the first user interface object 7308 is shown as highlighted in FIG. 7H relative to its unselected state shown in FIGS. 7E-7G).

In FIGS. 7E-7H, the first user interface object 7308 and the second user interface object 7311 are respectively located at a first position and a second position in the three-dimensional environment. In some embodiments, the first user interface object is a first application icon for activating a first application, a first avatar of a first user for starting a communication session with the first user, a first icon for starting a first computer-generated experience, a first interactive control, a first selectable menu item, etc.; and the second user interface object is a second application icon for activating a second application, a second avatar of a second user for starting a communication session with the second user, a second icon for starting a second computer-generated experience, a second interactive control, a second selectable menu item, etc. In some embodiments, the first user interface object and the second user interface objects are objects of the same type, or objects that can be activated or selected in the same manner. In some embodiments, the first user interface object and the second user interface objects are objects of different types and can be activated or selected in different manners (e.g., the second user interface object can be selected without requiring the gaze input to be held in the region of the second user interface objects for more than the first threshold amount of time (e.g., more than the gaze detection time threshold is sufficient)).

In some embodiments, in accordance with selection of the first user interface object 7308, the computer system performs a first operation corresponding to the first user interface object 7308 without detecting another subsequent input. For example, the computer system performs the first operation, optionally, immediately when the first gesture criteria and the first gaze criteria are both met. In some embodiments, the first user interface object is a first application icon and the first operation is launching the first application corresponding to the first application icon. In some embodiments, the first user interface object is a first avatar corresponding to a first user, and the first operation is initiating a process for establishing a communication session with the first user. In some embodiments, the first user interface object is an icon for starting a computer-generated experience, and the first operation is starting the first computer-generated experience in the three-dimensional environment or initiating the process for displaying the first computer-generated experience in the three-dimensional environment. In some embodiments, the first user interface object is a first category icon in a cluster of category icons of a home user interface, and the first operation is displaying a first plurality of icons (e.g., application icons, avatars of user, icons for experiences, etc.) corresponding to the first category icon (and not to the second category icon).

In some embodiments, in accordance with selection of the first user interface object 7308, the computer system performs a first operation corresponding to a subsequent user input detected with respect to the first user interface object (e.g., the selected first user interface object 7308 becomes the target or focus of the first operation corresponding to the subsequent user input. For example, while the first user interface object 7308 remains selected (e.g., selected in response to the first gesture criteria and the first gaze criteria having been met in conjunction with each other), the computer system detects a first user input that corresponds to a request to activate a respective one of the first user interface object and the second user interface object (e.g., the user input is a second hand gesture, a voice command, a confirmation input received by an input device, etc., that can be used to activate either the first user interface object or the second user interface object when said user interface is in a selected state). In response to detecting the first user input, the computer system performs a first operation corresponding to the first user interface object (e.g., the first user interface object is activated instead of the second user interface object because the first user input is detected while the first user interface object is selected and the second user interface object is not selected).

In some embodiments, the current location of the gaze input 7212 is visually indicated in the three-dimensional environment, for example, by a position indicator such as a cursor, a crosshair, a spotlight, a visual effect, etc. that changes position in accordance with movement of the gaze input. In some embodiments, the position indicator is displayed in response detection of a gaze input (e.g., when the gaze detection time threshold is met) before the gaze input has been held at a respective region corresponding to a user interface object for at least the first threshold amount of time. In some embodiments, the position indicator is displayed at all times even before a gaze input has been detected (e.g., before the light of sight is held substantially stationary for at least the gaze detection time threshold).

In some embodiments, the first user interface object 7308 is a home user interface object that includes a cluster of category icons for different categories of user interface objects (e.g., a first category for application icons, a second category for avatars of users, a third category for icons of XR experiences, etc.). In some embodiments, the first gesture criteria include criteria for detecting a pinch and drag gesture to switch current selection of the category icon among the cluster of category icons. For example, in some embodiments, before the movement of the hand meets the first gesture criteria and/or before the gaze input meets the first gaze criteria, a first set of icons corresponding to a first category icon are displayed in the three-dimensional environment (e.g., the first category icon is in a selection region of the home user interface object, or a selection object is on the first category icon) (e.g., as illustrated in FIG. 7K, where the first category icon is object 7304), and in accordance with the movement of the hand that meets the first gesture criteria detected in conjunction with the gaze input having been detected on the first user interface object for at least the first threshold amount of time, the computer system moves the first set of icons (e.g., objects 7316-a through 7316-d in FIG. 7K) corresponding to the first category icons (e.g., icon 7304 in FIG. 7K) out of view or to a less prominent position in the three-dimensional environment, and displays a second set of icons (e.g., objects 7318-a through 7318-d in FIG. 7M) corresponding to a second category icon (e.g., as illustrated in FIG. 7M, where the second category icon is object 7310 which is represented by object 7308 in FIG. 7H) in the three-dimensional environment at the positions previously occupied by the first set of icons (and the second category icon is now in a selection region of the home user interface object (e.g., as shown in FIG. 7M), or the selection object is moved to the second category icon, etc.).

In some embodiments, the first user interface object 7308 includes scrollable content (e.g., multiple rows, columns, pages, continuous content that cannot all be displayed at the same time, a scene that extends beyond the currently displayed view, etc.), and the movement of the user's hand that meets the first gesture criteria includes a movement of the hand as a whole while the hand maintains a predefined posture (e.g., two or more fingers in contact with each other, index finger raised while other fingers are curled up, fingers forming a grasp posture, etc.). In accordance with a determination that the first user interface object 7308 has been selected, the computer system scrolls the scrollable content displayed within the first user interface object in accordance with the movement of the hand as a whole (e.g., scrolling through different pages, portions, subsets of the text, images, user interface objects, controls, icons, avatars, etc. displayed within the first user interface object). In some embodiments, during the movement of the hand as a whole, the gaze input does not need to be maintained on the first user interface object 7308, as long as the first user interface object has already been selected in response to earlier portion of the movement of the hand (e.g., to form the pinch gesture) and the earlier detected gaze input. In some embodiments, the first user interface object 7308 represents the plurality of selectable user interface objects in a group or category (e.g., the group of user interface objects corresponding to the group icon 7304 (e.g., user interface objects 7316-*a* through 7316-*d*) in FIG. 7K, the group of user interface objects corresponding to the group icon 7310 (e.g., user interface objects 7318-*a* through 7318-*d*) in FIG. 7M, etc.), and the plurality of selectable user interface objects are scrollable in response to a movement of the hand as a whole while the hand maintains a predefined posture, after the plurality of selectable user interface objects are selected as a group in accordance with the method described in FIG. 7H.

In some embodiments, the first user interface object 7308 is a virtual object that can be moved from one position to another position in the three-dimensional environment. In some embodiments, the virtual object includes an avatar or representation of a second user during a communication session between the user of the computer system and the second user. In some embodiments, the virtual object includes a user interface of an outgoing communication request to establish the communication session between the second user and the user of the computer system. In some embodiments, the first user interface object is a launch pad that includes frequently used controls and/or icons for launching applications, experiences, and/or communication sessions. In some embodiments, after the user's gaze has dwelled on the first user interface object for at least the first threshold amount of time in conjunction with the user's hand forming the pinched posture, the first user interface object becomes selected, and subsequent movement of the user's hand as a whole while the first user interface object is selected causes the first user interface object to be moved from a first position to a second position different from the first position. In some embodiments, the first user interface object 7308 represent one of the user interface objects 7324, 7326, 7333 in FIGS. 7N-7O, user interface object 7342 in FIG. 7U, for example.

In some embodiments, e.g., as described with respect to FIGS. 7E-7H, the movement 7312 of the hand of the user that meets the first gesture criteria occurs in a region in the physical environment that is away from and outside of the region in the physical environment that corresponds to the region of the first user interface object 7312 in the three-dimensional environment. In some embodiments, the movement of the hand of the user that meets the first gesture criteria optionally meets the first gesture criteria irrespective whether the hand is within or outside of the region in physical environment that corresponds to the region of the first user interface object 7308 in the three-dimensional environment. In other words, the gesture that is used to select the first user interface object 7308 and perform the first operation is optionally made far away from the location that corresponds to the region occupied by the first user interface object 7308, or is optionally made near or at the location that corresponds to the region occupied by the first user interface object 7308. In some embodiments, the gesture that is used to select the first user interface object 7308 and perform the first operation is, optionally, made outside of the field of view provided by the first displayed generation component. In some embodiments, the gesture that is used to select the first user interface object 7308 and perform the first operation is, optionally, made on a side of the display generation component 7100 that is opposite to the region that is represented in the view of the three-dimensional environment and includes the first user interface object 7308.

In some embodiments, the computer system provides visual feedback in response to the detected gaze input 7212 being directed to a respective user interface object in the three-dimensional environment, irrespective of whether movement of the hand of the user is detected or whether the movement meets the first gesture criteria. For example, in response to detecting a gaze input directed to the first user interface object 7308 in the three-dimensional environment, the computer system changes a value of a first visual property of the first user interface object (e.g., expands or shrinks the size, changing the color or luminance, shifting the position, etc. of the first user interface object 7308), e.g., relative to the second user interface object (e.g., object 7311) and other user interface objects in the three-dimensional environment. In some embodiments, the computer system displays the visual feedback in accordance with a determination that the gaze input has been maintained in the region of the first user interface object for at least the first amount of time that is greater than the gaze detection time threshold (e.g., meets a gaze and dwell requirement), and does not display the visual feedback if the gaze input has not been maintained in the region of the first user interface object for at least the first amount of time (e.g., even though it has been detected there for more than the gaze detection time threshold $T_0$).

In some embodiments, the computer system provides the visual feedback with respect to the first user interface object 7308 (e.g., change the value of the first display property of the first user interface object) in response to detecting the movement 7312 of the hand that meets the first gesture criteria while a gaze input 7212 is being directed to the first user interface object 7308, even though the gaze input has not been held in the region of the first user interface object for at least the first amount of time that is greater than the gaze detection time threshold. In some embodiments, the first user interface object 7308 becomes selected when the gaze input 7212 remains in the region of the first user interface object 7308 until the gaze input has been detected in the region of the first user interface object for at least the first amount of time.

In some embodiments, the computer system provides different sets of feedback in response to different subsets of (a) the detection of gaze at the region of the first user interface object 7308, (b) the detection of maintenance or dwell of a detected gaze input in the region of the first user interface object 7308 for at least the first amount of time, and (c) the movement of the hand that meets the first gesture criteria. For example, in accordance with a determination that the first gesture criteria (c) and the first gaze criteria (b) are both met (e.g., the scenario shown in FIG. 7H), the computer system providing a first visual feedback in the three-dimensional environment; and in accordance with a determination that the first gesture criteria are met (c) and the first gaze criteria (b) are not met (e.g., the scenarios shown in FIG. 7F, and FIG. 7G, respectively), the computer system providing second visual feedback in the three-dimensional environment that is different from the first visual feedback.

FIGS. 7I-7M are block diagrams illustrating switching between different groups of selectable user interface objects in response to a user input, where a first group of selectable user interface objects is reduced in visual prominence as it moves away from a first position in the three-dimensional environment, while a second group of selectable user interface objects is increased in visual prominence as it moves toward the first position in the three-dimensional environment, in accordance with some embodiments.

In some embodiments, the different groups of selectable user interface objects correspond to different categories of icons in a home user interface or launch pad for computer-generated experiences, and the first position includes a preset region of the three-dimensional environment for displaying a currently selected category of icons. In some embodiments, as one group of icons moves away from the preset region, another group of icons, optionally, moves toward and into the preset region and become the currently selected category of icons. In some embodiments, the currently selected category of icons not only occupy the preset region in the three-dimensional environment, but also have greater visual prominence than other categories of icons of the home user interface. In some embodiments, during the movements of the different categories of icons, at least two categories of icons are concurrently displayed in the currently displayed view of the three-dimensional environment, optionally with different levels of visual prominence.

As shown in FIGS. 7I-7M, a three-dimensional environment (e.g., environment 7104, an environment as described with respect to FIGS. 7A-7D and/or FIGS. 7E-7H, another VR, AR, or XR environment, etc.) is displayed via a display generation component (e.g., display generation component 7100, the first display generation component described with respect to FIGS. 7A-7D and/or FIGS. 7E-7H, other display generation component, etc.) in communication with a computer system (e.g., the computer system 101, the computer system described with respect to FIGS. 7A-7D and/or 7E-7H, etc.). As shown in FIGS. 7I-7M, the currently displayed view of the three-dimensional environment 7104 includes one or more user interface objects (e.g., user interface object 7306', user interface object 7302, 7304, 7310, etc. that are constituents of the user interface object 7306', other user interface objects or virtual objects, etc.) displayed at various positions in the three-dimensional environment 7104 (e.g., positions that correspond to respective locations of physical objects or surfaces, positions that do not correspond to locations of physical objects and surfaces, etc.). In some embodiments, the user interface objects 7306' shown in FIGS. 7I-7J is an object analogous to the user interface object 7306 shown in FIG. 7C) displayed at a position that corresponds to a location at or near the hand 7202 of the user, and has analogous behaviors as the user interface object 7306 in FIG. 7C. In some embodiments, the user interface object 7306' shown in FIGS. 7K-7M is analogous to the user interface object 7306 displayed at a position that is away from the position that corresponds to the location at or near the user's hand 7202 in FIG. 7D and has analogous behaviors as the user interface object 7306 in FIG. 7D. In some embodiments, the user interface objects 7302, 7304, and 7310 shown in FIGS. 7K-7M have behaviors similar to that of object 7308 described with respect to FIG. 7H. In some embodiments, the user interface object 7306' (e.g., as shown in FIGS. 7K-7M) is a rotatable cluster of category icons represented by user interface objects 7302, 7304, and 7310 inside the user interface object 7306'. In some embodiments, the behaviors of the user interface (e.g., the three-dimensional environment 7104 and the user interface objects 7306', 7302, 7304, 7310, etc.) described with respect to FIGS. 7I-7M are also applicable to the user interface as described in FIGS. 7A-7D and/or FIGS. 7E-7H.

FIGS. 7I-7K illustrate an example scenario where the user interface object 7306' is initially displayed at a position that is corresponds to the location at or near the user's hand 7202 (e.g., in FIGS. 7I and 7J), and then displayed at a position that is away from the position that corresponds to the location that is at or near the location of the user's hand 7202 (e.g., in FIG. 7K), in accordance with some embodiments. In some embodiments, the transition between displaying the user interface object 7306' in FIGS. 7I and 7J and displaying the enlarged version of the user interface object 7306' in FIG. 7K is analogous to the manner as described with respect to user interface object 7306 in FIGS. 7C-7D. FIGS. 7K-7M illustrate an example scenario where the user interface object 7306' is selected and rotated, and correspondingly, a first group of selectable user interface objects 7316 (e.g., 7316-a through 7316-d)) are moved away from a preset region of the three-dimensional environment 7104 and ceased to be displayed, while a second group of selectable user interface objects 7318 (e.g., 7318-a through 7318-d) are moved to the preset region of the three-dimensional environment from outside of the currently displayed view of the three-dimensional environment. In FIG. 7L, it is shown that the first group of selectable user interface objects 7316 and the second group of selectable user interface objects 7318 are concurrently displayed for at least a portion of the time that the first group of selectable user interface objects 7316 and the second group of selectable user interface objects 7318 are moving relative to the preset region of the three-dimensional environment.

FIGS. 7I-7M show a computer system (e.g., device 101, or another computer system, etc.) that is in communication with a first display generation component (e.g., display generation component 7100, or another display generation component, etc.). In some embodiments, the first display generation component is a heads-up display. In some embodiments, the first display generation component is a head-mounted display (HMD). In some embodiments, the first display generation component is a standalone display, a touchscreen, a projector, or another type of display. In some embodiments, the computer system is in communication with one or more input devices, including cameras or other input devices that detect movement of the user's hand(s), movement of the user's body as whole, and/or movement of the user's head in the physical environment. In some embodiments, the one or more input devices detect the movement and the current postures, orientations, and positions of the user's hand(s), face, and body as a whole, etc. of the user. In some embodiments, the one or more input devices include an eye tracking component that detects location and movement of the user's gaze. In some embodiments, the first display generation component, and optionally, the one or more input devices and the computer system, are parts of a head-mounted device (e.g., an HMD, a pair of goggles, etc.) that moves and rotates with the user's head in the physical environment, and changes the viewpoint of the user into the three-dimensional environment provided via the first display generation component. In some embodiments, the first display generation component is a heads-up display that does not move or rotate with the user's head or the user's body as a whole, but, optionally, changes the viewpoint of the user into the three-dimensional environment provided via the first display generation component in accordance with the movement of the user's head or body relative to the first display generation component. In some embodiments, the first display generation component can be moved and rotated by the user's hand relative to the physical environment or the user's head, and thereby changing the viewpoint of the user into the three-dimensional environment provided via the first displayed generation component in accordance with the movement of the first display generation component relative to the user's head or face or relative to the physical environment.

As shown in FIGS. 7I-7M, the computer system displays a view of a three-dimensional environment (e.g., environment 7104, a virtual three-dimensional environment, an augmented reality environment, a pass-through view of a physical environment, a camera view of a physical environment, etc.). In some embodiments, the three-dimensional environment is a virtual three-dimensional environment without a representation of a physical environment. In some embodiments, the three-dimensional environment is a mixed reality environment that is a virtual environment augmented by sensor data corresponding to the physical environment. In some embodiments, the three-dimensional environment is an augmented reality environment that includes one or more virtual objects and a representation of at least a portion of a physical environment (e.g., representations 7004' and 7006' of walls, representation 7008' of a floor, representation 7002' of a physical object, etc.) surrounding the first display generation component. In some embodiments, the representation of the physical environment includes a camera view of the physical environment. In some embodiments, the representation of the physical environment includes a view of the physical environment through a transparent or semitransparent portion of the first display generation component.

In FIG. 7I, the computer system displays a user interface object 7306' at a position that corresponds to the location at or near the hand 7202 of the user. In some embodiments, the user interface object 7306' is displayed in response to a preset hand gesture or posture (e.g., turning the hand to show a preset side of the face toward the face of the user, moving the hand toward the face of the user, moving the hand toward the face of the user with a preset side of the hand facing toward the user's face, etc.). In some embodiments, the computer system displays the user interface object 7306' at the position that corresponds to the location at or near the hand 7202 of the user in accordance with a determination that a gaze input (e.g., a gaze input 7214, or another gaze input, etc.) is detected to the region in the three-dimensional environment 7104 that corresponds to a location of the hand 7202 of the user in the physical environment. In some embodiments, the computer system displays the user interface object 7306' at the position that corresponds to the location at or near the hand 7202 of the user in accordance with a determination that a gaze input (e.g., a gaze input 7214, or another gaze input, etc.) is detected to the region in the three-dimensional environment that corresponds to a location of the hand of the user in the physical environment while the hand of the user has a preset posture or has met preset gesture criteria.

In FIGS. 7J, while the user interface object 7306' is displayed, the computer system detects movement 7209 of the hand 7202 in the physical environment that meets the preset criteria for displaying the user interface object 7306' at a position that is away from the position corresponding to the location of the user's hand. In some embodiments, as shown in FIG. 7K, the user interface object 7306' is displayed at the position that is away from the position that corresponds to the location of the user's hand. In some embodiments, the user interface object 7306' is displayed at the position that is away from the position that corresponds to the location of the user's hand in accordance with the manner described with respect to FIGS. 7C-7D. In some embodiments, the user interface object 7306' is displayed at the position that is away from the position that corresponds to the location of the user's hand in accordance with a manner different from that described with respect to FIGS. 7C-7D. In some embodiments, a copy of the user interface object 7306' remains displayed at the position that corresponds to the location of the user's hand, while an enlarged version of the user interface object 7306' is displayed at the position that is away from the position that corresponds to the location of the user's hand.

In FIG. 7K, a first group of selectable user interface objects 7316 (e.g., 7316-*a* through 7316-*d*, and optionally, more objects in the group that can be scrolled into view with a scroll input, etc.) corresponding to the user interface object 7304 are displayed in a preset region of the three-dimensional environment 7104 at positions that are away from the position that corresponds to the location of the user's hand 7202. In some embodiments, the first group of selectable user interface objects 7316 are automatically selected for display by the computer system in accordance with preset criteria (e.g., the first group of selectable user interface objects are the last displayed group among different groups of selectable user interface objects corresponding to the different user interface objects included in the user interface object 7306', or the first group is a default or favorite group of the user, etc.). In some embodiments, the first group of selectable user interface objects 7316 are selected for display by the computer system in accordance with user's selection (e.g., a gaze input that is directed to the user interface object 7304 for at least the first threshold amount of time, a tap input at a location on the hand that corresponds to the user interface object 7304, an in-air tap input in conjunction with a gaze input directed to the user interface object 7304, etc.).

FIG. 7K illustrates that, while the first group of selectable user interface objects 7316 corresponding to the user interface object 7304 are displayed at the preset region in the three-dimensional environment 7104 (e.g., a region that is in the center of the field of view, a region that is near the bottom edge region of the field of view, a region that is along the top edge of the field of view, etc.), the computer system detects a user input that corresponds to a request to display a second group of selectable user interface objects from the multiple different groups of selectable user interface objects in the preset region of the three-dimensional environment, where the second group of selectable user interface object 7138 corresponds to the user interface object 7310 (e.g., the next group in a sequential listing of groups, a next group in the movement direction specified by the user input, etc.). In some embodiments, as shown in FIG. 7K, the user input includes a movement 7314 of the hand 7202 that is detected in conjunction with a gaze input 7216 directed to the user interface object 7310. In some embodiments, the computer system requires the movement 7314 of the hand to meet the first gesture criteria described with respect to FIGS. 7A-7H in order to select the user interface object 7310 and display the second group of selectable user interface object 7138 at the preset region of the three-dimensional environment. In some embodiments, the computer system requires the gaze input 7216 to be held in the region of the user interface object 7306', or in the region of the user interface object 7310, or in the region of the 7316 for at least the first amount of time (e.g., $T_0+T_h$) greater than the gaze detection time threshold in order to select the user interface object 7310 and display the second group of selectable user interface object 7318 at the preset region of the three-dimensional environment.

As shown in FIGS. 7K-7M, in response to detecting the user input that corresponds to a request to display the second group of selectable user interface objects at the preset region in the three-dimensional environment (e.g., the gaze input 7216 in conjunction with the movement 7314 of the hand), the computer system moves the first group of selectable user interface objects 7316 in the three-dimensional environment 7104 away from the preset region in the three-dimensional environment (e.g., toward the edge of the field of view, farther away from the viewpoint of the currently displayed view of the three-dimensional environment, etc.). In conjunction with moving the first group of selectable user interface objects 7316 away from preset region of the three-dimensional environment, the computer system also reduces the visual prominence of the first group of selectable user interface objects 7316 in the three-dimensional environment as the first group of selectable user interface objects are moved away from the first position in the three-dimensional environment (e.g., by ceasing to display the first group of selectable user interface objects, and/or reducing the size, clarity, color saturation, brightness, etc. of the first group of selectable user interface objects, etc.). In response to detecting the user input that corresponds to the request to display the second group of selectable user interface objects 7318 at the preset region in the three-dimensional environment, the computer system also moves the second group of selectable user interface objects 7318 (e.g., 7318-a through 7318-d, and optionally, more objects that can be brought into view with a scroll input, etc.) in the three-dimensional environment 7104 toward the preset region in the three-dimensional environment and increases the visual prominence of the second group of selectable user interface objects 7104 as the second group of selectable user interface object are moved to the first position in the three-dimensional environment. In some embodiments, the computer system brings the second group of selectable user interface objects 7318 into the currently displayed view of the three-dimensional environment from outside of the field of view, brings the second group of selectable user interface object 7318 closer to the viewpoint of the currently displayed view of the three-dimensional environment, and/or increases the size, clarity, color saturation, brightness, etc. of the second group of user interface objects 7318 (if previously displayed with reduced size, clarity, color saturation, brightness, etc.), to increase to visual prominence of the second group of selectable user interface objects 7318.

In some embodiments, as shown in FIG. 7L, the movement of the first group of selectable user interface objects 7316 and the movement of the second group of selectable user interface objects 7318 are performed concurrently, and the first group of selectable user interface objects 7316 and the second group of selectable user interface objects 7318 are displayed concurrently in the first view of the three-dimensional environment for at least a portion of the time that the first group of selectable user interface objects 7316 is moving in the three-dimensional environment and for at least a portion of the time that the second group of selectable user interface 7318 is moving in the three-dimensional environment.

In some embodiments, only one group of selectable user interface objects is displayed in the currently displayed view of the three-dimensional environment 7104 at a time. For example, in some embodiments, when the first group of selectable user interface objects 7316 is displayed at the preset region in the three-dimensional environment 7104 in FIG. 7K, the second group of selectable user interface objects 7318 is not concurrently displayed in the three-dimensional environment. In some embodiments, the preset region is in a central portion or another visually prominence position (e.g., an area to which the user's gaze or focus is directed, a central portion of a preset area of the field of view (e.g., the upper right quadrant, the lower left quadrant, etc.), etc.) in the field of view provided via the first display generation component.

In some embodiments, the user interface objects 7302, 7304, and 7310 in the user interface object 7306' are group representations for the different groups of selectable user interface objects that can be displayed in the preset region in the three-dimensional environment. In some embodiments, the user interface objects 7302, 7304, and 7310 are persistently displayed in the three-dimensional environment 7104, when different groups of selectable objects are selectively displayed in the preset region. As shown in FIG. 7K, the user interface object 7306' including the group representations (e.g., objects 7302, 7304, and 7310) of all three groups of selectable user interface objects is displayed in the three-dimensional environment 7104, even though only the first group of selectable user interface objects 7316 corresponding to the user interface object 7304 is displayed in the preset region of the three-dimensional environment 7104. In FIG. 7M, the user interface object 7306' including the group representations (e.g., objects 7302, 7304, and 7310) of all three groups of selectable user interface objects remains displayed in the three-dimensional environment, even though only the second group of selectable user interface objects 7318 corresponding to the user interface object 7310 is displayed in the preset region of the three-dimensional environment.

In some embodiments, the user input that corresponds to a request to display the second group of selectable user interface objects 7318 in the preset region in the three-dimensional environment includes a selection input (e.g., a tap, a swipe, a pinch, a voice command, etc.) directed to the user interface object 7310 in FIG. 7K which is a group representation of the second group of selectable user interface objects 7318.

In some embodiments, the user interface object 7306' is a rotatable user interface object in which the user interface objects 7302, 7304, and 7310 can be rotated or scrolled through a sequence of cyclic positions (e.g., like a carousel, or circular menu, etc.). In some embodiments, the user interface object 7306' includes a movable selection object that can be moved in response to user input sequentially through the user interface objects 7302, 7304, and 7310. In some embodiments, the user input includes a gaze input directed to the user interface object 7306', while a pinch and drag input rotates the user interface object 7306' to cause the user interface object 7304 to move away from a selection position and the user interface object 7310 to move into the selection position, or while a pinch and drag input moves the selection object from the user interface object 7304 to the user interface object 7310. In some embodiments, the user input includes a gaze input (or a gaze input that meets a gaze and dwell time threshold) directed to the user interface object 7310, while a preset gesture (e.g., a tap gesture, a pinch gesture, a swipe gesture, etc.) causes the user interface object 7310 to be selected, and the user interface object 7304 to be deselected.

In some embodiments, while a respective group of user interface objects (e.g., the first group of selectable user interface objects 7316 in FIG. 7K, the second group of selectable user interface objects 7318 in FIG. 7M, etc.) is displayed at the preset region of the three-dimensional environment 7104, the computer system detects a user input directed to the group representation of the respective group of user interface objects (e.g., user interface object 7304 for the first group of selectable user interface objects 7316 in FIG. 7K, user interface object 7310 for the second group of selectable user interface objects 7318 in FIG. 7M, etc.), the computer system, in accordance with a determination that the user input meets preset criteria (e.g., criteria for detecting a tap input, criteria for detecting a double tap input, criteria for detecting a pinch gesture, etc.), ceases to display the respective group of selectable user interface objects in the preset region of the three-dimensional environment, without replacing it with another group of selectable user interface objects. For example, the user input causes a currently selected group representation to toggle from the selected state to the unselected state, without selecting another group representation.

In some embodiments, the computer system changes the appearance of the group representation for the group of selectable user interface objects currently displayed at the preset region, relative to other group representations, to indicate which group of selectable user interface objects is the currently selected group. For example, in some embodiments, as shown in FIG. 7K, while displaying the first group of selectable user interface objects 7316 in the preset region in the three-dimensional environment, the computer system displays the first group representation (e.g., user interface object 7304) with greater visual prominence (e.g., with a larger size, with a greater brightness, with a greater level of details, at a more prominent position, at a position of the selection object, etc.) than the second group representation (e.g., user interface object 7310) and other group representations (e.g., user interface object 7302). As shown in FIG. 7M, while displaying the second group of selectable user interface objects 7318 in the preset region in the three-dimensional environment, the computer system displays the second group representation (e.g., user interface object 7310) with greater visual prominence (e.g., with a larger size, with a greater brightness, with a greater level of details, at a more prominent position, at a position of the selection object, etc.) than the first group representation (e.g., user interface object 7304) and other group representations (e.g., user interface object 7302).

In some embodiments, the computer system expands the user interface object 7306' or moves the user interface object 7306' toward the viewpoint of the currently view of the three-dimensional environment 7104 in response to detecting the gaze input 7216 directed to the user interface object 7306', as shown in FIG. 7K (e.g., user interface object 7306' optionally appears bigger and closer to the viewpoint in FIG. 7K, as compared to FIGS. 7L and 7M, when gaze is detected on the user interface object 7306 in FIG. 7K).

In some embodiments, the different groups of selectable user interface objects that can be displayed in the preset region of the three-dimensional environment, and the group representations included in the user interface object 7306' are for at least two of a first group of selected user interface objects, a second group of selected user interface objects, and a third group of selected user interface objects. In some embodiments, the first group of selectable user interface objects correspond to different applications (e.g., are application icons) where, when a respective user interface object from the first group of selectable user interface objects is selected in accordance with first criteria (e.g., criteria for detecting a tap input, a pinch input, etc.; criteria for activating the default function of the user interface object corresponding to a respective application, etc.), the computer system displays a corresponding application in the three-dimensional environment (e.g., displaying a default starting user interface or environment of the application, displaying a user interface to acquire necessary credential information to start the application, etc.). In some embodiments, the second group of selectable user interface objects correspond to different users (e.g., are user avatars, contact information, telephone numbers, user IDs, entity names, etc.) where, when a respective user interface object from the second group of selectable user interface objects is selected in accordance with the first criteria, the computer system initiates a process to establish communication with one or more corresponding users in the three-dimensional environment (e.g., establishing a default communication session, displaying a user interface for selecting a communication mode of the communication session from multiple available communication modes, displaying a user interface to obtain parameters values for starting a communication session, etc.). In some embodiments, the third group of selectable user interface objects correspond to different computer-generated experiences (e.g., different AR experiences, different VR experiences, system-level AR experiences, system-level VR experiences, etc.) wherein, when a respective user interface object from the third group of selectable user interface objects selected in accordance with the first criteria, the computer system initiates a process to display a corresponding computer-generated experience in the three-dimensional environment (e.g., an augmented reality atmosphere that changes lighting of a physical environment of the physical environment or a virtual environment that includes an immersive or partially immersive simulated three-dimensional space).

In some embodiments, the computer system allows the user to switch between different groups of user interface objects by providing a gaze input directed to different locations on the hand that correspond to different ones of the user interface objects 7302, 7304, 7310, etc. and tap on the hand. In some embodiments, in accordance with a determination that the gaze input is directed to the user interface object 7304 shown at a first position in the user interface object 7306' that is displayed at a position corresponding to the location of the user's hand 7202, a tap input on the hand 7202 causes the computer system to select the user interface object 7304 and display the first group of selectable user interface objects 7316 at the preset region of the three-dimensional environment (if not already displayed). In some embodiments, in accordance with a determination that the gaze input is directed to the user interface object 7304 shown at the first position in the user interface object 7306' that is displayed at a position corresponding to the location of the user's hand 7202, a tap input on the hand 7202 causes the computer system to unselect the user interface object 7304 and cease to display the first group of selectable user interface objects 7316 at the preset region of the three-dimensional environment (if already displayed). In some embodiments, in accordance with a determination that the gaze input is directed to the user interface object 7310 shown at a second position in the user interface object 7306' that is displayed at a position corresponding to the location of the user's hand 7202, a tap input on the hand 7202 (e.g., optionally at the same location as the earlier tap input) causes the computer system to select the user interface object 7310 and display the second group of selectable user interface objects 7318 at the preset region of the three-dimensional environment (e.g., replacing display of the first group of user interface objects 7316). In some embodiments, the gaze input causes the group representation that is displayed at the position of the gaze to move toward the viewpoint and/or change appearance relative to other group representations.

In some embodiments, the computer system switches between displaying different subsets of a respective group of selectable user interface objects in the preset region in response to first movement of the hand (e.g., a pinch and drag gesture, a swipe gesture, etc.) in a first preset direction (e.g., a horizontal pinch and drag or swipe gesture), without switching to displaying a different group of selectable user interface objects. In some embodiments, the computer system switches between displaying different groups of selectable user interface objects in the preset region in response to second movement of the hand (e.g., a pinch and drag gesture, a swipe gesture, etc.) in a second preset direction (e.g., a vertical pinch and drag or swipe gesture).

FIGS. 7N-7O are block diagrams illustrating that, a computer system, in response to detecting a user input that activates a first user interface object in a three-dimensional environment (e.g., from a user of the computer system and the first display generation component), changes display properties of background regions in the three-dimensional environment in conjunction with initiating a communication session between the user of the computer system and another user in the three-dimensional environment, where the background regions had a first level of visibility relative to the first user interface object in the three-dimensional environment before the user input, in accordance with some embodiments.

In some embodiments, the first user interface object includes a communication user interface that includes constituent user interface objects or controls for configuring and starting the communication session. In some embodiments, the first user interface object includes a respective user interface object within the communication user interface (e.g., a "call button", an "start" button, an avatar of a first user for starting the communication session with the first user, a control for selecting a communication mode for starting the communication session, etc.). In some embodiments, the first user interface object includes a representation of the first user that is displayed in another user interface, such as a home user interface, an address book user interface, a text message window, a list of contacts, etc. In some embodiments, the first user interface object is a user interface object that is configured to initiate an outgoing communication with the first user, when activated by a user input in accordance preset criteria. In some embodiments, changing the display property of the background regions includes making the background regions appear less visually prominent than before (e.g., appears more blurred, darkened, less color saturated, etc.), such that the content of the communication session has a greater visual emphasis relative to the background regions than that the first user interface object previously had relative to the background regions. In some embodiments, the three-dimensional environment is an augmented reality environment that includes a representation of the physical environment surrounding the first display generation component and the user of the first display generation component; and the background regions include at least a portion of the representation of the physical environment. Changing the display properties of the background regions include making the representation of the physical environment less visually prominent relative to the user interface objects corresponding to the communication session (e.g., avatar of the first user, control panel for the communication session, prompt and information related to the communication session, etc.). In some embodiments, if the representation of the physical environment is a camera view of the physical environment, the computer system processes the camera view to darken and/or blur the camera view, or make the camera view less color saturated, more grainy, etc., so that the representation of the physical environment in the background regions has a reduced level of visibility or visual prominence relative to the user interface objects corresponding to the communication session in the three-dimensional environment, as compared to the level of visibility or visual prominence it had prior to the user input. In some embodiments, if the representation of the physical environment is a view of the physical environment that is visible through a transparent of the first display generation component, the computer system changes the pass-through properties of the transparent portion of the first generation component (e.g., by making the transparent portion more opaque, less clear, more absorbent to light, more refractive and distortive to light, etc.), so that the representation of the physical environment in the background regions has a reduced level of visibility or visual prominence relative to the user interface objects corresponding to the communication session in the three-dimensional environment, as compared to the level of visibility or visual prominence it had prior to the user input. In some embodiments, the changes to the display properties of the background regions are more than simply reducing the area occupied by the background content due to the presence newly displayed user interface objects or expansion of existing user interface objects in the three-dimensional environment that are associated with the initiation of the communication session.

As shown in FIGS. 7N-7O, a three-dimensional environment (e.g., environment 7104, the environment as described with respect to FIGS. 7A-7D, FIGS. 7E-7H, and/or FIGS. 7I-7M, another VR, AR, or XR environment, etc.) is displayed via a first display generation component (e.g., display generation component 7100, the first display generation component described with respect to FIGS. 7A-7D, FIGS. 7E-7H, and/or FIGS. 7I-7M, other display generation components, etc.) in communication with a computer system (e.g., the computer system 101, the computer system described with respect to FIGS. 7A-7D, FIGS. 7E-7H, and/or FIGS. 7I-7M, etc.). As shown in FIGS. 7N-7O, the currently displayed view of the three-dimensional environment 7104 includes one or more user interface objects (e.g., user interface object 7320, user interface object 7322, user interface objects 7324, user interface objects 7326, 7328, and 7330 that are constituents of the user interface object 7324, other user interface objects or virtual objects, etc.) displayed at various positions in the three-dimensional environment 7104 (e.g., positions that correspond to respective locations of physical objects or surfaces, positions that do not correspond to locations of physical objects and surfaces, etc.). In some embodiments, the user interface object 7324 and/or the user interface object 7326 shown in FIGS. 7N-7O are objects analogous to the user interface object 7306 shown in FIG. 7C) displayed at a position that corresponds to a location at or near the hand of the user and has analogous behaviors as the user interface object 7306 in FIG. 7C. In some embodiments, the user interface object 7324 and/or the user interface object 7326 shown in FIGS. 7N-7O are objects analogous to the user interface object 7306 displayed at a position that is away from the position that corresponds to the location at or near the user's hand and has analogous behaviors as the user interface object 7306 in FIG. 7D. In some embodiments, the user interface object 7324 and/or the user interface object 7326 shown in FIGS. 7N-7O are objects analogous to the user interface object 7308 displayed at a position that is away from the position that corresponds to the location at or near the user's hand and has analogous behaviors as the user interface object 7308 in FIG. 7H. In some embodiments, the user interface object 7324 and/or the user interface object 7326 shown in FIGS. 7N-7O are user interface objects analogous to one of the selectable user interface objects 7316 or 7318 in FIGS. 7K and 7M. In some embodiments, the user interface object 7324 and/or the user interface object 7326 shown in FIGS. 7N-7O are user interface objects analogous to the user interface objects 7306', 7302, 7304, or 7310, in FIGS. 7I-7J. In some embodiments, the user interface object 7324 and/or the user interface object 7326 shown in FIGS. 7N-7O are user interface objects analogous to the user interface objects 7306', 7302, 7304, or 7310, in FIGS. 7K-7M. In some embodiments, the user interface object 7324 and/or the user interface object 7326 shown in FIGS. 7N-7O are user interface objects that have different behaviors from at least some of those described with respect to the user interface objects in FIGS. 7A-7M.

FIGS. 7N-7O show a computer system (e.g., device 101, or another computer system, etc.) that is in communication with a first display generation component (e.g., display generation component 7100, or another display generation component, etc.). In some embodiments, the first display generation component is a heads-up display. In some embodiments, the first display generation component is a head-mounted display (HMD). In some embodiments, the first display generation component is a standalone display, a touchscreen, a projector, or another type of display. In some embodiments, the computer system is in communication with one or more input devices, including cameras or other input devices that detect movement of the user's hand(s), movement of the user's body as whole, and/or movement of the user's head in the physical environment. In some embodiments, the one or more input devices detects the movement and the current postures, orientations, and positions of the user's hand(s), face, and body as a whole, etc. of the user. In some embodiments, the one or more input devices include an eye tracking component that detects location and movement of the user's gaze. In some embodiments, the first display generation component, and optionally, the one or more input devices and the computer system, are parts of a head mounted device (e.g., an HMD, a pair of goggles, etc.) that moves and rotates with the user's head in the physical environment, and changes the viewpoint of the user into the three-dimensional environment provided via the first display generation component. In some embodiments, the first display generation component is a heads-up display that does not move or rotate with the user's head or the user's body as a whole, but, optionally, changes the viewpoint of the user into the three-dimensional environment provided via the first display generation component in accordance with the movement of the user's head or body relative to the first display generation component. In some embodiments, the first display generation component is optionally moved and rotated by the user's hand relative to the physical environment or the user's head, and thereby changing the viewpoint of the user into the three-dimensional environment provided via the first displayed generation component in accordance with the movement of the first display generation component relative to the user's head or face, or relative to the physical environment.

As shown in FIGS. 7N-7O, the computer system displays a view of a three-dimensional environment (e.g., environment 7104, a virtual three-dimensional environment, an augmented reality environment, a pass-through view of a physical environment, a camera view of a physical environment, etc.). In some embodiments, the three-dimensional environment is a virtual three-dimensional environment without a representation of a physical environment. In some embodiments, the three-dimensional environment is a mixed reality environment that is a virtual environment that is augmented by sensor data corresponding to the physical environment. In some embodiments, the three-dimensional environment is an augmented reality environment that includes one or more virtual objects and a representation of at least a portion of a physical environment (e.g., representations 7004', 7006' of walls, representation 7008' of a floor, representation 7002' of a physical object, etc.) surrounding the first display generation component. In some embodiments, the representation of the physical environment includes a camera view of the physical environment. In some embodiments, the representation of the physical environment includes a view of the physical environment through a transparent or semi-transparent portion of the first display generation component.

In some embodiments, as shown in FIG. 7N, the computer system displays a first view (e.g., a view corresponding to a first viewpoint, a view from a first viewing perspective, etc.) of the three-dimensional environment 7104 that includes the first user interface object 7326 in a first region of the three-dimensional environment 7104. In some embodiments, the first user interface object 7326 is displayed among a plurality of user interface objects corresponding to different operations in the first region of the three-dimensional environment. In some embodiments, the plurality of user interface objects, e.g., user interface object 7328 and 7330, are user interface objects of a user interface of an application, a menu listing a plurality of users, a menu listing a plurality of communication modes, a notification of an incoming communication request from the first user, a mixed of two or more of the above, etc. In some embodiments, the plurality of user interface objects include other user interface objects that do not related to the communication session with the first user (e.g., user interface objects related to other applications, user interface object related to other computer-generated experiences, etc.). In some embodiments, the plurality of user interface objects are displayed at positions that are anchored to the three-dimensional environment 7104 (e.g., substantially fixed relative to the representations of the physical environment, or substantially fixed relative to the virtual three-dimensional environment, etc.). In such embodiments, the plurality of user interface objects maintain their positions in the three-dimensional environment despite of the movement of the viewpoint of the three-dimensional environment, e.g., as caused by the movement of the user's hand, the user's head, and/or the user's body as a whole, and/or the movement of the first display generation component in the physical environment. In some embodiments, the plurality of user interface objects are displayed at positions that are anchored to the viewpoint of the currently displayed view of the three-dimensional environment (e.g., substantially fixed relative to preset portion of the field of view provided via the first display generation component, substantially fixed to the position and orientation of the user's head or the first display generation component, etc.). In such embodiments, the plurality of user interface objects maintain their positions in the field of view provided by the first display generation component, despite of the movement of the viewpoint of the three-dimensional environment, e.g., as caused by the movement of the user's head, and/or the user's body as a whole, and/or the movement of the first display generation component in the physical environment. In some embodiments, the plurality of user interface objects are displayed at positions that are anchored to the location of the user's hand in the physical environment. In such embodiments, the plurality of user interface objects maintain their positions relative to the representation of the user's hand in the three-dimensional environment, despite of the movement of the user's hand, the movement of the viewpoint of the three-dimensional environment, e.g., as caused by the movement of the user's head and/or the user's body as a whole, and/or the movement of the first display generation component in the physical environment.

In some embodiments, the three-dimensional environment 7104 includes background content in regions outside of that occupied by the plurality of user interface objects. For example, in the view shown in FIG. 7N, the background regions of the plurality of user interface objects in the three-dimensional environment 7104 include portions of the representation of the physical environment that are not visually blocked, replaced, or overlaid by the plurality of user interface objects (e.g., the objects 7326, 7328, 7330, and 7324 in FIG. 7N). The background portions of the three-dimensional environment 7104 include, for example, a representation of unoccupied space in the physical environment, representations 7004', 7006', 7008', and 7002' of walls, and the floor, and the physical object, etc. in the physical environment. In some embodiments, the background portions of the physical environment include virtual objects, virtual surfaces, and user interface objects displayed in the three-dimensional environment that are not visually blocked, replaced, or overlaid by the plurality of user interface objects. As shown in FIG. 7N, before a user input is detected by the computer system, the background regions of the three-dimensional environment 7104 has a first level of visibility relative to the plurality of user interface objects (e.g., user interface objects 7324, 7326, 7328, 7330, etc.). The background content in the background regions has a first value for a respective visual property (e.g., opacity level, color saturation level, luminance level, blur radius, etc. that corresponds to a normal level of visibility, a default level of visibility, an unadjusted level of visibility, etc.) relative to corresponding values for the respective visual property for the plurality of user interface objects in the view of the three-dimensional environment 7104.

In some embodiments, the user interface object 7326 is a representation of the first user and the user interface objects 7328 and 7330 are user interface objects for configuring the communication session with the first user (e.g., for displaying information or functional elements related to previous communications (e.g., previously communication sessions, text messages, etc.) between the user of the computer system and the first user, for selecting a communication mode for the communication (e.g., voice-only, video, co-presence in a three-dimensional environment, etc.), etc.). In some embodiments, the user interface object 7326 is displayed as an incoming invitation for the communication session that has been received from the first user. In some embodiments, the user interface object 7326 is displayed as part of a notification or alert of the incoming invitation for the communication before the communication session is established. In some embodiments, the user interface object 7326 is displayed as part of an outgoing invitation for the communication session that is sent to the first user and while a response has not been received from the first user. In some embodiments, the user interface object 7326 is a representation of the first user that is displayed among representations of other users that are communication contacts of the user of the computer system. In some embodiments, the user interface object 7326 is displayed in the three-dimensional environment 7104 in response to selection of a category icon corresponding to a plurality of selectable user interface objects representing users (e.g., as described with respect to FIGS. 7I-7M).

As shown in FIG. 7N, while the computer system displays the plurality of user interface objects and the background content in the view of the three-dimensional environment, the compute system detects a user input that activates the first user interface object 7326 in accordance with first activation criteria. In some embodiments, the user input includes a predefined gesture 7332 (e.g., a pinch gesture, a tap gesture, etc.) that is detected while the first user interface object 7326 has input focus (e.g., while a gaze input 7218 is directed to the first user interface object 7326 and not to other user interface objects). In some embodiments, the user input is a confirmation gesture (e.g., a tap input, a flick input, a pinch input, etc.) while the first user interface object is selected by a previous input. In some embodiments, the user input is a preset gesture (e.g., a tap input, a flick input, a pinch input, etc.) with a location that corresponds to the position of the first user interface object 7326 and not the position of another user interface object.

In FIG. 7O following FIG. 7N, in response to detecting the user input that activates the first user interface object 7326 in accordance with the first activation criteria: the computer system initiates the communication session with the first user (e.g., as indicated by the display of a user interface object 7333 which, optionally, corresponds to a user interface of the communication session, an animated avatar or video feed of the first user in the communication session, a control user interface of the communication session corresponding to the first user, etc.). As shown in FIG. 7O relative to FIG. 7N, the computer system also adjusts the value of the respective visual property of at least a first portion of the background content from the first value to a second value that is different from the first value. For example, as shown in FIG. 7O, the computer system has adjusted the visibility of the background regions to make them less visually prominent as compared to their states shown in FIG. 7N. In some embodiments, the computer system adjusts the visibility of the background regions by applying a visual effect or changing the display property of the display generation component (e.g., changing the opacity level, color saturation level, luminance level, blur radius, optical pass-through properties (e.g., distribution of refractive index values or transmissivity across the transparent portion of the first display generation component to create a caustic lighting effect, or foggy glass effect, etc.), in dependent of displaying a new object (e.g., user interface object 7333) or enlarging an existing object (e.g., the user interface object 7324, or another user interface object, etc.). For example, the background regions of the view of the three-dimensional environment 7104 outside of the user interface object 7324 and new user interface object 7333 now have a reduced level of visibility (e.g., a value that has a reduced level of opacity, a reduced level of color saturation, a reduced luminance level, a greater blur radius, an increased level of distortion, an increased level of fogginess and graininess, etc.)), as compared to the state shown in FIG. 7N, and as compared to the user interface objects 7324, 7326, and 7333 in the current view of the three-dimensional environment. In some embodiments, adjusting the value of the respective visual property of at least the first portion of the background content from the first value to the second value is accomplished by a filter or visual effect (e.g., blur, darkening, reduced transparency, changing optical properties, etc.) applied to the transparent or semi-transparent pass-through portion of the first display generation component, or by applying a virtual blur, darkening, or other image processing procedures to the camera view of the pass-through content.

In some embodiments, the first portion of the background content includes some or all of the virtual objects and representations of physical objects in the background content that are not already visually obscured by the plurality of user interface objects when the first view of the three-dimensional environment was displayed, and that had the first level of visibility (e.g., normal, unadjusted, and/or default level of visibility) relative to the plurality of user interface objects in the first view of the three-dimensional environment before the user input that meets the first activation criteria was detected (e.g., as shown in FIG. 7N). In some embodiments, the computer system adjusts the visibility of the at least the first portion of the background content by increasing the blur radius, darkening, reducing color saturation, increasing transparency level, decreasing opacity, etc. of the virtual objects in the background content (e.g., relative to the first user interface object or a transformed version thereof that remains displayed in the first view of the three-dimensional environment after the detection of the user input). In some embodiments, the computer system reduces the visibility of at least some of the background portions such that they are no longer visible in the view of the three-dimensional environment, even though those portions are not otherwise visually blocked by another user interface object.

In some embodiments, the computer system reduces the visibility (e.g., changing values of one or more display properties) of one or more user interface objects other than the first user interface object 7326 among the plurality of user interface objects in conjunction with adjusting the visibility of the background portions content from a first level of visibility (e.g., normal, unadjusted visibility level) to a second level of visibility (e.g., reduced visibility level). In some embodiments, the first user interface object is an avatar of the first user displayed among avatars of other users; and in response to detecting the user's selection of the avatar of the first user to initiate the communication session with the first user, the computer system reduces the visibility of the background content surrounding the avatars of the users, and also reduces the visibility of the avatars of the other users that are not selected, while initiating the communication session with the first user. In some embodiments, the avatar of the first user is optionally enlarged and transformed into a communication user interface for the communication session, an outgoing invitation for the communication session, or a placeholder for placing the representation of the first user into a three-dimensional environment of the communication session, etc. In some embodiments, the representation of the physical environment in the background regions, the virtual objects (virtual objects, surfaces, and content other than the plurality of user interface objects), and/or the user interface objects (e.g., user interface objects 7328, 7324, etc.) in the plurality of user interface objects that are not the first user interface object 7326 are reduced in visibility through different mechanisms (e.g., blurred vs. darkened, processed using image processing filters vs. ceasing to be displayed vs. changing pass-through properties of hardware, etc.) and/or to differing degrees (e.g., user interface objects in the plurality of user interface objects are reduced less than the representation of the background and the virtual objects outside of the plurality of user interface objects).

In some embodiments, as shown in FIG. 7O, the view of the three-dimensional environment 7104 includes a representation of the physical environment surrounding the first display generation component and the visibility of the representation of the physical environment is reduced as compared to the state shown in FIG. 7N, in response to detecting the user input that activated the first user interface object 7326 and caused initiation of the communication session with the first user. For example, after the communication session is initiated, while the user is waiting for a response from the first user, the view of the physical environment included the three-dimensional environment is darkened and blurred, leaving only the user interface objects associated with the communication session (e.g., the user interface object 7326, user interface object 7333, etc.) and, optionally, a few other user interface objects (e.g., a system user interface object, a clock, user interface object 7320, etc.) with unchanged visibility.

In some embodiments, the reduction of visibility of the background content does not occur when the user input is used to select another type of user interface object that does not cause initiation of a communication session. For example, when the user input selects an application icon that starts an application in the three-dimensional environment (e.g., as opposed to an avatar of the first user or a notification of an incoming communication request from the first user, etc.), the computer system starts the application in the three-dimensional environment, without changing the display properties of the background regions in the three-dimensional environment (e.g., the background regions maintain their level of visibility as before and relative to the newly displayed content corresponding to the application, even though the newly displayed content may occupy more regions that were previously occupied by the background content).

In some embodiments, the user interface object 7326 shown in FIG. 7N is an avatar of the first user, e.g., displayed among avatars of other users; and the computer system reduces the visibility of the background content along with the avatars of the other users in conjunction with initiating the communication session with the first user. In some embodiments, the user interface object 7326 shown in FIG. 7O represents a control user interface object of the communication session corresponding to the first user. In some embodiments, the control user interface object of the communication session corresponding to the first user includes a first set of user interface objects, such as the avatar of the first user and one or more other user interface objects corresponding to a plurality of functions corresponding to the communication session with the first user (e.g., user interface objects for selecting and/or specifying control parameters for the communication session with the first user, user interface object for adding related content (e.g., chat, photos, augmented reality, annotations, etc.) to the communication session, etc.).

In some embodiments, the computer system, as part of the operation to initiate the communication session with the first user, displays a control user interface object that includes the avatar of the first user and an affordance (e.g., a call button, a "send" button, etc.) that, when activated, cause the computer system to send an outgoing request for establishing the communication session with the first user to a computer system of the first user. In some embodiments, the affordance is customized (e.g., showing different appearances, and text, etc. which corresponds to different types of requests that will be sent out when the affordance is activated) in accordance with which communication mode(s) are available for connecting with the first user in the communication session. For example, in some embodiments, the available modes include an audio-only communication mode, a video communication mode, and a co-presence communication mode (e.g., a mode in which representations of the participants are placed in a three-dimensional environment that is shared among at least some of the participants (e.g., depending on the capability of the devices used by the participants, and/or the modes chosen by the participants for their participation in the communication session, etc.)). In some embodiments, if the different modes of communications are prioritized in accordance with a preset order, then the affordance corresponds to a first available communication mode that has a higher priority in accordance with the preset order as compared to other available communication modes for the first user. For example, the affordance is customized to correspond to the best and/or most immersive mode that is available among multiple available modes for the computer system. In some embodiments, the computer system also provides access to affordances corresponding to other available modes, where a respective affordance of these other affordances, when activated, cause the computer system to initiate the communication session in a mode that corresponds to the affordance that is activated. In some embodiments, the access to the affordances that correspond to the communication modes with lower priorities are less visually prominent and/or are harder to reach than the affordance that corresponds to the communication mode with the higher priority (e.g., are smaller, are hidden in a lower-level menu, not directly accessible on the face of the currently displayed user interface, etc.).

In some embodiments, the computer system maintains the visibility of the background portions in the three-dimensional environment at the reduced level (e.g., as compared to the state prior to the activation of the first user interface object 7326 in FIG. 7N) while an outgoing request for establishing the communication session has been sent to the first user and before the communication session has been accepted by the first user. In some embodiments, the computer system maintains the visibility of the background portions in the three-dimensional environment at the reduced level (e.g., as compared to the state prior to the activation of the first user interface object 7326 in FIG. 7N) during the communication session as well. In some embodiments, the computer system restores the visibility of the background portions in the three-dimensional environment once the communication request has been accepted by the first user and the live representation of the first user is displayed in the three-dimensional environment (e.g., the first user joins the communication session in a co-presence mode or via video, optionally, in an augmented reality view of the three-dimensional environment).

In some embodiments, while the communication request is outstanding, pending acceptance by the first user, the user interface object containing the avatar of the first user (e.g., represented by the user interface object 7324, 7326, or 7333 in FIG. 7O) is displayed with a normal visibility level relative to the background regions that has the reduced visibility level, and the user interface object can be moved by the user in the three-dimensional environment 7104 as a placeholder object for the representation of the first user in the three-dimensional environment 7104 after the communication session is established in the three-dimensional environment 7104. In response to detecting that the communication session is established in accordance with the response to the request from the first user, the computer system updates the user interface object to show the representation of the first user in accordance with data received from the first user (e.g., real-time video image of the first user, an animated avatar of the first user received from the first user, etc.). In some embodiments, if the first user participates in the communication session in a co-presence mode or a spatial mode, the first user optionally controls the position and movement of the representation of the first user in the view of the three-dimensional environment 7104, e.g., in the manner as described with respect to FIGS. 7V-7X.

In some embodiments, if the first user joins the communication session in a co-presence mode, the computer system updates the position of the representation of the first user in the three-dimensional environment 7104 in accordance with position data received from the first user (e.g., location, orientation, or movement (e.g., change in orientation and/or location) of the first user, user input received from the first user, etc.). In some embodiments, if the first user has joined the communication session using a 2D-video mode or an audio-only mode, the computer system updates the position of the representation of the first user in the three-dimensional environment in accordance with user input received from the user of the computer system (e.g., user dragging the representation of the first user in the three-dimensional environment, user selecting a new position for the representation of the first user using a gaze input in conjunction with a confirmation input, etc.).

In some embodiments, the user interface object that includes the representation of the first user that has been displayed while the computer system waits for a response to the request for establishing the communication remains displayed until the user of the computer system cancels the request (e.g., by selecting a cancel affordance on the user interface object, or providing a voice command to cancel, etc.). In some embodiments, the user interface object is replaced with the representation of the first user that is updated by data received from the first user, once the first user has accepted the request and the communication session is established. In some embodiments, the computer system moves the user interface object in accordance with the user input provided by the user of the computer system, while the outgoing request for the communication session is waiting to be accepted by the first user.

In some embodiments, while the background regions have been reduced in visibility (e.g., in FIG. 7O) as a result of the user input that activated the first user interface object 7326 (e.g., in FIG. 7N), the computer system detects a gaze input directed to a portion of the background regions that has the reduced visibility (e.g., to the region of the user interface object 7322 (e.g., shown as 7322' in FIG. 7O), to the region of the walls or floor (e.g., shown as representations 7004", 7006", and 7008", respectively), to the region of a physical object (e.g., shown as representation 7002"), etc.). In response to detecting the gaze input directed to the portion of the background regions with the reduced visibility, the computer system, in accordance with a determination that the gaze input meets preset criteria (e.g., is held within a threshold region for at least a threshold amount of time, is directed to a user interface object, etc.), restores the visibility of at least a portion of the background regions to their original level of visibility in the three-dimensional environment 7104. For example, while the outgoing request for the communication session is pending, the background regions surrounding the user interface object containing the avatar of the first user is in a darkened and blurred state; and in response to the user's gaze input directed to the darkened and blurred background region for at least a threshold amount of time, the computer system gradually restores the visibility of the content in the background regions (e.g., avatars of other users, the representation of the physical environment, other user interface objects displayed in the three-dimensional environment, etc. that were displayed with normal visibility prior to the activation of the first user interface object 7326). In some embodiments, the computer system keeps the background content at the restored visibility level, after the gaze input has moved back to the user interface object corresponding to the communication session. In some embodiments, the computer system returns the background content back to the reduced visibility level, after the gaze input has moved back to the user interface object corresponding to the communication session (e.g., the user interface object including the avatar of the first user, or the control user interface of the communication session, etc.).

In some embodiments, while the communication session is ongoing, the computer system displays a control user interface object that corresponds to the communication with the first user. In some embodiments, the control user interface object is a separate user interface object from the representation of the first user in the three-dimensional environment 7104 displayed during the communication session. In some embodiments, the control user interface object includes one or more affordances for displaying additional content related to the communication session, such as an affordance for displaying a message thread with the first user, an affordance for displaying photos or media content items related to the first user, an affordance for displaying other control parameters associated with the communication session, an affordance for terminating the current communication mode, and optionally select another communication mode, etc. In some embodiments, the control user interface object has a preset position (e.g., a position selected by the computer system or by the user of the computer system, etc.) in the three-dimensional environment, and the computer systems ceases to display or reduces visibility of the control user interface object (e.g., by fading out, making more transparent, etc.) in accordance with a determination that a gaze input has not been detected in the region of the three-dimensional environment that corresponds to the control user interface object for at least a threshold amount of time. In some embodiments, the computer system redisplays the control user interface object at the preset position in response to detection of a gaze input directed to the region of the three-dimensional environment that corresponds to the preset position of the control user interface object (e.g., optionally, after a preset dwell time threshold longer than the gaze detection time threshold). In some embodiments, the preset position of the control user interface object is anchored to the three-dimensional environment, and does not move with the movement of the viewpoint of the currently displayed view of the three-dimensional environment. In some embodiments, the control user interface object is anchored to a position of a first portion of the user of the computer system (e.g., anchored to a representation of a hand or wrist of the user of the computer system in the three-dimensional environment), and does not move in accordance with the movement of the viewpoint of the currently displayed view of the three-dimensional environment. In some embodiments, the control user interface object is anchored to a preset portion of the field of view provided by the first display generation component.

In some embodiments, the control user interface object includes an affordance that, when activated, causes the computer system to change the communication mode of the communication session while the communication session is established in a first communication mode (e.g., a co-presence mode, a video mode, etc.). In some embodiments, the computer system changes the communication mode of the established communication session from the first communication mode to a second communication mode, e.g., a communication mode that has less immersive than the first communication mode (e.g., from a co-presence mode to a video mode, from a video mode to a voice-only mode, etc.). In some embodiments, the switching of the communication mode is reversible during the communication session, in response to user request. For example, in some embodiments, the computer system optionally stops the co-presence mode or switches to audio-only mode, when the user activates the affordance. The computer system then restarts the co-presence mode, when the user activates the affordance again, in accordance with some embodiments. In some embodiments, the control user interface object also includes an affordance to terminate the communication session completely.

In some embodiments, the first user interface object 7326 is or is part of a representation of a notification (e.g., first representation, second representation, third representation, etc.) for a communication request from the first user, which, when activated, causes the computer system to initiate the communication session with the first user. In some embodiments, the features of the embodiments described with respect to FIGS. 7P-7S are applicable to the features of the embodiments described with respect to FIGS. 7N-7O in various embodiments, and vice versa.

FIGS. 7P-7S are block diagrams that illustrate display of a representation of a notification before detecting direct user interaction with the notification (e.g., to respond to the request in the notification or dispose of the notification), in accordance with some embodiments. FIGS. 7T-7U are block diagrams illustrating interaction with a notification corresponding to an incoming communication request and displaying the communication session in the three-dimensional environment. In some embodiments, FIGS. 7P-7U illustrate a continuous sequence of events and interactions that occur when a notification corresponding to an incoming communication request is received at the computer system, in accordance with some embodiments. In some embodiments, the example shown in FIGS. 7P-7S and the example in FIGS. 7T-7U are independent of each other. For example, the notification shown in FIGS. 7P-7S is a notification of an application other than a communication-related application, or is a notification related to the operating system state, in accordance with some embodiments; and the notification in FIGS. 7T-7U can be displayed at the position that corresponds to the user's hand or a position in a preset portion of the field of view that is anchored to the viewpoint or the eyes or head of the user, without having been displayed in another region first, in accordance with some embodiments.

In FIG. 7P, a first notification is generated in response to occurrence of a first event at the first computer system. The computer system displays a first representation of the notification (e.g., first representation 7334 of the notification) at a first position in the three-dimensional environment 7104 that is selected based on a position of the first portion of the user. In some embodiments the first position is selected based on the position of the first portion of the user when the first position is anchored to the first portion of the user. In some embodiments, the first position is selected based on the position of the first portion of the user in another manner that does not require a fixed spatial correspondence between the position of the first representation of the notification and the virtual position of the first portion of the user in the three-dimensional environment, but allows the position of the first portion of the user to constrain the selection of the first position among one or more other constraints. In some embodiments, the first portion of the user includes the user's head or eyes, and the first position that is selected based on the location and orientation of the user's head in the physical environment. In such embodiments, the first position is a position that is anchored to the viewpoint of the currently displayed view of the three-dimensional environment. In some embodiments, when the first representation 7334 of the notification is displayed at the first position that is anchored to the viewpoint of the currently displayed view of the three-dimensional environment 7104, the first representation 7334 of the notification remains in a preset portion of the field of view (e.g., the upper left corner, the top edge region, etc.), even as the viewpoint moves in the three-dimensional environment in accordance with the movement of the user's head (e.g., translation, and rotation) in the physical environment. In some embodiments, the first portion of the user includes the user's torso, and the first position that is selected based on the location and orientation of the user's torso in the physical environment is a position that is anchored to the virtual position of the user in the three-dimensional environment, even as the viewpoint moves in accordance with the rotation of the user's head relative to the user's torso. After the first representation 7334 of the notification has been displayed at the first position that is selected based on the location of the first portion of the user, the computer system, having not detected a user interaction with the first representation 7334 of the notification that meets preset criteria, displays a second representation 7338 of the notification at a second position that corresponds to the location at or near the hand 7202 of the user (e.g., as shown in FIG. 7R). The second representation 7338 of the notification displayed at the second position moves in the three-dimensional environment in accordance with the movement of the user's hand 7202 in the physical environment (e.g., as shown in FIGS. 7R-7S). In some embodiments, the compute system allows the user to subsequently interact with the notification, e.g., in a manner as described with respect to FIGS. 7T and 7U, or directly interact with another representation of the notification displayed at a third position that corresponds to the location of the user's hand, at a fourth position floating in the field of view, floating or anchored to a fifth position in the three-dimensional environment, etc.

In FIGS. 7T-7U, a third representation 7336 of a notification (e.g., the same notification that caused displayed of the first representation 7334 in FIG. 7P, or the second representation 7338 om FIG. 7R, or a different notification, etc.) is displayed at a third position that is selected based on the location of a preset portion of the user (e.g., the hand of the user in this example, but could be the head of the user in a different example). In some embodiments, the third representation 7336 of the notification is displayed within a threshold range of the virtual position of the user when it is displayed at the third position that is selected based on the location of the preset portion of the user. In response to detecting a sequence of one or more user inputs corresponding to operations that respond to the request of the notification (e.g., a combination of gaze input 7220 directed to the third representation 7336 of the notification and a gesture input (e.g., movement 7340 of the hand 7202, or a tap gesture on the third representation 7336 of the notification, etc.) to accept the invitation of the communication session, to reply to a message, to display an application corresponding to the notification, etc.), the computer system displays a user interface object 7344 corresponding to the notification. In some embodiments, the notification is a request for establishing a communication session between the user of the computer system and another user, and the user interface corresponding to the notification includes a user interface of the communication session or a representation of the other user. In some embodiments, as shown in FIG. 7U, the user interface object 7342 is displayed in the three-dimensional environment 7104 at a fourth position that is more than a threshold distance away from the virtual position of the user. In some embodiments, the fourth position is anchored to the three-dimensional environment and does not move in accordance with the movement of the user or the first display generation component in the physical environment that causes movement of a viewpoint of the currently displayed view of the three-dimensional environment, and the fourth position does not move in accordance with the movement of the preset portion of the user (e.g., the hand of the user in this example).

As shown in FIGS. 7P-7U, a three-dimensional environment (e.g., environment 7104, the environment as described with respect to FIGS. 7A-7D, FIGS. 7E-7H, FIGS. 7I-7M, and/or 7N-7O, another VR, AR, or XR environment, etc.) is displayed via a first display generation component (e.g., display generation component 7100, the first display generation component described with respect to FIGS. 7A-7D, FIGS. 7E-7H, FIGS. 7I-7M, and/or 7N-7O, other display generation component, etc.) in communication with a computer system (e.g., the computer system 101, the computer system described with respect to FIGS. 7A-7D, FIGS. 7E-7H, FIGS. 7I-7M, and/or 7N-7O, etc.). As shown in FIGS. 7P-7U, the currently displayed view of the three-dimensional environment 7104 includes one or more user interface objects (e.g., user interface object 7322, other user interface objects or virtual objects, etc.) displayed at various positions in the three-dimensional environment (e.g., positions that correspond to respective locations of physical objects or surfaces, positions that do not correspond to locations of physical objects and surfaces, etc.).

FIGS. 7P-7U show a computer system (e.g., device 101, or another computer system, etc.) that is in communication with the first display generation component (e.g., display generation component 7100, or another display generation component, etc.). In some embodiments, the first display generation component is a heads-up display. In some embodiments, the first display generation component is a head-mounted display (HMD). In some embodiments, the first display generation component is a standalone display, a touchscreen, a projector, or another type of display. In some embodiments, the computer system is in communication with one or more input devices, including cameras or other input devices that detect movement of the user's hand(s), movement of the user's body as whole, and/or movement of the user's head in the physical environment. In some embodiments, the one or more input devices detects the movement and the current postures, orientations, and positions of the user's hand(s), face, and body as a whole, etc. of the user. In some embodiments, the one or more input devices include an eye tracking component that detects location and movement of the user's gaze. In some embodiments, the first display generation component, and optionally, the one or more input devices and the computer system, are parts of a head mounted device (e.g., an HMD, a pair of goggles, etc.) that moves and rotates with the user's head in the physical environment, and changes the viewpoint of the user into the three-dimensional environment provided via the first display generation component. In some embodiments, the first display generation component is a heads-up display that does not move or rotate with the user's head or the user's body as a whole, but, optionally, changes the viewpoint of the user into the three-dimensional environment provided via the first display generation component in accordance with the movement of the user's head or body relative to the first display generation component. In some embodiments, the first display generation component is moved and rotated by the user's hand relative to the physical environment or the user's head, and thereby changing the viewpoint of the user into the three-dimensional environment provided via the first displayed generation component in accordance with the movement of the first display generation component relative to the user's head or face or relative to the physical environment.

As shown in FIGS. 7P-7U, the computer system displays a view of the three-dimensional environment (e.g., environment 7104, a virtual three-dimensional environment, an augmented reality environment, a pass-through view of a physical environment, a camera view of a physical environment, etc.). In some embodiments, the three-dimensional environment is a virtual three-dimensional environment without a representation of a physical environment. In some embodiments, the three-dimensional environment is a mixed reality environment that is a virtual environment augmented by sensor data corresponding to the physical environment. In some embodiments, the three-dimensional environment is an augmented reality environment that includes one or more virtual objects and a representation of at least a portion of a physical environment (e.g., representations 7004', 7006' of walls, representation 7008' of a floor, representation 7002' of a physical object, etc.) surrounding the first display generation component. In some embodiments, the representation of the physical environment includes a camera view of the physical environment. In some embodiments, the representation of the physical environment includes a view of the physical environment through a transparent or semi-transparent portion of the first display generation component.

FIG. 7P illustrates that, while displaying the first view of the three-dimensional environment 7104, the computer system detects a first event that corresponds to receipt or generation of a first notification. In some embodiments, the first event corresponds to receipt of a notification or alert for an incoming request for establishing a communication session between a first user corresponding to the computer system and a second user different from the first user. In some embodiments, the first notification corresponds to other information or alert from the operating system or an application that requests the first user's attention. In some embodiments, the first event that corresponds to the receipt of the first notification is a system-generated event produced by the computer system in response to satisfaction of pre-established trigger conditions or in response to a request from another computer system or device, and is not a real-time response or feedback to a user input detected by the one or more input devices of the computer system. In response to detecting the first event, the computer system displays the first representation 7334 of the first notification (e.g., a pop up banner, a user interface object including notification content, etc.) in the three-dimensional environment 7104. As shown in FIG. 7P, the first representation 7334 of the notification is displayed at a position that is selected based on a position of a first portion of the first user in the physical environment. In this example, the first portion of the user's body is, optionally, the head of the first user, and the position and orientation of the head of the first user determines the position and the orientation of the viewpoint of the currently displayed view of the three-dimensional environment 7104. In some embodiments, the first portion of the first user's body is, optionally, the torso of the first user, and the position and orientation of the user's torso determines the position and orientation of the viewpoint of the currently displayed view of the three-dimensional environment. In some embodiments, the first representation 7334 of the first notification is anchored to the user's head, and the first representation 7334 of the notification is displayed in a preset portion of the field of view (e.g., upper left corner of the field of view, as shown in FIG. 7P) provided by the first display generation component; and as the user's head turns and/or moves in the physical environment (e.g., relative to the torso, or as a result of the movement of whole person, etc.), the viewpoint of the currently displayed view of the three-dimensional environment changes (e.g., the viewpoint has moved downward and rightward in the state shown in FIG. 7Q as compared to the state shown in FIG. 7P) but the first representation 7334 remains in the same preset portion of the field of view provided by the first display generation component. In some embodiments, the first representation 7334 of the first notification is anchored to the user's torso, and the viewpoint is also anchored to the first user's torso and not to the user's head; and the user can turn the user's head relative to the currently displayed view of the three-dimensional environment without causing movement of the viewpoint and without causing movement of the first representation of the notification in the three-dimensional environment or in the field of view. In some embodiments, the first representation 7334 of the first notification is anchored to the user's torso, and the viewpoint is also anchored to the first user's torso and not to the user's head; and the first representation of the notification stays at a fixed distance and position relative to the virtual position of the user (e.g., less than a threshold distance away from the virtual position of the user), when the user moves as a whole in the physical environment.

In some embodiments, the first representation 7334 of the first notification is a notification that includes some information (e.g., application name, application icon, excerpt of message, nature of the first event, type of action requested from the first user, etc.) for the user to determine whether to interact with the first notification to dispose of the notification.

FIGS. 7Q-7R illustrate that, after the first representation 7334 of the first notification has been displayed at the first position that is selected based on the position of the first portion of the first user in the physical environment, the computer system, in accordance with a determination that user interaction that meets the criteria to dispose of the first notification has not been detected within a preset period of time since initial display of the first representation 7334 of the first notification, the computer system displays a second representation 7338 of the first notification at a second position in the three-dimensional environment 7104 that is selected based on a position of a second portion of the first user in the physical environment (e.g., the position of the user's hand, the position of the user's wrist, etc.), where the second portion of the first user is different from the first portion of the first user and can be moved relative to the first portion of the first user. In some embodiments, the user interaction that disposes of the first notification includes a respective one of interactions to dismiss the notification so it will not be displayed again, to store the notification for later review in notification history, to open a user interface corresponding to the application of the notification, to display an user interface object corresponding to the notification for displaying notification content and receiving user input responding to the request in the notification, etc. In some embodiments, the second representation 7338 of the first notification (e.g., shown in FIG. 7R) is a reduced version of the first representation 7334 of the first notification (e.g., shown in FIG. 7P). In some embodiments, as shown in FIG. 7R, the second representation 7338 of the notification is, optionally, a generic indicator (e.g., a dot, a circle, a badge, etc.) that can be used for different notifications (e.g., for different applications, different events, etc.). In some embodiments, as shown in FIG. 7R, the second representation 7338 of the notification is, optionally, an application-specific or user-specific indicator (e.g., a reduced image of an application icon, a reduced image of an avatar of a user, etc.) that identify the source of the first notification or the first event. In some embodiments, the computer system displays an animated transition showing the first representation 7334 shrinking and moving toward the second position along a path 7335 in the three-dimensional environment (e.g., as shown in FIG. 7Q), and eventually transforms into the second representation 7338 at the second position in the three-dimensional environment (e.g., as shown in FIG. 7R). In some embodiments, the path 7335 is confined in a peripheral portion of the field of view provided by the first display generation component. In some embodiments, the first representation 7334 of the notification transforms into the second representation 7338 of the notification before moving away from the first position toward the second position.

In FIG. 7R-7S, the second representation 7338 of the first notification is displayed at the second position in the three dimensional environment 7104 that is selected based on the position of the second portion of the first user (e.g., the user's hand, the user's wrist, etc.) in the physical environment. As shown in FIG. 7R-7S, the computer system detects a movement of the second portion of the first user in the physical environment relative to the first portion of the first user (e.g., movement of the user's hand or wrist in the physical environment that is relative to the user's torso or head), which results in a movement of the hand toward the wall (e.g., the wall represented by representation 7004') in front of the first user. The movement of the user's hand in FIG. 7R-7S is relative to the user's body, because, for illustrative purposes, the user's body has meanwhile moved away from the wall in front of the user, resulting a change in the viewpoint of the currently displayed view of the three-dimensional environment 7104. In FIG. 7S, in response to detecting movement of the second portion of the first user in the physical environment relative to the first portion of the first user (e.g., as opposed to relative movement between the second portion and the first portion of the first user that is caused solely by the movement of the first portion of the first user in the physical environment), the computer system moves the second representation 7338 of the first notification in the three-dimensional environment 7104 based on the movement of the second portion of the first user in the physical environment. In some embodiments, when the representation of the second portion of the user (e.g., representation 7202' of the hand 7202, representation of the user's wrist, etc.) is visible in the currently displayed view of the three-dimensional environment 7104, the spatial relationship between the second representation 7338 of the notification and the representation of the second portion of the user remains substantially unchanged (e.g., optionally, subject to some simulated inertia or time lag) before and after the movement of the second portion of the user, as shown in FIG. 7R-7S.

In FIGS. 7P-7S, the first representation 7334 of the first notification and the second representation 7338 of the first notification are different from each other. In some embodiments, the first representation 7334 of the first notification includes more notification content than the second representation 7338 of the first notification. In some embodiments, the first representation 7334 of the first notification has a larger size than the second representation 7338 of the first notification. In some embodiments, the first representation 7334 of the first notification is displayed with a higher level of visibility than the second representation 7338 of the first notification. In some embodiments, the first representation 7334 of the first notification has an application-specific appearance, and the second representation 7338 of the first notification has a generic appearance that is not application-specific.

In some embodiments, the first representation 7334 of the first notification is the same as the second representation 7338 of the first notification. In some embodiments, the first representation 7334 of the first notification and the second representation 7338 of the first notification have the same appearance but have different movement behaviors relative to the different portions of the first user. In some embodiments, the computer system displays a visual indication and/or provides an audio or haptic indication to mark the transition from displaying the first representation of the first notification to displaying the second representation of the first notification. In some embodiments, the computer system automatically moves the displayed representation of the first notification, e.g., from the first position selected based on the position of the first portion of the first user to the second position selected based on the position of the second portion of the first user, as the visual indication for the transition from displaying the first representation of the first notification to displaying the second representation of the first notification.

In some embodiments, the first representation 7334 of the notification is displayed in a peripheral portion of the field of view (e.g., a top edge portion, a left edge portion, a top left corner, etc.) provided via the first display generation component, as shown in FIGS. 7P-7Q.

In some embodiments, after the initial display of the first representation 7334 of the notification, the first representation 7334 transforms into a small, reduced version of the notification and is displayed at a position that corresponds to a location at or near the user's hand, e.g., as shown in FIGS. 7Q-7S.

In some embodiments, as shown in FIG. 7T following FIG. 7S, while displaying the second representation 7338 of the first notification at the second position that is selected based on the position of the second portion of the first user (e.g., user's hand or wrist) in the physical environment, the computer system detects movement 7340 of the hand 7202 of the first user in the physical environment (e.g., translation or rotation of the hand as a whole, opening or closing the hand, moving one portion of the hand relative to another portion of the hand, etc.). In response to detecting the movement 7340 of the hand of the first user in the physical environment: in accordance with a determination that the movement 7340 of the hand meets first criteria, the computer system displays a third representation 7336 of the first notification. In some embodiments, the third representation 7336 of the first notification is the same as the first representation 7334 of the first notification. In some embodiments, the third representation 7336 of the first notification is an expanded version of the first representation 7334 of the first notification (e.g., including more notification content or provides more functions than the first representation 7334 of the notification, or includes content or functions not available in the first representation 7334 of the notification, etc.). In some embodiments, the third representation 7336 of the first notification is displayed at a third position in the three-dimensional environment that corresponds to the location of the hand 7202 of the first user in the physical environment. For example, in some embodiments, the preset criteria include criteria for detecting rotation of the hand 7202 to face a preset side of the hand toward the user's face, criteria for detecting hand opening with a preset side of the hand facing toward the user's face, criteria for detecting a palm of the hand moving toward the user's face, criteria for detecting the user's hand raising from a position outside of the field of view to a position within the field of view, etc. In some embodiments, the computer system displays the third representation 7336 of the first notification at a position that overlays, replaces display of, or blocking the view of, etc. of the representation 7202' of the hand 7202 of the user (e.g., the palm of the hand, the back of the hand, etc.).

In some embodiments, the preset criteria for displaying the third representation 7336 of the first notification require that the movement 7340 of the hand be detected in conjunction with a gaze input (e.g., gaze input 7220 that meets gaze detection time threshold, or the extended gaze and dwell time threshold, etc.) directed to the region of the three-dimensional environment 7104 that corresponds to the location of the user's hand or the second representation 7338 of the first notification in order for the preset criteria to be met. In some embodiments, if the computer system only detects the required movement of the hand for the preset criteria but not the required gaze input, the computer system provides some feedback (e.g., audio prompt, visual feedback such as blinking of the second representation 7338 of the notification, movement of the second representation 7338 of the notification toward the viewpoint, etc.). In some embodiments, the preset criteria require that the movement 7340 of the hand be detected in conjunction with a gaze input that has been maintained in the region of the three-dimensional environment that corresponds to the location of the user's hand or the region of the second representation 7338 of the notification for at least a first amount of time that is greater than the gaze detection time threshold in order for the preset criteria to be met. In some embodiments, if the computer system only detects the required movement of the hand for the preset criteria but not the required gaze input, or when the gaze input has not been maintained in the required region(s) for at least the first amount of time, the computer system provides some feedback (e.g., audio prompt, visual feedback such as blinking of the second representation 7338 of the notification, growing size of the second representation 7338 of the notification, etc.). In some embodiments, the preset criteria require that the movement of the hand includes turning a palm of the hand of the first user toward a preset direction (e.g., a direction corresponding to the face of the first user, upward, etc.) in order for the first criteria to be met.

In some embodiments, one or more of the representations of the notification (e.g., the first representation 7334, the second representation 7338, and the third representation 7336, etc.) change appearance, become animated, and/or move toward the viewpoint when a gaze input is detected in the region of the representation of the notification, even though the gaze input alone does not cause the computer system to perform an operation that disposes of the notification (e.g., dismissing the notification, opening a user interface corresponding to the notification, storing the notification for later view in notification history, etc.).

In some embodiments, when the computer system detects a preset activation input (e.g., an in-air tap gesture, a pinch gesture, a tap or swipe gesture by one hand on another hand, a touch-gesture on a touch-sensitive surface, a voice command, etc.) in conjunction with detecting a gaze input directed to a respective representation of the notification (e.g., the first representation 7334, the second representation 7338, and the third representation 7336, etc.), the computer system performs the operation that disposes of the notification (e.g., dismissing the notification, opening a user interface corresponding to the notification, storing the notification for later view in notification history, etc.).

In some embodiments, in conjunction with initially displaying the first representation 7334 of the notification in the three-dimensional environment (e.g., as shown in FIG. 7P) in response to detection of the first event, the computer system also outputs an audio alert. While the audio alert is still playing, if the computer system detects the user's gaze input moving to the position of the first representation 7334 of the notification, the computer system displays the third representation 7336 of the notification at the position that corresponds to the location of the second portion of the user (e.g., the user's hand or wrist), optionally, skipping the display of the second representation 7338 of the notification at the position that is selected based on the location of the second portion of the user. For example, if the computer system detects that the user looks at the first position or the first representation of the notification while the audio alert is playing (e.g., while in a preset time window of the initial display of the notification), the computer system moves the representation of the notification to the position of the user's hand and locks the representation of the notification to the user's hand, so that user can move the representation of the notification closer or father away from his/her face to see its content comfortably and to interact with the representation to respond to the first notification. In some embodiments, the computer system displays an animation showing the representation 7334 of the notification dropping into the user's hand (e.g., to the position of the representation 7202' of the hand) in response to detecting the user's gaze input directed to the representation 7334 of the notification within a time window or while the audio alert is still playing. In some embodiments, the computer system requires the user to raise his/her hand into the field of vie in order to display the third representation 7336 of the notification at the position that corresponds to the location of the user's hand. In some embodiments, if the computer system does not detect the user's gaze input at the position of the first representation 7334 of the notification (or the user's hand is not within the current field of view provided by the first display generation component), the computer system displays the second representation 7338 of the notification at the position that is selected in based on the location of the second portion of the user (e.g., along the edge of the field of view if the second portion of the user is not within the field of view, or next to the representation of the second portion of the user, etc.) (e.g., as shown in FIGS. 7P-7S). In some embodiments, the audio alert is a spatial audio alert that has a corresponding position in the three-dimensional environment, and the spatial audio alert appears to originate from the position at or near the position of the first representation 7334 of the notification when the first representation 7334 is displayed at the position that is selected based on the location of the first portion of the user. In some embodiments, the first representation 7334 of the notification is displayed in a peripheral region of the field of view provided by the first display generation component, and the spatial audio alert also appears to originate from that same peripheral region (e.g., as the region moves in accordance with the movement of the first portion of the user, and as the region remains stationary absent the movement of the first portion of the user in the physical environment, etc.). In some embodiments, the spatial audio alert is optionally started before the first representation of the notification appears or reach the first position that is selected based on the location of the first portion of the user, and persists for a preset amount of time (e.g., 200 milliseconds, 1 second, 2 seconds, etc.). In some embodiments, the spatial audio alert appears to originate from its source location in the three-dimensional environment, irrespective of the movement of the first display generation component, the movement of the user, and/or the movement of the audio output device that is used to output the spatial audio alert. In other words, in some embodiments, the spatial audio alert has a position in a reference frame that is separate from a reference frame based on the physical environment, a reference frame based on the location of the audio output device in the physical environment, and/or a reference frame based on the location of the first display generation component in the physical environment, etc.

In some embodiments, the first notification is generated while the computer system is displaying a shared experience in the three-dimensional environment, where at least a first portion of the three-dimensional environment is visible to and/or accessible by one or more users other than the first user (e.g., through the computer systems and display generation components used by these other users). In some embodiments, the first representation 7334, the second representation 7338, and the third representation 73637 of the first notification are not visible in the view of the first portion of the three-dimensional environment provided to the one or more other users. In other words, the first notification is kept private to the first user, unless the first user provides input to explicitly share its content with one or more of the other users in the first portion of the three-dimensional environment. In some embodiments, the first representation 7334 of the notification is not displayed in the first portion of the three-dimensional environment in the view provided by the display generation component of the first user. In some embodiments, an indication of the notification is optionally provided in the first portion of the three-dimensional environment and is visible to the other users that are participating in the shared experience, but the notification content shown in the first representation of the notification is not provided in the indication of the notification in the first portion of the three-dimensional environment shown to other users.

In some embodiments, after displaying the first representation 7334 of the notification at the first position that is selected based on the location of the first portion of the user in the physical environment, and, optionally, after outputting the audio alert in conjunction with displaying the first representation 7334 of the notification, the computer system, in accordance with a determination that a user input that disposes the notification has not been detected within a threshold amount of time since initial display of the first representation 7334 of the notification, displays the second representation 7338 at the second position in the three-dimensional environment that is selected based on the location of the second portion of the user in the physical environment. In some embodiments, the computer system also outputs a second audio alert in conjunction with displaying the second representation 7338 of the notification at the second position that is selected based on the location of the second portion of the user. In some embodiments, the second audio alert is a spatial audio alert that appears to originate from the second position in the three-dimensional environment. In some embodiments, the computer system also provides a third spatial audio alert that appears to originate from a moving source that moves from the first position to the second position in conjunction with displaying an animated transition that shows the representation of the notification (e.g., the first representation or the second representation, or some intermediate form of the two, etc.) moving from the first position to the second position in the three-dimensional environment. In some embodiments, the second spatial audio alert appears to originate from a moving source that moves in the three-dimensional environment in accordance with the movement of the second position of the second representation 7338 of the notification (e.g., as caused by the movement of the second portion of the user in the physical environment). The spatial audio alerts appear to originate from their virtual source positions independent of the movement of the first display generation component or the audio output devices in the physical environment, in accordance with some embodiments. In some embodiments, the audio alert that is played when the second representation 7338 of the notification is displayed at the second position that is selected based on the location of the second portion of the user gradually fades out after a preset amount of time.

In some embodiments, while displaying a respective representation of the first notification (e.g., the first representation 7334, the second representation 7338, etc.), the computer system detects movement of a hand of the user in the physical environment that includes opening the hand from a closed posture or raising the hand while the hand is in an open posture; and in response, the computer system displays the third representation 7336 of the notification in the three-dimensional environment (e.g., at a position in the three-dimensional environment that corresponds to the position of the hand of the first user in the physical environment), e.g., as shown in FIG. 7T, and optionally, without requiring a gaze input being directed to the region corresponding to the notification or the hand of the user.

In some embodiments, while displaying a respective representation of the first notification (e.g., the first representation 7334, the second representation 7338, etc.), the computer system detects movement of a hand of the user in the physical environment that includes opening the hand from a closed posture or raising the hand while the hand is in an open posture; and in response, the computer system displays a user interface object 7342 (e.g., an application user interface, a communication interface, a user interface that includes notification content and input interfaces for providing inputs requested in the notification, etc.) corresponding to the notification in the three-dimensional environment (e.g., at a position that is at least a threshold distance away from the user (e.g., anchored to the three-dimensional environment, not anchored to the user's hands, head, torso, etc.), etc.), e.g., as shown in FIG. 7U, and optionally, without requiring a gaze input being directed to the region corresponding to the notification or the hand of the user.

In some embodiments, while displaying a respective representation of the first notification (e.g., the first representation 7334, the second representation 7338, etc.), the computer system detects movement of a hand of the user in the physical environment that includes opening the hand from a closed posture followed by closing the hand (e.g., within a threshold amount of time after opening the hand, or after the third representation 7336 of the notification is displayed at the position that corresponds to the location of the user's open hand, etc.); and in response, the computer system dismisses the notification (e.g., ceasing the display the respective representation of the notification without displaying another representation or user interface corresponding to the notification, and clearing the notification from the three-dimensional environment, etc.), optionally, without requiring a gaze input being directed to the region corresponding to the notification or the hand of the user.

In some embodiments, while the third representation 7336 of the notification is displayed in the three-dimensional environment (e.g., at a position in the three-dimensional environment that corresponds to the position of an hand of the user), the computer system detects movement of another hand of the user that drags and drops content or objects (e.g., a file, a video, a photo, a document, a hyperlink, a contact card, text, an email, etc.) from a portion of the three-dimensional environment that is outside of the third representation 7336 of the notification to within the third representation 7336 of the notification; and in accordance with a determination that the content or object is dropped by the second hand of the user (e.g., as indicated by the termination of the drag and drop input) while the content or object is within the third representation 7336, the computer system adds a representation of the content or object in an input area within the third representation 7336 of the first notification. In some embodiments, the first notification is for a communication event, such as a received text message, a received email, a received phone call, a received invitation for a communication session with another user, a reminder for a conference call, etc. In some embodiments, the notification is for an event that requires the user's input in the form of content or object. In some embodiments, the content or object dropped into the third representation 7336 of the notification becomes part or all of a response to the request of information or input in the notification, or a reply to the communication event.

In some embodiments, the third representation 7336 of the notification changes its size in accordance with the movement of the hand toward or away from the face of the user. For example, in some embodiments, as the user's hand moves closer to the user's face, the computer increases the size of the third representation 7336 of the notification, e.g., to allow the user to see the content of the notification more clearly, or display more notification content in the third representation 7336 of the notification; and as the user's hand moves away from the user's face, the computer decreases the size of the third representation 7336 of the notification, e.g., to allow the user to view the content of the notification more comfortably, or display less notification content in the third representation 7336 of the notification. In some embodiments, the change in size of the third representation 7336 of the notification is not merely a change in displayed size due to the change in display distance from the viewpoint, but a change in the intrinsic size of the third representation 7336 of the notification in the three-dimensional environment. In some embodiments, as the user's hand 7202 moves closer to the user's face, the computer decreases the size of the third representation 7336 of the notification, e.g., to allow the user to see the content of the notification more comfortably, or display less notification content in the third representation 7336 of the notification; and as the user's hand moves away from the user's face, the computer increases the size of the third representation 7336 of the notification, e.g., to allow the user to view the content of the notification more clearly, or display more notification content in the third representation 7336 of the notification.

In some embodiments, while in the third representation 7336 of the notification is displayed at the third position that corresponds to the location of the user's hand 7202, the computer system detects a user input that drags content or object from a portion of the three-dimensional environment that is outside of the third representation 7336 of the notification to within the third representation 7336 of the notification. In response to detecting the user input, the computer system adds the content or object (e.g., a content item, a file, a hyperlink, a control affordance, a contact card, an avatar, etc.) into an input area within the third representation 7336 of the notification. In some embodiments, while in the third representation 7336 of the notification is displayed at the third position that corresponds to the location of the user's hand 7202, the computer system detects a user input that drags content or object within the third representation 7336 of the notification to a portion of the three-dimensional environment that is outside of the third representation 7336 of the notification. In response to detecting the user input, the computer system places a copy of the content or object (e.g., a content item, a file, a hyperlink, a control affordance, a contact card, an avatar, etc.) in the portion of the three-dimensional environment outside of the third representation 7336 of the notification. In some embodiments, the user input that drags and drops content or object between the third representation 7336 of the notification and a region of the three-dimensional environment outside of the third representation 7336 of the notification includes a pinch gesture by a second hand of the user that is detected in conjunction with a gaze input directed to the content or object (e.g., within the third representation 7336, or outside of the third representation 7336, etc.), followed by movement of the second hand while maintaining the pinch gesture, then followed by release of the pinch gesture while a drop off location has been selected by a gaze input or a location of the user's second hand.

FIGS. 7T-7U also illustrate display of an alert for an incoming communication request (e.g., a representation of a notification that is generated in response to the receipt of the communication request, the representation 7334 and 7338 of the notification in FIGS. 7P-7S, a representation of a notification that is displayed at a position that is selected based on the location of a preset portion of user (e.g., user's hand or wrist, face, head, torso, etc.) at a virtual position that is near the user's body (e.g., the user's hand or wrist, face, head, torso, etc.); and in response to detecting user interaction with the alert to accept the incoming communication request, the computer system displays a communication user interface corresponding to the incoming communication request at a position that is anchored to the three-dimensional environment, at least a threshold distance away from the virtual position of the user, in accordance with some embodiments.

As shown in FIG. 7T, the computer system displays a first view of the three-dimensional environment 7104 (e.g., a virtual three-dimensional environment, an augmented reality environment, a pass-through view of a physical environment, a camera view of a physical environment, etc.). While displaying the first view of the three-dimensional environment 7104, the computer system detects a first event (e.g., receipt of a notification or alert) that corresponds to an incoming request for establishing a communication session between the first user corresponding to the computer system and a second user different from the first user. In response to detecting the first event, the computer system displays a notification (e.g., a pop-up alert, an indicator of an event requiring user attention, etc.) at a respective position in the three-dimensional environment, wherein the respective position is selected based on a position in the three-dimensional environment that corresponds to a location of at least a preset portion of the first user in the physical environment (e.g., the notification is locked to the preset portion of the first user (e.g., head, body, hand, etc.)). In the example shown in FIG. 7T, the representation of the notification is displayed at a position that corresponds to the location of the user's hand or wrist (e.g., as the third representation 7336 in FIG. 7T). In some embodiments, the representation of the notification is displayed at a position that is selected based on the location of the user's hand or wrist, e.g., as the second representation 7338 in FIGS. 7R-7S (e.g., while the representation of the user's hand is not necessarily within the field of view provided by the first display generation component). In some embodiments, the representation of the notification is displayed at a position that is selected based on the location and orientation of the user's face or head (e.g., as the first representation 7334 in FIG. 7P). In some embodiments, the representation of the notification is displayed at a position that is selected based on the location and orientation of the user's torso (e.g., as the first representation 7334 in FIG. 7P).

In FIGS. 7T-7U, while displaying the notification at a respective position in the three-dimensional environment that is selected based on the respective position in the three-dimensional environment that corresponds to the location of at least the preset portion of the first user (e.g., the position of the first user's heard, body, or hand, etc.) in the physical environment (e.g., FIG. 7T shows the example where the preset portion of the first user is the hand 7202 of the user, while FIGS. 7P, and 7R, respectively, show the preset portion of the first user being other parts of the first user), the computer system detects a sequence of one or more user inputs that correspond to acceptance of the incoming request for establishing the communication session. For example, in some embodiments, the sequence of inputs includes inputs for interacting with one or more user interface objects and completing a sequence of one or more steps in a process for fully establishing the communication session, such as selecting operating parameters for the communication session, and providing authentication information for the communication session, etc. In some embodiments, the sequence of inputs includes a tap input on a "accept" affordance included in the currently displayed representation of the notification for the incoming communication request.

In FIG. 7U, in accordance with some embodiments, in response to detecting the sequence of one or more user inputs that corresponds to the acceptance of the incoming request for establishing the communication session, the computer system displays a plurality of user interface objects associated with the communication session (e.g., user avatar 7344 of the second user, a container object 7342 of the user interface that corresponds to the communication session, user interface objects 7346 and 7348 for various functions and/or content associated with the second user or the communication session, etc.) at respective second positions in the three-dimensional environment 7140 that are at least a threshold distance (e.g., at least an arm's length, a distance more than the viewing depth of the notification at the respective position selected based on the preset portion of the first user, etc.) away from a characteristic virtual position of the first user (e.g., the position of the viewpoint, a virtual position that corresponds to the location of the user's head or eyes in the physical environment, a virtual position that corresponds to the location of the user as a whole, etc.) in the three-dimensional environment. In some embodiments, the plurality of user interface objects associated with the communication session are locked to the representation of the physical environment in the three-dimensional environment (e.g., locked or anchored to the "world").

In some embodiments, the respective representation of the notification is displayed at a position that is selected based on a characteristic location of the first user as a whole (e.g., the location of the user's torso, the location of the base of the user's neck, etc.), and the representation of the notification moves in the three-dimensional environment in accordance with the movement of the characteristic location of the first user as a whole in the physical environment. As the first user moves as a whole in the physical environment, the viewpoint of the currently displayed view of the three-dimensional environment optionally moves in accordance with the movement of the first user as a whole, and the representation of the notification maintains a substantially constant spatial relationship relative to the viewpoint in the three-dimensional environment. However, as the first user's head moves relative to the first user's body, the movement of the viewpoint caused by the movement of the user's head alone does not cause movement of the representation of the notification in the three-dimensional environment.

In some embodiments, the respective representation of the notification is displayed at a position that is selected based on a characteristic location of the head of the first user (e.g., the location and orientation of the user's head, eyes, or face, etc.), and the respective representation of the notification moves in the three-dimensional environment 7104 in accordance with the movement of the characteristic location of the first user's head in the physical environment. As the first user moves as a whole, including the head, in the physical environment, the viewpoint of the currently displayed view of the three-dimensional environment moves in accordance with the movement of the first user's head, and the respective representation of the notification maintains a substantially constant spatial relationship relative to the viewpoint of the currently displayed view of the three-dimensional environment. In addition, as the first user's head moves relative to the first user's body, the movement of the first user's head causes both movement of the viewpoint and movement of the respective representation of the notification. As a result, the respective representation of the notification maintains its position in the field of view despite of the movement of the first user's head along with or relative to the first user's body. In some embodiments, as the respective representation of the notification is displayed at the position that is selected based on the characteristic location of the first user's head, the movement of the respective representation of the notification lags behind the movement of the viewpoint caused by the movement of the first user's head in the physical environment (e.g., the rotation of the first user's head relative to the first user's body left to right, right to left, upward, or downward, etc.). As a result, when the first user's head rotates in a first direction relative to the first user's body, the viewpoint moves in the first direction synchronously with the rotation of the first user's head, but the respective representation of the notification appears to start moving slightly after the movement of the viewpoint is started, and appears to shift to a second direction relative to the field of view in a direction that is opposite the first direction. The respective representation of the notification then catches up with the viewpoint, and returns to the same position in the field of view as before, a short period of time later.

In some embodiments, as shown in FIG. 7T, the respective representation of the notification (e.g., representation 7336) is displayed at a position that is selected based on a characteristic location of the user's hand (e.g., the location of the tip of a finger, the center of the hand, the wrist connected to the hand, the hand as a whole, etc.) in the physical environment. As the first user's hand moves in the physical environment, the respective representation of the notification appears to maintain a substantially fixed spatial relationship to the representation of the user's hand (e.g., representation 7202') in the three-dimensional environment, irrespective of movement of the viewpoint caused by the movement of the first user's torso, or head.

In some embodiments, the respective representation of the notification is displayed near an edge region of the field of view in accordance with a determination that a position that corresponds to the location of the user's hand is not currently within the field of view provided by the first display generation component, where the position of the respective representation of the notification within the edge portion of the field of view is selected based on the location of the user's hand. For example, the respective representation of the notification (e.g., representation 7338 in FIG. 7R) slides along the edge region of the field of view in the direction of the movement of the first user's hand outside of the field of view, in accordance with some embodiments.

In some embodiments, the respective representation of the notification is displayed at a position in the field of view that corresponds to the location of the user's hand, and overlays, replaces display of, or blocks the view of at least a portion of the region at or near the representation of the first user's hand (e.g., optionally, including at least a portion of the representation of the first user's hand). As the first user's hand moves in the physical environment, the respective representation of the notification moves in the field of view in accordance with the movement of the first user's hand such that a spatial relationship between the representation of the first user's hand and the respective representation of the notification is maintained. In some embodiments, the movement of the representation of the notification lags behind the movement of the representation of the user's hand slightly due to simulated inertia of the respective representation of the notification.

In some embodiments, the respective representation of the notification is initially displayed at a first position that is selected based on a first portion of the user (e.g., as shown in FIG. 7P), and then moves to a second position (or a third position) that is selected based on a second portion of the user (e.g., as shown in FIG. 7R or FIG. 7T), before the computer system detects the sequence of inputs that interact with the respective representation of the notification to accept the incoming communication request. In some embodiments, the computer system moves the respective representation of the notification from the first position to the second position (or the third position) along a path visible in the field of view (e.g., path 7335 in FIG. 7Q, or another path, etc.) to guide the first user to look at the second position (or the third position) in the three-dimensional environment before providing the sequence of user inputs to interact with the respective representation of the notification.

In some embodiments, the respective representation of the notification is initially displayed at the position that corresponds to the location of the user's hand if the representation of the user's hand is visible within the field of view (e.g., as shown in FIG. 7R, or 7T, respectively); and the respective representation of the notification is initially displayed at an edge portion of the field of view that is selected based on its closer proximity to the location of the user's hand in the physical environment if the representation of the user's hand is not visible within the field of view. In some embodiments, the position of the representation of the notification moves along the edge of the field of view to indicate to the first user that the first user should raise his/her hand into the field of view to look at the hand to see the notification.

In some embodiments, the representation of the notification is initially displayed at a position that is anchored to the user's head or face, and subsequently moves to a position that is anchored to the user's hand after a predetermined amount of time (e.g., if user interaction with the notification is not detected during the predetermined amount of time), e.g., in the manner described with respect to FIG. 7P-7S, or 7P-7T above.

In some embodiments, a visual representation of the notification is initially displayed at a position that is at a first distance away from a viewpoint of the currently displayed view of the three-dimensional environment and gradually moves closer to the viewpoint after it first showed up in the field of view.

In some embodiments, the computer system outputs an audio alert in conjunction with displaying a visual representation of the notification. In some embodiments, the visual representation of the notification is displayed before the audio alert is started. In some embodiments, the audio alert is a spatial audio output that appears to originate from the position at which the representation of the notification is and/or is to be displayed in the three-dimensional environment, despite of movement of the first user, the movement of the first display generation component, and the movement of the audio output devices used to output the spatial audio alert. In some embodiments, the position at which the representation of the notification is displayed moves in accordance with movement of the portion of the user to which it is currently anchored (e.g., the user's head, the user's torso, the user's hand, the user's wrist, etc.), and the spatial audio alert appears to originate from the position of the currently displayed representation of the notification, independent of the movements of other portions of the user, the first display generation component, and/or the audio output devices, that are independent of the movement of the portion of the user to which the representation of the notification is currently anchored.

In some embodiments, when displaying a representation of the notification at a position that is selected based on the location of the user's hand, the representation of the notification increases in size as the user's hand is raised closer toward the user's face. For example, when the user's hand is outside of the field of view, a small reduced representation of the notification is displayed near the edge portion of the field of view selected based on the location of the user's hand. As the user's hand is raised into the field of view, the representation of the notification moves to the position that corresponds to the user's hand and transforms into a more extensive version of the notification including notification content. When the user's hand continues to raise toward the user's face, the representation of the notification continues to expand to a suitable size for viewing at the position that corresponds to the location of the user's hand.

In some embodiments, the representation of the notification moves into the field of view provided by the first display generation or first appears in the field of view in a peripheral region of the field of view, such as near a side edge of the field of view (e.g., enters into view from the left side of the field of view, or enters into view from the right side of the field of view, as opposed to the top or bottom of the field of view).

In some embodiments, the representation of the notification that is displayed at position(s) that are anchored to a portion of the first user (e.g., the first user's head, the first user's hand, the first user's face, the first user's torso, etc.) and displayed within a threshold distance of the characteristic virtual location of the first user includes indications that identifies the second user that initiated the communication request, and/or a respective type of the communication session (e.g., voice-only call, video call, copresence in a three-dimensional environment (e.g., AR, VR, or XR environment), etc.) from multiple types of commutation sessions.

In some embodiments, the currently displayed representation of the notification is responsive to the first user's interaction while being displayed at a position that is selected based on the position of the user's head or torso (e.g., maintaining a stable spatial relationship to the viewpoint, or to the virtual position of the user, or to the field of view, etc.); and if no user interaction for accepting the communication request has been detected for at least a first preset amount of time since the initial display of the representation of the notification at the first position, the representation of the notification transforms into a reduced version of the notification (e.g., an indicator that identifies the type of the communication session or source of the communication request, a generic indicator, etc.) and is displayed at a position that is selected based on the position of the user's hand (e.g., maintaining a stable spatial relationship to the virtual position of the hand, or displayed in an edge portion of the field of view that is selected based on its closer proximity to the location of the user's hand as compared to other edge portions of the field of view, etc.) (e.g., as described with respect to FIGS. 7P-7S earlier). In some embodiments, if no user interaction for accepting the communication request has been detected for at least a first preset amount of time since the initial display of the representation of the notification at the first position, the computer system moves the representation of the notification closer to the viewpoint to draw the attention of the first user to the notification.

In some embodiments, as shown in FIG. 7U, the user interface 7342 that corresponds to the communication session between the first user and the second user are displayed at a position that is anchored to the three-dimensional environment, and does not move in accordance with the movement of the first user. For example, the user interface 7342 maintains a spatial relationship to a representation of the physical environment in the three-dimensional environment during movement of a viewpoint of a currently displayed view of the three-dimensional environment (e.g., movement of the viewpoint caused by a movement of the first display generation component, movement of the first user as a whole, movement and rotation of the head of the first user, etc. in the physical environment). In some embodiments, the computer system, optionally, allows the first user to reposition the user interface 7342 using an input that meets preset criteria (e.g., a drag and drop input, a swipe input, etc.). In some embodiments, the computer system optionally reduces the visibility of the background regions of the three-dimensional environment 7104 outside of the user interface object 7342, e.g., in the manner described with respect to FIGS. 7N-7O earlier.

FIGS. 7V-7X are block diagrams that illustrate a first computer system that is configured to display, via a first display generation component, a spatial mode and a non-spatial mode of a first user interface corresponding to a first communication session between a first user of the first computer system and a second user of a second computer system, where the spatial mode and the non-spatial mode are non-immersive modes of participating in the first communication session, and where the second user participates in the first communication session using an immersive mode in a first three-dimensional environment, in accordance with some embodiments.

In some embodiments, the first computer system (e.g., computer system 101-*t* in FIGS. 7V-7X, computer system 101 described with respect to FIGS. 7A-7U and 7Y-7Z, another computer system, etc.) selectively displays, via the first display generation component (e.g., display generation component 7100-*t* in FIGS. 7V-7X, display generation component 7100 described with respect to FIGS. 7A-7U and 7Y-7Z, another display generation component, etc.), the first user interface corresponding to the first communication session in a respective mode selected from a spatial mode (e.g., an AR mode, a VR mode, an XR mode, etc.) and a non-spatial mode (e.g., a gallery or showcase mode, a two-dimensional mode, etc.) of the first user interface, when the first computer system is participating in the first communication session using a non-immersive mode and at least one other user (e.g., the second user, and optionally a third user, etc.) is participating in the first communication session using an immersive mode. In some embodiments, in the spatial mode of the first user interface, a spatial relationship between a representation of the second user (e.g., the user that is participating in the first communication session in the immersive mode) and at least one other participant of the communication session (e.g., the first user that is participating in the first communication session using the non-immersive mode, a third user that is optionally participating in the first communication session in either an immersive mode or a non-immersive mode, etc.) in a first three-dimensional environment (e.g., a three-dimensional reference frame that is shared among the participants of the first communication session, and provides the basis for the respective view(s) of the first three-dimensional environment presented the participant(s)) is visually indicated in the first user interface. In some embodiments, if the first communication session is between the first user and two or more other users (e.g., the second user and the third user, and optionally, other users, etc.), the spatial relationships between the two or more other users in the first three-dimensional environment, and/or the spatial relationships between the first user and these two or more other users are, optionally, visually indicated in the first user interface in the spatial mode as well. In some embodiments, the first user interface displayed in the non-spatial mode (e.g., the showcase mode or gallery mode) does not visually indicate a spatial relationship between a representation of the second user and another participant of the communication session in a three-dimensional environment. In some embodiments, if the first communication session is between the first user and two or more other users (e.g., the second user and the third user, and optionally, other users, etc.), the respective representations of the two or more other users are displayed in accordance with a layout in the first user interface that is independent of the virtual positions of the participants in the first three-dimensional environment, and independent of the movement of the participant(s) (e.g., the second user, and optionally other users) that are participating in the first communication session in the immersive mode in the physical environment that causes changes in the virtual position(s) of the participant(s) in the first three-dimensional environment. In some embodiments, the first computer system switches between displaying the first user interface in the spatial mode or the non-spatial mode in response to detecting a change in the orientation of the first display generation component from a first preset orientation to a second preset orientation (e.g., from a portrait orientation to a landscape orientation, from a landscape orientation to a portrait orientation, from a substantially horizontal orientation to a substantially vertical orientation, etc.). In some embodiments, the first preset orientation and the second preset orientations are respectively defined by a corresponding range of angles and attitudes in three dimensions, as opposed to a single angle or attitude, relative to the physical environment or the face/head of the first user.

As shown in FIGS. 7V-7X, a first user 7200 is a user of a first computer system 101-t that is in communication with a first display generation component (e.g., display 7100-t, a touch-screen display, a standalone display, a display of a hand-held device, etc.) and one or more first input devices. In some embodiments, the first computer system 101-t is a handheld device, a desktop computer, a mobile device, a smart phone, or a tablet device. In some embodiments, the first display generation component 101-t is a touch-screen display, a LED display, a LCD display, a display that is separate from the first computer system 101-t, or a display that is integrated in the same housing as the first computer system 101-t and at least some of the one or more first input devices. In some embodiments, the first computer system 101-t in conjunction with the first display generation component 7100-t does not provide an immersive experience in a three-dimensional environment (e.g., an AR environment, a VR environment, an XR environment, etc.) during a communication session. For example, the first computer system 101-t, such as a tablet device or handheld device, optionally provides a viewport into an augmented reality view of the physical environment on the display of the first computer-system 101-t (e.g., a tablet device or handheld device), or into a virtual three-dimensional environment of the first communication session; but movement of the first user's head relative to the first display generation component 7100-t of the first computer system 101-t does not cause the first computer system 101-t to update the viewpoint of the augmented reality view or the viewpoint of the currently displayed view of the virtual three-dimensional environment (e.g., in contrast to the case with users that participate in the communication session in the immersive mode). When the first user participates in the first communication session with one or more other users that are participating in the communication session in the immersive mode in the first three-dimensional environment and having their respective positions and facing directions in the first three-dimensional environment updated in accordance with their movements in their physical environments, the first computer system 101-t allows the first user to see the real-time three-dimensional spatial relationships of the participants in a view of the first three-dimensional environment (e.g., an AR view, a VR view, etc.) in the spatial mode of the first user interface of the communication session, or to see the representations of the participants in a preset layout without showing the spatial relationships between the participants.

As shown in the right portion of FIG. 7V, the first computer system 101-t displays, via the first display generation component 7100-t, the first user interface of the first communication session between the first user 7200, the second user (e.g., represented by a representation 7203'), and, optionally, the third user (e.g., represented by a representation 7205'). In some embodiments, the second user is a user of the second computer system different from the first computer system. In some embodiments, the third user is a user of a third computer system different from the first and second computer systems. In some embodiments, the second computer system is a device (e.g., the computer system 101 described with respect to FIGS. 7A-7U, and 7Y-7Z, another computer system, HMD, etc.) that provides a fully-immersive co-presence experience in the first communication session. In some embodiments, the third computer system is a device (e.g., the computer system 101 described with respect to FIGS. 7A-7U, and 7Y-7Z, another computer system, HMD, etc.) that provides a fully-immersive co-presence experience in the first communication session for the third user. In some embodiments, the third computer system is a device (e.g., the computer system 101-t described with respect to FIGS. 7V-7X, another computer system, a handheld or tablet device, etc.) that is similar to the first computer system and does not provide a fully-immersive co-presence experience in the first communication session for the third user. In some embodiments, the second user is participating in the first communication session within a view of the first three-dimensional environment 7207 that is customized based on the physical environment of the second user or virtual elements selected by the second user or the second computer system.

The upper left portion of FIG. 7V provides an example of the first three-dimensional environment 7207 in which three-dimensional spatial relationships among the participants of the first communication session are indicated by their respective positions and facing directions in the same three-dimensional coordinate system. In some embodiments, the first three-dimensional environment 7207 is a three-dimensional environment based on which AR or VR environments shown to the participants of the communication session are constructed. As shown in FIG. 7V, each participant of the first communication session has a corresponding position and facing direction in the first three-dimensional environment 7207. In this example, the virtual position and facing direction of the second user (represented by the representation 7203') and the virtual position and facing direction of the third user (represented by the representation 7205') are such that they both are positioned in front of and facing toward the virtual position of the first user (e.g., represented by representation 7100-t' for the first display generation component 7100-t, enclosing a representation 7200' for the first user 7200), with the virtual position of the second user on the left and the virtual position of the third user on the right, and with the virtual position of the second user being closer to the virtual position of the first user than the virtual position of the third user.

In some embodiments, the respective view of the first three-dimensional environment 7207 that is presented to a respective participant of the first communication session is augmented with a representation of a respective physical environment of the respective participant of the first communication session. For example, when displaying the spatial mode of the first user interface, the first computer system presents the first user with a view of the first three-dimensional environment 7207 that is augmented with a representation of the physical environment 100 that surrounds the first user 7200, while the second computer system presents the second user with a view of the first three-dimensional environment 7207 that is augmented with a representation of another physical environment that surrounds the second user. Similarly, the third user is optionally presented with a view of the first three-dimensional environment 7207 that is augmented with a representation of yet another physical environment that surrounds the third user. For example, in the upper left portion of FIG. 7V, virtual positions of the physical walls 7004 and 7006 and floor 7008 of the physical environment 100 of the first user 7200 are shown (e.g., as representations 7004-t', 7006-t', and 7008-t', respectively) relative to the virtual positions of the first user, the second user, and the third user in the first three-dimensional environment 7207. In some embodiments, the spatial relationship between the representation of the physical environment of the first user and the virtual position of the first user in the first three-dimensional environment 7207 corresponds to the spatial relationship between the physical environment of the first user and the first user in the physical environment of the first user. In the spatial mode, the first user interface of the first communication session shown to the first user 7200 visually indicates a spatial relationship between the representation of the physical environment to the viewpoint of the currently displayed view 7106 of the first three-dimensional environment 7207 (e.g., by changing the size, appearance, viewing perspective, etc.) in accordance with the spatial relationship the virtual position of the physical environment and the virtual position of the first user in the first three-dimensional environment 7207, in accordance with some embodiments. In the spatial mode, the first user interface of the first communication session shown to the first user 7200 shows the representations of the second user and the third user (e.g., representations 7203' and 7205') with respective spatial relationships to the viewpoint of the view 7106 of the first three-dimensional environment 7207 in accordance with the spatial relationships between the virtual positions and facing directions of the second user and the third user and the virtual position and facing direction of the first user in the first three-dimensional environment 7207, in accordance with some embodiments. The spatial relationship between the representation 7203' of the second user and the representation 7205' of the third user in the view 7106 of the first three-dimensional environment 7207 shown to the first user corresponds to the spatial relationship between the virtual positions and facing directions of the second user and the third user in the first three-dimensional environment 7207, in accordance with some embodiments. In some embodiments, while the first display generation component 7100-t shows the spatial mode of the first user interface of the first communication session (e.g., as shown in the right portion of FIG. 7V), the second computer system used by the second user shows an immersive three-dimensional view of the first three-dimensional environment 7207. In some embodiments, in the immersive view of the first three-dimensional environment 7207, the representation 7100-t' of the first user 7200 (including the representation 7200' of the first user) and the representation 7205' of the third user are shown in an augmented reality view of the second user's physical environment, and the spatial relationship between the representation 7100-t' and the viewpoint of the AR view shown to the second user corresponds to the spatial relationship between the virtual positions of the first user and the second user in the first three-dimensional environment 7207. The virtual position of the respective physical environment of the second user in the first three-dimensional environment 7207 is determined based on the spatial relationship between the second user and its own physical environment, and is used to determine the spatial relationship between the representation of the physical environment of the second user and the viewpoint of the AR view shown to the second user by the second computer system, in accordance with some embodiments.

In some embodiments, the respective view of the first three-dimensional environment 7207 shown to a respective participant of the first communication session includes representation of a respective physical environment and/or virtual elements chosen by the respective participant for the first communication session; but the spatial positioning of the participants relative to one another is based on the same reference frame of the first three-dimensional environment 7207 and shared among the participants. In some embodiments, the spatial positioning of the participants in the first three-dimensional environment 7207 are reflected by the positioning and viewing angles of the representations of the participants in the respective user interfaces of the communication session shown via the respective display generation components of the participants.

In some embodiments, as shown in the right portion of FIG. 7V, the first user interface of the first communication session in the spatial mode includes a view 7106 of the first three-dimensional environment 7207 in which the appearance (e.g., placement, orientation, size, etc.) of the first representation 7203' of the second user indicates a spatial positioning of the second user relative to the third user in the first three-dimensional environment 7207 (e.g., second user is to the left of third user, and facing the same direction as the third user, etc.). In addition, the appearance (e.g., placement, orientation, size, etc.) of the representation 7203' of the second user visually indicates its spatial relationship with the viewpoint of the currently displayed view 7106 of the first three-dimensional environment 7207 (e.g., an augmented reality view of the physical environment 100 of the first user) that is based on a spatial positioning of the second user relative to the first user in the first three-dimensional environment 7207 (e.g., the second user is in front of the first user, off to the left of first user, and between the wall 7004 and the first user; and closer to the first user than the third user, etc.). In some embodiments, the same spatial relationship between the first user and the second user is shown in the respective view of the first three-dimensional environment 7207 displayed to the second user (e.g., as visually reflected by the positioning of the representation 7100-t' of the first display generation component and/or representation 7200' of the first user relative to the viewpoint of the respective view of the first three-dimensional environment 7207 shown to the second user by the second computer system via the second display generation component).

In some embodiments, while the first computer system 101-t is displaying the first user interface of the first communication session in the spatial mode, the first computer system allows the first user to change the virtual position and facing direction of the first user in the first three-dimensional environment 7207 by providing preset user inputs. For example, as shown in FIG. 7W following FIG. 7V, while displaying the first user interface of the first communication session in the spatial mode (shown in FIG. 7V), the first compute system 101-*t* detects first movement of the first user 7200 (e.g., detecting movement of the first display generation component 7100-*t* in the physical environment 100 of the first user 7200 caused by the movement of the first user's hand holding the first display generation component 7100-*t*, or movement of the first display generation component 7100-*t* as controlled by the first user 7200 using a controller device, etc.). In some embodiments, the movement of the first display generation component 7100-*t* includes translation of the first display generation component 7100-*t* in the physical environment 100 of the first user 7200. For example, as shown in FIG. 7W following FIG. 7V, the first display generation component 7100-*t* is moved closer to the wall 7004, and higher up relative to the first user 7200 and the floor 7008. As a result, the virtual position of the first user 7200 (as represented by representation 7100-*t*' and the representation 7200' in the first three-dimensional environment 7207 in the upper left portion of FIG. 7W) is moved in the first three-dimensional environment 7207 closer to the representation 7004-*t*' of the wall 7004, and farther away from the representation 7008-*t*' of the floor 7008. In some embodiments, the changes to the virtual position of the first user 7200 in the first three-dimensional environment 7207 is visually indicated in the view 7106 of the first three-dimensional environment 7207 shown via the first display generation component 7100-*t*, as shown in the right portion of FIG. 7W. For example, the representation 7004-*t*' of the wall 7004 appears closer to the viewpoint of the view 7106 of the first three-dimensional environment 7207 provided by the first display generation component 7100-*t* in the right portion of FIG. 7W. The viewpoint of the view 7016 of the first three-dimensional environment 7207 also appears higher relative to the representation 7008-*t*' of the floor 7008 in the view 7016 shown by the first display generation component 7100-*t* in FIG. 7W, in accordance with some embodiments. In some embodiments, the movement of the first display generation component 7100-*t* relative to the physical environment 100 includes a rotation of the first display generation component 7100-*t* around a vertical axis perpendicular to the floor 7008, and the virtual facing direction of the first user 7200 and the viewing perspective of the view 7106 will be changed in accordance with the rotation of the first display generation component 7100-*t* around the vertical axis. In some embodiments, updating the first user interface of the first communication session in the spatial mode displayed by the first computer system 101-*t* includes changing the view of the representation 7203' of the second user and the view of the representation 7205' of the third user to indicate a changed spatial positioning of the second user and the changed spatial positioning of the third user relative to the virtual position of the first user in the first three-dimensional environment 7207. As shown in FIG. 7W, the representation 7203' of the second user and the representation 7205' of the third user both appear to be closer to the viewpoint in the updated view 7106 of the first three-dimensional environment 7207 due to the changed virtual position of the first user (e.g., due to movement of the first display generation component 7100-*t* in the physical environment 100). As shown in FIG. 7W, the representation 7203' of the second user and the representation 7205' of the third user also appear to be lower relative to the viewpoint in the updated view 7106 of the first three-dimensional environment 7207 due to the changed virtual position of the first user in the first three-dimensional environment 7207.

In some embodiments, the virtual position of the first user 7200 in the first three-dimensional environment 7207 is, optionally, changed in response to a user input from the first user 7200 that is detected via one or more input devices in communication with the first computer system 101-*t*. In some embodiments, the user input includes a finger gesture detected by a camera, a touch gesture detected by a touch-sensitive surface or touch screen display, a movement input detected by a joystick or button, an activation of a graphical user interface element displayed on a touch-screen display, etc. In some embodiments, the user input includes a predefined gesture input provided by the first user 7200 that includes movement of a hand of the first user 7200 (e.g., a swipe gesture on a touch-screen display that serves as the first display generation component 7100-*t*, a tap gesture on a control affordance for moving the viewpoint of the currently displayed AR view, a swipe input or joystick input for moving the viewpoint of the currently displayed AR view, etc.). In some embodiments, the gesture input and the movement of the first display generation component 7100-*t* can be detected by the first computer system 101-*t* at the same time, and, optionally, one or both are used to determine the movement of the virtual position of the first user 7200 in the first three-dimensional environment 7207.

In some embodiments, in accordance with the change in the virtual position and facing direction of the first user 7200 in the first three-dimensional environment 7207 in accordance with the input received from the first user 7200 (e.g., through movement of the first display generation component 7100-*t*, or a gesture input detected via an input device in communication with the first computer system 101-*t*, etc.) when the first user interface of the first communication session is displayed in the spatial mode (e.g., as shown in FIGS. 7V and 7W), the second computer system used by the second user also updates the respective view of the first three-dimensional environment 7207 displayed to the second user to reflect the changed virtual position of the first user in the first three-dimensional environment 7207. For example, the spatial relationship between the representation of the first user and the viewpoint of the currently displayed view of the first three-dimensional environment shown to the second user via the second display generation component used by the second user is updated in the currently displayed view of the first three-dimensional environment displayed via the second display generation component used by the second user, in accordance with some embodiments. In addition, the spatial relationship between the representation of the first user and the representation of the physical environment of the second user in the currently displayed view of the first three-dimensional environment that is shown to the second user is also updated in the currently displayed view of the first three-dimensional environment displayed via the second display generation component used by the second user, in accordance with some embodiments. In addition, the spatial relationship between the representation of the first user and the representation of the third user is also updated in the currently displayed view of the first three-dimensional environment displayed via the second display generation component used by the second user, in accordance with some embodiments.

In the example scenario shown in FIGS. 7V-7W, the second user and the third user also moved their virtual positions in the first three-dimensional environment 7207. For example, the second user optionally moves (e.g., translates or turns, etc.) (e.g., moved in a direction that corresponds to a direction away from the virtual position of the first user, and a direction that corresponds to a direction toward the virtual position of the third user, etc.) in his/her own physical environment which causes a corresponding movement of the virtual position and facing direction of the second user in the first three-dimensional environment 7207. Similarly, the third user optionally moves (e.g., moved in a direction that corresponds to a direction toward the virtual position of the first user, and turned toward a direction that corresponds to a direction toward the virtual position of the second user, etc.) in his/her own physical environment which causes a corresponding movement of the virtual position and facing direction of the third user in the first three-dimensional environment 7207. In some embodiments, the second user optionally moves his/her virtual position in the first three-dimensional environment using an input that corresponds to a request for locomotion in the first three-dimensional environment without physically moving as a whole in his/her own physical environment. Similarly, the third user optionally moves his/her virtual position in the first three-dimensional environment using an input that corresponds to a request for locomotion in the first three-dimensional environment without physically moving as a whole in his/her own physical environment. As shown in upper left portions of FIGS. 7V-7W, the virtual positions and/or facing directions of the first user, the second user, and the third user all changed in the first three-dimensional environment 7207 in accordance with various movements and inputs from the respective users, and the new spatial relationships among the first user, the second user, and the third user in the first three-dimensional environment 7207 are reflected in the view 7106 of the first three-dimensional environment 7207 shown to the first user (e.g., in a spatial mode of the first user interface of the first communication session), to the second user (e.g., in an immersive co-presence view of the first communication session). Optionally, the new spatial relationships among the first user, the second user, and the third user are reflected in the respective view of the first three-dimensional environment 7207 shown to the third user by a third display generation component that is used by the third user (e.g., in a spatial view, or a co-presence view, depending on how the third user is participating in the communication session).

In FIG. 7X following FIG. 7V or 7W, while displaying the first user interface of the first communication session in the spatial mode, where the spatial relationships of the participants are visually indicated by the respective representations of the second user and the third user in the view 7106 of the first three-dimensional environment 7107 (e.g., shown in FIG. 7V or 7W), the first computer system 101-*t* detects a first user input that corresponds to a request to display the non-spatial mode of the first user interface (e.g., corresponding to a request to display the respective representation 7203' of the second user (and, optionally, the respective representation(s) of other participant(s) of the first communication session) in the non-spatial mode that does not indicates the spatial positioning of the second user (and, optionally, the spatial positioning of other participants) relative to the representation of the at least one other user in the first communication session in the first three-dimensional environment. For example, the request is for displaying the user interface of the communication session in the showcase mode, where the representations of the participants other than the first user are displayed in a preset layout in the first user interface, irrespective of the virtual positions and facing directions of the participants in the first three-dimensional environment 7207 (e.g., while the view(s) of the first three-dimensional environment shown to other participants that are in the immersive copresence mode or the spatial mode are still based on virtual positions of the participants in the first three-dimensional environment). In the example shown in FIG. 7X, the first user input includes a rotation of the first display generation component 7100-*t* from a first preset orientation that corresponds to the spatial mode of the first user interface to a preset second orientation that corresponds to the non-spatial mode of the first user interface (e.g., from a landscape orientation to a portrait orientation of the first display generation component 7100-*t*, with tolerance within a preset range of angles and attitudes relative to the physical environment or the head/face of the first user). In some embodiments, the first user interface provides an affordance (e.g., a button, a switch, etc.) that, when activated, changes (e.g., toggles or selects) the display mode of the first user interface between the spatial mode and the non-spatial mode. In some embodiments, the first user input includes a preset gesture for switching the display mode of the first user interface (e.g., a snap of fingers, a finger drawing a circle in the air or on another hand, etc.) between the spatial mode and the non-spatial mode. As shown in FIG. 7X, in response to detecting the first user input, the first computer system 101-*t* displays the first user interface of the first communication session in the non-spatial mode in which the respective representation 7203' of the second user is displayed in a manner without indicating the spatial positioning and facing direction of the second user relative to the other participants of the communication session in the first three-dimensional environment 7207. For example, the representation 7203' of the second user is displayed at a preset position in the first user interface in the non-spatial mode 7110. In some embodiments, the representation 7203' of the second user has an appearance that corresponds to a preset camera distance and angle, irrespective of how the spatial relationship between the first user 7200 and the first display generation component 7100-*t* in the physical environment of the first user is changing, irrespective of how the first display generation component 7100-*t* is moving in the physical environment of the first user, and irrespective of how the second user may be moving in his/her own physical environment. Similarly, the representation 7205' of the third user is displayed at a different preset position from the representation 7203' of the second user in the first user interface in the non-spatial mode 7110. In some embodiments, the representation 7205' of the third user has an appearance that corresponds to a preset camera distance and angle, irrespective of how the spatial relationship between the first user 7200 and the first display generation component 7100-*t* in the physical environment of the first user 7200 is changing, irrespective of how the first display generation component 7100-*t* is moving in the physical environment of the first user, and irrespective of how the third user may be moving in his/her own physical environment. The spatial relationship between the representation 7203' of the second user and the representation 7205' of the third user in the first user interface displayed in the non-spatial mode has static positions in the first user interface that do not reflect the spatial relationship of the virtual positions of the second user and the third user or the changes of their spatial relationship in the first three-dimensional environment 7207. In some embodiments, as shown in FIG. 7X, the respective representations of the participants of the communication session are displayed in a grid or on a plane in accordance with a preset layout that is static or scrollable in a preset direction. In some embodiments, the positions of the representations are optionally selected by the first user, or in accordance preset criteria (e.g., alphabetically by user name, ordered based on timing of when the participants joined the communication session, etc.).

In some embodiments, when the first user interface of the first communication session is displayed in the non-spatial mode, e.g., as shown in FIG. 7X, the second computer system that is used by the second user to participate in the first communication session continues to display the representation of the first user in a respective view of the first three-dimensional environment 7207 that visually indicates the spatial relationship between the virtual position of the first user and the virtual position of the second user in the first three-dimensional environment 7207. For example, in some embodiments, when the second user moves (e.g., translates, or turns, etc.) in his/her respective physical environment, the virtual position and/or facing direction of the second user are updated in the first three-dimensional environment 7207 in accordance with the movement of the second user, and the spatial relationship between the virtual position of the first user and the virtual position of the second user are also updated. As a result, the spatial relationship between the representation of the first user and the viewpoint of the currently displayed view of the first three-dimensional environment shown via the second display generation component is updated in the currently displayed view of the first three-dimensional environment according to the changed spatial relationship between the virtual positions of the first user and the second user in the first three-dimensional environment. Similarly, the third user optionally moves in his/her physical environment which causes movement of the virtual position of the third user in the first three-dimensional environment; and as a result, the representation of the third user as shown in the currently displayed view of the first three-dimensional environment displayed via the second display generation component of the second user is moved relative to the viewpoint in accordance with the updated virtual position of the third user and the updated spatial relationship between the second user and the third user in the first three-dimensional environment.

In some embodiments, while the first computer system displays the first user interface of the first communication session in the non-spatial mode, movement of the first user 7200 or the first display generation component 7100-t does not cause corresponding movement of the virtual position of the first user in the first three-dimensional environment 7207. In some embodiments, while the first computer system 101-t displays the first user interface of the first communication session in the non-spatial mode, the first computer system 101-t does not allow the first user 7200 to change the virtual position of the first user in the first three-dimensional environment 7207 via user inputs. However, in some embodiments, while the first computer system 101-t displays the first user interface of the first communication session in the non-spatial mode, the virtual position of the first user in the first three-dimensional environment 7207 can be changed in response to user input received from the second user (e.g., at least in the view of the first three-dimensional environment shown to the second user by the second display generation component). For example, in some embodiments, in response to detecting a user input from the second user that includes dragging the representation of the first user in the respective view of the first three-dimensional environment 7207 from a first position to a second position, the second computer system changes the virtual position of the first user from the first position to the second position in the first three-dimensional environment 7207, where the new virtual position of the first user is used by the respective computer systems of the participant(s) that is participating in the first communication session in the immersive mode and optionally the spatial mode, including the first computer system, and, optionally, the third computer system used by the third user, etc., to determine where to display the representation of the first user relative to the viewpoint when the respective computer systems display an immersive copresence view of the first communication session and, optionally, a spatial mode of the first user interface of the first communication session. In some embodiments, when the virtual position of the first user is changed in response to user input received from the second user while the first computer system is displaying the non-spatial mode of the first user interface, the first computer system continues to display the first user interface in the non-spatial mode and maintains the relative positions of the representations of participants in the first user interface without regard to the changed virtual positioning of the first user in the first three-dimensional environment.

In some embodiments, when the first computer system is displaying the first user interface of the first communication session in the spatial mode, the second computer system does not change the virtual position of the first user in response to user inputs received from the second user, and, optionally, prevents the second user from changing the position of the representation of the first user in the currently displayed view of the first three-dimensional environment shown via the second display generation component to the second user. For example, in some embodiments, the representation of the first user is displayed with a different appearance to visually indicate to the second user whether the first computer system is currently displaying the first user interface in the spatial mode or the non-spatial mode. In some embodiments, when the second user makes an attempt to grab or move the representation of the first user in the currently displayed view of the first three-dimensional environment shown via the second display generation component, the second computer system grays out the representation of the first user or temporarily moves the representation of the first user away from the location of the representation of the second user's hand, to indicate to the second user that the virtual position of the first user is not in the control of the second user at this moment, but rather in the control of the first user him/herself.

In some embodiments, as shown in FIG. 7X, while the first computer system displays the first user interface of the first communication session in the non-spatial mode, the representations of the second user and the third user (e.g., representation 7203' and representation 7205') have the same facing direction and orientation (e.g., upright, facing toward the front side of the first display generation component 7100-t, etc.), irrespective of which ways the second user and the third user are actually facing in their respective physical environments. In some embodiments, as shown in FIGS. 7V and 7W, while the first computer system displays the first user interface of the first communication session in the spatial mode, the representations of the second user and the third user (e.g., representation 7203' and representation 7205') have respective facing direction and orientation (e.g., bending forward or backward, facing different angles relative to the viewpoint and the front side of the first display generation component 7100-t, etc.) based on which ways the second user and the third user are actually facing in their respective physical environments.

In some embodiments, as shown in FIG. 7X, the first user interface of the first communication session displayed in the non-spatial mode (e.g., user interface 7110) does not include a representation of the physical environment 100 of the first user 7200. In some embodiments, the first user interface of the first communication session displayed in the non-spatial mode includes the representations of the second user and the third user (e.g., representation 7203' and representation 7205') in a virtual environment (e.g., a virtual two dimensional environment, a virtual three-dimensional environment, etc.). In some embodiments, the first user interface of the first communication session displayed in the non-spatial mode includes a virtual three-dimensional environment, and the representations of the participants are shown in a virtual conference room at preset positions that are selected independent of the virtual positions of the participants in the first three-dimensional environment 7207 (and independent of the movement and/or inputs of the participants that change the virtual positions of the participants in the first three-dimensional environment 7207).

In some embodiments, as shown in FIGS. 7V and 7W, the first user interface of the first communication session displayed in the spatial mode includes a representation of the physical environment 100 of the first user 7200 (e.g., representations 7004-t', 7006-t', and 7008-t' for the walls 7004 and 7006 and floor 7008, etc.). The physical objects and physical surfaces in the physical environment have corresponding virtual positions and virtual representations in the first three-dimensional environment 7207, and the representations of the physical objects and physical surfaces are displayed in the view 7106 of the first three-dimensional environment 7207 shown via the first display generation component 7100-t to visually indicate their spatial relationships to the representation of the first user in the first three-dimensional environment 7207. Accordingly, the representations of the physical objects and physical surfaces are displayed in the view 7106 of the first three-dimensional environment shown via the first display generation component 7100-t to visually indicate their spatial relationships to the representation 7203' of the second user and the representation 7205' of the third user in the first three-dimensional environment 7207. In some embodiments, the representation of the physical environment shown in the view 7106 of the first three-dimensional environment 7207 displayed via the first display generation component 7100-t to the first user 7200 is not displayed in the respective view of the first three-dimensional environment 7207 displayed via the second display generation component to the second user. Instead, a representation of the physical environment of the second user is displayed in the respective view of the first three-dimensional environment 7207 displayed via the second display generation component to the second user, in accordance with the spatial relationship between the second user and the physical environment of the second user.

In some embodiments, the second user participates in the first communication session in an immersive copresence mode where the second user views the first three-dimensional environment 7207 with representations of the participants displayed at respective positions and facing directions that correspond to their virtual positions and facing directions in the first three-dimensional environment 7207, such that the spatial relationships between the participants in the first three-dimensional environment 7207 are visually reflected in the spatial relationships between the representations of the participants (e.g., relative to one another and relative to the viewpoint of the currently displayed view of the first three-dimensional environment). In some embodiments, in the respective view of the first three-dimensional environment shown to the second user via the second display generation component, the representation of the first user includes a live video feed of the first user received from the first computer system. In some embodiments, the live video feed of the first user is included in a container object that can be repositioned in the respective view of the first three-dimensional environment 7207 in response to user inputs received from the second user by the second computer system. In some embodiments, when the second computer system repositions the container object including the live video feed of the first user in the respective view of the first three-dimensional environment shown via the second display generation component, the second computer system also updates the virtual position of the first user in the first three-dimensional environment according to the user inputs received from the second user. In some embodiments, when the second user and the third user both participate in the first communication session in the immersive copresence mode, the virtual position of the first user in the first three-dimensional environment is optionally movable by both the second user and the third user. In some embodiments, the second user and the third user optionally move the representation of the first user in the respective views of the first three-dimensional environment displayed on their respective display generation components, without affecting the view(s) shown to other participants of the first communication session. In some embodiments, the second user and the third user are optionally allowed to move the representation of the first user in the respective views of the first three-dimensional environment displayed on their respective display generation components, and both the second user and the third user can cause changes in the view shown to other participants that are seeing the three-dimensional environment in an immersive mode or spatial mode.

In some embodiments, as shown in FIG. 7X, the first user interface of the first communication session is displayed in the non-spatial mode, and includes a self-view of the first user (e.g., representation 7200"). In some embodiments, the self-view of the first user shown in the non-spatial mode via the first display generation component 7100-t includes a representation of the first user 7200 that is the same as the representation of the first user shown in the immersive copresence view of the first three-dimensional environment that is displayed via the second display generation component to the second user. In some embodiments, the self-view of the first user is shown in a corner of the first user interface in the non-spatial mode. In some embodiments, the self-view of the first user is shown side by side to the representations of other participants (e.g., representation 7203' and representation 7205', etc.) of the first communication session in the first user interface in the non-spatial mode 7110. In some embodiments, the self-view of the first user includes an animated or stationary avatar of the first user 7200 instead of a live video feed of the first user.

In some embodiments, as shown in FIGS. 7V and 7W, the first user interface of the first communication session is displayed in the spatial mode, and includes a self-view of the first user (e.g., representation 7200"). In some embodiments, the self-view of the first user 7200 shown in the spatial mode via the first display generation component 7100-t includes a representation of the first user that is the same as the representation of the first user shown in the immersive copresence view of the first three-dimensional environment 7207 that is displayed via the second display generation component to the second user. In some embodiments, the self-view of the first user is shown in a corner of the first user interface in the spatial mode 7106. In some embodiments, the self-view of the first user is shown in a picture-in-picture view, where the view 7106 of the first three-dimensional environment 7207 shows the live video feed or pass-through view of the physical environment 100 with the representations of the other participants (e.g., the second user, the third user, etc.) overlaying, replacing display of, or blocking at least a portion of the representation of the physical environment 100 of the first user, and where the self-view of the first user shows a live video feed of the first user captured by a different camera facing the opposite direction as the camera for the live video feed of the physical environment 100.

In some embodiments, as shown in FIG. 7X, while the first display generation component 7100-*t* displays the representations 7203' of the second user and the representation 7205' of the third user in the non-spatial mode of the first user interface of the first communication session, the representation 7203' of the second user and the representation 7205' of the third user appear to be captured with virtual cameras that have a preset camera distance and camera angle (e.g., facing straight toward the user that is being captured, at a fixed distance from the user that is being captured), such that their representations appear to face toward the first user and have roughly the same size on the first user interface shown in the non-spatial mode (e.g., as shown in FIG. 7X) via the first display generation component 7100-*t*. The representations of the second user and the third user do not rotate (e.g., to reflect a changing camera angle) or change their sizes (e.g., to reflect a changing camera distance) in the first user interface in the non-spatial mode 7110, even though the second user and/or the third user may move or turn to face different directions in their respective physical environments. In contrast, when the first user interface of the first communication session is displayed in the spatial mode (e.g., as shown in FIGS. 7V and 7W), the representations 7203' and 7205' of the second user and the third user appear to be captured by a virtual camera that has a camera position and camera angle corresponding to the virtual position and facing direction of the first user in the first three-dimensional environment 7207. As a result, when the first user, the second user, and the third user move in their respective physical environments, the representations of the second user and the third user appear to be captured by virtual cameras from different camera distances and/or camera angles, and appear to have changing sizes (e.g., to reflect a changing camera distance) and/or to rotate around a vertical axis that passes through the floor (e.g., to reflect a changing camera angle).

In some embodiments, the participants of the first communication session are allowed to share media content in a shared region of the first three-dimensional environment 7207 using their respective computer systems, such that all or a subset of selected participants of the first communication session are able to view the media content at the same time (e.g., having the media content available for viewing, or playing back the media content at the same time, synchronizing playback of the media content across the display generation components of the different participants, etc.). In some embodiments, the second computer system of the second user displays a respective view of the first three-dimensional environment via the second display generation component, but keeps objects and content shown in a first region of the first three-dimensional environment private to the second user, and does not allow the objects and content to be available for viewing by other participants of the first communication session (e.g., the first user, the third user, etc.). In some embodiments, in response to detecting an input from the second user that corresponds to a request to move a first content or object from the first region of the first three-dimensional environment to the shared region of the first three-dimensional environment, the second computer system displays the first content or object in the shared region of the first three-dimensional environment, and enables computer systems of other participants of the first communication session (e.g., the first computer system, the third computer system, etc.) to display the first content or object on their respective display generation components (e.g., in their respective views of the first three-dimensional environment). In some embodiments, when the first content or object is located in the shared region of the first three-dimensional environment (e.g., placed into the shared region by the second user, or by another participant, etc.), other participants of the first communication session (e.g., the first user, the third user, etc.) optionally provide inputs to their own computer systems to cause repositioning of the first content or object within the shared region of the first three-dimensional environment. In some embodiments, the user input for repositioning the first content or object in the shared region of the first three-dimensional environment only affects the position and orientation of the first content or object in the respective view of the first three-dimensional environment that is shown to the user that provided the user input, and not in the respective view(s) of the first three-dimensional environment that are shown to other user(s) that did not provide the user input. In some embodiments, the user input for repositioning the first content or object in the shared region of the first three-dimensional environment affects the position and orientation of the first content or object in the respective view of the first three-dimensional environment that is shown to the user that provided the user input, as well as in the view(s) of the first three-dimensional environment that are shown to other user(s) that did not provide the user input.

In some embodiments, as shown in FIGS. 7V and 7W, when the first user interface of the first communication session is displayed in the spatial mode, the representations of the second user and the third user are placed in the view 7106 of the first three-dimensional environment 7207 at positions and with facing directions that are determined automatically (e.g., without inputs from the first user or other users, not in response to and not in accordance with inputs from the first user or other users, etc.) by the first computer system or a server of the first communication session. For example, the virtual positions of the first user, the second user, and the third user in the first three-dimensional environment 7207 are automatically selected by a server of the communication session, so that the participants appear to be collocated in the same region of the first three-dimensional environment 7207, and facing toward one another in a circle or around an object of interest in the first three-dimensional environment (e.g., a shared content object, a virtual conference table, etc.). In some embodiments, prior to the start of the first communication session, the second computer system receives user input from the second user that positions the avatar(s) or representation(s) of the first user and, optionally the third user, in the respective view of the first three-dimensional environment 7207 shown via the second display generation component; and in accordance with the user input from the second user, the second computer system establishes and/or updates the virtual positions of the first user and the third user relative to the virtual position of the second user in the first three-dimensional environment. In some embodiments, when the second user and the third user move around in their physical environments to change the positions and facing directions of their respective representations in the first three-dimensional environment 7207, the first display generation component 7100-*t* shows the representations of the second user and the third user in the first user interface displayed in the spatial mode in accordance with the changed positions and/or facing directions of the representations of second user and the third user in the first three-dimensional environment 7207 (e.g., as caused by the movement of the second user and the third user in their physical environments).

In some embodiments, while the first display generation component 7100-*t* displays the representations of the second user and the third user in the first user interface of the first communication session (e.g., in the spatial mode, in the non-spatial mode, etc.), the first computer system detects user input from the first user to zoom in on a respective user (e.g., the second user), or to zoom in on the entire scene (e.g., a pinch or reverse pinch gesture in conjunction with a gaze input directed to the representation of the second user, the third user, etc.; a pinch gesture or reverse pinch gesture on the touch-screen display, etc.). In some embodiments, in response to detecting the user input from the first user, the first computer system changes the size of the representation of the respective user (e.g., changes the size of the representation 7203' of the second user relative to the representation 7205' of the third user, relative to the representation of the physical environment 100, and/or relative to the representation of the field of view, etc.). In some embodiments, in response to detecting the user input from the first user, the first computer system moves the viewpoint closer to the representation 7203' of the second user (and optionally, the representation 7205' of the third user, if the input is directed to the entire scene as opposed to the representation 7203' of the second user), as if the first user 7200 has moved virtually closer to the representation 7203' of the second user in the first three-dimensional environment 7207. In some embodiments, in response to detecting the user input from the first user, the first computer system changes the zoom level of the entire view 7106 of the first three-dimensional environment 7207, as if the first user has moved closer to the other participants, or moved closer to their faces.

In FIGS. 7V-7X, it is shown that changing the orientation of the first display generation component 7100-*t* causes the first computer system 101-*t* to switch between the spatial mode and the non-spatial mode of the first user interface of the first communication session, in accordance with some embodiments. As shown in FIG. 7W, the first computer system 101-*t* displays, via the first display generation component 7100-*t*, the first user interface of the first communication session between the first user and the second user (and optionally one or more additional users). In this example, the first user interface includes representations 7203' and 7205' of the other participants of the first communication session (e.g., the second user and the third user). When displaying the first user interface of the communication session in the spatial mode (as shown in FIG. 7V), the first computer system 7100-*t* detects a first movement (e.g., translation in a first direction, a second direction, etc., rotation around a first axis, a second axis, etc.) of the first display generation component 7100-*t* in the physical environment of the first user (e.g., as shown in FIG. 7W relative to FIG. 7V). In response to detecting the first movement of the first display generation component 7100-*t* in the physical environment of the first user 7200, in accordance with a determination that the first display generation component 7100-*t* is in a first orientation (e.g., the orientation associated with a spatial or AR view of participants of the first communication session, the landscape orientation, etc.) during the first movement of the first display generation component 7100-*t*, the first computer system 101-*t* updates the appearance of the representation 7203' of the second user based on the first movement of the first display generation component 7100-*t* in the physical environment 100 of the first user 7200 and a simulated viewpoint of the first user into the first three dimensional environment 7207 in which the representation 7203' of the second user is displayed (e.g., in the view 7106 in FIGS. 7V and 7W). For example, the first movement of the first display generation component 7100-*t* has caused the simulated viewpoint of the first user to move forward in the first three-dimensional environment 7207, and closer to the virtual position of the second user in the first three-dimensional environment 7207; and as a result, the first computer system 101-*t* updates the view 7106 of the first three-dimensional environment 7207 that is shown via the first display generation component 7100-*t* to show the representation 7203' of the second user closer to the simulated viewpoint (e.g., the representation 7203' appear to be larger and closer in the view 7106 shown in FIG. 7W than that shown in FIG. 7V) into the first three-dimensional environment 7207. In contrast, as shown in FIG. 7X, in accordance with a determination that the first display generation component 7100-*t* is in a second orientation (e.g., the orientation associated with a gallery or non-spatial view of meeting participants, the portrait orientation, etc.) during the first movement of the first display generation component 7100-*t*, the first computer system 101-*t* maintains display of the representation 7203' of the second user at a respective location in the first user interface of the first communication session (e.g., shown as user interface 7110 in FIG. 7X) as the first display generation component 7100-*t* moves in the first physical environment 100 of the first user 7200. For example, if the first user 7200 hadn't changed the orientation of the first display generation component 7100-*t* in FIG. 7W, the first user interface shown on the first display generation component 7100-*t* would be the same as that shown in FIG. 7X, with the representations of the second user and the third user displayed with the same layout and size as that shown in FIG. 7X, even though the virtual positions and facing directions of the participants have changed in the first three-dimensional environment (e.g., as shown in the upper left portions of FIGS. 7W and 7X).

In FIGS. 7V-7W, when the first display generation component 7100-*t* is in the orientation that is associated with displaying the first user interface of the first communication session in the spatial mode, movement of the first display generation component 7100-*t* in the physical environment causes the first computer system 101-*t* to change the virtual position of the first user in the first three-dimensional environment 7207; and as a result, the viewpoint of the currently displayed view 7106 of the first three-dimensional environment 7207 is moved to correspond to the new virtual position of the first user in the first three-dimensional environment 7207, and the representation of the physical environment and the representations of the second user and the third user are also updated in the view 7106 to indicate their changed spatial relationships relative to the representation of the first user in the first three-dimensional environment 7207. If the movement of the first display generation component 7100-*t* causes a change in orientation of the first display generation component 7100-*t* from the orientation that corresponds to the spatial mode to the orientation that corresponds to the non-spatial mode of the first user interface of the first communication session, the first computer system 101-*t* ceases to display the view 7106 of the first three-dimensional environment 7207, and instead, switches to display the virtual environment with the representations of the second user and the third user in the preset layout independent of the spatial relationships between the users in the first three-dimensional environment (e.g., as shown in FIG. 7X). Subsequent movement of the first display generation component 7100-*t* in the physical environment, if not changing the orientation of the first display generation component 7100-*t* back to the orientation corresponding to the spatial mode, does not cause changes in the layout of the representations of the second user and the third user in the first user interface displayed in the non-spatial mode (e.g., user interface 7100 as shown in FIG. 7X).

In some embodiments, the first computer system 101-*t* and the first display generation component 7100-*t* are integrated in the same housing, and includes a front facing camera and a rear facing camera respectively pointing toward two opposite directions away from the display side of the first display generation component 7100-*t*. The first computer system 101-*t* utilizes the front facing camera to capture a live video of the first user 7200 during the first communication session and sends the live video of the first user 7200 for display in the representation 7200' of the first user in the respective views of the first three-dimensional environment 7207 shown to other participants of the first communication session (e.g., the second user, the third user, etc.). In some embodiments, the first computer system utilizes the rear facing camera to capture a live video of the physical environment 100 in front of the first user 7200, and displays the live video as a representation of the physical environment (e.g., the representations 7004-*t'*, 7006-*t'*, 7008-*t'*, etc.) in the view 7106 of the first three-dimensional environment 7207 in the spatial mode of the first user interface (e.g., as shown in FIGS. 7V and 7W). In some embodiments, the first computer system 101-*t* uses the images captured by the front facing camera and the rear facing camera to determine the spatial positioning (e.g., the height, facing direction, lateral position, and movement direction, etc.) of the first display generation component 7100-*t* in the first user's physical environment 100. In some embodiments, the spatial positioning of the first display generation component 7100-*t* is used by the first computer system to determine the camera distances and camera angles of the virtual camera for generating the representations of the second user and the third user for display in the spatial mode of the first user interface.

In some embodiments, the first computer system 101-*t* detects the movement of the first display generation component 7100-*t* from one location to another location in the physical environment 100 (e.g., translating horizontally, or translating up and down, etc.), or rotates from facing a first direction to facing a second direction in the physical environment 100 (e.g., panning from left to right, or from the right to left), and/or tilt forward or backward (e.g., tilting forward to point the front facing camera higher and the rear facing camera lower, or tilting backward to point the front facing camera lower and the rear facing camera higher, etc.) in the physical environment 100. As a result of the movement of the first display generation component 7100-*t*, the first computer system 101-*t* transmits the positioning data (e.g., lateral position, height, facing direction, attitude, movement direction, etc.) of the first display generation component 7100-*t* to the server and/or the computer systems used by other participants of the first communication session, and the other computer systems display the representation of the first user (e.g., the container object including the live video of the first user, or an avatar of the first user, etc.) in the respective views of the first three-dimensional environment with the position, facing direction, and/or attitude, updated in accordance with the changes in the position, facing direction, and/or attitude of the first display generation component 7100-*t* in the physical environment 100 that were made while the first display generation component displays the first user interface in the spatial mode.

In some embodiments, the representations of the second user and the third user are displayed as a flat two-dimensional images in the non-spatial mode of the first user interface of the first communication session shown by the first display generation component 7100-*t*, and the two-dimensional images are converted to three-dimensional or pseudo-three-dimensional images of the second user and the third user when the first display generation component 7100-*t* switches to displaying the spatial mode of the first user interface of the first communication session. In some embodiments, in response to detecting the first display generation component 7100-*t* switches back to displaying the non-spatial mode of the first user interface, the representations of the second user and the third user change back to the two-dimensional images of the second user and the third user. In some embodiments, when the first display generation component 7100-*t* displays the self-view of the first user 7200 in the first user interface of the first communication session, the self-view remains as a two-dimensional image (e.g., a live video, or a two-dimensional avatar of the first user, etc.) when the first display generation component 7100-*t* switches between the spatial mode and the non-spatial mode of the first user interface, and the representations of the other participants are switched between three-dimensional avatars and two-dimensional avatars.

In some embodiments, before the first communication session is started or before the first user 7200 joins the first communication session (e.g., while the communication request from the second user is pending acceptance by the first user), the second computer system displays an indication of whether the first user is going to participate in the first communication session in the immersive copresence mode in the first three-dimensional environment, or join by video or voice only (e.g., using a non-immersive mode, such as the spatial mode or non-spatial mode described herein). For example, in the respective user interface of the first communication session displayed via the second display generation component used by the second user, the representation of the first user includes a container object that has an appearance mimicking a device type (e.g., a tablet device, a mobile phone, a handheld device, etc.) of the first computer system 7100-*t* used by the first user 7200 to join the first communication session. In some embodiments, if the third user is joining the first communication session in the immersive copresence mode using a third computer system, the respective user interface of the first communication session displayed via the second display generation component used by the second user shows the representation of the third user as a three-dimensional avatar of the third user (e.g., a three-dimensional model of a person, an animated character, etc.), rather than a container object that looks like a tablet device or mobile device with a flat display.

In some embodiments, when the rotation of the first display generation component 7100-*t* between a first preset orientation and a second preset orientation is used to cause the first computer system 101-*t* to switch between displaying the spatial mode and the non-spatial mode of the first user interface of the first communication session using the first display generation component 7100-*t*, the second computer system changes the aspect ratio of the container object used to represent the first user in the respective view of the first three-dimensional environment shown via the second display generation component. For example, the aspect ratio of the container object, optionally, indicates that the first display generation component 7100-*t* is in a landscape orientation in accordance with a determination that the first display generation component 7100-t is displaying the representations of the second user and the third user in the spatial mode of the first user interface; and the aspect ratio optionally changes to indicate that the first display generation component 7100-t is in a portrait orientation in accordance with a determination that the first display generation component 7100-t is displaying the representations of the second user and the third user in the non-spatial mode of the first user interface. In some embodiments, the second computer system changes the aspect ratio of the container object for the representation of the first user in accordance with the display mode of the first user interface shown by the first display generation component, irrespective of the actual orientation of the first display generation component 7100-t in the physical environment 100, because the actual orientation may vary within a range of angles without triggering a switching of the display mode of the first user interface and/or the display mode is optionally selected via activation of a mode switching affordance without a corresponding change in the orientation of the first display generation component in the physical environment 100.

Figure 7Y:
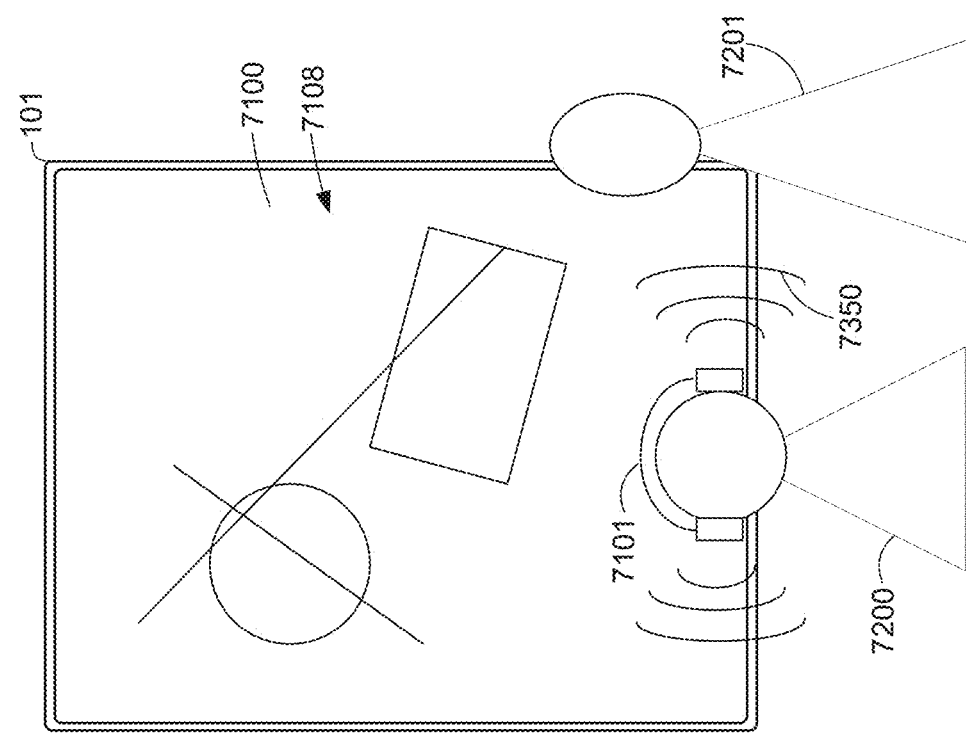

FIGS. 7Y-7Z are block diagrams that illustrate changing audio output properties (and optionally visual output properties) for a computer-generated experience in response to detecting a user's attention being directed to another user (e.g., as indicated by physical movement of the user toward said other user, or virtual movement of the user toward a representation of said other user in the computer-generated experience, etc.) in accordance with some embodiments.

In the example shown in FIGS. 7Y-7Z, a user of the first computer system 101 (e.g., the first computer system 101 as described with respect to FIGS. 7A-7U, and the first computer system as described with respect to FIGS. 7V-7X, the second computer system as described with respect to FIGS. 7V-7X, or another computer system, etc.) is the first user 7200. A second user 7201 is in the same physical environment as the first user, but is not a participant of the computer-generated experience presented by the first computer system, and is not a user of the first computer system. The first computer system 101 is in communication with a first display generation component 7100 (e.g., the first display generation component 7100 as described with respect to FIGS. 7A-7U, and the first display generation component 7100-t as described with respect to FIGS. 7V-7X, the second display generation component as described with respect to FIGS. 7V-7X, or another display generation component, etc.). In some embodiments, the first display generation component 7100 is a touch-screen, a heads-up display, a display, a projector, a head-mounted display (HMD), etc. In some embodiments, the first computer system 101 is also in communication with a first audio output component 7101 (e.g., headphones, speakers, earphones, sound sources arranged speakers distributed in a physical environment, sound sources embedded in one or more audio output components in an HMD, etc.). In some embodiments, the first computer system 101 is an integrated device with one or more processors and memory enclosed in the same housing as the first display generation component 7100 and the first audio output component 7101. In some embodiments, the first computer system 101 is separately housed from the first display generation component 7100 and the first audio output component 7101, while the first display generation component 7100 and the first audio output component 7101 are both head-mounted devices that move with the first user's head when the first user is engaged in the computer-generated experience. In some embodiments, the first display generation component 7100 and the first audio output component 7101 are separately housed, and are, optionally, located at different locations and move independently relative to the first user 7200 when the first user 7200 is engaged in the computer-generated experience. In some embodiments, only one of the first display generation component 7100 and the first audio output component 7101 is head-mounted when the first user 7200 is engaged in the computer-generated experience. For example, the first display generation component 7100 is, optionally, a heads-up display, while the first audio output component 7101 is a pair of ear phones worn over the first user's ears. In another example, the first display generation component 7100 is, optionally, a head-mounted display device worn over the first user's eyes, while the first audio output component 7101 is a speaker system located away from the first user 7200 in the physical environment. In some embodiments, the first display generation component 7100 is, optionally, a tablet device with a touch-screen display or a standalone display, while the first audio output component 7101 is a speaker located away from the first user or a pair of earphones worn over the first user's ears.

As shown in FIG. 7Y, the first computer system 101 is presenting first computer-generated content, including computer-generated visual content 7108 and computer-generated audio content 7350 (e.g., including video content and audio content associated with a virtual three-dimensional environment, an augmented reality environment, a pass-through view of a physical environment, a camera view of a physical environment, etc.; including audio and visual content from a movie, video, game, etc.; and/or including audio and visual content from a user interface of an operating system or application, etc.). In some embodiments, the visual content 7108 of the first computer-generated content has spatial properties in three dimensions. In some embodiments, the audio content 7350 of the first computer-generated content has spatial properties in three dimensions (e.g., spatial audio, surround sound, etc.). In some embodiments, the visual content 7108 of the first computer-generated content has spatial properties in two dimensions only. In some embodiments, the audio content 7350 of the first computer-generated content is stereo audio or mono-audio. As shown in FIG. 7Y, while the first computer system output visual content 7108 using the first display generation component 7100, the first computer system 101 also outputs audio content 7350 using the first audio output component 7101. In some embodiments, the visual content and the audio content correspond to each other in terms of subject matter and timing according to the progress of the computer-generated experience provided by the first computer-system 101 and the user input received from the first user 7200.

FIG. 7Z following FIG. 7Y illustrates that, while presenting the first computer-generated content, the first computer system 101 detects first movement of the first user 7200 in the physical environment of the first user. In response to detecting the first movement of the first user in the physical environment of the first user: the first computer system 101, in accordance with a determination that the first movement of the first user 7200 changes a spatial relationship between the first user 7200 and the second user 7201 in the physical environment, and that the change in the spatial relationship between the first user 7200 and the second user 7201 indicates that attention of the first user 7200 is directed to the second user 7201 (e.g., the first user leans toward the second user, the first user turns to face toward the second user, the first user started to talk to the second user while leaning toward the second user, the first user taps on the second user's shoulder, etc.), the first computer system 101 changes one or more output properties of the first computer-generated content while presenting the first computer-generated content. For example, the first computer system 101, optionally, reduces the visual prominence of the virtual content 7108 displayed via the first display generation component 7100, and makes the physical environment of the first user more visible through the first display generation component, or more prominent relative to the virtual content shown by the first display generation component, e.g., to let the first user 7200 see the second user 7201 or the physical environment more clearly than before. In some embodiments, the first computer system 101, optionally, reduces the audio volume of the computer-generated audio content, and/or increases audio pass-through from the physical environment (e.g., output a modified version 7350' of the audio content 7350) using the first audio output component 7101, so the first user 7200 can hear the sound from the physical environment more clearly (e.g., speech from the second user, sound from a device held by the second user, etc.), while the first computer-generated content via at least one of the first display generation component 7100-t and the first audio output component 7101 (e.g., in the original version or in the modified version (e.g., the original or modified version of the visual content 7108, or the original or modified version of the audio content 7350). In some embodiments, if the movement of the first user 7200 does not change the spatial relationship between the first user and the second user in a way that indicates the first user's attention is being directed to the second user, the first computer system 101 continues to present the first computer-generated content without changing the one or more output properties of the first computer-generated content (e.g., both the visual content 7108 and the audio content 7350 are presented in their original, unadjusted versions).

In some embodiments, the first computer-generated content includes visual content that includes virtual content, such as user interface objects, a virtual three-dimensional environment, virtual objects, content, and/or visual effect displayed concurrently with a representation of the physical environment, or an augmented reality view of the physical environment, etc. In some embodiments, the first computer system 101 continues to update the visual content 7108 in accordance preset progress of the computer-generated content without user input (e.g., according to playback progress of a movie, a video, etc.), in accordance with preset progress as well as user inputs (e.g., according to programmed progress of a game, a mixed-reality experience, a copresence experience in a communication session, etc. that respond to user inputs), and/or in accordance preset responses for user inputs from the first user (e.g., according to programmed responses of user interfaces provided by the first computer system), etc. In some embodiments, when the first computer system 101 detects that the first user 7200 has moved in the physical environment in a manner that indicates the first user 7200 wishes to direct his/her attention to or engage with the second user 7201, the first computer system 101 reduces the visual prominence (e.g., increasing transparency, ceasing to display, reducing color saturation, providing a visual pass-through region in the virtual content, etc.) of at least a first portion of the first computer-generated visual content 7108 to reveal a respective representation of the second user 7201 in a first region of a field of view provided via the first display generation component 7100 that was previously occupied by the at least the first portion of the first computer-generated visual content 7108. For example, in some embodiments, as the first user 7200 leans toward the second user 7201 in the physical environment, or turns toward the second user 7202, etc., the first computer system 101 makes the virtual content presented in a first region of the virtual environment or augmented reality environment more transparent, or ceases to display that portion of the virtual content, to show a representation of at least a portion of the second user 7201 that was previously blocked by the virtual content, without requiring the first user 7200 to remove the first display generation component 7100 from his/her head or face.

In some embodiments, when the first computer system 101 detects that the first user 7200 has moved in the physical environment in a manner that indicates that the first user 7200 wishes to direct his/her attention to the second user 7201, the first computer system 101 reduces audio prominence of the first computer-generated audio content 7350 relative to sound from the physical environment of the first user (e.g., by reducing noise filtering or cancelation, lowering audio volume of the first computer-generated audio content 7350, ceasing to output the first computer-generated audio content 7350, boosting sound from the physical environment, etc.) (e.g., outputting a modified version 7350' of the first computer-generated audio content 7350 that optionally includes changed volume, frequencies, noise reduction, virtual and real audio reverberations, and/or audio pass-through properties, etc.).

In some embodiments, when the first computer system 101 detects that the first user 7200 has moved in the physical environment in a manner that indicates the first user 7200 wishes to direct his/her attention to the second user 7201, the first computer system 101 optionally continues with normal output of the audio content 7350 while reducing the visual prominence of the virtual visual content 7108 provided by the first display generation component 7100. For example, when the first user 7200 leans toward the second user 7201 while still facing the display side of the first display generation component 7100 and not facing toward the second user 7201, the first computer system 101 optionally continues to display the visual content 7108 of the computer-generated experience normally, while lowering the volume of the audio content of the computer-generated experience and/or increases audio pass-through from the physical environment (e.g., reducing noise cancellation, enhancing sound or speech captured in the physical environment, etc.). In some embodiments, when the first computer system 101 detects that the first user 7200 has moved in the physical environment in a manner that indicates the first user 7200 wishes to direct his/her attention to the second user 7201, the first computer system 101 optionally continues with normal output of the visual content 7108 while reducing the audio prominence of the computer-generated audio content provided by the first audio output component 7101. For example, when the first user 7200 turns toward the second user 7201 with the first display generation component 7100 over his/her eyes and when neither the first user 7200 nor the second user 7201 are speaking, the first computer system 101 optionally continues to output the audio content of the computer-generated experience normally, while increasing the amount of visual pass-through content from the physical environment (e.g., increasing transparency of the display, reducing opacity of the virtual content, creating a window or viewport in the virtual content to show the physical environment, etc.) to let the first user 7200 see the second user 7201 more clearly.

In some embodiments, the first computer system 101 changes the output properties by which the computer-generated content is presented to the first user 7200 in accordance with a determination that the first user's movement is accompanied by detection of speech from either the first user 7200 or the second user 7201.

In some embodiments, the first computer system 101 changes the output properties by which the computer-generated content is presented to the first user 7200 in accordance with a determination that the first user's movement includes the first user 7200 turning to face toward the second user 7201.

In some embodiments, the first computer system 101 increases the audio prominence of the sound from the physical environment and/or reduce the audio prominence of the audio content from the computer-generated content by reducing the volume of the audio content from the computer-generated content in certain preset frequency ranges. For example, in some embodiments, the first computer system 101 lowers the volumes of frequencies in the audio content 7350 of the computer-generated content that correspond to human speech, sudden loud noises, and/or constant white noise, to allow the speech from the surrounding physical environment to be heard more clearly.

In some embodiments, the first computer system 101 increases the audio prominence of the sound from the physical environment and/or reduce the audio prominence of the audio content 7350 from the computer-generated content by increasing the volume of the sound captured from the physical environment and output it through the first audio output component 7101. In some embodiments, the first computer system 101 selectively increases the volume of sound captured in the physical environment in certain preset frequency ranges, and outputs the sound using the first audio output component 7101. For example, in some embodiments, the first computer system 101 increases the volumes of frequencies in the sound captured from the physical environment that correspond to human speech to allow the speech from the second user 7201 to be heard more clearly. In some embodiments, the first computer system 101, optionally, specifically identifies the speech from the second user 7201 from the sound captured in the physical environment, and selectively outputs it via the first audio output component 7101 (e.g., optionally with enhanced volume, and suppression of other ambient sound from the physical environment, etc.).

In some embodiments, the first computer system 101 captures speech or other sounds (e.g., instruments, playback of a recording on a device held by the second user 7201, clapping sound of hands, etc.) from both the first user 7200 and the second user 7201 in the physical environment, and the first computer system 101 (e.g., after lowering the audio prominence of the audio content 7350 from the computer-generated content, and while continuing to display the visual content 7108 of the computer-generated content, etc.) processes the speech or other sounds to add virtual audio reverberations that are generated based on the same three-dimensional environment (e.g., a virtual three-dimensional environment with preset simulated acoustic properties), and optionally removing real audio reverberations in the physical environment from the captured sound. The first computer system 101 then outputs the speech and other sounds with the added virtual audio reverberations (e.g., with real physical audio reverberations removed or reduced) using the first audio output component 7101, in accordance with some embodiments. In some embodiments, the simulated acoustic properties of the virtual three-dimensional environment allow the first computer system 101 to make the speech and other sounds captured from the physical environment more clear and pleasing to hear than the sound that is in the physical environment (e.g., because the physical environment may have poor acoustic properties that produces a lot of echoes and/or harsh sound effects).

In some embodiments, the first computer system presents shared media content in a communication session, where the media content is output to multiple users using different display generation components and different audio output components. In some embodiments, the audio content is processed to add virtual audio reverberations that correspond to the same three-dimensional environment with simulated acoustic properties, such that when the media content is output using the different audio output components used by the different users, the audio from the media content sounds as if the audio content is being output in the same three-dimensional environment in which the users are virtual present (e.g., the same virtual game environment, the same virtual conference room, etc.)

In some embodiments, the first computer system 101 increases the visual prominence of the physical environment and/or reduce the visual prominence of the virtual content from the computer-generated content by reducing the opacity of the first display generation component 7100, or reducing the darkening of the view of the physical environment as seen through the transparent portion of the first display generation component 7100.

In some embodiments, the first computer system 101 changes the output properties of the computer-generated content in the manner described above in response to detecting movement of the second user 7201 in the physical environment that indicates the second user's desire to engage the attention of the first user 7200. For example, the audio prominence of the audio content 7350 of the computer-generated content is decreased, the audio prominence of the sound from the physical environment is increased, the visual prominence of the virtual visual content 7108 of the computer-generated environment is decreased, the visual prominence of the representation of the physical environment is increased, and/or the level of immersion of the computer-generated content is decreased, etc., in response to the first computer system 101 detecting movement of the second user 7201 in the physical environment that meets preset criteria (e.g., the second user 7201 leans toward the first user 7200, the second user 7201 taps on the first user's shoulder, the second user 7201 turns to the first user 7200 and speaks to the first user, etc.).

In some embodiments, the first computer system 101 changes the output properties of the computer-generated content in the manner described above in response to detecting movement of the first user 7200 in the physical environment that changes a spatial relationship between a representation of the first user 7200 and a representation of a third user (different from the second user) in a copresence experience in a respective computer-generated three-dimensional environment (e.g., a virtual three-dimensional environment, an augmented reality environment, a copresence environment, etc.). For example, the movement of the first user 7200 optionally includes the first user leaning toward a direction that corresponds to a virtual position of the third user in the respective computer-generated three-dimensional environment. For example, the audio prominence of the audio content of the computer-generated content (e.g., sound from other participants, sound from the respective three-dimensional environment, etc.) is decreased, the audio prominence of the sound from the third user is increased, the visual prominence of the virtual visual content of the computer-generated environment (e.g., visual data outside of the representation of the third user in the virtual three-dimensional environment) is decreased, and/or the visual prominence of the representation of the third user in the virtual three-dimensional environment is increased, etc., in response to the first computer system 101 detecting movement of the first user 7200 in the physical environment (e.g., movement that is not a gesture input that controls the computer-generated environment) that meets preset criteria (e.g., the second user leans toward a position that corresponds to the virtual position of the third user in the virtual three-dimensional environment, the first user waves while facing the direction that corresponds to the virtual position of the third user in the virtual three-dimensional environment, etc.).

In some embodiments, the computer-generated content includes a computer-generated three-dimensional environment in which the first user 7200 and the third user are virtually co-present, and the second user 7201 is collocated with the first user 7200 in the physical environment of the first user, but is not participating in the shared experience in the computer-generated three-dimensional environment.

In some embodiments, input gestures used in the various examples and embodiments described herein (e.g., with respect to FIGS. 7A-7Z, and FIGS. 8-16) optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device 7100, 7100-*t* or an HMD)) that includes a display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7102), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a tap input is, optionally, a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a flick gesture is, optionally, a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a swipe gesture is, optionally, a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, etc.). In some embodiments, the amount of movement performed by the moving finger (e.g., thumb) and or other movement metrics associated with the movement of the finger (e.g., speed, initial speed, ending speed, duration, direction, movement pattern, etc.) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture, etc.). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

Additional descriptions regarding FIGS. 7A-7Z are provided below in references to methods 8000, 9000, 10000, 11000, 12000, 13000, 14000, 15000, and 16000 described with respect to FIGS. 8-16 below.

Figure 8:
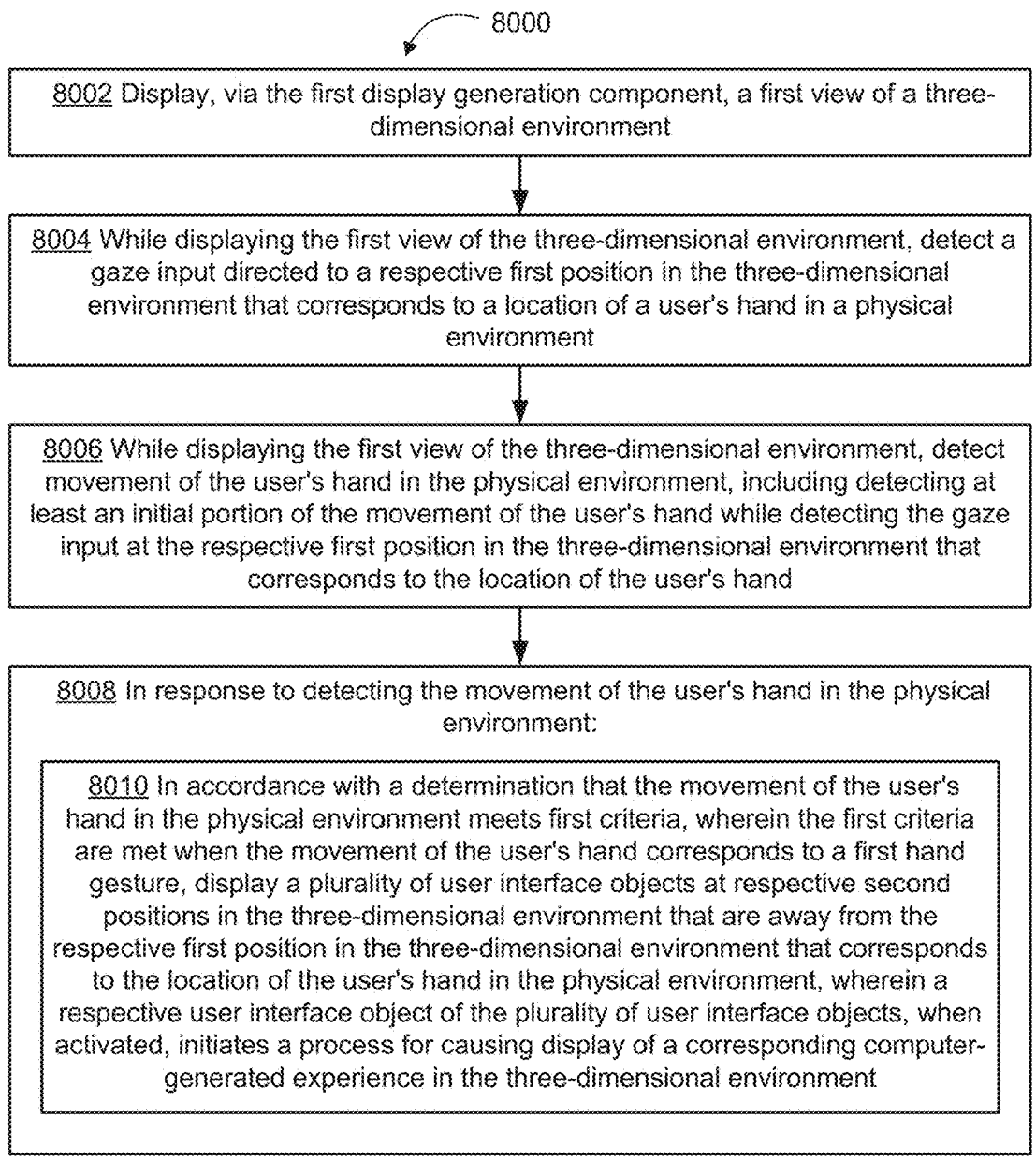
FIG. 8 is a flowchart of a method of using detection of a gaze input directed to a hand in conjunction with a preset movement of the hand to cause display of user interface objects corresponding to various computer-generated experiences at positions in a three-dimensional environment that are away from the virtual position of the user's hand in the three-dimensional environment, in accordance with some embodiments.

FIG. 8 is a flowchart of a method 8000 of using detection of a gaze input directed to a hand in conjunction with a preset movement of the hand to cause display of user interface objects corresponding to various computer-generated experiences at positions in a three-dimensional environment that are away from the virtual position of the user's hand in the three-dimensional environment, in accordance with some embodiments.

In some embodiments, the method 8000 is performed at a computer system (e.g., computer system 101 in FIG. 1) including a first display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 8000 are, optionally, combined and/or the order of some operations is, optionally, changed.

In some embodiments, the method 8000 is performed at a computer system (e.g., the computer system 101 in FIG. 1, the computer system 101 described with respect to FIGS. 7A-7D, FIGS. 7E-7F, FIGS. 7G-7H, FIGS. 7I-7M, FIGS. 7N-7O, FIGS. 7P-7S, FIGS. 7T-7U, and/or FIGS. 7V-7X, the first computer system 101-t described with respect to FIGS. 7V-7X, the second computer system described with respect to FIGS. 7V-7X, etc.). In some embodiments, the computer system is in communication with a first display generation component (e.g., the first display generation component is a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the first display generation component is a first display generation component 7100 described with respect to FIGS. 7A-7U and 7Y-7Z, a first display generation component 7100-t described with respect to FIGS. 7V-7X, a second display generation component described with respect to FIGS. 7V-7X, etc. In some embodiments, the computer system is an integrated device with one or more processors and memory enclosed in the same housing as the first display generation components and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the first display generation component and/or the one or more input devices. In some embodiments, the first display generation component and the one or more input devices are integrated and enclosed in the same housing. Many of the features of the method 8000 are described with respect to FIGS. 7A-7D, in accordance with some embodiments.

In the method 8000, the computer system displays (8002), via the first display generation component, a first view of a three-dimensional environment (e.g., a virtual three-dimensional environment, an augmented reality environment, a pass-through view of a physical environment, a camera view of a physical environment, etc.). As shown in FIG. 7A-7D, a first view of the three-dimensional environment 7104 is displayed by the first display generation component 7100. In some embodiments, the three-dimensional environment is a virtual three-dimensional environment without a representation of a physical environment. In some embodiments, the three-dimensional environment is a mixed reality environment that is a virtual environment that is augmented by sensor data corresponding to the physical environment. In some embodiments, the three-dimensional environment is an augmented reality environment that includes one or more virtual objects and a representation of at least a portion of a physical environment surrounding the first display generation component (e.g., a camera view or a view through a transparent or semitransparent portion of the first display generation component).

In method 8000, while displaying the first view of the three-dimensional environment (e.g., first view of the three-dimensional environment 7104 as shown in FIGS. 7A-7D), the computer system detects (8004) a gaze input directed to a respective first position in the three-dimensional environment that corresponds to a location of a user's hand (e.g., the palm of the user's hand, the back of the user's hand, etc.) in a physical environment. As shown in FIGS. 7B and 7C, respectively, the gaze input 7210 is directed to the location of the hand 7202, for example. In some embodiments, an indicator (e.g., a graphical marker, a visual effect, etc.) of the position of the gaze input is displayed at the respective first position that corresponds to the location of the user's hand. In some embodiments, detecting the gaze input includes detecting that the position of the gaze of the user meets preset stability and duration criteria (e.g., the gaze remains at the respective first position with less than a threshold amount of movement for at least a threshold amount of time, the gaze remains within a region of the three-dimensional environment that corresponds to the spatial region occupied by the hand in the physical environment, etc.).

In method 8000, while displaying the first view of the three-dimensional environment, the computer system detects (8006) movement of the user's hand in the physical environment, including detecting at least an initial portion of the movement of the user's hand while detecting the gaze input at the respective first position in the three-dimensional environment that corresponds to the location of the user's hand (e.g., the gaze optionally is not detected at the respective first position during at least a portion of the movement (e.g., a middle portion, or the end portion, etc.)). This is illustrated, for example, in FIGS. 7B, and 7C, respectively, where the gaze input 7210 is directed to a position that corresponds to the location of the user's hand 7202, while the hand 7202 makes a movement in the physical environment. In some embodiments, the movement of the user's hand is a continuous movement that corresponds to a toss gesture, a push gesture, or a throw gesture, etc. In some embodiments, the movement of the user's hand is a continuous movement that does not correspond to a toss gesture, a push gesture, or a throw gesture, etc., but corresponds to lateral movement in front of the user, or movement toward the user's face, etc.

In the method 8000, in response to detecting the movement of the user's hand in the physical environment (8008): in accordance with a determination that the movement of the user's hand in the physical environment meets first criteria, wherein the first criteria are met when the movement of the user's hand corresponds to a first hand gesture (e.g., a toss gesture, a push gesture, a throw gesture, etc.), the computer system displays (8010) a plurality of user interface objects at respective second positions in the three-dimensional environment that are away from the respective first position in the three-dimensional environment that corresponds to the location of the user's hand in the physical environment, wherein a respective user interface object of the plurality of user interface objects, when activated, initiates a process for causing display of a corresponding computer-generated experience in the three-dimensional environment. This is illustrated, for example, in FIGS. 7C-7D, where in response to the movement 7209 of the hand 7202 that meets preset criteria and the gaze input being directed to the position that corresponds to the location of the hand 7202, the computer system displays user interface objects 7306, 7302, and 7304 are positions that are away from the position that corresponds to the location of the hand 7202 (e.g., in the three-dimensional environment 7104, and anchored to the representation of the physical environment). In some embodiments, initiating a process for causing display of the corresponding computer-generated experience in the three-dimensional environment includes displaying a user interface or user interface object that includes one or more user interface objects for selecting one or more parameters of the computer-generated experiences and/or for receiving a confirmation input from the user for starting the computer-generated experience, followed by displaying the computer-generated experience in the three-dimensional environment in response to interactions with the user interface or user interface object that select the parameters and/or provide the required confirmation input. In some embodiments, initiating a process for causing display of the corresponding computer-generated experience in the three-dimensional environment includes displaying the computer-generated experience in the three-dimensional environment without requiring additional user input. In some embodiments, the first criteria require that the movement of the hand corresponds to the first hand gesture and that the gaze input is detected at the respective first position in the three-dimensional environment that corresponds to the location of the user's hand during at least an initial portion of the movement of the hand. In some embodiments, in response to detecting the movement of the hand that corresponds to the first hand gesture and in accordance with a determination that the gaze input is not detected during at least the initial portion of the movement of the hand that corresponds to the first hand gesture, the computer system forgoes displaying the plurality of user interface objects at the respective second positions in the three-dimensional environment. In other words, the requirements on the location of the gaze input and the movement of the hand both need to be met in order for the computer system to display the plurality of user interface objects at the respective second positions in the three-dimensional environment. Displaying a plurality of user interface objects at respective second positions that are away from the respective first position corresponding to the location of the user's hand in the physical environment in accordance with a determination that the movement of the user's hand in the physical environment meets first criteria provides additional control options without cluttering the UI with additional displayed controls (e.g., additional controls for selecting and/or displaying the plurality of user interface objects at respective second positions). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the movement of the user's hand in the physical environment, in accordance with a determination that the movement of the user's hand in the physical environment does not meet the first criteria, foregoing displaying the plurality of user interface objects at the respective second positions in the three-dimensional environment that are away from the respective position that corresponds to the location of the user's hand in the physical environment. This is illustrated, for example, in FIG. 7B, where the hand 7202 does not make the required movement that meets the preset criteria, even though the gaze input is directed to the position that corresponds to the location of the hand 7202, the computer system does not display the user interface objects at positions that are away from the position that corresponds to the location of the hand 7202. In some embodiments, in response to detecting the movement of the user's hand in the physical environment, in accordance with a determination that the movement of the user's hand in the physical environment does not meet the first criteria, the computer system displays a first user interface object that correspond to the plurality of the user interface objects at the respective first position in the three-dimensional environment and moves the first user interface object in accordance with the movement of the user's hand in the physical environment, e.g., such that the first user interface object substantially maintains a fixed spatial position relative to the representation of the user's hand in the three-dimensional environment. For example, in some embodiments, the first user interface object includes reduced scale representations of at least a subset (e.g., some, all, etc.) of the plurality of user interface objects and is displayed at a position that corresponds to the location of the user's hand and remains displayed at a position that corresponds to the current location of the user's hand during movement of the user's hand that does not meet the first criteria (e.g., lateral movement of the user's hand in front of the user, movement toward the user's body or face, movement that does not correspond to a toss gesture, a throw gesture, etc.). Forgoing displaying the plurality of user interface objects at the respective second positions in the three-dimensional environment that are away from the respective position that corresponds to the location of the user's hand in the physical environment, in accordance with a determination that the movement of the user's hand in the physical environment does not meet the first criteria provides additional control options without cluttering the UI (e.g., by not displaying the plurality of user interface objects at the respective second positions when first criteria is not met). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the gaze input directed to the first position in the three-dimensional environment that corresponds to the location of the user's hand in the physical environment (e.g., without requiring another user input (e.g., an input provided by another hand, or a voice command, etc.)), the computer system displays, via the first display generation component, a first user interface object at the respective first position in the three-dimensional environment that corresponds to the location of the user's hand in the physical environment. For example, in FIG. 7B, or FIG. 7C, the computer system, optionally, displays one or more of the user interface objects 7306, 7302, and 7304 at the position that corresponds to the location of the user's hand 7202, in response to detecting the gaze input 7210 in the region that corresponds to the user's hand 7202 (e.g., before the movement 7209 that meets the preset criteria is detected or completed), in some embodiments. In some embodiments, the first user interface object includes a cluster of icons representing different categories of applications, a home button, a root menu, etc. In some embodiments, the first user interface object is a user interface object including reduced scale representations of at least a subset (e.g., some, all, etc.) of the plurality of user interface objects, or a user interface object including representations of respective subsets of the plurality of user interface objects, etc. In some embodiments, the first user interface object is locked to the user's hand as long as the gaze input is still being directed to the position in the three-dimensional environment that corresponds to the location of the user's hand in the physical environment. For example, in some embodiments, the first user interface object is displayed overlaying or replacing display of at least a portion of a representation of the user's hand in the three-dimensional environment. In some embodiments, other portions of the user's body, e.g., the inner side of the user's wrist, are used instead of the user's hand as the target location for detecting the gaze input and anchoring display of the first user interface object. Displaying a first user interface object at the respective first position in the three-dimensional environment that corresponds to the location of the user's hand in the physical environment in response to detecting the gaze input directed to the first position in the three-dimensional environment reduces the number of inputs needed to display the first user interface object at the respective first position in the three-dimensional environment that corresponds to the location of the user's hand in the physical environment (e.g., the user does not need to perform another user input (e.g., with another hand, or with a voice command, etc.)). Reducing the number of inputs needed to perform an operation enhances the operability of the device, which, additionally, reduces power usage and improves battery life of the device by enabling the user to use the device more quickly and efficiently.

In some embodiments, detecting the movement of the user's hand in the physical environment includes detecting at least the initial portion of the movement of the user's hand while displaying the first user interface object at the respective first position in the three-dimensional environment that corresponds to the location of the user's hand (e.g., the first user interface object is not displayed at the respective position during at least a portion of the movement (e.g., a middle portion, or the end portion, etc.)). For example, as shown in FIG. 7C, at least one of the user interface objects 7306, 7302, and 7304 is displayed at the position that corresponds to the location of the user's hand in response to detecting the gaze input 7210, and the movement 7209 of the hand, optionally, starts while the at least one of the user interface objects 7306, 7302, and 7304 is displayed at the position that corresponds to the location of the user's hand, in accordance with some embodiments. In some embodiments, the computer system displays the first user interface object in response to concurrently detecting the gaze input at the respective first position that corresponds to the user's hand and a movement of the user's hand to show the palm of the user's hand to the user (e.g., turning the palm side of the hand toward the user's face, opening the hand while the palm side of the hand is facing toward the user's face, etc.). Detecting at least the initial portion of the user's hand while displaying the first user interface object at the respective first position in the three-dimensional environment that corresponds to the location of the user's hand reduces the number of inputs needed to display the first user interface object (e.g., the user does not need to repeat a gesture to display the first user interface object if the user accidentally moves the user's hand). Reducing the number of inputs needed to perform an operation enhances the operability of the device, which, additionally, reduces power usage and improves battery life of the device by enabling the user to use the device more quickly and efficiently.

In some embodiments, the first criteria include a requirement that is met when the movement of the user's hand includes a rotation of the user's hand around a wrist connected to the user's hand. For example, the movement 7209 in FIG. 7C that meets the preset criteria includes a rotation of the hand 7202 around a wrist connected to the hand 7202 to cause display of the user interface objects 7306, 7302, and 7304 at the positions away from the position that corresponds to the location of the hand 7202 in FIG. 7D, in accordance with some embodiments. In some embodiments, the first criteria further include a requirement that is met when the rotation exceeds a preset threshold speed or acceleration threshold during at least a portion of the rotation movement. In some embodiments, the first criteria further require that the first user interface object is displayed at the respective first position (e.g., in response to a prior movement or an initial portion of the movement of the user's hand (e.g., opening the hand or turning the hand to show the palm of the hand to the user, etc.)) detected in conjunction with the gaze directed to the respective first position that corresponds to the location of the hand. Requiring movement of the user's hand include a rotation of the user's hand around a wrist connected to the user's hand for first criteria to be met reduces the number of inputs needed to display the plurality of user interface objects at respective second positions in the three-dimensional environment (e.g., the user does not need to perform an additional gesture (e.g., with another hand, or with a voice command, etc.)). Reducing the number of inputs needed to perform an operation enhances the operability of the device, which, additionally, reduces power usage and improves battery life of the device by enabling the user to use the device more quickly and efficiently.

In some embodiments, displaying the plurality of user interface objects at the respective second positions in the three-dimensional environment includes displaying an animated transition that includes movement of a first user interface object that corresponds to the plurality of user interface objects (e.g., the first user interface object is a home button, a cluster of reduced scale versions of the plurality of user interface objects, etc.) from the respective first position that corresponds to the location of the user's hand toward the respective second positions and transformation of the first user interface object into the plurality of user interface objects prior to their arrival at the respective second positions in the three-dimensional environment. For example, in FIGS. 7C-7D, the computer system optionally displays an animated transition that shows the user interface objects 7306, 7302, and 7304 flying out of the position that corresponds to the location of the hand 7202 in FIG. 7C toward positions of the user interface objects 7306, 7302, and 7304 shown in FIG. 7D that are away from the position that corresponds to the location of the user's hand; and the computer system optionally shows the user interface objects 7306, 7302, and 7304 growing in size and changing their appearances during the animated transition, in accordance with some embodiments. In some embodiments, in response to detecting the movement of the user's hand that meets the first criteria, the computer system shows the first user interface object moves away from the respective first position that corresponds to the location of the user's hand in a direction that corresponds to the movement direction of the user's hand (e.g., the direction of the toss or throw gesture), and expanding in size and transforming into the plurality of user interface objects that are ultimately displayed at the respective second positions in the three-dimensional environment (e.g., floating in the three-dimensional environment away from the position that corresponds to the location of the user, displayed at a position that corresponds to a physical surface such as a wall, a table, etc.). In some embodiments, the first user interface object includes a cluster of icons that correspond to different categories of the plurality of user interface objects (e.g., a first icon for applications, a second icon for users, a third icon for experiences, etc.). In some embodiments, a respective icon (e.g., the first icon, the second icon, the third icon, etc.) moves away from the position that corresponds to the user's hand and transforms into a respective group of multiple icons (e.g., application icons, avatars of people, icons of experiences, etc.) associated with the category represented by the respective icon. In some embodiments, the first user interface object includes a unitary user interface object (e.g., a home button, an icon, an image, etc.) that is transformed into another user interface object that includes different groups of icons that correspond to different categories of functions (e.g., launching applications, starting communication sessions, starting experiences, etc.), and optionally, respective group representations for the different categories of functions. Displaying an animated transition that includes movement of a first user interface object that corresponds to the plurality of user interface objects from the respective first position that corresponds to the location of the user's hand toward the respective second positions and transforming the first user interface object into the plurality of user interface objects prior to their arrival at the respective second locations in the three-dimensional environment provides improved feedback to the user (e.g., that movement of the user's hand has met first criteria and the computer system is, or is in the process of, displaying the plurality of user interface objects at respective second positions). Providing improved feedback enhances the operability of the device, which, additionally, reduces power usage and improves battery life of the device by enabling the user to use the device more quickly and efficiently.

In some embodiments, the computer system generates a first audio output in conjunction with displaying the plurality of user interface objects at the respective second positions in the three-dimensional environment. For example, in FIGS. 7C-7D, when the computer system moves the user interface objects 7302, 7304, and/or 7306 toward their final positions in the three-dimensional environment as shown in FIG. 7D, the computer system, optionally, generates an audio output that corresponds to movement of the user interface objects and/or landing of the user interface objects at their final positions in the three-dimensional environment, in accordance with some embodiments. In some embodiments, the computer system generates an audio output (e.g., a sound effect, an audio alert, etc.) during the movement of the first user interface object away from the respective first position that corresponds to the location of the hand toward the respective second positions in the three-dimensional environment. In some embodiments, the computer system generates an audio output upon arrival of the plurality of user interface objects arriving and settling into the respective second positions in the three-dimensional environment. Generating a first audio output in conjunction with displaying the plurality of user interface objects at the respective second positions in the three-dimensional environment provides improved feedback to the user (e.g., by providing both audio and visual feedback). Providing improved feedback enhances the operability of the device, which, additionally, reduces power usage and improves battery life of the device by enabling the user to use the device more quickly and efficiently.

In some embodiments, the respective second positions (e.g., where the plurality of user interface objects are displayed) in the three-dimensional environment are within a predefined distance threshold from the respective first position in the three-dimensional environment. For example, as shown in FIG. 7D, the user interface objects 7306, 7302, and/or 7304 are displayed at positions that are within a threshold range of the viewpoint that corresponds to the virtual position of the user's hand or the virtual position of the user, e.g., such that the user interface objects are in a comfortable viewing range of the user (e.g., one to five feet of the viewpoint), in some embodiments. For example, in some embodiments, the plurality of user interface objects are displayed within one to five feet of a position that corresponds to a characteristic location of the user (e.g., the respective first position in the three-dimensional environment that corresponds to the location of the user's hand in the physical environment, the position that corresponds to the location of the center of the user, the position that corresponds to the location of the head of the user, etc.). In some embodiments, the predefined distance is a preselected viewing distance that is suitable for viewing the plurality of user interface objects (e.g., the viewing distance is an average viewing distance comfortable for most user, a customized viewing distance for the user, etc.). In some embodiments, the predefined distance is automatically adjusted by the computer system in accordance with the size, quantity, and level of details of the plurality of user interface objects at the respective second positions in the three-dimensional environment. In some embodiments, the respective second positions span a preset angular range, e.g., when more icons are displayed, the icons are displayed at a farther distance away from the viewpoint, and when fewer icons are displayed, the icons are displayed at a closer distance away from the viewpoint. Displaying a plurality of user interface objects at respective second positions that are within a predefined distance threshold from the respective first position in the three-dimensional environment reduces the number of inputs needed to display the plurality of user interface objects at respective second positions in the three-dimensional environment (e.g., the user does not need to perform an additional gesture to select the respective second positions at which to display the plurality of user interface objects, the user does not need to manually adjust the respective second positions of the plurality of user interface objects if they are displayed too close or too far from the user for comfortable viewing). Reducing the number of inputs needed to perform an operation enhances the operability of the device, which, additionally, reduces power usage and improves battery life of the device by enabling the user to use the device more quickly and efficiently.

In some embodiments, while displaying the plurality of user interface objects in accordance with the determination that the movement of the user's hand that meets the first criteria, the computer system detects first further movement of the user's hand in the physical environment. In response to detecting the first further movement of the user's hand in the physical environment: in accordance with a determination that the first further movement of the user's hand in the physical environment meets second criteria, wherein the second criteria are met when the first further movement of the user's hand in the physical environment corresponds to a second hand gesture (e.g., the user's hand turning from the palm side facing away from the user to the palm side facing toward the user) different from the first hand gesture (e.g., a reversal of the throw gesture, a reversal of the toss gesture, a recall gesture, a hand rotation to face the palm toward the user, etc.), the computer system ceases to display of the plurality of user interface objects at the respective second positions in the three-dimensional environment. For example, in FIG. 7D, if the computer system detects that the hand 7202 performs another preset gesture (e.g., turning the hand over, pulling the hand toward the user's face, etc.), the computer system, optionally, ceases to display the user interface objects 7306, 7302, and/or 7304 at the positions that are away from the position corresponding to the location of the user's hand, in accordance with some embodiments. In some embodiments, the first further movement meets the second criteria when the first further movement of the hand includes rotation of the user's hand around a wrist connected to the hand such that the palm of the hand is turned toward the user's face. In some embodiments, the second criteria require that the first further movement of the hand meets preset speed threshold or acceleration threshold in order for the second criteria to be met. In some embodiments, the second criteria require that a gaze input is detected at the respective position in the three-dimensional environment that corresponds to the user's hand during at least a portion of the further movement of the user's hand. In some embodiments, in response to detecting the first further movement of the hand and in accordance with a determination that the first further movement of the user's hand does not meet the second criteria, the computer system maintains display of the plurality of user interface objects at the respective second positions in the three-dimensional environment. Ceasing to display the plurality of user interface objects at the respective second positions in the three-dimensional environment in accordance with a determination that the first further movement of the user's hand corresponds to a second hand gesture different from the first hand gesture, provides additional control options without cluttering the UI with additional displayed controls (e.g., additional controls for ceasing display of the plurality of user interface objects). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the first further movement of the user's hand in the physical environment: in accordance with a determination that the first further movement of the user's hand in the physical environment meets second criteria (e.g., the user's hand turning from the palm side facing away from the user to the palm side facing toward the user), the computer system displays a first user interface object (e.g., the same first user interface object that was displayed at the respective first position previously) (e.g., the first user interface object is a home button, a cluster of reduced scale versions of the plurality of user interface objects, etc.) at a respective third position in the three-dimensional environment that corresponds to the location of the user's hand in the physical environment. For example, in FIG. 7D, if the computer system detects that the hand 7202 performs another preset gesture (e.g., turning the hand over, pulling the hand toward the user's face, etc.), the computer system, optionally, ceases to display the user interface objects 7306, 7302, and/or 7304 at the positions that are away from the position corresponding to the location of the user's hand, in accordance with some embodiments and redisplays the user interface objects 7306, 7302 and/or 7304 at the position that corresponds to the location of the user's hand or displays a home button at the position that corresponds to the location of the user's hand, in accordance with some embodiments. In some embodiments, displaying the first user interface object at the respective third position that corresponds to the location of the user's hand includes displaying an animated transition that includes movement of the plurality of user interface objects from the respective second positions toward the respective third position in the three-dimensional environment and transformation of the plurality of user interface objects into the first user interface object prior to its arrival at the respective third location in the three-dimensional environment that corresponds to the location of the user's hand at the end of the first further movement. In some embodiments, in response to detecting the first further movement of the user's hand that meets the second criteria, the computer system shows the plurality of user interface objects moving away from their respective positions toward the third position that corresponds to the location of the user's hand, and shrinking in size and transforming into the first user interface object that is ultimately displayed at the respective third position in the three-dimensional environment (e.g., overlaying, replacing display of, blocking, etc. at least a portion of a representation of the user's hand). In some embodiments, the first user interface object includes a cluster of icons that correspond to different categories of the plurality of user interface objects (e.g., a first icon for applications, a second icon for people, a third icon for experiences, etc.). In some embodiments, a respective group of multiple icons (e.g., application icons, avatars of people, icons of experiences, etc.) associated with the category represented by a respective icon in the first user interface object move toward the position corresponding to the user's hand and transform into the respective icon (e.g., the first icon, the second icon, the third icon, etc.). In some embodiments, the first user interface object is a unitary user interface object, such as a home button, an icon, an image, etc. In some embodiments, different groups of icons that correspond to different categories of functions (e.g., launching applications, starting communication sessions, starting experiences, etc.) displayed at the respective second positions are transformed back into the unitary user interface object displayed at the third position that corresponds to the location of the user's hand at the end of the first further movement. In some embodiments, in response to detecting the first further movement of the hand and in accordance with a determination that the first further movement of the user's hand does not meet the second criteria, the computer system maintains display of the plurality of user interface objects at the respective second positions in the three-dimensional environment. Displaying a first user interface object at a respective third position in the three-dimensional environment that corresponds to the location of the user's hand in the physical environment, in accordance with a determination that the first further movement of the user's hand in the physical environment meets second criteria reduces the number of inputs needed to display the first user interface object at a respective third position in the three-dimensional environment that corresponds to the location of the user's hand in the physical environment (e.g., the user does not need to perform a separate hand gesture, a different hand gesture (e.g., with a different hand), or a voice command, etc.). Performing an operation when a set of conditions has been met without requiring further user input enhances the operability of the device, which, additionally, reduces power usage and improves battery life of the device by enabling the user to use the device more quickly and efficiently.

In some embodiments, in response to detecting at least an initial portion of the movement of the user's hand in the physical environment: in accordance with a determination that the first criteria have not been met by the at least the initial portion of the movement of the user's hand that has been detected (e.g., an initial portion of the movement that were detected before the first criteria are met by the movement), the computer system moves the first user interface object in the three-dimensional environment in accordance with the at least the initial portion of the movement of the user's hand in the physical environment to maintain a respective spatial relationship between the first user interface object and a position that corresponds to a current location of the user's hand (e.g., the first user interface object is locked to the hand as the hand moves without meeting the first criteria). For example, in FIG. 7C, before the movement 7209 meets the criteria for displaying the user interface objects 7302, 7304, and/or 7306 at the positions that are away from the position that corresponds to the location of the user's hand, the computer system moves the user interface objects 7302, 7304, and/or 7306 in accordance with the movement of the hand such that the user interface objects 7302, 7304, and/or 7306 appear to be locked or anchored to the user's hand. In some embodiments, the user interface objects 7302, 7304, and/or 7306 remain displayed overlaying, replacing display of, or blocking the view of at least a portion of the representation 7202' of the hand 7202 during movement of the hand 7202 in FIG. 7C, if the movement of the hand does not meet the first criteria, in accordance with some embodiments. In some embodiments, in response to detecting at least an initial portion of the movement of the user's hand in the physical environment: in accordance with a determination that the first criteria have been met by the at least the initial portion of the movement of the user's hand that has been detected (e.g., an initial portion of the movement that were detected before the first criteria are met by the movement followed by a subsequent portion of the movement, where the subsequent portion of the movement, either alone or in combination with the initial portion of the movement, meets the first criteria), the computer system maintains display of the plurality of user interface objects at the respective second positions in the physical environment, irrespective of further movement of the user's hand after the first criteria have been met by the at least the initial portion of the movement of the user's hand (e.g., the plurality of user interface objects are not locked to the hand but is, optionally, locked to the three-dimensional environment). For example, in FIG. 7D, after the first criteria are met, and the user interface objects 7306, 7302, and/or 7304 are displayed at the second positions that are away from the position that corresponds to the location of the user's hand, if the hand continues to move or moves again after stopping, the computer system does not move the user interface objects 7306, 7302, and/or 7304 in accordance with the movement of the user's hand (e.g., because the user interface objects are now anchored or locked to the three-dimensional environment and no longer locked to the location of the user's hand or other portions of the user), in accordance with some embodiments. Maintaining display of the plurality of user interface objects at the respective second positions in the physical environment irrespective of further movement of the user's hand, or moving the first user interface object to maintain a respective spatial relationship between the first user interface object and a position that corresponds to a current location of the user's hand, in accordance with at least the initial portion of the movement of the user's hand, in accordance with a determination that the first criteria have or have not been met, respectively, by the at least the initial portion of the movement of the user's hand provides additional control options without cluttering the UI (e.g., additional controls for moving the first user interface object to maintain a respective spatial relationship between the first user interface object and a position corresponding to the current location of the user's hand, additional controls for allowing the user to move their hand without moving the first user interface object, etc.). Providing additional control options without cluttering the UI with additional displayed controls enhances the operability of the device, which, additionally, reduces power usage and improves battery life of the device by enabling the user to use the device more quickly and efficiently.

In some embodiments, while displaying, via the first display generation component, the first user interface object (e.g., a cluster of icons representing different categories of applications, a home button, a root menu, etc.) (e.g., a user interface object including reduced scale representations of at least a subset (e.g., some, all, etc.) of the plurality of user interface objects, a user interface object including representations of respective subsets of the plurality of user interface objects, etc.) at the respective first position in the three-dimensional environment that corresponds to the location of the user's hand in the physical environment, the computer system detects an input directed to the first user interface object (e.g., a tap input on the user's hand by the finger(s) of another hand, a swipe input on the user's hand by the finger(s) of another hand, a swipe input or a tap input by one part of the user's hand on another part of the user's hand, a pinch gesture by another hand while the user's gaze is detected on the first user interface object, etc.). In response to detecting the input directed to the first user interface object, in accordance with a determination that the input directed to the first user interface object meets third criteria (e.g., criteria for detecting a tap, criteria for detecting a preset swipe gesture, criteria for detecting an in-air selection gesture while the user's gaze is detected on the first user interface object, etc.) and that a location of the input (e.g., the tap location, the swipe location, the gaze location, etc.) corresponds to the respective user interface object of the plurality of user interface objects (e.g., a first application icon, a second application icon, a first avatar for a first user, a second avatar for a second user, an icon for a first experience, an icon for a second experience, etc., respectively), the computer system initiates a process (e.g., a process separate from the process that can be initiated by invoking the respective user interface object at one of the respective second positions) for causing display of the corresponding computer-generated experience in the three-dimensional environment. For example, in FIG. 7C, while the user interface objects 7306, 7302, and/or 7304 are displayed at the position that corresponds to the location of the user's hand, if the computer system detects that the user has tapped on the hand (e.g., using another hand) at a location that corresponds to a respective user interface object of the user interface objects 7306, 7302, or 7304, the computer system starts an application, an experience, or communication session, etc. that corresponds to the respective user interface object, in accordance with some embodiments. In some embodiments, if the respective user interface object is a category icon for a plurality of selectable user interface objects, the computer system displays the plurality of selectable user interface objects at the positions that are away from the position that corresponds to the location of the user's hand. In some embodiments, if the respective user interface object is a home button or a cluster of category icons, the computer system displays the cluster of category icons at the positions that are away from the position that corresponds to the location of the user's hand. In some embodiments, display of the corresponding computer-generated experience includes display of the first application, display of a second application, starting a communication session with the first user, starting a communication session with the second user, display of the first experience, display of the second experience, etc., respectively, in the three-dimensional environment. In some embodiments, the first user interface object is activated by the input while the plurality of user interface objects are displayed at the respective second positions in the three-dimensional environment. In some embodiments, the first user interface object is activated by the input without the plurality of user interface objects being displayed at the respective second positions in the three-dimensional environment. In some embodiments, the computer system initiates the same process for displaying the computer-generated experience corresponding to a respective user interface object (e.g., a first application icon, a second application icon, a first avatar, a second avatar, a first icon for a computer-generated experience, a second icon for a computer-generated experience, etc.) in response to activating the respective user interface object from the first user interface object displayed at a respective first position corresponding to the user's hand, or activating the respective user interface object from one of the respective second positions away from the respective first position. Initiating a process for causing display of the corresponding computer-generated experience in the three-dimensional environment in response in accordance with a determination that the input directed to the first user interface object meets third criteria and that a location of the input corresponds to the respective user interface object of the plurality of user interface objects reduces the number of inputs needed to initiate display of the corresponding computer-generated experience in the three-dimensional environment (e.g., the user does not need to first display the respective user interface object to a respective second position away from the user's hand, then select the respective user interface object at the second position, to initiate display of the computer-generated experience). Reducing the number of inputs needed to perform an operation enhances the operability of the device, which, additionally, reduces power usage and improves battery life of the device by enabling the user to use the device more quickly and efficiently.

In some embodiments, displaying the plurality of the user interface objects at the respective second positions in the three-dimensional environment (e.g., in response to detecting the movement of the user's hand that meets the first criteria) includes moving the plurality of user interface objects from the respective first position in the three-dimensional environment that corresponds to the location of the hand in the physical environment to the respective second positions in the three-dimensional environment (e.g., in response to detecting the movement of the user's hand that meets the first criteria). For example, in FIGS. 7C-7D, the compute system, optionally, displays the user interface objects 7306, 7302, and 7304 moving through the three-dimensional environment 7104 from the position that corresponds to the location of the hand 7202 to their final positions shown in FIG. 7D, in accordance with some embodiments. In some embodiments, the plurality of user interface objects (e.g., same size or reduced scales versions thereof) were displayed at the respective first position in the three-dimensional environment that corresponds to the location of the user's hand before the first criteria are met by the movement of the user's hand. In some embodiments, the plurality of user interface objects (e.g., same size or reduced scale versions thereof) were not displayed at the respective first position in the three-dimensional environment that corresponds to the location of the user's hand before the first criteria are met by the movement of the user's hand (e.g., no user interface object, or a different representation or user interface object is displayed at the respective first position, instead). In some embodiments, the plurality of user interface objects, when displayed at the respective first position in the three-dimensional environment that corresponds to the location of the user's hand in the physical environment, are activatable by a respective input that meets preset criteria (e.g., the third criteria, criteria for detecting a tap, a swipe, etc.) and cause performance of a respective operation (e.g., initiating display of a corresponding computer-generated experience, invoking a change in the computer system or the three-dimensional environment, etc.) corresponding to the user interface object to which the respective input is directed. Moving the plurality of user interface objects from the respective first position in the three-dimensional environment that corresponds to the location of the hand in the physical environment to the respective second positions in the three-dimensional environment provides improved visual feedback to the user (e.g., that the user's first hand gesture meets first criteria). Providing improved feedback enhances the operability of the device, which, additionally, reduces power usage and improves battery life of the device by enabling the user to use the device more quickly and efficiently.

In some embodiments, displaying the plurality of the user interface objects at the respective second positions in the three-dimensional environment (e.g., in response to detecting the movement of the user's hand that meets the first criteria) includes expanding respective sizes of the plurality of user interface objects as the plurality of user interface objects move from the respective first position in the three-dimensional environment that corresponds to the location of the hand in the physical environment to the respective second positions in the three-dimensional environment (e.g., in response to detecting the movement of the user's hand that meets the first criteria). For example, in FIGS. 7C-7D, the compute system, optionally, displays the user interface objects 7306, 7302, and 7304 expanding as they move through the three-dimensional environment 7104 from the position that corresponds to the location of the hand 7202 to their final positions shown in FIG. 7D, in accordance with some embodiments. Expanding respective sizes of the plurality of user interface objects as the plurality of user interface objects move from the first respective position in the three-dimensional environment that corresponds to the location of the hand in the physical environment to the respective second positions in the three-dimensional environment provides improved feedback to the user (e.g., by increasing the visibility of the user interface objects as they move to the respective second positions). Providing improved feedback enhances the operability of the device, which, additionally, reduces power usage and improves battery life of the device by enabling the user to use the device more quickly and efficiently.

In some embodiments, while displaying the plurality of user interface objects at the respective second positions in the three-dimensional environment (e.g., in response to detecting the movement of the user's hand meeting the first criteria), the computer system detects an event that meets preset criteria (e.g., detecting movement of at least a portion of the computer system or a component in communication with the computer system (e.g., movement of display generation component that is used to display the three-dimensional environment, movement of the one or more sensors and/or cameras that are used to provide a representation of the physical environment and/or provide the spatial data used to generated the three-dimensional environment, etc.)). In response to detecting the event that meets the preset criteria (e.g., the criteria requiring that the event is detection of a movement of the display generation component, a movement of the camera, a movement of a component that is strapped on or attached to the user's head or face, etc.), the computer system transitions from displaying the first view of the three-dimensional environment to displaying a second view of the three-dimensional environment that is different from the first view of the three dimensional environment (e.g., the second view has a different viewpoint from that of the first view, due to the moving of the at least the portion of the computer system), wherein displaying the second view of the three-dimensional environment includes maintaining display of the plurality of user interface objects at the respective second positions in the three-dimensional environment as a viewpoint a currently displayed view of the three-dimensional environment changes (e.g., changes from a viewpoint corresponding to the first view to a viewpoint corresponding to the second view). For example, in FIG. 7D, after the user interface objects 7306, 7302, and 7304 are displayed at their positions that are away from the position corresponding to the location of the user's hand, the user interface objects are locked to the three-dimensional environment; and if the viewpoint of the currently displayed view of the three-dimensional environment moves, the user interface objects 7306, 7302, and 7304, are optionally, displayed at the same positions in the three-dimensional environment as before, but shown from a different viewing perspective corresponding to the new position of the viewpoint, in accordance with some embodiments. For example, the plurality of user interface objects remain at the same positions in the three-dimensional environment, but may show up on a different portion of the field of view provided by the display generation component (e.g., have different displayed positions on the display), because the viewpoint has changed due to the event. In some embodiments, some or all of the plurality of user interface objects may be outside of the currently displayed view due to the changing viewpoint, but will be visible again when the respective second positions reenter the field of view as a result of further movement of the display generation component and/or cameras of the computer system. Transition from displaying the first view of the three-dimensional environment to displaying a second view of the three-dimensional environment that is different from the first view of the three dimensional environment, wherein displaying the second view of the three-dimensional environment includes maintaining display of the plurality of user interface objects at the respective second positions in the three-dimensional environment as a viewpoint a currently displayed view of the three-dimensional environment changes reduces the number of inputs needed to display the plurality of user interface objects at the respective second positions (e.g., because display of the plurality of user interface objects is maintained at the respective second positions in the three-dimensional environment, the user does not need to repeat movement of user's hand meeting first criteria to redisplay the plurality of user interface objects at the respective second positions in the three-dimensional environment). Reducing the number of inputs needed to perform an operation enhances the operability of the device, which, additionally, reduces power usage and improves battery life of the device by enabling the user to use the device more quickly and efficiently.

In some embodiments, while displaying the plurality of user interface objects at the respective second positions in the three-dimensional environment (e.g., in response to detecting the movement of the user's hand meeting the first criteria), the computer system detects an event that meets preset criteria (e.g., detecting movement of at least a portion of the computer system or a component in communication with the computer system (e.g., movement of display generation component that is used to display the three-dimensional environment, movement of the one or more sensors and/or cameras that are used to provide a representation of the physical environment and/or provide the spatial data used to generated the three-dimensional environment, etc.)). In response to detecting the event that meets the preset criteria (e.g., the criteria requiring that the event is detection of a movement of the display generation component, a movement of the camera, a movement of a component that is strapped on or attached to the user's head or face, etc.), the computer system transitions from displaying the first view of the three-dimensional environment to displaying a second view of the three-dimensional environment that is different from the first view of the three dimensional environment (e.g., the second view is captured from a different viewpoint compared to that of the first view, due to the moving of the at least the portion of the computer system), wherein displaying the second view of the three-dimensional environment includes moving the plurality of user interface objects to respective third positions in the three-dimensional environment such that a spatial relationship between the plurality of user interface objects and a viewpoint corresponding to a currently displayed view of the three-dimensional environment is maintained. For example, in FIG. 7D, after the user interface objects 7306, 7302, and 7304 are displayed at their positions that are away from the position corresponding to the location of the user's hand, the user interface objects are locked to the viewpoint (e.g., corresponding to the location and facing direction of the user's head or face) three-dimensional environment; and if the viewpoint of the currently displayed view of the three-dimensional environment moves, the user interface objects 7306, 7302, and 7304, optionally, move with the viewpoint such that they remain at the same positions in the field of view provided by the first display generation component, in accordance with some embodiments. For example, the plurality of user interface objects remain at the same display positions in the current displayed field of view while the viewpoint of the currently displayed view of the three-dimensional environment has moved or changed due to the event. In some embodiments, the plurality of user interface objects will maintain their displayed positions on the display or in the field of view provided by the display generation component (e.g., in the upper portion, the left portion, the central portion, the right portion, the bottom portion, etc. of the field of view), irrespective of the changing position of the viewpoint relative to fixed elements of the three-dimensional environment. Transitioning from displaying the first view of the three-dimensional environment to displaying a second view of the three-dimensional environment that is different from the first view of the three dimensional environment, wherein displaying the second view of the three-dimensional environment includes moving the plurality of user interface objects to respective third positions in the three-dimensional environment such that a spatial relationship between the plurality of user interface objects and a viewpoint corresponding to a currently displayed view of the three-dimensional environment is maintained maintains the spatial relationship without requiring further user input (e.g., the user does not need to perform another gesture to move the plurality of user interface objects to respective positions such that the spatial relationship between the plurality of user interface objects and the viewpoint is maintained). Performing an operation when a set of conditions has been met without requiring further user input enhances the operability of the device, which, additionally, reduces power usage and improves battery life of the device by enabling the user to use the device more quickly and efficiently.

In some embodiments, in response to detecting the event that meets the preset criteria (e.g., the criteria requiring that the event is detection of a movement of the display generation component, a movement of the camera, a movement of a component that is strapped on or attached to the user's head or face, etc.), in accordance with a determination that the event meets a preset threshold (e.g., the movement of the at least the portion of the computer system in the physical environment exceeds a threshold amount (e.g., the computer system's movement exceeds a distance, speed, and/or acceleration threshold amount, etc.)), the computer system ceases to display the plurality of user interface objects in the three-dimensional environment (e.g., even when the respective second positions are still within or moved back within the field of view provided via the display generation component). For example, in FIG. 7D, after the user interface objects 7306, 7302, and 7304 are displayed at their positions that are away from the position corresponding to the location of the user's hand, the user interface objects are locked to the three-dimensional environment or to the viewpoint; and if the viewpoint of the currently displayed view of the three-dimensional environment moves by more than a threshold amount, the computer system ceases to display the user interface objects 7306, 7302, and 7304 in the three-dimensional environment, in accordance with some embodiments. Ceasing to display the plurality of user interface objects in the three-dimensional environment in response to detecting the event that meets the preset criteria performs an operation when a set of conditions has been met without requiring further user input (e.g., the user does not need to perform an additional gesture or manually select an option to cease displaying the plurality of user interface objects). Performing an operation when a set of conditions has been met without requiring further user input enhances the operability of the device, which, additionally, reduces power usage and improves battery life of the device by enabling the user to use the device more quickly and efficiently.

In some embodiments, while displaying the plurality of user interface objects at the respective positions in the three-dimensional environment (e.g., in response to detecting the movement of the user's hand that meets the first criteria), the computer system detects a user input that is directed to the user's hand (e.g., a touch input by another hand, a swipe input by another hand, a tap or swipe by one part of the user's hand relative to another part of the user's hand, etc.). In response to detecting the user input that is directed to the user's hand, in accordance with a determination that the user input corresponds to a request to interact with the plurality of user interface objects (e.g., in accordance with a determination that the user input is a recognized input for interacting with a respective one of the plurality of user interface objects, or for interacting with the plurality of user interface objects as a whole, etc.) (e.g., in accordance with a determination that the user input is detected while a gaze input is directed to a respective one of the plurality of user interface objects or the plurality of user interface objects as a whole, etc.), the computer system performs a respective operation in the three-dimensional environment that changes or activates at least one of the plurality of user interface objects (e.g., scrolling through the plurality of user interface objects, reorganizing at least some of the plurality of user interface objects, activating a respective user interface object that is selected, etc.). For example, in FIG. 7C or FIG. 7D, the computer system allows the user to provide inputs at locations on the hand 7202 to interact with the user interface objects 7306, 7302, and/or 7304, even though the user interface objects 7306, 7302, and 7304 are displayed at positions that are away from the position that corresponds to the location of the user's hand, in accordance with some embodiments. In some embodiments, copies of the user interface objects 7306, 7302, and 7304 remain displayed at the position that corresponds to the location of the hand, even after the user interface objects 7306, 7302, and 7304 are displayed at positions that are away from the position that corresponds to the location of the user's hand. In some embodiments, the computer system displays a first user interface object (e.g., a reduced scale version or simplified version of the user interface that contains the plurality of user interface objects at the respective second positions, a control object that controls the display of the plurality of user interface objects (e.g., organization, priority, level of expansion, etc.), etc.) at the respective first position in the three-dimensional environment that corresponds to the location of the user's hand, while the plurality of user interface objects and the first user interface; and the computer system allows the user to control the plurality of user interface objects displayed at the respective second positions using inputs directed to the first user interface object. In some embodiments, the first user interface object is displayed at the respective first position in the three-dimensional environment prior to, during, and/or after the plurality of user interface objects are displayed at the respective second positions in the three-dimensional environment. Performing a respective operation in the three-dimensional environment that changes or activates at least one of the plurality of user interface objects in accordance with a determination that the user input corresponds to a request to interact with the plurality of user interface objects reduces the number of inputs needed to change or activate the at least one of the plurality of user interface objects (e.g., the user does not need to navigate to or select the user interface object in the three-dimensional environment to change or activate the user interface object). Reducing the number of inputs needed to perform an operation enhances the operability of the device, which, additionally, reduces power usage and improves battery life of the device by enabling the user to use the device more quickly and efficiently.

In some embodiments, while displaying the plurality of user interface objects at the respective positions in the three-dimensional environment (e.g., in response to detecting the movement of the user's hand that meets the first criteria), displaying a first user interface object (e.g., a cluster of icons representing different categories of applications, a home button, a root menu, etc.) (e.g., a user interface object including reduced scale representations of at least a subset (e.g., some, all, etc.) of the plurality of user interface objects, a user interface object including representations of respective subsets of the plurality of user interface objects, etc.) at the respective first position in the three-dimensional environment that corresponds to the location of the user's hand (e.g., the computer system evaluates the user input that is directed to the user's hand as a user input directed to the first user interface object). For example, in FIG. 7D, the computer system optionally displays copies of the user interface objects 7306, 7302, and 7304 at the position that corresponds to the location of the hand, even after the user interface objects 7306, 7302, and 7304 are displayed at positions that are away from the position that corresponds to the location of the user's hand, in accordance with some embodiments. In some embodiments, the first user interface object displayed at respective first position appears to overlay or be in contact with the representation of the user's hand in the three-dimensional environment. In some embodiments, the first user interface object displayed at the respective first position appears to float above the representation of the user's hand in the three-dimensional environment. Displaying a first user interface object at the respective first position in the three-dimensional environment that corresponds to the location of the user's hand while displaying while displaying the plurality of user interface objects at the respective positions in the three-dimensional environment reduces the number of inputs needed to locate a desired user interface object (e.g., the user does not need to find and select the first user interface object at its respective position in the three-dimensional environment, or perform another gesture to display the first user interface object). Providing additional control options without cluttering the UI with additional displayed controls enhances the operability of the device, which, additionally, reduces power usage and improves battery life of the device by enabling the user to use the device more quickly and efficiently.

In some embodiments, while displaying the plurality of user interface objects at the respective second positions in the three-dimensional environment, the computer system detects a user input (e.g., a tap input, a swipe input, a gaze input detected in conjunction with a tap or swipe input, etc.) that corresponds to a request to select a respective user interface object (e.g., a first application icon for launching a first application, a second application icon for launching a second application, a first avatar for a first user, a second avatar for a second user, a first icon for a first experience, a second icon for a second experience, etc.) of the plurality of user interface objects. In response to detecting the user input that corresponds to the request to select the respective user interface object, the computer system changes a size (e.g., enlarging, shrinking, etc.) of the respective user interface object relative to one or more user interface objects of the plurality of user interface objects (e.g., other user interface objects that are not selected by the user input, other user interface objects that are in the same category as the respective user interface objects, etc.). For example, as shown in FIGS. 7K-7L, when the user interface objects 7304 or 7310 are displayed at positions that are away from the position that corresponds to the location of the user's hand, selection of the user interface object 7304 causes the user interface object 7304 to be enlarged, and selection of the user interface object 7310 causes the user interface object 7310 to be enlarged, in accordance with some embodiments. In some embodiments, the computer system visually emphasizes the selected user interface object relative to its surrounding user interface objects that are not selected, such as by changing relative sizes, colors, transparency levels, opacity, blur radius, etc. of the user interface objects to contrast the selected user interface object and the unselected user interface objects. Changing a size of the respective user interface object relative to one or more user interface objects of the plurality of user interface objects in response to detecting the user input that corresponds to the request to select the respective user interface object provides improved visual feedback to the user (e.g., by increasing visibility of the selected respective user interface object). Providing improved feedback enhances the operability of the device, which, additionally, reduces power usage and improves battery life of the device by enabling the user to use the device more quickly and efficiently.

In some embodiments, the computer system displays a first user interface object that corresponds to the plurality of user interface objects (e.g., a cluster of icons representing different categories of applications, a home button, a root menu, etc.) (e.g., a user interface object including reduced scale representations of at least a subset (e.g., some, all, etc.) of the plurality of user interface objects, a user interface object including representations of respective subsets of the plurality of user interface objects, etc.) at the respective first position in the three-dimensional environment that corresponds to the location of the user's hand in the physical environment, while the plurality of user interface objects are not displayed at the respective second positions (e.g., before the movement of the user's hand meets the first criteria, when the movement of the user's hand does not meet the first criteria, after the plurality of user interface objects are dismissed by an additional input, etc.), and while the plurality of user interface objects are displayed at the respective second positions (e.g., in response to the movement of the user's hand meeting the first criteria), in the three-dimensional environment. For example, in FIGS. 7C and 7D, the computer system, optionally, maintains display of the user interface objects 7306, 7302, and 7304 at the position that corresponds to the location of the user's hand 7202, both before and after the user interface objects 7306, 7302, and 7304 are displayed at the positions that are away from the position that corresponds to the location of the user's hand 7202, in some embodiments. In some embodiments, the computer system displays the first user interface object at the respective first position in the three-dimensional environment that corresponds to the location of the user's hand, irrespective of whether the plurality of user interface objects are displayed at the respective second positions in the three-dimensional environment away from the respective first position, but the computer system requires that the user's gaze is directed to the respective first position, the user's hand is in the user's field of view provided via the display generation component, a preset portion of the user's hand (e.g., palm, back of hand, inner wrist, etc.) is facing toward the user, the user's hand is in a preset posture (e.g., hand open with fingers extended, hand in a fist with back of thumb facing toward the user, etc.), etc., in order to display the first user interface object at the respective first position in the three-dimensional environment that corresponds to the location of the user's hand. Displaying a first user interface object that corresponds to the plurality of user interface objects at the respective first position corresponding to the user's hand, while the plurality of user interface objects are not displayed at the respective second positions . . . reduces the number of inputs needed to display the first user interface object (e.g., the user does not need to perform an additional gesture to redisplay the first user interface object that corresponds to the plurality of user interface objects, after the user's hand has moved). Reducing the number of inputs needed to perform an operation enhances the operability of the device, which, additionally, reduces power usage and improves battery life of the device by enabling the user to use the device more quickly and efficiently.

In some embodiments, while displaying the first user interface object at the respective first position that corresponds to the location of the user's hand, the computer system detects a change in hand posture of the user's hand that corresponds to a transition between an open posture and a closed posture of the user's hand (e.g., opening the hand to show the full palm or back of hand, closing the hand to form a fist or semi-fist, etc.). In response to detecting the change in hand posture that corresponds to the transition between the open posture and the closed posture of the user's hand, the computer system changes a size of the first user interface object in accordance with the change in hand posture of the user's hand (e.g., expanding the first user interface object in accordance with the opening movement of the user's hand, and shrinking the first user interface object in accordance with the closing movement of the user's hand, etc.). For example, in FIG. 7C, if the user's hand opens wider, the computer system increases the sizes of the user interface objects 7306, 7302, and 7304; and if the user's hand closes, the computer system decreases the sizes of the user interface objects 7306, 7302, and 7304, in accordance with some embodiments. For example, in some embodiments, there is a direct correlation between the movement of the hand and the visual feedback provided via the first user interface object. In some embodiments, the direction of the change in the size of the first user interface object is, optionally, based on the direction of the change in hand posture (e.g., opening or closing). In some embodiments, the speed of change in the size of the first user interface object is, optionally, based on the speed of the change in hand posture. In some embodiments, the amount of the change in the size of the first user interface object is, optionally, based on the amount of change in the hand posture. Additionally, in some embodiments, the first user interface object increases in size and subsequently decrease in size or vice versa as the change in hand posture progresses (e.g., the hand opening and then closing). Changing a size of the first user interface object in accordance with the change in hand posture of the user's hand reduces the number of inputs needed to interact with the first user interface object (e.g., the user does not need to perform additional inputs to increase or decrease the size of the first user interface object). Reducing the number of inputs needed to perform an operation enhances the operability of the device, which, additionally, reduces power usage and improves battery life of the device by enabling the user to use the device more quickly and efficiently.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, 11000, 12000, 13000, 14000, 15000, and 16000) are also applicable in an analogous manner to method 8000 described above with respect to FIG. 8. For example, the gestures, gaze inputs, physical objects, user interface objects, controls, movements, criteria, three-dimensional environment, display generation component, surface, representation of physical object, virtual objects, and/or animations described above with reference to method 8000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 9000, 10000, 11000, 12000, 13000, 14000, 15000, and 16000). For brevity, these details are not repeated here.

Figure 9:
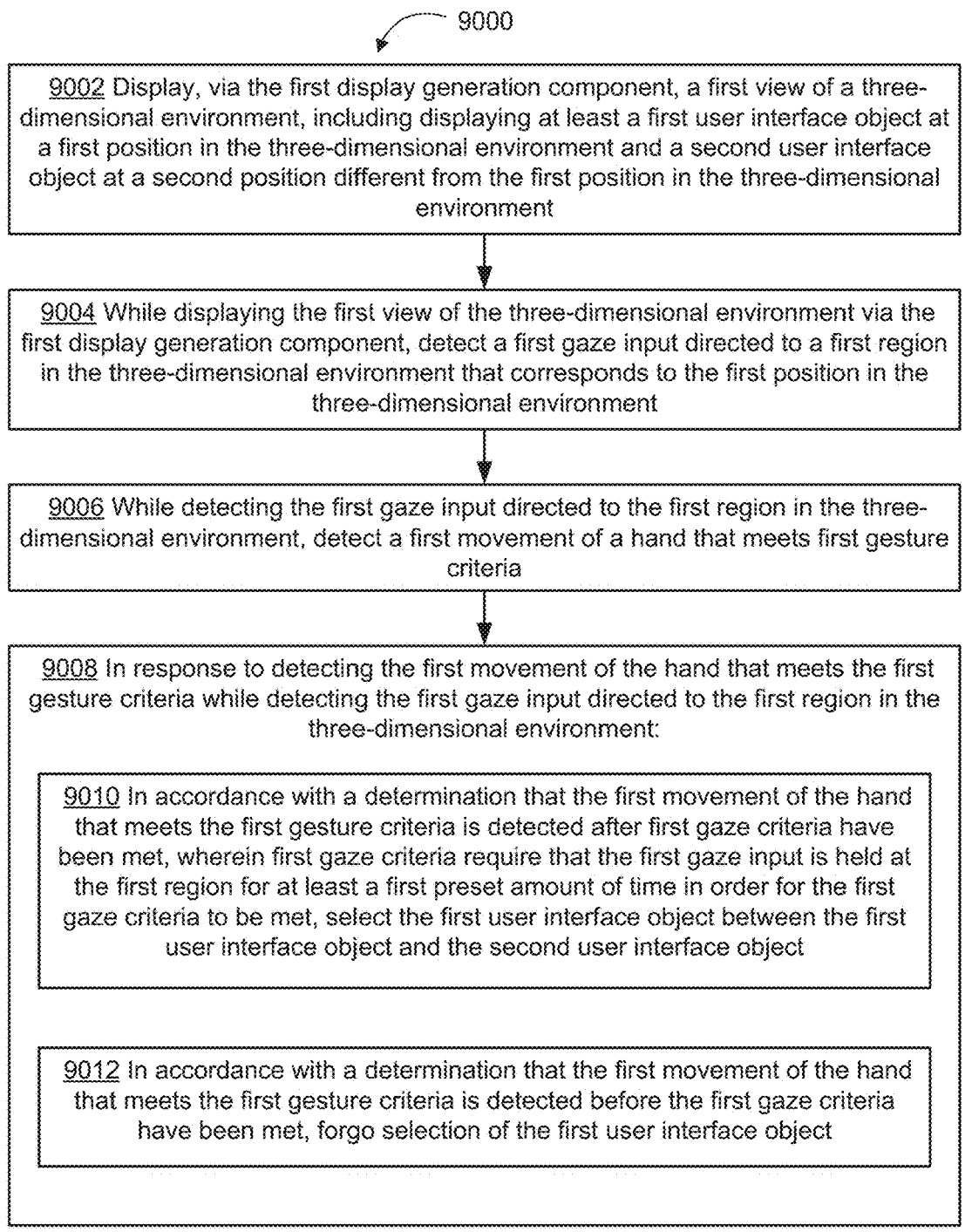
FIG. 9 is a flowchart of a method of using detection of a preset hand gesture in conjunction with detection of a gaze input that is maintained on a respective user interface object for a preset extended amount of time (e.g., a preset dwell time) to cause selection of the respective user interface object, in accordance with some embodiments.

FIG. 9 is a flowchart of a method 9000 of using detection of a preset hand gesture in conjunction with detection of a gaze input that is maintained on a respective user interface object for a preset extended amount of time (e.g., a preset dwell time) to cause selection of the respective user interface object, in accordance with some embodiments.

In some embodiments, the method 9000 is performed at a computer system (e.g., computer system 101 in FIG. 1) including a first display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 9000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 9000 are, optionally, combined and/or the order of some operations is, optionally, changed.

In some embodiments, the method 9000 is performed at a computer system (e.g., the computer system 101 in FIG. 1, the computer system 101 described with respect to FIGS. 7A-7D, FIGS. 7E-7F, FIGS. 7G-7H, FIGS. 7I-7M, FIGS. 7N-7O, FIGS. 7P-7S, FIGS. 7T-7U, and/or FIGS. 7V-7X, the first computer system 101-*t* described with respect to FIGS. 7V-7X, the second computer system described with respect to FIGS. 7V-7X, etc.). In some embodiments, the computer system is in communication with a first display generation component (e.g., the first display generation component is a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the first display generation component is a first display generation component 7100 described with respect to FIGS. 7A-7U and 7Y-7Z, a first display generation component 7100-*t* described with respect to FIGS. 7V-7X, a second display generation component described with respect to FIGS. 7V-7X, etc. In some embodiments, the computer system is an integrated device with one or more processors and memory enclosed in the same housing as the first display generation components and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the first display generation component and/or the one or more input devices. In some embodiments, the first display generation component and the one or more input devices are integrated and enclosed in the same housing. Many of the features of the method 9000 are described with respect to FIGS. 7E-7H, in accordance with some embodiments.

In the method 9000, the computer system displays (9002), via the first display generation component, a first view (e.g., a view corresponding to a first viewpoint, a view from a first viewing perspective, etc.) of a three-dimensional environment (e.g., a virtual three-dimensional environment, an augmented reality environment, a pass-through view of a physical environment, a camera view of a physical environment, etc.), including displaying at least a first user interface object at a first position in the three-dimensional environment and a second user interface object at a second position different from the first position in the three-dimensional environment. This is illustrated, for example, in FIGS. 7E-7H, where the first user interface object 7308 and the second user interface object 7311 are displayed in a first view of a three-dimensional environment 7104, in accordance with some embodiments. In some embodiments, the three-dimensional environment is a virtual three-dimensional environment without a representation of a physical environment. In some embodiments, the three-dimensional environment is a mixed reality environment that is a virtual environment that is augmented by sensor data corresponding to the physical environment. In some embodiments, the three-dimensional environment is an augmented reality environment that includes one or more virtual objects and a representation of at least a portion of a physical environment surrounding the first display generation component (e.g., a camera view or a view through a transparent or semitransparent portion of the first display generation component). In some embodiments, the first user interface object is a first application icon for activating a first application, a first avatar of a first user for starting a communication session with the first user, a first icon for starting a first computer-generated experience, a first interactive control, a first selectable menu item, etc.; and the second user interface object is a second application icon for activating a second application, a second avatar of a second user for starting a communication session with the second user, a second icon for starting a second computer-generated experience, a second interactive control, a second selectable menu item, etc.

In the method 9000, while displaying the first view of the three-dimensional environment via the first display generation component, the computer system detects (9004) a first gaze input directed to a first region in the three-dimensional environment that corresponds to the first position in the three-dimensional environment (e.g., the first region is defined to be within or substantially within a visible region of the first user interface object in the currently displayed view of the three-dimensional environment when the first user interface object is displayed at the first position in the three-dimensional environment). This is illustrated, for example, in FIGS. 7G and 7H, where the gaze input 7212 is directed to the region that corresponds to the first user interface object 7308 in the first view of a three-dimensional environment 7104, in accordance with some embodiments.

In the method 9000, while detecting the first gaze input directed to the first region in the three-dimensional environment, the computer system detects (9006) a first movement of a hand that meets first gesture criteria (e.g., criteria for detecting a preset selection gesture, a tap gesture, a pinch gesture, a pinch and drag gesture, etc.). This is illustrated, for example, in FIGS. 7G and 7H, where the gaze input 7212 is directed to the region that corresponds to the first user interface object 7308 in the first view of a three-dimensional environment 7104, while the computer system detects movement 731 that meets the first gesture criteria, in accordance with some embodiments.

In the method 9000, in response to detecting the first movement of the hand that meets the first gesture criteria while detecting the first gaze input directed to the first region in the three-dimensional environment (9008): in accordance with a determination that the first movement of the hand that meets the first gesture criteria (e.g., completion of the first movement, or at least a portion of the first movement, etc.) is detected after first gaze criteria have been met (e.g., while the first gaze criteria continue to be met, or within a preset time window of when the first gaze criteria were last met, etc.), wherein first gaze criteria require that the first gaze input is held at the first region for at least a first preset amount of time (e.g., 500 milliseconds, 700 milliseconds, 1 second, two seconds, etc.) in order for the first gaze criteria to be met (e.g., the precise position of the first gaze input may change but is overall continuously confined within the first region during the first preset amount of time), the computer system selects (9010) the first user interface object between the first user interface object and the second user interface object (e.g., selecting the first user interface object without selecting the second user interface object); and in accordance with a determination that the first movement of the hand that meets the first gesture criteria (e.g., completion of the first movement, start of the first movement, etc.) is detected before the first gaze criteria have been met (and optionally, outside of the preset time window of when the first gaze criteria were last met), the computer system forgoes (9012) selection of the first user interface object. These features are, for example, illustrated in FIGS. 7G and 7H, if the gaze input 7212 directed to the region that corresponds to the first user interface object 7308 has not been held for at least the first amount of time T0+$T_h$, the movement 7312 of the hand does not cause selection of the first user interface object 7308 (as shown in FIG. 7G); and if the gaze input 7212 has been held in the region of the first user interface object 7308 for at least the first amount of time, the movement 7312 of the hand causes selection of the first user interface object 7308 (as shown in FIG. 7H), in accordance with some embodiments. Selecting the first user interface object between the first user interface object and the second user interface object in accordance with a determination that the first movement of the hand that meets the first gesture criteria is detected after first gaze criteria have been met, or forgoing selection of the first user interface object in accordance with a determination that the first movement of the hand that meets the first gesture criteria is detected before the first gaze criteria have been met provides additional control options without cluttering the UI with additional displayed controls (e.g., allows the user to control whether the first user interface object is or is not selected by timing of the first movement of the hand relative to meeting first gaze criteria, rather than relying on additional displayed controls). Providing additional control options without cluttering the UI with additional displayed controls enhances the operability of the device, which, additionally, reduces power usage and improves battery life of the device by enabling the user to use the device more quickly and efficiently.

In some embodiments selecting the first user interface object includes performing a first operation corresponding to the first user interface object (e.g., the computer system performs the first operation without detecting another user input, optionally, immediately when the first gesture criteria and the first gaze criteria are both met). For example, in FIG. 7H, selection of the first user interface object 7308, optionally, causes performance of an operation corresponding to the first user interface object 7308, in accordance with some embodiments. In some embodiments, the first user interface object is a first application icon and the first operation is launching the first application corresponding to the first application icon. In some embodiments, the first user interface object is a first avatar corresponding to a first user, and the first operation is initiating a process for establishing a communication session with the first user. In some embodiments, the first user interface object is an icon for starting a computer-generated experience, and the first operation is starting the first computer-generated experience in the three-dimensional environment or initiating the process for displaying the first computer-generated experience in the three-dimensional environment. Performing a first operation corresponding to the first user interface object when selecting the first user interface object reduces the number of inputs needed to perform the first operation corresponding to the first user interface object (e.g., the user does not need to perform an additional gesture, after selecting the first user interface object, to perform the first operation corresponding to the first user interface object). Reducing the number of inputs needed to perform an operation enhances the operability of the device, which, additionally, reduces power usage and improves battery life of the device by enabling the user to use the device more quickly and efficiently.

In some embodiments, while the first user interface object remains selected (e.g., selected in response to the first gesture criteria and the first gaze criteria having been met in conjunction with each other), the computer system detects a first user input that meets preset criteria for activating a respective one of the first user interface object and the second user interface object while the respective one of the first user interface object or the second user interface object is selected (e.g., the user input is a second hand gesture, a voice command, a confirmation input received by an input device, etc.). In response to detecting the first user input, the computer system performs a first operation corresponding to the first user interface object (e.g., the first user interface object is activated instead of the second user interface object because the first user input is detected while the first user interface object is selected and the second user interface object is not selected). For example, in FIG. 7H, after the selection of the first user interface object 7308, the computer system, optionally, detects a user input that meets the requirement for activating either the first user interface object 7308 or the second user interface object 7311; and in accordance with a determination that the first user interface object 7308 is selected, the computer system performs the operation that corresponds to the first user interface object 7308, in accordance with some embodiments. In some embodiments, the first user interface object is a first application icon and the first operation is launching the first application corresponding to the first application icon. In some embodiments, the first user interface object is a first avatar corresponding to a first user, and the first operation is initiating a process for establishing a communication session with the first user. In some embodiments, the first user interface object is an icon for starting a computer-generated experience, and the first operation is starting the first computer-generated experience in the three-dimensional environment or initiating the process for displaying the first computer-generated experience in the three-dimensional environment. Performing a first operation corresponding to the first user interface object in response to detecting the first user input while the first user interface object remains selected provides additional control options without cluttering the UI with additional displayed controls (e.g., individual controls for different first operations corresponding to the first user interface). Providing additional control options without cluttering the UI with additional displayed controls enhances the operability of the device, which, additionally, reduces power usage and improves battery life of the device by enabling the user to use the device more quickly and efficiently.

In some embodiments, the computer system displays a position indicator (e.g., a virtual spot light, a cursor, a crosshair, a marker, etc.) at a respective position in the three-dimensional environment that corresponds to a current position of the first gaze input, wherein the respective position of the position indicator is updated in accordance with movement of the first gaze input before the first gaze input is detected at the first region in the three-dimensional environment as well as while the first gaze input is detected at the first region in the three-dimensional environment (e.g., the position indicator is continuously displayed irrespective of whether or not the first gaze criteria are met by the first gaze input and/or whether the first gaze input is detected at the first region or outside of the first region). For example, in FIGS. 7G and 7H, the computer system, optionally, displays a cursor or spotlight that indicates the current position of the gaze input 7212, where the cursor or spotlight moves in accordance with the movement of the gaze input 7212 (e.g., before, after, and during the time that the gaze input is detected in the region of the first user interface object 7308), in accordance with some embodiments. Displaying a position indicator at a respective position that corresponds to a current position of the first gaze input, which is updated in accordance with movement of the first gaze input provides improved visual feedback to the user (e.g., regarding the location at which the user's gaze is directed). Providing improved feedback enhances the operability of the device, which, additionally, reduces power usage and improves battery life of the device by enabling the user to use the device more quickly and efficiently.

In some embodiments, the first movement of the hand that meets the first gesture criteria includes pinching two or more fingers of the hand together and moving the hand while the two or more fingers are pinched together (e.g., lateral movement and/or rotational movement of the whole hand with the thumb touching the index finger and/or middle finger of the hand). In response to detecting the movement of the hand while the two or more fingers are pinched together, in accordance with a determination that the first user interface object has been selected (e.g., in response to the pinching of the two more fingers of the hand while the first gaze criteria are met), the computer system scrolls content displayed within the first user interface object in accordance with the movement of the hand while the two or more fingers are pinched together (e.g., scrolling through different pages, portions, subsets of the text, images, user interface objects, controls, icons, avatars, etc. displayed within the first user interface object). For example, in FIGS. 7K-7M, the first user interface object is the user interface object 7306', and the movement of the hand is a pinch and drag gesture performed by the hand 7202 while the gaze input 7206 has been maintained in the region of the user interface object 7306' for more than the first amount of time; and in response to the pinch and drag gesture, the computer system, optionally, scrolls the content and/or user interface objects within the user interface object 7306' in accordance with the movement of the hand 7202, in accordance with some embodiments. In some embodiments, pinching the two or more fingers of the hand together and moving the hand while the two or more fingers are pinched together do not cause scrolling of the content within the first user interface object if the first gaze input has not met the first gaze criteria and the first user interface object is not selected. Scrolling content displayed within the first user interface in accordance with movement of the hand while the two or more fingers are pinched together reduces the number of inputs needed to scroll content within the first user interface object (e.g., allows the user to both select the first user interface object and scroll content displayed within the first user interface object in a single gesture). Reducing the number of inputs needed to perform an operation enhances the operability of the device, which, additionally, reduces power usage and improves battery life of the device by enabling the user to use the device more quickly and efficiently.

In some embodiments, the first movement of the hand that meets the first gesture criteria includes pinching two or more fingers of the hand together and moving the hand while the two or more fingers are pinched together (e.g., lateral movement and/or rotational movement of the whole hand with the thumb touching the index finger and/or middle finger of the hand). In response to detecting the movement of the hand while the two or more fingers are pinched together, in accordance with a determination that the first user interface object has been selected (e.g., in response to the pinching of the two more fingers of the hand while the first gaze criteria are met), the computer system moves the first user interface object (e.g., translating, rotating, pivoting, etc.) in the three-dimensional environment in accordance with the movement of the hand while the two or more fingers of the hand are pinched together. For example, in FIGS. 7K-7M, the first user interface object is the user interface object 7306', and the movement of the hand is a pinch and drag gesture performed by the hand 7202 while the gaze input 7206 has been maintained in the region of the user interface object 7306' for more than the first amount of time; and in response to the pinch and drag gesture, the computer system, optionally, rotates and/or translate the user interface object 7306' in accordance with the movement of the hand 7202, in accordance with some embodiments. In some embodiments, pinching the two or more fingers of the hand together and moving the hand while the two or more fingers are pinched together do not cause scrolling of the content within the first user interface object if the first gaze input has not met the first gaze criteria and the first user interface object is not selected. Moving the first user interface object in accordance with movement of the hand while the two or more fingers of the hand are pinched together reduces the number of inputs needed to move the first user interface object (e.g., allows the user to both select and move the first user interface object in a single gesture). Reducing the number of inputs needed to perform an operation enhances the operability of the device, which, additionally, reduces power usage and improves battery life of the device by enabling the user to use the device more quickly and efficiently.

In some embodiments, the first gesture criteria are capable of being met in response to the first movement of the hand irrespective of whether or not the first movement of the hand occurs in a region of the physical environment that corresponds to the first region of the three-dimensional environment. For example, in FIG. 7H, whether the movement 7312 of the hand occurs in a region that is away from a location that corresponds to the position of the first user interface object 7308 in the three-dimensional environment or at the location that corresponds to the position of the first user interface object 7308 in the three-dimensional environment, the computer system will select the first user interface object

7308 in accordance with a determination that the movement 7312 meets the first gesture criteria while the gaze input 7212 meets the first gaze criteria, in accordance with some embodiments. For example, in some embodiments, if a movement of the hand meets the first gesture criteria when the movement occurs in a spatial region of the physical environment that is mapped to a region in the three-dimensional environment that is within a threshold range of the first user interface object (e.g., the first region, the region that is occupied by the first user interface object, etc.), the same movement of the hand would meet the first gesture criteria when the movement occurs in a spatial region of the physical environment that is mapped to a region in the three-dimensional environment that is outside of, or away from the threshold range of the first user interface object. In other words, in some embodiments, the location of the first movement is not a factor in determining wither the first movement of the hand meets the first gesture criteria. In some embodiments, the location of the first movement is a factor in determining wither the first movement of the hand meets the first gesture criteria, and the location is optionally required to be mapped to the first position in the three-dimensional environment in order for the first gesture criteria to be met. In some embodiments, the location of the first movement is a factor in determining wither the first movement of the hand meets the first gesture criteria, and the location is optionally required to be mapped to a position outside of the first region in the three-dimensional environment in order for the first gesture criteria to be met. Meeting first gesture criteria in response to the first movement of the hand irrespective of whether or not the first movement of the hand occurs in a region of the physical environment that corresponds to the first region of the three-dimensional environment provides additional control options without cluttering the UI (e.g., by not requiring the first movement of the hand to occur on or near the first or second user interface objects in the three-dimensional environment, which may obscure the view of the three-dimensional environment, the first region, and/or the first or second user interface objects). Providing additional control options without cluttering the UI enhances the operability of the device, which, additionally, reduces power usage and improves battery life of the device by enabling the user to use the device more quickly and efficiently.

In some embodiments, in response to detecting the first gaze input directed to the first region in the three-dimensional environment, the computer system changes a value of a first visual property of the first user interface object at the first position in the three-dimensional environment. For example, in FIG. 7G, the computer system, optionally, changes the appearance of the first user interface object 7308 as visual feedback for detecting the gaze input 7212 in the region of the first user interface object 7308, even when the movement 7312 has not been detected and even though the gaze input 7212 has not been held in the region for at least the first amount of time, in accordance with some embodiments. In some embodiments, the first user interface object changes in size (e.g., expands or shrinks), color, or other visual properties when the first gaze input is directed to the first region in the three-dimensional environment that corresponds to the first position in the three-dimensional environment. Changing the value of a first visual property of the first user interface in response to detecting the first gaze input directed to the first region in the three-dimensional environment provides improved visual feedback to the user (e.g., that the computer system has detected the user's gaze being directed to the first region of the three-dimensional environment). Providing improved feedback enhances the operability of the device, which, additionally, reduces power usage and improves battery life of the device by enabling the user to use the device more quickly and efficiently.

In some embodiments, in response to detecting the first gaze input directed to the first region in the three-dimensional environment: in accordance with a determination that the first gaze input meets the first gaze criteria, the computer system changes a value of a first visual property of the first user interface object at the first position in the three-dimensional environment; and in accordance with a determination that the first gaze input does not meet the first gaze criteria, the computer system forgoes changing the value of the first visual property of the first user interface object in the three-dimensional environment. For example, in FIG. 7G, the computer system, optionally, changes the appearance of the first user interface object 7308 as visual feedback for detecting the gaze input 7212 in the region of the first user interface object 7308 when the gaze input 7212 has been held in the region for at least the first amount of time, but does not change the appearance of the first user interface object 7308 when the gaze input 7212 has not been held in the region for at least the first amount of time yet, in accordance with some embodiments. In some embodiments, the first user interface object changes in size (e.g., expands or shrinks), color, or other visual properties when the first gaze input is directed to and held at the first region in the three-dimensional environment that corresponds to the first position in the three-dimensional environment for at least the first preset threshold amount of time, while the visual properties of the second user interface object are not changed. In some embodiments, the first user interface object does not change in appearance (e.g., does not change in size (e.g., expands or shrinks), color, or other visual properties, etc.) when the first gaze input is directed to but not held at the first region in the three-dimensional environment that corresponds to the first position in the three-dimensional environment for at least the first preset threshold amount of time. In some embodiments, the change in display property of the first user interface object is implemented by a visual contrast between the first user interface object and the rest of the three-dimensional environment (e.g., dimming the rest of the visible portion of the three-dimensional environment while maintaining the original appearance of the first user interface object when the first gaze criteria are met by the first gaze input). In some embodiments, upon selection of the first user interface object in response to the first movement of the hand that meets the first gesture criteria after the first gaze criteria have been met by the first gaze input, the computer system further changes the appearance of the first user interface object, optionally, in conjunction with performing an operation that is associated with selection of the first user interface object. Changing or forgoing changing the value of the first visual property of the first user interface object in accordance with a determination that the first gaze input does or does not meet the first gaze criteria, respectively, provides additional control options without cluttering the UI with additional displayed controls (e.g., the user does not need to select or deselect any additional controls in order to control whether the value of the first visual property of the first user interface object changes). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the first movement of the hand that meets the first gesture criteria while detecting the first gaze input directed to the first region in the three-dimensional environment: in accordance with a determination that the first movement of the hand that meets the first gesture criteria (e.g., completion of the first movement, or at least a portion of the first movement, etc.) is detected while the first gaze input is detected (e.g., before the first gaze criteria are met, while the first gaze criteria are or continue to be met, within a preset time window of when the first gaze criteria were last met, etc.), the computer system changes a value of a first visual property of the first user interface object at the first position in the three-dimensional environment. For example, in FIG. 7H, the computer system, optionally, changes the appearance of the first user interface object 7308 as visual feedback for detecting the gaze input 7212 in the region of the first user interface object 7308 in conjunction with detecting at least a portion of the movement 7312 that meets the first gesture criteria, in accordance with some embodiments. In some embodiments, in accordance with a determination that the first movement of the hand that meets the first gesture criteria (e.g., completion of the first movement, start of the first movement, an entirety of the first movement, etc.) is detected when the first gaze input is not concurrently detected at the first region, the computer system forgoes changing the appearance of the first user interface object (e.g., forgoing changing the value of the first visual property of the first user interface object, and maintaining the appearance of the first user interface object, etc.). In some embodiments, the first user interface object changes in size (e.g., expands or shrinks), color, or other visual properties when the first movement of the hand that meets the first gesture criteria is detected while a gaze input is directed to the first region in the three-dimensional environment that corresponds to the first position in the three-dimensional environment. In some embodiments, the first user interface object does not change in size (e.g., expand or shrink), color, or other visual properties when the first movement of the hand that meets the first gesture criteria is detected while no gaze input is directed to the first region in the three-dimensional environment that corresponds to the first position in the three-dimensional environment. In some embodiments, the first user interface object changes visual appearance in response to the first movement of the hand while a gaze input is directed to the first region of the three-dimensional environment, without the gaze input having been held at the first region for more than the preset threshold amount of time to meet the first gaze criteria. Changing a value of a first visual property of the first user interface object in accordance with a determination that the first movement of the hand meets first gesture criteria while the first gaze input is detected provides improved visual feedback to the user (e.g., that first gesture criteria have been met and the first gaze input is being detected, but before first gaze criteria are met). Providing improved feedback enhances the operability of the device, which, additionally, reduces power usage and improves battery life of the device by enabling the user to use the device more quickly and efficiently.

In some embodiments, in accordance with a determination that the first gesture criteria and the first gaze criteria are both met, the computer system provides a first visual feedback in the three-dimensional environment (e.g., the first visual feedback is a first change in visual characteristic of the first user interface object and/or a second change in the three dimensional environment outside of the first user interface object, etc.). In accordance with a determination that the first gesture criteria are met and the first gaze criteria are not met, the computer system provides a second visual feedback in the three-dimensional environment (e.g., the second visual feedback is a third change in visual characteristic of the first user interface object and/or a fourth change in the three dimensional environment outside of the first user interface object, etc.), the second visual effect being different from the first visual effect. For example, in the scenarios in FIGS. 7G, 7H, and 7F, respectively, the computer system, optionally, provide different visual feedback to indicate which sets or subsets of criteria for selecting the first user interface object 7308 have been met or not met, in accordance with some embodiments. In some embodiments, if the first gesture criteria are met when a gaze input is not detected in the first region, the computer system provides a third visual feedback in the three-dimensional environment (e.g., the third visual feedback may be a fifth change in visual characteristic of the first user interface object and/or a sixth change in the three dimensional environment outside of the first user interface object, etc.); if the movement of the hand does not meet the first gesture criteria but the first gaze criteria are met, the computer system provides a fourth visual feedback in the three-dimensional environment (e.g., the fourth visual feedback may be a seventh change in visual characteristic of the first user interface object and/or an eighth change in the three dimensional environment outside of the first user interface object, etc.); if the movement of the hand does not meet the first gesture criteria and the gaze is also not directed to the first region, the computer system does not provide a visual feedback with respect to the first user interface object. In some embodiments, the first visual effect, the second visual effect, the third visual effect, and the fourth visual effect are all different from one another. Providing first or second visual feedback in accordance with a determination that the first gesture criteria and first gaze criteria are both met or both not met, respectively, provides improved feedback to the user (e.g., provides a visual indication whether or not the user has successfully met both first gesture criteria and first gaze criteria or not). Providing improved feedback enhances the operability of the device, which, additionally, reduces power usage and improves battery life of the device by enabling the user to use the device more quickly and efficiently.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 10000, 11000, 12000, 13000, 14000, 15000, and 16000) are also applicable in an analogous manner to method 9000 described above with respect to FIG. 9. For example, the gestures, gaze inputs, physical objects, user interface objects, controls, movements, criteria, three-dimensional environment, display generation component, surface, representation of physical object, virtual objects, and/or animations described above with reference to method 9000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 10000, 11000, 12000, 13000, 14000, 15000, and 16000). For brevity, these details are not repeated here.

Figure 10:
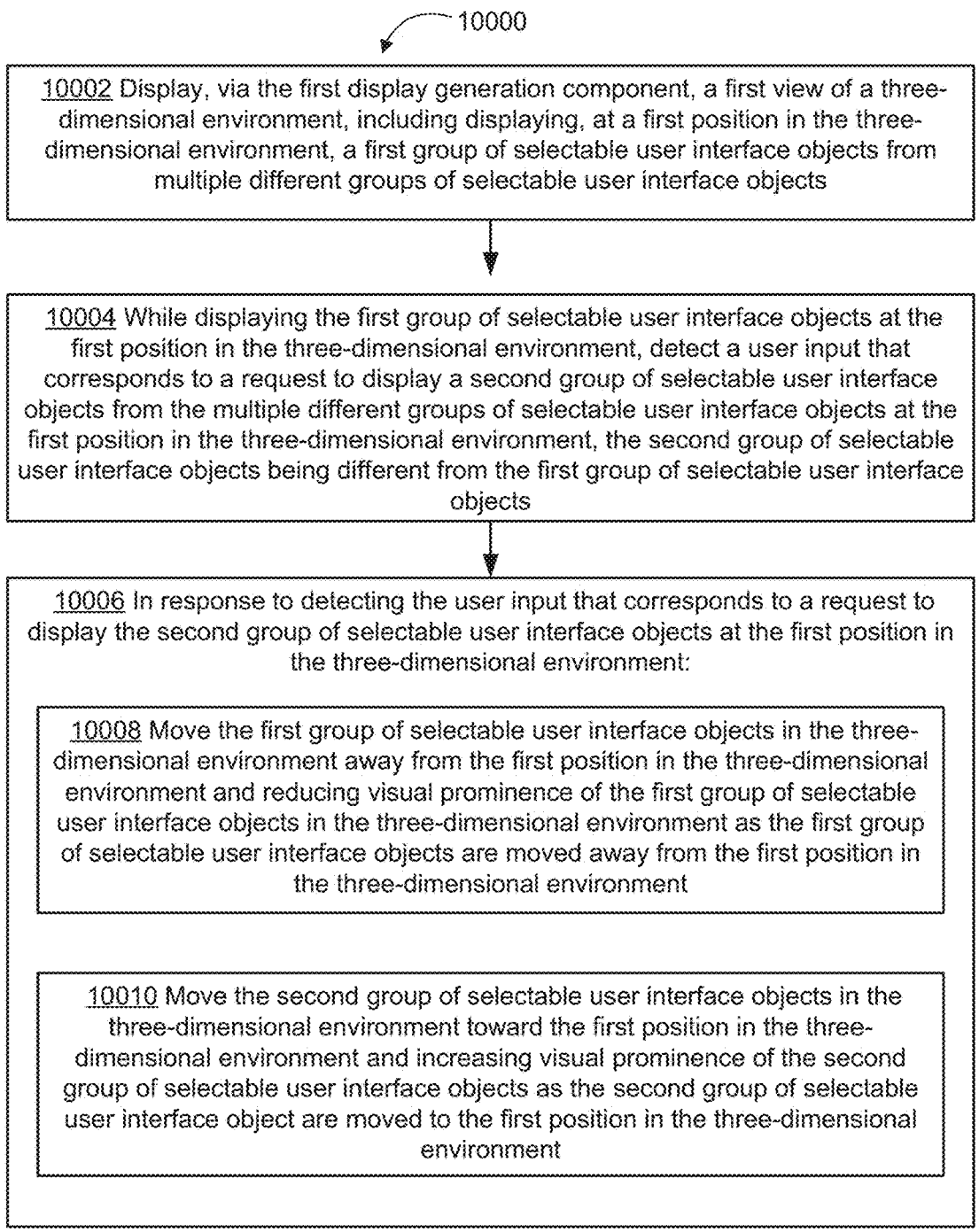
FIG. 10 is a flowchart of a method of switching between different groups of selectable user interface objects in response to a user input, where visual prominence of a respective group is increased or decreased depending on whether it is moving toward or away from a first position in a three-dimensional environment, in accordance with some embodiments.

FIG. 10 is a flowchart of a method 10000 of switching between different groups of selectable user interface objects in response to a user input, where visual prominence of a respective group is increased or decreased depending on whether it is moving toward or away from a first position in a three-dimensional environment, in accordance with some embodiments.

In some embodiments, the method 10000 is performed at a computer system (e.g., computer system 101 in FIG. 1) including a first display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 10000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 10000 are, optionally, combined and/or the order of some operations is, optionally, changed.

In some embodiments, the method 10000 is performed at a computer system (e.g., the computer system 101 in FIG. 1, the computer system 101 described with respect to FIGS. 7A-7D, FIGS. 7E-7F, FIGS. 7G-7H, FIGS. 7I-7M, FIGS. 7N-7O, FIGS. 7P-7S, FIGS. 7T-7U, and/or FIGS. 7V-7X, the first computer system 101-*t* described with respect to FIGS. 7V-7X, the second computer system described with respect to FIGS. 7V-7X, etc.). In some embodiments, the computer system is in communication with a first display generation component (e.g., the first display generation component is a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the first display generation component is a first display generation component 7100 described with respect to FIGS. 7A-7U and 7Y-7Z, a first display generation component 7100-*t* described with respect to FIGS. 7V-7X, a second display generation component described with respect to FIGS. 7V-7X, etc. In some embodiments, the computer system is an integrated device with one or more processors and memory enclosed in the same housing as the first display generation components and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the first display generation component and/or the one or more input devices. In some embodiments, the first display generation component and the one or more input devices are integrated and enclosed in the same housing. Many of the features of the method 10000 are described with respect to FIGS. 7I-7M, in accordance with some embodiments.

In the method 10000, the computer system displays (10002), via the first display generation component, a first view (e.g., a view corresponding to a first viewpoint, a view from a first viewing perspective, etc.) of a three-dimensional environment (e.g., a virtual three-dimensional environment, an augmented reality environment, a pass-through view of a physical environment, a camera view of a physical environment, etc.), including displaying, at a first position in the three-dimensional environment, a first group of selectable user interface objects (e.g., a group of application icons corresponding to different applications, a group of avatars corresponding to different users, a group of icons corresponding to different computer-generated experiences, a group of controls corresponding to different device and/or operating system control functions, etc.) from multiple different groups of selectable user interface objects (e.g., some or all of the above-mentioned groups, etc.). This is illustrated, for example, in FIG. 7K, where the first group of user interface objects 7316-*a* through 7316-*d* are shown at a first position in the three-dimensional environment 7104, in some embodiments.

In the method 10000, while displaying the first group of selectable user interface objects at the first position in the three-dimensional environment, the computer system detects (10004) a user input that corresponds to a request to display a second group of selectable user interface objects from the multiple different groups of selectable user interface objects at the first position in the three-dimensional environment, the second group of selectable user interface objects being different from the first group of selectable user interface objects (e.g., different in terms of object type (e.g., application icon vs. avatar vs. icons for computer-generated experiences), different in terms of constituent objects (e.g., a first set of objects and a second set of objects that do not overlap, or intersect, etc.), etc.). This is illustrated, for example, in FIG. 7K, where, while the first group of user interface objects 7316-*a* through 7316-*d* are shown at the first position in the three-dimensional environment 7104, the computer system detects movement 7314 of the hand 7202 in conjunction with the gaze input 7206 directed to user interface object 7310 that corresponds to a second group of selectable user interface objects 7318-*a* through 7318-*d*, in some embodiments. In some embodiments, the first group of selectable user interface objects have a corresponding first group representation, the second group of selectable user interface objects have a corresponding second group representation, and the user input that corresponds to a request to display the second group of selectable user interface objects at the first position in the three-dimensional environment includes a user input that selects the second group representation (e.g., displayed at a position that corresponds to the user's hand (e.g., a position that is locked to the hand and moves in accordance with the movement of the hand in the physical environment), or displayed at a position that is away from the position that corresponds to the user's hand (e.g., a position locked to the field of view or a position that is locked to the three-dimensional environment, etc.), etc.). In some embodiments, the first group of selectable user interface objects are displayed at the first position in accordance with a determination that a user input that selects the first group representation has been detected. In some embodiments, the user input that selects a respective group representation includes a selection input that is directed to the location of the respective group representation, moves a selector object to the location of the respective group representation, or is detected while the respective group representation has input focus (e.g., is at the location of a currently detected gaze input, or a selector object, etc.). In some embodiments, the user input that corresponds to a request to display the second group of selectable user interface object at the first position in the three-dimensional environment is a navigation input (e.g., a swipe input, a tap on a navigation control, a drag input the moves a selector object from one group representation to another group representation, a voice command "next", etc.) that navigates or scrolls through the multiple groups of selectable user interface objects one by one in accordance with an order of the multiple groups of selectable user interface objects.

In the method 10000, in response to detecting the user input that corresponds to a request to display the second group of selectable user interface objects at the first position in the three-dimensional environment (10006): the computer system moves (10008) the first group of selectable user interface objects in the three-dimensional environment away from the first position in the three-dimensional environment and reducing visual prominence of the first group of selectable user interface objects in the three-dimensional environment as the first group of selectable user interface objects are moved away from the first position in the three-dimensional environment (e.g., ceasing to display the first group of selectable user interface objects, or reducing the size, clarity, color saturation, brightness, etc. of the first group of selectable user interface objects, etc.); and the computer system moves (10010) the second group of selectable user interface objects in the three-dimensional environment toward the first position in the three-dimensional environment and increasing visual prominence of the second group of selectable user interface objects (e.g., displaying (if previously not displayed) the second group of selectable user interface objects, or increasing the size, clarity, color saturation, brightness, etc. (if previously displayed with reduced size, clarity, color saturation, brightness, etc.), etc.) as the second group of selectable user interface object are moved to the first position in the three-dimensional environment. This is illustrated, for example, in FIGS. 7K-7M, where, while the first group of user interface objects 7316-*a* through 7316-*d* are shown at the first position in the three-dimensional environment 7104, the computer system detects movement 7314 of the hand 7202 in conjunction with the gaze input 7206 directed to user interface object 7310 that corresponds to a second group of selectable user interface objects 7318-*a* through 7318-*d*; and in response to the user inputs, the computer system moves the first group of user interface objects 7316-*a* through 7316-*d* away from the first position in the three-dimensional environment 7104 out of the current field of view, while moving the second group of user interface objects 7318-*a* through 7318-*d* toward the first position in the three-dimensional environment 7104 from outside of the field of view, in some embodiments. In some embodiments, the movement of the first group of selectable user interface objects and the movement of the second group of selectable user interface objects are performed concurrently, and the first group of selectable user interface objects and the second group of selectable user interface objects are displayed concurrently in the first view of the three-dimensional environment for at least a portion of the time that the first group of selectable user interface objects are moving in the three-dimensional environment and for at least a portion of the time that the second group of selectable user interface are moving in the three-dimensional environment.

In some embodiments, the first group of selectable user interface objects and the second group of selectable user interface objects are concurrently displayed in the first view of the three-dimensional environment at a time when the user input that corresponds to the request to display the second group of selectable user interface objects at the first position in the three-dimensional environment is detected. For example, in FIG. 7K, the computer system, optionally, displays a reduced representation of the second group of selectable user interface objects 7318 in the view of the three-dimensional environment 7104 (e.g., with a faded appearance, a greater virtual distance from the viewpoint, in a less prominent position than the first position, etc.), concurrently with the first group of selectable user interface objects 7316, in accordance with some embodiments. In some embodiments, the first group of selectable user interface objects are displayed at the first position in the three-dimensional environment and the second group of selectable user interface objects are displayed at a second position different from the first position in the three-dimensional environment. In some embodiments, the first position is in a central portion or another visually prominent position (e.g., an area to which the user's gaze or focus is directed, a central portion of a preset area of the field of view (e.g., the upper right quadrant, the lower left quadrant, etc.), etc.) in the field of view provided via the first display generation component, as compared to the second position in the field of view (e.g., a peripheral portion of the field of view, an area to which the user's gaze or focus is not directed, a peripheral portion of the preset area of the field of view (e.g., the upper right quadrant, the lower left quadrant, etc.), etc.). In some embodiments, the first group of selectable user interface objects and the second group of selectable user interface objects are concurrently displayed in the first view after the second group of selectable user interface objects are moved to the first position, and the first group of selectable user interface objects are moved away from the first position (e.g., to the second position, to a third position, etc.). In some embodiments, the first group of selectable user interface objects are moved out of view after the second group of selectable user interface objects are moved to the first position, and, optionally, a third group of selectable user interface objects are moved to the second position. Concurrently displaying the first and second groups of selectable user interface objects at a time when the user input that corresponds to the request to display the second group of selectable user interface objects at the first position in the three-dimensional environment is detected provides improved visual feedback to the user (e.g., providing visual feedback that another group of selectable user interface objects is available). Providing improved feedback enhances the operability of the device, which, additionally, reduces power usage and improves battery life of the device by enabling the user to use the device more quickly and efficiently.

In some embodiments, the second group of selectable user interface objects are not displayed in the first view of the three-dimensional environment at a time when a start of the user input that corresponds to the request to display the second group of selectable user interface objects at the first position in the three-dimensional environment is detected. For example, as shown in FIG. 7K, the computer system, optionally, does not displays the second group of selectable user interface objects 7318 in the view of the three-dimensional environment 7104 concurrently with the first group of selectable user interface objects 7316, before the input meeting the criteria for displaying the second group of user interface objects 7318 has been detected, in accordance with some embodiments. For example, in some embodiments, when the first group of selectable user interface objects are displayed at the first position in the three-dimensional environment, the second group of selectable user interface objects are not concurrently displayed at a second position different from the first position in the three-dimensional environment. In some embodiments, the first position is in a central portion or another visually prominence position (e.g., an area to which the user's gaze or focus is directed, a central portion of a preset area of the field of view (e.g., the upper right quadrant, the lower left quadrant, etc.), etc.) in the field of view provided via the first display generation component. In some embodiments, the first group of selectable user interface objects cease to be displayed or move to a less prominence or central position after the second group of selectable user interface objects are moved to the first position (e.g., from outside of the first view of the three-dimensional environment, or after immerging in the first view, etc.) and the first group of selectable user interface objects are moved away from the first position. Not displaying the second group of selectable user interface objects in the first view of the three-dimensional environment at a time when a start of the user input that corresponds to the request to display the second group of selectable user interface objects at the first position in the three-dimensional environment is detected provides additional control options without cluttering the UI with additional displayed controls (e.g., allows the user to switch between the first and second groups of selectable user interface objects without cluttering the UI with multiple groups of user interface objects). Providing additional control options without cluttering the UI with additional displayed controls enhances the operability of the device, which, additionally, reduces power usage and improves battery life of the device by enabling the user to use the device more quickly and efficiently.

In some embodiments, while displaying the first group of selectable user interface objects at the first position in the three-dimensional environment (e.g., before the user input that corresponds to a request for displaying the second group of selectable user interface objects at the first position is detected), the computer system displays respective group representations (e.g., respective group icons, category icons, etc.) corresponding to the multiple different groups of user interface objects in the first view of the three-dimensional environment (e.g., in a preset corner of the field of view provided via the first display generation component, at a preset position in the three-dimensional environment that is visible in the first view, at a position that corresponds to the location of the user's hand, etc.), the respective group representations including a first group representation that corresponds to the first group of selectable user interface objects and a second group representation that corresponds to the second group of selectable user interface objects. For example, as shown in FIG. 7K, the group representations 7304 and 7310 are both displayed in the three-dimensional environment, when the first group of selectable user interface objects 7316-a through 7316-d are displayed in the view of the three-dimensional environment, in accordance with some embodiments. While moving the second group of selectable user interface objects toward the first position in the three-dimensional environment (e.g., after the user input that corresponds to a request for displaying the second group of selectable user interface objects at the first position is detected), the computer system maintains display of the respective group representations (e.g., respective group icons, category icons, etc.) corresponding to the multiple different groups of user interface objects in the first view of the three-dimensional environment (e.g., in the preset corner of the field of view provided via the first display generation component, at the preset position in the three-dimensional environment that is visible in the first view, at a position that corresponds to the location of the user's hand, etc.). For example, as shown in FIG. 7L, the group representations 7304 and 7310 are still both displayed in the three-dimensional environment, when the first group of selectable user interface objects 7316-a through 7316-d are moving away from the first position and the second group of selectable user interface objects 7318-a through 7318-d are moving toward the first position in the view of the three-dimensional environment, in accordance with some embodiments. In some embodiments, the computer system continues to maintain display of the respective group representations after the second group of selectable user interface objects are moved to the first position in the three-dimensional environment. In some embodiments, the respective group representations are persistently displayed, as long as at least one of the multiple groups of selectable user interface objects are displayed at the first position in the three-dimensional environment. In some embodiments, the respective group representations are persistently displayed even when none of the multiple groups of selectable user interface objects is displayed at the first position in the three-dimensional environment; and a selection of one or all of the respective group representations (e.g., a gaze input directed to the location of the one or more group representations, a tap input directed to the location of the one or more group representations, etc.) causes the computer system to display one or more of the groups of selectable user interface objects at the first position in the three-dimensional environment. Displaying respective group representations corresponding to the multiple different groups of user interface objects while displaying the first group of selectable user interface objects at the first position, and maintaining display of the respective group representations corresponding to the multiple different groups of user interface objects while moving the second group of selectable user interface objects toward the first position in the three-dimensional environment provides improved visual feedback to the user (e.g., by maintaining display of the multiple different groups of user interface objects even when moving the second group of selectable user interface objects). Providing improved feedback enhances the operability of the device, which, additionally, reduces power usage and improves battery life of the device by enabling the user to use the device more quickly and efficiently.

In some embodiments, detecting the user input that corresponds to a request to display the second group of selectable user interface objects at the first position in the three-dimensional environment includes: detecting a selection input (e.g., a tap, a swipe, a pinch, a voice command, etc.) directed to the second group representation while the first group of selectable user interface objects are displayed at the first position in the three-dimensional environment. For example, in FIG. 7K, the user input includes a gaze input 7216 directed to the group representation 7310 that corresponds to the second group of selectable user interface objects 7318-a through 7318-d, in conjunction with the movement 7314 of the hand 7202, in some embodiments. In some embodiments, the selection input includes a tap input at a location that corresponds to the position of the second group representation that is detected at a time when the first group representation is the currently selected group representation. In some embodiments, the selection input includes a swipe input at a location that corresponds to the position of the respective group representations (as a whole, or individually) that is detected at a time when the first group representation is the currently selected group representation and the second group representation is the next representation in the navigation/scroll direction specified by the swipe direction. In some embodiments, the selection input is a tap input or swipe input that is detected away from the location that corresponds to the position(s) of the respective group representation(s) while an input focus is on the position(s) of the respective group representations (e.g., a gaze input is directed to the position(s) of the respective group representation(s), the respective group representation(s) are already selected by a prior input, etc.). Detecting a selection input directed to the second group representation while the first group of selectable user interface objects are displayed at the first position provides additional control options without cluttering the UI with additional displayed controls (e.g., additional controls for moving the first and/or second groups of selectable user interface objects). Providing additional control options without cluttering the UI with additional displayed controls enhances the operability of the device, which, additionally, reduces power usage and improves battery life of the device by enabling the user to use the device more quickly and efficiently.

In some embodiments, detecting the selection input directed to the second group representation displayed in the three-dimensional environment includes: detecting a gaze input directed to the second group representation in conjunction with detecting a preset gesture input (e.g., a tap, a pinch gesture, a flick, a swipe, a double tap, etc.) in the physical environment (e.g., in the air, away from the user's hand, etc.). For example, in FIG. 7K, the selection input includes a gaze input 7216 directed to the group representation 7310 that corresponds to the second group of selectable user interface objects 7318-a through 7318-d, in conjunction with the movement 7314 of the hand 7202 that meets the criteria for detecting the preset gesture input (e.g., a pinch gesture, a tap gesture, etc.), in some embodiments. In some embodiments, in response to detecting the selection input directed to the first group representation displayed in the three-dimensional environment, including detecting a gaze input directed to the first group representation in conjunction with detecting the preset gesture input, the computer system redisplays the first group of selectable user interface objects at the first position in the three-dimensional environment. In some embodiments, in response to detecting the selection input directed to a third group representation displayed in the three-dimensional environment, including detecting a gaze input directed to the third group representation in conjunction with detecting the preset gesture input, the computer system displays the third group of selectable user interface objects at the first position in the three-dimensional environment (and moves the second group of selectable user interface objects away from the first position), in the manner analogous to that described with respect to displaying the second group of selectable user interface objects at the first position. Detecting a gaze input directed to the second group representation in conjunction with detecting a preset gesture input in the physical environment provides additional control options without cluttering the UI with additional displayed controls (e.g., additional controls for selecting the second group representation). Providing additional control options without cluttering the UI with additional displayed controls enhances the operability of the device, which, additionally, reduces power usage and improves battery life of the device by enabling the user to use the device more quickly and efficiently.

In some embodiments, while displaying a respective group of selectable user interface objects (e.g., the first group of selectable user interface objects, the second group of selectable user interface objects, etc.) at the first position in the three-dimensional environment, the computer system detects a respective selection input (e.g., a tap, a swipe, a pinch, a voice command, etc.) directed to a respective group representation of the respective group of selectable user interface objects (e.g., the first group representation when the first group of selectable user interface objects are displayed at the first position, the second group representation when the second group of selectable user interface objects are displayed at the first position, etc.). In response to detecting the respective selection input directed to the respective group representation of the respective group of selectable user interface objects, the computer system ceases to display the respective group of selectable user interface objects at the first position in the three-dimensional environment, without moving another group of selectable user interface objects to the first position. For example, in FIG. 7K, if the gaze input 7216 is directed to the region that corresponds to the user interface object 7304 that corresponds to the currently displayed first group of selectable user interface objects 7316-a through 7316-d (e.g., as opposed to the user interface object 7310), the computer system, optionally, ceases to display the first group of selectable user interface objects 7316-a through 7316-d at the first position, without displaying the second group of selectable user interface objects 7318-a through 7318-d, in accordance with some embodiments. For example, in some embodiments, when the first group representation of the first group of selectable user interface objects is selected by the selection input, in accordance with a determination that the first group of selectable user interface objects are currently displayed at the first position, the computer system shrink down the first group of selectable user interface objects to the first group representation, but does not replace the first group of selectable user interface objects with another group of selectable user interface objects; but in accordance with a determination that the first group of selectable user interface objects are not currently displayed at the first position (e.g., no group is currently displayed, or the second group of selectable user interface objects are displayed at the first position, etc.), the computer system displays the first group of selectable user interface objects at the first position (e.g., moving the currently displayed group, if any, away from the first position). Ceasing to display the respective group of selectable user interface objects at the first position in response to detecting the respective selection input directed to the respective group representation of the respective group of selectable user interface objects, and without moving another group of selectable user interface objects to the first position, provides additional control options without cluttering the UI with additional displayed controls (e.g., additional controls for ceasing to display the respective group of selectable user interface objects). Providing additional control options without cluttering the UI with additional displayed controls enhances the operability of the device, which, additionally, reduces power usage and improves battery life of the device by enabling the user to use the device more quickly and efficiently.

In some embodiments, while displaying the first group of selectable user interface objects at the first position in the three-dimensional environment (e.g., before the user input that corresponds to a request for displaying the second group of selectable user interface objects at the first position is detected), the computer system displays the first group representation with greater visual prominence (e.g., with a larger size, with a greater brightness, with a greater level of details, at a more prominent position, at a position of the selection object, etc.) than the second group representation (and other group representations). While moving the second group of selectable user interface objects toward the first position in the three-dimensional environment (e.g., after the user input that corresponds to a request for displaying the second group of selectable user interface objects at the first position is detected), the computer system transitions from displaying the first group representation with greater visual prominence than the second group representation to displaying the second group representation with greater visual prominence (e.g., with a larger size, with a greater brightness, with a greater level of details, at a more prominent position, at a position of the selection object, etc.) than the first group representation (and other group representations). As shown in FIG. 7K-7M, the computer system displays the user interface object 7304 with a larger size than the user interface object 7310 when the first group of user interface objects 7316-*a* through 7316-*d* are displayed at the first position in the three-dimensional environment 7104, and after the second user interface object 7310 is selected and the second group of selectable user interface objects 7318-*a* through 7318-*d* are moved to the first position, the user interface object 7310 is displayed with a larger size than the user interface object 7304, in accordance with some embodiments. Transitioning from displaying the first group representation with greater visual prominence than the second group representation to displaying the second group representation with greater visual prominence than the first group representation provides improved visual feedback to the user (e.g., visual feedback regarding which group representation is currently selected). Providing improved feedback enhances the operability of the device, which, additionally, reduces power usage and improves battery life of the device by enabling the user to use the device more quickly and efficiently.

In some embodiments, an area occupied by the respective group representations (e.g., respective group icons, category icons, etc.) corresponding to the multiple different groups of user interface objects changes (e.g., expands, moves toward the viewpoint of the first view, etc.) in the first view of the three-dimensional environment in response to a gaze input being directed to the area occupied by the respective group representations (e.g., a container object that contains the respective group representations, or a bounding box of the respective group representations, etc.). For example, in FIG. 7K, the computer system optionally increases the size of the user interface object 7306' in response to detection of the gaze input in the region corresponding to the user interface object 7306', and optionally restores the size of the user interface object 7306' once the gaze input ceases to be displayed in the region that corresponds to the user interface object 7306', in accordance with some embodiments. Changing an area occupied by the respective group representations corresponding to the multiple different groups of user interface objects in response to a gaze input being directed to the area occupied by the respective group representations provides improved visual feedback to the user (e.g., that the computer system detects the user's gaze directed to the area occupied by the respective group representations). Providing improved feedback enhances the operability of the device, which, additionally, reduces power usage and improves battery life of the device by enabling the user to use the device more quickly and efficiently.

In some embodiments, the different groups of selectable user interface objects include two or more groups from: a first group of selectable user interface objects corresponding to different applications (e.g., application icons) that, when a respective user interface object from the first group of selectable user interface objects is selected in accordance with first criteria (e.g., criteria for detecting a tap input, a pinch input, etc.; criteria for activating the default function of the user interface object corresponding to a respective application, etc.), cause the computer system to display a corresponding application in the three-dimensional environment (e.g., displaying a default starting user interface or environment of the application, displaying a user interface to acquire necessary credential information to start the application, etc.), a second group of selectable user interface objects corresponding to different users (e.g., user avatars, contact information, telephone numbers, user IDs, entity names, etc.) that, when a respective user interface object from the second group of selectable user interface objects is selected in accordance with the first criteria, cause the computer system to initiate a process to establish communication with one or more corresponding users in the three-dimensional environment (e.g., establishing a default communication session, displaying a user interface for selecting a communication mode of the communication session from multiple available communication modes, displaying a user interface to obtain parameters values for starting a communication session, etc.), and a third group of selectable user interface objects corresponding to different computer-generated experiences (e.g., different AR experiences, different VR experiences, system-level AR experiences (e.g., different types of baseline home environments (e.g., the three-dimensional environment that is being displayed, and from which the different applications can be launched, etc.), different levels of immersions, etc.), system-level VR experiences, etc.) that, when a respective user interface object from the third group of selectable user interface objects selected in accordance with the first criteria, cause the computer system to initiate a process to display a corresponding computer-generated experience in the three-dimensional environment (e.g., an augmented reality atmosphere that changes lighting of a physical environment of the physical environment or a virtual environment that includes an immersive or partially immersive simulated three-dimensional space). For example, in FIGS. 7K-7M, the user interface objects 7302, 7304, and 7310 in the user interface objects 7306' are group icons corresponding to applications, users, and experiences, respectively; and the first group of selectable user interface objects are optionally application icons corresponding to different applications; the second group of selectable user interface objects are optionally avatars of different users, and a third group of selectable user interface objects that are displayed at the first position in response to user input directed to the third user interface object 7302 are optionally icons for launching different computer-generated experiences in the three-dimensional environment, in accordance with some embodiments. Including a first group of selectable user interface objects corresponding to different applications, a second group of selectable user interface objects corresponding to different users, and a third group of selectable user interface objects corresponding to different computer-generated experiences provides addition control options without cluttering the UI with additional displayed controls (e.g., reducing clutter in the UI by grouping similar user interface objects into a respective groups that can moved in and out of the first position, rather than displaying all available user interface objects at one time). Providing additional control options without cluttering the UI with additional displayed controls enhances the operability of the device, which, additionally, reduces power usage and improves battery life of the device by enabling the user to use the device more quickly and efficiently.

In some embodiments, before displaying the first group of selectable user interface objects at the first position in the three-dimensional environment, the computer system detects a first gaze input directed to a first region in the three dimensional environment that corresponds to the location of a user's hand in a physical environment. In response to detecting the first gaze input directed to the first region in the three-dimensional environment, the computer system displays a first user interface object (e.g., a home button, a cluster of reduced scale group representations of the multiple groups of selectable user interface objects, etc.) at the first region in the three-dimensional environment that corresponds to the location of the user's hand in the physical environment. For example, in FIG. 7C or FIG. 7K, in response to detecting a gaze input directed to the position that corresponds to the location of the user's hand, the computer system, optionally, displays a user interface object, such as a reduced version of the user interface object 7306', at the position that corresponds to the location of the user's hand, in accordance with some embodiments. This is also illustrated in FIG. 7I, where, in response to detecting the gaze input 7214 directed to the position that corresponds to the location of the user's hand, the computer system displays a reduced scale version of the user interface object 7306' including the user interface objects 7302, 7304, and 7310, at the position that corresponds to the location of the user's hand, in accordance with some embodiments. In some embodiments, the first user interface object is displayed at the first region that corresponds to the location of the user's hand when the user's hand has a preset orientation and/or posture (e.g., with the palm side facing the user, with the back of hand facing the user, opened with fingers extended out, etc.), and ceases to be displayed when the gaze input is no longer directed to the first region that corresponds to the location of the user's hand and/or when the hand is no longer in the preset orientation and/or posture. In some embodiments, the user interface object 7306' in FIGS. 7K-7M correspond to the user interface object 7306 in FIGS. 7A-7D and have analogous behaviors as the user interface object 7306 described with respect to FIGS. 7A-7D. In some embodiments, the user interface objects 7304 and 7310 in FIGS. 7K-7M correspond to the user interface objects 7304 and have analogous behaviors as the user interface object 7304 described with respect to FIGS. 7A-7D. In some embodiments, the user interface objects 7304 and 7310 in FIGS. 7K-7M correspond to the user interface objects 7308 and have analogous behaviors as the user interface object 7308 described with respect to FIGS. 7E-7H. Displaying a first user interface object at the first region in the three-dimensional environment that corresponds to the location of the user's hand in the physical environment in response to detecting the first gaze input directed to the first region in the three-dimensional environment reduces the number of inputs to display the first user interface object at the first region (e.g., the user does not need to perform a separate gesture to display the first user interface object). Reducing the number of inputs needed to perform an operation enhances the operability of the device, which, additionally, reduces power usage and improves battery life of the device by enabling the user to use the device more quickly and efficiently.

In some embodiments, before displaying the first group of selectable user interface objects at the first position in the three-dimensional environment, the computer system detects a first gaze input directed to a first region in the three dimensional environment that corresponds to the location of a user's hand in a physical environment in conjunction with detecting a preset gesture input (e.g., a tap, a flick, a swipe, a tap and hold, a double tap, etc.) on the hand (e.g., at a position that corresponds to the home button or reduced scale group representations that are displayed at the position that corresponds to the location of the user's hand), wherein the first group of selectable user interface objects are displayed at the first position in the three-dimensional environment in response to detecting the first gaze input directed to the first region in the three-dimensional environment in conjunction with detecting the preset gesture input on the hand. As shown in FIG. 7J-7K, the computer system, in response to detecting the movement 7209 of the hand 7202 in conjunction with the gaze input 7214 directed to the position that corresponds to the location of the hand 7202, displays the user interface object 7306' and the first group of selectable user interface objects 7316-a through 7316-d in the three-dimensional environment, at positions away from the position that corresponds to the location of the user's hand 7202, in accordance with some embodiments. In some embodiments, the user interface object 7306' in FIGS. 7K-7M corresponds to the user interface object 7306 and have analogous behaviors as the user interface object 7306 described with respect to FIGS. 7A-7D. In some embodiments, the first group of user interface objects 7316 in FIGS. 7K-7M correspond to the user interface object 7306 and have analogous behaviors as the user interface object 7306 described with respect to FIGS. 7A-7D. In some embodiments, the group representations corresponding to the different groups of selectable user interface objects are also displayed in the three-dimensional environment in response to detecting the first gaze input directed to the first region in the three-dimensional environment in conjunction with detecting the preset gesture input on the hand. In some embodiments, the second group of selectable user interface objects and optionally one or more other groups of selectable user interface objects are also displayed in the three-dimensional environment (e.g., at the second position, and optionally other positions in the three-dimensional environment, etc.) in response to detecting the first gaze input directed to the first region in the three-dimensional environment in conjunction with detecting the preset gesture input on the hand. Detecting the first gaze input directed to the first region in the three-dimensional environment in conjunction with detecting the preset gesture input on the hand before displaying the first group of selectable user interface objects at the first position in the three-dimensional environment reduces the number of inputs needed to display the first group of selectable user interface objects at the first position (e.g., the user does not need to perform separate gestures to display the first group of selectable user interface objects and to move the first group of selectable user interface objects to the first position in the three-dimensional environment). Reducing the number of inputs needed to perform an operation enhances the operability of the device, which, additionally, reduces power usage and improves battery life of the device by enabling the user to use the device more quickly and efficiently.

In some embodiments, the first group of selectable user interface objects are displayed at the first position in the three-dimensional environment in response to detecting the first gaze input directed to the first region in the three-dimensional environment that corresponds to the user's hand in conjunction with detecting the preset gesture input at a first location on the hand (e.g., a first sub-region that corresponds to the position of a first group representation displayed in the first region of the three-dimensional environment, and that does not correspond to the position of a second group representation displayed in the first region of the three-dimensional environment). The user input that corresponds to the request to display the second group of selectable user interface objects at the first position in the three-dimensional environment includes a second gaze input directed to the first region in the three-dimensional environment that corresponds to the user's hand detected in conjunction with the preset gesture input at a second location on the hand (e.g., the second sub-region that corresponds to the position of the second group representation displayed in the first region of the three-dimensional environment, and that does not correspond to the position of the first group representation displayed in the first region of the three-dimensional environment). For example, in some embodiments, in FIG. 7J, the computer system, optionally, detects a tap input on the hand 7202 while a gaze input is directed to the user interface object 7304 displayed at a first position that corresponds to the location of the user's hand, and as a result, the computer system displays the first group of selectable user interface objects 7316-*a* through 7316-*d* in the three-dimensional environment at the first position as shown in FIG. 7K; and in Figure J, the computer system, optionally, detects a tap input on the hand 7202 while a gaze input is directed to the user interface object 7310 displayed at a second position that corresponds to the location of the user's hand, and as a result, the computer system displays the second group of selectable user interface objects 7316-*a* through 7316-*d* in the three-dimensional environment at the first position (e.g., as shown in FIGS. 7L-7M), in accordance with some embodiments. In some embodiments, a third group of selectable user interface objects are displayed at the first position in the three-dimensional environment in response to detecting a third gaze input directed to the first region in the three-dimensional environment that corresponds to the user's hand in conjunction with detecting the preset gesture input at a third location on the hand (e.g., a third sub-region that corresponds to the position of a third group representation displayed in the first region of the three-dimensional environment, and that does not correspond to the positions of the first and second group representations displayed in the first region of the three-dimensional environment). In some embodiments, after displaying the second group of selectable user interface objects at the first position in response to the user input, the computer system optionally detects a fourth gaze input directed to the first region in the three-dimensional environment that corresponds to the user's hand in conjunction with detecting the preset gesture input at the first location on the hand, and the first group of selectable user interface objects are redisplayed at the first position in the three-dimensional environment in response to detecting the fourth gaze input directed to the first region in the three-dimensional environment that corresponds to the user's hand in conjunction with detecting the preset gesture input at the first location on the hand. In some embodiments, the first location, the second location, the third location on the hand are locations that correspond to the current display positions of the first group representation corresponding to the first group of selectable user interface objects, the second group representation corresponding to the second group of selectable user interface objects, and the third group representation corresponding to the third group of selectable user interface objects. In some embodiments, the first location, the second location, and the third location are updated when the first group representation, the second group representation, and third group representation are moved through a preset selection position in response to a selection input directed to a group representation that is not currently selected (e.g., in a carousel fashion, in a cyclic fashion, etc.). Displaying the first group of selectable user interface objects at the first position in response to detecting the first gaze input directed to the first region that corresponds to the user's hand in conjunction with detecting the preset gesture input at a first location on the hand and detecting the request to display the second group of selectable user interface objects at the first position includes a second gaze input directed to the first region that corresponds to the user's hand detected in conjunction with the preset gesture input at a second location on the hand provides additional control options without cluttering the UI with additional displayed controls (e.g., additional controls to navigate between the first and second location on the hand). Providing additional control options without cluttering the UI with additional displayed controls enhances the operability of the device, which, additionally, reduces power usage and improves battery life of the device by enabling the user to use the device more quickly and efficiently.

In some embodiments, the user input that corresponds to a request to display the second group of selectable user interface objects at the first position in the three-dimensional environment includes a gaze input that is directed to a respective position in the three-dimensional environment of a respective group representation of the second group of selectable user interface object (e.g., the respective group representation displayed in the three-dimensional environment that is away from a region that corresponds to the location of the user's hand, the respective group representation displayed inside the region that corresponds to the user's hand, etc.). For example, the gaze input 7216 is directed to the user interface object 7310 that corresponds to the second group of selectable user interface objects 7318-*a* through 7318-*d* when the movement 7314 of the hand 7202 is detected (e.g., as shown in FIG. 7K), and as a result, the computer system displays the second group of selectable user interface objects 7318-*a* through 7318-*d* at the first position in FIG. 7M, and not a third group of selectable user interface objects that correspond to user interface object 7302, in accordance with some embodiments. In some embodiments, the gaze input is detected in conjunction with another preset confirmation input such as a gesture input (e.g., a tap, a double tap, a swipe, etc.) at a location on the hand that corresponds to the displayed position of the respective group representation inside the first region that corresponds to the location of the user's hand, an in-air gesture (e.g., an in-air tap input, an in-air pinch input, an in-air swipe input, etc.), a voice command, etc. In some embodiments, the gaze input may be directed to the respective position in the three-dimensional environment of another group representation for a group that is not currently displayed at the first position, and the computer system displays said other group of selectable user interface objects at the first position when the preset confirmation input is detected in conjunction with the gaze input. Detecting a gaze input that is directed to a respective position in the three-dimensional environment of a respective group representation of the second group of selectable user interface object reduces the number of inputs needed to request display of the second group of selectable user interface objects (e.g., the user can select a specific group of selectable user interface items and request display of that specific group of selectable user interface items with a single gesture). Reducing the number of inputs needed to perform an operation enhances the operability of the device, which, additionally, reduces power usage and improves battery life of the device by enabling the user to use the device more quickly and efficiently.

In some embodiments, in response to detecting the gaze input that is directed to the respective position of the respective group representation of the second group of selectable user interface objects, the computer system applies a visual effect to visually distinguishing the respective group representation of the second group of selectable user interface objects from the respective group representation of the first group of selectable user interface objects (and, optionally, from respective group representations of other groups of selectable user interface objects in the multiple different groups of selectable user interface objects). For example, in some embodiments, in response to detecting the gaze input 7216 directed to the user interface object 7310 in FIG. 7K, the computer system, optionally, enlarges the size of the user interface object 7310 and shrinks the size of the user interface object 7304, to visually indicate the location of the gaze input, even before the movement 7314 of the hand is detected. In some embodiments, applying the visual effect includes changing an appearance property (e.g., changing a size, color, brightness, display position, animation, highlighting, etc. in a first manner) of the respective group representation of the second group of selectable user interface object without making the same change in the appearance property of the respective group representation of the first group of selectable user interface objects (and, optionally, without making the same change in the appearance properties of the respective group representations of other groups of selectable user interface objects in the multiple different groups of selectable user interface objects). In some embodiments, applying the visual effect includes changing an appearance property (e.g., changing a size, color, brightness, display position, animation, blur radius degree of translucency, saturation, etc. in a second manner) of the respective group representation of the first group of selectable user interface object (and, optionally, making the same change in the appearance properties of the respective group representations of other groups of selectable user interface objects in the multiple different groups of selectable user interface objects) without making the same change in the appearance property of the respective group representation of the second group of selectable user interface objects. Applying a visual effect to visually distinguishing the respective group representation of the second group of selectable user interface objects from the respective group representation of the first group of selectable user interface objects in response to detecting the gaze input that is directed to the respective position of the respective group representation of the second group of selectable user interface objects provides improved visual feedback to the user (e.g., that the computer system detects the user's gaze directed to the respective position of the respective group representation of the second group of selectable user interface objects). Providing improved feedback enhances the operability of the device, which, additionally, reduces power usage and improves battery life of the device by enabling the user to use the device more quickly and efficiently.

In some embodiments, while displaying a first subset of the first group of selectable user interface objects at the first position in the three-dimensional environment, the computer system detects a user input that includes movement of a user's hand in a first direction (e.g., horizontal direction, vertical direction, a direction that corresponds to a cardinal layout direction of the first group of selectable user interface objects, etc.) in the physical environment while the user's hand is in a first preset posture (e.g., a pinch and drag gesture, a tap and drag gesture, etc.) (e.g., maintaining contact between thumb and index finger and moving the hand horizontally in the physical environment, moving index finger in the vertical direction and then move the hand horizontally with the index finger extended, etc.). In response to detecting the user input that includes movement of the user's hand in the first direction in the physical environment while the user's hand is in the first preset posture, the computer system displays a second subset of the first group of selectable user interface objects at the first position in the three-dimensional environment, wherein the second subset of the first group of selectable objects (e.g., a second page of multiple pages of the first group of selectable objects, a second subgroup of multiple subgroups of the first group of selectable objects, etc.) are different from the first subset of the first group of selectable objects (e.g., a first page of multiple pages of the first group of selectable objects, a first subgroup of multiple subgroups of the first group of selectable objects, etc.). For example, in FIG. 7K, if the computer system detects a pinch and drag gesture in a horizontal direction (e.g., as opposed to the combination of gaze input 7216 and the movement 7314 of the hand that meets the criteria for displaying the second group of selectable user interface objects at the first position) while the first group of selectable user interface objects 7316-a through 7316-d are displayed in the three-dimensional environment, the computer system, optionally, scrolls through the first group of selectable user interface objects in the horizontal direction to show additional user interface objects that are in the first group of selectable user interface objects that correspond to the user interface object 7304, in accordance with some embodiments. In some embodiments, the first subset of the first group of selectable user interface objects are moved away from a display area at the first position and the second subset of the first group of selectable user interface objects are moved to the display area at the first position, in response to the navigation input that includes a movement of the hand in the first direction while the hand is in the preset posture. In some embodiments, the navigation direction (e.g., forward, backward, etc.) through the different subsets of selectable user interface object within a respective group of selectable user interface objects is based on the movement direction of the hand in the physical environment (e.g., leftward, rightward, upward, downward, etc.). Displaying a second subset of the first group of selectable user interface objects, different from the first subset of the first group of selectable user interface objects, in response to detecting the user input that includes movement of the user's hand in the first direction in the physical environment while the user's hand is in the first preset posture provides additional control options without cluttering the UI with additional displayed controls (e.g., additional controls for navigating between the first and second subsets of the first group of selectable user interface objects). Providing additional control options without cluttering the UI with additional displayed controls enhances the operability of the device, which, additionally, reduces power usage and improves battery life of the device by enabling the user to use the device more quickly and efficiently.

In some embodiments, the user input that corresponds to the request to display the second group of selectable user interface objects includes movement of the user's hand in a second direction different from (e.g., perpendicular to, at an angle relative to, etc.) the first direction in the physical environment while the user's hand is in the first preset posture. For example, in FIGS. 7K-7M, the computer system, in response to detecting a pinch and drag gesture in a vertical direction while the first group of selectable user interface objects 7316-a through 7316-d are displayed in the three-dimensional environment, the computer system, optionally, switches to displaying the second group of selectable user interface objects 7318-a through 7318-d at the first position in the three-dimensional environment, in accordance with some embodiments. For example, in some embodiments, a pinch and drag gesture in the vertical direction causes the computer system to navigate within a currently selected group (e.g., the group displayed at the first position) to display a different subset of selectable user interface objects in the currently selected group at the first position in the three-dimensional environment; while a pinch and drag gesture in the horizontal direction causes the computer system to select a different group of selectable user interface objects and display that group at the first position as the currently selected group in the three-dimensional environment. In some embodiments, a pinch and drag gesture in the horizontal direction causes the computer system to navigate within a currently selected group (e.g., the group displayed at the first position) to display a different subset of selectable user interface objects in the currently selected group at the first position in the three-dimensional environment; while a pinch and drag gesture in the vertical direction causes the computer system to select a different group of selectable user interface objects and display that group at the first position as the currently selected group in the three-dimensional environment. Detecting movement of the user's hand in a second direction different from the first direction in the physical environment while the user's hand is in the first preset posture provides additional control options without cluttering the UI with additional displayed controls (e.g., by allowing the user to use the direction of the gesture to control whether the computer system navigates between groups, or within a specific group, without the need for additional gestures or controls). Providing additional control options without cluttering the UI with additional displayed controls enhances the operability of the device, which, additionally, reduces power usage and improves battery life of the device by enabling the user to use the device more quickly and efficiently.

In some embodiments, the first group of selectable user interface objects (e.g., user interface objects 7316-*a* through 7316-*d* in FIG. 7K, or another group of user interface objects, etc.) include a first subset of selectable user interface objects that correspond to a first set of users with which communication has occurred in a preset time period preceding the current time, and wherein the first subset of selectable user interface objects include at least a respective user interface object that corresponds to a first user with which communication has occurred in the preset time period with a first communication mode, and a respective user interface object that corresponds to a second user with which communication has occurred in the preset time period with a second communication mode different from the first communication mode (e.g., email, text message, virtual conference call, augmented reality conference, co-presence in a virtual environment, co-presence in an augmented reality environment, collaboration on a shared document, a mixed modality call (e.g., one user using an AR/VR device and the other user using a non-AR device, one user using a video-enabled device and the other using a voice-only device, etc.). In some embodiments, the first subset of selectable user interface objects are displayed at a preset portion of the area occupied by the first group of selectable user interface objects when the first group is displayed at the first position in the three-dimensional environment. Including at least a respective user interface object that corresponds to a first user with which communication has occurred in the preset time period with a first communication mode and a second user with which communication has occurred in the preset time period with a second communication mode, different from the first communication mode, reduces the number of inputs needed to locate a specific user (e.g., the user does not need to navigate through all possible users to locate the first or second user with which communication has occurred in the preset time period). Reducing the number of inputs needed to perform an operation enhances the operability of the device, which, additionally, reduces power usage and improves battery life of the device by enabling the user to use the device more quickly and efficiently.

In some embodiments, displaying the first group of selectable user interface objects (e.g., user interface objects 7316-*a* through 7316-*d* in FIG. 7K, or another group of user interface objects, etc.) at the first position in the three-dimensional environment includes displaying representations of a plurality of users in different subgroups that are organized in accordance with respective status information associated with the plurality of users, including a first subgroup including representations of a first subset of the plurality of users that are associated with a first type of status information, and a second subgroup including representations of a second subset of the plurality of users that are associated with a second type of status information different from the first type of status information. In some embodiments, the different types of status information indicates whether a user belongs to a subgroup of favorite contacts, recent contacts (e.g., contacts who recently had communication sessions with the user), suggested contacts (e.g., suggested based on upcoming events or device context), user-selected contacts (e.g., pinned contacts, saved contacts, etc.), contacts that are online using a first type of device (e.g., video-enabled device, AR-enabled device, etc.), contacts that are online using a second type of device (e.g., voice-only device, non-AR device, etc.), etc. Displaying representation of a plurality of users in different subgroups that are organized in accordance with respective status information associated with the plurality of users reduces the number of inputs needed to locate specific users (e.g., the user does not need to navigate through all users in the plurality of users to locate users for which respective status information is available). Reducing the number of inputs needed to perform an operation enhances the operability of the device, which, additionally, reduces power usage and improves battery life of the device by enabling the user to use the device more quickly and efficiently.

In some embodiments, displaying the first group of selectable user interface objects (e.g., user interface objects 7316-*a* through 7316-*d* in FIG. 7K, or another group of user interface objects, etc.) at the first position in the three-dimensional environment includes displaying respective representations of a first subset of users with a higher priority (e.g., with priority in position, in timing, etc.) than respective representations of a second subset of users in accordance with a determination that the first subset of users have an active status (e.g., is currently online, is trying to communicating with the user of the computer system, has a current communication session open with the user of the computer system, etc.) and the second subset of users do not have an active status (e.g., is currently offline, is not trying to communicating with the user of the computer system, does not have a current communication session open with the user of the computer system, etc.). Displaying respective representations of a first subset of users with a higher priority than respective representations of a second subset of users in accordance with a determination that the first subset of users have an active status and the second subset of users do not have an active status reduces the number of inputs needed to identify a specific user (e.g., the user does not need to sort through users without active statuses in order to find a particular user that has an active status). Reducing the number of inputs needed to perform an operation enhances the operability of the device, which, additionally, reduces power usage and improves battery life of the device by enabling the user to use the device more quickly and efficiently.

In some embodiments, displaying the first group of selectable user interface objects (e.g., user interface objects 7316-*a* through 7316-*d* in FIG. 7K, or another group of user interface objects, etc.) at the first position in the three-dimensional environment includes displaying a representation for a respective user of the plurality of users that is associated with two or more subgroups according to the respective status information associated with the respective user, in a single subgroup of the more than one subgroups. For example, if a respective user is associated with both a first subgroup for favorite contacts and a second subgroup for recent contacts, and both subgroups are concurrently displayed in the first view of the three-dimensional environment, the computer system only displays the representation of the respective user in one of the two subgroups (e.g., the subgroup that is selected by the computer system based on preset criteria (e.g., affinity scores for the two subgroups, positions of the two subgroups, etc.), selected based on user's preference, etc.). In some embodiments, if the representation of a respective user is added to the subgroup corresponding to active users (e.g., online, is requesting communication with the user of the computer system, is in a communication session with the user of the computer system, etc.) due to a change in status of the respective user, the representation of the respective user is removed from another subgroup that is displayed in the first view of the three-dimensional environment. Displaying a representation for a respective user of the plurality of users that is associated with two or more subgroups according to the respective status information associated with the respective user, in a single subgroup of the more than one subgroups provides additional control options without cluttering the UI with additional displayed controls (e.g., duplicate controls for a respective user in each of the subgroups the respective user is associated with). Reducing the number of inputs needed to perform an operation enhances the operability of the device, which, additionally, reduces power usage and improves battery life of the device by enabling the user to use the device more quickly and efficiently.

In some embodiments, displaying the first group of selectable user interface objects (e.g., user interface objects 7316-*a* through 7316-*d* in FIG. 7K, or another group of user interface objects, etc.) at the first position in the three-dimensional environment includes displaying representations of a plurality of users in different subgroups, wherein a respective representation of a respective user of the plurality of users is displayed with a visual indication (e.g. an icon, a graphical representation, a color-coded indicator, etc.) of a type of association (e.g., status indicator, device type, contact type, etc.) between the respective user and a respective subgroup that caused assignment of the respective user to the respective subgroup. Displaying representations of a plurality of users in different subgroups with a visual indication of a type of association between the respective user and a respective subgroup that caused assignment of the respective user to the respective subgroup provides improved visual feedback to the user (e.g., regarding why a particular user appears in a particular subgroup). Providing improved feedback enhances the operability of the device, which, additionally, reduces power usage and improves battery life of the device by enabling the user to use the device more quickly and efficiently.

In some embodiments, displaying the first group of selectable user interface objects (e.g., user interface objects 7316-*a* through 7316-*d* in FIG. 7K, or another group of user interface objects, etc.) at the first position in the three-dimensional environment includes displaying representations of a plurality of users in different subgroups, wherein respective representations of a first subset of the plurality of users included in a first subgroup are reordered based on changed communication timing information (e.g., time of last communication, frequency of communication, etc.) associated with the first subset of the plurality of users, and respective representations of a second subset of the plurality of users included in a second subgroup (e.g., favorite contacts, pinned contacts, etc.) are not reordered. Reordering representations of a first subset of the plurality of users included in a first subgroup based on changed communication timing information associated with the first subset of the plurality of users, and not reordering respective representations of a second subset of the plurality of users included in a second subgroup reduces the number of inputs needed to identify a specific user (e.g., because the user interface objects in the second subset of the plurality of users are not reordered, the user does not need to navigate through all available users to identify a user in the second subset of the plurality of users). Reducing the number of inputs needed to perform an operation enhances the operability of the device, which, additionally, reduces power usage and improves battery life of the device by enabling the user to use the device more quickly and efficiently.

In some embodiments, displaying the first group of selectable user interface objects (e.g., user interface objects 7316-*a* through 7316-*d* in FIG. 7K, or another group of user interface objects, etc.) includes displaying respective selectable user interface objects in the first group with characteristic values of a first display property (e.g., blur radius, size, translucency level, opacity level, color saturation, luminance, etc.) that are determined based on respective positions of the respective selectable user interface objects among the first group of selectable user interface objects (e.g., respective distances from a central region of the area occupied by the first group of selectable user interface objects, row numbers, column numbers, etc.). For example, in some embodiments, the user interface objects closer to a key position (e.g., center, left side, top, etc.) of the area occupied by the first group of user interface objects are displayed with greater details, more vivid colors, higher luminance, larger size, closer distance to the viewpoint, etc. than the user interface objects farther away from the key position. In some embodiments, the user interface objects farther away from a key position (e.g., center, left side, top, etc.) of the area occupied by the first group of user interface objects are displayed with more blurring, lesser details, less saturated colors, lower luminance, smaller sizes, greater distance from the viewpoint, etc. than the user interface objects closer to the key position. Displaying respective selectable user interface objects in the first group with characteristic values of a first display property determined based on respective positions of the respective selectable user interface objects among the first group of selectable user interface objects provides improved feedback to the user (e.g., by increasing visibility for user interface objects corresponding to user for which the user has communicated recently). Providing improved feedback enhances the operability of the device, which, additionally, reduces power usage and improves battery life of the device by enabling the user to use the device more quickly and efficiently.

In some embodiments, displaying the first group of selectable user interface objects includes displaying the first group of selectable user interface objects (e.g., user interface objects 7316-*a* through 7316-*d* in FIG. 7K, or another group of user interface objects, etc.) in a respective region that spans a predefined viewing angle in the three-dimensional environment (e.g., the width of two thirds of the field of view provided via the first display generation component, a full width of the field of view, etc.). Displaying the first group of selectable user interface objects in a respective region that spans a predefined viewing angle in the three-dimensional environment provides additional control options without cluttering the UI with additional displayed controls (e.g., by preventing user interface objects from being displayed outside a reasonable viewing angle of the user). Providing additional control options without cluttering the UI with additional displayed controls enhances the operability of the device, which, additionally, reduces power usage and improves battery life of the device by enabling the user to use the device more quickly and efficiently.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 11000, 12000, 13000, 14000, 15000, and 16000) are also applicable in an analogous manner to method 10000 described above with respect to FIG. 10. For example, the gestures, gaze inputs, physical objects, user interface objects, controls, movements, criteria, three-dimensional environment, display generation component, surface, representation of physical object, virtual objects, and/or animations described above with reference to method 10000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 11000, 12000, 13000, 14000, 15000, and 16000). For brevity, these details are not repeated here.

Figure 11:
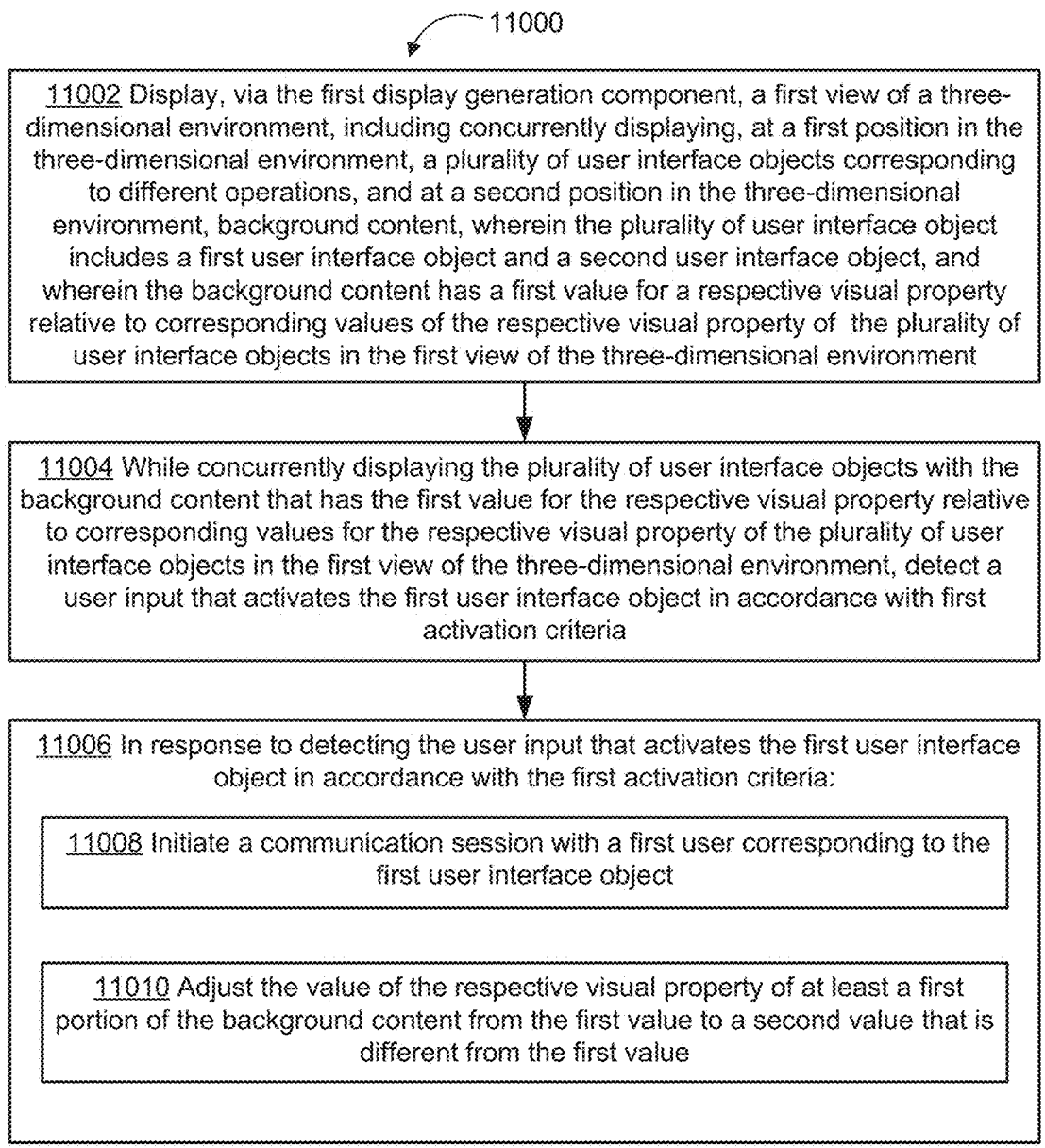
FIG. 11 is a flowchart of a method of changing display properties of background regions in a three-dimensional environment in conjunction with initiating a communication session, in accordance with some embodiments.

FIG. 11 is a flowchart of a method 11000 of changing display properties of background regions in a three-dimensional environment in conjunction with initiating a communication session, in accordance with some embodiments.

In some embodiments, the method 11000 is performed at a computer system (e.g., computer system 101 in FIG. 1) including a first display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 11000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 11000 are, optionally, combined and/or the order of some operations is, optionally, changed.

In some embodiments, the method 11000 is performed at a computer system (e.g., the computer system 101 in FIG. 1, the computer system 101 described with respect to FIGS. 7A-7D, FIGS. 7E-7F, FIGS. 7G-7H, FIGS. 7I-7M, FIGS. 7N-7O, FIGS. 7P-7S, FIGS. 7T-7U, and/or FIGS. 7V-7X, the first computer system 101-*t* described with respect to FIGS. 7V-7X, the second computer system described with respect to FIGS. 7V-7X, etc.). In some embodiments, the computer system is in communication with a first display generation component (e.g., the first display generation component is a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the first display generation component is a first display generation component 7100 described with respect to FIGS. 7A-7U and 7Y-7Z, a first display generation component 7100-*t* described with respect to FIGS. 7V-7X, a second display generation component described with respect to FIGS. 7V-7X, etc. In some embodiments, the computer system is an integrated device with one or more processors and memory enclosed in the same housing as the first display generation components and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the first display generation component and/or the one or more input devices. In some embodiments, the first display generation component and the one or more input devices are integrated and enclosed in the same housing. Many of the features of the method 11000 are described with respect to FIGS. 7N-7O, in accordance with some embodiments.

In the method 11000, the computer system displays (11002), via the first display generation component, a first view (e.g., a view corresponding to a first viewpoint, a view from a first viewing perspective, etc.) of a three-dimensional environment (e.g., a virtual three-dimensional environment, an augmented reality environment that includes a pass-through view of a physical environment or a camera view of the physical environment, etc.), including concurrently displaying, at a first position in the three-dimensional environment, a plurality of user interface objects corresponding to different operations (e.g., user interface objects of a user interface of an application, a menu listing a plurality of users, a menu listing a plurality of communication modes, a notification of an incoming communication request from another user, a mixed of two or more of the above, etc.), and at a second position in the three-dimensional environment, background content (e.g., part of the three-dimensional environment (e.g., virtual objects, unoccupied space, representation of physical objects, representation of the physical environment, etc.) that is outside of region occupied by the plurality of user interface objects, a container object or background graphic for the plurality of user interface objects, etc.), wherein the plurality of user interface object includes a first user interface object (e.g., a first user interface object corresponding to a first user, a first user interface object corresponding to a first communication session, a first user interface object for accepting or initiating a communication session with a first user, etc.) and a second user interface object (e.g., a second user interface object corresponding to a second user different from the first user, a second user interface object corresponding to a second communication session different from the first communication session, a second user interface object for accepting or initiating a communication session with a second user, other user interface objects in the same container object or user interface as the first user interface object but corresponds to different operations or users, etc.), and wherein the background content has a first value for a respective visual property (e.g., opacity level, color saturation level, luminance level, blur radius, etc. that corresponds to a normal level of visibility, a default level of visibility, an unadjusted level of visibility, etc.) relative to corresponding values of the respective visual property for the plurality of user interface objects in the first view of the three-dimensional environment. For example, as shown in FIG. 7N, the computer system displays a view of a three-dimensional environment 7104 that includes a first user interface object 7326 and other user interface objects such as 7328, 7330, 7320, etc. along with background content such as representation of the physical environment (e.g., representations 7004' 7006', 7008', 7002', etc.) and virtual objects (e.g., virtual object 7322), where the background content has a normal unadjusted level of visibility relative to the first user interface object 7326, in accordance with some embodiments. In some embodiments, the plurality of user interface objects corresponding to different operations include user interface objects corresponding to different users, user interface objects corresponding to different communication sessions, user interface objects of a currently displayed application corresponding to different operations within the application, user interface objects corresponding to different system-level operations, user interface objects corresponding to operations in different applications, user interface objects of a mix of two or more of the above types, etc. In some embodiments, the background content includes virtual objects, virtual lighting, virtual controls, etc. In some embodiments, the background content includes representations of physical objects and unoccupied physical space (e.g., as viewed through a transparent portion of the display, in a camera view, etc.) that is included in the currently displayed view of the three-dimensional environment. In some embodiments, the background content includes a mix of virtual content and representations of physical objects and space. In some embodiments, the virtual objects and representations of physical objects and space in the background content have respective spatial relationships with respective ones of the plurality of user interface objects in the three-dimensional environment. In some embodiments, some portions of the background content (e.g., some of the virtual objects and representations of physical objects in the background content) have respective spatial relationships with respective ones of the plurality of user interface objects in the three-dimensional environment that, optionally, cause said portions of the background content to be visually obscure by the plurality of user interface objects when the first view of the three-dimensional environment is displayed (e.g., when the three-dimensional environment is viewed from a first viewpoint, when the currently displayed viewpoint has a first spatial relationship with the plurality of user interface objects in the three-dimensional environment, etc.); and at least some other portions of background content (e.g., at least some of the virtual objects and representations of physical objects in the background content) are not visually obscured by the plurality of user interface objects when the first view of the three-dimensional environment is displayed, and have a first level of visibility (e.g., normal, unadjusted, and/or default level of visibility) relative to the plurality of user interface objects in the first view of the three-dimensional environment.

In the method 11000, while concurrently displaying the plurality of user interface objects with the background content that has the first value for the respective visual property relative to corresponding values of the respective visual property for the plurality of user interface objects in the first view of the three-dimensional environment, the computer system detects (11004) a user input that activates the first user interface object in accordance with first activation criteria (e.g., criteria for detecting a predefined gesture (e.g., a pinch gesture, a tap gesture, etc.) while the first user interface object has input focus (e.g., while a gaze input is directed to the first user interface object and not to other user interface objects, while the first user interface object is selected, while the location of the predefined gesture corresponds to the position of the first user interface object and not the position of other user interface objects, etc.)). For example, as shown in FIG. 7N, while the computer system displays the first user interface object 7326 and other user interface objects such as 7328, 7330, 7320, etc. along with background content such as representation of the physical environment (e.g., representations 7004' 7006', 7008', 7002', etc.) and virtual objects (e.g., virtual object 7322), the computer system detects movement 7332 of the hand 7202 in conjunction with a gaze input 7218 directed to the first user interface object 7326 which meets the criteria to activate the first user interface object 7326, in accordance with some embodiments.

In the method 11000, in response to detecting the user input that activates the first user interface object in accordance with the first activation criteria (11006): the computer system initiates (11008) a communication session (e.g., a communication of a respective type based on device capabilities, environment type, etc., such as an audio-only communication session, a video communication session with a user using a 2D camera, a co-presence experience with a user in a virtual three-dimensional environment, a co-presence experience with a user in a shared augmented reality environment, etc.) with a first user corresponding to the first user interface object (e.g., a user interface object including an avatar of the first user and an affordance that initiates the communication session with the first user, an avatar of the first user, a "call" button in a user interface of a communication application while an avatar of the first user is selected in the user interface, an "accept" button in a notification of a communication request from the first user, etc.), and the computer system adjusts (11010) the value of the respective visual property (e.g., proactively adjusting visibility by applying a visual effect or changing the display property of the display generation component (e.g., changing the opacity level, color saturation level, luminance level, blur radius, etc.), in dependent of displaying a new object or enlarging an existing object, and different from merely allowing the background to be blocked by a newly displayed object or an enlarged existing object due to the spatial relationship of objects and background in the three-dimensional environment) for at least a first portion of the background content (e.g., relative to at least the first user interface object) from the first value to a second value that is different from the first value (e.g., a value that corresponds to a reduced level of visibility of the first portion of the background content (e.g., a value that has a reduced level of opacity, a reduced level of color saturation, a reduced luminance level, a greater blur radius, etc.)). For example, as shown in FIGS. 7N-7O, in response to detecting the combination of the movement 7332 of the hand and the gaze input 7218 directed to the first user interface object 7326, the computer system initiates the communication session with a user that corresponds to the first user interface object 7326, and reduces the visual prominence of the background regions, such as the representation of the physical environment (e.g., representations 7004', 7006', 7008', 7002', etc.) and virtual objects (e.g., virtual object 7322), in accordance with some embodiments. In some embodiments, adjusting the value of the respective visual property of at least the first portion of the background content from the first value to the second value is accomplished by a filter or visual effect (e.g., blur, darkening, reduced transparency, etc.) applied to the transparent pass-through portion of the first display generation component, or by applying a virtual blur, darkening, or other image processing procedures to the camera view of the pass-through content. In some embodiments, the first portion of the background content includes some or all of the virtual objects and representations of physical objects in the background content that are not visually obscured by the plurality of user interface objects when the first view of the three-dimensional environment is displayed, and that have the first level of visibility (e.g., normal, unadjusted, and/or default level of visibility) relative to the plurality of user interface objects in the first view of the three-dimensional environment before the user input that meets the first activation criteria was detected. In some embodiments, the computer system adjusts the visibility of the at least the first portion of the background content by increasing the blur radius, darkening, reducing color saturation, increasing transparency level, decreasing opacity, etc. of the virtual objects in the background content (e.g., relative to the first user interface object or a transformed version thereof that remains displayed in the first view of the three-dimensional environment after the detection of the user input). In some embodiments, the computer system adjusts the visibility of the at least the first portion of the background content by increasing the blur radius, darkening, reducing color saturation, increasing transparency level, decreasing opacity, etc. of the camera view of the physical environment included in the first view of the three-dimensional environment (e.g., relative to the first user interface object or a transformed version thereof that remains displayed in the first view of the three-dimensional environment after the detection of the user input). In some embodiments, the computer system adjusts the visibility of the at least the first portion of the background content by increasing the opacity, or increasing a filtering level for luminance, color, etc. of the pass-through content seen through the transparent display of the first display generation component. In some embodiments, at least the first portion of the background content is reduced to a second level of visibility where the background content is not completely invisible (e.g., achieved by applying a visual effect to the background content, and/or by applying a filter to the transparent display, etc.). In some embodiments, the second level of visibility is a level where some, less than all, of the background content is completely invisible (e.g., achieved by ceasing display, or completely blocking, etc.). Adjusting the value of the respective visual property for at least the first portion of the background content provides improved visual feedback to the user (e.g., by increasing visibility of the user interface objects that are associated with the communication session). Providing improved feedback enhances the operability of the device, which, additionally, reduces power usage and improves battery life of the device by enabling the user to use the device more quickly and efficiently.

In some embodiments, in response to detecting the user input that activates the first user interface object in accordance with the first activation criteria (e.g., in response to detecting selection of a preferred communication mode in a user interface that includes an avatar of the first user and one or more other affordances related to the communication session, in response to detecting selection of the avatar of the first user from among avatars of a plurality of users, etc.), the computer system reduces visibility (e.g., changing values of one or more visual properties) of one or more user interface objects (e.g., objects other than the first user interface object, a set of objects including the second user interface object, a set of objects not including the second user interface object, etc.) of the plurality of user interface objects other than the first user interface object (e.g., reducing visibility of the representations of users that are not activated by the user input), in conjunction with adjusting visibility of the at least the first portion of the background content from a first level of visibility (e.g., normal, unadjusted visibility level) to a second level of visibility (e.g., reduced visibility level) (e.g., changing the values of one or more visual properties, including changing the value of the respective visual property from the first value to the second value). For example, in some embodiments, in FIG. 7N, the first user interface object 7326 is, optionally, displayed among a group of similar user interface objects corresponding to other users, and/or user interface objects corresponding to applications and other experiences; and in FIG. 7O, these other similar user interface objects are reduced in visual prominence along with virtual object 7322 (e.g., shown as 7322' with reduced visibility level as compared to object 7322 in FIG. 7N), in accordance with some embodiments. For example, in some embodiments, in addition to reducing the visibility of the virtual objects and representations of the physical objects in the physical environment, the computer system also reduces the visibility of some or all of the plurality of user interface objects that are not activated by the user input. In some embodiments, the computer system reduces the visibility of at least some of the plurality of user interface objects that are not activated by the user input by increasing the blur radius, darkening, reducing color saturation, increasing transparency level, decreasing opacity, etc. of these user interface objects relative to the first user interface object or a transformed version of the first user interface object that remains displayed in the first view of the three-dimensional environment. In some embodiments, the computer system reduces the visibility of at least some of the plurality of user interface objects that are not activated by the user input by increasing the blur radius, darkening, reducing color saturation, increasing transparency level, decreasing opacity, etc. of these user interface objects relative to their previous appearances. In some embodiments, visibility of only some of the plurality of user interface objects that are not activated by the user input are reduced in response to the user input that activated the first user interface objects, while visibility of some of the plurality of user interface objects that are not activated by the user input remain unchanged. For example, in some embodiments, the plurality of user interface objects include avatars of multiple different users, and when the user input selects the avatar of the first user to initiate a communication session with the first user, avatars of other users who are not currently engaged in a communication session with the user are reduced in visibility along with the background content, while avatars of one or more users who are currently engaged in one or more communication sessions with the user are not reduced in visibility. In another example, in some embodiments, the plurality of user interface objects include avatars of multiple different users, and when the user input selects the avatar of the first user to initiate a communication session with the first user, avatars of other users who are not currently available to be engaged in a communication session with the user are reduced in visibility along with the background content, while avatars of one or more users who are currently available to join the respective communication session with the first user are not reduced in visibility (e.g., so the user can add them to the same communication session later). In some embodiments, the plurality of user interface objects include avatars of multiple different users, and when the user input selects the avatar of the first user to initiate a communication session with the first user, avatars of other users who are not selected are reduced in visibility along with the background content. In some embodiments, the plurality of user interface objects include avatars of multiple different users and application icons, and when the user input selects the avatar of the first user to initiate a communication session with the first user, the application icons are reduced in visibility along with the background content, while the avatars of users that are not selected are not reduced in visibility. In some embodiments, the plurality of user interface objects include user interface objects from a first application and user interface objects from a second application, and the first user interface object is, optionally, one of the user interface objects of the first application; and in response to the user input that activated the first user interface object, the user interface objects from the first application are not reduced in visibility while the user interface objects from the second application are reduced in visibility along with the background content. In some embodiments, the plurality of user interface objects include user interface objects from a first application and user interface objects from a second application, and in accordance with a determination that the first user interface object is one of the user interface objects of the first application, a first set of objects (e.g., objects in the background content, and objects in the plurality of user interface objects, etc.) are reduced in visibility in response to the user input; and in accordance with a determination that the first user interface object is one of the user interface objects of the second application, a second set of objects (e.g., objects in the background content, and objects in the plurality of user interface objects, etc.) are reduced in visibility in response to the user input, wherein the second set of objects are different from (e.g., non-overlapping, or overlapping but include different objects, etc.) the first set of objects. Reducing visibility of one or more user interface objects in conjunction with adjusting visibility of the at least the first portion of the background content, in response to detecting the user input that activates the first user interface object provides improved visual feedback to the user (e.g., by increasing visibility of the first user interface object the user has activated). Providing improved feedback enhances the operability of the device, which, additionally, reduces power usage and improves battery life of the device by enabling the user to use the device more quickly and efficiently.

In some embodiments, the background content includes a representation of a physical environment (e.g., a camera view of the physical environment, a view of the physical environment through a transparent portion of the first display generation component, etc.) surrounding the first display generation component, and wherein adjusting the value of the respective visual property of the at least the first portion of the background content from the first value to the second value (e.g., for the purpose of adjusting the visibility of at least the first portion of the background content from the first level of visibility to the second level of visibility) includes reducing visibility of at least a first portion of the representation of the physical environment (e.g., a portion of the representation that is visible in the first view of the three-dimensional environment in a region surrounding the plurality of user interface objects, surrounding the first use interface object, etc.) in the first view of the three-dimensional environment (e.g., from the first level of visibility to the second level of visibility). For example, as shown in FIG. 7O, the visibility of the representation of the physical environment (e.g., representations 7004' 7006', 7008' and 7002', etc. of physical surfaces and objects in the physical environment) is reduced as compared to that shown in FIG. 7N, in accordance with some embodiments. In some embodiments, the background content further includes one or more virtual objects in regions that surround the plurality of user interface objects, and adjusting the visibility of at least the first portion of the background content from the first level of visibility to the second level of visibility includes reducing visibility of at least some of the one or more virtual objects in the first view of the three-dimensional environment (e.g., from the first level of visibility to the second level of visibility). Adjusting the value of the respective visual property for at least the first portion of the background content, including reducing visibility of at least a first portion of the representation of the physical environment, provides improved visual feedback to the user (e.g., by increasing visibility of the first user interface object the user has activated). Providing improved feedback enhances the operability of the device, which, additionally, reduces power usage and improves battery life of the device by enabling the user to use the device more quickly and efficiently.

In some embodiments, while concurrently displaying the plurality of user interface objects with the background content that has the first value for the respective visual property (e.g., that has the first level of visibility relative to the plurality of user interface objects) in the first view of the three-dimensional environment, the computer system detects a user input that activates the second user interface object in accordance with second activation criteria (e.g., criteria for detecting a predefined gesture (e.g., a pinch gesture, a tap gesture, etc.) while the second user interface object has input focus (e.g., while a gaze input is directed to the second user interface object and not to other user interface objects, while the second user interface object is selected, while the location of the predefined gesture corresponds to the position of the second user interface object and not the position of other user interface objects, etc.)). In response to detecting the user input that activates the second user interface object in accordance with the second activation criteria, the computer system performs an operation that corresponds to the second user interface object, while maintaining the first value of the respective visual property of the first portion of the background content (e.g., maintaining visibility of the first portion of the background content at the first level of visibility) (e.g., without reducing the visibility of the background content to the second level of visibility that is lower than the first level of visibility). For example, in FIG. 7N, if the computer system, instead of detecting the gaze input directed to the first user interface object 7326 in conjunction with the movement 7322, detects the gaze input directed to another user interface object such as the user interface object 7322 or 7320, the computer system, optionally, performs an operation corresponding to said other user interface object without altering the visibility level of the background regions in the manner as shown in FIG. 7O, in accordance with some embodiments. For example, in some embodiments, the first user interface object is an avatar of the first user, and the second user interface object is an application icon corresponding to a first application, and performing the operation corresponding to the second user interface object includes displaying a user interface of the first application. When the user interface of the first application is displayed, the computer system does not reduce the visibility of the background content, even though some of the background content may be blocked visually by the newly displayed user interface of the first application. In some embodiments, the first user interface object is an avatar of a first user that is available for communication, and the second user interface object is an avatar of a second user that is not available for communication; and performing the operation that corresponds to the second user interface object includes displaying a notification regarding the unavailability of the second user without initiating the communication session with the second user; and when the notification is displayed, the computer system does not reduce the visibility of the background content, even though some of the background content may be blocked visually by the newly displayed notification. In some embodiments, the first user interface object is an affordance for initiating communication with the first user in a first communication mode; and the second user interface object is an affordance for initiating communication with the first user in a second mode; and performing the operation that corresponds to the second user interface object includes initiating a communication session with the first user in the second communication mode; and, when the computer system initiates the communication session with the first user using the second communication mode, the computer system does not reduce the visibility of the background content, or reduce visibility of a second portion of that background content that was not reduced in visibility when the communication session is initiated in the first communication mode in response to the input directed to the first user interface object. In some embodiments, the first communication mode is an immersive communication mode, and the second communication mode is a non-immersive communication mode. Performing an operation that corresponds to the second user interface object while maintaining the first value of the respective visual property of the first portion of the background content, in response to detecting the user input that activates the second user interface object in accordance with second activation criteria, provides additional control options without cluttering the UI with additional displayed controls (e.g., additional controls for adjusting the first value of the respective visual property). Providing additional control options without cluttering the UI with additional displayed controls enhances the operability of the device, which, additionally, reduces power usage and improves battery life of the device by enabling the user to use the device more quickly and efficiently.

In some embodiments, the plurality of user interface objects represent a plurality of different users (e.g., the plurality of user interface objects are respective avatars, identifiers, menu options, etc. corresponding to the plurality of different users), the first user interface object represents the first user, the second user interface object represents a second user different from the first user. For example, in FIG. 7N, the first user interface object 7326 is optionally an avatar of the first user, and the first user interface object 7326 is optionally displayed among a plurality of other avatars of different users, where a respective avatar is activatable in a manner similar to the first user interface object 7326 to start a corresponding communication session with a corresponding user of the respective avatar, in accordance with some embodiments. Representing the plurality of different users with the plurality of user interface objects provides improved visual feedback to the user (e.g., allows the user to easily identify user interface objects based on an avatar, name, etc.). Providing improved feedback enhances the operability of the device, which, additionally, reduces power usage and improves battery life of the device by enabling the user to use the device more quickly and efficiently.

In some embodiments, initiating the communication session with the first user corresponding to the first user interface object includes: displaying a first set of user interface objects (e.g., objects displayed in the same container user interface object, in the same cluster, etc.) corresponding to the communication session with the first user in the first view of the three-dimensional environment, wherein the at least the first portion of the background content has the second value for the respective visual property relative to values of the respective visual property of the first set of user interface objects (e.g., the first portion of the background content has the second level of visibility relative to the first set of user interface objects) (e.g., the first set of user interface objects has a greater level of visibility relative to the background content than the level of visibility the plurality of user interface objects had relative to the background content before the detection of the user input, due to the reduction of visibility of the background content in response to the user input). For example, as shown in FIG. 7O, when the communication session is started, the computer system, optionally, displays a user interface object 7333 that includes a set of user interface objects corresponding to the communication session, and the background regions (e.g., the representation of the physical environment and the user interface object 7322') have a reduced visibility relative to the user interface object 7333, in accordance with some embodiments. In some embodiments, the first set of user interface objects include the first user interface object or a transformed version of the first user interface object (e.g., an avatar of the first user), and one or more other user interface objects corresponding to a plurality of functions corresponding to the communication session with the first user (e.g., user interface objects for selecting and/or specifying control parameters for the communication session with the first user, user interface object for adding related content (e.g., chat, photos, augmented reality, annotations, etc.) to the communication session, etc.). Displaying a first set of user interface objects corresponding to the communication session, wherein the at least the first portion of the background content has the second value for the respective visual property relative to values of the respective visual property of the first set of user interface objects, provides improved visual feedback to the user (e.g., provides a visual contrast between the first set of user interface objects and the at least the first portion of the background content). Providing improved feedback enhances the operability of the device, which, additionally, reduces power usage and improves battery life of the device by enabling the user to use the device more quickly and efficiently.

In some embodiments, displaying the first set of user interface objects (e.g., objects displayed in the same container user interface object, in the same cluster, etc.) corresponding to the communication session with the first user in the first view of the three-dimensional environment includes displaying a first affordance that corresponds to a first communication mode (e.g., a co-presence mode in a shared three-dimensional environment, a video mode, an audio-only mode, etc.) of a plurality of different communication modes, wherein activation of the first affordance in accordance with preset criteria corresponding to the first affordance causes the computer system to initiate the communication session with the first user using the first communication mode. For example, as shown in FIG. 7O, when the process for starting the communication session is initiated, the computer system, optionally, displays a control user interface object 7333 that includes a set of user interface objects corresponding to the communication session, and the set of user interface object includes an affordance for selecting a communication mode for the communication session, in accordance with some embodiments. In some embodiments, the first set of user interface objects includes the first user interface object or a transformed version of the first user interface object, such as the avatar or image of the first user. In some embodiments, the first set of user interface objects further includes control affordances for sending the communication request and selecting a communication mode for the communication session. In some embodiments, the first affordance is displayed by the computer system instead of a second affordance that corresponds to a second communication mode in accordance with a determination that the first use is capable of communication in the first communication mode, and not capable of communication in the second communication mode. In some embodiments, the first affordance is displayed by the computer system instead of a second affordance that corresponds to a second communication mode in accordance with a determination that the first use is capable of communication in both the first communication mode and the second communication mode, but the first communication mode is a more preferred communication mode than the second communication mode (e.g., for the user of the computer system, for the first user, etc.). In some embodiments, if the first user is capable of communicating with the user of the computer system using multiple communication modes (e.g., audio only, 2D video, co-presence in a three-dimensional environment, etc.) (e.g., using a first type of device, using a second type of device, using a third type of device, etc.), the computer system displays a respective affordance corresponding to a respective communication mode that is most preferred among the multiple communication modes, where the preference is ranked based on one or more preset criteria (e.g., level of immersion, speed, power usage, most stable connection, etc.). In some embodiments, the computer system further displays an affordance that, when activated, causes a list of available communication modes to be displayed. Displaying a first affordance that corresponds to a first communication mode of a plurality of different communication modes, wherein activation of the first affordance in accordance with preset criteria initiates the communication session with the first user using the first communication mode, reduces the number of inputs needed to initiate the communication session with the first user using the fist communication mode (e.g., the plurality of different communication modes can be filtered by communication modes available for communicating with the first user, so the user does not select a communication mode that is unavailable for communicating with the first user). Reducing the number of inputs needed to perform an operation enhances the operability of the device, which, additionally, reduces power usage and improves battery life of the device by enabling the user to use the device more quickly and efficiently.

In some embodiments, the computer system provides access to selectable options corresponding to a plurality of different communication modes in which the communication session can be conducted, including one or more second communication modes (e.g., 2D video communication, chat, messages, voice communication, etc.) different from the first communication mode (e.g., co-presence in a three-dimensional environment), wherein access to the selectable options corresponding to the one or more second communication modes are deprioritized (e.g., in terms of display location, visual prominence, order in work flow, menu level, etc.) below access to the first affordance corresponding to the first communication mode. For example, as shown in FIG. 7O, when the communication session is initiated, the computer system, optionally, displays a user interface object 7333 that includes affordances for selecting a communication mode for the communication session, where the affordance for starting the communication session in a immersive copresence mode is provided with greater visual prominence and/or ease of access (e.g., directly activatable in the user interface object 7333, is listed first in the user interface object 7333, etc.) while the affordances for starting the communication session in a non-immersive mode (e.g., video mode, voice-only mode, etc.) are provided with less visual prominence and/or less direct access (e.g., not directly activatable in the user interface object 7333, hidden under a drop down menu in the user interface object 7333, etc.), in accordance with some embodiments. For example, in some embodiments, the first affordance for starting the communication session with the first communication mode is provided in response to activation of the first user interface object, while the selectable options for starting the communication session with any of a number of other communication modes are not provided in response to activation of the first user interface object but in response to another input (e.g., selection of a "more options" affordance shown next to the first affordance) that is detected after the display of the first affordance. Deprioritizing one or more second communication modes below access to the first affordance corresponding to the first communication mode reduces the number of inputs needed to initiate the communication session with the first user using the first communication mode (e.g., the user does not need to navigate through communication modes other than the first communication mode in order to select the first communication mode). Reducing the number of inputs needed to perform an operation enhances the operability of the device, which, additionally, reduces power usage and improves battery life of the device by enabling the user to use the device more quickly and efficiently.

In some embodiments, while displaying the first set of user interface objects (e.g., objects displayed in the same container user interface object, in the same cluster, etc. in response to the user input that activated the first user interface object) corresponding to the communication session with the first user in the first view of the three-dimensional environment, wherein the at least the first portion of the background content has the second value for the respective visual property (e.g., has the second level of visibility relative to the first set of user interface object) and wherein the first set of user interface objects includes a representation of the first user (e.g., the representation of the first user is the first user interface object or a transformed version of the first user interface object), the computer system detects an event that causes the computer system to send out a request to communicate with the first user and wait for a response to the request. While waiting for the response to the request, the computer system reduces visibility of one or more of the first set of user interface objects relative to the representation of the first user (e.g., changing the value of the respective visual property of the first set of user interface objects from the first value to the second value) (e.g., reducing visibility of other user interface objects in the first set of user interface objects to the second level of visibility, without reducing the visibility of the representation of the first user in the first view of the three-dimensional environment). For example, the first user interface object 7333 in FIG. 7O, optionally, includes an avatar of the first user, and other user interface objects for configuring the communication session; and once the outgoing communication request is sent out in response to selection of the communication mode or a "call" button in the user interface object 7333, the rest of the user interface object 7333 fades out leaving avatar of the first user remaining in the view of the three-dimensional environment 7104 while the outgoing communication request is pending acceptance by the first user, in accordance with some embodiments. In some embodiments, in response to detecting the user selecting the first affordance that corresponds to the first communication mode, the computer system sends out a request to the device of the first user to start the communication session in the first communication mode, and while waiting for a response from the first user and while waiting to establish the communication session in the first communication mode, the computer system reduces visibility of (e.g., fade out, cease to display, blur, darken, etc.) the user interface objects for selecting the communication mode and other options, leaving the representation of the first user with the normal visibility or enhanced visibility in the first view of the three-dimensional environment (e.g., along with visual prompt indicating the waiting status of the computer system). In some embodiments, the computer system automatically sends out the request to the device of the first user to start the communication session in a default communication mode (e.g., the first communication mode, a most preferred mode among the available modes, etc.) after a period of time, without an explicit selection or confirmation input from the user. In other words, the event that causes the computer system to send out the request for communication is optionally a system-generated event, and not a user input, in accordance with some embodiments. Reducing visibility of one or more of the first set of user interface objects relative to the representation of the first user while waiting for the response to the request to communicate with the first user provides improved visual feedback to the user (e.g., that the computer system is waiting for the response to the request to communicate with the first user). Providing improved feedback enhances the operability of the device, which, additionally, reduces power usage and improves battery life of the device by enabling the user to use the device more quickly and efficiently.

In some embodiments, while waiting for the response to the request and displaying the representation of the first user in the first view of the three-dimensional environment, the computer system detects a user input that corresponds to a request to move the representation of the first user from a first position to a second position in the three-dimensional environment (e.g., detecting the user input includes detecting a user's hand forming a pinch gesture and moving from a first location to a second location while maintaining the pinch gesture in conjunction with detecting a gaze input is directed to the representation of the first user, or detecting the user input includes detecting a gaze input directed to the second position in conjunction with a confirmation input (e.g., a tap input, a double tap input, etc.), etc.). In response to detecting the user input that corresponds to the request to move the representation of the first user from the first position to the second position in the three-dimensional environment, the computer system displays the representation of the first user at the second position in the three-dimensional environment. In response to detecting that the communication session is established in accordance with the response to the request, the computer system updates the representation of the first user at the second position in accordance with data received from the first user (e.g., real-time video image of the first user, avatar of the first user received from the first user, etc.). For example, the first user interface object 7333 in FIG. 7O, optionally, includes an avatar of the first user, and other user interface objects for configuring the communication session; and once the outgoing communication request is sent out in response to selection of the communication mode or a "call" button in the user interface object 7333, the rest of the user interface object 7333 fades out leaving avatar of the first user remaining in the view of the three-dimensional environment 7104 while the outgoing communication request is pending acceptance by the first user, in accordance with some embodiments. The computer system, optionally, allows the user to drag the avatar of the first user in the three-dimensional environment while the outgoing communication request is pending acceptance by the first user. Once the request has been accepted, the computer system replaces the avatar of the first user with image data received from the computer system used by the first user to represent the first user at the final position of the avatar selected by the user, in accordance with some embodiments. In some embodiments, the first position and the second position have different distances from the viewpoint corresponding to the currently displayed view of the three-dimensional environment. In some embodiments, the first position and the second position have different depths from the viewpoint corresponding to the currently displayed view of the three-dimensional environment. In some embodiments, the position of the representation of the first user is controlled by the first user during the communication session. In some embodiments, the position of the representation of the first user is controlled by the user of the computer system during the communication session. In some embodiments, whether the position of the representation of the first user is controlled by the first user or by the user of the computer system depends on the type of device that the first user is using for the communication session. For example, if the first user uses an AR-enabled device, the first user controls the position of his/her own avatar in the three-dimensional environment; and if the first user uses a 2D-video device or an audio-only device, the user of the computer system controls the position of the avatar of the first user in the three-dimensional environment. Displaying the representation of the first user at the second position in the three-dimensional environment in response to detecting the user input that corresponds to the request to move the representation of the first user from the first position to the second position in the three-dimensional environment, and updating the representation of the first user at the second position in accordance with data received from the first user in response to detecting that the communication session is established in accordance with the response to the request performs an operation (e.g., updates the representation of the first user at the second position) without requiring further user input (e.g., requiring the user to also position a video image or avatar of the first user that appears in response to detecting that the communication session is established). Performing an operation when a set of conditions has been met without requiring further user input enhances the operability of the device, which, additionally, reduces power usage and improves battery life of the device by enabling the user to use the device more quickly and efficiently.

In some embodiments, during the communication session with the first user, in accordance with a determination that the first user has joined the communication session using a first communication mode (e.g., a copresence mode in a shared three-dimensional environment), the computer system updates a position of the representation of the first user in the three-dimensional environment in accordance with data received from the first user (e.g., location, orientation, or movement (e.g., change in orientation and/or location) of the first user, user input received from the first user, etc.). For example, the first user interface object 7333 in FIG. 7O, optionally, includes an avatar of the first user, and other user interface objects for configuring the communication session; and once the outgoing communication request is sent out in response to selection of the communication mode or a "call" button in the user interface object 7333, the rest of the user interface object 7333 fades out leaving avatar of the first user remaining in the view of the three-dimensional environment 7104 while the outgoing communication request is pending acceptance by the first user, in accordance with some embodiments. The computer system, optionally, allows the user to drag the avatar of the first user in the three-dimensional environment while the outgoing communication request is pending acceptance by the first user. Once the request has been accepted, the computer system replaces the avatar of the first user with image data received from the computer system used by the first user to represent the first user at the final position of the avatar selected by the user, in accordance with some embodiments. After the communication session has been established, the computer system, in accordance with a determination that the first user participates in the communication session in an immersive copresence mode, moves the representation of the first user in the view of the three-dimensional environment 7104 in accordance with movement and position data of the first user that change the virtual position of the first user in the three-dimensional environment, in accordance with some embodiments. Updating a position of the representation of the first user in the three-dimensional environment in accordance with data received from the first user, in accordance with a determination that the first user has joined the communication session using a first communication mode, performs an operation (e.g., updating the position of the representation of the first user) without requiring further user input (e.g., requiring the user to manually move the position of the representation of the first user). Performing an operation when a set of conditions has been met without requiring further user input enhances the operability of the device, which, additionally, reduces power usage and improves battery life of the device by enabling the user to use the device more quickly and efficiently.

In some embodiments, during the communication session with the first user, in accordance with a determination that the first user has joined the communication session using a second communication mode (e.g., a 2D-video mode, an audio-only mode, etc.), the computer system updates a position of the representation of the first user in the three-dimensional environment in accordance with user input received from a user of the computer system (e.g., user dragging the representation of the first user in the three-dimensional environment, user selecting a new position for the representation of the first user using a gaze input in conjunction with a confirmation input, etc.). In some embodiments, after the communication session has been established, the computer system, in accordance with a determination that the first user participates in the communication session in a non-immersive mode (e.g., video, or voice-only mode, etc.), does not move the representation of the first user in the view of the three-dimensional environment 7104 in accordance with movement and position data of the first user, but continue to move the representation of the first user in the view of the three-dimensional environment 7104 in accordance with drag input received from the user of the computer system, in accordance with some embodiments. Updating a position of the representation of a position of the representation of the first user in the three-dimensional environment in accordance with user input received from a user of the computer system, in accordance with a determination that the first user has joined the communication session using a second communication mode, reduces the number of inputs needed to position the representation of the first user in the three-dimensional environment at the desired location (e.g., the user does not need to reposition the representation of the first user even if data from the first user is received from the first user). Reducing the number of inputs needed to perform an operation enhances the operability of the device, which, additionally, reduces power usage and improves battery life of the device by enabling the user to use the device more quickly and efficiently.

In some embodiments, while waiting for the response to the request, the computer system maintaining display of a respective user interface object that includes an indication that the response to the request has not been accepted in a view of the three-dimensional environment until the request is canceled (e.g., canceled in response to user input from the first user) or accepted (e.g., accepted in response to user input from the second user). In some embodiments, the respective user interface object includes the representation of the first user. For example, the first user interface object 7333 in FIG. 7O, optionally, includes an avatar of the first user, and other user interface objects for configuring the communication session; and once the outgoing communication request is sent out in response to selection of the communication mode or a "call" button in the user interface object 7333, the rest of the user interface object 7333 fades out leaving avatar of the first user remaining in the view of the three-dimensional environment 7104 while the outgoing communication request is pending acceptance by the first user, in accordance with some embodiments. The computer system, optionally, maintains display of the avatar of the first user in the three-dimensional environment while the outgoing communication request is pending acceptance by the first user along with a cancel button. Once the request has been accepted, the computer system replaces the avatar of the first user with image data received from the computer system used by the first user to represent the first user at the final position of the avatar selected by the user, in accordance with some embodiments. If the user cancels the outgoing communication request by selecting the cancel button, the computer system ceases to display the avatar of the first user and restores display of the three-dimensional environment into the state shown prior to the user input that initiated the communication session, in accordance with some embodiments. Maintaining display of a respective user interface object that includes an indication that the response to the request has not been accepted, while waiting for the response to the request to communicate with the first user provides improved visual feedback to the user (e.g., that the request to communicate with the first user has not yet been accepted). Providing improved feedback enhances the operability of the device, which, additionally, reduces power usage and improves battery life of the device by enabling the user to use the device more quickly and efficiently.

In some embodiments, while displaying the respective user interface object that includes the indication that the request has not been accepted in the view of the three-dimensional environment, the computer system detects a user input that corresponds to a request to move the respective user interface object from a first position to a second position in the three-dimensional environment (e.g., detecting the user input includes detecting a user's hand forming a pinch gesture and moving from a first location to a second location while maintaining the pinch gesture while a gaze input is directed to the respective user interface object, or detecting the user input includes detecting a gaze input directed to the second position in conjunction with a confirmation input (e.g., a tap input, a double tap input, etc.), etc.). In response to detecting the user input that corresponds to the request to move the respective user interface object from the first position to the second position in the three-dimensional environment, the computer system displays the respective user interface object at the second position in the three-dimensional environment. For example, the first user interface object 7333 in FIG. 7O, optionally, includes an avatar of the first user, and other user interface objects for configuring the communication session; and once the outgoing communication request is sent out in response to selection of the communication mode or a "call" button in the user interface object 7333, the rest of the user interface object 7333 fades out leaving avatar of the first user remaining in the view of the three-dimensional environment 7104 while the outgoing communication request is pending acceptance by the first user, in accordance with some embodiments. The computer system, optionally, allows the user to drag the avatar of the first user in the three-dimensional environment while the outgoing communication request is pending acceptance by the first user. Once the request has been accepted, the computer system replaces the avatar of the first user with image data received from the computer system used by the first user to represent the first user at the final position of the avatar selected by the user, in accordance with some embodiments. In some embodiments, the first position and the second position have different distances from the viewpoint corresponding to the currently displayed view of the three-dimensional environment. In some embodiments, the first position and the second position have different depths from the viewpoint corresponding to the currently displayed view of the three-dimensional environment. In some embodiments, the first position is within a region that is designated as private for the user of the computer system, and the second position is within a region that is designated as shared between the user of the computer system and the first user. In some embodiments, the respective user interface object is anchored in the three-dimensional environment and does not move in accordance with movement of the viewpoint of the currently displayed view of the three-dimensional environment. In some embodiments, the respective user interface object is anchored to the viewpoint (e.g., head-locked, or body-locked to the user) and move in accordance with movement of the viewpoint of the currently displayed view of the three-dimensional environment (e.g., as a result of the movement of the user's head wearing the first display generation component, or as a result of the movement of the user's hand holding the first display generation component, or as a result of the movement of the user as a whole in the physical environment, etc.). In some embodiments, the first position is a position that corresponds to the location of the user's hand, and the second position is a position that corresponds to a location away from the user's hand. In some embodiments, when the respective user interface object is displayed at the first position, the respective user interface object is locked to the location of the user's hand; and when the respective user interface object is displayed at the second position, the respective user interface object is locked to the three-dimensional environment and no longer moves in accordance with the movement of the user's hand. Displaying the respective user interface object, that includes the indication that the request has not been accepted, at the second position in the three-dimensional environment in response to detecting the user input that corresponds to the request to move the respective user interface object from the first position to the second position in the three-dimensional environment reduces the number of inputs needed to interact with the computer system while maintaining display of the respective user interface object (e.g., if the respective user interface object is displayed while the user is performing another task, the user can reposition the respective user interface object for easy access once the user finishes the previous task, without having to minimize or dismiss the respective user interface object). Reducing the number of inputs needed to perform an operation enhances the operability of the device, which, additionally, reduces power usage and improves battery life of the device by enabling the user to use the device more quickly and efficiently.

In some embodiments, while displaying at least the first portion of the background content (e.g., relative to at least the first user interface object) with the second level of visibility, the computer system detects a gaze input directed to the first portion of the background content. In response to detecting the gaze input directed to the first portion of the background content, and in accordance with a determination that the gaze input meets first preset criteria (e.g., is held within a threshold region for at least a threshold amount of time, is directed to a user interface object, etc.), the computer system restores the visibility of the at least the first portion of the background content to the first level of visibility. For example, in FIG. 7O, if the computer system detects a gaze input directed to the reduced visibility version of the virtual object 7322', or a portion of the representation 7004", 7006", 7008", 7002", etc. of the physical environment, the computer system, optionally, in accordance with a determination that the gaze input meets preset location or duration criteria, restores visibility of the background content or a portion thereof (e.g., all of the portions that have reduced visibility, or the portion that is under the gaze input, etc.), in accordance with some embodiments. Restoring the visibility of the at least the first portion of the background content to the first level of visibility in response to detecting the gaze input directed to the first portion of the background content provides additional control options without cluttering the UI with additional displayed controls (e.g., additional controls to control the level of visibility for the background). Providing additional control options without cluttering the UI with additional displayed controls enhances the operability of the device, which, additionally, reduces power usage and improves battery life of the device by enabling the user to use the device more quickly and efficiently.

In some embodiments, after the communication session with the first user is started, the computer system displays a control user interface object that corresponds to the communication session with the first user (e.g., concurrently with displaying a representation of the first user in the first view of the three-dimensional environment), wherein the control user interface object includes one or more affordances for displaying additional content related to the communication session (e.g., an affordance for displaying a message thread with the first user, an affordance for displaying photos or media content items related to the first user, an affordance for displaying other control parameters associated with the communication session, an affordance for terminating the current communication mode, and optionally select another communication mode, etc.). For example, in some embodiments, the user interface object 7333 in FIG. 7O represents a control user interface for the communication session that is displayed after the communication session is fully established and/or before the communication request is sent out. In some embodiments, the user interface object 7333 includes affordances for displaying additional content related to the communication session, in accordance with some embodiments. Displaying a control user interface object that includes one or more affordances for displaying additional content related to the communication session reduces the number of inputs needed to access the additional content related to the communication session (e.g., the user does not need to navigate away from the communication session in order to access the related content). Reducing the number of inputs needed to perform an operation enhances the operability of the device, which, additionally, reduces power usage and improves battery life of the device by enabling the user to use the device more quickly and efficiently.

In some embodiments, after the communication session with the first user is started, the computer system displays a control user interface object that corresponds to the communication session with the first user (e.g., concurrently with displaying a representation of the first user in the first view of the three-dimensional environment). In some embodiments, the control user interface object is a container object that includes a second set of user interface objects that corresponds to various functions related to the communication session with the first user. In some embodiments, the control user interface object optionally changes in appearance and constituents over time in response to different user input and events, and can be moved in the three-dimensional environment relative to the representation of the first user in response to user inputs. In some embodiments, the computer system ceases to display the control user interface object in response to detecting a user input that corresponds to a request to terminate the communication session with the first user, and/or a request to dismiss the control user interface object. In some embodiments, the control user interface object includes an affordance for terminating the communication session in the currently used communication mode, and activation of the affordance causes termination of the communication session. In some embodiments, after the control user interface object is displayed in the three-dimensional environment for at least a first preset amount of time, in accordance with a determination that a gaze input has not been detected in a region of the control user interface object in the three-dimensional environment for at least a second preset amount of time, the computer system reduces visibility of the control user interface object in the three-dimensional environment (e.g., by increasing a blur radius, darkening, reducing color saturation, etc. of the control user interface object). For example, in some embodiments, the user interface object 7333 in FIG. 7O represents a control user interface for the communication session that is displayed after the communication session is fully established (e.g., concurrently with a representation of the first user); and if the computer system has not detected the user's gaze at the user interface object 7333 for a period of time, the user interface object 7333 fades out leaving only the representation of the first user; and the user interface object 7333 is redisplayed with normal visibility when the user's gaze is detected at the last/current position of the user interface object 7333, in accordance with some embodiments. In some embodiments, the user interface objects include affordances for displaying additional content related to the communication session, in accordance with some embodiments. In some embodiments, when a gaze input is detected at the control user interface object within the second preset amount of time, the computer system does not reduce the visibility of the control user interface object. In some embodiments, when a gaze input is detected in the region of the control user interface object after the reduction of the control user interface object, the computer system restores the visibility of the control user interface object in the three-dimensional environment. In some embodiments, the computer system does not reduce the visibility of the representation of the first user during the communication session, even if a gaze input has not been detected at a region of the representation of the first user for at least the second amount of time. In some embodiments, the visibility of the representation of the first user is not reduced as much as the control user interface object, when a gaze input has not been detected at either the representation of the first user or the control user interface object. Reducing visibility of the control user interface object in the three-dimensional environment after the control user interface object is displayed for at least a first preset amount of time and in accordance with a determination that a gaze input has not been detected in a region of the control user interface object for at least a second preset amount of time provides improved visual feedback to the user (e.g., that the user has not directed a gaze input to the region of the control user interface object for at least the second preset amount of time). Providing improved feedback enhances the operability of the device, which, additionally, reduces power usage and improves battery life of the device by enabling the user to use the device more quickly and efficiently.

In some embodiments, displaying the control user interface object that corresponds to the communication session with the first user (e.g., concurrently with displaying a representation of the first user in the first view of the three-dimensional environment) includes, for at least a first period of time (e.g., initially, or after detection a gesture from the user sending the control user interface object from a position fixed to the user's hand to a position in the three-dimensional environment, etc.), displaying the control user interface object at a position in the three-dimensional environment that is anchored to the three-dimensional environment (e.g., anchored to a representation of a physical environment in the three-dimensional environment, fixed relative to a coordinate system of the three-dimensional environment) (e.g., independent of movement of the viewpoint of the currently displayed view of the three-dimensional environment, independent of movement of the user of the computer system in the physical environment that does not amount to a recognized request to reposition the control user interface object in the three-dimensional environment). For example, in some embodiments, the user interface object 7333 in FIG. 7O represents a control user interface for the communication session that is displayed after the communication session is fully established, and the control user interface object is anchored to the representation of the physical environment in the view of the three-dimensional environment 7104 (e.g., does not move in accordance with the movement of the viewpoint, the user's hand, head, or body). Displaying the control user interface object at a position in the three-dimensional environment that is anchored to the three-dimensional environment reduces the number of inputs needed to interact with the control user interface (e.g., the user can perform a different operation before interacting with the control user interface, without having to perform an additional gesture to redisplay the control user interface). Reducing the number of inputs needed to perform an operation enhances the operability of the device, which, additionally, reduces power usage and improves battery life of the device by enabling the user to use the device more quickly and efficiently.

In some embodiments, displaying the control user interface object that corresponds to the communication session with the first user (e.g., concurrently with displaying a representation of the first user in the first view of the three-dimensional environment) includes, for at least a second period of time (e.g., initially, or after detection a gesture from the user recalling the control user interface object a position in the three-dimensional environment back to a position fixed to the user's hand to a position in the three-dimensional environment, etc.), displaying the control user interface object at a position in the three-dimensional environment that is anchored to a position of a first portion of the user of the computer system (e.g., anchored to a representation of a hand or wrist of the user of the computer system in the three-dimensional environment) (e.g., independent of movement of the viewpoint of the currently displayed view of the three-dimensional environment). For example, in some embodiments, the user interface object 7333 in FIG. 7O represents a control user interface for the communication session that is displayed after the communication session is fully established, and the control user interface object is, optionally, anchored to the location of the user's hand and moves in accordance with the movement of the user's hand 7202, in some embodiments. Displaying the control user interface object at a position in the three-dimensional environment that is anchored to a position of a first portion of the user of the computer system reduces the number of inputs needed to interact with the control user interface (e.g., the user can perform a different operation before interacting with the control user interface, without having to perform an additional gesture to redisplay the control user interface). Reducing the number of inputs needed to perform an operation enhances the operability of the device, which, additionally, reduces power usage and improves battery life of the device by enabling the user to use the device more quickly and efficiently.

In some embodiments, while displaying the control user interface object that corresponds to the communication session with the first user (e.g., concurrently with displaying a representation of the first user in the first view of the three-dimensional environment), the computer system detects a user input that corresponds to a request to display additional information related to the communication session (e.g., detecting selection of an affordance in the control user interface object for displaying a message thread, displaying photos or videos, or session information, etc. for the communication session or first user). In response to detecting the user input that corresponds to the request to display the additional information related to the communication session, the computer system displays the additional information within the control user interface object (e.g., optionally, after expanding the control user interface object in the three-dimensional environment). For example, in some embodiments, the user interface object 7333 in FIG. 7O represents a control user interface for the communication session that is displayed after the communication session is fully established, and the control user interface object is expandable to display additional content (e.g., text messages, images, etc.) in response to user input, in accordance with some embodiments. In some embodiments, the additional information replaces some of the content and control affordances displayed in the control user interface object. In some embodiments, one or more additional windows are displayed to display the additional information, while the control user interface object is maintained in its original state. Displaying the additional information within the control user interface object in response to detecting the user input that corresponds to the request to display the additional information related to the communication session reduces the number of inputs needed to view the additional information (e.g., the user does not need to navigate away from the control user interface object in order to view the additional information, and does not need to perform an additional gesture to redisplay the control user interface object after viewing the additional information). Reducing the number of inputs needed to perform an operation enhances the operability of the device, which, additionally, reduces power usage and improves battery life of the device by enabling the user to use the device more quickly and efficiently.

In some embodiments, after the communication session with the first user is started, the computer system displays a first affordance (e.g., a "leave session" or "end call" affordance) for terminating the communication session (e.g., as part of the control user interface object that corresponds to the communication session with the first user, or separate from the control user interface object, etc.) (e.g., concurrently with displaying a representation of the first user in the first view of the three-dimensional environment), wherein activation of the first affordance causes the computer system to terminate the communication session with the first user. For example, in some embodiments, the user interface object 7333 or the user interface object 7324 in FIG. 7O represents a control user interface for the communication session that is displayed after the communication session is fully established, and the control user interface object includes an option to terminate the communication session, in accordance with some embodiments. In some embodiments, the first affordance is displayed at a position that is within the control user interface object. In some embodiments, the first affordance is displayed adjacent to the control user interface object. In some embodiments, the first affordance is anchored to the three-dimensional environment. In some embodiments, the first affordance is anchored to the viewpoint of the currently displayed view of the three-dimensional environment. In some embodiments, the first affordance is anchored to the field of view provided via the first display generation component. In some embodiments, the first affordance is displayed at a position that corresponds to the position of the hand of the user of the computer system. Displaying a first affordance for terminating the communication session after the communication session with the first user is started reduces the number of inputs needed to terminate the communication session (e.g., the user does not need to select a menu that includes the option to terminate the communication session). Reducing the number of inputs needed to perform an operation enhances the operability of the device, which, additionally, reduces power usage and improves battery life of the device by enabling the user to use the device more quickly and efficiently.

In some embodiments, after the communication session with the first user is started, displaying a second affordance (e.g., a "leave session" or "end call" affordance) for switching a currently used communication mode of the communication session (e.g., as part of the control user interface object that corresponds to the communication session with the first user, or separate from the control user interface object, etc.) (e.g., concurrently with displaying a representation of the first user in the first view of the three-dimensional environment), wherein activation of the second affordance causes the computer system to change a communication mode of the communication session with the first user from a first communication mode to a second communication mode different from the first communication mode. For example, in some embodiments, the user interface object 7333 or the user interface object 7324 in FIG. 7O represents a control user interface for the communication session that is displayed after the communication session is fully established, and the control user interface object includes an option to switch to a different communication mode from that used to establish the communication session, in accordance with some embodiments. In some embodiments, the second affordance is displayed at a position that is within the control user interface object. In some embodiments, the second affordance is displayed adjacent to the control user interface object. In some embodiments, the second affordance is anchored to the three-dimensional environment. In some embodiments, the second affordance is anchored to the viewpoint of the currently displayed view of the three-dimensional environment. In some embodiments, the second affordance is anchored to the field of view provided via the first display generation component. In some embodiments, the second affordance is displayed at a position that corresponds to the position of the hand of the user of the computer system. In some embodiments, the second affordance is displayed in a user interface object that is displayed in response to activation of a third affordance within the control user interface object. Displaying a second affordance for switching a currently used communication mode of the communication session after the communication session with the first user is started, wherein activation of the second affordance causes the computer system to change a communication mode of the communication session with the first user from a first communication mode to a second communication mode different from the first communication mode, reduces the number of inputs needed to establish a communication session with the first user using the second communication mode (e.g., the user does not need to terminate the communication session and establish a new communication session with the first user using the second communication mode). Reducing the number of inputs needed to perform an operation enhances the operability of the device, which, additionally, reduces power usage and improves battery life of the device by enabling the user to use the device more quickly and efficiently.

It should be understood that the particular order in which the operations in FIG. 11 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 12000, 13000, 14000, 15000, and 16000) are also applicable in an analogous manner to method 11000 described above with respect to FIG. 11. For example, the gestures, gaze inputs, physical objects, user interface objects, controls, movements, criteria, three-dimensional environment, display generation component, surface, representation of physical object, virtual objects, and/or animations described above with reference to method 11000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, 12000, 13000, 14000, 15000, and 16000). For brevity, these details are not repeated here.

Figure 12:
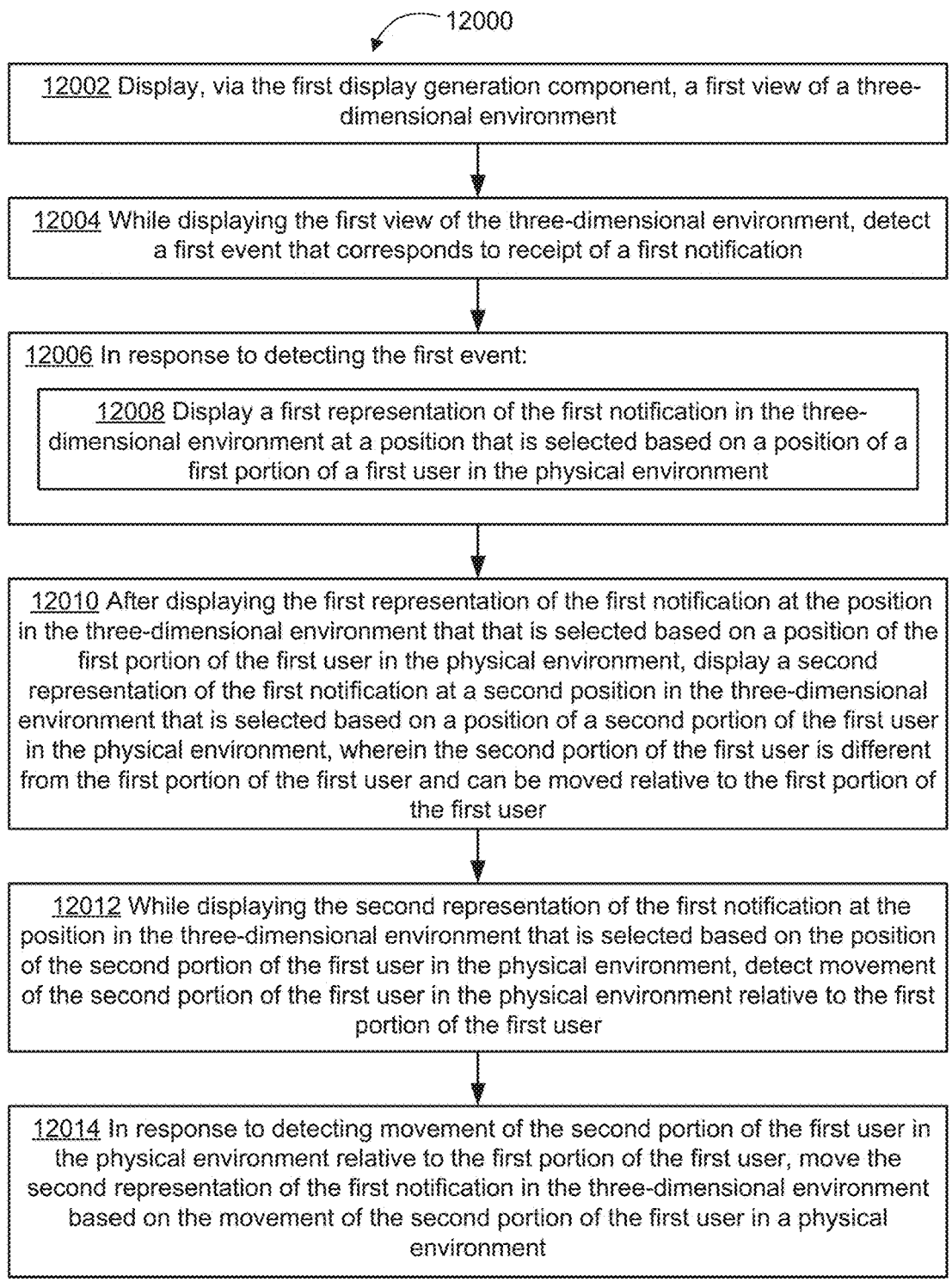
FIG. 12 is a flowchart of a method of displaying a representation of a notification before detecting direct user interaction with the notification, in accordance with some embodiments.

FIG. 12 is a flowchart of a method 12000 of displaying a representation of a notification before detecting direct user interaction with the notification, in accordance with some embodiments.

In some embodiments, the method 12000 is performed at a computer system (e.g., computer system 101 in FIG. 1) including a first display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 12000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 12000 are, optionally, combined and/or the order of some operations is, optionally, changed.

In some embodiments, the method 12000 is performed at a computer system (e.g., the computer system 101 in FIG. 1, the computer system 101 described with respect to FIGS. 7A-7D, FIGS. 7E-7F, FIGS. 7G-7H, FIGS. 7I-7M, FIGS. 7N-7O, FIGS. 7P-7S, FIGS. 7T-7U, and/or FIGS. 7V-7X, the first computer system 101-*t* described with respect to FIGS. 7V-7X, the second computer system described with respect to FIGS. 7V-7X, etc.). In some embodiments, the computer system is in communication with a first display generation component (e.g., the first display generation component is a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the first display generation component is a first display generation component 7100 described with respect to FIGS. 7A-7U and 7Y-7Z, a first display generation component 7100-*t* described with respect to FIGS. 7V-7X, a second display generation component described with respect to FIGS. 7V-7X, etc. In some embodiments, the computer system is an integrated device with one or more processors and memory enclosed in the same housing as the first display generation components and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the first display generation component and/or the one or more input devices. In some embodiments, the first display generation component and the one or more input devices are integrated and enclosed in the same housing. Many of the features of the method 12000 are described with respect to FIGS. 7P-7U, in accordance with some embodiments.

In the method 12000, the computer system displays (12002), via the first display generation component, a first view of a three-dimensional environment (e.g., a virtual three-dimensional environment, an augmented reality environment, a pass-through view of a physical environment, a camera view of a physical environment, etc.). As shown in FIGS. 7P-7S, the computer system displays a view of the three-dimensional environment 7104, in accordance with some embodiments. In some embodiments, the three-dimensional environment is a virtual three-dimensional environment without a representation of a physical environment. In some embodiments, the three-dimensional environment is a mixed reality environment that is a virtual environment that is augmented by sensor data corresponding to the physical environment. In some embodiments, the three-dimensional environment is an augmented reality environment that includes one or more virtual objects and a representation of at least a portion of a physical environment surrounding the first display generation component (e.g., a camera view or a view through a transparent or semitransparent portion of the first display generation component).

In the method 12000, while displaying the first view of the three-dimensional environment, the computer system detects (12004) a first event that corresponds to receipt of a first notification. In some embodiments, the first event corresponds to receipt of a notification or alert for an incoming request for establishing a communication session between a first user corresponding to the computer system (e.g., a first user that views the three-dimensional environment through the first display generation component and provides input to the computer system via the one or more input devices) and a second user different from the first user (e.g., a second user using a different computer system (e.g., a mobile device, a desktop computer, a head-mounted device, etc.) and that is, optionally, located in a different physical environment from the first user. In some embodiments, the first notification corresponds to other information or alert from the operating system or an application that requests the first user's attention, such as a notification from a shopping application that indicates delivery of a package, a notification from the operation system regarding a download or installation of a new app that has just been completed, a notification from the operating system indicating that the battery level of the first display generation component is low and require recharging soon, a notification from the operating system that a peripheral device of the computer system is requesting permission to connect with the computer system, a notification that a preset alarm or calendar reminder has gone off, a notification that an incoming call is received and requesting to be connected, etc. In some embodiments, the first event that corresponds to the receipt of the first notification is a system-generated event produced by the computer system in response to satisfaction of pre-established trigger conditions or in response to a request from another computer system or device, and is not a real-time response or feedback to a user input detected by the one or more input devices of the computer system.

In the method 12000, in response to detecting the first event (12006): the computer system displays (12008) a first representation of the first notification (e.g., a pop up banner, a user interface object including notification content, etc.) in the three-dimensional environment at a position that is selected based on a position of a first portion of a first user in the physical environment (e.g., notification is locked to the first portion of the first user (e.g., head, body, etc.), locked to a peripheral region of the user's field of view that moves as the user moves in the physical environment as a whole or turns his/her head, etc.)). As shown in FIGS. 7P-7Q, the first representation 7334 of the first notification is displayed at a position that is locked to the user's head or the user's torso, in accordance with some embodiments. In some embodiments, the first representation 7334 of the first notification remains in a fixed portion of the field of view (e.g., anchored to the viewpoint which has a virtual position that corresponds to the location and/or facing direction of the user's head or torso) and moves in accordance with the movement of the user's head or torso (e.g., while the movement changes the position and facing direction of the viewpoint), e.g., as shown in FIGS. 7P-7Q. In some embodiments, the first representation of the first notification is a notification that includes some information (e.g., application name, application icon, excerpt of message, nature of the first event, type of action requested from the first user, etc.) for the first user to determine whether to interact with the first notification to dispose of the first notification. In some embodiments, the computer system disposes of the first notification in response to the first user taking the requested action (e.g., rejecting a call, muting the alarm, snoozing the alert, etc.) while a currently displayed experience or application is ongoing and remains displayed, or in response to the first user launching a corresponding application or experience to fully engage with the application or experience through interaction with the first notification while suspending or terminating the currently displayed experience or application (e.g., pausing the current experience and joining a communication session, opening a calendar application to review details of an upcoming calendar event, etc.). In some embodiments, the first representation of the first notification is displayed with a first type of spatial relationship with the viewpoint of the currently displayed view of the three-dimensional environment (e.g., fixed relative to a preset portion of the field of view, fixed at a preset viewing depth from the viewpoint, etc.). In some embodiments, the first representation of the first notification is initially displayed in a preset peripheral portion of the currently displayed view of the three-dimensional environment and remains in the preset peripheral portion of the currently displayed view, rather than popping up in a central portion of the currently displayed view of the three-dimensional environment. In some embodiments, the first representation of the first notification enters the field of view in a manner that is less intrusive and disrupting as compared to a notification banner that pops up in the center of the user's field of view and blocks the content that the first user is currently viewing. In some embodiments, the first representation notification enters the field of view from a peripheral region of the field of view and optionally moves along a path in the peripheral region of the field of view (e.g., from a larger viewing depth to a smaller viewing depth, from the top edge to the middle portion of the left edge, from the lower left corner to the middle portion of the left edge, etc.).

In the method 12000, after displaying the first representation of the first notification at the position in the three-dimensional environment that is selected based on a position of the first portion of the first user in the physical environment (e.g., without detecting direct user interaction with the first representation of the first notification (e.g., without detecting a gaze input, without detecting a gaze input that meets a dwell time threshold, without detecting a gesture input, a voice command, a selection input, etc. directed to the first representation that meets interaction criteria (e.g., without detecting user input that corresponds to a request to open a corresponding application, dismiss the notification, or reposition the notification, etc.), etc.)), the computer system displays (12010) a second representation of the first notification (e.g., a reduced version of the first representation, a generic indicator used for different notifications, an indicator with reduced notification content as compared to the first representation of the first notification, etc.) at a second position in the three-dimensional environment that is selected based on a position of a second portion of the first user in the physical environment (e.g., the position of the user's hand, the position of the user's wrist, etc.), wherein the second portion of the first user is different from the first portion of the first user and can be moved relative to the first portion of the first user. As shown in FIG. 7Q, after the first representation 7334 has been displayed at the position that is selected based on the position of the user's head or torso in the physical environment, the computer system switches to displaying a second representation 7338 of the first notification at a position that is selected based on the position of the user's hand 7202 in the physical environment (e.g., in FIG. 7R following FIG. 7Q), in accordance with some embodiments.

In the method 12000, while displaying the second representation of the first notification at the position in the three dimensional environment that is selected based on the position of the second portion of the first user in the physical environment, the computer system detects (12012) movement of the second portion of the first user in the physical environment (e.g., absolute movement of the second portion of the first user relative to the physical environment) relative to the first portion of the first user (e.g., movement of the user's hand or wrist in the physical environment that is relative to the user's torso or head). In response to detecting movement of the second portion of the first user in the physical environment relative to the first portion of the first user (e.g., as opposed to relative movement between the second portion and the first portion of the first user that is caused solely by the movement of the first portion of the first user in the physical environment), the computer system moves (12014) the second representation of the first notification in the three-dimensional environment based on the movement of the second portion of the first user in the physical environment. For example, as shown in FIGS. 7R-7S, the computer system detects the movement of the user's hand 7202 in the physical environment, while the second representation 7338 is displayed at the position that is selected based on the position of the user's hand 7202, in accordance with some embodiments; and in response to the movement of the hand 7202 relative to the user's head or torso, the computer system moves the second representation 7338 based on the movement of the user's hand 7202 such that the second representation 7338 of the first notification maintains a fixed spatial relationship with the representation 7202' of the user's hand 7202, while the representation 7202' is within the field of view provided by the first display generation component, in accordance with some embodiments. For example, in some embodiments, the position of the second representation of the first notification is locked to and moves in accordance with the changing position of the representation of the second portion of the first user when the representation of the second portion of the first user moves within the currently displayed view of the three-dimensional environment. In some embodiments, the position of the second representation of the first notification is locked to an edge portion of the field of view that is selected based on its closer proximity to the position of the second portion of the first user in the physical environment when the representation of the second portion of the first user is outside of the currently displayed view of the three-dimensional environment. Displaying a first representation of a notification at a first position that is selected based on a position of a first portion of the user, and then displaying a second representation of the notification at a second position that is selected based on the position of a second portion of the user, provides improved visual feedback to the user (e.g., by drawing attention to the arrival of the notification at one position, and then moving the representation to another position to reduce distraction to the user). Providing improved feedback enhances the operability of the device, which, additionally, reduces power usage and improves battery life of the device by enabling the user to use the device more quickly and efficiently.

In some embodiments, the first representation of the first notification (e.g., the first representation 7334 of the first notification in FIGS. 7P-7Q) is different from the second representation of the first notification (e.g., the second representation 7338 of the first notification in FIGS. 7R-7S). In some embodiments, the first representation of the first notification includes more notification content than the second representation of the first notification. In some embodiments, the first representation of the first notification has a larger size than the second representation of the first notification. In some embodiments, the first representation of the first notification is displayed with a higher level of visibility than the second representation of the first notification. In some embodiments, the first representation of the first notification has an application-specific appearance, and the second representation of the first notification has a generic appearance that is not application-specific. In some embodiments, the computer system displays a visual indication or provides an audio or haptic indication to mark the transition from displaying the first representation of the first notification to displaying the second representation of the first notification. In some embodiments, the computer system automatically displays an animated transition that shows movement and transformation of the displayed representation of the first notification, e.g., from the first representation displayed at the position selected based on the position of the first portion of the first user to the second representation displayed at the position selected based on the position of the second portion of the first user. In some embodiments, the movement of the displayed representation of the first notification is in a peripheral region of the field of view to reduce distraction to the first user before the first user directly interacts with the currently displayed representation the first notification. Displaying a second representation of the first notification that is different from the first representation of the first notification provides improved visual feedback to the user (e.g., because the first and second representations are different, the user can easily distinguish newer notifications from older notifications). Providing improved feedback enhances the operability of the device, which, additionally, reduces power usage and improves battery life of the device by enabling the user to use the device more quickly and efficiently.

In some embodiments, the first representation of the first notification is the same as the second representation of the first notification. For example, in some embodiments, the second representation 7338 shown in FIGS. 7R-7S is optionally replaced by the first representation 7334 shown in FIGS. 7P-7Q, such that visually the representation of the first notification has not changed, even though position of the representation is initially selected based on the position of the user's head or torso, and later selected based on the position of the user's hand or wrist. In some embodiments, the first representation of the first notification and the second representation of the first notification have the same appearance but have different movement behaviors relative to the different portions of the first user. For example, the first representation of the first notification does not move in accordance with movement of the second portion of the first user in the physical environment relative to the first portion of the first user, but moves in accordance with the movement of the first portion of the first user relative to the physical environment (e.g., irrespective of whether the second portion of the first user moves relative to the physical environment); in contrast, the second representation of the first notification moves in accordance with movement of the second portion of the first user in the physical environment relative to the first portion of the first user, but does not moves in accordance with the movement of the first portion of the first user relative to the physical environment if the second portion of the first user does not moves relative to the physical environment. In some embodiments, the computer system displays a visual indication or provides an audio or haptic indication to mark the transition from displaying the first representation of the first notification to displaying the second representation of the first notification. In some embodiments, the computer system automatically moves the displayed representation of the first notification, e.g., from the position selected based on the position of the first portion of the first user to the position selected based on the position of the second portion of the first user, as the visual indication for the transition from displaying the first representation of the first notification to displaying the second representation of the first notification. In some embodiments, the movement of the displayed representation of the first notification is in a peripheral region of the field of view to reduce distraction to the first user. Displaying a second representation of the first notification that is the same as the first representation of the first notification provides improved visual feedback to the user (e.g., because the first and second representations are the same, the user can easily identify the second representation at the second location). Providing improved feedback enhances the operability of the device, which, additionally, reduces power usage and improves battery life of the device by enabling the user to use the device more quickly and efficiently.

In some embodiments, while displaying the first representation of the first notification at the position in the three-dimensional environment that is selected based on the position of the first portion of the first user in the physical environment, the computer system detects first movement of the first portion of the first user in the physical environment (e.g., movement of the first user as a whole, movement of the head of the first user, etc.). In response to detecting the first movement of the first portion of the first user in the physical environment, the computer system updates the position of the first representation of the first notification in a currently displayed view of the three-dimensional environment (e.g., moving the first representation in the three-dimensional environment, moving the first representation relative to a representation to a physical environment in an augmented reality environment or relative to a virtual three-dimensional environment, etc.) in accordance with the first movement of the first portion of the first user in the physical environment. For example, as shown in FIGS. 7P-7Q, while the first representation 7334 of the first notification is displayed, movement of the user's head or torso moves the viewpoint of the currently displayed view of the three-dimensional environment 7104, and the compute system moves the first representation 7334 of the first notification in accordance with the movement of the user's head or torso to maintain the spatial relationship between the first representation 7334 of the first notification and the virtual position of the user's face or torso (e.g., a position that, optionally, corresponds to the position of the viewpoint), in accordance with some embodiments. In some embodiments, in response to detecting the first movement of the first portion of the first user in the physical environment, the computer system updates the currently displayed view of the three-dimensional environment in accordance with movement of a viewpoint of the currently displayed view of the three-dimensional environment, wherein the movement of the viewpoint of the currently displayed view of the three-dimensional environment corresponds to the movement of the first portion of the first user in the physical environment. In some embodiments, the displayed position of the first representation of the first notification in the field of view remains substantially unchanged when the viewpoint of the currently displayed view is moved forward, backward, leftward, rightward, clockwise, counterclockwise, etc. in the three-dimensional environment in response to the movement of the first portion of the first user in the physical environment (e.g., forward, backward, leftward, rightward, clockwise, counterclockwise, etc.). In some embodiments, the displayed depth of the first representation of the first notification in the field of view remains substantially unchanged relative to the viewpoint of the currently displayed view when the viewpoint of the currently displayed view is moved forward, backward, leftward, rightward, clockwise, counterclockwise, etc. in the three-dimensional environment in response to the movement of the first portion of the first user in the physical environment (e.g., forward, backward, leftward, rightward, clockwise, counterclockwise, etc.). In some embodiments, the displayed position of the first representation of the first notification in the field of view remains substantially unchanged in response to the movement of the first portion of the first user in the physical environment (e.g., forward, backward, leftward, rightward, clockwise, counterclockwise, etc.). Updating the position of the first representation of the first notification in accordance with the first movement of the first portion of the first user in the physical environment, in response to detecting the first movement of the first portion of the first user in the physical environment performs an operation (e.g., updating the position of the first representation of the first notification) when a set of conditions has been met (e.g., the first portion of the first user has moved) without requiring further user input (e.g., additional inputs to update the position of the first representation of the first notification after the first portion of the first user has moved). Performing an operation when a set of conditions has been met without requiring further user input enhances the operability of the device, which, additionally, reduces power usage and improves battery life of the device by enabling the user to use the device more quickly and efficiently.

In some embodiments, while displaying the first representation of the first notification at the position in the three-dimensional environment that is selected based on the position of the first portion of the first user in the physical environment, the computer system detects second movement of the second portion of the first user in the physical environment relative to the first portion of the first user (e.g., without detecting the movement of the first portion of the first user in the physical environment (e.g., movement of the first user as a whole, movement of the head of the first user, etc.)). In response to detecting the second movement of the second portion of the first user in the physical environment relative to the first portion of the first user, the computer system maintains the position of the first representation of the first notification in a currently displayed view of the three-dimensional environment (e.g., forgoing moving the first representation in the three-dimensional environment, forgoing moving the first representation relative to a representation of a physical environment in an augmented reality environment or relative to a virtual three-dimensional environment, etc.) (e.g., maintaining the position of the first representation of the first notification irrespective to the second movement of the second portion of the first user that is not accompanied by a movement of the first portion of the first user in the physical environment). For example, in FIG. 7P, when the first representation 7334 of the first notification is displayed at a position that is anchored to or selected based on the position of the user's head or torso, the computer system does not move the first representation 7334 of the first notification in accordance with the movement of the user's hand 7202 relative to the user's head or torso, in accordance with some embodiments. For example, in some embodiments, when the second portion of the first user moves in the physical environment relative to the first portion of the first user, the first representation of the first notification may move in the three-dimensional environment in accordance with concurrently movement of the first portion of the first user, but the movement of the first representation of the first notification is independent of the movement of the second portion of the first user in the physical environment relative to the first portion of the first user. For example, the second portion of the first user includes a hand or wrist of the first user, and the user may raise his/her hand (e.g., relative to the first user's body or head) toward a location in the physical environment that corresponds to the position of the first representation of the first notification to interact with the first notification, in accordance with some embodiments. Maintaining the position of the first representation of the first notification in a currently displayed view of the three-dimensional environment in response to detecting the second movement of the second portion of the first user in the physical environment relative to the first portion of the first user reduces the number of inputs needed to interact with the first representation of the first notification (e.g., the user does not need to perform an additional input to reposition the first representation of the first notification after the computer system detects movement of the second portion of the first user). Performing an operation when a set of conditions has been met without requiring further user input enhances the operability of the device, which, additionally, reduces power usage and improves battery life of the device by enabling the user to use the device more quickly and efficiently.

In some embodiments, while displaying the second representation of the first notification at the position in the three-dimensional environment that is selected based on the position of the second portion of the first user in the physical environment (e.g., while displaying the second representation at or near the representation of the hand or wrist of the first user in the currently displayed view of the three-dimensional environment, or at or near an edge portion of the field of view that is proximate to the position of the hand or wrist of the first user in the physical environment, etc.), the computer system detects third movement of the first portion of the first user in the physical environment (e.g., movement of the first user as a whole, movement of the head of the first user, etc.) without detecting movement of the second portion of the first user in the physical environment (e.g., when the second portion of the first user is kept stationary in the physical environment (e.g., moved relative to the first portion of the first user), or the movement of the second portion of the first user is outside of a detection range (e.g., hands are not raised, hands are behind the user's back, etc.), etc.). In response to detecting the third movement of the first portion of the first user in the physical environment, the computer system maintains the position of the second representation of the first notification in a currently displayed view of the three-dimensional environment (e.g., at the position selected in accordance with the position of the second portion of the first user in the physical environment (e.g., at or next to the representation of the user's hand or wrist, at an edge portion of the field of view proximate to the position of the user's hand or wrist, etc.)) (e.g., irrespective of the movement of the first portion of the first user in the physical environment). For example, in FIG. 7R, while the second representation 7338 of the first notification is displayed at the position that is selected based on the location of the user's hand 7202, if the computer system detects movement of the user's head or torso, but not the movement of the user's hand 7202 in the physical environment, the computer system continues to display the second representation 7338 of the first notification at the position at or proximate to the location of the user's hand 7202, even though the view of the three-dimensional environment changes in accordance with the movement of the viewpoint caused by the movement of the user's head or torso, in accordance with some embodiments. In some embodiments, in response to detecting the third movement of the first portion of the first user in the physical environment, the computer system updates the currently displayed view of the three-dimensional environment in accordance with movement of a viewpoint of the currently displayed view of the three-dimensional environment, wherein the movement of the viewpoint of the currently displayed view of the three-dimensional environment in the three-dimensional environment corresponds to the movement of the first portion of the first user in the physical environment. In some embodiments, the displayed position of the second representation of the first notification in the field of view changes to remain at the position that is selected in accordance with the current position of the second portion of the first user in the physical environment. In some embodiments, the displayed depth of the second representation of the first notification in the field of view may change relative to the viewpoint of the currently displayed view when the viewpoint of the currently displayed view is moved forward, backward, leftward, rightward, clockwise, counterclockwise, etc. in the three-dimensional environment in response to the movement of the first portion of the first user in the physical environment (e.g., forward, backward, leftward, rightward, clockwise, counterclockwise, etc.). Maintaining the position of the second representation of the first notification in a currently displayed view of the three-dimensional environment in response to detecting the third movement of the first portion of the first user in the physical environment reduces the number of inputs needed to interact with the second representation of the first notification (e.g., the user does not need to perform an additional input to reposition the first representation of the first notification after the computer system detects movement of the second portion of the first user). Performing an operation when a set of conditions has been met without requiring further user input enhances the operability of the device, which, additionally, reduces power usage and improves battery life of the device by enabling the user to use the device more quickly and efficiently.

In some embodiments, displaying the first representation of the first notification in the three-dimensional environment at the position that is selected based on the position of the first portion of the first user in the physical environment includes displaying the first representation of the first notification in a peripheral portion of a field of view (e.g., a top edge portion, a left edge portion, a top left corner, etc.) provided via the first display generation component. For example, as shown in FIG. 7P, the first representation 7334 of the first notification is displayed in an upper left corner of the field of view provided by the first display generation component, as opposed to the middle of the first display generation component; and as the viewpoint changes due to movement of the user's head or torso, the first representation 7334 remains displayed in the upper left corner of the field of view, in accordance with some embodiments. In some embodiments, the first representation of the first notification remains substantially stationary in the peripheral portion of the field of view for a first preset period of time after the initial display of the first representation of the first notification. In some embodiments, the first representation of the first notification does not enter a central portion of the field of view provided via the first display generation component unless a user input that corresponds to a direct interaction with the first representation of the first notification is received via the one or more input devices during the first preset period of time. In some embodiments, the computer system transitions to display the second representation of the first notification if the computer system has not detected a user input that corresponds to a direct interaction with the first representation of the first notification during the first preset period of time. Displaying the first representation of the first notification in a peripheral portion of a field of view provided via the first display generation component provides improved visual feedback to the user (e.g., provides visual feedback without cluttering the non-peripheral regions of the field of view). Providing improved feedback enhances the operability of the device, which, additionally, reduces power usage and improves battery life of the device by enabling the user to use the device more quickly and efficiently.

In some embodiments, the computer system displays transformation of the first representation of the first notification into the second representation of the first notification and movement of the second representation of the first notification to the position in the three-dimensional environment that is selected based on the position of the second portion of the first user in the physical environment. For example, as shown in FIG. 7Q-7R, the computer system displays an animated transition showing the first representation 7334 transforming into the second representation 7338 and moving along the path 7335 to the position that is selected based on the position of the user's hand 7202, in accordance with some embodiments. In some embodiments, the first representation of the first notification is a notification window or user interface object that includes notification content of the first notification, and the second representation of the first notification is a reduced indicator without notification content (e.g., geometric shape such as a circle, a dot, or another indicia of an application that generated the first notification, etc.) after the first representation of the first notification has been displayed in the three-dimensional environment at the position that is selected based on the position of the first portion of the first user for a first preset period of time without being actively disposed of by the first user. In some embodiments, after the first representation of the first notification has been displayed in the three-dimensional environment at the position that is selected based on the position of the first portion of the first user for a first preset period of time without being actively disposed of by the first user, the computer system displays an animated transition showing the first representation of the first notification reduces into the second representation of the first notification, while moving toward the position that is selected based on the position of the second portion of the first user (e.g., toward the representation of the user's hand or wrist visible in the currently displayed view of the three-dimensional environment, or toward an edge portion of the field of view that is selected based on its closer proximity to the position of the user's hand or wrist that is not current within the field of view, etc.). In some embodiments, the path of the representation of the first notification (e.g., an intermediate representation or the second representation of the first notification) to the position that is selected based on the position of the second portion of the first user remains within a peripheral portion of the field of view provided via the first display generation component. In some embodiments, the second representation of the first notification remains displayed at the position that is selected and contiguously updated based on the position of the second portion of the first user for a preset second period of time before automatically ceases to be displayed. In some embodiments, the second representation of the first notification remains displayed at the position that is selected and contiguously updated based on the position of the second portion of the first user (e.g., for at least a preset second period of time, for no more than the preset second period of time, etc.) until a user input that corresponds to a direct interaction with the second representation of the first notification (e.g., shaking the hand to dismissal the first notification, turning the hand to view the details of the first notification, etc.) is detected via the input devices of the computer system. Transforming the first representation of the first notification into the second representation of the first notification, and moving the second representation to the position selected based on the position of the second portion of the first user in the physical environment provides improved visual feedback to the user (e.g., that a certain amount of time has passed since the first representation of the first notification was initially displayed). Providing improved feedback enhances the operability of the device, which, additionally, reduces power usage and improves battery life of the device by enabling the user to use the device more quickly and efficiently.

In some embodiments, while displaying the second representation of the first notification in the three-dimensional environment at the position that is selected based on the position of the second portion of the first user (e.g., user's hand or wrist) in the physical environment (or, optionally, while displaying the first representation of the first notification at the position that is selected based on the position of the first portion of the first user), the computer system detects movement of a hand of the first user in the physical environment (e.g., translation or rotation of the hand as a whole, opening or closing the hand, moving one portion of the hand relative to another portion of the hand, etc.). In response to detecting the movement of the hand of the first user in the physical environment: in accordance with a determination that the movement of the hand of the first user in the physical environment meets first preset criteria (e.g., criteria for detecting rotation of the hand to face a preset side of the hand toward the user's face, criteria for detecting hand opening with a preset side of the hand facing toward the user's face, criteria for detecting palm of the hand moving toward the user's face, criteria for detecting the user's hand raising from a position outside of the field of view to a position within the field of view, etc.), the computer system displays a third representation of the first notification at a position in the three-dimensional environment that corresponds to a position of the hand of the first user. For example, in FIG. 7R, while the second representation 7338 of the first notification is displayed, if the computer system detects the user's hand 7202 meets preset criteria (e.g., opens or turns toward the user's face, etc.), the computer system, optionally, ceases to display the second representation 7338 of the first notification, and displays the representation 7334 or an expanded version of the representation 7334 with notification content at the position that corresponds to the location of the user's hand, in accordance with some embodiments. This is also illustrated in FIG. 7T following FIG. 7S, where, in response to detecting the movement 7340 of the hand in conjunction with the gaze input 7220 directed to the region that corresponds to the user's hand 7202, the computer system displays a third representation 7336 of the first notification at the position that corresponds to the location of the user's hand 7202, in accordance with some embodiments. In some embodiments, the third representation of the first notification is a user interface object that includes notification content and optionally one or more controls and affordances for accepting user inputs that responds to the requests specified in the first notification (e.g., controls for displaying an application corresponding to the notification, replying to a message corresponding to the notification, configuring how a communication session corresponding to the notification is to be established, etc.). In some embodiments, the computer system ceases to display the second representation of the first notification in response to the movement of the hand of the first user meeting the preset first criteria. In some embodiments, the computer system detects movement of the hand of the first user while displaying the third representation of the first notification, and moves the third representation of the first notification in the three-dimensional environment in accordance with the movement of the hand of the first user in the physical environment. In some embodiments, the computer system displays, via the first display generation component, a representation of the hand of the first user in the currently displayed view of the three-dimensional environment when the movement of the hand of the first user meets the first preset criteria, and the third presentation of the first notification is displayed overlaying, replacing display of, or blocking a view of at least a portion of the representation of the hand of the first user (e.g., the third representation of the first notification is projected onto the hand and viewed through a transparent portion of the first display generation component, the third representation of the first notification replaces display of a camera view of the hand displayed by the first display generation component, the third representation of the first notification displayed by the first display generation component blocks the view of the hand through a transparent portion of the first display generation component, etc.) in accordance with the determination that the movement of the hand of the first user has met the first preset criteria. In some embodiments, in response to detecting the movement of the hand of the first user in the physical environment: in accordance with a determination that the movement of the hand of the first user does not meet the first preset criteria, the computer system does not display the third representation of the first notification, and optionally, updates the position of the second representation of the first notification in accordance with the movement of the hand of the first user (e.g., when the second portion of the first user also moved with the hand, or when the second portion of the first user is the hand of the first user). Displaying a third representation of the first notification at a position in the three-dimensional environment that corresponds to a position of the hand of the first user in accordance with a determination that the movement of the hand of the first user meets first preset criteria reduces the number of inputs needed to display a representation of the first notification (e.g., the third representation of the first notification) at a position of the user's hand (e.g., the user does not need to perform any additional inputs to locate and/or move a representation of the first notification to the position of the user's hand). Reducing the number of inputs needed to perform an operation enhances the operability of the device, which, additionally, reduces power usage and improves battery life of the device by enabling the user to use the device more quickly and efficiently.

In some embodiments, the first preset criteria require that the movement of the hand of the first user (e.g., movement that forms a preset hand posture or state, movement toward the user's face, etc.) is detected in conjunction with a first gaze input being directed to a preset position in the three-dimensional environment (e.g., a position of the first representation while the first representation is displayed, a position of the second representation while the second representation is displayed, a position that corresponds to the hand of the first user while the first representation of the first notification or the second representation of the first notification is displayed, etc.) in order for the first criteria to be met. In response to detecting the movement of the hand of the first user in the physical environment: in accordance with a determination that the movement of the hand of the first user in the physical environment fails to meet the first criteria due to absence of the first gaze input directed to the preset position in the three-dimensional environment (e.g., the position of the first representation while the first representation is displayed, the position of the second representation while the second representation is displayed, the position that corresponds to the hand of the first user while the first representation of the first notification or the second representation of the first notification is displayed, etc.), the computer system provides visual feedback indicating a requirement of the first gaze input at a position in the three-dimensional environment that corresponds to the hand of the first user (e.g., the second representation of the first notification is animated at or near the representation of the hand of the first user, a textual prompt is displayed at or near the representation of the hand of the first user, etc.). For example, in FIG. 7R, while the second representation 7338 of the first notification is displayed, if the computer system detects the user's hand 7202 opens or turns toward the user's face, etc., the computer system, optionally, in accordance with a determination that a gaze input is not detected in a region that corresponds to the location of the user's hand, displays a visual prompt and/or spatial audio alert to draw the user's gaze toward the region of the user's hand, in accordance with some embodiments. In some embodiments, when the gaze input is directed to the region of the user's hand in conjunction with the hand making the required movement, the computer system, optionally, ceases to display the second representation 7338 of the first notification, and displays a representation of the notification that includes notification content at the position that corresponds to the location of the user's hand (e.g., as shown in FIG. 7T), in accordance with some embodiments. Providing visual feedback indicating a requirement of the first gaze input in accordance with a determination that the movement of the hand of the first user fails to meet first criteria due to absence of the first gaze input direct to the preset position in the three-dimensional environment provides improved visual feedback to the user (e.g., that the movement of the user's hand fails to meet first criteria, and more specifically that the first gaze input directed to the preset position in the three-dimensional environment was not detected). Providing improved feedback enhances the operability of the device, which, additionally, reduces power usage and improves battery life of the device by enabling the user to use the device more quickly and efficiently.

In some embodiments, the first preset criteria require that the movement of the hand of the first user (e.g., movement that forms a preset hand posture or state, movement toward the user's face, etc.) is detected in conjunction with a first gaze input being directed to a preset position in the three-dimensional environment (e.g., a position of the first representation while the first representation is displayed, a position of the second representation while the second representation is displayed, a position that corresponds to the hand of the first user while the first representation of the first notification or the second representation of the first notification is displayed, etc.) for at least a first threshold amount of time (e.g., 50 ms, 100 ms, etc.) in order for the first criteria to be met. In response to detecting the movement of the hand of the first user in the physical environment: in accordance with a determination that the first criteria are not met due to the first gaze input not being held within a threshold range of the preset position in the three-dimensional environment (e.g., the position of the first representation while the first representation is displayed, the position of the second representation while the second representation is displayed, the position that corresponds to the hand of the first user while the first representation of the first notification or the second representation of the first notification is displayed, etc.) for at least the first threshold amount of time (e.g., even if the movement of the hand of the first user meets the hand movement and/or hand posture requirement imposed by the first preset criteria), the computer system forgoes display of the third representation of the first notification. For example, in FIG. 7R, while the second representation 7338 of the first notification is displayed, if the computer system detects the user's hand 7202 opens or turns toward the user's face, etc., the computer system, optionally, in accordance with a determination that a gaze input has not been detected in a region that corresponds to the location of the user's hand for at least a first threshold amount of time that is greater than the gaze detection time threshold, maintains display of the second representation 7338 of the first notification; and the computer system, in accordance with a determination that a gaze input has been detected in the region that corresponds to the location of the user's hand for at least the first threshold amount of time, ceases to display the second representation 7338 of the first notification and displays a representation of the notification (e.g., third representation 7336 in FIG. 7T) that includes notification content at the position that corresponds to the location of the user's hand (e.g., as shown in FIG. 7T), in accordance with some embodiments. Forgoing display of the third representation of the first notification in accordance with a determination that the first criteria are not met due to the first gaze input not being held within a threshold range of the preset position in the three-dimensional environment for at least the first threshold amount of time provides additional control options without cluttering the UI with additional displayed controls (e.g., additional controls for ceasing to display the third representation of the first notification if the user accidentally or unintentionally causes display of the third representation). Providing additional control options without cluttering the UI with additional displayed controls enhances the operability of the device, which, additionally, reduces power usage and improves battery life of the device by enabling the user to use the device more quickly and efficiently.

In some embodiments, the first preset criteria require that the movement of the hand of the first user includes turning a palm of the hand of the first user toward a preset direction (e.g., a direction corresponding to the face of the first user, upward, etc.) in order for the first criteria to be met. This is also illustrated in FIG. 7T following FIG. 7S, for example, where, in response to detecting the movement 7340 of the hand (e.g., turning the palm of the hand toward the user's face), the computer system displays a third representation 7336 of the first notification at the position that corresponds to the location of the user's hand 7202, in accordance with some embodiments. Requiring movement of the hand of the first user include turning a palm of the hand of the first user toward a preset direction in order for the first criteria to be met provides additional control options without cluttering the UI with additional displayed controls (e.g., the movement of the user's palm, rather than additional displayed controls, determines whether or not the first criteria are met). Providing additional control options without cluttering the UI with additional displayed controls enhances the operability of the device, which, additionally, reduces power usage and improves battery life of the device by enabling the user to use the device more quickly and efficiently.

In some embodiments, while displaying a respective representation of the first notification (e.g., the first representation, the second representation, etc. of the first notification) in the three-dimensional environment, the computer system detects a gaze input directed to a region in the three-dimensional environment that corresponds to the respective representation of the first notification. In response to detecting the gaze input directed to the region in the three-dimensional environment that corresponds to the respective representation of the first notification, the computer system changes one or more display properties of the respective representation of the first notification in a currently displayed view of the three-dimensional environment (e.g., animating the respective representation of the first notification, moving the respective representation of the first notification toward the viewpoint, enlarging or highlighting the respective representation of the first notification, changing the color of the respective representation of the first notification, etc.). For example, in FIG. 7P, if the computer system detects a gaze input directed to the first representation 7334 of the first notification, the computer system, optionally, changes the appearance of the first representation 7334 (e.g., move the representation 7334 closer to the viewpoint, enlarging the representation 7334, etc.) to indicate that the gaze input is directed to it, in accordance with some embodiments. In another example, in FIG. 7R, if the computer system detects a gaze input directed to the second representation 7336 of the first notification, the computer system, optionally, changes the appearance of the second representation 7336 (e.g., animating the representation 7336, enlarging the representation 7336, etc.) to indicate that the gaze input is directed to it, in accordance with some embodiments. In some embodiments, the computer system, in response to detecting that the gaze input ceases to be directed to the region in the three-dimensional environment that corresponds to the respective representation of the first notification, reverts the changes made to the one or more display properties of the respective representation of the first notification in the currently displayed view of the three-dimensional environment. In some embodiments, the computer system makes the changes to the one or more display properties of the respective representation of the first notification before the gaze input is held within the region corresponding to the respective representation of the first notification for a first threshold amount of time. In some embodiments, the computer system makes the changes to the one or more display properties of the respective representation of the first notification after the gaze input is held within the region corresponding to the respective representation of the first notification for at least a first threshold amount of time. In some embodiments, the respective representation includes the second representation and not the first representation of the first notification. In some embodiments, the respective representation includes either one of the second representation and the first representation of the first notification. In some embodiments, the respective representation includes the first representation and not the second representation of the first notification. Changing one or more display properties of the respective representation of the first notification in response to detecting the gaze input directed to the region in the three dimensional environment that corresponds to the respective representation of the first notification provides improved visual feedback to the user (e.g., that the computer system has detected the user's gaze input directed to the region in the three-dimensional environment that corresponds to the respective representation of the first notification). Providing improved feedback enhances the operability of the device, which, additionally, reduces power usage and improves battery life of the device by enabling the user to use the device more quickly and efficiently.

In some embodiments, while displaying a respective representation of the first notification (e.g., the first representation, the second representation, the third representation of the first notification, etc.) in the three-dimensional environment, the computer system detects a first gesture (e.g., an in-air hand gesture, a gesture that includes movement of a first portion of a hand of the first user relative to another portion of the hand of the first user, a touch gesture on a touch-sensitive surface, etc.) performed by a hand of the first user (e.g., the hand that is or is adjacent to the second portion of the first user, a hand that is separate from the second portion of the first user, etc.) in conjunction with a gaze input directed to a region in the three-dimensional environment that corresponds to the respective representation of the first notification. In response to detecting the first gesture in conjunction with the gaze input directed to the region in the three-dimensional environment that corresponds to the respective representation of the first notification: in accordance with a determination that the first gesture and the gaze input meet activation criteria, the computer system performs an operation in the three-dimensional environment corresponding to the first notification in accordance with the first gesture (e.g., displaying an application corresponding to the first notification, displaying a user interface that is configured to capture further user input to compose a reply in response to the notification content of the first notification, performing an action that is requested in the first notification, etc.), and dismisses the first notification (e.g., ceasing to display the first notification or any representation thereof). For example, the computer system, optionally, performs an operation that corresponds to the first notification and dismisses the first notification while a respective representation (e.g., first representation 7334 in FIG. 7P, second representation 7338 in FIG. 7R, third representation 7336 in FIG. 7T, etc.) is displayed in the three-dimensional environment, in response to a combination of a gaze input directed to the respective representation of the first notification and a preset hand gesture from the user, in accordance with some embodiments. In some embodiments, the respective representation includes the second representation and not the first representation of the first notification. In some embodiments, the respective representation includes either one of the second representation and the first representation of the first notification. In some embodiments, the respective representation includes the first representation and not the second representation of the first notification. Performing an operation in the three-dimensional environment corresponding to the first gesture, and dismissing the first notification, in accordance with a determination that the first gesture and the gaze input meet activation criteria reduces the number of inputs needed to interact with the first notification (e.g., the user does not need to perform additional hand inputs to select the representation of the first notification, and the user does not need to perform additional inputs to dismiss the first notification once the computer system performs the operation corresponding to the first notification). Reducing the number of inputs needed to perform an operation enhances the operability of the device, which, additionally, reduces power usage and improves battery life of the device by enabling the user to use the device more quickly and efficiently.

In some embodiments, the activation criteria are met by the first gesture in accordance with a determination that the first gesture includes movement of a first preset portion of the hand of the first user (e.g., middle finger, index finger, first phalange of thumb or index finger, etc.) relative to a second preset portion of the hand of the first user (e.g., thumb, first phalange of thumb, etc.) that starts from or ends in contact between the first portion of the hand and the second portion of the hand (e.g., first gesture is a pinch gesture or a reverse pinch gesture of the thumb and another finger of the same hand). For example, the computer system, optionally, performs an operation that corresponds to the first notification and dismisses the first notification while a respective representation (e.g., first representation 7334 in FIG. 7P, second representation 7338 in FIG. 7R, third representation 7336 in FIG. 7T, etc.) is displayed in the three-dimensional environment, in response to a combination of a gaze input directed to the respective representation of the first notification and a pinch gesture or reverse pinch gesture performed by the user's hand, in accordance with some embodiments. For example, in some embodiments, while the first representation of the first notification is displayed in the three-dimensional environment, the computer system detects a pinch or reverse pinch gesture that is directed to the first representation of the first notification (e.g., when the gaze input is directed to the first representation of the first notification, when the gaze input has been directed to the first representation of the first notification for at least a first threshold amount of time, etc.); and in response, the computer system performs a first operation in the three-dimensional environment corresponding to the first notification and dismisses the first notification. In some embodiments, while the second representation of the first notification is displayed in the three-dimensional environment, the computer system detects a pinch or reverse pinch gesture that is directed to the second representation of the first notification (e.g., when the gaze input is directed to the second representation of the first notification, when the gaze input has been directed to the second representation of the first notification for at least a first threshold amount of time, etc.); and in response, the computer system performs a second operation (e.g., performs the first operation, displays the third representation, etc.) in the three-dimensional environment corresponding to the first notification. In some embodiments, while the third representation of the first notification is displayed in the three-dimensional environment, the computer system detects a pinch or reverse pinch gesture that is directed to the third representation of the first notification (e.g., when the gaze input is directed to the third representation of the first notification, when the gaze input has been directed to the third representation of the first notification for at least a first threshold amount of time, etc.); and in response, the computer system performs a third operation (e.g., performs the first operation, performs an operation that is represented in the third representation of the first notification, etc.) in the three-dimensional environment corresponding to the first notification and dismisses the first notification. Performing an operation in the three-dimensional environment corresponding to the first gesture, and dismissing the first notification, in accordance with a determination that the first gesture includes movement of a first preset portion of the hand of the first user relative to a second preset portion of the hand of the first user that starts from or ends in contact between the first portion of the hand and the second portion of the hand provides additional control options without cluttering the UI with additional displayed controls (e.g., the user can control whether or not first criteria are met based on movement of the first preset portion of the user's hand relative to the second preset portion of the user's hand, without the need for additional displayed controls (e.g., to cease performing the operation in case the user accidentally or unintentionally causes performance of the operation)). Providing additional control options without cluttering the UI with additional displayed controls enhances the operability of the device, which, additionally, reduces power usage and improves battery life of the device by enabling the user to use the device more quickly and efficiently.

In some embodiments, the activation criteria are met by the first gesture in accordance with a determination that the first gesture includes a touch input (e.g., a tap input, a swipe input, a flick input, a double tap input, a touch and hold input, etc.) performed by a first hand of the first user (e.g., the hand that is or is adjacent to the second portion of the first user, either hand of the first user, etc.) directed to a second hand of the first user (e.g., the hand other than the first hand, the hand that can move relative to the representation of the first notification, etc.). For example, the computer system, optionally, performs an operation that corresponds to the first notification and dismisses the first notification while a respective representation (e.g., first representation 7334 in FIG. 7P, second representation 7338 in FIG. 7R, third representation 7336 in FIG. 7T, etc.) is displayed in the three-dimensional environment, in response to a combination of a gaze input directed to the respective representation of the first notification and a tap or swipe gesture performed by one hand on another hand (e.g., hand 7202), in accordance with some embodiments. For example, in some embodiments, while the first representation of the first notification is displayed in the three-dimensional environment, the computer system detects a tap, touch, or poke gesture performed by one hand on or near the other hand (e.g., when the gaze input is directed to the first representation of the first notification, when the gaze input has been directed to the first representation of the first notification for at least a first threshold amount of time, etc.); and in response, the computer system performs a first operation in the three-dimensional environment corresponding to the first notification and dismisses the first notification. In some embodiments, while the second representation of the first notification is displayed in the three-dimensional environment at a position that corresponds to a first hand of the first user, the computer system detects a touch gesture performed by a second hand on the first hand (e.g., when the gaze input is directed to the second representation of the first notification, when the gaze input has been directed to the second representation of the first notification for at least a first threshold amount of time, etc.); and in response, the computer system performs a second operation (e.g., performs the first operation, displays the third representation, etc.) in the three-dimensional environment corresponding to the first notification. In some embodiments, while the third representation of the first notification is displayed in the three-dimensional environment at a position that corresponds to the location of a first hand of the first user, the computer system detects a touch gesture performed by a second hand on the first hand (e.g., when the gaze input is directed to the third representation of the first notification, when the gaze input has been directed to the third representation of the first notification for at least a first threshold amount of time, etc.); and in response, the computer system performs a third operation (e.g., performs the first operation, performs an operation that is represented in the third representation of the first notification, etc.) in the three-dimensional environment corresponding to the first notification and dismisses the first notification. Performing an operation in the three-dimensional environment corresponding to the first gesture, and dismissing the first notification, in accordance with a determination that the first gesture includes a touch input performed by a first hand of the first user directed to a second hand of the first user provides additional control options without cluttering the UI with additional displayed controls (e.g., the user can control whether or not first criteria are met based on whether the touch input of the first hand is directed to the second hand of the user, without the need for additional displayed controls (e.g., to cease performing the operation in case the user accidentally or unintentionally causes performance of the operation)). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the first event: the computer system outputs a first spatial audio alert with an associated spatial location in the physical environment that corresponds to (e.g., at or adjacent to) the position of the second portion of the first user in the physical environment. In accordance with a determination that a gaze input is detected in a preset range of the associated spatial location of the first spatial audio alert while the first spatial audio alert is being output, the computer system displays a third representation of the first notification (e.g., a user interface object that includes notification content of the first notification and optionally one or more control affordances for performing one or more operations corresponding to the first notification) at a position in the three-dimensional environment that corresponds to the second portion of the first user in the physical environment (e.g., at a position that corresponds to the location of the hand of the first user). For example, the computer system, optionally, outputs a spatial audio alert that appears to originate from a position at or near the first representation 7334 of the first notification in FIG. 7P; and if the computer system detects a gaze input directed to the region of the first representation 7334 while the spatial audio alert is playing, the computer system, optionally, ceases to display the first representation 7334 of the first notification at the position that is anchored to the user's head or torso, and displays the third representation 7336 of the first notification at the position that corresponds to the location of the user's hand (e.g., as shown in FIG. 7T), in accordance with some embodiments. In some embodiments, the second portion of the first user includes a hand or wrist of the first user, and the computer system displays the third representation of the first notification at a location that corresponds to the user's hand (e.g., palm, back of hand, etc.) in accordance with a determination that a gaze input is detected in the preset range of the second portion of the first user, while a movement of the second portion of the first user meets preset movement criteria (e.g., turns the palm toward the user's face, turns the palm upward, etc.). In some embodiments, if the third representation of the first notification is displayed in response to the user's gaze being detected in the spatial region of the first spatial audio alert while the first spatial audio alert is being output with audio characteristics that make the sound appear to have been generated at the spatial location corresponding to the position of the second portion of the first user, the computer system forgoes displaying the second representation of the first notification. In some embodiments, if the computer system does not detect a user's gaze in the spatial region of the first spatial audio alert while the first spatial audio alert is being output at the spatial location corresponding to the position of the second portion of the first user, the computer system proceeds to display the second representation of the first notification at the position that is selected based on the position of the second portion of the first user. In some embodiments, the computer system does not display the first representation of the first notification and/or the second representation of the first notification initially, and generates the spatial audio alert with an associated spatial location at or near the user's hand in response to detecting the first event; and in response to detecting the user's gaze directed to the location of the spatial audio alert and the palm of the hand turning to face toward the user's face within a threshold period of time, the computer system displays the third representation of the notification is at or near the representation of the user's hand. If the user's gaze is not detected and/or the palm of the hand is not turned to the user's face within the threshold period of time, the computer system then displays the second representation of the first notification at the position that is selected based on the position of the second portion of the first user. Outputting a first spatial audio alert with an associated spatial location, and displaying a third representation of the first notification in accordance with a determination that a gaze input is detected in a preset range of the associated spatial location of the first spatial audio alert while the first spatial audio alert is being output, provides improved feedback to the user (e.g., both visual and audio feedback). Providing improved feedback enhances the operability of the device, which, additionally, reduces power usage and improves battery life of the device by enabling the user to use the device more quickly and efficiently.

In some embodiments, the first view of the three-dimensional environment (e.g., the environment 7104 in FIGS. 7P-7U) includes a first three-dimensional region (e.g., a region that is at least a threshold distance away from the viewpoint of the currently displayed view of the three-dimensional environment, a region that is defined by the user, a region inside of moveable window or other two-dimensional or three-dimensional container object, etc.) that is shared between the first user and a second user that is engaged in a shared-experience with the first user (e.g., the shared experience is provided in a shared augmented reality environment, a shared virtual environment, a communication session, etc.). While displaying the first representation of the first notification (e.g., representation 7334 in FIG. 7P) in the first view of the three-dimensional environment, the computer system forgoes providing notification content of the first notification (e.g., forgoing providing the first representation of the first notification, forgoing providing any representation of the first notification, etc.) in the first three-dimensional region that is shared between the first user and the second user. In some embodiments, even if the position of the first representation of the first notification is within the first three-dimensional region and shown to the first user via the first display generation component, the first representation of the first notification is not provided to the computer system used by the second user and is not displayed to the second user via the display generation component used by the second user. In some embodiments, the first representation of the first notification is displayed in a region that is outside of the first three-dimensional region, and is therefore not visible to the second user. Forgoing providing notification content of the first notification in the first three-dimensional region that is shared between the first user and the second user, while displaying the first representation of the first notification in the first view of the three-dimensional environment provides additional control options without cluttering the UI with additional displayed controls (e.g., users for which the first notification is not relevant (e.g., users other than the first and second user) do not see the first notification). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the first event, the computer system generates a first audio alert in conjunction with displaying the first representation of the first notification. For example, in FIG. 7P, when the first representation 7334 of the first notification is initially displayed in the three-dimensional environment, the computer system, optionally, outputs an audio alert at the same time, or slightly before the initial display of the first representation 7334 of the first notification, in accordance with some embodiments. For example, in some embodiments, the computer system generates a spatial audio alert with a spatial location that corresponds to the displayed position of the first representation of the first notification. Generating a first audio alert in conjunction with displaying the first representation of the first notification provides improved audio feedback to the user (e.g., in conjunction with visual feedback). Providing improved feedback enhances the operability of the device, which, additionally, reduces power usage and improves battery life of the device by enabling the user to use the device more quickly and efficiently.

In some embodiments, the computer system generates the first audio alert in conjunction with displaying the first representation of the first notification includes generating a first spatial audio alert with a simulated spatial location in the physical environment that corresponds to the position of the first representation of the first notification in the three-dimensional environment that is selected based on the position of the first portion of the first user in the physical environment. For example, in FIG. 7P, when the first representation 7334 of the first notification is initially displayed in the three-dimensional environment, the computer system, optionally, outputs a spatial audio alert at the same time, or slightly before the initial display of the first representation 7334 of the first notification, where the spatial audio alert appears to originate from a position at or near the position of the first representation 7334 of the first notification, in accordance with some embodiments. For example, when the first representation of the first notification is initially displayed in response to the detection of the first event, the computer system generates a spatial audio alert that appears to originate from a location in the physical environment that corresponds to the position of the first representation of the first notification in the three-dimensional environment, where the position of the first representation of the first notification in the three-dimensional environment is in a preset peripheral region of the field of view provided by the first display generation component. Generating a first spatial audio alert with a simulated spatial location in the physical environment that corresponds to the position of the first representation of the first notification in the three-dimensional environment that is selected based on the position of the first portion of the first user in the physical environment provides improved audio feedback to the user (e.g., the audio feedback provides information regarding the position of the first notification). Providing improved feedback enhances the operability of the device, which, additionally, reduces power usage and improves battery life of the device by enabling the user to use the device more quickly and efficiently.

In some embodiments, the computer system displays an animated transition between displaying the first representation of the first notification at the position in the three-dimensional environment that is based on the position of the first portion of the first user in the physical environment and displaying the second representation of the first notification at the position in the three-dimensional environment that is based on the position of the second portion of the first user in the physical environment. The computer system generates an audio output in conjunction with displaying the animated transition (e.g., at the start of the animated transition, during the animated transition, and/or at the end of the transition, starting at the end of the animated transition and extends for a period of time after the end of the animated transition, etc.). For example, as shown in FIGS. 7Q-7R, when the first representation 7334 of the first notification starts to move toward the position that is selected based on the position of the user's hand and transforms into the second representation 7338 of the first notification, the computer system, optionally, outputs an audio alert at the same time in conjunction with the movement and transformation of the representation of the first notification, in accordance with some embodiments. In some embodiments, the spatial audio alert appears to originate from the position of the second representation 7338 of the first notification while the second representation 7338 of the first notification is displayed at the position that is selected based on the position of the user's hand and moves in the three-dimensional environment in accordance with the movement of the user's hand (e.g., optionally, for at least a period of time, and optionally fading out after the period of time, etc.). In some embodiments, the animated transition shows the first representation of the first notification shrinking and transforms into the second representation of the first notification, and starts to move toward the position in the three-dimensional environment that is based on the position of the second portion of the first user; and the audio output is a spatial audio alert that has an associated spatial location that moves in accordance with the movement of the second portion of the first user in the physical environment during an initial period of time that the second representation of the first notification is displayed in the three-dimensional environment. In some embodiments, the spatial audio alert gradually fades out after the initial period of time. In some embodiments, the currently displayed representation of the first notification is a virtual sound source of the spatial audio sound effect, and the spatial audio sound effect appears to originate from a virtual position in the currently displayed three-dimensional environment that corresponds to a peripheral portion of the user's field of view, the user's viewpoint, the location of the user's eyes, etc., when or right before the representation of the notification is initially displayed in the peripheral portion of the user's field of view and while the representation of the notification moves toward another position that is at or near the virtual position that corresponds to the location of the user's hand, even while the display generation component, the audio output component, the user, the user's hand, the user's head, etc. are moving in the physical environment. When the representation of the notification is displayed at and moves with the virtual position that corresponds to the location of the user's hand, the spatial audio sound effect also appears to originate from the virtual position, even while the display generation component, the audio output component, the user, the user's hand, the user's head, etc. are moving in the physical environment. Generating an audio output in conjunction with displaying an animated transition between displaying the first representation of the first notification at the position in the three-dimensional environment that is based on the position of the first portion of the first user in the physical environment and displaying the second representation of the first notification at the position in the three-dimensional environment that is based on the position of the second portion of the first user in the physical environment provides improved audio and visual feedback to the user (e.g., that the computer system is transitioning between displaying the first representation and the second representation of the first notification). Providing improved feedback enhances the operability of the device, which, additionally, reduces power usage and improves battery life of the device by enabling the user to use the device more quickly and efficiently.

Existing stereo and mono audio output modes provide audio with respect to a frame of reference that is tied to the audio output devices. For stationary audio output devices, the sound appears to originated from the locations of the audio output devices in the physical environment, irrespective of movement of the user in the physical environment and irrespective to the changes in the visual content of the computer-generated experience (e.g., changes due to movement of virtual sound sources and/or movement of the viewpoint, etc. in the three-dimensional environment of the computer-generated experience). For wearable audio output devices that stay stationary relative to a portion of the user's body (e.g., ears, head, etc.), the sound appears to be locked to the portion in user's body, irrespective to the changes in the visual content of the computer-generated experience (e.g., changes due to movement of the virtual sound sources, changes due to movement of the viewpoint (e.g., movement of the viewpoint caused by a locomotion request by the user or computer system, and not caused by and does not correspond to the movement of the portion of the user's body, etc.), etc.) in the three-dimensional environment of the computer-generated experience. In some cases, the audio output devices and the display generation component of the computer system are separately housed and may move relative to each other in the physical environment during the presentation of computer-generated content via the audio output devices and the display generation component. In such cases, the sound still appears to originate from the audio output devices, irrespective the location of the display generation component in the physical environment, or the changes in the visual content of the computer-generated experience (e.g., changes due to movement of a virtual sound source (e.g., the representations of the notification, in this case) and/or movement of the viewpoint (e.g., movement caused by a locomotion request in the displayed environment, or in response to and in accordance with movement of the user or a portion thereof in the physical environment, etc.), etc. in the three-dimensional environment of the computer-generated experience). In general, stereo and mono audio output modes provide a less realistic and less immersive listening experience than a spatial audio output mode, when the audio content of a computer-generated experience is provided to the user using the stereo audio output mode or the mono audio output mode. In some embodiments, the spatial audio output mode simulates a more realistic listening experience in which audio seems to come from sources of sound in a separate frame of reference, such as the three-dimensional environment displayed via the display generation component (e.g., an augmented reality environment, a virtual reality environment, a pure pass-through view of the physical environment surrounding the user, etc.) and in which the positioning of simulated sources of sound (e.g., the representations of the notification, in this example) is decoupled from the location and movement of the audio output devices in the physical environment. In some embodiments, the frame of reference for a spatial audio output (e.g., the sound alert or sound effect accompanying the display of the different representations of the notification, in this example) is based on the physical environment that is represented in the three-dimensional environment of the computer-generated experience, and the frame of reference, optionally, does not change due to movement of the user, movement of the audio output devices, and/or movement of the display generation component, in the physical environment. In some embodiments, the frame of reference for a spatial audio output (e.g., the sound alert or sound effect accompanying the display of one or both of the representations of the notification, in this example) is based on a virtual three-dimensional environment of the computer-generated experience. In some embodiments, the frame of reference optionally does not change due to movement of the user, movement of the audio output device, and/or movement of the display generation component, in the physical environment, if these movement do not cause a corresponding movement of the virtual three-dimensional environment. In some embodiments, the frame of reference for a spatial audio output (e.g., the sound alert or sound effect accompanying the display of one or both of the representations of the notification, in this example) is based on a three-dimensional environment that is tied to the viewpoint of the currently displayed view of the three-dimensional environment (e.g., in this case, when the first representation of the notification is displayed in a preset region of the field of view). In some embodiments, the frame of reference, optionally, does not change due to the movement of the user, movement of the audio output device, and/or movement of the display generation component in the physical environment, if these movement do not cause a corresponding movement of the viewpoint of the currently displayed view of the three-dimensional environment. In some embodiments, the frame of reference for the audio content output in the spatial audio mode is optionally different from the frame of reference for the visual content in the computer-generated experience. For example, in some embodiments, while the visual content is displayed relative to a frame of reference that is tied to the physical environment or virtual environment that is visually presented via the display generation component, at least some of the virtual sound sources (e.g., an external narrator, internal dialogue, etc.) are in a frame of reference that is tied to the user's viewpoint. In some embodiments, the audio content of the computer-generated experience optionally includes sound sources tied to different frames of references, such as a first frame of reference for virtual sound sources that do not have corresponding virtual positions in the three-dimensional environment of the computer-generated experience (e.g., system-level sound, external narration, etc.), a second frame of reference for virtual sound sources that have corresponding visual embodiments (e.g., virtual object, virtual surface, virtual light, etc.) in the three-dimensional environment of the computer-generated experience, and optionally, a third frame of reference for virtual sound sources that are far away from the viewpoint, outside of the field of view, hidden, etc. (e.g., ambient noise, such as sound of waves, insects, wind, rain, jungle, etc.). In some embodiments, the first frame of reference is fixe to, optionally, moves with, the user's head, the display generation component, and/or the viewpoint. In some embodiments, the second frame of reference is tied to the three-dimensional environment of the computer-generated experience, and optionally, moves with the display generation component. In some embodiments, the third frame of reference is tied to the physical environment, and optionally, does not move with the user, the display generation component, or the viewpoint. The computer system can select and configure the spatial audio mode to output sound based on different frame(s) of references based on the visual content that is being presented via the display generation component, based on the spatial configuration between the audio output device(s) and the display generation component in the physical environment, and based on the spatial configuration between the user, the display generation component, and the audio output devices, to provide a more realistic, and more immersive listening experience in conjunction with providing the visual content using the display generation component. In some embodiments, a spatial audio output mode is a mode that allows audio that is output from the audio output device(s) to sound as though the audio is coming from one or more locations (e.g., one or more sources of sound) in a respective frame of reference chosen for the virtual sound sources, such as the three-dimensional environment of the computer-generated experience or the physical environment, where the positioning of the one or more simulated or perceived sources of sound is decoupled from or independent of the movement of audio output device(s) relative to the respective frame of reference. Typically, the one or more perceived sound sources, when fixed, are fixed relative to the respective frame of reference associated with the sound sources, and, when moving, move relative to the respective frame of reference. In some embodiments, the frame of reference is a frame of reference based on a physical environment represented in a computer-generated experience that is provided via the display generation component of the computer system. In some embodiments, where the frame of reference is based on a physical environment (e.g., when the computer-generated experience is an augmented reality experience based on the physical environment, or a pass-through view of the physical environment, etc.), the one or more perceived sound sources have respective spatial locations in the physical environment. For example, in some embodiments, the computer-generated experience includes visual counterparts of the perceived sound sources (e.g., virtual objects that generated the sounds in the computer-generated experience, such as the second representation of the notification in the above example) that have respective positions that correspond to the respective spatial locations in the physical environment (e.g., the locations of the user's hand in the physical environment). In some embodiments, the computer-generated experiences include sounds without a visual counterpart (e.g., remote or hidden virtual objects that generated the sounds in the computer-generated experience, virtual wind, sound effect, external narrator, etc.) (e.g., the representation of the notification before the representation of the notification enter into the field of view of the user) but have origins corresponding to respective spatial locations in the physical environment. In some embodiments, as the audio output device(s) move about the physical environment, the audio output from the audio output device(s) is adjusted so that the audio continues to sound as though it is coming from the one or more perceived sound sources at the respective spatial locations in the physical environment (e.g., as the user walks around with the audio output device on his head, or with the audio output device in the physical environment away from his/her person, the sound continue to appear to come from the location of the user's hand, or continue to come from the location that is in the peripheral portion of the user's field of view). Where the one or more perceived sound sources are moving sources that move through a sequence of spatial locations about the physical environment (e.g., as the user's hand moves relative to his/her body while the user is stationary or walks around, the sound continue to appear to come from the location of the user's hand when the representation of the notification is displayed at or near a position that corresponds to the location of the user's hand), the audio output from the audio output device(s) is adjusted so that the audio continues to sound as though it is coming from the one or more perceived sound sources at the sequence of spatial locations in the physical environment. Such adjustment for moving sound sources also takes into account any movement of audio output device(s) relative to the physical environment (e.g., if the audio output device(s) move relative to the physical environment along an analogous path as the moving source of sound so as to maintain a constant spatial relationship with the source of sound, the audio would be output so that the sound does not appear to move relative to audio output device(s)). In some embodiments, when the audio content is output using spatial audio output mode and a frame of reference based on the physical environment represented in the computer-generated experience, the viewpoint of the currently displayed view of the three-dimensional environment changes in accordance with the movement of the user and/or the display generation component in the physical environment; and the user will perceive the sound as coming from the virtual positions of the virtual sound sources and experience the visual content of the three-dimensional environment in the same frame of reference based on the physical environment represented in the computer-generated experience. In some embodiments, the frame of reference is a frame of reference based on a virtual three-dimensional environment of a computer-generated experience provided via the display generation component of the computer system. In some embodiments, where the frame of reference is based on a virtual three-dimensional environment (e.g., an environment of a virtual three-dimensional movie, a three-dimensional game, a virtual office, etc.), the one or more perceived sound sources have respective spatial positions in the virtual three-dimensional environment. In some embodiments, as the audio output device(s) move about the physical environment, the audio output from the audio output device(s) is adjusted so that the audio continues to sound as though it is coming from the one or more perceived sound sources at the respective spatial positions in the virtual three-dimensional environment. Where the one or more perceived sound sources are moving sources that move through a sequence of spatial positions about the virtual three-dimensional environment, the audio output from the audio output device(s) is adjusted so that the audio continues to sound as though it is coming from the one or more perceived sound sources at the sequence of spatial positions in the virtual three-dimensional environment. In some embodiments, when the audio content is output using spatial audio output mode and a frame of reference based on the three-dimensional environment of the computer-generated experience, the viewpoint of the currently displayed view of the three-dimensional environment changes in accordance with the movement of the user and/or the display generation component in the physical environment; and the user will perceive the sound as coming from the virtual positions of the virtual sound sources and experience the visual content of the three-dimensional environment in the same frame of reference. In some embodiments, when the audio content is output using a spatial audio output mode and a frame of reference based on the three-dimensional environment of the computer-generated experience, the viewpoint of the currently displayed view of the three-dimensional environment changes in accordance with a locomotion request provided by the user and/or in accordance with the movement of the user and/or the display generation component in the physical environment; and the user will perceive the sound as coming from the virtual positions of the virtual sound sources and experience the visual content of the three-dimensional environment in the same frame of reference, with the user's virtual position tied to the viewpoint of the currently displayed view. In some embodiments, the frame of reference for the spatial audio output mode is fixed to an electronic device, such as a display generation component, that is outputting visual content corresponding to the audio content that is being output via the audio output device (e.g., the sound follows the display generation component). For example, locations of the simulated sources of the audio in a physical environment move corresponding to movement of the display generation component in the physical environment (e.g., when the representation of the notification is displayed in the peripheral portion of the field of view provided by an HMD), but not corresponding to the movement of the audio output device in the physical environment. For example, in some embodiments, the display generation component is a head-mounted display device, or a hand-held display device, while the audio output devices are placed in the physical environment and do not follow the movement of the user. In some embodiments, the frame of reference of the spatial audio effect is fixed to the display generation component and indirectly to the user, as the display generation component and the user move around the physical environment, relative to the audio output device(s). In some embodiments, when the audio content is output using spatial audio output mode and a frame of reference based on the three-dimensional environment of the computer-generated experience, the viewpoint of the currently displayed view of the three-dimensional environment changes in accordance with a locomotion request provided by the user and/or in accordance with the movement of the user and/or the display generation component in the physical environment; and the user will perceive the sound as coming from the virtual positions of the virtual sound sources and experience the visual content of the three-dimensional environment in the same frame of reference, with the user's virtual position tied to the viewpoint of the currently displayed view. In some embodiments, the frame of reference for at least some of the spatial audio effect is fixed to a viewpoint of the currently displayed view of the three-dimensional environment (e.g., an augmented reality environment, a mixed reality environment, a virtual reality environment, etc.) that is presented via the display generation component. In some embodiments, the viewpoint moves relative to the three-dimensional environment to provide a view of the three-dimensional environment from different positions or viewing perspectives in the three-dimensional environment during the computer-generated experience. In some embodiments, the viewpoint stays stationary in the three-dimensional environment during the computer-generated experience. In some embodiments, movement of the viewpoint in the three-dimensional environment is caused by and corresponds to movement of the display generation component in the physical environment. In some embodiments, movement of the viewpoint in the three-dimensional environment is caused by and corresponds to move of the user as a whole or movement of the user's head to torso relative to the physical environment. In some embodiments, movement of the viewpoint in the three-dimensional environment is caused by and corresponds to a navigation or locomotion request provided by the user, and/or generated by the computer system. In some embodiments, the one or more perceived sound sources have respective spatial locations in the three-dimensional environment relative to the viewpoint. For example, in some embodiments, the computer-generated experience includes visual counterparts of the perceived sound sources (e.g., virtual objects that generated the sounds in the computer-generated experience, virtual light, virtual surfaces, etc.) that have respective positions in the three-dimensional environment relative to the viewpoint. In some embodiments, the computer-generated experience includes sounds without a visual counterpart (e.g., remote or hidden virtual objects that generated the sounds in the computer-generated experience, virtual wind, sound effect, external narrator, etc.) but have origins corresponding to respective positions in the three-dimensional environment relative to the viewpoint. In some embodiments, as the viewpoint moves about the three-dimensional environment, the audio output from the audio output device(s) is adjusted so that the audio continues to sound as though it is coming from the one or more perceived sound sources at the respective positions in the three-dimensional environment.

In some embodiments, while displaying a respective representation of the first notification (e.g., the first representation, the second representation, etc.) (e.g., while the second representation is displayed at the position in the three-dimensional environment that is based on the position of the second portion of the first user in the physical environment (e.g., a first hand, wrist, or finger, etc. of the first user), or while the first representation is displayed at the position that is based on the position of the first portion of the first user in the physical environment, etc.), the computer system detects movement of a first hand that corresponds to the second portion of the first user (e.g., the first hand is the second portion of the first user, is adjacent to the second portion of the first user, or is part of the second portion of the first user, etc.) in the physical environment. In response to detecting the movement of the first hand that corresponds to the second portion of the first user, in accordance with a determination that the movement of the first hand includes opening the first hand, the computer system displays a third representation of the first notification (e.g., at a position in the three-dimensional environment that corresponds to the position of the first hand of the first user) while the first hand is open (and ceasing to display the respective representation of the first notification) (e.g., the third representation of the first notification includes notification content and one or more control affordances for performing operations corresponding to the first notification). For example, while the computer system displays a respective representation of the notification (e.g., first representation 7334 in FIG. 7P, second representation 7338 in FIG. 7R, etc.), if the computer system detects the user's hand is opened from a closed posture, the computer system, optionally, displays a representation of the notification (e.g., the third representation 7336 of the first notification) at a position that corresponds to the location of the user's hand (e.g., as shown in FIG. 7T), in accordance with some embodiments. Displaying a third representation of the first notification while the first hand is open, in accordance with a determination that the movement of the first hand corresponds to the second portion of the first user and includes opening the first hand reduces the number of inputs needed to display the third notification (e.g. at a position corresponding to the position of the first hand) (e.g., the user does not need to perform a first input to display the third representation and an additional input to move the third representation to the location of the user's hand). Reducing the number of inputs needed to perform an operation enhances the operability of the device, which, additionally, reduces power usage and improves battery life of the device by enabling the user to use the device more quickly and efficiently.

In some embodiments, in response to detecting the movement of the first hand that corresponds to the second portion of the first user, in accordance with a determination that the movement of the first hand includes closing of the first hand after opening the first hand (and optionally after other intermediate inputs interacting with the third representation of the first notification), the computer system ceases to display the third representation of the first notification (and optionally, without dismissing the first notification). For example, when the first hand is opened again after closing, the computer system displays the third representation of the first notification again because the first notification has not been disposed of by the closing of the first hand earlier. For example, while the computer system displays a respective representation of the notification (e.g., first representation 7334 in FIG. 7P, second representation 7338 in FIG. 7R, etc.), if the computer system detects the user's hand is opened from a closed posture, the computer system, optionally, displays a third representation 7336 of the notification at a position that corresponds to the location of the user's hand (e.g., as shown in FIG. 7T) (and ceases to display the respective representation of the first notification); and if the computer system then detects the user's hand closing, the computer system, optionally, ceases to display the third representation 7336 of the notification at the position that corresponds to the location of the user's hand (e.g., optionally, dismisses the first notification), in accordance with some embodiments. In some embodiments, the first notification is dismissed in response to another input that meets the criteria for dismissing the first notification (e.g., tapping on a closing affordance in the third representation of the first notification, swiping the third representation off the first hand, etc.). Ceasing to display the third representation of the first notification in accordance with a determination that the movement of the first hand includes closing of the first hand after opening the first hand provides additional control options without cluttering the UI with additional displayed controls (e.g., additional controls for ceasing to display the third representation of the first notification). Reducing the number of inputs needed to perform an operation enhances the operability of the device, which, additionally, reduces power usage and improves battery life of the device by enabling the user to use the device more quickly and efficiently.

In some embodiments, in response to detecting the movement of the first hand that corresponds to the second portion of the first user, in accordance with a determination that the movement of the first hand includes closing of the first hand after opening the first hand (e.g., optionally, without other intermediate inputs interacting with the third representation of the first notification), the computer system ceases to display the third representation of the first notification and dismissing the first notification. For example, while the computer system displays a respective representation of the notification (e.g., first representation 7334 in FIG. 7P, second representation 7338 in FIG. 7R, etc.), if the computer system detects the user's hand is opened and then closed right away, the computer system ceases to display the respective representation of the first notification (and optionally, dismisses the first notification), in accordance with some embodiments. For example, when the first hand is opened again after closing, the computer system ceases to display the third representation of the first notification because the first notification has been disposed of by the closing of the first hand earlier. Ceasing to display the third representation of the first notification and dismissing the first notification in accordance with a determination that the movement of the first hand includes closing of the first hand after opening the first hand reduces the number of inputs needed to dismiss the first notification (e.g., the user does not need to perform separate inputs to cease to display the third representation and to dismiss the first notification). Reducing the number of inputs needed to perform an operation enhances the operability of the device, which, additionally, reduces power usage and improves battery life of the device by enabling the user to use the device more quickly and efficiently.

In some embodiments, while displaying the third representation of the first notification in the three-dimensional environment (e.g., at a position in the three-dimensional environment that corresponds to the position of the first hand of the first user), the computer system detects movement of a second hand of the first user, the second hand being different from the first hand. In response to detecting the movement of the second hand of the first user, in accordance with a determination that the movement of the second hand corresponds to a drag and drop gesture that starts at a location in physical environment that corresponds to a position of a first content item (e.g., a file, a video, a photo, a document, a hyperlink, a contact card, an email, etc.) in the three-dimensional environment and ends at a location in the physical environment that corresponds to the position of the third representation of the first notification, the computer system adds a representation of the first content item (e.g., the first content item itself, a link to the first content item, a copy of the first content item, etc.) in an input area within the third representation of the first notification. For example, in FIG. 7T, if the computer system detects that the user has dragged and dropped a content item from outside of the third representation 7336 of the first notification to within the third representation of the first notification, the computer system adds a copy of the content item to an input field within the third representation 7336 of the first notification, in accordance with some embodiments. For example, in some embodiments, the first notification is a notification of a received instant message, and the third representation of the first notification includes an input area for compose a reply to the received instant message. When the third representation of the first notification is displayed at a position that corresponds to the position of the first hand in the open posture, in response to the first user dragging and dropping a content item from other parts of the three-dimensional environment to the position of the third representation of the first notification, the content item is added to the input area as part of the reply to the received instant message. In some embodiments, reply to another notification requesting user input (e.g., notification for an upcoming event, notification for an email, etc.) can be composed by dragging and dropping user interface objects, content items, files, etc. into the third representation of the notification as part of a reply or response to the event that triggered the notification. Adding a representation of the first content item in an input area within the third representation of the first notification in accordance with a determination that the movement of the second hand corresponds to a drag and drop gesture that starts at a location in physical environment that corresponds to a position of a first content item in the three-dimensional environment and ends at a location in the physical environment that corresponds to the position of the third representation of the first notification reduces the number of inputs needed to add a representation of the first content item to an input area within the third representation of the first notification (e.g., by combining the selection, movement, and adding of the first content item into a single gesture). Reducing the number of inputs needed to perform an operation enhances the operability of the device, which, additionally, reduces power usage and improves battery life of the device by enabling the user to use the device more quickly and efficiently.

In some embodiments, in response to detecting the movement of the first hand of the first user: in accordance with a determination that the movement of the first hand includes first movement of the first hand away from the first user during a first period of time, the computer system changes a size of the third representation of the first notification (e.g., reducing the size, increasing the size, etc.) in accordance with the first movement of the first hand away from the first user during the first period of time. In accordance with a determination that the movement of the first hand includes second movement of the first hand toward the first user during a second period of time, the computer system changes the size of the third representation of the first notification (e.g., increasing the size, decreasing the size, etc.) in accordance with the second movement of the first hand toward the first user (e.g., in a manner opposite to that used in accordance with the first movement of the first hand away from the first user) during the second period of time. For example, in FIG. 7T, while the third representation 7336 of the first notification is displayed at a position that corresponds to the location of the user's hand 7202, if the computer system detects the user's hand 7202 moving toward the user, the computer system, optionally, changes the size of the third representation 7336 of the first notification in a first manner; and if the computer system detects the user's hand 7202 moving away from the user, the computer system, optionally, changes the size of the third representation 7336 of the first notification in a second manner opposite the first manner, in accordance with some embodiments. In some embodiments, the size of the third representation of the first notification is dynamically updated as the first hand of the first user is moved closer to the first user, and father away from the first user. In some embodiments, the size of the third representation of the first notification is further dynamically updated in accordance with the current degree of opening and closing of the first hand in the physical environment. Changing the size of the third representation of the first notification in accordance with the second movement of the first hand away, or toward, the first user during a first or second period of time, respectively, provides improved visual feedback to the user (e.g., regarding the relative distance of the first hand from the first user). Providing improved feedback enhances the operability of the device, which, additionally, reduces power usage and improves battery life of the device by enabling the user to use the device more quickly and efficiently.

In some embodiments, while displaying the third representation of the first notification in the three-dimensional environment (e.g., at a position in the three-dimensional environment that corresponds to the position of the first hand of the first user), the computer system detects a first user input that corresponds to a request to drag and drop a first object from the three-dimensional environment to the third representation of the first notification. In response to detecting the first user input, the computer system adds the first object (e.g., a content item, a file, a hyperlink, a control affordance, a contact card, an avatar, etc.) in an input area within the third representation of the first notification. For example, in FIG. 7T, if the computer system detects that the user has dragged and dropped a content item from outside of the third representation 7336 of the first notification to within the third representation of the first notification, the computer system adds a copy of the content item to an input field within the third representation 7336 of the first notification, in accordance with some embodiments. For example, in some embodiments, the first notification is a notification of a received instant message, and the third representation of the first notification includes an input area for compose a reply to the received instant message. When the third representation of the first notification is displayed at a position that corresponds to the position of the first hand in the open posture, in response to the first user dragging and dropping a content item from other parts of the three-dimensional environment to the position of the third representation of the first notification, the content item is added to the input area as part of the reply to the received instant message. In some embodiments, reply to another notification requesting user input (e.g., notification for an upcoming event, notification for an email, etc.) can be composed by dragging and dropping user interface objects, content items, files, etc. into the third representation of the notification as part of a reply or response to the event that triggered the notification. Adding the first object in an input area within the third representation of the first notification in response to detecting the first user input corresponding to a request to drag and drop a first object from the three-dimensional environment to the third representation of the first notification reduces the number of inputs needed to add the first object to an input area (e.g., combines the selection, movement, and adding of the first object into a single gesture). Reducing the number of inputs needed to perform an operation enhances the operability of the device, which, additionally, reduces power usage and improves battery life of the device by enabling the user to use the device more quickly and efficiently.

In some embodiments, while displaying the third representation of the first notification in the three-dimensional environment (e.g., at a position in the three-dimensional environment that corresponds to the position of the first hand of the first user), the third representation of the first notification includes a second object (e.g., a content item, a file, a hyperlink, a control affordance, a contact card, an avatar, etc.), the computer system detects a second user input that corresponds to a request to drag and drop the second object from the third representation of the first notification to the three-dimensional environment. In response to detecting the second user input, the computer system adds the second object (e.g., a content item, a file, a hyperlink, a control affordance, a contact card, an avatar, etc.) to a position in the three-dimensional environment outside of the third representation of the first notification. For example, in FIG. 7T, if the computer system detects that the user has dragged and dropped a content item from within the third representation 7336 of the first notification to outside of the third representation of the first notification, the computer system adds a copy of the content item to the three-dimensional environment outside of the third representation 7336 of the first notification, in accordance with some embodiments. For example, in some embodiments, the first notification is a notification of a received instant message, and the third representation of the first notification includes a content item of the received instant message. When the third representation of the first notification is displayed at a position that corresponds to the position of the first hand in the open posture, in response to the first user dragging and dropping the content item from the third representation of the first notification to another part of the three-dimensional environment, the content item is added to the three-dimensional environment at a position selected by the user's input. Adding the second object to a position in the three-dimensional environment outside of the third representation of the first notification in response to detecting the second user input corresponding to a request to drag and drop the second object from the third representation of the first notification to the three-dimensional environment reduces the number of inputs needed to add the second object to a position in the three-dimensional environment outside of the third representation of the first notification (e.g., combines the selection, movement, and adding of the first object into a single gesture). Reducing the number of inputs needed to perform an operation enhances the operability of the device, which, additionally, reduces power usage and improves battery life of the device by enabling the user to use the device more quickly and efficiently.

It should be understood that the particular order in which the operations in FIG. 12 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, 13000, 14000, 15000, and 16000) are also applicable in an analogous manner to method 12000 described above with respect to FIG. 12. For example, the gestures, gaze inputs, physical objects, user interface objects, controls, movements, criteria, three-dimensional environment, display generation component, surface, representation of physical object, virtual objects, and/or animations described above with reference to method 12000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, 11000, 13000, 14000, 15000, and 16000). For brevity, these details are not repeated here.

Figure 13:
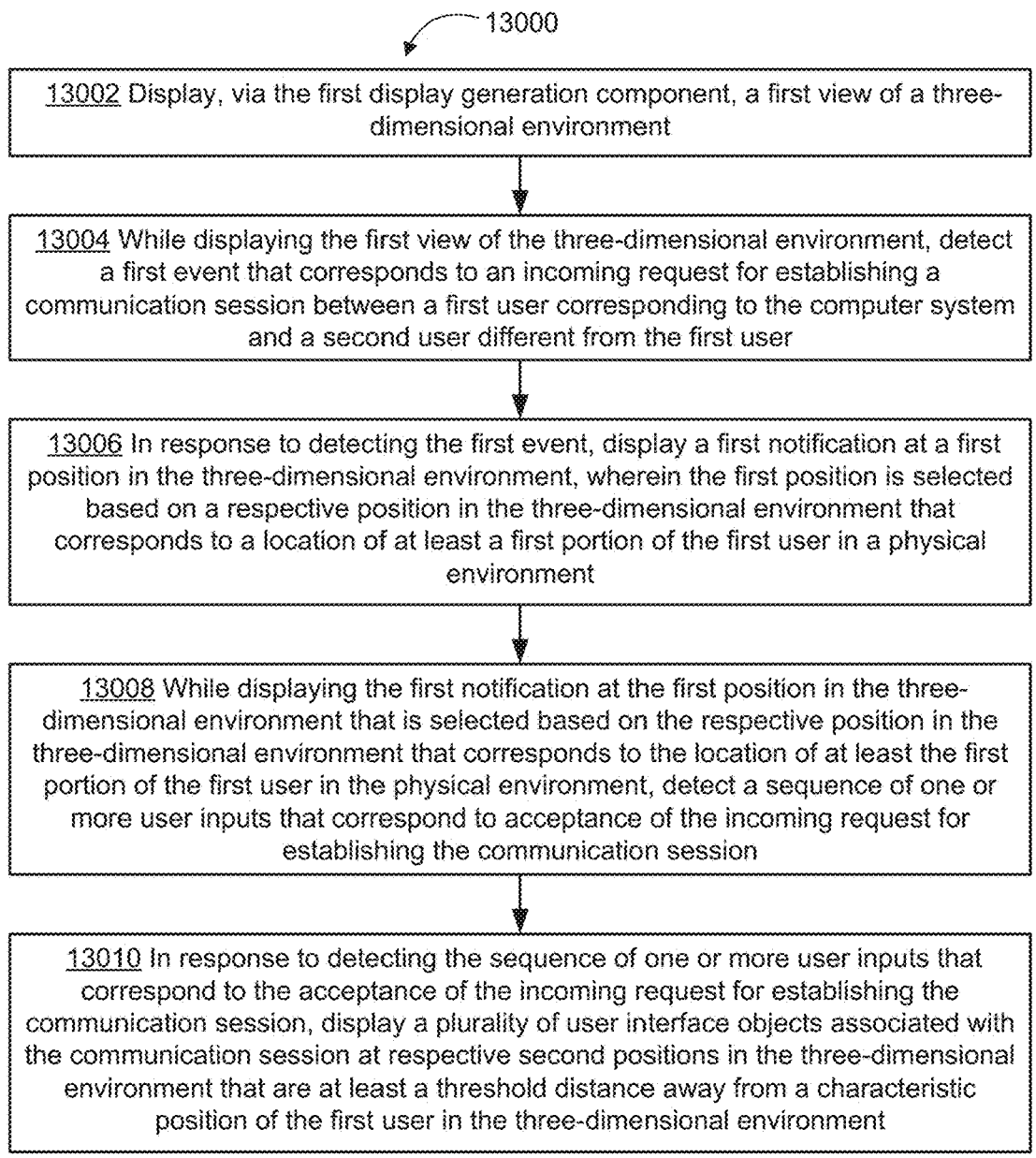
FIG. 13 is a flowchart of a method of interacting with a notification corresponding to an incoming communication request and displaying the communication session in the three-dimensional environment, in accordance with some embodiments.

FIG. 13 is a flowchart of a method 13000 of interacting with a notification corresponding to an incoming communication request and displaying the communication session in the three-dimensional environment, in accordance with some embodiments.

In some embodiments, the method 13000 is performed at a computer system (e.g., computer system 101 in FIG. 1) including a first display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 13000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 13000 are, optionally, combined and/or the order of some operations is, optionally, changed.

In some embodiments, the method 13000 is performed at a computer system (e.g., the computer system 101 in FIG. 1, the computer system 101 described with respect to FIGS. 7A-7D, FIGS. 7E-7F, FIGS. 7G-7H, FIGS. 7I-7M, FIGS. 7N-7O, FIGS. 7P-7S, FIGS. 7T-7U, and/or FIGS. 7V-7X, the first computer system 101-t described with respect to FIGS. 7V-7X, the second computer system described with respect to FIGS. 7V-7X, etc.). In some embodiments, the computer system is in communication with a first display generation component (e.g., the first display generation component is a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the first display generation component is a first display generation component 7100 described with respect to FIGS. 7A-7U and 7Y-7Z, a first display generation component 7100-t described with respect to FIGS. 7V-7X, a second display generation component described with respect to FIGS. 7V-7X, etc. In some embodiments, the computer system is an integrated device with one or more processors and memory enclosed in the same housing as the first display generation components and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the first display generation component and/or the one or more input devices. In some embodiments, the first display generation component and the one or more input devices are integrated and enclosed in the same housing. Many of the features of the method 13000 are described with respect to FIGS. 7P-7U, in accordance with some embodiments.

In the method 13000, the computer system displays (13002), via the first display generation component, a first view of a three-dimensional environment (e.g., a virtual three-dimensional environment, an augmented reality environment, a pass-through view of a physical environment, a camera view of a physical environment, etc.). In some embodiments, the three-dimensional environment is a virtual three-dimensional environment without a representation of a physical environment. In some embodiments, the three-dimensional environment is a mixed reality environment that is a virtual environment that is augmented by sensor data corresponding to the physical environment. In some embodiments, the three-dimensional environment is an augmented reality environment that includes one or more virtual objects and a representation of at least a portion of a physical environment surrounding the first display generation component (e.g., a camera view or a view through a transparent or semitransparent portion of the first display generation component). While displaying the first view of the three-dimensional environment, the computer system detects (13004) a first event (e.g., receipt of a notification or alert) that corresponds to an incoming request for establishing a communication session between a first user corresponding to the computer system (e.g., a first user that views the three-dimensional environment through the first display generation component and provides input to the computer system via the one or more input devices) and a second user different from the first user (e.g., a second user using a different computer system (e.g., mobile device, a desktop computer, a head-mounted device, etc.) and that is, optionally, located in a different physical environment from the first user). In response to detecting the first event, the computer system displays (13006) a first notification (e.g., a pop-up alert, an indicator of an event requiring user attention, etc.) at a first position in the three-dimensional environment, wherein the first position is selected based on a respective position in the three-dimensional environment that corresponds to a location of at least a first portion of the first user in the physical environment (e.g., the notification is locked to a first portion of the first user (e.g., head, body, hand, etc.)). For example, this is illustrated in FIG. 7P where a first representation 7334 of the first notification is displayed at a position that is anchored to the location of the user's face or head or torso, in FIG. 7R where a second representation 7338 of the first notification is displayed at a position that is anchored to the location of the user's hand, or in FIG. 7T where a third representation 7336 of the first notification is displayed at a position that is anchored to the user's hand and includes notification content, in accordance with some embodiments. In some embodiments, in response to detecting movement of the first portion of the first user (e.g., hand, head, body, etc.) in the physical environment, the computer system moves the position of the notification in the three-dimensional environment, such that the spatial relationship between the position of the notification and the respective position in the three-dimensional environment that corresponds to the current location of the first portion of the first user in the physical environment remains substantially unchanged. For example, in some embodiments, the first position is locked to the first user's head, and stays at a preset portion in the field of view provided via the first display generation component (e.g., in the top left corner of the field of view; in the bottom right corner of the field of view; near the top edge of the field of view, etc.) when the first user moves the first display generation component (e.g., an HMD, a heads-up display, display of a handheld device, etc.) relative to the physical environment by moving the first portion of the first user (e.g., head, hand, body, etc.) in the physical environment. In some embodiments, the first position is locked to the first user's hand or wrist, and moves in accordance with movement of the first user's hand or wrist. For example, in some embodiments, when a representation of the first user's hand or wrist is within the field of view provided via the first display generation component, the notification is displayed at or near the representation of the first user's hand or wrist; and when the representation of the first user's hand or wrist moves out of the field of view due to movement of the hand or wrist in the physical environment, the notification is displayed at or near an edge of the field of view that is closest to the current location of the hand or wrist. In some embodiments, when the notification is initially displayed in the first view of the physical environment, the initial position of the notification is locked to the first user's head and remains substantially fixed in a preset portion of the field of view provided via the first display generation component; and after a period of time, if the computer system has not detected user interaction with the notification, the notification is moved to a subsequent position that corresponds to the location of the first user's hand or wrist and locked to the first user's hand or wrist. In some embodiments, the notification also changes its form (e.g., from a banner to a small indicator, from a user interface object including notification content to a visual indicator without notification content, etc.) when transitioning from being in a first display mode (e.g., a head-locked mode) to a second display mode (e.g., a hand-locked mode). In some embodiments, when the notification is displayed at the first position that is selected based on the location of the first portion of the first user (e.g., head, hand, body, etc.) (e.g., locked to a first portion of the first user's body, as opposed to locked to the three-dimensional environment), the notification is displayed at a preset depth away from the virtual position of the first user or the viewpoint of the currently displayed view of the three-dimensional environment (e.g., 15 inches away, 20 inches away, a comfortable viewing distance for the content of the notification selected for the first user, etc.), and remains at that preset depth. In some embodiments, the first position of the notification is no more than an arm's length away from the virtual position of the first user (e.g., either when displayed in a preset peripheral region of the field of view, or when displayed at or near the position that is selected based on the location of the first user's hand or wrist, etc.).

In the method 13000, while displaying the notification at the first position in the three-dimensional environment that is selected based on the respective position in the three-dimensional environment that corresponds to the location of at least the first portion of the first user (e.g., the position of the first user's heard, body, or hand, etc.) in the physical environment, the computer system detects (13008) a sequence of one or more user inputs that correspond to acceptance of the incoming request for establishing the communication session (e.g., inputs for interacting with one or more user interface objects and completing a sequence of one or more steps in a process for fully establishing the communication session, such as selecting operating parameters for the communication session, and providing authentication information for the communication session, etc.). In response to detecting the sequence of one or more user inputs that correspond to the acceptance of the incoming request for establishing the communication session, the computer system displays (13010) a plurality of user interface objects associated with the communication session at respective second positions in the three-dimensional environment that are at least a threshold distance (e.g., at least an arm's length, a distance more than the viewing depth of the notification at the first position, etc.) away from a characteristic position of the first user (e.g., the position of the viewpoint, a virtual position that corresponds to the location of the user's head or eyes in the physical environment, a virtual position that corresponds to the location of the user as a whole, etc.) in the three-dimensional environment. For example, after displaying the respective representation of the notification (e.g., the first representation 7334 in FIG. 7P, the second representation 7338 in FIG. 7R, the third representation 7336 in FIG. 7T, etc.), the computer system detects the user's input that corresponds to an acceptance of the incoming communication request that triggered the first notification; and in response to the user inputs that corresponds to the acceptance of the incoming communication request, the computer system displays a user interface 7342 of the communication session at a position that is at least a threshold distance away from the virtual position of the user (e.g., away from the virtual position of the user's face, head, torso, and hand, etc.). In some embodiments, the plurality of user interface objects associated with the communication session are locked to the "world" or the representation of the physical environment in the three-dimensional environment. In some embodiments, as the viewpoint of the currently displayed view of the three-dimensional environment is moved in accordance with the movement of the first display generation component, the first user, the head of the first user, etc., the plurality of user interface objects remain at their respective second positions in the three-dimensional environment. In some embodiments, as the first portion of the first user moves (e.g., the user's head, body, hand, etc.), the plurality of user interface objects do not move away from their respective second positions, unless the movement of the first portion of the first user (e.g., the movement of the user's hand) meets preset criteria for qualifying as a request to reposition one or more of the plurality of user interface objects in the three-dimensional environment (e.g., criteria for detecting a pinch and drag gesture, criteria for detecting a flick gesture while a gaze is directed to the plurality of user interface objects, etc.). Displaying a notification of an incoming communication request at a position that is selected based on the location of a portion of the user, while displaying a user interface of the communication session at a position that is at least a threshold distance away from the virtual position of the user in response to user input interacting with the notification that corresponds to acceptance of the communication request, provides improved feedback and allows the user to easily interact with the notification, while having sufficient space to engage in the communication session and be free of the user interface objects that are anchored to the user's body, which enhances the operability of the device, which, additionally, reduces power usage and improves battery life of the device by enabling the user to use the device more quickly and efficiently.

In some embodiments, the location of the at least the first portion of the first user includes a characteristic location of the first user as a whole in the physical environment (e.g., the location of the user's torso, the location of the user head, etc.). While the first notification is displayed at the first position that is selected based on the respective position in the three-dimensional environment that corresponds to the characteristic location of the first user as a whole in the physical environment (e.g., during a first period of time when the notification is initially displayed in the three-dimensional environment in response to the event) (e.g., prior to detecting the sequence of one or more user inputs that correspond to the acceptance of the incoming request for establishing the communication session), the computer system detects movement of the characteristic location of the first user as a whole from a first location to a second location in the physical environment. In response to detecting the movement of the characteristic location of the first user as a whole from the first location to the second location in the physical environment (e.g., during a first period of time when the notification is initially displayed in the three-dimensional environment in response to the event) (e.g., prior to detecting the sequence of one or more user inputs that correspond to the acceptance of the incoming request for establishing the communication session): the computer system displays a second view of the three-dimensional environment, wherein a viewpoint of the second view corresponds to the second location in the physical environment (e.g., while the viewpoint of the first view corresponds to the first location in the physical environment); and the computer system displays the first notification in the second view of the three-dimensional environment at an updated first position that is selected based on the second location in the physical environment. For example, in FIGS. 7P-7Q, when the first representation 7334 of the first notification is anchored to the location of the user's torso, the movement of the user as a whole causes movement of the viewpoint which results in a different view of the three-dimensional environment being displayed, but the first representation 7334 is moved in accordance with the movement of the user's torso, such that the spatial relationship between the first representation 7334 and the viewpoint is maintained, in accordance with some embodiments. In some embodiments, when the notification is displayed at the first position that is selected based on the respective position that corresponds to the characteristic location of the first user's body as a whole (e.g., continuously updated based on the characteristic location of the first user as a whole), the viewing depth of the notification away from the viewpoint remains substantially the same as the viewpoint moves in the three-dimensional environment in accordance with the movement of the characteristic location of the first user as a whole in the physical environment. In some embodiments, when the notification is displayed at the first position that is selected based on the respective position that corresponds to the characteristic location of the first user's body as a whole (e.g., continuously updated based on the characteristic location of the first user as a whole), the notification remains substantially stationary in a preset region of the field of view (e.g., a central portion of the field of view, a peripheral portion of the field of view, the top right corner, the left edge region, the lower left corner, the bottom edge region, the lower right corner, the right edge region, the top right corner, the top edge region, etc.), as the field of view changes in the three-dimensional environment in accordance with the movement of the characteristic location of the first user as a whole in the physical environment. In some embodiments, the notification is locked to the first user's body during a first period of time when the notification is initially displayed in the three-dimensional environment, and subsequently moved to a different position that is selected based on another portion of the first user, such as the user's hand or wrist. Displaying a second view of the three-dimensional environment, and displaying the first notification in the second view of the three-dimensional environment at an updated first position that is selected based on the second location in the physical environment, in response to detecting the movement of the characteristic location of the first user as a whole from the first location to the second location in the physical environment performs an operation when a set of conditions (e.g., the characteristic location of the first user as a whole moves from the first location to the second location) has been met without requiring further user input (e.g., does not require the user to perform an additional gesture to display the second view or to display the first notification in the second view at the updated first position). Performing an operation when a set of conditions has been met without requiring further user input enhances the operability of the device, which, additionally, reduces power usage and improves battery life of the device by enabling the user to use the device more quickly and efficiently.

In some embodiments, the location of the at least the first portion of the first user includes a characteristic location and orientation of a head of the first user in the physical environment (e.g., the location, facing direction, and tilt angle, etc. of the first user's head, eyes, etc.). While the first notification is displayed at the first position that is selected based on the respective position in the three-dimensional environment that corresponds to the characteristic location and orientation of the head of the first user in the physical environment (e.g., during a first period of time when the notification is initially displayed in the three-dimensional environment in response to the event) (e.g., prior to detecting the sequence of one or more user inputs that correspond to the acceptance of the incoming request for establishing the communication session), the computer system detects a change in the characteristic location and orientation of the head of the first user from a first state to a second state in the physical environment. In response to detecting the change in the characteristic location and orientation of the head of the first user in the physical environment (e.g., during a first period of time when the notification is initially displayed in the three-dimensional environment in response to the event) (e.g., prior to detecting the sequence of one or more user inputs that correspond to the acceptance of the incoming request for establishing the communication session): the computer system displays a third view of the three-dimensional environment, wherein a viewpoint of the third view corresponds to the second state of the head of the first user in the physical environment (e.g., while the viewpoint of the first view corresponds to the first state of the head of the first user in the physical environment); and the computer system displays the first notification in the third view of the three-dimensional environment at an updated first position that is selected based on the second state of the head of the first user in the physical environment. For example, in FIGS. 7P-7Q, when the first representation 7334 of the first notification is anchored to the position of the user's head, the movement of the user's head relative to the user's torso causes movement of the viewpoint which results in a different view of the three-dimensional environment being displayed, but the first representation 7334 is moved in accordance with the movement of the user's head, such that the spatial relationship between the first representation 7334 and the viewpoint is maintained, in accordance with some embodiments. In some embodiments, when the notification is displayed at the first position that is selected based on the respective position that corresponds to the characteristic location and orientation of the first user's head (e.g., continuously updated based on the characteristic location and orientation of the first user's head), the viewing depth of the notification away from the viewpoint remains substantially the same as the viewpoint moves in the three-dimensional environment in accordance with the movement of the characteristic location and orientation of the first user's head in the physical environment. In some embodiments, when the notification is displayed at the first position that is selected based on the respective position that corresponds to the characteristic location and orientation of the first user's head (e.g., continuously updated based on the characteristic location and orientation of the first user's head), the notification remains substantially stationary in a preset region of the field of view (e.g., a central portion of the field of view, a peripheral portion of the field of view, the top right corner, the left edge region, the lower left corner, the bottom edge region, the lower right corner, the right edge region, the top right corner, the top edge region, etc.), as the field of view changes in the three-dimensional environment in accordance with the change in the characteristic location and orientation of the first user's head in the physical environment. In some embodiments, the notification is locked to the first user's head during a first period of time when the notification is initially displayed in the three-dimensional environment, and subsequently moved to a different position that is selected based on another portion of the first user, such as the user's hand or wrist. Displaying a third view of the three-dimensional environment, wherein a viewpoint of the third view corresponds to the second state of the head of the first user in the physical environment, and displaying the first notification in the third view of the three-dimensional environment at an updated first position that is selected based on the second state of the head of the first user in the physical environment, in response to detecting the change in the characteristic location and orientation of the head of the first user in the physical environment, performs an operation when a set of conditions (e.g., the characteristic location and orientation of the head of the first user changes) has been met without requiring further user input (e.g., does not require the user to perform an additional gesture to display the third view or to display the first notification in the third view at the updated first position). Performing an operation when a set of conditions has been met without requiring further user input enhances the operability of the device, which, additionally, reduces power usage and improves battery life of the device by enabling the user to use the device more quickly and efficiently.

In some embodiments, movement of the first notification from the first position in the first view of the three-dimensional environment to the first updated position in the third view of the three-dimensional environment lags behind a change from displaying the first view of the three-dimensional environment to displaying the third view of the three-dimensional environment. For example, in FIGS. 7P-7Q, when the first representation 7334 of the first notification is anchored to the position of the user's head, the movement of the user's head relative to the user's torso causes movement of the viewpoint which results in a different view of the three-dimensional environment being displayed, but the first representation 7334 is moved in accordance with the movement of the user's head, such that the spatial relationship between the first representation 7334 and the viewpoint is maintained, subject to a delay due to a difference between simulated inertia for the viewpoint and the first representation 7334 of the first notification, in accordance with some embodiments. For example, in some embodiments, when the first notification is displayed at a position that selected based on a respective position that corresponds to the characteristic location and orientation of the head of the first user, the viewpoint moves in accordance with the changes in the characteristic location and orientation of the head of the first user, the field of view is updated according to the movement of the viewpoint, and the first notification moves in order to remain at a respective portion of the field of view, but the movement of the first notification lags behind the movement of the viewpoint. For example, the first notification appears to have simulated inertia that causes it to lag behind the movement of the respective portion of the field of view and then catches up after some amount of time when the movement of the respective portion of the field of view slows or stops. So for a first portion of the movement, the notification moves slower than the head (e.g., as the movement of the notification lags behind the movement of the head) and for a second portion of the movement, the notification moves more quickly than the head (e.g., as the movement of the notification catches up to the movement of the head). Lagging the movement of the first notification from the first position to the first updated position behind a change from displaying the first view to displaying the third view of the three-dimensional environment provides improved visual feedback to the user (e.g., that the computer system has changed from the first view to the third view of the three-dimensional environment). Providing improved feedback enhances the operability of the device, which, additionally, reduces power usage and improves battery life of the device by enabling the user to use the device more quickly and efficiently.

In some embodiments, the location of the at least the first portion of the first user includes a characteristic location (e.g., the location of the tip of a finger, the center of the hand, the wrist connected to the hand, the hand as a whole, etc.) of a hand (e.g., a preset hand, either hand, etc.) of the first user in the physical environment. Displaying the first notification at the first position that is selected based on the respective position in the three-dimensional environment that corresponds to the location of at least the first portion of the first user includes displaying the first notification at a position that is selected based on the characteristic location of the hand of the first user in the physical environment (e.g., when the notification is initially displayed in the three-dimensional environment in response to the event, or during a second period of time after the first period of time in which the notification was locked to the user's body as a whole, etc.). For example, when the second representation 7338 of the first notification in FIG. 7R, or the third representation 7336 of the first notification in FIG. 7T are displayed, anchored to the position of the user's hand, the movement of the user's hand causes movement of the displayed representation of the first notification in the three-dimensional environment in accordance with the movement of the user's hand, such that the spatial relationship between the displayed representation of the first notification and the representation of the hand is maintained, in accordance with some embodiments. Displaying the first notification at a position that is selected based on the characteristic location of the hand of the first user in the physical environment provides improved visual feedback to the user (e.g., by consistently displaying the first notification at a position selected based on the characteristic location of the first user's hand in the physical environment). Providing improved feedback enhances the operability of the device, which, additionally, reduces power usage and improves battery life of the device by enabling the user to use the device more quickly and efficiently.

In some embodiments, the position that is selected based on the characteristic location of the hand of the first user in the physical environment includes a respective position at or near (and moves with) a representation of the hand of the first user, in accordance with a determination that the representation of the hand of the first user is within a currently displayed view of the three-dimensional environment (e.g., the first view of the three-dimensional environment, a view that is updated due to movement of the viewpoint, etc.). For example, when the second representation 7338 of the first notification in FIG. 7R, or the third representation 7336 of the first notification in FIG. 7T are displayed, the computer system display the representation of the first notification at a position that is at or near the representation of the user's hand in accordance with a determination that the representation of the hand is within the field of view, in accordance with some embodiments. Displaying the first notification at a position at or near a representation of the hand of the first user, in accordance with a determination that the representation of the hand of the first user is within a currently displayed view of the three-dimensional environment provides improved visual feedback to the user (e.g., by displaying the first notification at the respective position at or near the representation of the user's hand only when the user's hand is within the displayed view). Providing improved feedback enhances the operability of the device, which, additionally, reduces power usage and improves battery life of the device by enabling the user to use the device more quickly and efficiently.

In some embodiments, the position that is selected based on the characteristic location of the hand of the first user in the physical environment includes a respective position at or near an edge portion (e.g., the bottom edge, the left edge, the right edge, etc.) of the currently displayed view of the three-dimensional environment, in accordance with a determination that the representation of the hand of the first user is outside the currently displayed view of the three-dimensional environment. For example, when the second representation 7338 of the first notification in FIG. 7R is displayed, the computer system display the second representation 7338 of the first notification at a position along the edge of the field of view that is selected based on the location of the user's hand in accordance with a determination that the representation of the hand is within the field of view, in accordance with some embodiments. In some embodiments, the respective position at or near the edge portion of the currently displayed view of the three-dimensional environment is selected based on its closer proximity to the position that corresponds to the location of the hand of the first user, as compared to other positions along the edge point of the currently displayed view of the three-dimensional environment and/or as compared to other edge portions of the currently displayed view of the three-dimensional environment. In some embodiments, when the hand of the first user moves as a whole in the physical environment, the notification moves along the peripheral region of the currently displayed view of the three-dimensional environment (e.g., downward along the left edge region to the bottom edge and then rightward along the bottom edge, or leftward along the bottom edge and then upward along the left edge, etc.) in accordance with the movement and current location of the hand of the first user in the physical environment (e.g., hand moves from one side to another side of the body outside of the field of view). Displaying the first notification at a respective position at or near an edge portion of the currently displayed view of the three-dimensional environment in accordance with a determination that the representation of the hand of the first user is outside the currently displayed view of the three-dimensional environment provides improved visual feedback to the user (e.g., by displaying the first notification even when the user's hand is outside the currently displayed view). Providing improved feedback enhances the operability of the device, which, additionally, reduces power usage and improves battery life of the device by enabling the user to use the device more quickly and efficiently.

In some embodiments, while displaying the first notification at the position that is selected based on the characteristic location of the hand of the first user in the physical environment (e.g., when the notification is initially displayed in the three-dimensional environment in response to the event, or during a second period of time after the first period of time in which the notification was locked to the user's body as a whole, etc.) (e.g., prior to detecting the sequence of one or more user inputs that correspond to the acceptance of the incoming request for establishing the communication session), the computer system detects movement of the hand of the first user from a third location to a fourth location in the physical environment. In response to detecting the movement of the hand of the first user from the third location to the fourth location in the physical environment, the computer system moves the first notification in the three-dimensional environment (e.g., the first view, the second view, the third view, etc.) from a third position that is selected based on the third location in the physical environment to a fourth position that is selected based on the fourth location in the physical environment. For example, when the second representation 7338 of the first notification in FIG. 7R, or the third representation 7336 of the first notification in FIG. 7T are displayed, the computer system display the representation of the first notification at a position that is at or near the representation of the user's hand; and moves the displayed representation of the first notification in accordance with the movement of the hand, such that the spatial relationship between the displayed representation of the notification and the representation of the user's hand is maintained in the three-dimensional environment, in accordance with some embodiments. Moving the first notification from a third position selected based on the third location in the physical environment to a fourth position selected based on the fourth location in the physical environment in response to detecting movement of the hand of the first user from the third location to the fourth location in the physical environment reduces the number of inputs needed to maintain the display of the first notification at the desired location (e.g., the user does not need to perform an additional gesture to move the first notification from the third position to the fourth position, after the user's hand has moved from the third location to the fourth location in the physical environment). Reducing the number of inputs needed to perform an operation enhances the operability of the device, which, additionally, reduces power usage and improves battery life of the device by enabling the user to use the device more quickly and efficiently.

In some embodiments, the third position in the three-dimensional environment is at or near a representation of the hand of the first user in a currently displayed view of the three-dimensional environment when the hand of the first user is at the third location in the physical environment. The fourth position in the three-dimensional environment is at or near the representation of the hand of the first user in the currently displayed view of the three-dimensional environment when the hand of the first user is at the fourth location in the physical environment. For example, when the second representation 7338 of the first notification in FIG. 7R, or the third representation 7336 of the first notification in FIG. 7T are displayed, the computer system display the representation of the first notification at a position that is at or near the representation of the user's hand; and moves the displayed representation of the first notification in accordance with the movement of the hand, such that the spatial relationship between the displayed representation of the notification and the representation of the user's hand is maintained in the three-dimensional environment, in accordance with some embodiments. Moving the first notification from a third position, at or near a representation of the hand of the first user in a currently displayed view of the three-dimensional environment when the hand of the first user is at the third location in the physical environment, selected based on the third location in the physical environment to a fourth position, at or near the representation of the hand of the first user in the currently displayed view of the three-dimensional environment when the hand of the first user is at the fourth location in the physical environment, selected based on the fourth location in the physical environment in response to detecting movement of the hand of the first user from the third location to the fourth location in the physical environment reduces the number of inputs needed to maintain the display of the first notification at the desired location (e.g., the user does not need to perform an additional gesture to move the first notification from the third position to the fourth position, after the user's hand has moved from the third location to the fourth location in the physical environment). Reducing the number of inputs needed to perform an operation enhances the operability of the device, which, additionally, reduces power usage and improves battery life of the device by enabling the user to use the device more quickly and efficiently.

In some embodiments, in response to detecting the first event, displaying movement of the first notification from an initial display position of the first notification (e.g., a position in the interior region of the view, in an edge region of the view, far away from the viewpoint, etc.; the notification immerges from this initial display position, or comes into view from this initial display position, etc.) toward the first position in the three-dimensional environment that is selected based on the respective position in the three-dimensional environment that corresponds to the location of at least the first portion of the first user (e.g., the head, eyes, body, hand, wrist, etc.) in the physical environment. For example, the computer system displays movement of a displayed representation of the first notification (e.g., first representation 7334 in FIG. 7P, second representation 7338 in FIG. 7R, etc.) to the anchored position of the representation of the first notification (e.g., position in the upper left corner of the field of view in FIG. 7P, or position at or near the representation of the user's hand in FIG. 7R, etc.) to attract the use's attention to the displayed representation of the first notification, in accordance with some embodiments. For example, in some embodiments, when the notification is initially displayed in response to detecting the first event, the computer system displays an animated transition showing the notification arriving at the first position that is anchored to the first portion of the first user from an initial display position. In some embodiments, the path taken by the notification is from a point that is far away from the viewpoint toward the viewpoint, from a point near the edge of the field of view toward an interior region of the field of view, from a top edge or corner region of the field of view toward the position or edge that corresponds to the location of the user's hand, etc. In some embodiments, the movement of the notification prior to the notification being displayed at a stable position that is locked to the first portion of the first user provides useful visual cues catch the first user's attention and guide the user's gaze to the stable display position of the notification. Displaying movement of the first notification from an initial display position toward the first position in the three-dimensional environment that is selected based on the respective position in the three-dimensional environment that corresponds to the location of at least the first portion of the first user in the physical environment provides improved visual feedback to the user (e.g., movement of the first notification is used to draw the user's attention, and to focus the user's attention to the first position in the three-dimensional environment). Providing improved feedback enhances the operability of the device, which, additionally, reduces power usage and improves battery life of the device by enabling the user to use the device more quickly and efficiently.

In some embodiments, wherein the first position in the three-dimensional environment is selected based on a respective position in the three-dimensional environment that corresponds to the location of a hand of the first user in the physical environment, and the movement of the first notification starts from the initial display position of the first notification (e.g., a position in the interior region of the view, in an edge region of the view, far away from the viewpoint, etc.; the notification immerges from this initial display position, or comes into view from this initial display position, etc.) ends at or near the respective position in the three-dimensional environment that corresponds to the location of the hand of the first user in the physical environment. For example, the initial display position of the first notification is the position of the first representation 7334 of the first notification as shown in FIG. 7P, and the representation of the first notification then moves to the position that is at or near the location of the user hand, e.g., as shown in FIG. 7Q (e.g., along the path 7335), in accordance with some embodiments. In some embodiments, the movement path of the movement from the initial display position of the notification toward the respective position in the three-dimensional environment that corresponds to the location of the hand of the first user in the physical environment is confined within a peripheral region of the field of view provided via the first display generation component when the representation of the hand of the first user is not currently within view (e.g., from the top left corner of the field of view along the left edge region down to the middle of the bottom edge of the field of view, when the hand is the user is below the middle portion of the bottom edge of the field of view). In some embodiments, the movement path of the movement from the initial display position of the notification toward the respective position in the three-dimensional environment that corresponds to the location of the hand of the first user in the physical environment is confined within a peripheral region of the field of view provided via the first display generation component when the representation of the hand of the first user is near the peripheral portion of the currently displayed view (e.g., from the top left corner of the field of view along the left edge region down to the middle of the bottom edge of the field of view, when the hand is the user is near the middle portion of the bottom edge of the field of view). In some embodiments, the movement path of the movement from the initial display position of the notification toward the respective position in the three-dimensional environment that corresponds to the location of the hand of the first user in the physical environment is not fully confined within a peripheral region of the field of view provided via the first display generation component when the representation of the hand of the first user is in the central portion of the currently displayed view (e.g., from the top left corner of the field of view straight toward the representation of the hand when the hand in the central region of the field of view). Displaying movement of the first notification that starts from the initial display position of the first notification, selected based on a respective position in the three-dimensional environment that corresponds to the location of a hand of the first user in the physical environment, and ends at or near the respective position in the three-dimensional environment that corresponds to the location of the hand of the first user in the physical environment provides improved visual feedback to the user (e.g., movement of the first notification is used to draw the user's attention, and to focus the user's attention to the first position in the three-dimensional environment). Providing improved feedback enhances the operability of the device, which, additionally, reduces power usage and improves battery life of the device by enabling the user to use the device more quickly and efficiently.

In some embodiments, the first position in the three-dimensional environment is selected based on a respective position in the three-dimensional environment that corresponds to the location of a head of the first user in the physical environment, and the movement of the first notification starts from the initial display position of the first notification (e.g., a position in the interior region of the view, in an edge region of the view, far away from the viewpoint, etc.; the notification immerges from this initial display position, or comes into view from this initial display position, etc.) and ends at or near the respective position in the three-dimensional environment that corresponds to the location of the hand of the first user in the physical environment. For example, the initial display position of the first notification is the position of the first representation 7334 of the first notification as shown in FIG. 7P, and the representation of the first notification then moves to the position that is at or near the location of the user hand, e.g., as shown in FIG. 7Q (e.g., along the path 7335), in accordance with some embodiments. In some embodiments, the notification pauses at an intermediate position in the three-dimensional environment that corresponds to a location of a head of the first user in the physical environment (e.g., the intermediate position moves in accordance with a movement of the head of the first user) for a preset period of time, before moving to the position at or near the respective position in the three-dimensional environment that corresponds to the location of the hand of the first user in the physical environment. In some embodiments, the notification comes into view from a peripheral region or edge of a field of view of a user of the device and moves toward the viewpoint of the currently displayed view. In some embodiments, after the notification moves to a suitable initial viewing position relative to the viewpoint or the field of view, the notification remains substantially stationary at that initial viewing position for a period of time; and if user inputs that correspond to an acceptance of the incoming request have not been received during the period of time, the notification moves to the first position that is based on the respective position of the hand of the first user in the physical environment. In some embodiments, when the first notification is displayed at the intermediate position that selected based on a respective position that corresponds to the characteristic location and orientation of the head of the first user, the viewpoint moves in accordance with the changes in the characteristic location and orientation of the head of the first user, the field of view is updated according to the movement of the viewpoint, and the first notification moves in order to remain at a respective portion of the field of view, but the movement of the first notification lags behind the movement of the viewpoint. For example, the first notification appears to have simulated inertia that causes it to lag behind the movement of the respective portion of the field of view and then catches up after some amount of time when the movement of the respective portion of the field of view slows or stops. Displaying movement of the first notification that starts from the initial display position of the first notification, selected based on a respective position in the three-dimensional environment that corresponds to the location of a head of the first user in the physical environment, and ends at or near the respective position in the three-dimensional environment that corresponds to the location of the hand of the first user in the physical environment provides improved visual feedback to the user (e.g., movement of the first notification is used to draw the user's attention, and to focus the user's attention to the first position in the three-dimensional environment). Providing improved feedback enhances the operability of the device, which, additionally, reduces power usage and improves battery life of the device by enabling the user to use the device more quickly and efficiently.

In some embodiments, in response to detecting the first event, the computer system moves the first notification from a first depth from a viewpoint of a currently displayed view of the three-dimensional environment to a second depth from the viewpoint of the currently displayed view of the three-dimensional environment. For example, in FIG. 7P, the first representation 7334 enters into view from a larger depth from the viewpoint and settles into a preset distance from the viewpoint at a position that is selected based on the location of the first portion of the user, in accordance with some embodiments. In some embodiments, the first notification displayed at the second depth is anchored to the head of the first user in the physical environment, and moves in the three-dimensional environment in accordance with a change in the characteristic location and orientation of the head of the first user. In some embodiments, the first notification displayed at the second depth is displayed at a preset portion of the field of view provided via the first display generation component. In some embodiments, the first notification displayed at the second depth is anchored to the body of the first user in the physical environment, and moves in the three-dimensional environment in accordance with movement of the first user as a whole in the physical environment. In some embodiments, the first notification displayed at the second depth moves within the field of view provided via the first display generation component when the head of the user rotates relative to the body of the first user. In some embodiments, the computer system may respond to user inputs detected while the first notification is displayed at the second depth to accept the request to establish the communication session, without moving the first notification to a position that is selected based on the respective position that corresponds to the hand of the first user. In some embodiments, the computer system moves the first notification to a position that is selected based on the respective position that corresponds to the hand of the first user after having displayed the second notification at the second depth for a period of time. Moving the first notification from a first depth from a viewpoint of a currently displayed view of the three-dimensional environment to a second depth from the viewpoint of the currently displayed view of the three-dimensional environment provides improved visual feedback to the user (e.g., movement of the first notification is used to draw the user's attention, and to focus the user's attention to the first position in the three-dimensional environment). Providing improved feedback enhances the operability of the device, which, additionally, reduces power usage and improves battery life of the device by enabling the user to use the device more quickly and efficiently.

In some embodiments, in response to detecting the first event, the computer system generates a first audio alert (e.g., a stereo sound, a spatial audio alert with a corresponding static or dynamic location in the physical environment, etc.) in conjunction with displaying the first notification at the first position in the three-dimensional environment that is selected based on the respective position in the three-dimensional environment that corresponds to the location of at least the first portion of the first user in the physical environment. For example, in conjunction with displaying a respective representation of the first notification (e.g., the first representation 7334 in FIG. 7P, the second representation 7338 in FIG. 7R, the third representation 7336 in FIG. 7T, etc.), the computer system, optionally, generates an audio alert corresponding to the display of the respective representation of the first notification, in accordance with some embodiments. In some embodiments, the first audio alert is a discrete audio alert that ends shortly after it starts. In some embodiments, the first audio alert is a continuous audio alert that has at least a threshold duration and optionally extends indefinitely until a preset event occurs. In some embodiments, the first audio alert is started slightly prior to initial display of the first notification in the field of view. In some embodiments, the first audio alert is output upon initial display of the first notification in the field of view, In some embodiments, the first audio alert is output continuously throughout display of or during movement of the first notification in the field of view, In some embodiments, the first audio alert is output upon the first notification reaching a threshold range of the first position in the three-dimensional environment. In some embodiments, the first audio alert is output upon arrival of the first notification at the first position. In some embodiments, the first audio alert is not output upon initial appearance of the first notification in the field of view, and is output when the first notification is at or near the first position (e.g., at or near a bottom edge of the field of view near the location of the first user's hand, at or near a representation of the first user's hand in the currently displayed view of the three-dimensional environment, etc.). Generating a first audio alert in conjunction with displaying the first notification at the first position provides improved audio feedback to the user (e.g., the computer system provides both audio feedback in addition to visual feedback, in case the user misses the visual feedback). Providing improved feedback enhances the operability of the device, which, additionally, reduces power usage and improves battery life of the device by enabling the user to use the device more quickly and efficiently.

In some embodiments, the first audio alert is started after an initial appearance of the first notification in a currently displayed view of the three-dimensional environment (e.g., upon arrival of the first notification at the first position, while the first notification is moving toward the first position, etc.). For example, in conjunction with displaying a respective representation of the first notification (e.g., the first representation 7334 in FIG. 7P, the second representation 7338 in FIG. 7R, the third representation 7336 in FIG. 7T, etc.), the computer system, optionally, generates an audio alert corresponding to the display of the respective representation of the first notification, where the display of the representation of the first notification precedes the corresponding audio alert, in accordance with some embodiments. Starting the first audio alert after an initial appearance of the first notification in a currently displayed view of the three-dimensional environment provides improved audio feedback to the user (e.g., the computer system provides both audio feedback in addition to visual feedback, in case the user misses the visual feedback). Providing improved feedback enhances the operability of the device, which, additionally, reduces power usage and improves battery life of the device by enabling the user to use the device more quickly and efficiently.

In some embodiments, while displaying the first notification in a currently displayed view of the three-dimensional environment (e.g., at the first position that is selected based on a respective position in the three-dimensional environment that corresponds to a hand of the first user in the physical environment, at an edge portion of the field of view that is selected based on its proximity to the hand of the first user, etc.), the computer system detects movement of a hand of the first user toward a respective location in the physical environment that corresponds to a current position of the first notification (e.g., toward the first position in the three-dimensional environment) in the three-dimensional environment (e.g., the representation of the hand may be outside of the currently displayed view of the three-dimensional environment during all or part of the movement of the hand toward the respective location). In response to detecting the movement of the hand of the first user toward the respective location in the physical environment that corresponds to the current position of the first notification in the three-dimensional environment, the computer system changes an appearance of the first notification (e.g., increasing a size of the first notification, displaying notification content that was not displayed at the time, adding user interface objects for responding to the notification and configuring the communication session, etc.). For example, in FIG. 7P or FIG. 7T, when the computer system detects the user's hand (e.g., a hand other than the hand 7202 to which the third representation 7336 is anchored) reaching toward a location that corresponds to the position of the displayed representation of the first notification (e.g., the first representation 7334 in FIG. 7P, the third representation 7336 in FIG. 7T, etc.), the computer system provides visual feedback including enlarging the displayed representation of the first notification, moving the displayed representation of the notification toward the hand, in accordance with some embodiments. In some embodiments, after changing the appearance of the first notification, the computer system detects movement of the hand of the first user away from the respective location in the physical environment that corresponds to the current position of the first notification (e.g., away from the first position in the three-dimensional environment) in the three-dimensional environment; and in response to detecting the movement of the hand of the first user away from the respective location in the physical environment that corresponds to the current position of the first notification in the three-dimensional environment, the computer system reverses the changes made to the appearance of the first notification (e.g., decreasing the size of the first notification, ceasing to display the notification content that was displayed at the time, removing user interface objects for responding to the notification and configuring the communication session from the first notification, etc.). Changing an appearance of the first notification in response to detecting the movement of the hand of the first user toward the respective location in the physical environment that corresponds to the current position of the first notification in the three-dimensional environment provides improved visual feedback to the user (e.g., regarding the relative position of the user's hand to the current position of the first notification in the three-dimensional environment). Providing improved feedback enhances the operability of the device, which, additionally, reduces power usage and improves battery life of the device by enabling the user to use the device more quickly and efficiently.

In some embodiments, in response to detecting the first event, the computer system displays movement of the first notification into a currently displayed view of the three-dimensional environment from a side edge or corner of the currently displayed view (e.g., as opposed to dropping down from the top edge or raising up from the bottom edge of the currently displayed view). For example, in FIG. 7P, the first representation 7334 of the first notification moves into view from a side edge or corner of the currently displayed view of the three-dimensional environment 7104, in accordance with some embodiments. Displaying movement of the first notification into a currently displayed view of the three-dimensional environment from a side edge or corner of the currently displayed view provides improved visual feedback to the user (e.g., movement of the first notification is used to draw the user's attention, and to focus the user's attention to the first position in the three-dimensional environment). Providing improved feedback enhances the operability of the device, which, additionally, reduces power usage and improves battery life of the device by enabling the user to use the device more quickly and efficiently.

In some embodiments, the first notification identifies the second user. For example, in FIG. 7P, the first representation 7334 of the first notification identifies the source of the incoming communication request that is sent from the second user, e.g., by including a username or avatar of the second user and/or a type of communication mode that is used by the second user for the communication session. In another example, in FIG. 7T, the third representation 7336 of the first notification identifies the source of the incoming communication request that is sent from the second user, e.g., by including a username or avatar of the second user and/or a type of communication mode that is used by the second user for the communication session. In some embodiments, the first notification includes an identifier or avatar of the second user. In some embodiments, the first notification identifies a type of device used by the second user for the communication session. In some embodiments, the type of device used for the communication session is based on whether the device is capable of supporting copresence of the second user with the first user in a shared three-dimensional environment, or whether the device is only capable of video communication, or audio communication. In some embodiments, the first notification identifies the type of communication mode requested by the second user (e.g., by a symbol or text), e.g., whether the communication session will be established in an augmented reality mode, or in a virtual reality mode, a standard video mode, or a voice-only mode, etc. Identifying the second user in the first notification provides improved visual feedback to the user (e.g., provides additional information to the user regarding the incoming notification). Providing improved feedback enhances the operability of the device, which, additionally, reduces power usage and improves battery life of the device by enabling the user to use the device more quickly and efficiently.

In some embodiments, in response to detecting the first event, the computer system displays the first notification with notification content for a first period of time. In accordance with a determination that the sequence of one or more user inputs that correspond to the acceptance of the incoming request for establishing the communication session have not been received after a first preset period of time of initial display of the first notification with the notification content, the computer system ceases to display at least a portion of the notification content and moves the first notification (e.g., a reduced version of the first notification that includes less or none of the notification content) to a different position in the three-dimensional environment (e.g., the first position that is selected based on the respective position in the three-dimensional environment that corresponds to the hand or wrist of the first user, a corner position, or a preset home position, etc. for ignored notifications). For example, as shown in FIGS. 7P-7R, where the first representation 7334 of the first notification includes notification content; and after the first representation 7334 is displayed for a period of time, if the computer system has not detected user input interacting with the first representation of the first notification, the computer system ceases to display the first representation 7334 of the first notification, and displays the second representation 7338 of the first notification at a different position that is anchored to the location of the user's hand, where the second representation 7338 of the first notification has less notification content than the first representation 7334 of the first notification, in accordance with some embodiments. Ceasing to display at least a portion of the notification content and moving the first notification to a different position in the three-dimensional environment in accordance with a determination that the sequence of one or more user inputs have not been received after a first preset period of time performs an operation (e.g., ceasing to display at least a portion of the notification content and moving the first notification) when a set of conditions has been met (e.g., the sequence of one or more user inputs has not been received within the first preset period of time) without requiring further user input (e.g., to manually dismiss and/or move the first notification). Performing an operation when a set of conditions has been met without requiring further user input enhances the operability of the device, which, additionally, reduces power usage and improves battery life of the device by enabling the user to use the device more quickly and efficiently.

In some embodiments, displaying the plurality of user interface objects associated with the communication session at the respective second positions in the three-dimensional environment includes maintaining a spatial relationship between the plurality of user interface objects and a representation of a physical environment in the three-dimensional environment during movement of a viewpoint of a currently displayed view of the three-dimensional environment (e.g., movement of the viewpoint caused by a movement of the first display generation component, movement of the first user as a whole, movement and rotation of the head of the first user, etc. in the physical environment). For example, in FIG. 7U, the user interface object 7342 corresponding to the communication session is, optionally, anchored to the three-dimensional environment (e.g., to the representation of the physical environment in the three-dimensional environment), and does not move in accordance with the movement of the user that causes movement of the viewpoint of the currently displayed view of the three-dimensional environment. For example, in some embodiments, in conjunction with establishing the communication session, the computer system anchors the plurality of the user interface objects to the representation of the physical environment or the coordinate system of the three-dimensional environment, and subsequent movement of the viewpoint of the currently displayed view of the three-dimensional environment does not cause movement of the plurality of user interface objects relative to the representation of the physical environment in the three-dimensional environment or relative to the three-dimensional environment. Maintaining a spatial relationship between the plurality of user interface objects and a representation of a physical environment in the three-dimensional environment during movement of a viewpoint of a currently displayed view of the three-dimensional environment reduces the number of inputs needed to interact with the plurality of user interface objects (e.g., if the user needs to perform a different task, the user does not to dismiss the plurality of user interface objects, and does not need to perform an additional gesture to redisplay the plurality of user interface objects). Reducing the number of inputs needed to perform an operation enhances the operability of the device, which, additionally, reduces power usage and improves battery life of the device by enabling the user to use the device more quickly and efficiently.

It should be understood that the particular order in which the operations in FIG. 13 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, 12000, 14000, 15000, and 16000) are also applicable in an analogous manner to method 13000 described above with respect to FIG. 13. For example, the gestures, gaze inputs, physical objects, user interface objects, controls, movements, criteria, three-dimensional environment, display generation component, surface, representation of physical object, virtual objects, and/or animations described above with reference to method 13000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, 11000, 12000, 14000, 15000, and 16000). For brevity, these details are not repeated here.

Figure 14:
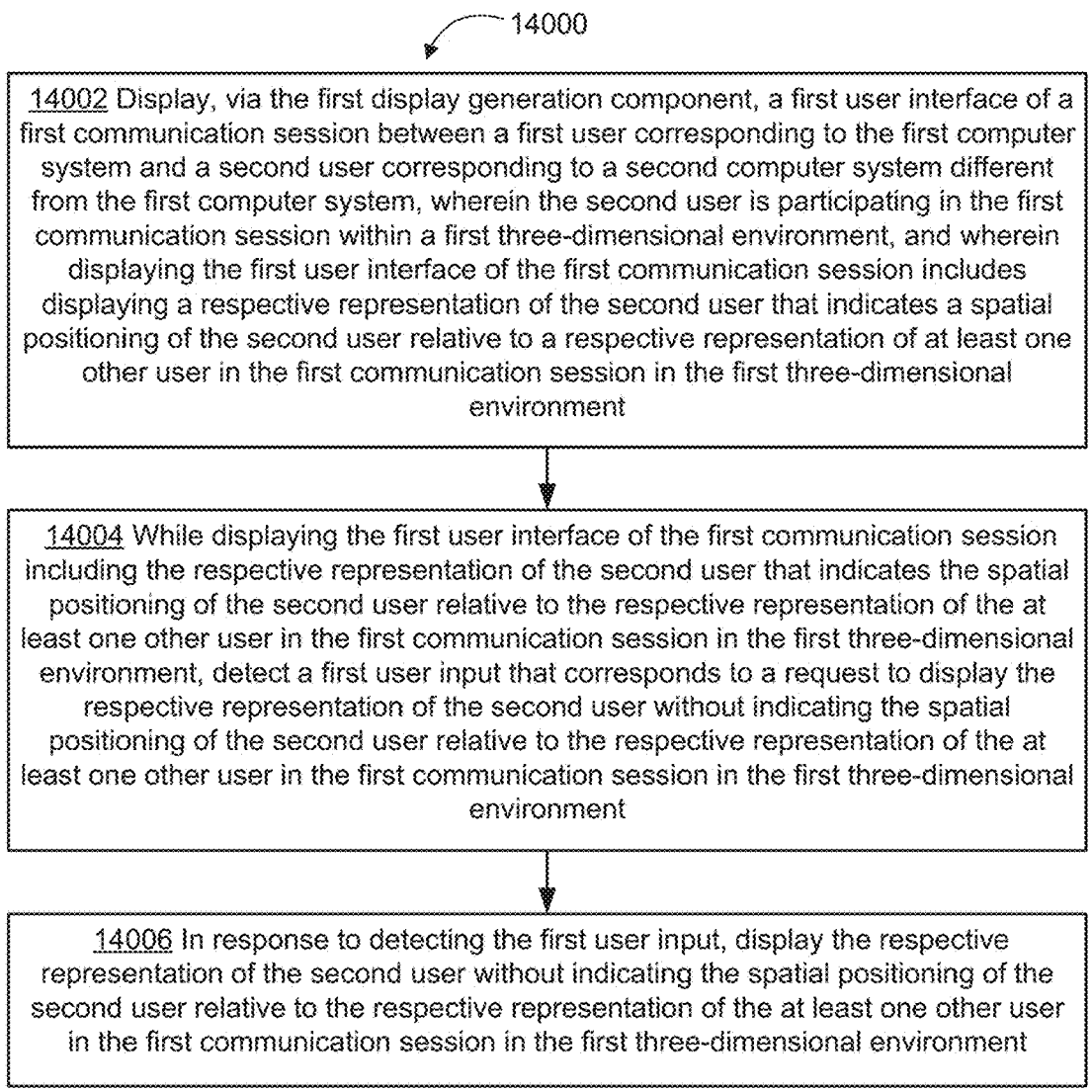
FIG. 14 is a flowchart of a method of providing a spatial mode and a non-spatial mode of a user interface of a communication session between a first user and a second user, in accordance with some embodiments.

FIG. 14 is a flowchart of a method 14000 of providing a spatial mode and a non-spatial mode of a user interface of a communication session between a first user and a second user, in accordance with some embodiments.

In some embodiments, the method 14000 is performed at a computer system (e.g., computer system 101 in FIG. 1) including a first display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 14000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 14000 are, optionally, combined and/or the order of some operations is, optionally, changed.

In some embodiments, the method 14000 is performed at a computer system (e.g., the computer system 101 in FIG. 1, the first computer system 101-t described with respect to FIGS. 7V-7X, etc.). In some embodiments, the computer system is in communication with a first display generation component (e.g., the first display generation component is a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the first display generation component is the first display generation component 7100-t described with respect to FIGS. 7V-7X. In some embodiments, the first computer system and the first display generation component (e.g., the computer system(s) 101 and the first display generation component(s) 7100 described with respect to FIGS. 7A-7U, and 7Y-Z, etc.) are capable of providing an immersive three-dimensional experience in a three-dimensional environment (e.g., an augmented reality environment, a virtual reality environment, etc.), but may be temporarily restricted to only allow video and audio communication with another user in a communication session. In some embodiments, the first computer system and the first display generation component are not capable of providing an immersive three-dimensional experience in a three-dimensional environment. In some embodiments, a computer system that provides an immersive experience in a three-dimensional environment changes a viewpoint from which the three-dimensional environment is presented to the user of the computer system in accordance with the rotation of the user's head relative to the physical environment (e.g., how the user normally changes his/her viewpoint in the physical environment). In some embodiments, although a computer system, such as a tablet device or handheld device may be capable of providing a viewport into an augmented reality view of the physical environment on the display of the tablet device or handheld device, the augmented reality view is not immersive, because rotation of the user's head relative to the display of the computer system does not cause the computer system to update the viewpoint of the augmented reality view. Similarly, although a computer system, such as a tablet device or handheld device may be capable of providing a viewport into a virtual three-dimensional environment on the display of the tablet device or handheld device, the view of the three-dimensional environment is not immersive, because rotation of the user's head relative to the display of the computer system does not cause the computer system to update the viewpoint of the currently displayed view of the virtual three-dimensional environment. Many of the features of the method 14000 are described with respect to FIGS. 7V-7X, in accordance with some embodiments. In some embodiments, the second computer system and the second display generation component described herein are analogous to the computer system(s) 101 and the first display generation component(s) 7100 described with respect to FIGS. 7A-7U and 7Y-7Z.

In the method 14000, the first computer system displays (14002), via the first display generation component, a first user interface of a first communication session between a first user corresponding to the first computer system (e.g., a user of a device that does not support a fully-immersive co-presence experience in a communication session and only supports a video and/or audio-only communication session, a user of a device that is participating in the communication session in a video-only or audio-only mode, etc.) and a second user corresponding to a second computer system different from the first computer system (e.g., a user of a device that supports a fully-immersive co-presence experience in a communication session and that is participating in the communication session in an immersive mode), wherein the second user is participating in the first communication session within a first three-dimensional environment (e.g., a three-dimensional environment on which AR or VR environments shown to the participants of the communication session are constructed), and wherein displaying the first user interface of the first communication session includes displaying a respective representation of the second user that indicates a spatial positioning of the second user relative to a respective representation of at least one other user in the first communication session in the first three-dimensional environment. For example, as shown in FIGS. 7V-7W, the first user 7200 is using the first computer system 101-*t* and the first display generation component 7100-*t* to participate in a communication session with the second user (e.g., represented by representation 7203') who is using a second computer system and a second display generation component, where the second computer system displays a view of the first three-dimensional environment 7207 with a viewpoint that moves in accordance with the movement of the second user's head in the second user's physical environment, in accordance with some embodiments. In some embodiments, the second computer system and the second display generation component are integrated into a single housing and worn by the second user on the second user's head or in front of the second user's eyes, provides an immersive three-dimensional experience to the second user in the first three-dimensional environment 7207 in the communication session. In FIGS. 7V-7W, the first computer system 101-*t* is displaying a spatial mode of the first user interface of the communication session, where the representation 7203' of the second user is displayed with an appearance that indicates its spatial positioning relative to the viewpoint of the view 7106 of the first three-dimensional environment 7207, as well as relative to the representation 7305' of a third user who also participates in the communication session, in accordance with some embodiments. As shown in FIG. 7V-7W, as the second user moves around in his/her own physical environment, the virtual position of the second user's representation 7203' changes in the first three-dimensional environment 7207, and that change is visually indicated in the view 7106 of the first three-dimensional environment 7207, in accordance with some embodiments. Furthermore, the first computer system 101-*t*, optionally, changes the viewpoint of the view 7106 of the first three-dimensional environment 7207 in accordance with movement or user input from the first user 7200, and the first computer system also changes the appearance of the representation 7203' of the second user to visually indicate the movement of the viewpoint of the view 7106 of the first three-dimensional environment presented in the first user interface displayed in the spatial mode, in accordance with some embodiments. For example, the respective representation of the second user is located in the first three-dimensional environment relative to a respective representation of the first user in the first three-dimensional environment and/or where the respective representation of the second user is located in the first three-dimensional environment relative to a respective representation of a third user in the first three-dimensional environment, etc. In some embodiments, the view of the first three-dimensional environment may be augmented with a representation of a respective physical environment of a respective participant of the first communication session, or virtual elements chosen by the respective participant for the first communication session in the user interface of the communication session shown by the display generation component of the respective participant; but the spatial positioning of the participants relative to one another is based on the same reference frame of the first three-dimensional environment and shared among the participants; and the spatial positioning of the participants in the first three-dimensional environment are reflected by the positioning and viewing angle of the representations of the participants in the respective user interfaces of the communication session shown via the respective display generation components of the participants. For example, in some embodiments, the AR view of the first three-dimensional environment shown via the first display generation component to the first user includes a representation of the first physical environment of the first user, while the immersive view of the first three-dimensional environment shown via a second display generation component to the second user includes a representation of a second physical environment of the second user, or includes virtual objects that are not shown in the AR view displayed via the first display generation component. In some embodiments, when the first user interface of the first communication session is displayed in the AR mode via the first display generation component, the position of the representation of the second user is shown relative to the position of the viewpoint of a first AR view of the first three-dimensional environment (e.g., the viewpoint has a position in the first three-dimensional environment that corresponds to the position of the first user in the first physical environment), and, optionally, relative to the representation of at least one other user that is also participating in the communication session (e.g., another user that participates in the communication session using an HMD or another user that participates in the communication session using a tablet device). In some embodiments, the first user interface of the first communication session optionally includes the representation of the second user and, optionally, the representation of the at least one other user, in a view of a virtual three-dimensional environment (e.g., in a VR mode) that is based on the first three-dimensional environment, where the positioning of the representations of the participants are indicated in the view of the virtual three-dimensional environment. In some embodiments, the first user interface of the first communication session is displayed in a showcase or gallery mode via the first display generation component, and the representation of the second user, and, optionally, the representation of the at least one other user, are displayed in a preset layout (e.g., in a two-dimensional grid, in a row, in a default or user-configured layout, etc.) that are independent of the positions and movements of the participants in their respective physical environments and independent of the virtual positions of the representations of the participants in the first three-dimensional environment. In some embodiments, the first computer system uses the AR mode to display the representations of the participants (e.g., the representation of the second user, and optionally the representation of the third user different from the first user and the second user) in the first user interface of the first communication session in response to a change in orientation of the first display generation component from a first preset orientation to a second preset orientation (e.g., from the portrait orientation to the landscape orientation, or from the landscape orientation to the portrait orientation, etc.). In some embodiments, the first user interface of the first communication session includes a first control affordance that, when activated in accordance with first preset criteria, causes the first computer system to switch to the AR mode, or to switch to the showcase mode if the current mode is the AR mode (e.g., the first control affordance is a toggle switch, or a selection affordance for the AR mode or the showcase mode).

In the method 14000, while displaying the first user interface of the first communication session including the respective representation of the second user that indicates the spatial positioning of the second user relative to the respective representation of the at least one other user in the first communication session in the first three-dimensional environment (e.g., while displaying the first user interface in the AR mode, or the VR mode based on the first three-dimensional environment), the first computer system detects (14004) a first user input that corresponds to a request to display the respective representation of the second user without indicating the spatial positioning of the second user relative to the respective representation of the at least one other user in the communication session in the first three-dimensional environment (e.g., the first user input is a user input selecting a showcase or gallery mode for displaying the participants of the communication session in a preset layout, the first user input is a rotation of the first display generation component from a first preset orientation to a second preset orientation, etc.). In response to detecting the first user input, the first computer system displays (14006) the respective representation of the second user without indicating the spatial positioning of the second user relative to the respective representation of the at least one other user in the first communication session in the first three-dimensional environment (e.g., displaying the respective representations of the participants of the first communication session in a grid or on a plane in accordance with a preset layout (e.g., at positions that are fixed relative to one another, and independent of the virtual positions of the participants in the first three-dimensional environment)). As shown in FIG. 7X following FIG. 7V, the first computer system 101-*t* detects that the first user has rotated the first display generation component 7100-*t* from a landscape orientation to a portrait orientation; and in response to detecting the rotation of the first display generation component 7100-*t*, the first computer system 101-*t* switches from displaying the first user interface of the first communication in the spatial mode (e.g., as shown in FIG. 7V) to displaying the first user interface of the first communication session in the non-spatial mode (e.g., as shown in FIG. 7X), in accordance with some embodiments. In FIG. 7X, when the first user interface of the first communication session is displayed in the non-spatial mode, the representation 7203' of the second user is displayed without indicating the spatial positioning of the second user in the first three-dimensional environment 7207, and subsequent movement of the first user and/or the second user that does not cause a mode switching of the first user interface (e.g., a movement that does not rotate the first display generation component from the portrait orientation back to the landscape orientation) does not cause changes to the representation 7302' of the second user that indicates the spatial positioning of the second user in the first three-dimensional environment 7207. The representation 7203' of the second user is, optionally, scrollable in the first user interface in response to user input from the first user (e.g., a swipe input, a tap input directed to a scroll control, etc.), but the scrolling of the representation 7203' does not reflect the virtual position of the second user in the first three-dimensional environment or the spatial relationship between the first user and the second user in the first three-dimensional environment, in accordance with some embodiments. Switching the display mode of the user interface of the communication session between a spatial mode and a non-spatial mode in response to user input allows the user to, optionally, choose between a shared three-dimensional experience and a lightweight two-dimensional experience in the communication session with another user who is participating in an immersive mode, which enhances the operability of the device and helps the user to accomplish a desired outcome without using specialized hardware, such as a head-mounted device.

In some embodiments, while the respective representation of the second user is displayed, via the first display generation component, without indicating the spatial positioning of the second user relative to the respective representation of the at least one other user in the first communication session in the first three-dimensional environment (e.g., while the first user interface of the first communication session in the showcase mode via the first display generation component): a second user interface of the first communication session is displayed via a second display generation component of the second computer system, displaying the second user interface including displaying a first view of the first three-dimensional environment via the second display generation component that is in communication with the second computer system, and displaying a respective representation of the first user that indicates a spatial positioning of the first user relative to the second user in the first three-dimensional environment (e.g., relative to a viewpoint of the first view of the first three-dimensional environment displayed via the second display generation component). For example, in FIG. 7X, while the first computer system 101-*t* displays the first user interface of the first communication session in the non-spatial mode, the second computer system displays, via the second display generation component, a view of the first three-dimensional environment 7207 in which the spatial positioning of the participants (e.g., the first user 7200, the second user, and optionally the third user, etc.) in the first three-dimensional environment 7207 is visually indicated in the view of the first three-dimensional environment 7207, in accordance with some embodiments. In some embodiments, the spatial positioning of the first user and the second user in the first three-dimensional environment are generated by the first computer system and/or the second computer system, or a server of the first communication session, and subsequently updated in accordance with user inputs received from the participants of the first communication session and/or movements of the participants in their respective physical environments. In some embodiments, the first view of the first three-dimensional environment displayed via the second display generation component to the second user is an AR view that is generated based on the first three-dimensional environment and a representation of the physical environment of the second user, and includes a representation of the physical environment of the second user. In some embodiments, the position of the representation of the first user, and optionally, the position of the representation of the third user, in the first view of the first three-dimensional environment is relative to the representation of the physical environment of the second user. In some embodiments, the position of the viewpoint of the first view of the three-dimensional environment displayed via the second display generation component corresponds to a current position of the second user in a physical environment of the second user, and is updated in accordance with movement of the second user as a whole in the physical environment of the second user as well as rotation of the head of the second user in the physical environment of the second user. Displaying a first view of the first three-dimensional environment via a second display generation component in communication with the second communication system and displaying a respective representation of the first user that indicates a spatial positioning of the first user relative to the second user provides improved visual feedback to the user (e.g., regarding the relative position of the second user). Providing improved feedback enhances the operability of the device, which, additionally, reduces power usage and improves battery life of the device by enabling the user to use the device more quickly and efficiently.

In some embodiments, in accordance with a second user input from the second user that moves the respective representation of the first user in the first view of the first three-dimensional environment (e.g., by dragging the respective representation of the first user from one position to another position in the first view, by flicking it across the first view using an in-air hand gesture, etc.), the respective representation of the first user in the first view of the first three-dimensional environment is moved by the second computer system to indicate an update to the spatial positioning of the first user relative to the second user in the first three-dimensional environment, without causing a corresponding change in the first user interface of the first communication session displayed via the first display generation component (e.g., the representations of the participants in the first communication session are still shown in the preset layout in the first user interface of the first communication session displayed via the first display generation component). For example, in FIG. 7X, while the first computer system 101-t displays the first user interface of the first communication session in the non-spatial mode, the second computer system displays, via the second display generation component, a view of the first three-dimensional environment 7207 in which the spatial positioning of the participants (e.g., the first user 7200, the second user, and optionally the third user, etc.) in the first three-dimensional environment 7207 is visually indicated in the view of the first three-dimensional environment 7207, in accordance with some embodiments. The second computer system, optionally, allows the second user to move the representation of the first user 7200 in the view of the first three-dimensional environment 7207 displayed to the second user to cause change in the positioning of the first user 7200 in the view of the first three-dimensional environment 7207 shown by the second display generation component to the second user, but not to cause change in the first user interface displayed in the non-spatial mode by the first display generation component 7100-t, in accordance with some embodiments. For example, in some embodiments, when the first computer system is displaying the first user interface of the first communication session in the showcase mode where the representations of the participants are displayed in a grid or on a plane at positions that are fixed relative to one another, if the second user moves the representation of the first user in the view of the three-dimensional environment displayed via the second display generation component, the first computer system will not make any changes to the positions of the representations of the participants in the preset layout of participants in the showcase mode. In some embodiments, the first computer system optionally receives and stores the changes in the positions of one or more of the participants and uses the information to configure how the representations of the participants will be arranged in an AR mode based on the first three-dimensional environment when the first computer system switches back to the AR mode in response to another input from the first user. Moving the respective representation of the first user to indicate an update to the spatial positioning of the first user relative to the second user, without causing a corresponding change in the first user interface displayed via the first display generation component, and in accordance with a second user input from the second user that moves the respective representation of the first user in the first view reduces the number of inputs needed to reposition a representation of a user (e.g., the second user can reposition the representation of the first user without interfering with the first user interface that the first user sees, which may cause the first user to reposition the representation of the second user). Reducing the number of inputs needed to perform an operation enhances the operability of the device, which, additionally, reduces power usage and improves battery life of the device by enabling the user to use the device more quickly and efficiently.

In some embodiments, while the respective representation of the second user is displayed via the first display generation component with the indication of the spatial positioning of the second user relative to the respective representation of the at least one other user in the first communication session in the first three-dimensional environment, the second user interface of the first communication session is displayed by the second computer system, where displaying the second user interface of the first communication session includes displaying the first view of the first three-dimensional environment via the second display generation component that is in communication with the second computer system, and displaying the respective representation of the first user that indicates the spatial positioning of the first user relative to the second user in the first three-dimensional environment (e.g., relative to a viewpoint of the first view of the first three-dimensional environment displayed via the second display generation component), and wherein the respective representation of the first user is not controlled by inputs received from the second user (e.g., the position of the respective representation of the first user shown in the first view of the first three-dimensional environment displayed via the second display generation component is controlled by inputs received from the first user, inputs from the first computer system, or automatically determined by the second computer system, etc.). For example, in FIG. 7V, while the first computer system 101-t displays the first user interface of the first communication session in the spatial mode, the second computer system displays, via the second display generation component, a view of the first three-dimensional environment 7207 in which the spatial positioning of the participants (e.g., the first user 7200, the second user, and optionally the third user, etc.) in the first three-dimensional environment 7207 is visually indicated in the view of the first three-dimensional environment 7207, in accordance with some embodiments. The second computer system, optionally, does not allow the second user to move the representation of the first user 7200 in the view of the first three-dimensional environment 7207 displayed to the second use, and does not allow the second user to cause change in the first user interface displayed in the spatial mode by the first display generation component 7100-t, in accordance with some embodiments. In some embodiments, when the first computer system is displaying the first user interface of the first communication session in the AR mode where the representations of the participants are displayed in an AR view of the first three-dimensional environment at positions that may move relative to one another based on the movement of the participants in their respective physical environment, if the second user tries to moves the respective representation of the first user in the first view of the first three-dimensional environment displayed via the second display generation component, neither the first computer system, nor the second computer system will make any changes to the positions of the representations of the participants in the currently displayed views of the first three-dimensional environment. In some embodiments, the second computer system optionally ignores the input from the second user that attempts to move the respective representation of the first user in the first view of the first three-dimensional environment, and issues an alert that the first user is participating in the first communication session using an AR mode, and his/her representation cannot be moved by the second user. Displaying the respective representation of the first user wherein the respective representation of the first user is not controlled by inputs received from the second user, reduces the number of inputs needed to reposition a representation of a user (e.g., no additional inputs are needed to reposition the respective representation of the first user, as the second user cannot accidentally reposition the respective representation of the first user). Reducing the number of inputs needed to perform an operation enhances the operability of the device, which, additionally, reduces power usage and improves battery life of the device by enabling the user to use the device more quickly and efficiently.

In some embodiments, while displaying the first user interface of the first communication session including the respective representation of the second user that indicates the spatial positioning of the second user relative to the representation of the at least one other user in the first communication session in the first three-dimensional environment (e.g., while the first computer system is displaying the first user interface in the AR mode, or VR mode), the first computer system detects a third user input that corresponds to a request to move a virtual position of the first user in the first three-dimensional environment (e.g., detecting first movement of the first display generation component in the first physical environment caused by the first user holding the first display generation component, or detecting an input on an input device in communication with the first computer system (e.g., a swipe input, a drag input, activation of a controller or a virtual affordance, etc.), etc.). In response to detecting the third user input that corresponds to the request to move the virtual position of the first user in the first three-dimensional environment, the first computer system changes the virtual position of the first user in the first three-dimensional environment (e.g., and optionally, updating the first user interface of the first communication session including the representation of the second user to indicate a changed spatial positioning of the second user relative to the virtual position of the first user in the three-dimensional environment, and causing an update to the position of the representation of the first user shown in a view of the first three-dimensional environment displayed via the second display generation component, etc.). For example, as shown in FIGS. 7V-7W, while the first computer system 101-*t* displays the first user interface of the first communication session in the spatial mode, the first computer system detects inputs such as movement of the first user 7200 or the first display generation component 7100-*t* in the physical environment 100, and/or a swipe or pinch input on the touch-screen display of the first display generation component 7100-*t*, etc., and the first computer system 101-*t*, optionally, moves the virtual position of the first user in the first three-dimensional environment 7207 according to the inputs from the first user, moves the viewpoint of the view 7106 of the first three-dimensional environment shown by the first display generation component 7100-*t*, and visually indicates the changed spatial positioning of the second user relative to the first user in the first three-dimensional environment 7207 in the view 7106, in accordance with some embodiments. In some embodiments, the change in the virtual position of the first user in the first three-dimensional environment results in a movement of the respective representation of the first user (e.g., rotation and/or translation) in the first view of the first three-dimensional environment shown via the second display generation component. In some embodiments, the change in the virtual position of the first user in the first three-dimensional environment results in a movement of the simulated viewpoint of the first user into the AR or VR environment based on the first three dimensional environment in which the respective representation of the second user (and respective representations of other participants) is displayed. In some embodiments, the first computer system sends the updated virtual position of the first user in the first three-dimensional environment to a server of the communication session and/or the second computer system, and causes the second computer system to update the position of the respective representation of the first user in a view of the first three-dimensional environment shown via the second display generation component (e.g., moving the respective representation of the first user relative to the viewpoint of the currently displayed view of the first three-dimensional environment, and/or relative to the representation of another participant (e.g., a third user) of the first communication session, etc.). Changing the virtual position of the first user in the first three-dimensional environment in response to detecting the third user input that corresponds to the request to move the virtual position of the first user provides additional control options without cluttering the UI with additional displayed controls (e.g., additional controls for locking or unlocking the user's ability to move their virtual position in the first three-dimensional environment). Providing additional control options without cluttering the UI with additional displayed controls enhances the operability of the device, which, additionally, reduces power usage and improves battery life of the device by enabling the user to use the device more quickly and efficiently.

In some embodiments, detecting the third user input that corresponds to the request to move the virtual position of the first user in the first three-dimensional environment includes detecting first movement of the first display generation component in a first physical environment of the first user (e.g., the first user holding the first display generation component and moving it in the physical environment, the first display generation component moving in the first physical environment in response to a user input of the first user, etc.). For example, in FIGS. 7V-7W, while the first computer system 101-*t* displays the first user interface of the first communication session in the spatial mode, the first computer system detects inputs such as movement of the first user 7200 or the first display generation component 7100-*t* in the physical environment 100, and the first computer system 101-*t*, optionally, moves the virtual position of the first user in the first three-dimensional environment 7207 according to the inputs from the first user, moves the viewpoint of the view 7106 of the first three-dimensional environment shown by the first display generation component 7100-*t*, and visually indicates the changed spatial positioning of the second user relative to the first user in the first three-dimensional environment 7207 in the view 7106, in accordance with some embodiments. In some embodiments, changing the virtual position of the first user in the first three-dimensional environment includes moving the virtual position of the first user in the first three-dimensional environment in accordance with the movement of the first display generation component in the physical environment of the first user. For example, in response to a rotation of the first display generation component around a vertical axis that passes through a position of the first user in the first physical environment, the first computer system updates a facing direction of the simulated viewpoint of the first user by an amount that corresponds to the amount of rotation of the first display generation component. In another example, in response to translation of the first display generation component in a forward direction in the first physical environment relative to the current position of the first user in the first physical environment, the first computer system moves the virtual position of the first user in the first three-dimensional environment by an amount and in a direction that corresponds to the amount and direction of the movement of the first display generation component in the first physical environment. In some embodiments, changing the virtual position of the first user in the first three-dimensional environment includes moving the virtual position of the first user in the first three-dimensional environment in accordance with one or more characteristics of the movement of the first display generation component (e.g., timing, duration, movement distance, direction, acceleration, positions, path, etc.) in the first physical environment. Detecting the third user input that corresponds to the request to move the virtual position of the first user, including detecting first movement of the first display generation component in a first physical environment of the first user, provides additional control options without cluttering the UI with additional controls (e.g., additional controls for moving the virtual position of the first user in the first three-dimensional environment). Providing additional control options without cluttering the UI with additional displayed controls enhances the operability of the device, which, additionally, reduces power usage and improves battery life of the device by enabling the user to use the device more quickly and efficiently.

In some embodiments, detecting the third user input that corresponds to the request to move the virtual position of the first user in the first three-dimensional environment includes detecting a predefined gesture input provided by the first user that includes movement of a hand of the first user (e.g., a swipe gesture on a touch-screen display that serves as the first display generation component, a tap gesture on a control affordance for moving the viewpoint of the currently displayed AR view, a swipe input or joystick input for moving the viewpoint of the currently displayed AR view, etc.). For example, as shown in FIGS. 7V-7W, while the first computer system 101-t displays the first user interface of the first communication session in the spatial mode, the first computer system detects inputs such as a swipe or pinch input on the touch-screen display of the first display generation component 7100-t, etc., and the first computer system 101-t, optionally, moves the virtual position of the first user in the first three-dimensional environment 7207 according to the inputs from the first user, moves the viewpoint of the view 7106 of the first three-dimensional environment shown by the first display generation component 7100-t, and visually indicates the changed spatial positioning of the second user relative to the first user in the first three-dimensional environment 7207 in the view 7106, in accordance with some embodiments. In some embodiments, the gesture input and the movement of the first display generation component can be detected by the first computer system at the same time, and, optionally, one or both are used to determine the movement of the virtual position of the first user in the first three-dimensional environment. In some embodiments, changing the virtual position of the first user in the first three-dimensional environment includes moving the virtual position of the first user in the first three-dimensional environment in accordance with one or more characteristics of the gesture input provided by the first user (e.g., timing, duration, movement distance, direction, acceleration, positions, path, etc.). Detecting the third user input that corresponds to the request to move the virtual position of the first user, including detecting a predefined gesture input provided by the first user that includes movement of a hand of the first user, provides additional control options without cluttering the UI with additional controls (e.g., additional controls for moving the virtual position of the first user in the first three-dimensional environment). Providing additional control options without cluttering the UI with additional displayed controls enhances the operability of the device, which, additionally, reduces power usage and improves battery life of the device by enabling the user to use the device more quickly and efficiently.

In some embodiments, while displaying the first user interface of the first communication session including the respective representation of the second user that indicates the spatial positioning of the second user relative to the representation of the at least one other user in the communication session in the first three-dimensional environment (e.g., while the first computer system is displaying the first user interface in the AR mode, or VR mode), and in response to detecting the third user input that corresponds to the request to move the virtual position of the first user in the first three-dimensional environment (e.g., the user input received from the first user), the first computer system updates the first user interface of the first communication session, including updating the respective representation of the second user to indicate a changed spatial positioning of the second user relative to the virtual position of the first user in the first three-dimensional environment. For example, as shown in FIGS. 7V-7W, while the first computer system 101-t displays the first user interface of the first communication session in the spatial mode, the first computer system detects inputs such as movement of the first user 7200 or the first display generation component 7100-t in the physical environment 100, and/or a swipe or pinch input on the touch-screen display of the first display generation component 7100-t, etc., and the first computer system 101-t, optionally, moves the virtual position of the first user in the first three-dimensional environment 7207 according to the inputs from the first user, moves the viewpoint of the view 7106 of the first three-dimensional environment shown by the first display generation component 7100-t, and visually indicates the changed spatial positioning of the second user relative to the first user in the first three-dimensional environment 7207 in the view 7106, in accordance with some embodiments. For example, in some embodiments, the respective representation of the second user, optionally, appears closer to the first user as a result of the update to the first user interface of the first communication session (e.g., when the first user walks forward when the first display generation component in his/her hand); and the respective representation of the second user may appear to shift to the left relative to the first user as a result of the update to the first user interface of the first communication session (e.g., when the first user moves the first display generation component rightward in the first physical environment). In some embodiments, the respective representation of the second user may block the view of a representation of a third user from the viewpoint of the currently displayed view of the first three-dimensional environment shown via the first display generation component. In some embodiments, as a result of the update to the first user interface, the respective representation of the second user may block a different portion of the representation of the first physical environment in the currently displayed view of the first three-dimensional environment that is shown via the first display generation component. Moving the virtual position of the first user to indicate a changed spatial positioning of the second user relative to the virtual position of the first user in the first three-dimensional environment provides improved visual feedback to the user (e.g., regarding their relative location to other user's in the first three-dimensional environment). Providing improved feedback enhances the operability of the device, which, additionally, reduces power usage and improves battery life of the device by enabling the user to use the device more quickly and efficiently.

In some embodiments, in accordance with a change in the virtual position of the first user in the first three-dimensional environment made in response to the third user input that corresponds to the request to move the virtual position of the first user in the first three-dimensional environment (e.g., while the first computer system is displaying the first user interface in the AR mode, or VR mode), a respective representation of the first user is moved from a first position (e.g., corresponding to the virtual position of the first user prior to the detection of the third user input) to a second position (e.g., corresponding to the virtual position of the first user after the detection of the third user input) in a first view (e.g., an AR view or VR view) of the first three-dimensional environment shown by the second computer system (e.g., shown to the second user via a second display generation component in communication with the second computer system (e.g., shown to the second user via an HMD, or other immersive display device, etc.)). For example, in FIGS. 7V-7W, while the first computer system 101-t displays the first user interface of the first communication session in the spatial mode, the first computer system detects inputs such as movement of the first user 7200 or the first display generation component 7100-t in the physical environment 100, and/or a swipe or pinch input on the touch-screen display of the first display generation component 7100-t, etc., and the first computer system 101-t, optionally, moves the virtual position of the first user in the first three-dimensional environment 7207 according to the inputs from the first user. In accordance with the changed virtual position of the first user in the first three-dimensional environment, the second computer system moves the representation of the first user in the view of the first three-dimensional environment 7207 shown by the second display generation component in accordance with the changed virtual position of the first user in the first three-dimensional environment 7207, in accordance with some embodiments. Moving a respective representation from a first position to a second position in a first view of the first three-dimensional environment shown by the second computer system, in accordance with a change in the virtual position of the first user in the first three-dimensional environment provides improved visual feedback to the second user (e.g., regarding movement of the first user and the new location of the first user in the first three-dimensional environment). Providing improved feedback enhances the operability of the device, which, additionally, reduces power usage and improves battery life of the device by enabling the user to use the device more quickly and efficiently.

In some embodiments, the first user interface of the first communication session includes at least a respective representation of a third user that is different from the first user and the second user. For example, in FIGS. 7V and 7X, the first user interface includes a representation 7203' of the second user, and a representation 7205' of the third user who are both participating in the communication session, in accordance with some embodiments. For example, in some embodiments, in the AR mode, the first user interface of the first communication session includes the respective representation of the second user and a respective representation of the third user that indicate the relative positioning of the second user and the third user in the first three-dimensional environment (e.g., by the relative positions of the representations of the second and third users in the AR view shown via the first display generation component), as well as positioning of the second user and the third user relative to the virtual position of the first user in the first three-dimensional environment (e.g., by the positions of the representations of the second and third users relative to the viewpoint of the AR view shown via the first display generation component). Including, in the first user interface of the first communication session, at least a respective representation of the third user that is different from the first user and the second user reduces the number of inputs needed to communicate with multiple users (e.g., the first user does not need to perform additional inputs to start a separate communication session with the third user). Reducing the number of inputs needed to perform an operation enhances the operability of the device, which, additionally, reduces power usage and improves battery life of the device by enabling the user to use the device more quickly and efficiently.

In some embodiments, displaying the respective representation of the second user that indicates the spatial positioning of the second user relative to the respective representation of the at least one other user in the first communication session in the first three-dimensional environment (e.g., displaying the first user interface in the AR mode) includes displaying the respective representation of the second user with a first orientation and displaying the respective representation of the third user with a second orientation different from the first orientation. For example, in some embodiments, the first orientation and the second orientations are respectively determined and updated in accordance with the real-time movement of the first user and the third user (e.g., rotation and translation movement) in their respective physical environments. For example, as shown in FIGS. 7V and 7W, the first display generation component 7100-t shows the first user interface of the communication session in the spatial mode, and the representation 7203' of the second user and the representation 7205' of the third user are three-dimensional or pseudo-three-dimensional avatars of the second and third users that appear to face different directions (e.g., the representation 7205' in FIG. 7W appears to have rotated relative to the state shown in FIG. 7V, while the representation 7203' has not changed its facing direction) in accordance with their facing directions in the first three-dimensional environment 7207, in accordance with some embodiments. In some embodiments, displaying the respective representation of the second user without indicating the spatial positioning of the second user relative to the respective representation of the at least one other user in the first communication session in the first three-dimensional environment (e.g., displaying the first user interface in the showcase mode, non-AR mode) includes displaying the respective representation of the second user and the respective representation of the third user with a third orientation (e.g., facing toward the second user, facing forward, facing respective preset directions, etc.). For example, the first user interface 7110 in the non-spatial mode as shown in FIG. 7X shows the representation 7203' of the second user and the representation 7205' of the third user side by side facing in the same direction (e.g., forward, toward the first user 7200 located in front of the display side of the first display generation component, etc.), in accordance with some embodiments. In some embodiments, when the second user and the third user move or turn in their respective physical environment, the representations 7203' and 7205' in the first user interface 7110 of the communication session, optionally, remain facing the same direction as before (and remain the same size as before), in accordance with some embodiments. Displaying the respective representation of the second user with a first orientation and the third user with a second orientation different from the first orientation when displaying the respective representation of the second user that indicates the spatial positioning of the second user relative to the respective representation of the at least one other user in the first three-dimensional environment, and displaying the respective representation of the second user and the respective representation of the third user with a third orientation when the respective representation of the second user without indicating the spatial positioning of the second user relative to the respective representation of the at least one other user, reduces the number of inputs needed to set the correct orientation for each respective user (e.g., the user does not need to perform additional inputs to change the orientation of each respective user). Reducing the number of inputs needed to perform an operation enhances the operability of the device, which, additionally, reduces power usage and improves battery life of the device by enabling the user to use the device more quickly and efficiently.

In some embodiments, displaying the respective representation of the second user without indicating the spatial positioning of the second user relative to the representation of the at least one other user in the first communication session in the first three-dimensional environment (e.g., displaying the first user interface in the showcase mode, non-AR mode) includes displaying the respective representation of the second user in a virtual environment (e.g., a virtual two-dimensional environment, a virtual three-dimensional environment for which the simulated viewpoint of the first user does not change in accordance with inputs of the first user, etc.). For example, in FIG. 7X, the first user interface 7110 in the non-spatial mode includes a virtual environment that does not include a representation of the physical environment 100, in accordance with some embodiments. In some embodiments, the positions of the representations of the participants in the virtual environment are preset or has a preset layout (e.g., automatically determined by the computer systems involved in the first communication session, or by user inputs or settings established prior to the start of the first communication session, etc.), and are not changed by the movement of the participants in their respective physical environments. Displaying the respective representation of the second user without indicating the spatial positioning of the second user relative to the representation of at least one other user, including displaying the respective representation of the second user in a virtual environment, provides improved visual feedback to the user (e.g., that the computer system does not know the spatial position of the second user relative to the at least one other user). Providing improved feedback enhances the operability of the device, which, additionally, reduces power usage and improves battery life of the device by enabling the user to use the device more quickly and efficiently.

In some embodiments, displaying the respective representation of the second user indicating the spatial positioning of the second user relative to the respective representation of the at least one other user in the first communication session in the first three-dimensional environment (e.g., displaying the first user interface in the AR mode) includes displaying the respective representation of the second user at a first position in a first augmented reality environment that includes a representation of the first physical environment. For example, in FIGS. 7V-7W, the view 7106 of the first three-dimensional environment 7207 shown in the first user interface in the spatial mode includes a representation of the physical environment 100 (e.g., including the representations 7004-t', 7006-t', and 7008-t' of the walls 7004, 7006, and floor 7008 in the physical environment 100), and the representation 7203' of the second user, and the representation 7205' of the third user are shown in the view 7106 in a manner than indicates their spatial positioning relative to the physical environment 100 in the first three-dimensional environment 7207, in accordance with some embodiments. In some embodiments, the first augmented reality environment is an integration of the representation of the first physical environment and the first three-dimensional environment, where the positions within the first physical environment are mapped to positions in the first three-dimensional environment, such that the representations of the participants of the first communication session are displayed at respective positions in the first augmented reality environment that correspond to their virtual positions in the first three-dimensional environment. Displaying the respective representation of the second user indicating the spatial positioning of the second user relative to the respective representation of the at least one other user, including displaying the respective representation of the second user at a first position in a first augmented reality environment that includes a representation of the first physical environment, provides improved visual feedback to the user (e.g., regarding the relative positions of the second user to the at least one other user, and the positions of users in the first physical environment). Providing improved feedback enhances the operability of the device, which, additionally, reduces power usage and improves battery life of the device by enabling the user to use the device more quickly and efficiently.

In some embodiments, the second computer system is in communication with a second display generation component (e.g., the second display generation component that provides an immersive experience in a first AR environment based on the first three-dimensional environment to the second user), (e.g., during a time when the first computer system displays the first user interface of the first communication session via the first display generation component) a second user interface of the first communication session between the first user and the second user is displayed via the second display generation component of the second computer system, wherein displaying the second user interface includes displaying a respective representation of the first user that indicates a spatial positioning of the first user relative to a respective representation of at least one other user in the first communication session in the first three-dimensional environment (e.g., where the representation of the first user is located in a second AR environment based on the first three-dimensional environment relative to the representation of the second user or where the representation of the first user is located in the AR environment based on the first three-dimensional environment relative to a representation of a third user, etc.). For example, when the first user interface of the first communication session is displayed in either the spatial mode (e.g., as shown in FIGS. 7V and 7W) or the non-spatial mode (e.g., as shown in FIG. 7X), the second computer system used by the second user displays a view of the first three-dimensional environment 7207 that includes a representation of the first user 7200 that visually indicates the spatial positioning of the first user relative to the second user, and, optionally, to the third user and/or to the second user's physical environment in the first three-dimensional environment 7207, in accordance with some embodiments. In some embodiments, the second augmented reality environment is an integration of the representation of a second physical environment of the second user and the first three-dimensional environment, where the positions within the second physical environment are mapped to positions in the first three-dimensional environment, such that the representations of the participants of the first communication session are displayed at respective positions in the second augmented reality environment that correspond to their virtual positions in the first three-dimensional environment. Displaying, via the second display generation component, a respective representation of the first user that indicates a spatial positioning of the first user relative to a respective representation of at least one other user in the first communication session in the first three-dimensional environment provides improved visual feedback to the second user (e.g., regarding the spatial position of the first user relative to a respective representation of at least one other user in the first three-dimensional environment). Providing improved feedback enhances the operability of the device, which, additionally, reduces power usage and improves battery life of the device by enabling the user to use the device more quickly and efficiently.

In some embodiments, the respective representation of the first user in the second user interface of the first communication session includes a video feed of the first user (e.g., real-time video of the first user captured during the first communication session). For example, when the first user interface of the first communication session is displayed in either the spatial mode (e.g., as shown in FIGS. 7V and 7W) or the non-spatial mode (e.g., as shown in FIG. 7X), the second computer system used by the second user displays a view of the first three-dimensional environment 7207 that includes a representation of the first user 7200 that visually indicates the spatial positioning of the first user relative to the second user, and, optionally, to the third user and/or to the second user's physical environment in the first three-dimensional environment 7207, and where the representation of the first user includes a live video feed of the first user received from the first computer system, in accordance with some embodiments. Displaying, via the second display generation component, a respective representation of the first user that includes a video feed and that indicates a spatial positioning of the first user relative to a respective representation of at least one other user in the first communication session in the first three-dimensional environment provides improved visual feedback to the second user (e.g., regarding the spatial position of the first user relative to a respective representation of at least one other user in the first three-dimensional environment). Providing improved feedback enhances the operability of the device, which, additionally, reduces power usage and improves battery life of the device by enabling the user to use the device more quickly and efficiently.

In some embodiments, the second computer system (e.g., during a time when the first computer system displays the first user interface of the first communication session via the first display generation component) detects a fourth user input from the second user that corresponds to a request to move the respective representation of the first user in the first three-dimensional environment (e.g., a user input from the second user that drags the representation of the first user from a first position to a second position in a second AR view based on the first three-dimensional environment, a user input from the second user that swipes the representation of the first user to the side in the second AR view based on the first three-dimensional environment, etc.); and in response to detecting the fourth user input from the second user, the second computer system moves the respective representation of the first user in the second user interface of the first communication session to change the spatial positioning of the first user relative to the respective representation of the at least one other user in the first communication session in the first three-dimensional environment. For example, when the first user interface of the first communication session is displayed in either the non-spatial mode (e.g., as shown in FIG. 7X), the second computer system used by the second user displays a view of the first three-dimensional environment 7207 that includes a representation of the first user 7200 that visually indicates the spatial positioning of the first user relative to the second user, and, optionally, to the third user and/or to the second user's physical environment in the first three-dimensional environment 7207. If the second computer system detects a user input from the second user that moves the representation of the first user in the view of the first three-dimensional environment 7207 displayed via the second display generation component, the second computer system updates the virtual position of the first user in the first three-dimensional environment, and displays the first representation of the first user at the updated position in the view of the first three-dimensional environment shown by the second display generation component in accordance with the user input from the second user, in accordance with some embodiments. Moving the representation of the first user in the second user interface of the first communication session to change the spatial positioning of the first user relative to the respective representation of the at least one other user in the first communication session in the first three-dimensional environment, in response to detecting the fourth user input corresponding to a request to move the respective representation of the first user in the first three-dimensional environment provides improved visual feedback to the second user (e.g., regarding the updated spatial position of the first user relative to the at least one other user). Providing improved feedback enhances the operability of the device, which, additionally, reduces power usage and improves battery life of the device by enabling the user to use the device more quickly and efficiently.

In some embodiments, the first computer system displays, via the first display generation component, the first user interface of the first communication session between the first user and the second user, including displaying a respective representation of the first user at a preset position in the first user interface. As shown in FIGS. 7V and 7X, the self-view 7200" of the first user 7200 is shown in the first user interface of the first communication session at a preset position, in accordance with some embodiments. In some embodiments, the second computer system displays, via the second display generation component, a representation of the second user overlaying, replacing display of, or blocking a portion of the view of the first three-dimensional environment displayed by the second display generation component, in accordance with some embodiments. In some embodiments, displaying, via the second display generation component, the second user interface of the first communication session between the first user and the second user includes displaying a respective representation of the second user at a preset position in the second user interface. In some embodiments, the preset position for displaying a self view of a respective participant (e.g., the first user, the second user, etc.) in the user interface of the first communication session in independent of a change in location and orientation of the respective participant and/or independent of a change in location and orientation of a respective display generation component in a physical environment of the respective participant. In some embodiments, the preset position is fixed relative to a field of view provided via the respective display generation component used by the respective participant. In some embodiments, the preset position is locked to a virtual position of a head or eyes of the respective participant in the first three-dimensional environment. In some embodiments, the view of the first three-dimensional environment displayed via the respective display generation component used by the respective participant includes a picture-in-picture view of a live video feed or an animated avatar of the respective participant as seen by the other participants of the communication session. Displaying a respective representation of the first user at a preset position in the first user interface of the first communication session provides improved visual feedback to the first user (e.g., regarding the representation of the first user that is seen by other users in the first communication session). Providing improved feedback enhances the operability of the device, which, additionally, reduces power usage and improves battery life of the device by enabling the user to use the device more quickly and efficiently.

In some embodiments, the respective representation of the second user (e.g., when the first user interface is displayed in a showcase mode, when the representation of the second user is displayed in a self view in the second user interface of the first communication session, etc.) includes an avatar (e.g., an animated character with facial expressions and optionally hand gestures) of the second user that corresponds to a preset camera angle and/or imaging distance. For example, in FIG. 7X, when the first user interface 7110 of the first communication session is displayed in the non-spatial mode, the representations of the second user and the third user appear to be captured by a virtual camera having a preset camera distance and camera angle, irrespective of the facing directions and positions of the second user and the third user in their respective environments, in accordance with some embodiments. In some embodiments, when the first user and the second user are the only participant in the communication session, when the avatars of first user and the third user are shown in the showcase mode via the first display generation component, etc., the avatars of the participants have an appearance that correspond to a preset camera angle and imaging distance, such that the size and orientation of the avatars appear consistent among the participants. In some embodiments, for a respective participant of the first communication session that uses a device that provides an immersive experience in the first three-dimensional environment of the first communication session (e.g., the second user, the third user, etc.), the computer system used by the respective participant generates an avatar of the respective participant based on a preset imaging distance and/or camera angle, irrespective of whether the respective participant has moved or turned in his/her own physical environment, and that avatar is used in the self-view of the respective participant as well as in the showcase view of all the participants. In some embodiments, a respective participant (e.g., the second user or the third user) may move forward in his/her physical environment, but the representation of the respective participant in the first user interface shown via the first display generation component remains unchanged in size and position. In some embodiments, the second user may be facing south in his/her physical environment, and the third user may be facing east in his/her physical environment, but the representation of the second user and the representation of the third user in the AR environment or two-dimensional UI shown via the first display generation component are both facing the same direction toward the first user. Displaying the respective representation of the second user, including an avatar of the second user, with a preset camera angle and/or imaging distance reduces the number of inputs needed to display the respective representation of the second user (e.g., no additional inputs are needed to adjust the camera angle or imaging distance to ensure the respective representation of the second user can be comfortably viewed). Reducing the number of inputs needed to perform an operation enhances the operability of the device, which, additionally, reduces power usage and improves battery life of the device by enabling the user to use the device more quickly and efficiently.

In some embodiments, the first computer system displays a media player object in a shared region of the first three-dimensional environment (e.g., displaying the media player object in a first portion of the first AR view based on the first three-dimensional environment, where the first portion of the first AR view corresponds to the shared region of the first three-dimensional environment), wherein the media player object is shown via the first display generation component in the first user interface of the first communication session (and via the second display generation component in the second user interface of the first communication session, and via a third display generation component in a third user interface of the first communication session, etc.), wherein the media player object includes a video that is playing. In some embodiments, the second computer system displays the media player object in a second portion of the second AR view based on the first three-dimensional environment, where the second portion of the second AR view corresponds to the shared region of the first three-dimensional environment as well. In some embodiments, the media player object is placed into the shared region of the first three-dimensional environment in response to a request from the first user, or a request from the second user, or a request from the third user, etc. In some embodiments, in response to receiving, via the second computer system (or via the first computer system, or via the third computer system, etc.), a fifth user input that corresponds to a request to move the media player object from a third position to a fourth position within the shared region of the first three-dimensional environment, the first computer system moves the media player object in the first user interface of the first communication session (and optionally in the second user interface, and the third user interface, etc. of the first communication session) to indicate the changed position of the media player object in the first three-dimensional environment. For example, in FIG. 7V, as the first computer system is displaying the first user interface in the spatial mode, one of the first user, the second user, and the third user, shares a media object in a shared region of the first three-dimensional environment. As a result, the computer systems used by the users display the media object in a media player in the respective views of the first three-dimensional environment 7207 in the share region, using their respective display generation components. If a respective computer system of a respective participant of the communication session receives user input from the respective participant that corresponds to a request to move the media player within the shared region, the respective computer system changes the virtual position and facing direction of the media player in the first three-dimensional environment 7207 in accordance with the user input; and as a result, the respective computer system as well as computer systems used by other participants update their views of the first three-dimensional environment to reflect the changed virtual position and facing direction of the media player, in accordance with some embodiments. Moving the media player object to indicate the changed position of the media player object in the first three-dimensional environment, in response to receiving a fifth user input corresponding to a request to move the media player object to a fourth position in the shared region of the first three-dimensional environment, provides improved visual feedback to the user (e.g., regarding the new position of the media player object, particularly if moved by another user). Providing improved feedback enhances the operability of the device, which, additionally, reduces power usage and improves battery life of the device by enabling the user to use the device more quickly and efficiently.

In some embodiments, the first user interface of the first communication session includes a first affordance that, when activated in accordance with preset criteria, causes display of the respective representation of the second user that indicates the spatial positioning of the second user relative to the representation of the at least one other user in the first communication session in the first three-dimensional environment (e.g., to switch to displaying the AR mode of the first user interface). For example, in FIGS. 7V-7W, and 7X, the first computer system, optionally, displays an affordance for toggling between the spatial mode and the non-spatial mode of the first user interface, which, when activated by the first user 7200, causes the first computer system 101-t to change the display mode of the first user interface of the first communication session (e.g., optionally, irrespective of the orientation of the first display generation component 7100-t), in accordance with some embodiments. In some embodiments, the first affordance is a switch or control that toggles between an AR mode in which the representations of the participants are displayed in a manner to indicate the spatial positioning of the participants in the first three-dimensional environment, and a showcase mode in which the representations of the participants are displayed in a different manner without indicating the spatial positioning of the participants in the first three-dimensional environment, in response to inputs that activate the affordance (e.g., an in-air tap gesture, a swipe gesture, a flick gesture, a tap gesture, etc.). Including, in the first user interface of the first communication session, a first affordance that causes display of the respective representation of the second user indicating the spatial positioning of the second user relative to the at least one other user in the first communication session in the first three-dimensional environment reduces the number of inputs needed to indicate the spatial positioning of the second user relative to the at least one other user (e.g., the user can switch between indicating and not indicating the spatial positioning via the first affordance, rather than needing to start a new communication session or rejoin the first communication session with different settings). Reducing the number of inputs needed to perform an operation enhances the operability of the device, which, additionally, reduces power usage and improves battery life of the device by enabling the user to use the device more quickly and efficiently.

In some embodiments, displaying the respective representation of the second user that indicates the spatial positioning of the second user relative to the representation of the at least one other user in the first communication session in the first three-dimensional environment includes displaying the respective representation of the second user at a position that is chosen automatically by a computer system (e.g., by the first computer system, by the second computer system, by a server of the first communication session, etc.). In some embodiments, when the first computer system 101-t displays the spatial mode of the first user interface of the first communication session for the first time (e.g., as shown in FIG. 7V), the first computer system automatically selects the virtual positions of the participants in the first three-dimensional environment 7207, without regard to user input from the first user (and optionally, without regard to user input from the second user or other participants). Displaying the respective representation of the second user at a position chosen automatically by the computer system reduces the number of inputs needed to display the respective representation of the second user (e.g., users do not need to perform separate inputs to initiate display of the respective representation of the second user and to select a location for display, users do not need to perform additional inputs to reposition the respective representation of the second user for comfortable viewing, etc.). Reducing the number of inputs needed to perform an operation enhances the operability of the device, which, additionally, reduces power usage and improves battery life of the device by enabling the user to use the device more quickly and efficiently.

In some embodiments, displaying the respective representation of the second user that indicates the spatial positioning of the second user relative to the respective representation of the at least one other user in the first communication session in the first three-dimensional environment includes displaying the respective representation of the second user at a position that is chosen in accordance with an input from the second user provided through the second computer system. In some embodiments, when the first computer system 101-t displays the spatial mode of the first user interface of the first communication session for the first time (e.g., in FIG. 7V), the first computer system automatically selects the virtual positions of the participants in the first three-dimensional environment 7207, and, optionally, selects the virtual position of the first user in accordance with user input provided by the second user or other participant(s) (e.g., input dragging a placeholder representation of the first user in a view of the first three-dimensional environment 7207 shown via the display generation component(s) of the second user or other participant (s), while the request for the communication session is pending acceptance by the first user), in accordance with some embodiments. In some embodiments, the second user moves in his/her physical environment as a whole, and/or the second user repositions the representation of the first user in the second AR view of the first three-dimensional environment shown via the second display generation component, and as a result, the first computer system updates the spatial positioning of the representation of the second user relative to the viewpoint of the first user in the first AR view presented via the first display generation component accordingly. In some embodiments, the initial position of the representation of the second user in the first three-dimensional environment as shown in the first AR view displayed via the first display generation component is chosen automatically by a computer system (e.g., the first computer system, the second computer system, or a server of the first communication session, etc.), and the positions of the representations of the first user and the second user can be updated subsequently in accordance with user input received from the first user, and/or user input received from the second user. Displaying the respective representation of the second user at a position that is chosen in accordance with an input from the second user provided through the second computer system reduces the number of inputs needed to display the respective representation of the second user at a desired position (e.g., the user does not need to perform additional inputs to reposition the respective representation of the second user if the computer system automatically choses to display the respective representation of the second user at a different location). Reducing the number of inputs needed to perform an operation enhances the operability of the device, which, additionally, reduces power usage and improves battery life of the device by enabling the user to use the device more quickly and efficiently.

In some embodiments, displaying the respective representation of the second user that indicates the spatial positioning of the second user relative to the respective representation of the at least one other user in the first communication session in the first three-dimensional environment includes displaying the respective representation of the second user and a respective representation of a third user to indicate a first spatial relationship between the second user and the third user in the first three-dimensional environment. For example, as shown in FIGS. 7V and 7W, when the first user interface of the first communication session is displayed in the spatial mode, the spatial relationship between the second user and the third user in the first three-dimensional environment 7207 is visually indicated in the view 7106 of the first three-dimensional environment 7207 shown by the first display generation component 7100-*t*, in accordance with some embodiments. In some embodiments, the first spatial relationship is shown in the second user interface of the first communication session displayed via the second computer system used by the second user, and the third user interface of the first communication session displayed via the third computer system used by the third user. In some embodiments, the first spatial relationship is updated in accordance with movement of the second user as a whole and/or the movement of the third user as a whole in their respective physical environments. Displaying the respective representation of the second user and a respective representation of a third user to indicate a first spatial relationship between the second user and the third user in the first three-dimensional environment provides improved visual feedback to the user (e.g., regarding the relative position of the second and third users in the first three-dimensional environment). Providing improved feedback enhances the operability of the device, which, additionally, reduces power usage and improves battery life of the device by enabling the user to use the device more quickly and efficiently.

In some embodiments, while displaying the respective representation of the second user that indicates the spatial positioning of the second user relative to the representation of the at least one other user in the first communication session in the first three-dimensional environment (e.g., while displaying the first user interface in the AR mode), the first computer system detects a sixth user input that corresponds to a request to resize the respective representation of the second user (e.g., a hand gesture that includes movement of two fingers toward each other, or movement of two fingers away from each other after making contact with each other, etc.). In response to detecting the sixth user input that corresponds to the request to resize the respective representation of the second user, the first computer system changes a size of the respective representation of the second user in the first user interface of the first communication session in accordance with the sixth user input (e.g., in accordance with the magnitude, timing, speed, etc. of the input). In some embodiments, the size of the representation of the second user is changed without changing the spatial positioning of the second user in the first three-dimensional environment. In some embodiments, the size of the representation of the second user is changed in conjunction with changing the spatial positioning of the second user in the first three-dimensional environment (e.g., the first user becomes farther or closer to the second user in the first three-dimensional environment, as a result of the first user's input). For example, in FIG. 7V, if the first computer system 101-*t* detects a pinch input on the touch-screen display of the first display generation component 7100-*t* at a location of the second representation 7203' of the second user, the first computer system 101-*t*, optionally, changes the size of the second representation 7203' of the second user relative to the third representation 7205' of the third user, in accordance with some embodiments. In another example, in FIG. 7V, if the first computer system 101-*t* detects a pinch input on the touch-screen display of the first display generation component 7100-*t* at a location between the second representation 7203' of the second user and the third representation 7205' of the third user, the first computer system 101-*t*, optionally, changes the sizes of the second representation 7203' of the second user and the third representation 7205' of the third user, as if the virtual position of the first user has moved closer to the virtual positions of the second user and the third user in the first three-dimensional environment 7207, in accordance with some embodiments. Changing a size of the respective representation of the second user without changing the spatial positioning of the second user in the first three-dimensional environment, in accordance with the sixth user input corresponding to a request to resize the respective representation of the second user provides additional control options without cluttering the UI with additional displayed controls (e.g., additional controls for changing the size of the respective representation of the second user). Providing additional control options without cluttering the UI with additional displayed controls enhances the operability of the device, which, additionally, reduces power usage and improves battery life of the device by enabling the user to use the device more quickly and efficiently.

It should be understood that the particular order in which the operations in FIG. 14 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, 12000, 13000, 15000, and 16000) are also applicable in an analogous manner to method 14000 described above with respect to FIG. 14. For example, the gestures, gaze inputs, physical objects, user interface objects, controls, movements, criteria, three-dimensional environment, display generation component, surface, representation of physical object, virtual objects, and/or animations described above with reference to method 14000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, 11000, 12000, 13000, 15000, and 16000). For brevity, these details are not repeated here.

Figure 15:
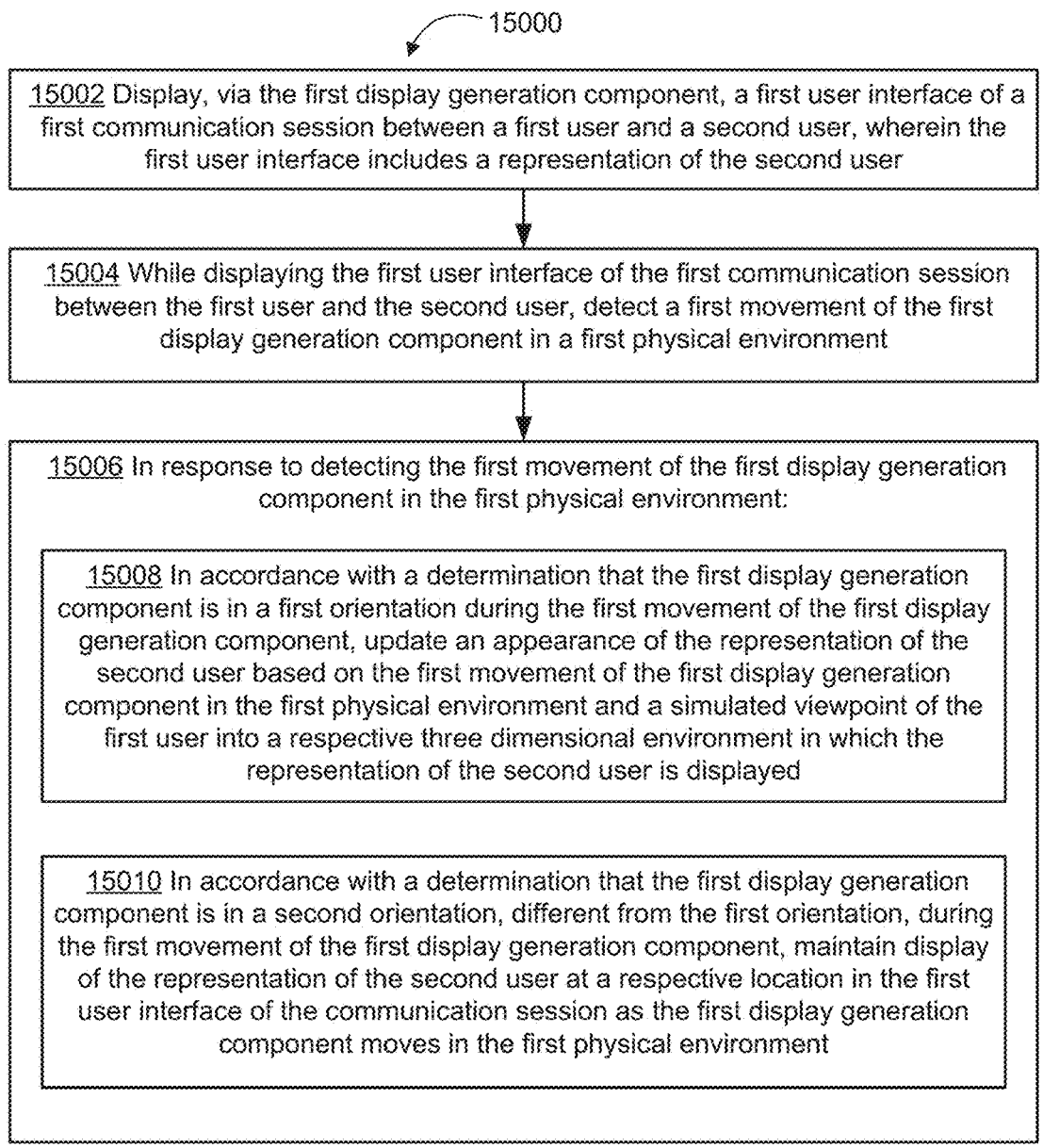
FIG. 15 is a flowchart of a method of displaying a spatial mode or a non-spatial mode of a user interface of a communication session based on an orientation of the display generation component, in accordance with some embodiments.

FIG. 15 is a flowchart of a method 15000 of displaying a spatial mode or a non-spatial mode of a user interface of a communication session based on an orientation of the display generation component, in accordance with some embodiments.

In some embodiments, the method 15000 is performed at a computer system (e.g., computer system 101 in FIG. 1) including a first display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 15000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 15000 are, optionally, combined and/or the order of some operations is, optionally, changed.

In some embodiments, the method 15000 is performed at a computer system (e.g., the computer system 101 in FIG. 1, the first computer system 101-*t* described with respect to FIGS. 7V-7X, etc.). In some embodiments, the computer system is in communication with a first display generation component (e.g., the first display generation component is a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the first display generation component is the first display generation component 7100-*t* described with respect to FIGS. 7V-7X. In some embodiments, the first computer system and the first display generation component (e.g., the computer system(s) 101 and the first display generation component(s) 7100 described with respect to FIGS. 7A-7U, and 7Y-Z, etc.) are capable of providing an immersive three-dimensional experience in a three-dimensional environment (e.g., an augmented reality environment, a virtual reality environment, etc.), but may be temporarily restricted to only allow video and audio communication with another user in a communication session. In some embodiments, the first computer system and the first display generation component are not capable of providing an immersive three-dimensional experience in a three-dimensional environment. In some embodiments, a computer system that provides an immersive experience in a three-dimensional environment changes a viewpoint from which the three-dimensional environment is presented to the user of the computer system in accordance with the rotation of the user's head relative to the physical environment (e.g., how the user normally changes his/her viewpoint in the physical environment). In some embodiments, although a computer system, such as a tablet device or handheld device may be capable of providing a viewport into an augmented reality view of the physical environment on the display of the tablet device or handheld device, the augmented reality view is not immersive, because rotation of the user's head relative to the display of the computer system does not cause the computer system to update the viewpoint of the augmented reality view. Similarly, although a computer system, such as a tablet device or handheld device may be capable of providing a viewport into a virtual three-dimensional environment on the display of the tablet device or handheld device, the view of the three-dimensional environment is not immersive, because rotation of the user's head relative to the display of the computer system does not cause the computer system to update the viewpoint of the currently displayed view of the virtual three-dimensional environment. Many of the features of the method 15000 are described with respect to FIGS. 7V-7X, in accordance with some embodiments. In some embodiments, the second computer system and the second display generation component described herein are analogous to the computer system(s) 101 and the first display generation component(s) 7100 described with respect to FIGS. 7A-7U and 7Y-7Z.

In the method 15000, the first computer system displays (15002), via the first display generation component, a first user interface of a first communication session between a first user and a second user, wherein the first user interface includes a representation of the second user. For example, as shown in FIGS. 7V and 7X, respectively, the first user interface of the first communication session includes a representation 7203' of the second user, in accordance with some embodiments. In some embodiments, the first user is a user of the first computer system and is in a position to view the first user interface of the first communication session via the first display generation component; and the second user is a user of a second computer system that is in communication with a second display generation component different from the first display generation component, where a second user interface of the communication session is displayed via the second display generation component to the second user. In some embodiments, the first user and the second user are located in different physical spaces and joins the communication session using their respective computer systems. In some embodiments, one or more other users are also in the communication session using their own computer systems and display generation components. In some embodiments, the user interfaces of the communication session include representations of each participant of the communication session (e.g., avatars of other users and a self view). In some embodiments, the first computer system is not capable of or is restricted from supporting participation of the first communication session with an immersive experience in a three-dimensional environment. In some embodiments, the first computer system and the first display generation component is a handheld device with an integrated display, a portable computer, a tablet device, etc. In some embodiments, the second computer system is capable of supporting participation of the first communication session with an immersive experience in the three-dimensional environment, and is providing a view of the three-dimensional environment with representations of other participants to the second user.

In the method 15000, while displaying the first user interface of the first communication session between the first user and the second user, the first computer system detects (15002) a first movement (e.g., translation in a first direction, a second direction, etc., rotation around a first axis, a second axis, etc.) of the first display generation component in a first physical environment (e.g., the physical environment surrounding the first computer system, the first display generation component, and the first user). For example, in FIGS. 7V and 7X, respectively, the first computer system optionally detects movement of the first display generation component 7100-*t* in the physical environment 100, in accordance with some embodiments. In some embodiments, the first movement does not cause a change in orientation of the first display generation component from a portrait orientation to a landscape orientation, and does not cause a change in orientation of the first display generation component from the landscape orientation to the portrait orientation. In some embodiments, the first movement optionally changes the angle that the display side of the first display generation component is facing relative to the physical environment and/or the first user, and optionally changes the distance and relative lateral position of the first display generation component relative to the first user and/or the physical environment.

In the method 15000, in response to detecting the first movement of the first display generation component in the first physical environment (15006): in accordance with a determination that the first display generation component is in a first orientation (e.g., the portrait orientation, the orientation associated with a spatial or AR view of participants of the communication session, the landscape orientation, etc.) (e.g., the first orientation is associated a first range of angles that the first display generation component is placed in the physical environment relative to the ground or relative to the user's face) during the first movement of the first display generation component, the first computer system updates (15008) an appearance of the representation of the second user based on the first movement of the first display generation component in the first physical environment and a simulated viewpoint of the first user into a respective three dimensional environment in which the representation of the second user is displayed (e.g., the first movement of the first display generation component changes the viewing perspective of the AR view of a virtual three-dimensional meeting space, and changes the positions of the representations of participants on the first user interface). For example, in FIGS. 7V and 7W, during the movement of the first display generation component 7100-*t* in the physical environment 100, the first display generation component 7100-*t* substantially remained in the first orientation (e.g., within a range of angles and attitudes corresponding to a landscape or upright orientation of the first display generation component 7100-*t*), and accordingly, the first computer system 101-*t* continues to display the first user interface of the first communication session in the spatial mode, and visually indicate the virtual position and facing direction of the second representation 7203' of the second user in the view 7106 of the first three-dimensional environment 7207 in accordance with the movement of the first display generation component 7100-*t* and the simulated viewpoint of the view 7106 that corresponds to the virtual position and facing direction of the first user in the first three-dimensional environment 7207, in accordance with some embodiments. In response to detecting the first movement of the first display generation component in the first physical environment (15006): in accordance with a determination that the first display generation component is in a second orientation (e.g., the landscape orientation, the orientation associated with a gallery or non-spatial view of meeting participants, the portrait orientation, etc.) (e.g., the second orientation is associated a second range of angles that the first display generation component is placed in the physical environment relative to the ground or relative to the user's face), different from the first orientation, during the first movement of the first display generation component, the first computer system maintains (15010) display of the representation of the second user at a respective location in the first user interface of the communication session as the first display generation component moves in the first physical environment (e.g., a location of the representation of the second user in the first user interface is independent of movement of the first display generation component in the first physical environment) (e.g., avatars of meeting participants do not move on the first user interface, even though the first display generation component moves in the physical environment). For example, in FIG. 7X, if the first display generation component 7100-*t* is moved in the physical environment while the first display generation component remain in the second orientation (e.g., within a range of angles and attitudes corresponding to a portrait or reclined orientation of the first display generation component 7100-*t*), and accordingly, the first computer system 101-*t* continues to display the non-spatial mode of the first user interface in which the representation 7203' of the second user does not change position in accordance with the movement of the first display generation component 7100-*t*, in accordance with some embodiments. In some embodiments, in accordance with a determination that the movement of the first display generation component 7100-*t* changes the orientation of the first display generation component 7100-*t* from the first orientation to the second orientation or from the second orientation to the first orientation, the first computer system 7100-*t* changes the display mode of the first user interface, and either moves the representation 7203' of the second user in accordance with the subsequent movement of the first display generation component (e.g., in accordance with a determination that the movement is made while the first display generation component is in the first orientation associated with the spatial mode of the first user interface), or maintain the position of the representation 7203' of the second user irrespective of the subsequent movement of the first display generation component (e.g., in accordance with a determination that the movement is made while the first display generation component is in the second orientation that is associated with the non-spatial mode of the first user interface), in accordance with some embodiments. In some embodiments, the first orientation is not just a single angle, such as a vertical orientation of the display side of the first display generation component relative to the ground with the long sides of the field of view in the vertical direction, but a range of angles (e.g., tilt slightly forward and backward (e.g., +/−30 degrees, +90 degrees and −30 degrees, etc. around a first horizontal axis), or turned slightly sideways (e.g., +/−30 degrees, +/−20 degrees around a second horizontal axis), etc.) relative to the vertical orientation. In some embodiments, the first orientation of the first display generation component allows the display side of the first display generation component to face any angle in a wide angle range (e.g., 180 degrees, 270 degrees, etc.) around a vertical axis that passes through the ground. In some embodiments, the second orientation is not just a single angle, such as a vertical orientation of the display side of the first display generation component relative to the ground with the short sides of the field of view in the vertical direction, but a range of angles (e.g., tilt slightly forward and backward (e.g., +/−30 degrees, +90 degrees and −30 degrees, etc. around a first horizontal axis), or turned slightly sideways (e.g., +/−30 degrees, +/−20 degrees around a second horizontal axis), etc.) relative to the vertical orientation. In some embodiments, the second orientation of the first display generation component allows the display side of the first display generation component to face any angle in a wide angle range (e.g., 180 degrees, 270 degrees, etc.) around a vertical axis that passes through the ground. Automatically switching the display mode of the user interface of the communication session between a spatial mode and a non-spatial mode based on an orientation of the display generation component used to display the first user interface reduces screen clutter and reduces user mistakes when interacting with the first computer system while engaged in the communication session, which enhance the operability of the device and reduce power usage and improves battery life of the device by enabling the user to use the device more quickly and efficiently.

In some embodiments, the first user interface of the communication session between the first user corresponding to the first computer system (e.g., a user of a device that does not support a fully-immersive co-presence experience in a communication session and only supports a video and/or audio-only communication session, a user of a device that is participating in the communication session in a video-only or audio-only mode, etc.) and the second user corresponding a second computer system different from the first computer system (e.g., a user of a device that supports a fully-immersive co-presence experience in a communication session and that is participating in the communication session in an immersive mode) can be displayed in two different modes via the first display generation component used by the first user. In some embodiments, the second user is participating in the communication session within a first three-dimensional environment (e.g., a three-dimensional environment on which AR or VR environments shown to the participants of the communication session are constructed), and displaying the first user interface of the communication session includes displaying a respective representation of the second user that indicates a spatial positioning of the second user relative to a respective representation of at least one other user in the communication session in the first three-dimensional environment. More features related to the spatial mode and the non-spatial mode of the first user interface are described with respect to FIG. 14 and method 14000, in accordance with some embodiments. For example, the respective representation of the second user is located in the first three-dimensional environment relative to a respective representation of the first user in the first three-dimensional environment and/or where the respective representation of the second user is located in the first three-dimensional environment relative to a respective representation of a third user in the first three-dimensional environment, etc. In some embodiments, the view of the first three-dimensional environment may be augmented with a representation of a respective physical environment of a respective participant of the first communication session, or virtual elements chosen by the respective participant for the first communication session in the user interface of the communication session shown by the display generation component of the respective participant; but the spatial positioning of the participants relative to one another is based on the same reference frame of the first three-dimensional environment and shared among the participants; and the spatial positioning of the participants in the first three-dimensional environment are reflected by the positioning and viewing angle of the representations of the participants in the respective user interfaces of the communication session shown via the respective display generation components of the participants. For example, in some embodiments, the AR view of the first three-dimensional environment shown via the first display generation component to the first user includes a representation of the first physical environment of the first user, while the immersive view of the first three-dimensional environment shown via a second display generation component to the second user includes a representation of a second physical environment of the second user, or includes virtual objects that are not shown in the AR view displayed via the first display generation component. In some embodiments, when the first user interface of the first communication session is displayed in the AR mode via the first display generation component, the position of the representation of the second user is shown relative to the position of the viewpoint of a first AR view of the first three-dimensional environment (e.g., the viewpoint has a position in the first three-dimensional environment that corresponds to the position of the first user in the first physical environment), and, optionally, relative to the representation of at least one other user that is also participating in the communication session (e.g., another user that participates in the communication session using an HMD or another user that participates in the communication session using a tablet device). In some embodiments, the first user interface of the first communication session optionally includes the representation of the second user and, optionally, the representation of the at least one other user, in a view of a virtual three-dimensional environment (e.g., in a VR mode) that is based on the first three-dimensional environment, where the positioning of the representations of the participants are indicated in the view of the virtual three-dimensional environment. In some embodiments, when the first user interface of the first communication session is displayed in a showcase or gallery mode via the first display generation component, the representation of the second user, and, optionally, the representation of the at least one other user, are displayed in a preset layout (e.g., in a two-dimensional grid, in a row, in a default or user-configured layout, etc.) that are independent of the positions and movements of the participants in their respective physical environments and independent of the virtual positions of the representations of the participants in the first three-dimensional environment. In some embodiments, the first computer system uses the AR mode to display the representations of the participants (e.g., the representation of the second user, and optionally the representation of the third user different from the first user and the second user) in the first user interface of the first communication session in response to a change in orientation of the first display generation component from a first preset orientation to a second preset orientation (e.g., from the portrait orientation to the landscape orientation, or from the landscape orientation to the portrait orientation, etc.). In some embodiments, the first user interface of the first communication session includes a first control affordance that, when activated in accordance with first preset criteria, causes the first computer system to switch to the AR mode, or to switch to the showcase mode if the current mode is the AR mode (e.g., the first control affordance is a toggle switch, or a selection affordance for the AR mode or the showcase mode).

In some embodiments, after updating the first user interface (e.g., including updating the appearance of the representation of the second user based on the first movement of the first display generation component in the first physical environment and a simulated viewpoint of the first user into a respective three dimensional environment in which the second representation of the user is displayed) in response to detecting the first movement of the first display generation component in the first physical environment: the first computer system detects a first change in orientation of the first display generation component (e.g., from the first orientation to the second orientation, from the first orientation to a third orientation, from the portrait orientation to the landscape orientation, from the portrait orientation to another orientation different from the landscape orientation, etc.) and after detecting the first change in orientation of the first display generation component, the first computer system detects second movement of the first display generation component in the first physical environment. For example, in some embodiments, a change in orientation of the first display generation component may not cause or complete a transition from the portrait orientation to the landscape orientation of the display side of the first display generation component, and thus, may not cause the display mode of the first user interface of the communication session to switch from the AR mode to the showcase mode. Similarly, a change in orientation of the first display generation component may not cause or complete a transition from the landscape orientation to the portrait orientation of the display side of the first display generation component (or of the field of view provided via the first display generation component), and thus, may not cause the display mode of the user interface of the communication session to switch from the showcase mode to the AR mode. Thus, after the first change in orientation of the first display generation component is detected, the first computer system determines whether to update the representation of the second user in the first user interface of the communication session depending on the actual orientation of the first display generation component (and correspondingly the display mode of the first user interface of the communication that is associated with the actual current orientation of the first display generation component). In response to detecting second movement of the first display generation component in the first physical environment: in accordance with a determination that the first display generation component is in the first orientation (e.g., the portrait orientation, the orientation associated with the spatial or AR view of meeting participants, the landscape orientation, etc.) during the second movement of the first display generation component, the first computer system updates the appearance of the representation of the second user based on the second movement of the first display generation component in the first physical environment and the simulated viewpoint of the first user into the respective three dimensional environment in which the representation of the second user is displayed (e.g., updating the view of the three-dimensional environment in the AR mode); and in accordance with a determination that the first display generation component is in the second orientation (e.g., the landscape orientation, the orientation associated with the gallery view of meeting participants, the portrait orientation, etc.) during the second movement of the first display generation component, the first computer system maintains display of the representation of the second user at the respective location in the first user interface of the communication session as the first display generation component moves in the first physical environment (e.g., a location of the representation of the second user in the first user interface is independent of movement of the first display generation component in the first physical environment) (e.g., avatars of meeting participants do not move on the first user interface, even though the first display generation component moves in the physical environment) (e.g., maintaining the showcase view of the first user interface without making changes in accordance with the second movement of the first display generation component). For example, in some embodiments, in FIGS. 7V and 7X, if the first computer system detects movement of the first display generation component 7100-*t*, in accordance with a determination that the movement of the first display generation component 7100-*t* changes the orientation of the first display generation component 7100-*t* from the first orientation to the second orientation or from the second orientation to the first orientation, the first computer system 7100-*t* changes the display mode of the first user interface between the spatial mode and the non-spatial mode, and either moves the representation 7203' of the second user in accordance with the subsequent movement of the first display generation component (e.g., in accordance with a determination that the movement is made while the first display generation component is in the first orientation associated with the spatial mode of the first user interface), or maintain the position of the representation 7203' of the second user irrespective of the subsequent movement of the first display generation component (e.g., in accordance with a determination that the movement is made while the first display generation component is in the second orientation that is associated with the non-spatial mode of the first user interface), in accordance with some embodiments. Updating the appearance of the representation of the second user based on the second movement of the first display generation component in the first physical environment and the simulated viewpoint of the first user into the respective three dimensional environment in accordance with a determination that the first display generation component is in the first orientation during the second movement, and maintaining display of the representation of the second user at the respective location in the first user interface of the first communication session as the first display generation component moves in the first physical environment in accordance with a determination that the first display generation component is in the second orientation during the second movement provides improved visual feedback to the user (e.g., whether the first display generation component is in the first or second orientation). Providing improved feedback enhances the operability of the device, which, additionally, reduces power usage and improves battery life of the device by enabling the user to use the device more quickly and efficiently.

In some embodiments, the communication session is between at least the first user, the second user, and a third user that is different from the first user and the second user, and wherein the first user interface of the communication session further includes a representation of the third user. In some embodiments, in response to detecting the first movement of the first display generation component in the first physical environment: in accordance with the determination that the first display generation component is in the first orientation (e.g., the portrait orientation, the orientation associated with a spatial or AR view of participants of the communication session, the landscape orientation, etc.) during the first movement of the first display generation component, the first computer system updates an appearance of the representation of the third user based on the first movement of the first display generation component in the first physical environment and based on the simulated viewpoint of the first user into the respective three-dimensional environment in which the representation of the second user is displayed (e.g., the first movement of the first display generation component changes the viewing perspective of the AR view of the virtual three-dimensional meeting space, and the positions of the representations of participants on the first user interface). In some embodiments, in response to detecting the first movement of the first display generation component in the first physical environment: in accordance with the determination that the first display generation component is in the second orientation (e.g., the landscape orientation, the orientation associated with a showcase or non-spatial view of meeting participants, the portrait orientation, etc.) during the first movement of the first display generation component, the first computer system maintains display of the representation of the third user at a second respective location in the first user interface of the communication session as the first display generation component moves in the first physical environment (e.g., a location of the representation of the third user in the first user interface is independent of the movement of the first display generation component in the first physical environment) (e.g., avatars of meeting participants do not move on the first user interface, even though the first display generation component moves in the physical environment) (e.g., positions of the representations of the meeting participants are maintained in the showcase mode of the first user interface while the first display generation components moves in the first physical environment). For example, in FIGS. 7V and 7W, during the movement of the first display generation component 7100-*t* in the physical environment 100, the first display generation component 7100-*t* substantially remained in the first orientation (e.g., within a range of angles and attitudes corresponding to a landscape or upright orientation of the first display generation component 7100-*t*), and accordingly, the first computer system 101-*t* continues to display the first user interface of the first communication session in the spatial mode, and visually indicate the virtual positions and facing directions of the second representation 7203' of the second user and the third representation 7205' of the third user in the view 7106 of the first three-dimensional environment 7207 in accordance with the movement of the first display generation component 7100-*t* and the simulated viewpoint of the view 7106 that corresponds to the virtual position and facing direction of the first user in the first three-dimensional environment 7207, in accordance with some embodiments. For example, in FIG. 7X, if the first display generation component 7100-*t* is moved in the physical environment while the first display generation component remain in the second orientation (e.g., within a range of angles and attitudes corresponding to a portrait or reclined orientation of the first display generation component 7100-*t*), and accordingly, the first computer system 101-*t* continues to display the non-spatial mode of the first user interface in which the representation 7203' of the second user and the representation 7205' of the third user do not change positions in accordance with the movement of the first display generation component 7100-*t*, in accordance with some embodiments. Updating an appearance of the representation of the third user based on the first movement of the first display generation component and based on the simulated viewpoint of the first user into the respective three-dimensional environment in which the representation of the second user is displayed, in accordance with the determination that the first display generation component is in the first orientation during the first movement of the first display generation component, and maintaining display of the representation of the third user at a second respective location in the first user interface of the first communication session as the first display generation component moves in the first physical environment in accordance with the determination that the first display generation component is in the second orientation during the first movement of the first display generation component provides improved visual feedback to the user (e.g., whether the first display generation component is in the first or second orientation). Providing improved feedback enhances the operability of the device, which, additionally, reduces power usage and improves battery life of the device by enabling the user to use the device more quickly and efficiently.

In some embodiments, in accordance with the determination that the movement does not causes the first display generation component to transition between the first orientation and the second orientation, a three-dimensional spatial relationship between the representation of the second user and the representation of the third user in the respective three-dimensional environment (e.g., the virtual three-dimensional environment on which the AR view displayed via the first display generation component is based, the AR environment displayed via the first display generation component, etc.) is maintained independent of movement of the first display generation component in the first physical environment (e.g., first movement, second movement, etc.). For example, in FIG. 7X, if the first display generation component 7100-*t* is moved in the physical environment while the first display generation component remain in the second orientation (e.g., within a range of angles and attitudes corresponding to a portrait or reclined orientation of the first display generation component 7100-*t*), and accordingly, the first computer system 101-*t* continues to display the non-spatial mode of the first user interface in which the representation 7203' of the second user and the representation 7205' of the third user do not change positions in accordance with the movement of the first display generation component 7100-*t*, in accordance with some embodiments. In some embodiments, the spatial relationship between the representation of the second user and the representation of the third user is updated in the first user interface displayed in the spatial mode (e.g., AR mode, VR mode, etc.) in accordance with movement of the second user and/or movement of the third user in their respective physical environments. In some embodiments, the spatial relationship between the representation of the second user and the simulated viewpoint of the first user into the respective three-dimensional environment in which the representation of the second user is displayed is updated in the first user interface in the spatial mode (e.g., VR mode, AR mode, etc.) in accordance with movement of the second user in his/her respective physical environment. In some embodiments, the spatial relationship between the representation of the third user and the simulated viewpoint of the first user into the respective three dimensional environment in which the representation of the third user is displayed is updated in the first user interface in the spatial mode (e.g., VR mode, AR mode, etc.) in accordance with movement of the third user in his/her respective physical environment. Maintaining the representations of the second user and third user independent of movement of the first display generation component in the first physical environment, in accordance with the determination that the first movement does not causes the first display generation component to transition between the first orientation and the second orientation, provides improved visual feedback to the user (e.g., that the first display generation component has not transitioned between the first orientation and the second orientation). Providing improved feedback enhances the operability of the device, which, additionally, reduces power usage and improves battery life of the device by enabling the user to use the device more quickly and efficiently.

In some embodiments, the first computer system is in communication with a first set of cameras facing a first direction relative to the first display generation component, and in communication with a second set of cameras facing a second direction relative to the first display generation component (e.g., the first direction is opposite of the second direction). The first computer system determines, in accordance with first image data received from the first set of cameras and second image data received from the second set of cameras, a position of the simulated viewpoint of the first user (e.g., the height, lateral position, and facing direction, etc. of the viewpoint of the view shown in the first user interface in the spatial mode) in the respective three-dimensional environment in which the representation of the second user is displayed. For example, the first display generation component 7100-*t* includes both a front-facing camera and a rear-facing camera, and the image data from both cameras are used to determine the position and facing direction of the virtual representation 7100-t' or 7200' of the first user 7200 in the first three-dimensional environment 7207, where the virtual position and facing direction of the virtual representation of the first user is used to determine the spatial relationships between the participants in the first three-dimensional environment 7207, in accordance with some embodiments. In some embodiments, the first set of cameras faces a direction toward the face of the first user, and the second set of cameras faces a direction away from the face of the first user. In some embodiments, the first set of cameras points in a direction outward from a display side of the first display generation component, and the second set of cameras points in a direction outward from a backside of the first display generation component. In some embodiments, the first set of cameras is a front-facing camera, and the second set of cameras is a rear-facing camera of the first display generation component. Determining a position of the simulated viewpoint of the first user in the respective three-dimensional environment in accordance with first image data received from the first set of cameras and second image data received from the second set of cameras provides improved visual feedback to the user (e.g., more accurately positions the simulated viewpoint of the first user). Providing improved feedback enhances the operability of the device, which, additionally, reduces power usage and improves battery life of the device by enabling the user to use the device more quickly and efficiently.

In some embodiments, a representation of the first user is displayed in a second user interface of the first communication session shown via a second display generation component used by the second user (e.g., the second display generation component displays an AR view or VR view of the respective three-dimensional environment). In some embodiments, the AR view of the respective three-dimensional environment is an integration of a representation of the physical environment of the second user and the respective three-dimensional environment. In some embodiments, the VR view of the respective three-dimensional environment optionally includes virtual objects selected by the second computer system and/or the second user at various positions in the respective three-dimensional environment, where the virtual objects are not shared with other participants of the communication session. In accordance with a determination that the first display generation component is in the first orientation (e.g., the orientation associated with the spatial mode of the first user interface) during the first movement of the first user in the first physical environment, a position of the representation of the first user in a view of the respective three-dimensional environment (e.g., an AR view or VR view based on the respective three-dimensional environment) shown in the second user interface is updated in accordance with the first movement of the first user in the first physical environment. For example, the virtual positions of the participants in the first three-dimensional environment 7207 in FIGS. 7V-7X are determined and updated in accordance with the movement of the participants in their own physical environment, when the participants are in the communication session using an immersive copresence mode, or a spatial mode of a non-immersive mode. In some embodiments, in accordance with a determination that the first display generation component is in the second orientation (e.g., the orientation associated with the non-spatial mode, such a as the showcase mode) during the first movement of the first user in the first physical environment, a position of the representation of the first user in the AR view or VR view of the respective three-dimensional environment shown in the second user interface is maintained independent of the first movement of the first user in the first physical environment. Updating a position of the representation of the first user in a view of the three-dimensional environment in accordance with the first movement of the first user in the first physical environment, and in accordance with a determination that the first display generation component is in the first orientation during the first movement of the first user, provides improved visual feedback to the user (e.g., regarding the movement of the first user and the orientation of the first display generation component). Providing improved feedback enhances the operability of the device, which, additionally, reduces power usage and improves battery life of the device by enabling the user to use the device more quickly and efficiently.

In some embodiments, displaying, via the first display generation component, the first user interface of the communication session between the first user and the second user includes: in accordance with a determination that the first display generation component is in the first orientation (e.g., the orientation associated with the spatial mode of the first user interface), the first computer system displays the representation of the second user in a first view of the respective three-dimensional environment, wherein the first view of the respective three-dimensional environment includes a representation of the first physical environment, and the representation of the second user is displayed at a position in the first view of the respective three-dimensional environment with a preset spatial relationship to the representation of the first physical environment. For example, as shown in FIGS. 7V-7W, when the first user interface of the first communication session is displayed in the spatial mode, the first computer system 101-t displays a view 7106 of the first three-dimensional environment 7207 that includes a representation of the physical environment 101, and wherein the spatial relationship between the second user and the representation of the physical environment 101 in the first three-dimensional environment are visually indicated in the view 7106 of the first three-dimensional environment 7207, in accordance with some embodiments. In some embodiments, positions in the first physical environment are mapped to positions in the respective three-dimensional environment in the first view of the respective three-dimensional environment, such that a position of the representation the second user in the respective three-dimensional environment has a corresponding position in the first view of the respective three-dimensional environment relative to the positions in the representation of the first physical environment. In some embodiments, in accordance with a determination that the first display generation component is in the second orientation, displaying the representation of the second user in a virtual environment that optionally does not include a representation of the first physical environment, and the representation of the second user is displayed at a position independent of any representation of the first physical environment in the first user interface. In some embodiments, the mode of displaying the first user interface can be manually switched using an affordance provided in the first user interface and not necessarily in response to a change in orientation of the first display generation component; and in such embodiments, the display of the representation of the second user is based on the display mode of the first user interface, and not necessarily based on the orientation of the first display generation component. Displaying the representation of the second user at a position in the first view of the respective three-dimensional environment with a preset spatial relationship to the representation of the first physical environment, in accordance with a determination that the first display generation component is in the first orientation, provides improved visual feedback to the users (e.g., that the first display generation component is in the first orientation). Providing improved feedback enhances the operability of the device, which, additionally, reduces power usage and improves battery life of the device by enabling the user to use the device more quickly and efficiently.

In some embodiments, displaying, via the first display generation component, the first user interface of the first communication session between the first user and the second user includes: in accordance with a determination that the first display generation component is in the first orientation (e.g., the orientation associated with the spatial mode (e.g., AR mode, VR mode, etc.)), displaying a representation of the first user (e.g., a floating window of a live video feed of the first user, an animated avatar of the first user, etc.) at a respective position in the first user interface of the first communication session that does not have a three-dimensional spatial relationship to the representation of the first physical environment in the first view of the respective three-dimensional environment. For example, in FIGS. 7V and 7W, when the first computer system is displaying the first user interface of the first communication session in the spatial mode, the self-view 7200" of the first user 7200 is displayed floating over the representation of the physical 100 environment (e.g., not anchored to the representation of the physical environment 100, and not showing a three-dimensional spatial relationship relative to the representation of the physical environment 100, etc.) in the view 7106 of the first three-dimensional environment, in accordance with some embodiments. In some embodiments, the self view of the first user is displayed as a floating image or window that overlays a portion of the field of view at which a portion of the representation of the physical environment would be visible if the floating image or window had not been displayed there or had been moved away. In some embodiments, in accordance with a determination that the first display generation component is in the second orientation (e.g., the orientation that is associated with the non-spatial mode of the first user interface), the representation of the first user is displayed at a preset position in the first user interface (e.g., in the corner of the first user interface, overlaid or replacing display of a portion of the first view of the respective three-dimensional environment, etc.). In some embodiments, the mode of displaying the first user interface can be manually switched using an affordance provided in the first user interface and not necessarily in response to a change in orientation of the first display generation component; and in such embodiments, the display of the representation of the first user is based on the display mode of the first user interface, and not necessarily based on the orientation of the first display generation component being in the first orientation or the second orientation. Displaying a representation of the first user at a respective position in the first user interface of the first communication session that does not have a three-dimensional spatial relationship to the representation of the first physical environment in the first view of the respective three-dimensional environment in accordance with a determination that the first display generation component is in the first orientation provides improved visual feedback to the users (e.g., that the first display generation component is in a first orientation). Providing improved feedback enhances the operability of the device, which, additionally, reduces power usage and improves battery life of the device by enabling the user to use the device more quickly and efficiently.

In some embodiments, displaying, via the first display generation component, the first user interface of the communication session between the first user and the second user includes: in accordance with the determination that the first display generation component is in the first orientation (e.g., the orientation associated with the spatial mode of the first user interface), displaying the representation of the second user with at least a first amount of depth difference relative to the simulated viewpoint of the first user into the respective three dimensional environment in which the representation of the second user is displayed (e.g., the depth difference includes a thickness or distance from the front to the back of the representation of the second user); and in accordance with the determination that the first display generation component is in the second orientation (e.g., the orientation associated with the non-spatial mode of the first user interface), displaying the representation of the second user with less than the first amount of depth difference (e.g., a flat two-dimensional representation, or with less depth difference as compared to the representation of the second user displayed with the first display generation component in the first orientation). For example, in FIGS. 7V and 7W, the representation 7203' of the second user displayed in the spatial mode of the first user interface includes a three-dimensional or pseudo-three-dimensional model of the second user (e.g., a model that, optionally, rotates in the view 7106); while, in FIG. 7X, the representation 7203' of the second user displayed in the non-spatial mode of the first user interface includes a two-dimensional image of the second user (e.g., a flat image that does not have different viewing perspectives in the user interface 7110), in accordance with some embodiments. Displaying the representation of the second user with at least a first amount of depth difference relative to the simulated viewpoint of the first user into the respective three dimensional environment in accordance with the determination that the first display generation component is in the first orientation, and displaying the representation of the second user with less than the first amount of depth difference in accordance with the determination that the first display generation component is in the second orientation, provides improved visual feedback to the user (e.g., regarding whether the first display generation component is in the first orientation or second orientation). Providing improved feedback enhances the operability of the device, which, additionally, reduces power usage and improves battery life of the device by enabling the user to use the device more quickly and efficiently.

In some embodiments, the simulated viewpoint of the first user into the respective three-dimensional environment in which the representation of the second user is displayed has a position in the respective three-dimensional environment that is determined (e.g., by the first computer system, by a server of the communication session, etc.) based on a vertical position of the first display generation component in the first physical environment. For example, the virtual height of the viewpoint of the view 7106 shown in FIGS. 7V and 7W, the camera angles and camera heights of the virtual cameras corresponding to the views of the representation 7203' of the second user and the representation 7205' of the third user shown in the spatial mode are determined in accordance with the height of the first display generation component 7100-t in the physical environment 100, in accordance with some embodiments. Determining the position of the simulated viewpoint of the first user into the respective three-dimensional environment based on a vertical position of the first display generation component in the first physical environment reduces the number of inputs needed to correctly display the simulated viewpoint of the first user into the three-dimensional environment (e.g., the user does not need to perform additional inputs to adjust or calibrate the simulated viewpoint). Reducing the number of inputs needed to perform an operation enhances the operability of the device, which, additionally, reduces power usage and improves battery life of the device by enabling the user to use the device more quickly and efficiently.

In some embodiments, a second display generation component used by the second user displays a second user interface of the first communication session, and wherein the second user interface displays a representation of the first user that includes an indication of a device type of the first computer system. For example, in FIGS. 7V-7X, when the first user is joining the first communication session in a non-immersive mode using the first display generation component 7100-t, the second computer system displays, in its own view of the first three-dimensional environment 7207, a representation of the first user that indicates that the first user 7200 will join or has joined the first communication using in the non-immersive mode using a tablet device, a desktop computer, or a mobile phone, rather than in the immersive copresence mode using a head-mounted device, in accordance with some embodiments. For example, in some embodiments, the representation of the first user is displayed by the second display generation component while the communication session is being requested or established, and the representation shows an image or name of the type of device used by the first user for the communication session, in particular, the device type identifies whether or not the first computer system will support the immersive experience in the respective three-dimensional environment (e.g., co-presence with the second user in the respective three-dimensional environment). Displaying a representation of the first user, including an indication of a device type of the first computer system, in the second user interface of the first communication session provides improved visual feedback to the user (e.g., regarding the type of device of the first computer system). Providing improved feedback enhances the operability of the device, which, additionally, reduces power usage and improves battery life of the device by enabling the user to use the device more quickly and efficiently.

In some embodiments, the indication of the device type of the first display generation component is a frame that surrounds an image of the first user (e.g., a live video feed of the first user received from the first computer system, an animated avatar of the first user, etc.). For example, in FIGS. 7V-7X, when the first user is joining the first communication session in a non-immersive mode using the first display generation component 7100-t, the second computer system displays, in its own view of the first three-dimensional environment, a representation of the first user that indicates that the first user 7200 will join or has joined the first communication using in the non-immersive mode using a tablet device, a desktop computer, or a mobile phone, rather than the an immersive copresence mode using a head-mounted device, where the representation of the first user includes a frame that includes an image of the first user, in accordance with some embodiments. In some embodiments, the frame has an appearance and/or orientation that corresponds to the device type of the first computer system (e.g., a mobile phone, a table device, a desktop computer, etc.) and/or current orientation of the first display generation component. In some embodiments, the orientation of the frame corresponds to the orientation (e.g., the first orientation, the second orientation, etc.) of the first display generation component at the time which indicates whether the first user is participating in the communication session using the spatial mode or using the non-spatial mode. Displaying the representation of the first user, including a frame that surrounds an image of the first user that indicates the device type of the first computer system, provides improved visual feedback to the user (e.g., regarding the type of device of the first computer system). Providing improved feedback enhances the operability of the device, which, additionally, reduces power usage and improves battery life of the device by enabling the user to use the device more quickly and efficiently.

In some embodiments, an orientation of the frame corresponds to the orientation of the first display generation component in the first physical environment. For example, in FIGS. 7V-7X, when the first user is joining the first communication session in a non-immersive mode using the first display generation component 7100-t, the second computer system displays, in its own view of the first three-dimensional environment 7207, a representation of the first user that includes an image of a device enclosing an image of the first user, where the orientation of the device in the image of the device indicates whether the first user is currently using the spatial mode or the non-spatial mode to participate in the first communication session, in accordance with some embodiments. In some embodiments, the orientation of the frame corresponds to the orientation (e.g., the first orientation, the second orientation, etc.) of the first display generation component at the time (e.g., does not change with the changing orientation of the first display generation component in real-time, but switches between discrete orientation states) which indicates whether the first user is participating in the communication session using the spatial mode (e.g., when the frame is displayed with a first orientation associated with the spatial mode) or using the non-spatial mode (e.g., when the frame is displayed with a second orientation associated with the non-spatial mode). Displaying the representation of the first user, including a frame that surrounds an image of the first user corresponding to the orientation of the first display generation component in the first physical environment and that indicates the device type of the first computer system, provides improved visual feedback to the user (e.g., regarding the type of device of the first computer system and the orientation of the first computer system). Providing improved feedback enhances the operability of the device, which, additionally, reduces power usage and improves battery life of the device by enabling the user to use the device more quickly and efficiently.

It should be understood that the particular order in which the operations in FIG. 15 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, 12000, 13000, 14000, and 16000) are also applicable in an analogous manner to method 15000 described above with respect to FIG. 15. For example, the gestures, gaze inputs, physical objects, user interface objects, controls, movements, criteria, three-dimensional environment, display generation component, surface, representation of physical object, virtual objects, and/or animations described above with reference to method 15000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, 11000, 12000, 13000, 14000, and 16000). For brevity, these details are not repeated here.

Figure 16:
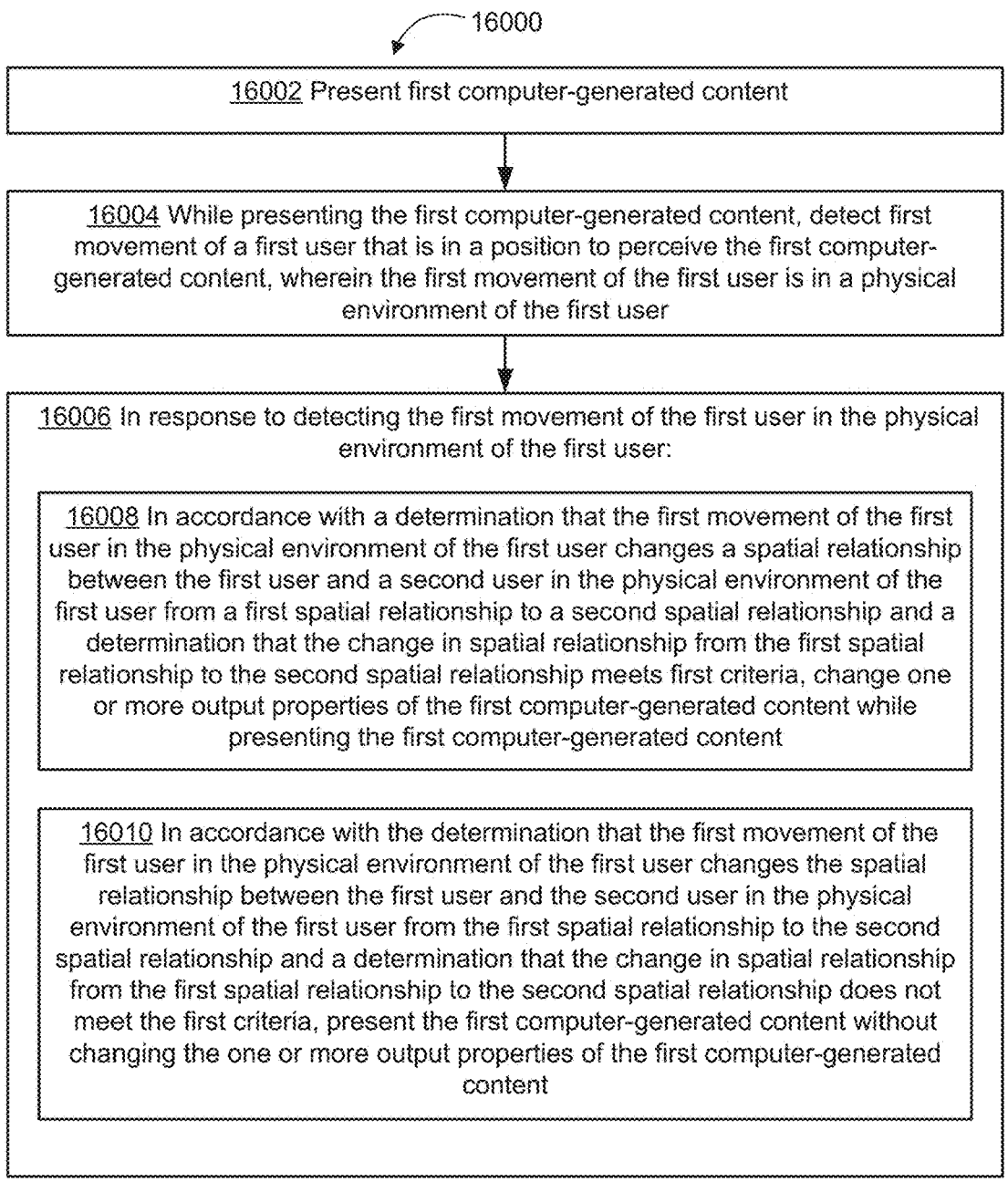
FIG. 16 is a flowchart of a method of changing output properties of computer-generated content in response to detecting a first user's movement in a physical environment that indicates first user's shifting attention toward a second user, in accordance with some embodiments.

FIG. 16 is a flowchart of a method 16000 of changing output properties of computer-generated content in response to detecting a first user's movement in a physical environment that indicates first user's shifting attention toward a second user, in accordance with some embodiments.

In some embodiments, the method 16000 is performed at a computer system (e.g., computer system 101 in FIG. 1) including a first display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 16000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 16000 are, optionally, combined and/or the order of some operations is, optionally, changed.

In some embodiments, the method 16000 is performed at a computer system (e.g., the computer system 101 in FIG. 1, the computer system 101 described with respect to FIGS. 7A-7D, FIGS. 7E-7F, FIGS. 7G-7H, FIGS. 7I-7M, FIGS. 7N-7O, FIGS. 7P-7S, FIGS. 7T-7U, and/or FIGS. 7V-7X, the first computer system 101-t described with respect to FIGS. 7V-7X, the second computer system described with respect to FIGS. 7V-7X, etc.). In some embodiments, the computer system is in communication with a first display generation component (e.g., the first display generation component is a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the first display generation component is a first display generation component 7100 described with respect to FIGS. 7A-7U and 7Y-7Z, a first display generation component 7100-t described with respect to FIGS. 7V-7X, a second display generation component described with respect to FIGS. 7V-7X, etc. In some embodiments, the first computer system is an integrated device with one or more processors and memory enclosed in the same housing as the first display generation components and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the first display generation component and/or the one or more input devices. In some embodiments, the first display generation component and the one or more input devices are integrated and enclosed in the same housing. In some embodiments, the first audio output component is enclosed in a separate housing from the first computer system and the first display generation component. In some embodiments, the first audio output component is enclosed in the same housing as the first display generation component, e.g., in a head-mounted device. In some embodiments, the first computer system and the first display generation component are capable of providing an immersive three-dimensional experience in a three-dimensional environment (e.g., an augmented reality environment, a virtual reality environment, etc.), but may be temporarily restricted to only allow video and audio communication with another user in a communication session. In some embodiments, the first computer system and the first display generation component are not capable of providing an immersive three-dimensional experience in a three-dimensional environment. In some embodiments, a computer system that provides an immersive experience in a three-dimensional environment changes a viewpoint from which the three-dimensional environment is presented to the user of the computer system in accordance with the rotation of the user's head relative to the physical environment (e.g., how the user normally changes his/her viewpoint in the physical environment). In some embodiments, although a computer system, such as a tablet device or handheld device may be capable of providing a viewport into an augmented reality view of the physical environment on the display of the tablet device or handheld device, the augmented reality view is not immersive, because rotation of the user's head relative to the display of the computer system does not cause the computer system to update the viewpoint of the augmented reality view. Similarly, although a computer system, such as a tablet device or handheld device may be capable of providing a viewport into a virtual three-dimensional environment on the display of the tablet device or handheld device, the view of the three-dimensional environment is not immersive, because rotation of the user's head relative to the display of the computer system does not cause the computer system to update the viewpoint of the currently displayed view of the virtual three-dimensional environment. Many of the features of the method 16000 are described with respect to FIGS. 7Y-7Z, in accordance with some embodiments.

In the method 16000, the computer system presents (16002) first computer-generated content (e.g., video content and/or audio content associated with a virtual three-dimensional environment, an augmented reality environment, a pass-through view of a physical environment, a camera view of a physical environment, etc.). As shown in FIGS. 7Y-7Z, the computer system 101 presents computer-generated content that includes visual content 7108 and audio content 7350, in accordance with some embodiments. In some embodiments, the first computer-generated content includes audio-visual content, such as video content, gaming content, etc. In some embodiments, the first computer-generated content includes visual content without audio content. In some embodiments, the first computer-generated content includes audio content without visual content. In some embodiments, the visual content of the first computer-generated content has spatial properties in three dimensions. In some embodiments, the audio content of the first computer-generated content has spatial properties in three dimensions (e.g., spatial audio, surround sound, etc.). In some embodiments, the visual content of the first computer-generated content has spatial properties in two dimensions only. In some embodiments, the audio content of the first computer-generated content has spatial properties is stereo audio or mono-audio.

In the method 16000, while presenting the first computer-generated content (e.g., displaying visual content via the first display generation component, outputting audio content using the first audio output component, etc.), the computer system detects (16004) first movement of a first user that is in a position to perceive the first computer-generated content (e.g., to view the visual content of the first computer-generated content via the first display generation component, to hear the audio content of the first computer-generated content via the first audio output device, etc.) (e.g., the first user is wearing an HMD that is presenting the first computer-generated content, the first user is in front of a display that displays the first computer-generated visual content and wearing a headphone that is outputting the computer-generated audio content corresponding to the first computer-generated visual content, etc.), wherein the first movement of the first user is in a physical environment of the first user. For example, as shown in FIGS. 7Y-7Z, the first computer system detects the first user 7200 moving relative to a second user 7201 in the physical environment, in accordance with some embodiments. In some embodiments, the first movement of the first user changes a spatial relationship between the first user and a second user in a first physical environment of the first user and the second user. In some embodiments, the first movement changes a spatial relationship between a representation of the first user and a representation of a third user in a computer-generated three-dimensional environment (e.g., a three-dimensional environment of a communication session to which the first user and the third user are participants, or a three-dimensional environment of a multiplayer game or experience to which the first user and the third user are participants, etc., where the first computer-generated content includes audio and visual content provided in a virtual reality or augmented reality environment of the communication session, game, or experience).

In the method 16000, in response to detecting the first movement of the first user in the physical environment (16006): in accordance with a determination that the first movement of the first user in the physical environment changes a spatial relationship between the first user and a second user in the physical environment from a first spatial relationship to a second spatial relationship and a determination that the change in spatial relationship from the first spatial relationship to the second spatial relationship meets first criteria (e.g., criteria for detecting the first user turning his/her head toward the second user, leaning toward the second user while facing the second user, reaching out a hand toward the second user, etc.), the first computer system changes (16008) one or more output properties of the first computer-generated content (e.g., reducing visual prominence of virtual content, reducing audio volume of computer-generated audio content, increasing or enhancing visual pass-through of the physical environment, increasing or enhancing audio pass-through from the physical environment, etc.) while presenting the first computer-generated content. For example, as shown in FIGS. 7Y-7Z, the first computer system detects the first user 7200 moving relative to a second user 7201 in the physical environment, and the movement corresponds to the first user 7200 leaning toward the second user 7201 which indicates the first user turning his/her attention to the second user; and in response, the first computer system changes the audio output properties of the audio content 7350 (e.g., presenting a modified version 7350' of the audio content 7350) while continuing to present the visual content 7108, in accordance with some embodiments. In response to detecting the first movement of the first user in the physical environment (16006): in accordance with the determination that the first movement of the first user in the physical environment changes the spatial relationship between the first user and the second user in the physical environment from the first spatial relationship to the second spatial relationship and a determination that the change in spatial relationship from the first spatial relationship to the second spatial relationship does not meet the first criteria (e.g., criteria for detecting the first user turning his/her head toward the second user, leaning toward the second user while facing the second user, reaching out a hand toward the second user, etc.), the computer system presents the first computer-generated content without changing the one or more output properties of the first computer-generated content (e.g., presenting the first computer-generated content without reducing visual prominence of virtual content, reducing audio volume of computer-generated audio content, increasing or enhancing visual pass-through of the physical environment, increasing or enhancing audio pass-through from the physical environment, etc.). For example, in FIGS. 7Y-7Z, the first computer system detects the first user 7200 moving relative to a second user 7201 in the physical environment, and if the movement corresponds to the first user 7200 leaning away from the second user 7201 which indicates the first user is not turning his/her attention to the second user; and in response, the first computer system does not change the audio output properties of the audio content 7350 or the visual properties of the visual content 7108 while outputting the computer-generated content, in accordance with some embodiments. Displaying computer-generated content with changed output properties in response to detecting movement of the first user in the physical environment relative to the second user allows the first user to perceive the physical environment without removing the first user completely from the computer-generated experience, and without requiring special input from the first user. Improving the user's interaction with the physical environment while engaged in a computer-generated experience and reducing the number of inputs used to achieve a desired outcome enhance the operability of the device, which, additionally, reduces power usage and improves battery life of the device by enabling the user to use the device more quickly and efficiently.

In some embodiments, presenting the first computer-generated content includes displaying first computer-generated visual content (e.g., virtual content, augmented reality content, experience in a virtual three-dimensional environment, experience in a mixed reality environment, video content, gaming content, experience in a three-dimensional environment of a communication session, etc.) of the first computer-generated content via the first display generation component (optionally, in conjunction with outputting first computer-generated audio content via the first audio output device). For example, as shown in FIGS. 7Y-7Z, the first computer-generated content output by the computer system 101 includes first computer-generated visual content 7108 output by the first display generation component 7100, in some embodiments. Displaying first computer-generated visual content of the first computer-generated content via the first display generation component provides improved visual feedback to the user (e.g., that the first computer-generated content is being presented). Providing improved feedback enhances the operability of the device, which, additionally, reduces power usage and improves battery life of the device by enabling the user to use the device more quickly and efficiently.

In some embodiments, changing the one or more output properties of the first computer-generated content while presenting the first computer-generated content includes reducing visual prominence (e.g., increasing transparency, ceasing to display, reducing color saturation, providing a visual pass-through region in the virtual content, etc.) of at least a first portion of the first computer-generated visual content to reveal a respective representation of the second user in a first region of a field of view provided via the first display generation component that was previously occupied by the at least the first portion of the first computer-generated visual content. For example, in FIG. 7Z, the computer system 101, optionally, in accordance with a determination that the first user 7200 is leaning toward the second user 7201 or otherwise changes the spatial relationship between the first user and the second user in the physical environment in a way that indicates the first user 7200 directing attention to the second user 7201, changes the output properties of the first computer-generated visual content 7108 as the first computer-generated visual content 7108 is output by the first display generation component 7100, in some embodiments. For example, in some embodiments, as the first user leans toward the second user, or turns toward the second user, etc., the first computer system makes the virtual content presented in a first region of the virtual environment or augmented reality environment more transparent, or ceases to display that portion of the virtual content, to show a representation of at least a portion of the second user to the first user that was previously blocked by the virtual content, without requiring the first user to remove the first display generation component from his head or face. Reducing visual prominent of at least a first portion of the first computer-generated visual content to reveal a respective representation of the second user in a first region of a field of view provided via the first display generation component that was previously occupied by the at least the first portion of the first computer-generated visual content provides improved visual feedback to the user (e.g., by drawing visual attention to the newly revealed respective representation of the second user in the first region). Providing improved feedback enhances the operability of the device, which, additionally, reduces power usage and improves battery life of the device by enabling the user to use the device more quickly and efficiently.

In some embodiments, presenting the first computer-generated content includes outputting first computer-generated audio content (e.g., stereo audio, spatial audio, mono-audio, surround sound, audio that has been processed with noise cancelation or other modifications, sound track, speech, music, etc.) of the first computer-generated content via the first audio output component (optionally, in conjunction with displaying the first computer-generated visual content via the first display generation component). For example, as shown in FIG. 7Z, the computer system 101, optionally, in accordance with a determination that the first user 7200 is leaning toward the second user 7201 or otherwise changes the spatial relationship between the first user and the second user in the physical environment in a way that indicates the first user 7200 directing attention to the second user 7201, changes the output properties of the first computer-generated audio content 7350 (e.g., to a modified version 7350') as the first computer-generated audio content 7350 is output by the first audio output component 7101, in some embodiments. Outputting first computer-generated audio content of the first computer-generated content via the first audio output component provides improved audio feedback to the user (e.g., that the first computer-generated content is being presented). Providing improved feedback enhances the operability of the device, which, additionally, reduces power usage and improves battery life of the device by enabling the user to use the device more quickly and efficiently.

In some embodiments, changing the one or more output properties of the first computer-generated content while presenting the first computer-generated content includes reducing audio prominence of the first computer-generated audio content relative to sound from the physical environment of the first user (e.g., by reducing noise filtering or cancelation, lowering audio volume of the first computer-generated audio content, ceasing to output the first computer-generated audio content, boosting sound from the physical environment, etc.). For example, as shown in FIG. 7Z, the modified version 7350' of the first computer-generated audio content includes reduced audio prominence for the audio content corresponding to the first computer-generated content, and increased pass-through or enhancement to the sound from the physical environment, in accordance with some embodiments. Changing the one or more output properties of the first computer-generated content while presenting the first computer-generated content, including reducing audio prominence of the first computer-generated audio content relative to sound from the physical environment of the first user, provides improved visual feedback to the user (e.g., that the first movement of the first user changes a spatial relationship between the first user and second user, and that the first movement meets first criteria). Providing improved feedback enhances the operability of the device, which, additionally, reduces power usage and improves battery life of the device by enabling the user to use the device more quickly and efficiently.

In some embodiments, the first computer-generated content includes first computer-generated visual content and first computer-generated audio content that accompanies the first computer-generated visual content (e.g., movie with corresponding sound track, game with corresponding sound effects, audio conversation in a virtual or augmented reality environment of a communication session, etc.), and wherein changing the one or more output properties of the first computer-generated content while presenting the first computer-generated content includes reducing visual prominence of the first computer-generated visual content relative to a representation of the second user, while maintaining audio prominence the first computer-generated audio content relative to sound from the physical environment of the first user. For example, in some embodiments, in the scenario shown in FIG. 7Z, the computer system, optionally, maintains the output properties of the audio content 7350, while reducing the visual prominence of the visual content 7108 (e.g., increasing pass-through of the physical environment, reducing opacity, color saturation, etc. of the visual content 7108, etc.). For example, in some embodiments, as the first user leans toward the second user, or turns toward the second user, etc., the first computer system makes the virtual content presented in a first region of the virtual environment or augmented reality environment more transparent, or ceases to display that portion of the virtual content, to show a representation of at least a portion of the second user to the first user that was previously blocked by the virtual content, without requiring the first user to remove the first display generation component from his head or face. Meanwhile, the audio output of the first computer-generated content is presented normally without being reduced in prominence (e.g., without reducing its volume, without reducing the amount of noise cancelation that is applied, without increasing the audio pass-through from the physical environment, etc.). Reducing visual prominence of the first computer-generated visual content relative to a representation of the second user, while maintaining audio prominence the first computer-generated audio content relative to sound from the physical environment of the first user, wherein the first computer generated content includes first computer-generated visual and first computer-generated audio content maintains the audio prominence of the first computer-generated audio content without requiring further user input (e.g., further input to adjust the prominence of the first computer-generated audio content). Performing an operation when a set of conditions has been met without requiring further user input enhances the operability of the device, which, additionally, reduces power usage and improves battery life of the device by enabling the user to use the device more quickly and efficiently.

In some embodiments, the first computer-generated content includes first computer-generated visual content and first computer-generated audio content that accompanies the first computer-generated visual content (e.g., movie with corresponding sound track, game with corresponding sound effects, audio conversation in a virtual or augmented reality environment of a communication session, etc.), and wherein changing the one or more output properties of the first computer-generated content while presenting the first computer-generated content includes reducing audio prominence the first computer-generated audio content relative to sound from the physical environment of the first user, while maintaining visual prominence of the first computer-generated visual content relative to a representation of the second user (e.g., while maintaining the current display properties of the first computer-generated visual content, without increasing the visual pass-through of the physical environment, etc.). For example, as shown in FIG. 7Z, the computer system, optionally, maintains the output properties of the visual content 7108, while reducing the audio prominence of the audio content 7350 (e.g., reducing noise cancellation, increasing pass-through sound from the physical environment, lower the volume of the audio content 7350, etc.), in accordance with some embodiments. For example, in some embodiments, as the first user leans toward the second user, or turns toward the second user, etc., the first computer system reduces the volume or mutes the volume of the audio content of the first computer-generated content (or optionally increasing or enhance the sound from the second user or from the physical environment through the first audio output component), without requiring the first user to remove the first audio output component from his ears. Meanwhile, the visual content of the first computer-generated content is presented normally without being reduced in prominence (e.g., without increasing in transparency, without creating or increasing a pass-through region on the first display generation component, etc.). Reducing audio prominence of the first computer-generated audio content relative to a representation of the second user, while maintaining visual prominence the first computer-generated visual content relative to sound from the physical environment of the first user, wherein the first computer generated content includes first computer-generated visual and first computer-generated audio content maintains the audio prominence of the first computer-generated audio content without requiring further user input (e.g., further input to adjust the prominence of the first computer-generated visual content). Performing an operation when a set of conditions has been met without requiring further user input enhances the operability of the device, which, additionally, reduces power usage and improves battery life of the device by enabling the user to use the device more quickly and efficiently.

In some embodiments, the first criteria require that the first movement that changes the spatial relationship between the first user and the second user is detected in conjunction with (e.g., is accompanied by, is detected within a preset amount of time of, etc.) detection of speech (e.g., speech of the first user, speech of the second user, etc.) in order for the first criteria to be met. For example, in FIGS. 7Y-7Z, the detection of the movement of the first user 7200 toward the second user 7201 is accompanied by detection of speech from the first user or the second user in order for the computer system to change the output properties of the computer-generated content that is output via the first display generation component 7100 and the first audio output component 7101, in some embodiments. Requiring first movement of the first user in the first user that changes the spatial relationship between the first user and the second user be detected in conjunction with detection of speech in order for the first criteria to be met provides additional control options without cluttering the UI with additional displayed controls (e.g., additional displayed controls for changing one or more output properties of the first computer-generated content). Providing additional control options without cluttering the UI with additional displayed controls enhances the operability of the device, which, additionally, reduces power usage and improves battery life of the device by enabling the user to use the device more quickly and efficiently.

In some embodiments, the first criteria require that the first movement that changes the spatial relationship between the first user and the second user includes the first user turning to face the second user. For example, in FIGS. 7Y-7Z, the movement of the first user 7200 relative to the second user 7201 includes the first user turning to face the second user, in order for the computer system to change the output properties of the computer-generated content that is output via the first display generation component 7100 and the first audio output component 7101, in some embodiments. In some embodiments, the first criteria require that the first movement that changes the spatial relationship between the first user and the second user includes the first user leaning toward the second user. In some embodiments, the first criteria require that the first movement that changes the spatial relationship between the first user and the second user includes the first user turning toward the second user and leaning toward the second user in order for the first criteria to be met. Requiring the first movement of the first user in the physical environment of the first user that changes the spatial relationship between the first user and the second user include the first user turning to face the second user in order for first the first criteria to be met provides additional control options without cluttering the UI with additional displayed controls (e.g., additional displayed controls for changing one or more output properties of the first computer-generated content). Providing additional control options without cluttering the UI with additional displayed controls enhances the operability of the device, which, additionally, reduces power usage and improves battery life of the device by enabling the user to use the device more quickly and efficiently.

In some embodiments, the first computer-generated content includes first computer-generated audio content, and wherein changing the one or more output properties of the first computer-generated content while presenting the first computer-generated content includes reducing respective volumes of a first subset of frequency bands in the first computer-generated audio content without reducing respective volumes of a second subset of frequency bands in the first computer-generated audio content. For example, in FIG. 7Z, the modified version 7350' of the first computer-generated audio content 7350 includes reduction of the volume of some frequencies in the first computer-generated audio content 7350, in some embodiments. For example, in some embodiments, ambient sounds are muted or reduced in volume, while speech sounds are maintained or not reduced as much in the first computer-generated audio content, in accordance with a determination that the first criteria are met by the first movement of the first user. In some embodiments, speech sounds are muted or reduced in volume in the first computer-generated audio content, while other sounds continue to be output or are not reduced as much as the speech sounds, in accordance with a determination that the first criteria are met by the first movement of the first user. In some embodiments, sounds in the standard speech frequency bands are reduced while sounds in other frequency bands are not reduced or not reduced as much as the sound in the standard speech frequency bands. Reducing the volume of the frequency bands of speech in the computer-generated audio content allows the first user to better discern the speech coming from the second user, even while sounds in other frequency bands continued to be output with no reduction or with less reduction in audio prominence. Reducing respective volumes of a first subset of frequency bands in the first computer-generated audio content without reducing respective volumes of a second subset of frequency bands in the first computer-generated audio content provides improved audio feedback to the user (e.g., by reducing ambient sounds without reducing speech sounds). Providing improved feedback enhances the operability of the device, which, additionally, reduces power usage and improves battery life of the device by enabling the user to use the device more quickly and efficiently.

In some embodiments, in response to detecting the first movement of the first user in the physical environment: in accordance with the determination that the first movement of the first user in the physical environment changes the spatial relationship between the first user and the second user in the physical environment from the first spatial relationship to the second spatial relationship and the determination that the change in spatial relationship from the first spatial relationship to the second spatial relationship meets the first criteria (e.g., criteria for detecting the first user turning his/her head toward the second user, leaning toward the second user while facing the second user, reaching out a hand toward the second user, etc.), the computer system enhances sound from the physical environment of the first user (e.g., speech sound from the second user, sound output by a device controlled by the second user, etc.). In accordance with the determination that the first movement of the first user in the physical environment changes the spatial relationship between the first user and the second user in the physical environment from the first spatial relationship to the second spatial relationship and the determination that the change in spatial relationship from the first spatial relationship to the second spatial relationship does not meet the first criteria (e.g., criteria for detecting the first user turning his/her head toward the second user, leaning toward the second user while facing the second user, reaching out a hand toward the second user, etc.), the computer system forgoes enhancing the sound from the physical environment of the first user (e.g., speech sound from the second user, sound output by a device held by the second user, etc.). For example, in FIG. 7Z, the modified version 7350' of the first computer-generated audio content 7350 includes enhancement of sound from the physical environment as compared to the first computer-generated audio content 7350, in some embodiments. Enhancing sound from the physical environment of the first user in accordance with the determination that the first movement of the first user in the physical environment of the first user changes the spatial relationship between the first user and the second user in the physical environment of the first user from the first spatial relationship to the second spatial relationship and the determination that the change in spatial relationship from the first spatial relationship to the second spatial relationship meets the first criteria, and forgoing enhancing the sound from the physical environment of the first user in accordance with the determination that the first movement of the first user in the physical environment of the first user changes the spatial relationship between the first user and the second user in the physical environment of the first user from the first spatial relationship to the second spatial relationship and the determination that the change in spatial relationship from the first spatial relationship to the second spatial relationship does not meet the first criteria, provides additional control options without cluttering the UI with additional displayed controls (e.g., additional displayed controls for enhancing or forgoing enhancing the sound from the physical environment). Providing additional control options without cluttering the UI with additional displayed controls enhances the operability of the device, which, additionally, reduces power usage and improves battery life of the device by enabling the user to use the device more quickly and efficiently.

In some embodiments, while presenting the first computer-generated content (e.g., while the one or more output properties of the first computer-generated content are changed), the computer system detects first audio input from the first user and detects second audio input from the second user (e.g., the first user and the second user are having a conversation while the first audio content of the first computer-generated content is reduced in prominence relative to the speech sound from the physical environment (e.g., including both the first user's speech and the second user's speech)). The computer system generates first virtual audio reverberations for the first audio input in accordance with simulated acoustic properties of a first three-dimensional environment and generating second virtual audio reverberations for the second audio input in accordance with the simulated acoustic properties of the first three-dimensional environment (e.g., same environment used for both the audio input from the first user, and the audio input from the second user). In some embodiments, the first three-dimensional environment is the virtual or augmented reality environment of the first computer-generated content. In some embodiments, the first virtual audio reverberations and the second audio reverberations are integrated with the first audio input and the second audio input, and output via the first audio output component to the first user (e.g., while the visual content of the first computer-generated content continues to be displayed via the first display generation component). For example, in FIG. 7Z, the modified version 7350' of the computer-generated audio content, optionally, includes sounds from the first user and the second user captured in the physical environment as well as virtual audio reverberations for the sounds of the first user and/or the second user from the physical environment that are generated based on a virtual three-dimensional environment with simulated acoustic properties, in accordance with some embodiments. Generating first virtual audio reverberations for the first audio input and second virtual audio reverberations for the second audio input in accordance with simulated acoustic properties of a first three-dimensional environment provides improved audio feedback to the user (e.g., regarding characteristics of the first audio input, the second audio input, and/or the first three-dimensional environment). Providing improved feedback enhances the operability of the device, which, additionally, reduces power usage and improves battery life of the device by enabling the user to use the device more quickly and efficiently.

In some embodiments, the simulated acoustic properties of the first three-dimensional environment are different from actual acoustic properties of the physical environment of the first user. For example, in FIG. 7Z, the modified version 7350' of the computer-generated audio content, optionally, includes sounds from the first user and the second user captured in the physical environment as well as virtual audio reverberations for the sounds of the first user and/or the second user from the physical environment that are generated based on a virtual three-dimensional environment with simulated acoustic properties, where the simulated acoustic properties are different from the actual acoustic properties of the physical environment surrounding the first user and the second user, in accordance with some embodiments. In some embodiments, the first computer system processes the speech and/or other sounds received from the physical environment, suppresses the sound other than the speech inputs from the first user and the second user (e.g., including audio reverberations from the physical environment, and ambient sounds, etc.), generates simulated audio reverberations of the speech inputs based on the simulated acoustic properties of the first three-dimensional environment (e.g., a virtual three-dimensional environment), integrates the speech inputs with their simulated audio reverberations, and outputs the integrated sounds via the first audio output component to the first user. In some embodiments, speech sounds from a third user that is in the three-dimensional environment of the first computer-generated content goes through similar processing as the speech input of the second user, and is output to the first user via the first audio output component. In this manner, the speech from users in the physical environment and the speech from users in the virtual environment sound more like they are coming from users that share the same space (e.g., a three-dimensional environment of a communication session, a three-dimensional multiplayer gaming environment, etc.). Generating first virtual audio reverberations for the first audio input and second virtual audio reverberations for the second audio input in accordance with simulated acoustic properties of a first three-dimensional environment, which are different from actual acoustic properties of the physical environment of the first user, provides improved audio feedback to the user (e.g., regarding characteristics of the first audio input, the second audio input, and/or the first three-dimensional environment). Providing improved feedback enhances the operability of the device, which, additionally, reduces power usage and improves battery life of the device by enabling the user to use the device more quickly and efficiently.

In some embodiments, presenting the first computer-generated content (e.g., while the one or more output properties of the first computer-generated content are changed, while the one or more output properties of the first computer-generated content are not changed, etc.) includes outputting second audio content that is shared between the first user and a third user that is different from the first user and the second user in a communication session between the first user and the third user (e.g., the first user and the second user are engaged in a communication session, and the first computer-generated content includes a three-dimensional AR or VR environment or a virtual environment that includes a representation of the third user, and the first user and the second user has shared the second audio content to be played in the communication session), wherein outputting the second audio content includes generating third virtual audio reverberations for the second audio content in accordance with the simulated acoustic properties of the first three-dimensional environment. For example, in FIGS. 7Y-7Z, the audio content 7350 and the modified audio content 7350, optionally, include audio content shared in a communication session; and the shared audio content, when output by the first audio output component 7101, optionally, includes virtual audio reverberations that are generated based on a virtual three-dimensional environment with simulated acoustic properties, in accordance with some embodiments. In virtual three-dimensional environment and simulated acoustic properties are shared among the computer systems of the participants of the communication session when outputting the shared audio content in the communication session, in some embodiments. Outputting second audio content different from the first user and the second user in a communication session between the first user and the third user and generating third virtual audio reverberations for the second audio content in accordance with the simulated acoustic properties of the first three-dimensional environment that is shared between the first user and a third user, provides improved audio feedback to the user (e.g., regarding characteristics of the second audio content and/or the first three-dimensional environment). Providing improved feedback enhances the operability of the device, which, additionally, reduces power usage and improves battery life of the device by enabling the user to use the device more quickly and efficiently.

In some embodiments, the first computer-generated content includes first computer-generated visual content, and wherein changing the one or more output properties of the first computer-generated content while presenting the first computer-generated content includes changing one or more display properties of the first computer-generated visual content. For example, in FIG. 7Z, the computer system optionally outputs a modified version of the visual content 7108, in accordance with a determination that the movement of the first user 7200 relative to the second user 7201 indicates that the first user is turning toward the second user or otherwise directing his/her attention to the second user, in accordance with some embodiments. Changing one or more display properties of the first computer-generated visual content provides improved visual feedback to the user (e.g., the one more display properties are changed in accordance with the first movement of the first user). Providing improved feedback enhances the operability of the device, which, additionally, reduces power usage and improves battery life of the device by enabling the user to use the device more quickly and efficiently.

In some embodiments, changing the one or more display properties of the first computer-generated visual content includes increasing visual prominence of a representation of the physical environment of the first user. For example, in FIG. 7Z, the computer system optionally outputs a modified version of the visual content 7108, in accordance with a determination that the movement of the first user 7200 relative to the second user 7201 indicates that the first user is turning toward the second user or otherwise directing his/her attention to the second user, where outputting the modified version of the visual content 7108 includes reducing the amount of dimming or blurring applied to the transparent portion of the display generation component 7100 or the camera view of the representation of the physical environment, in accordance with some embodiments. Increasing visual prominence of a representation of the physical environment of the first user when changing one or more display properties of the first computer-generated visual content provides improved visual feedback to the user (e.g., the visual prominence increases in accordance with the first movement of the first user). Providing improved feedback enhances the operability of the device, which, additionally, reduces power usage and improves battery life of the device by enabling the user to use the device more quickly and efficiently.

In some embodiments, changing the one or more display properties of the first computer-generated visual content includes reducing a level of immersion provided by the first computer-generated visual content (e.g., increasing pass-through of the representation of the physical environment, applying a visual effect to change the appearance of the virtual content in a respective region of the virtual content based on the appearance of the portion of the physical environment that is located behind the location corresponding to the respective region of the virtual content relative to the viewpoint of the currently displayed view of the first computer-generated visual content). For example, in FIG. 7Z, the computer system optionally outputs a modified version of the visual content 7108, in accordance with a determination that the movement of the first user 7200 relative to the second user 7201 indicates that the first user is turning toward the second user or otherwise directing his/her attention to the second user, where outputting the modified version of the visual content 7108 includes reducing the amount of dimming and/or blurring applied to the transparent portion of the display generation component 7100 or the camera view of the representation of the physical environment, in accordance with some embodiments. For example, a shimmering visual effect, transmission of light through a simulated tinted glass, a rippling effect, etc. are applied to at least a portion of the virtual content, such that the portion of the virtual content changes its appearance based on the appearance of the representation of the physical environment that is located behind the portion of the virtual content. In this manner, the first computer system conveys the appearance of the physical environment, e.g., silhouette, colors, sizes, shapes, etc. of the second user, without ceasing to display the first visual content of the first computer-generated content. Reducing a level of immersion provided by the first computer-generated visual content when changing one or more display properties of the first computer-generated visual content provides improved visual feedback to the user (e.g., the level of immersion decreases in accordance with the first movement of the first user). Providing improved feedback enhances the operability of the device, which, additionally, reduces power usage and improves battery life of the device by enabling the user to use the device more quickly and efficiently.

In some embodiments, while presenting the first computer-generated content, the computer system detects second movement of the second user that changes the spatial relationship between the first user and the second user in the physical environment from a third spatial relationship to a fourth spatial relationship. In response to detecting the second movement of the second user: in accordance with a determination that the change in spatial relationship from the third spatial relationship to the fourth spatial relationship meets second criteria (e.g., criteria for detecting the second user turning his/her head toward the first user, leaning toward the first user while facing the first user, reaching out a hand toward the first user, etc.), the computer system changes the one or more output properties of the first computer-generated content while presenting the first computer-generated content; and in accordance with a determination that the change in spatial relationship from the third spatial relationship to the fourth spatial relationship does not meet the second criteria, the computer system presents the first computer-generated content without changing the one or more output properties of the first computer-generated content. For example, in FIG. 7Z, if the computer system detects that the second user 7201 is leaning toward the first user 7200 in a manner that indicates the second user's desire to gain the first user's attention, the computer system, optionally, modifies the output properties of the computer-generated content (e.g., visual content 7350 and/or visual content 7108) in a similar matter as the computer system detects such movement by the first user relative to the second user, in accordance with some embodiments. Changing the one or more output properties of the first computer-generated content while presenting the first computer-generated content in accordance with a determination that the change in spatial relationship from the third spatial relationship to the fourth spatial relationship meets second criteria and presenting the first computer-generated content without changing the one or more output properties of the first computer-generated content in accordance with a determination that the change in spatial relationship from the third spatial relationship to the fourth spatial relationship does not meet the second criteria provides additional control options without cluttering the UI with additional displayed controls (e.g., additional displayed controls corresponding to the first and second criteria). Providing additional control options without cluttering the UI with additional displayed controls enhances the operability of the device, which, additionally, reduces power usage and improves battery life of the device by enabling the user to use the device more quickly and efficiently.

In some embodiments, the first computer-generated content includes a view of a three-dimensional environment (e.g., VR environment, AR environment, etc.) that is shared by the first user and a third user, and wherein the view of the three-dimensional environment includes a representation of the third user that indicates a spatial positioning of the third user relative to the first user in the three-dimensional environment (e.g., the first user and the third user are participants of a co-presence experience in the three-dimensional environment). In some embodiments, the second user does not need to be present when the first user and the third user are participating in a shared experience in the three-dimensional environment. In response to detecting the first movement of the first user in the physical environment: in accordance with a determination that the first movement of the first user in the physical environment changes a spatial relationship between a respective representation of the first user and a respective representation of the third user in the three-dimensional environment from a fifth spatial relationship to a sixth spatial relationship and a determination that the change in spatial relationship from the fifth spatial relationship to the sixth spatial relationship meets third criteria (e.g., criteria for detecting the first user turning his/her head toward a location that corresponds to the representation of the third user, leaning toward a location that corresponds to the representation of the third user while facing the representation of the third user, reaching out a hand toward a location that corresponds to the representation of the third user, etc.), the computer system changes the one or more output properties of the first computer-generated content (e.g., reducing visual prominence of shared virtual content (e.g., a shared video, other sounds in the three-dimensional environment), reducing audio volume of some of the computer-generated audio content unrelated to the third user, increasing or enhancing the representation of the third user, increasing or enhancing sound from the third user, etc.) while presenting the first computer-generated content (e.g., a video shared in the three-dimensional environment, speech from other participants different from the first user and the third user, etc.). In accordance with a determination that the first movement of the first user in the physical environment changes the spatial relationship between the respective representation of the first user and the respective representation of the third user in the three-dimensional environment from the fifth spatial relationship to the sixth spatial relationship and a determination that the change in spatial relationship from the first spatial relationship to the second spatial relationship does not meet the third criteria (e.g., criteria for detecting the first user turning his/her head toward a location that corresponds to the representation of the third user, leaning toward a location that corresponds to the representation of the third user while facing the representation of the third user, reaching out a hand toward a location that corresponds to the representation of the third user, etc.), the computer system presents the first computer-generated content without changing the one or more output properties of the first computer-generated content (e.g., presenting the first computer-generated content without reducing visual prominence of shared virtual content (e.g., a shared video, other sounds in the three-dimensional environment), without reducing audio volume of some of the computer-generated audio content unrelated to the third user, without increasing or enhancing the representation of the third user, without increasing or enhancing sound from the third user, etc.). For example, in FIG. 7Z, if the first computer-generated content is a virtual or augmented reality environment of a communication session with a third user, and the audio content 7350 includes sounds that are not from the third user (e.g., from a shared content item playing in the communication session, from other participants of the communication session, etc.), and the computer system detects movement of the first user in the physical environment that corresponds to a movement in the virtual or augmented reality environment toward the representation of the third user in a manner that indicates the first user's attention being directed to the third user; in response, the computer system, optionally, modifies the sounds in the communication session that are not from the third user to lower their audio prominence relative to the sound from the third user, and optionally enhances the sound from the third user to increase its audio prominence relative to other sounds in the communication session, in accordance with some embodiments. Changing the one or more output properties of the first computer-generated content while presenting the first computer-generated content in accordance with a determination that the first movement of the first user in the physical environment of the first user changes a spatial relationship between a respective representation of the first user and a respective representation of the third user in the three-dimensional environment from a fifth spatial relationship to a sixth spatial relationship and a determination that the change in spatial relationship from the fifth spatial relationship to the sixth spatial relationship meets third criteria and presenting the first computer-generated content without changing the one or more output properties of the first computer-generated content in accordance with a determination that the first movement of the first user in the physical environment of the first user changes the spatial relationship between the respective representation of the first user and the respective representation of the third user in the three-dimensional environment from the fifth spatial relationship to the sixth spatial relationship and a determination that the change in spatial relationship from the first spatial relationship to the second spatial relationship does not meet the third criteria provides additional control options without cluttering the UI with additional displayed controls (e.g., additional displayed controls corresponding to the third criteria). Providing additional control options without cluttering the UI with additional displayed controls enhances the operability of the device, which, additionally, reduces power usage and improves battery life of the device by enabling the user to use the device more quickly and efficiently.

It should be understood that the particular order in which the operations in FIG. 16 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, 12000, 13000, 14000, and 15000) are also applicable in an analogous manner to method 14000 described above with respect to FIG. 16. For example, the gestures, gaze inputs, physical objects, user interface objects, controls, movements, criteria, three-dimensional environment, display generation component, surface, representation of physical object, virtual objects, and/or animations described above with reference to method 16000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000, 9000, 10000, 11000, 12000, 13000, 14000, and 15000). For brevity, these details are not repeated here.

The operations described above with reference to FIGS. 8, 9, 10, 11, 12, 13, 14, 15, and 16 are, optionally, implemented by components depicted in FIGS. 1-6. In some embodiments, aspects/operations of methods 8000, 9000, 10000, 11000, 12000, 13000, 14000, 15000, and 16000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A method, comprising:
at a computer system that is in communication with a first display generation component and one or more input devices:
displaying, via the first display generation component, a first view of a three-dimensional environment, including displaying at least a first user interface object at a first position in the three-dimensional environment and a second user interface object at a second position different from the first position in the three-dimensional environment;
while displaying the first view of the three-dimensional environment via the first display generation component, detecting a first gaze input directed to a first region in the three-dimensional environment that corresponds to the first position in the three-dimensional environment;
while detecting the first gaze input directed to the first region in the three-dimensional environment, detecting a first movement of a hand that meets first gesture criteria, wherein the first movement of the hand that meets the first gesture criteria includes pinching two or more fingers of the hand together and moving the hand while the two or more fingers are pinched together;
in response to detecting the first movement of the hand that meets the first gesture criteria while detecting the first gaze input directed to the first region in the three-dimensional environment:
in accordance with a determination that the first movement of the hand that meets the first gesture criteria is detected after first gaze criteria have been met, wherein first gaze criteria require that the first gaze input is held at the first region for at least a first preset amount of time in order for the first gaze criteria to be met, scrolling content displayed within the first user interface object in accordance with the movement of the hand while the two or more fingers are pinched together; and in accordance with a determination that the first movement of the hand that meets the first gesture criteria is detected before the first gaze criteria have been met, forgoing scrolling the content displayed within the first user interface object in accordance with the movement of the hand while the two or more fingers are pinched together.

2. The method of the claim 1, including:

detecting a first user input that meets preset criteria for activating a respective one of the first user interface object and the second user interface object while the respective one of the first user interface object or the second user interface object is selected; and in response to detecting the first user input, performing a first operation corresponding to the respective one of the first user interface object or the second user interface object that is selected.

3. The method of claim 1, including:

displaying a position indicator at a respective position in the three-dimensional environment that corresponds to a current position of the first gaze input, wherein the respective position of the position indicator is updated in accordance with movement of the first gaze input before the first gaze input is detected at the first region in the three-dimensional environment as well as while the first gaze input is detected at the first region in the three-dimensional environment.

4. The method of claim 1, including:

while the first user interface object is selected, detecting a second movement of the hand that meets the first gesture criteria, the second movement of the hand includes pinching two or more fingers of the hand together and moving the hand while the two or more fingers are pinched together, and in response to detecting the second movement of the hand, in accordance with a determination that the first user interface object is selected, moving the first user interface object in the three-dimensional environment in accordance with the second movement of the hand while the two or more fingers of the hand are pinched together.

5. The method of claim 1, wherein the first gesture criteria are capable of being met in response to the first movement of the hand irrespective of whether or not the first movement of the hand occurs in a region of a physical environment that corresponds to the first region of the three-dimensional environment.

6. The method of claim 1, including:

in response to detecting the first gaze input directed to the first region in the three-dimensional environment, changing a value of a first visual property of the first user interface object at the first position in the three-dimensional environment.

7. The method of claim 1, including:

in response to detecting the first gaze input directed to the first region in the three-dimensional environment:
in accordance with a determination that the first gaze input meets the first gaze criteria, changing a current value of a first visual property of the first user interface object in the three-dimensional environment; and
in accordance with a determination that the first gaze input does not meet the first gaze criteria, forgoing changing the current value of the first visual property of the first user interface object in the three-dimensional environment.

8. The method of claim 7, including:

in response to detecting the first movement of the hand that meets the first gesture criteria while detecting the first gaze input directed to the first region in the three-dimensional environment:
in accordance with a determination that the first movement of the hand that meets the first gesture criteria is detected while the first gaze input is detected, changing a value of a second visual property of the first user interface object in the three-dimensional environment, wherein changing the value of the second visual property is different from changing the current value of the first visual property.

9. The method of claim 1, including:

in accordance with a determination that the first gesture criteria and the first gaze criteria are both met, providing first visual feedback in the three-dimensional environment; and in accordance with a determination that the first gesture criteria are met and the first gaze criteria are not met, providing second visual feedback in the three-dimensional environment, the second visual feedback being different from the first visual feedback.

10. A computer system, comprising:

one or more input devices;

one or more processors; and memory storing one or more programs, wherein the computer system is in communication with a first display generation component, and wherein the one or more programs are configured to be executed by the one or more processors, the one or more programs including instructions for performing operations including:

displaying, via the first display generation component, a first view of a three-dimensional environment, including displaying at least a first user interface object at a first position in the three-dimensional environment and a second user interface object at a second position different from the first position in the three-dimensional environment;

while displaying the first view of the three-dimensional environment via the first display generation component, detecting a first gaze input directed to a first region in the three-dimensional environment that corresponds to the first position in the three-dimensional environment;

while detecting the first gaze input directed to the first region in the three-dimensional environment, detecting a first movement of a hand that meets first gesture criteria, wherein the first movement of the hand that meets the first gesture criteria includes pinching two or more fingers of the hand together and moving the hand while the two or more fingers are pinched together;

in response to detecting the first movement of the hand that meets the first gesture criteria while detecting the first gaze input directed to the first region in the three-dimensional environment:
in accordance with a determination that the first movement of the hand that meets the first gesture criteria is detected after first gaze criteria have been met, wherein first gaze criteria require that the first gaze input is held at the first region for at least a first preset amount of time in order for the first gaze criteria to be met, scrolling content displayed within the first user interface object in accordance with the movement of the hand while the two or more fingers are pinched together; and
in accordance with a determination that the first movement of the hand that meets the first gesture criteria is detected before the first gaze criteria have been met, forgoing scrolling the content displayed within the first user interface object in accordance with the movement of the hand while the two or more fingers are pinched together.

11. The computer system of claim 10, the one or more programs including instructions for performing operations including:
detecting a first user input that meets preset criteria for activating a respective one of the first user interface object and the second user interface object while the respective one of the first user interface object or the second user interface object is selected; and
in response to detecting the first user input, performing a first operation corresponding to the respective one of the first user interface object or the second user interface object that is selected.

12. The computer system of claim 10, the one or more programs including instructions for performing operations including:
displaying a position indicator at a respective position in the three-dimensional environment that corresponds to a current position of the first gaze input, wherein the respective position of the position indicator is updated in accordance with movement of the first gaze input before the first gaze input is detected at the first region in the three-dimensional environment as well as while the first gaze input is detected at the first region in the three-dimensional environment.

13. The computer system of claim 10, wherein the one or more programs include instructions for performing operations include:
while the first user interface object is selected, detecting a second movement of the hand that meets the first gesture criteria, the second movement of the hand includes pinching two or more fingers of the hand together and moving the hand while the two or more fingers are pinched together, and
in response to detecting the second movement of the hand, in accordance with a determination that the first user interface object is selected, moving the first user interface object in the three-dimensional environment in accordance with the second movement of the hand while the two or more fingers of the hand are pinched together.

14. The computer system of claim 10, wherein the first gesture criteria are capable of being met in response to the first movement of the hand irrespective of whether or not the first movement of the hand occurs in a region of a physical environment that corresponds to the first region of the three-dimensional environment.

15. The computer system of claim 10, the one or more programs including instructions for performing operations including:
in response to detecting the first gaze input directed to the first region in the three-dimensional environment, changing a value of a first visual property of the first user interface object in the three-dimensional environment.

16. A non-transitory computer-readable storage medium storing one or more programs, wherein the one or more programs are configured to be executed by one or more processors of a computer system, wherein the computer system is in communication with one or more input devices and a first display generation component, and wherein the one or more programs include instructions for performing operations including:
displaying, via the first display generation component, a first view of a three-dimensional environment, including displaying at least a first user interface object at a first position in the three-dimensional environment and a second user interface object at a second position different from the first position in the three-dimensional environment;
while displaying the first view of the three-dimensional environment via the first display generation component, detecting a first gaze input directed to a first region in the three-dimensional environment that corresponds to the first position in the three-dimensional environment;
while detecting the first gaze input directed to the first region in the three-dimensional environment, detecting a first movement of a hand that meets first gesture criteria, wherein the first movement of the hand that meets the first gesture criteria includes pinching two or more fingers of the hand together and moving the hand while the two or more fingers are pinched together;
in response to detecting the first movement of the hand that meets the first gesture criteria while detecting the first gaze input directed to the first region in the three-dimensional environment:
in accordance with a determination that the first movement of the hand that meets the first gesture criteria is detected after first gaze criteria have been met, wherein first gaze criteria require that the first gaze input is held at the first region for at least a first preset amount of time in order for the first gaze criteria to be met, scrolling content displayed within the first user interface object in accordance with the movement of the hand while the two or more fingers are pinched together; and
in accordance with a determination that the first movement of the hand that meets the first gesture criteria is detected before the first gaze criteria have been met, forgoing scrolling the content displayed within the first user interface object in accordance with the movement of the hand while to the two or more fingers are pinched together.

17. The computer system of claim 10, the one or more programs including instructions for performing operations including:
in response to detecting the first gaze input directed to the first region in the three-dimensional environment:
in accordance with a determination that the first gaze input meets the first gaze criteria, changing a current value of a first visual property of the first user interface object in the three-dimensional environment; and
in accordance with a determination that the first gaze input does not meet the first gaze criteria, forgoing changing the current value of the first visual property of the first user interface object in the three-dimensional environment.

18. The computer system of claim 17, the one or more programs including instructions for performing operations including:
in response to detecting the first movement of the hand that meets the first gesture criteria while detecting the first gaze input directed to the first region in the three-dimensional environment:
   in accordance with a determination that the first movement of the hand that meets the first gesture criteria is detected while the first gaze input is detected, changing a value of a second visual property of the first user interface object in the three-dimensional environment, wherein changing the value of the second visual property is different from changing the current value of the first visual property.

19. The computer system of claim 10, the one or more programs including instructions for performing operations including:
  in accordance with a determination that the first gesture criteria and the first gaze criteria are both met, providing first visual feedback in the three-dimensional environment; and
  in accordance with a determination that the first gesture criteria are met and the first gaze criteria are not met, providing second visual feedback in the three-dimensional environment, the second visual feedback being different from the first visual feedback.

20. The non-transitory computer-readable storage medium of claim 16, wherein the one or more programs include instructions for performing operations including:
  detecting a first user input that meets preset criteria for activating a respective one of the first user interface object and the second user interface object while the respective one of the first user interface object or the second user interface object is selected; and
  in response to detecting the first user input, performing a first operation corresponding to the respective one of the first user interface object or the second user interface object that is selected.

21. The non-transitory computer-readable storage medium of claim 16, wherein the one or more programs include instructions for performing operations including:
  displaying a position indicator at a respective position in the three-dimensional environment that corresponds to a current position of the first gaze input, wherein the respective position of the position indicator is updated in accordance with movement of the first gaze input before the first gaze input is detected at the first region in the three-dimensional environment as well as while the first gaze input is detected at the first region in the three-dimensional environment.

22. The non-transitory computer-readable storage medium of claim 16, wherein the one or more programs include instructions for performing operations including:
  while the first user interface object is selected, detecting a second movement of the hand that meets the first gesture criteria, the second movement of the hand includes pinching two or more fingers of the hand together and moving the hand while the two or more fingers are pinched together, and
  in response to detecting the second movement of the hand, in accordance with a determination that the first user interface object is selected, moving the first user interface object in the three-dimensional environment in accordance with the second movement of the hand while the two or more fingers of the hand are pinched together.

23. The non-transitory computer-readable storage medium of claim 16, wherein the first gesture criteria are capable of being met in response to the first movement of the hand irrespective of whether or not the first movement of the hand occurs in a region of a physical environment that corresponds to the first region of the three-dimensional environment.

24. The non-transitory computer-readable storage medium of claim 16, wherein the one or more programs include instructions for performing operations including:
  in response to detecting the first gaze input directed to the first region in the three-dimensional environment, changing a value of a first visual property of the first user interface object at the first position in the three-dimensional environment.

25. The non-transitory computer-readable storage medium of claim 16, wherein the one or more programs include instructions for performing operations including:
  in response to detecting the first gaze input directed to the first region in the three-dimensional environment:
   in accordance with a determination that the first gaze input meets the first gaze criteria, changing a current value of a first visual property of the first user interface object in the three-dimensional environment; and
   in accordance with a determination that the first gaze input does not meet the first gaze criteria, forgoing changing the current value of the first visual property of the first user interface object in the three-dimensional environment.

26. The non-transitory computer-readable storage medium of claim 25, wherein the one or more programs include instructions for performing operations including:
  in response to detecting the first movement of the hand that meets the first gesture criteria while detecting the first gaze input directed to the first region in the three-dimensional environment:
   in accordance with a determination that the first movement of the hand that meets the first gesture criteria is detected while the first gaze input is detected, changing a value of a second visual property of the first user interface object in the three-dimensional environment, wherein changing the value of the second visual property is different from changing the current value of the first visual property.

27. The non-transitory computer-readable storage medium of claim 16, wherein the one or more programs include instructions for performing operations including:
  in accordance with a determination that the first gesture criteria and the first gaze criteria are both met, providing first visual feedback in the three-dimensional environment; and
  in accordance with a determination that the first gesture criteria are met and the first gaze criteria are not met, providing second visual feedback in the three-dimensional environment, the second visual feedback being different from the first visual feedback.

* * * * *